US008959555B2

(12) United States Patent
Monari et al.

(10) Patent No.: US 8,959,555 B2
(45) Date of Patent: Feb. 17, 2015

(54) INSTRUMENTED SPORTS PARAPHERNALIA SYSTEM

(71) Applicants: Lawrence Maxwell Monari, Palm Bay, FL (US); Lawrence Scott Monari, Palm Bay, FL (US)

(72) Inventors: Lawrence Maxwell Monari, Palm Bay, FL (US); Lawrence Scott Monari, Palm Bay, FL (US)

( * ) Notice: Subject to any disclaimer, the term of this patent is extended or adjusted under 35 U.S.C. 154(b) by 37 days.

(21) Appl. No.: 13/909,335

(22) Filed: Jun. 4, 2013

(65) Prior Publication Data

US 2014/0013361 A1 Jan. 9, 2014

Related U.S. Application Data

(60) Provisional application No. 61/667,512, filed on Jul. 3, 2012.

(51) Int. Cl.

| | |
|---|---|
| ***H04N 7/18*** | (2006.01) |
| ***H04N 13/02*** | (2006.01) |
| ***H04N 21/61*** | (2011.01) |
| ***H04N 5/225*** | (2006.01) |
| ***A63B 63/00*** | (2006.01) |
| ***A63B 43/00*** | (2006.01) |
| ***H04N 21/218*** | (2011.01) |
| ***H04N 21/2187*** | (2011.01) |
| ***H04N 21/414*** | (2011.01) |
| *H04N 5/232* | (2006.01) |
| *H04N 5/247* | (2006.01) |
| *A63B 67/14* | (2006.01) |
| *A63B 71/00* | (2006.01) |

(52) U.S. Cl.

CPC ........... *H04N 7/181* (2013.01); *H04N 13/0242* (2013.01); *H04N 21/6106* (2013.01); *H04N 5/2252* (2013.01); *H04N 5/23206* (2013.01); *H04N 5/23238* (2013.01); *H04N 13/0239* (2013.01); *H04N 2213/001* (2013.01); *H04N 5/247* (2013.01); *A63B 63/004* (2013.01); *A63B 67/14* (2013.01); *A63B 43/00* (2013.01); *A63B 43/002* (2013.01); *A63B 2071/0063* (2013.01); *A63B 2209/10* (2013.01); *A63B 2220/806* (2013.01); *A63B 2220/808* (2013.01); *A63B 2220/833* (2013.01); *A63B 2225/20* (2013.01); *A63B 2225/50* (2013.01); *A63B 2225/54* (2013.01); *H04N 21/21805* (2013.01); *H04N 21/2187* (2013.01); *H04N 21/41415* (2013.01); *H04N 21/6125* (2013.01); *H04N 21/6131* (2013.01)

USPC ............... 725/74; 725/62; 725/143; 725/148; 348/143; 348/151; 348/157; 348/158; 348/159

(58) Field of Classification Search

USPC ...................................... 725/62, 74; 348/157

See application file for complete search history.

(56) References Cited

U.S. PATENT DOCUMENTS

| | | | | |
|---|---|---|---|---|
| 5,280,904 A * | 1/1994 | Rodriguez | .................... | 473/477 |
| 5,553,846 A * | 9/1996 | Frye et al. | .................... | 473/455 |

(Continued)

FOREIGN PATENT DOCUMENTS

| | | |
|---|---|---|
| GB | 2407725 A * | 5/2005 |
| GB | 2487209 A * | 7/2012 |

*Primary Examiner* — Robert Hance

(57) ABSTRACT

A real time system to both televise and stream sporting events from sports paraphernalia that are ordinarily used by the players on soccer playing fields, ice hockey rinks, tennis courts, baseball playing fields and football playing fields are disclosed. The sports paraphernalia are instrumented with a variety of TV cameras, microphones, and bi-directional communication electronics. Instrumented sports paraphernalia such as ice hockey goals, ice hockey pucks, soccer goals, tennis nets, tennis posts, baseball bases, baseball home plates, baseball pitcher's rubbers and footballs are disclosed. Instrumentation is built into and contained internally within some of the instrumented sports paraphernalia. Instrumentation is mounted and attached onto some of the sports paraphernalia. The instrumented sports paraphernalia can both televise signals to a TV viewing audience, and simultaneously stream onto the internet.

37 Claims, 56 Drawing Sheets

(56) References Cited

U.S. PATENT DOCUMENTS

| | | | | |
|---|---|---|---|---|
| 5,852,754 | A * | 12/1998 | Schneider | 396/427 |
| 6,704,044 | B1 * | 3/2004 | Foster et al. | 348/157 |
| 6,735,382 | B2 * | 5/2004 | Schneider | 396/26 |
| 8,237,787 | B2 * | 8/2012 | Hollinger | 348/82 |
| 2004/0036770 | A1 * | 2/2004 | Adams | 348/157 |
| 2005/0179774 | A1 * | 8/2005 | Fletcher et al. | 348/61 |
| 2006/0273522 | A1 * | 12/2006 | Marshall et al. | 273/407 |
| 2007/0188612 | A1 * | 8/2007 | Carter | 348/157 |
| 2007/0260743 | A1 * | 11/2007 | Oijer | 709/231 |
| 2008/0192117 | A1 * | 8/2008 | Shanks et al. | 348/157 |
| 2011/0237367 | A1 * | 9/2011 | Kodama et al. | 473/570 |

* cited by examiner

FIG 9A
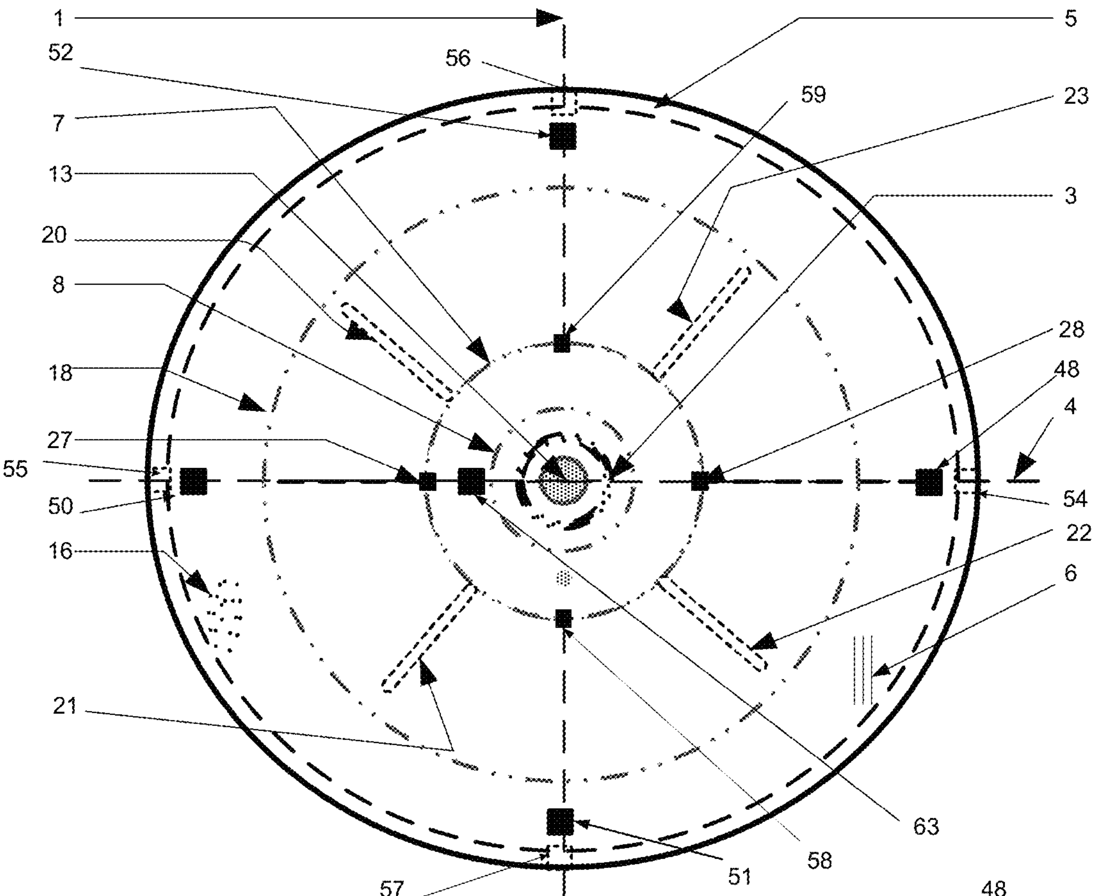
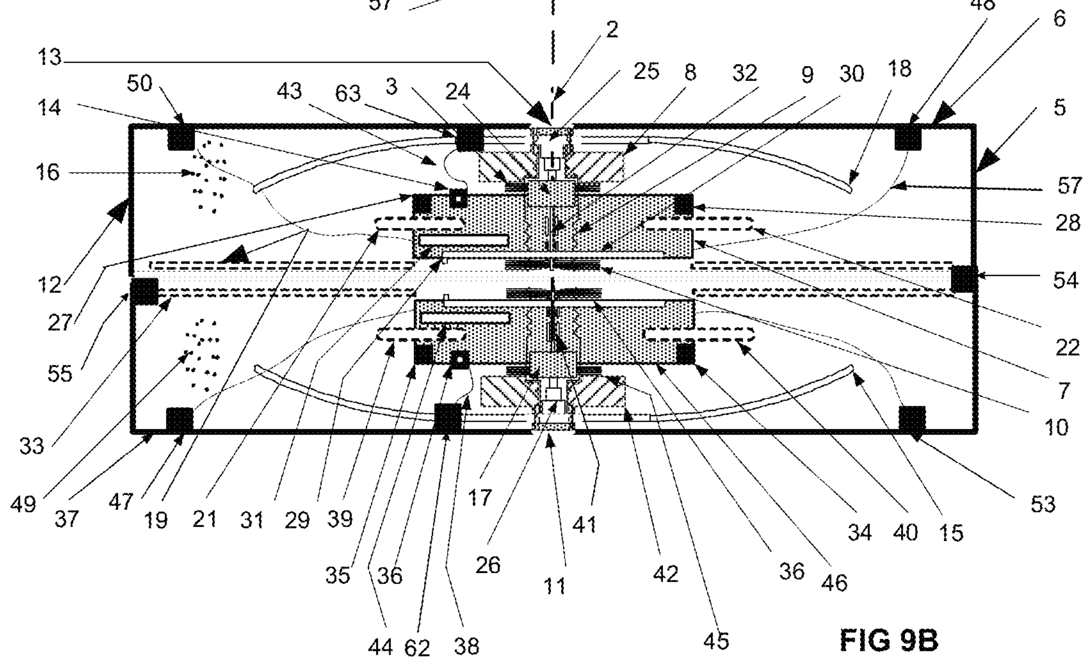
FIG 9B

A
A

FIG 28C
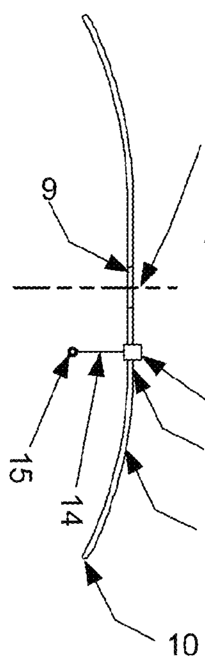
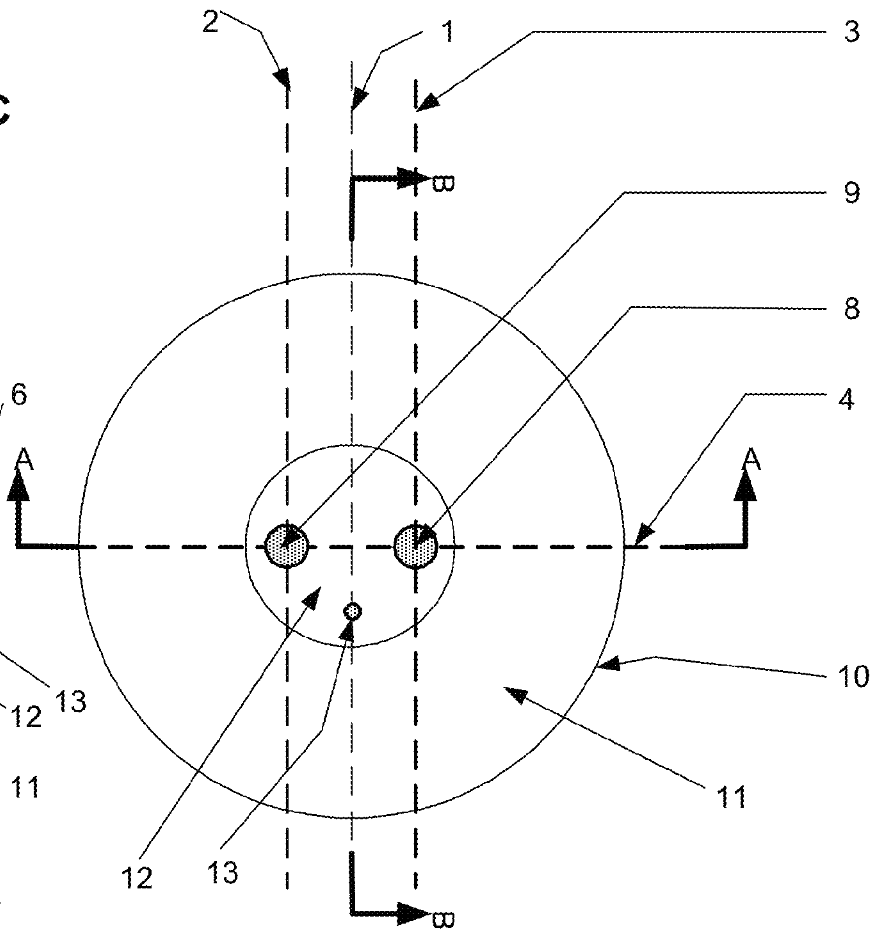
FIG 28A
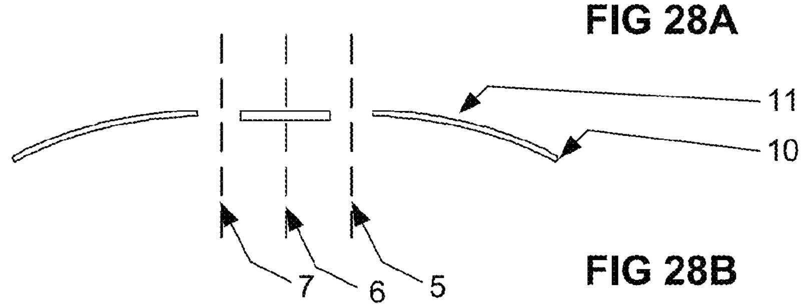
FIG 28B

FIG 42A
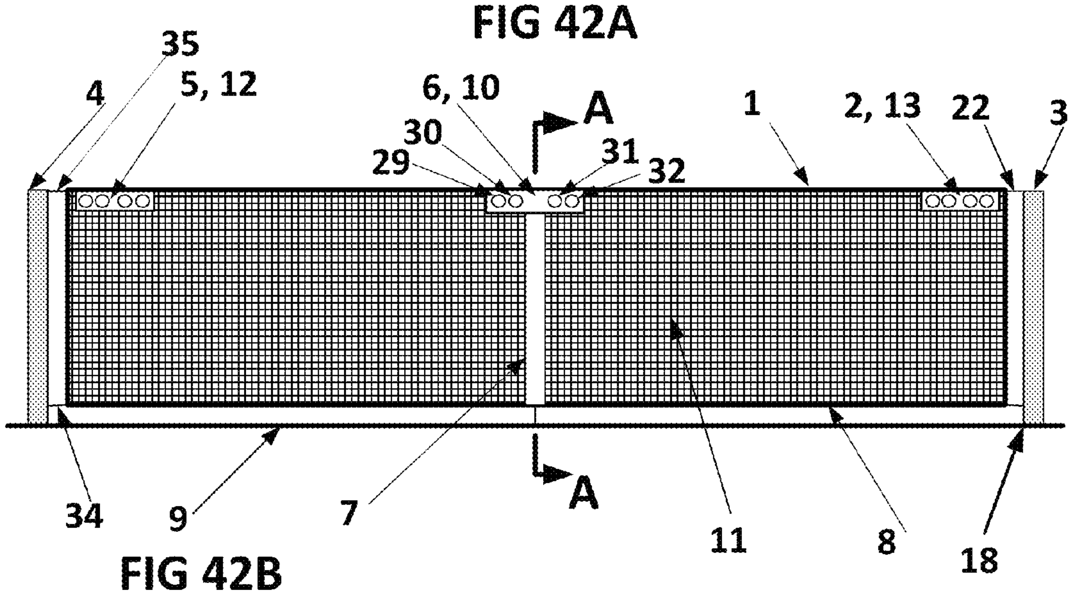
FIG 42B
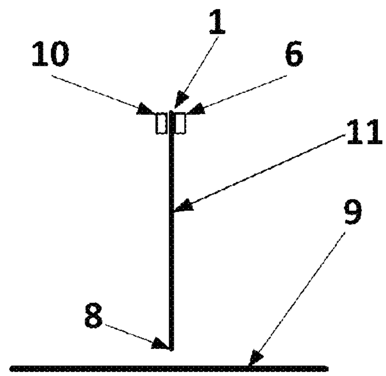
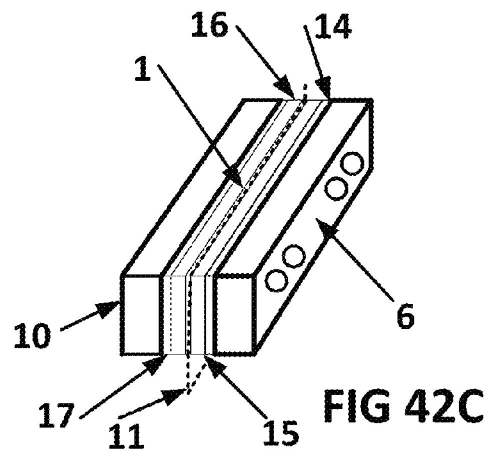
FIG 42C
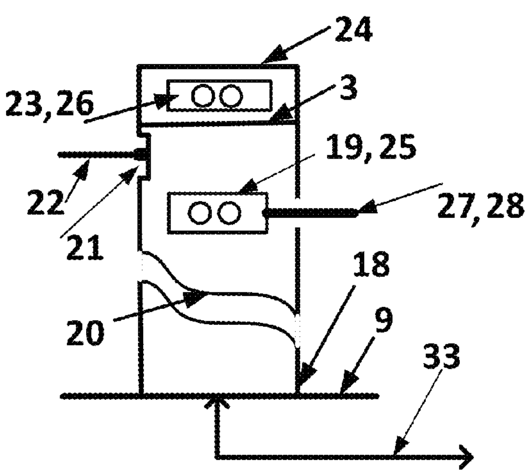
FIG 42D
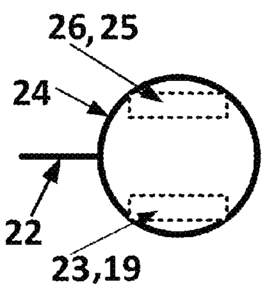
FIG 42E

INSTRUMENTED SPORTS PARAPHERNALIA SYSTEM

"This application claims the benefit of U.S. Provisional Application No. 61667512, filed 03-Jul.-2012."

BACKGROUND OF THE INVENTION

1. Field of the Invention

The present invention relates generally to television broadcasting and streaming, and in particular to the television broadcasting and streaming of sports events from a system of instrumented sports paraphernalia on the playing fields/rinks of sports stadiums.

2. Description of the Prior Art

Many sports are played in sports venues including stadiums, arenas etc. Examples of these sports are football, baseball and ice hockey. Football, baseball and ice hockey are televised in these venues for entertaining TV viewing audiences, training players; and for doing instant replays.

A prior art system for capturing video and audio of these sporting events within these venues involves positioning video cameras at ground, roof and balcony locations within the sporting arena or sports stadium, around the periphery of the sporting event and outside of the actual playing field. U.S. Pat. No. 8,194,135 (James) and U.S. Pat. No. 8,184,169 (Ortiz) and U.S. Pat. No. 8,059,152 (daCosta) and U.S. Pat. No. 8,013,899 (Gillard) and U.S. Pat. No. 7,376,388 (Ortiz) and U.S. Pat. No. 7,030,906 (Auffret) and U.S. Pat. No. 6,934,510 (Katayama) and U.S. Pat. No. 6,873,355 (Thompson) and U.S. Pat. No. 6,681,398 (Verna) and U.S. Pat. No. 5,416,513 (Morisaki) are examples.

Another prior art system for capturing video and audio of these sporting events involves mounting cameras at various mobile or fixed overhead positions on cable rails deployed over the playing field. U.S. Pat. No. 8,199,197 (Bennett) and U.S. Pat. No. 7,239,106 (Rodnunsky) and U.S. Pat. No. 5,568,189 (Kneller) and U.S. Pat. No. 4,710,819 (Brown) are examples.

Yet another prior art system for capturing video and audio of these sporting events involves the use of hand held cameras carried around the periphery of the sporting event and outside of the actual playing field. U.S. Pat. No. 7,128,419 (Harris) and U.S. Pat. No. 4,017,168 (Brown) are examples.

Still yet another prior art system for capturing video and audio of these sporting events involves cameras mounted on blimps deployed in the air space above the playing field. U.S. Pat. No. 7,173,649 (Shannon) and U.S. Pat. No. 5,426, 476 (Fussell) are examples.

Other prior art systems for capturing video and audio of these sporting events involve cameras mounted on helmets and caps used by the players on the playing field. U.S. Pat. No. 6,819,354 (Foster) and U.S. Pat. No. 6,704,044 (Foster) and U.S. Pat. No. 6,028,627 (Helmsderfer) are examples.

Also, in prior art fields unrelated to television sports broadcasting and streaming, cameras have been carried aloft by sport's projectiles et al, where the cameras are used and specifically adapted to measure the path of travel of the projectiles in their flight. These projectiles concentrate on getting pictures without sound, while the projectiles are in the air for the purpose of determining the path of the projectile. U.S. Pat. No. 6,833,849 (Kurokawa) and U.S. Pat. No. 6,995,787 (Adams) and U.S. Pat. No. 7,335,116 (Petrov) and U.S. Pat. No. 7,791,808 (French) and U.S. Pat. No. 8,085,188 (Tuxen) are examples. Projectiles in the prior art do not address the needs of broadcast television for the TV viewing audience, and streaming for the internet users.

It should be noted that an important consideration in meeting the needs of televising and streaming sporting events is to routinely provide high quality entertaining pictures and sounds to the TV viewing audience and the internet users which contain significant aspects of the game. Prior art projectiles like those cited above have not been designed or intended or made practical or useful as suitable platforms from which to televise and stream sporting events.

BRIEF SUMMARY OF THE INVENTION

This invention relates to a system used to both televise and stream sports events from instrumented sports paraphernalia. Sports paraphernalia, which are ordinarily used by the players on the playing field during a game, are instrumented with TV cameras, microphones and electronics to both televise and stream the audio and video of the game.

SPECIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF THE SEVERAL VIEWS OF THE DRAWINGS

In order to more fully understand the objects of the invention, the following detailed description of the illustrative embodiments should be read in conjunction with the appended figure drawings, wherein:

FIG. 9A is a top view of the two sided two-camera instrumented ice hockey puck.

FIG. 9B is a front view of the two sided two-camera instrumented ice hockey puck.

FIG. 28A is the top view of an upper protective cover plate with two windows.

FIG. 28B is the front view of an upper protective cover plate with two windows.

FIG. 28C is the side view of an upper protective cover plate with two windows.

FIG. 42A is a front view of the instrumented tennis net.

FIG. 42B is a side view A-A section of FIG. 42A of the instrumented tennis net.

FIG. 42C is an isometric view of instrumentation modules mounted on the net using a Velcro sandwich.

FIG. 42D is a front view of instrumentation modules mounted on a net post.

FIG. 42E is a top view of instrumentation modules mounted on a net post.

DETAILED DESCRIPTION OF THE INVENTION

Figure 1C:
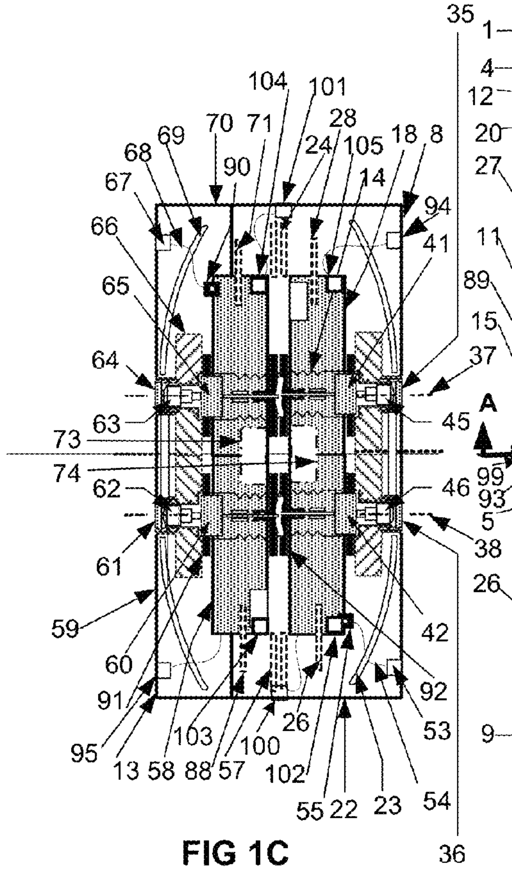
FIG. 1C shows a side view of the eight camera two sided instrumented ice hockey puck.

Throughout this description, the preferred embodiments and examples shown should be considered as examples, rather than limitations, of the present invention.

The following are some of the preferred embodiments and contemplations disclosed in the present invention for the major system components of the "Instrumented Sports Paraphernalia System" discussed in the detailed descriptions of the drawings.

General Instrumented Sports Paraphernalia System
- Instrumented Sports Paraphernalia
- Instrumented Sports Stadiums/Arenas
- Instrumented Playing Fields, Rinks, Courts
- Remote Base Stations
- Antenna Array Relay Junctions
- Instrumented Ice Hockey Pucks
- Instrumented Ice Hockey Goals
- Instrumented Soccer Goals
- Instrumented Tennis Nets
- Instrumented Tennis Posts
- Instrumented Volleyball Nets
- Instrumented Volleyball Posts
- Instrumentation Modules
- Instrumentation Package Assemblies
- Battery Pack Charging Stations
- Hand Held Remotes
- System for Streaming Games on the Internet
- System for televising Games on broadcast TV General "Instrumented Sports Paraphernalia System" Preferred Embodiments and Contemplations The present invention contemplates a system architecture for streaming on the internet high definition video and multidimensional audio from soccer, ice hockey, tennis and baseball games, captured by cameras and microphones contained within instrumentation modules 3, 4, 5 and 6 that are positioned and attached on and to a system of instrumented sports paraphernalia such as soccer goals, ice hockey goals, baseball bases, baseball home plates, baseball pitcher's rubbers, volleyball nets, volleyball net posts, tennis nets, and tennis net posts, to an audience which may or may not have spectators present at the games but wish to subscribe and view the games remotely on their personal wireless display devices.

The present invention also contemplates equipping existing prior art sports stadiums/arenas with an "Instrumented Sports Paraphernalia System" comprised of instrumented sports paraphernalia, an antenna array relay junction(s), bi-directional communication links and a remote base station, to improve the quality of the sports stadium's/arena's TV broadcasts. The present invention contemplates a system for televising professional, college and high school league sports games with cameras and microphones positioned on the playing field/rink amongst the players. The TV cameras and microphones, along with their supporting electronics, are packaged in modules which are housed inside selected sports paraphernalia like ice hockey pucks, ice hockey goals and soccer goals that are used in the game by the players on the playing field/rink. Sports paraphernalia instrumented in this way will be called "instrumented sports paraphernalia". The module containing the TV cameras and microphones within the instrumented ice hockey goals and instrumented soccer goals will be called an "instrumentation module". The module containing the TV cameras and microphones within the instrumented ice hockey pucks will be called an "instrumentation package assembly". Examples of preferred embodiments of instrumented sports paraphernalia disclosed in the present invention are: instrumented ice hockey pucks, instrumented ice hockey goals, and instrumented soccer goals.

The present invention contemplates a system for wirelessly televising professional league soccer, ice hockey, tennis, volleyball, baseball and football games from instrumented sports paraphernalia like soccer goals, ice hockey goals, tennis nets, tennis posts, baseball bases, baseball home plates, baseball pitcher's rubbers and footballs. Instrumentation modules, which contain television cameras and microphones, are mounted inside of the structural members of the soccer goals, tennis net posts and ice hockey goals. TV signals are transmitted from the instrumentation modules mounted inside of the structural members of the soccer goals, tennis net posts and ice hockey goals to a remote base station. The instrumentation modules have optical windows. The cameras are deployed at the optical windows enabling them to look out from inside the instrumentation modules onto the playing field/rink from the vantage point of the soccer goals and the ice hockey goals. The pictures and sounds acquired by the TV cameras and microphones are transmitted from the instrumented sports paraphernalia via a closed circuit bi-directional RF wireless and/or fiber optics cable transmitting and receiving network to a remote base station via an antenna array relay junction. The pictures and sounds are processed and formatted at the remote base station, thus preparing them for presentation to a final live TV audience for viewing. An operator at the remote base station commands and controls the electronic and optical functions of the instrumented sports paraphernalia by receiving control status signals from the instrumented sports paraphernalia, and transmitting command and control signals to the instrumented sports paraphernalia via the antenna array relay junction(s) using the bi-directional RF wireless and/or fiber optics cable network. The present invention is contemplated to endure the rigors of the hostile environment on the field/rink. The instrumented sports paraphernalia is both airtight and watertight and is designed to endure shock, vibration and temperature extremes.

The present invention also contemplates a system for wirelessly televising professional soccer, tennis, volleyball and ice hockey games from instrumented sports paraphernalia, like soccer goals, tennis nets, and ice hockey goals that are instrumented with instrumentation modules containing television cameras and microphones, where the instrumentation modules are mounted and attached to the outside of the structural members of the instrumented soccer goals, tennis nets, volleyball nets, volleyball net posts, and ice hockey goals. TV signals are transmitted from the cameras and microphones within the instrumentation modules that are attached to the goals, to a remote base station. The instrumentation modules have optical windows. The cameras are deployed at the optical windows enabling them to look out from inside the instrumentation modules onto the playing field/rink from the vantage point of the soccer goals and the ice hockey goals. The pictures and sounds acquired by the TV cameras and microphones are transmitted from the instrumented sports paraphernalia via a closed circuit bi-directional RF wireless and/or fiber optics cable transmitting and receiving network to a remote base station via an antenna array relay junction. The pictures and sounds are processed and formatted at the remote base station, thus preparing them for presentation to a final live TV audience for viewing. An operator at the remote base station commands and controls the electronic and optical functions of the instrumented sports paraphernalia by receiving control status signals from the instrumented sports paraphernalia, and transmitting command and control signals to the instrumented sports paraphernalia via the antenna array relay junction(s) and using the bi-directional RF wireless and/or fiber optics cable network. The present invention is contemplated to endure the rigors of the hostile environment on the field/rink. The instrumented sports paraphernalia are both airtight and watertight and is designed to endure shock, vibration and temperature extremes.

The present invention contemplates a system for wirelessly televising professional league ice hockey games from instrumented sports paraphernalia like ice hockey pucks. Instrumentation package assemblies, which contain television cameras and microphones, are mounted inside of the ice hockey pucks. TV signals are transmitted from the instrumentation package assemblies mounted inside of the ice hockey pucks to a remote base station. The Instrumentation package assemblies have optical windows. The cameras are deployed at the optical windows enabling them to look out from inside the instrumented ice hockey pucks onto the ice rink from the vantage point of the ice hockey pucks. The pictures and sounds acquired by the TV cameras and microphones are transmitted from the ice hockey pucks via a closed circuit bi-directional RF wireless transmitting and receiving network to a remote base station via an antenna array relay junction. The pictures and sounds are processed and formatted at the remote base station, thus preparing them for presentation to a final live TV audience for viewing. An operator at the remote base station commands and controls the electronic and optical functions of the instrumented ice hockey pucks by receiving control status signals from the instrumented ice hockey pucks, and transmitting command and control signals to the instrumented ice hockey pucks via the antenna array relay junction(s) using the bi-directional RF wireless network. The present invention is contemplated to endure the rigors of the hostile environment on the field/rink. The instrumented ice hockey pucks are both airtight and watertight and are designed to endure shock, vibration and temperature extremes.

The televised pictures and sound are transmitted as signals from the instrumented sports paraphernalia via wireless radio, fiber optics cable and/or copper cable to an antenna array relay junction(s) which is positioned beyond the side lines of the playing field/rink. The antenna array relay junction(s) then relays the signals by wireless radio, fiber optics cable and/or copper cable to a remote base station which is in the vicinity of the sports stadium/arena. The remote base station processes the incoming signals and broadcasts the pictures and sounds to a live TV viewing audience.

In a preferred embodiment of the present invention, the remote base station simultaneously receives signals from a multitude of instrumented sports paraphernalia that are on the playing field/rink/court. In a preferred embodiment of the present invention, the remote base station simultaneously transmits command and control signals back to the multitude of instrumented sports paraphernalia to control their functions. In a preferred embodiment of the present invention, the instrumented sports paraphernalia transmit status control signals to the remote base station to close the feedback loop. In alike manner, the present invention contemplates ways and means to televise the pictures and sounds from sports demonstrations, sports promotions, sports commercials, player warm-up sessions, and player training sessions.

The present invention contemplates televising and streaming pictures and sounds of the players from rare exciting vantage points amongst the players on the playing field/rink. The present invention enables cameras and microphones to be near to and amongst the players themselves during each play of the game. The present invention provides a more close at hand method of televising fast action packed sports events, like ice hockey and soccer by doing it from the sports paraphernalia used by the players within the game itself; thereby conveying a level of excitement and detail of the game heretofore unrealized by the viewing audience. It is contemplated that the instrumented sports paraphernalia will be equipped with 3-D stereo camera pairs to further convey the realism and excitement of the game to the TV viewing audience.

The present invention contemplates that the TV cameras will see and hear out onto the playing field from a whole selection of vantage points from within the instrumented sports paraphernalia. For example, TV cameras will see and hear out from the tops and bottoms of instrumented ice hockey pucks; TV cameras will see and hear out from instrumentation modules mounted to the top horizontal cross bar of the instrumented soccer goals; and TV cameras will see and hear out from instrumentation modules mounted to the top horizontal cross bar of the instrumented ice hockey goals; TV cameras will see and hear out from instrumentation modules mounted to the footing of the instrumented soccer goals; and TV cameras will see and hear out from instrumentation modules mounted to the footing of the instrumented ice hockey goals; TV cameras will see and hear out from instrumentation modules mounted inside the top horizontal cross bar of the instrumented soccer goals; and TV cameras will see and hear out from instrumentation modules mounted inside the top horizontal cross bar of the instrumented ice hockey goals; TV cameras will see and hear out from instrumentation modules mounted inside the footing of the instrumented soccer goals; and TV cameras will see and hear out from instrumentation modules mounted inside the footing of the instrumented ice hockey goals.

The present invention contemplates that the instrumented soccer goals will be flexible to mount instrumentation modules at any location inside or on the instrumented soccer goals so that the TV audience will hear and see the game from any vantage point and angle from the soccer goals.

The present invention contemplates that the instrumented ice hockey goals will be flexible to mount instrumentation modules at any location inside or on the instrumented ice hockey goals so that the TV audience will hear and see the game from any vantage point and angle from the soccer goals.

The present invention contemplates that the instrumented sports paraphernalia can substitute for conventional sports paraphernalia on the playing field/rink amongst the players and be accepted by the leagues. The present invention contemplates the instrumented sports paraphernalia to have substantially the same weight, balance, appearance and playing qualities as conventional professional league sports paraphernalia, so as to be accepted as credible substitutes by the leagues and qualify them to substitute for conventional professional league sports paraphernalia used in the game. The present invention contemplates a system for wirelessly televising professional league soccer and ice hockey games from soccer goals, ice hockey goals and ice hockey pucks that are instrumented with television cameras and microphones that are housed inside the sports paraphernalia, where TV signals are transmitted from the cameras and microphones from within the sports paraphernalia to a remote base station for processing, where from the final signals are broadcasted to a TV viewing audience.

The present invention contemplates that the instrumentation package assembly and instrumentation modules within the instrumented sports paraphernalia be instrumented with transceivers and antennas to transmit radio signals encoded with the picture and sound information to a remote base station via an antenna array relay junction. The present invention contemplates that one or more cameras, and one or more microphones, and supporting electronics are packaged within an instrumentation package assembly and instrumentation module that is housed inside the instrumented sports paraphernalia. The instrumented sports paraphernalia is used on the field of play in place of the conventional sports paraphernalia which it replaces during a game. The instrumented sports paraphernalia, except for any externally mounted instrumentation modules, has the identical outward appearance and playability as the conventional sports paraphernalia it replaces. The instrumented sports paraphernalia possesses one or more optical windows through which its cameras may acquire video as they look out onto the playing field. The instrumentation package assembly and instrumentation modules possesses sound conduction paths by which the microphones hear the sounds of impacts made directly to the instrumented sports paraphernalia, and also sounds made in the vicinity of the instrumented sports paraphernalia. The instrumented sports paraphernalia and instrumentation modules possess all the elements within themselves, necessary to wirelessly transmit video and sound of the game from within themselves, to a remote base station via an antenna array relay junction(s). The antenna array relay junction(s) and the remote base station are both located in the sports stadium/arena and its vicinity. The instrumented sports paraphernalia are deployed at the same traditional locations of the conventional sports paraphernalia which they substitute for on the playing field/rink amongst the players during a game.

Inside the instrumented sports paraphernalia the TV cameras are deployed at optical windows enabling them to look out from the instrumented sports paraphernalia onto the playing field. The pictures and sounds acquired by the TV cameras and microphones are transmitted from the instrumented sports paraphernalia via a bi-directional closed circuit transmitting and receiving network to a remote base station. The pictures and sounds are processed and formatted at the remote base station, thus preparing them for presentation to a final live TV audience for viewing. An operator at the remote base station commands and controls the electronic and optical functions of the instrumented sports paraphernalia by transmitting command and control signals to the instrumented sports paraphernalia using the bi-directional RF wireless and/or fiber optics cable network. The present invention is contemplated to endure the rigors of the hostile environment on the field. The instrumented sports paraphernalia are both airtight and watertight and are designed to endure shock, vibration and temperature extremes. The present invention overcomes the shortcomings of the prior art by providing a more close at hand method of televising fast action packed sports events like ice hockey and soccer, by doing it from instrumented sports paraphernalia used by the players within the game itself; thereby conveying a level of excitement and detail of the game heretofore unrealized by the TV viewing audience. The microphones pick up the impacts and shocks to the ice hockey pucks when they for example hit the goal net, are hit by a player, hit a wall or are scraping on the ice. The microphones pick up the impacts and shocks to the hockey goals and soccer goals when they for example are hit by a player or hear a player scrambling for position.

The present invention visually and audibly extends and enhances the audience's pleasure and excitement of the game by acquiring pictures and sounds from the spatial vantage points occupied by instrumented sports paraphernalia on the playing field/rink amongst the players. Such intimate pictures and sounds taken so close and immediate to the players have heretofore been unobtainable during ice hockey and soccer games. These pictures and sounds taken from these special vantage points are not possible in the prior art. For example, the microphones pick up and enable the audience to hear in real time the real impacts and shocks to the puck's skin when the ice hockey puck is hit, sliding on the ice, being blocked or striking the goal post netting when a goal is scored. The audience can also hear the rush and scraping of the flying ice flakes as the puck spins with forward motion on the ice. The present invention visually and audibly extends and enhances the audience's pleasure and excitement of the game by acquiring pictures and sounds from special spatial vantage points that are not possible in the prior art. Such intimate pictures and sounds taken so close and immediate to the players have heretofore been unobtainable. The present invention contemplates ways and means to capture pictures and sounds of the players during popular sports events, demonstrations, promotions, warm-ups and player training sessions from vantage points amongst the players on the playing field/rink.

The present invention contemplates that sports paraphernalia that are in play on the playing field/rink during professional league games, player training sessions and warming-up sessions, are instrumented with cameras and microphones thereby enabling them to acquire pictures and sounds of the players on the field. The present invention contemplates ways and means to process and format wirelessly transmitted pictures and sounds from sports paraphernalia, thereby enabling their presentation to a viewing audience. The present invention contemplates ways and means to televise pictures and sounds of sports events, sports demonstrations, sports promotions, sports player warm-up and player training sessions, by instrumenting sports paraphernalia used in the game with TV cameras and microphones. The present invention contemplates that the remote base station be equipped with hardware and software for processing the encoded radio signals it receives from the instrumented sports paraphernalia and preparing the encoded pictures and sounds with a format suitable for presentation to a viewing audience.

The present invention contemplates a remote base station where the pictures and sounds received from the cameras and microphones within the instrumented sports paraphernalia are processed and formatted, thus preparing them for presentation to a final live TV audience for viewing; processing and formatting included are HD, 3-D, upright and stabilized pictures, surround sound, and stabilized surround sound. The present invention contemplates that the instrumented sports paraphernalia functions are enabled, commanded and controlled in response to signals it receives from the remote base station. The present invention visually and audibly extends and enhances the audience's pleasure and excitement of the game by acquiring pictures and sounds from special spatial vantage points that are not possible in the prior art. Such intimate pictures and sounds taken so close and immediate to the players have heretofore been unobtainable. The present invention achieves this objective by providing a more close at hand method of televising fast action packed sports events, like baseball, by doing it from paraphernalia used by the players within the game itself; thereby conveying a level of excitement and detail of the game heretofore unrealized by the viewing audience. This invention enables cameras and microphones to be near to and amongst the players themselves during each play. Microphones pick up and enable the audience to hear in real time the impacts and shocks when the football is thrown, hiked, caught, hit, fumbled, kicked, sacked or striking the goal post netting. The audience can also hear the rush of the air as the football spins on a pass through the air.

The present invention contemplates producing instrumented sports paraphernalia like hockey pucks that have substantially the same weight, balance, appearance and playing qualities of conventional professional league sports paraphernalia, so as to be accepted as a credible substitute by the leagues and qualify it to substitute for conventional professional league sports paraphernalia used in the game. Besides professional league games, the present invention contemplates a variety of other venues like college and high school sporting events and training sessions where the instrumented sports paraphernalia may be used.

Besides professional league games, the present invention contemplates a variety of venues like college and high school sporting events and training sessions. The cameras can be of different types, yielding picture formats such as still frame photographs, freeze frame, full motion video, real time video, SD/HD real time video, and 3-D SD/HD real time video. The present invention contemplates enhancing the enjoyment of sports events, demonstration games, player training and warm-up sessions by other live audiences besides live TV viewing audiences. Examples of such audiences are those streaming on the internet, those viewing live general displays in stadiums, those reviewing reproductions of all the intimate details of the game that were too numerous to broadcast in real time, and instant replay judges/umpires etc. Readers of newspapers and magazines can also benefit by the high resolution still photos of critical plays that the system produces. The present invention contemplates ways and means to process and format the pictures and sounds from the cameras and microphones to enable their presentation to a viewing audience.

"Instrumented Sports Paraphernalia" Preferred Embodiments and Contemplations

The present invention contemplates instrumented sports paraphernalia arranged in a system architecture for streaming on the internet their high definition video and multi-dimensional audio captured by their cameras and microphones. The present invention contemplates instrumentation modules and instrumentation package assemblies that house the cameras and microphones, where the instrumentation modules and instrumentation package assemblies are positioned within and attached onto the instrumented sports paraphernalia. Instrumented sports paraphernalia such as soccer goals, ice hockey goals, baseball bases, baseball home plates, baseball pitcher's rubbers, tennis nets, and tennis net posts, ice hockey pucks and footballs are disclosed. It is contemplated that an audience which may or may not have spectators present at the games but wish to subscribe and view the games remotely on their personal wireless display devices, will stream on the internet and view and hear the games from their chosen select camera and microphone vantage point positions and angles on the instrumented sports paraphernalia located on the field of play amongst the players.

The present invention contemplates that sports paraphernalia like ice hockey goals, soccer goals, tennis nets, tennis net posts, baseball bases, baseball home plates, baseball pitcher's rubbers, footballs and ice hockey pucks, that are in play on the playing field/rink/court during sports games, are instrumented with TV cameras and microphones enabling them to acquire the pictures and sounds of the players on the field/rink/court, and televise them to a remote base station via an antenna array relay junction(s). The present invention overcomes the shortcomings of the prior art by providing a more close at hand method of televising fast action packed sports events by doing it from the instrumented sports paraphernalia used by the players within the game itself; thereby conveying a level of excitement and detail of the game heretofore unrealized by the viewing audience. The present invention contemplates ways and means to televise the pictures and sounds of professional sports events, college sports events and high school sports events. The present invention contemplates instrumenting sports paraphernalia such as ice hockey pucks, soccer goals and ice hockey goals.

The present invention contemplates that TV cameras, lenses, microphones, RF antennas, electronics and a battery pack are housed within the instrumented ice hockey puck inside a module called the instrumentation package assembly. Also, the present invention contemplates that soccer goals and ice hockey goals be instrumented with instrumentation modules. The instrumentation modules contain TV cameras, lenses, microphones, RF antennas, electronics and a battery pack.

The present invention contemplates that the instrumentation package assembly possesses all the elements necessary to acquire and transmit the video and sound of the game wirelessly by RF to the remote base station, while the instrumented ice hockey puck is on the rink during a sports game.

The present invention contemplates that the instrumentation module possesses all the elements necessary to acquire and transmit the video and sound of the game both wirelessly by RF and by fiber optics/copper cable to the remote base station, while the instrumented ice hockey goals are on the rink during a sports game, and while the instrumented soccer goals are on the paying field during a sports game.

The present invention contemplates that the instrumented ice hockey pucks, instrumented soccer goals and instrumented ice hockey goals that are in play on the rink during sports games, are instrumented with cameras and microphones thereby enabling it to acquire pictures and sounds of the players on the rink. The present invention contemplates that the cameras and microphones that are used to instrument the sports paraphernalia can be of different types, yielding picture formats such as still frame photographs, freeze frame, full motion video, real time video, SD/HD real time video, and 3-D SD/HD real time video.

The present invention contemplates a remote base station where the pictures and sounds received from the cameras and microphones within the instrumented sports paraphernalia are processed and formatted, thus preparing them for presentation to a final live TV audience for viewing. Processing software in the remote base station includes such capabilities as surround sound, stabilized surround sound, and upright stabilized pictures. The present invention contemplates achieving its objectives by a more close at hand method of televising fast action packed sports events, like ice hockey and soccer, by doing it from instrumented sports paraphernalia used by the players within the game itself, enabling cameras and microphones to be near to and amongst the players themselves during each play, thereby conveying a level of sound and picture excitement and detail to the game heretofore unrealized by the TV viewing audience using prior art methods. The present invention visually and audibly extends and enhances the audience's pleasure and excitement of the game by acquiring pictures and sounds from all the special spatial vantage points that the instrumented sports paraphernalia occupies and sees and feels on the field. Such intimate pictures and sounds taken so close and immediate to the players have heretofore been unobtainable during sports games. For example, the microphones pick up and enable the audience to hear in real time the impacts and shocks to the instrumented sports paraphernalia. The audience can hear the scraping of the moving puck on the ice. The audience can hear the rush of the air as the wind blows past the soccer and ice hockey goals on a windy day. The audience can hear the grunts of the soccer and hockey players.

The present invention contemplates that the instrumented sports paraphernalia be equipped with a battery pack capable of being wirelessly charged by an electrical power source external to the instrumented sports paraphernalia. The present invention contemplates that instrumented sports paraphernalia be equipped with a battery pack capable of being removed from the instrumented sports paraphernalia and replaced by a substitute battery pack. The present invention contemplates instrumenting both dynamic and static sports paraphernalia. The present invention contemplates instrumented sports paraphernalia that endures the rigors of the hostile environment on the sports playing field. The present invention contemplates instrumented sports paraphernalia that has substantially the same weight, balance, outward appearance and playing qualities of conventional league sports paraphernalia, so as to be accepted as a credible substitute by the conventional league sports paraphernalia used in the game. The present invention contemplates instrumented sports paraphernalia with optical windows through which the TV cameras within the instrumented sports paraphernalia to look out onto the playing field.

The present invention contemplates instrumented sports paraphernalia with microphones that are housed internally within the body of the instrumented sports paraphernalia that hear impacts to the surfaces of the instrumented sports paraphernalia by the conduction of sound waves through the instrumented sports paraphernalia. The present invention contemplates instrumented sports paraphernalia with microphones that are exposed to air above and below the surfaces of the instrumented sports paraphernalia that hear sound waves from sources external to the instrumented sports paraphernalia that compress the surrounding air.

The present invention contemplates a hand held remote capable of wirelessly interrogating the status of all the functions of the instrumented sports paraphernalia like instrumented soccer goals, instrumented ice hockey goals, instrumented tennis nets, instrumented tennis net posts, instrumented baseball bases, instrumented baseball home plates, instrumented baseball pitcher's rubbers, instrumented footballs and instrumented ice hockey pucks. both on and off the playing field/rink/court. Hand held remotes are disclosed in FIG. 17A and FIG. 17B.

The present invention contemplates that the battery packs of instrumented sports paraphernalia like the ice hockey goals, soccer goals, tennis nets, tennis net posts, volleyball nets, volleyball net posts, baseball bases, baseball home plates, baseball pitcher's rubbers, footballs and ice hockey pucks can be wirelessly recharged inductively by a battery recharging station on or off the playing field/rink/court.

"Instrumented Sports Stadiums/Arenas" Preferred Embodiments and Contemplations

In a preferred embodiment of the present invention, the playing field/rink/court is prepared with bi-directional internet fiber optic/copper cable and electrical power cable installed and buried beneath the playing surfaces that can be routed up from the ground to the static sports paraphernalia that are positioned at their traditional locations on the playing field/ice rink/court.

In a preferred embodiment of the present invention, an instrumented sports stadium/arena is equipped with an antenna array relay junction(s) which serve(s) as a bi-directional means to receive wirelessly televised video and sound signals from the instrumented sports paraphernalia and relay same to the remote base station. The antenna array relay junction also serves as a bi-directional means to relay command and control signals wirelessly from the remote base station to the instrumented sports paraphernalia; and relay control status signals from the instrumented sports paraphernalia to the remote base station.

In a preferred embodiment of the present invention, an instrumented sports stadium is equipped with an antenna array relay junction(s) which serves as a bi-directional means to receive wirelessly televised video and sound signals from instrumented ice hockey pucks, instrumented soccer goals, and instrumented ice hockey goals, which are examples of dynamic and static instrumented sports paraphernalia In a preferred embodiment of the present invention, an instrumented sports stadium/arena is equipped with an antenna array relay junction which serves as a bi-directional means to receive televised video and sound signals from the static instrumented sports paraphernalia by fiber optics cable and relay same to the remote base station by fiber optics cable. Examples of the static instrumented sports paraphernalia are the instrumented soccer goals, and the instrumented ice hockey goals. The antenna array relay junction also serves as a bi-directional means to relay command and control signals from the remote base station to the instrumented sports paraphernalia, and relay status control signals from the instrumented sports paraphernalia to the remote base station, by fiber optics cable/copper cable. Instrumented ice hockey goals and instrumented soccer goals are examples of static instrumented sports paraphernalia.

In a preferred embodiment of the present invention, an instrumented sports stadium is equipped with an antenna array relay junction(s) which serve(s) as a means to bi-directionally receive televised video and sound signals from the static instrumented sports paraphernalia wirelessly and/or by fiber optics cable and relay same to the remote base station wirelessly and/or by fiber optics cable. The antenna array relay junction also serves as a means to bi-directionally relay command and control signals from the remote base station to the instrumented sports paraphernalia wirelessly and/or by fiber optics cable; and relay status control signals from the instrumented sports paraphernalia to the remote base station wirelessly and by fiber optics cable/copper cable communication links.

"Instrumented Playing Fields/Rinks/Courts" Preferred Embodiments and Contemplations In a preferred embodiment, the instrumented playing field/ice rinks/courts are configured with bi-directional fiber optics cable/copper cable communications links buried beneath the ground/ice rink between the instrumented sports paraphernalia that are positioned at their traditional locations on the playing field/ice rink and the antenna array relay junction(s) and/or internet.

In a preferred embodiment, instrumented soccer goals are located on the soccer field at their traditional positions at either end of the field and connected to the bi-directional fiber optics cable/copper cable which is extended upward from under the playing field ground into the bottom opening in the footings of each of the soccer goals to form a connection.

In a preferred embodiment, instrumented ice hockey goals are located on the ice hockey rink at their traditional positions at either end of the rink and connected to the bi-directional fiber optics cable/copper cable which is extended upward from under the ice rink into the bottom opening in the footings of each of the ice hockey goals to form a connection.

"Remote Base Station" Preferred Embodiments and Contemplations

The present invention contemplates that the remote base station is equipped with hardware and software for processing and formatting the encoded video and audio signals received from the instrumented sports paraphernalia, and preparing the pictures and sounds with a format suitable for presentation to a live TV viewing audience like for example 3D and surround sound. The present invention contemplates that the operating functions of the instrumented sports paraphernalia are enabled, commanded and controlled by signals it receives from the remote base station. The present invention contemplates instrumented sports paraphernalia where TV signals are transmitted from the cameras and microphones within the instrumented sports paraphernalia over bi-directional communications links to a remote base station by bi-directional fiber optics cable/copper cable and/or by RF wireless radio means. The present invention contemplates a remote base station with means to process and format pictures and sounds received from a single or a multiplicity of instrumented sports paraphernalia on the playing field. The present invention contemplates that an operator at the remote base station controls all the various electronic and optical functions of the instrumented sports paraphernalia, wirelessly and/or by fiber optics cable, by transmitting command and control signals to the instrumented sports paraphernalia and receiving control status signals in return.

The remote base station is disclosed in FIG. 7, and FIG. 8, and FIG. 10, FIG. 14A and FIG. 14B, FIG. 30A and FIG. 30B, and FIG. 31A and FIG. 31B, and FIG. 32A and FIG. 32B, and FIG. 33A and FIG. 33B and FIG. 33C and FIG. 33D and FIG. 33E, and FIG. 35A and FIG. 35C. The pictures and sounds are processed and formatted at the remote base station, thus preparing them for broadcast presentation to a final live or instant replay TV audience for viewing. An operator at the remote base station can command and control the various electronic, mechanical and optical functions of the instrumented ice hockey puck, instrumented soccer goal and instrumented ice hockey goal by wirelessly transmitting command and control signals to these sports paraphernalia from the remote base station. In return, the remote base station receives status control signals from the instrumented sports paraphernalia thereby closing the control feedback loop. The remote base station is located on, or remotely from, the sports stadium grounds.

"Instrumented Soccer Goals" Preferred Embodiments and Contemplations

The present invention contemplates a system for televising professional league soccer games, college league soccer games, high school league soccer games, and little league soccer games from unique positions amongst the players on the soccer playing field. The soccer goals are instrumented with TV cameras and microphones. Soccer goals instrumented in this manner in the present invention are referred to as instrumented soccer goals. The cameras and microphones are housed either inside each of the instrumented soccer goals in a module called an instrumentation module, or mounted and attached to the outside of the soccer goal in their instrumentation modules.

The present invention contemplates a system for televising professional league soccer games. The soccer goals are instrumented with instrumentation modules. Each instrumentation module contains four TV cameras and twelve microphones. The four cameras and twelve microphones are housed inside the soccer goal in an instrumentation module.

The present invention contemplates an additional system embodiment for televising professional league soccer games. The soccer goals are instrumented with instrumentation modules. Each instrumentation module contains four TV cameras and twelve microphones. The four cameras and twelve microphones are contained within an instrumentation module. The instrumentation module is mounted and attached to the outside of the soccer goal.

In another preferred embodiment, the present invention contemplates instrumentation modules which are mounted inside of the instrumented soccer goal, to wirelessly and/or by fiber optics, televise soccer games from its cameras and microphones to the remote base station.

In another preferred embodiment, the present invention contemplates an instrumentation module, which is mounted and attached to the outside of the instrumented soccer goal, to wirelessly and/or by fiber optics, televise soccer games from its cameras and microphones to the remote base station.

In yet another preferred embodiment, the pictures and sounds acquired by the TV cameras and microphones within the instrumentation module mounted inside the instrumented soccer goal are wirelessly transmitted from the instrumented soccer goal via a closed circuit transmitting and receiving network, to a remote base station. The pictures and sounds are processed and formatted at the remote base station, thus preparing them for presentation to a final live TV audience for viewing. An operator at the remote base station can control various electronic and optical functions of the instrumented soccer goal by wirelessly transmitting control signals to the instrumented soccer goal; and wirelessly receive signals from the instrumented soccer goal. In a preferred embodiment, the present invention contemplates an instrumented soccer goal, which when stationed on any soccer playing field at the traditional soccer goal locations can wirelessly and autonomously televise baseball games under the command and control of the remote base station. The remote base station is disclosed in FIG. 30A and FIG. 30B and FIG. 31A and FIG. 31B and FIG. 32A and FIG. 32B. The present invention contemplates that the instrumented soccer goal functions are enabled, commanded and controlled by and in response to signals it receives from the remote base station.

In yet another preferred embodiment, the pictures and sounds acquired by the TV cameras and microphones within the instrumentation module mounted on and attached to the outside of the instrumented soccer goal are wirelessly transmitted from the instrumented soccer goal via a closed circuit transmitting and receiving network, to a remote base station. The pictures and sounds are processed and formatted at the remote base station, thus preparing them for presentation to a final live TV audience for viewing. An operator at the remote base station can control various electronic and optical functions of the instrumented soccer goal by wirelessly transmitting control signals to the instrumented soccer goal; and wirelessly receive signals from the instrumented soccer goal. In a preferred embodiment, the present invention contemplates an instrumented soccer goal, which when stationed on any soccer playing field at the traditional soccer goal locations can wirelessly and autonomously televise baseball games under the command and control of the remote base station. The remote base station is disclosed in FIG. 30A and FIG. 30B and FIG. 31A and FIG. 31B and FIG. 32A and FIG. 32B. The present invention contemplates that the instrumented soccer goal functions are enabled, commanded and controlled by and in response to signals it receives from the remote base station.

In yet another preferred embodiment, the pictures and sounds acquired by the TV cameras and microphones from inside the instrumented soccer goal are transmitted wirelessly and/or by fiber optics from the instrumented baseball base via a bi-directional closed circuit transmitting and receiving network to the remote base station. The pictures and sounds are processed and formatted at the remote base station, thus preparing them for presentation to a final live TV audience for viewing. The remote base station is disclosed in FIG. 30A and FIG. 30B and FIG. 31A and FIG. 31B and FIG. 32A and FIG. 32B. The present invention contemplates that the instrumented baseball base's functions are enabled, commanded, and controlled by signals it receives from the remote base station. An operator at the remote base station controls the various electronic and optical functions of the instrumented soccer goal by transmitting command and control signals wirelessly and by fiber optics/copper cable to the instrumented soccer goals from the remote base station.

The invention visually and audibly extends and enhances the audience's pleasure and excitement of the game by acquiring pictures and sounds from all the special spatial vantage points that the instrumented soccer goals traditionally occupy and sees and feels on the soccer field. Such intimate pictures and sounds taken so close and immediate to the soccer players have heretofore been unobtainable during a soccer game. For example, the microphones pick up and enable the audience to hear in real time the impacts and shocks when a soccer goal is hit by a player or a soccer ball. The audience can also hear the rush of the air as the soccer ball spins on a kick through the air. The present invention contemplates producing an instrumented soccer goal having substantially the same appearance and playing qualities of a conventional professional league soccer goal, so as to be accepted by the leagues and qualify it to substitute for conventional professional league soccer goals in the game. The present invention contemplates that the instrumented soccer goal be unobtrusive to the game and its players. In order to achieve this objective, the present invention contemplates preferred embodiments for the instrumented soccer goal having substantially the same appearance and playing qualities of the conventional professional league soccer goals, conventional college league soccer goals, conventional high school soccer goals, and junior and little league soccer goals so as to be accepted by the leagues and qualify the instrumented soccer goals to substitute for conventional league soccer goals in the game.

Figure 3:
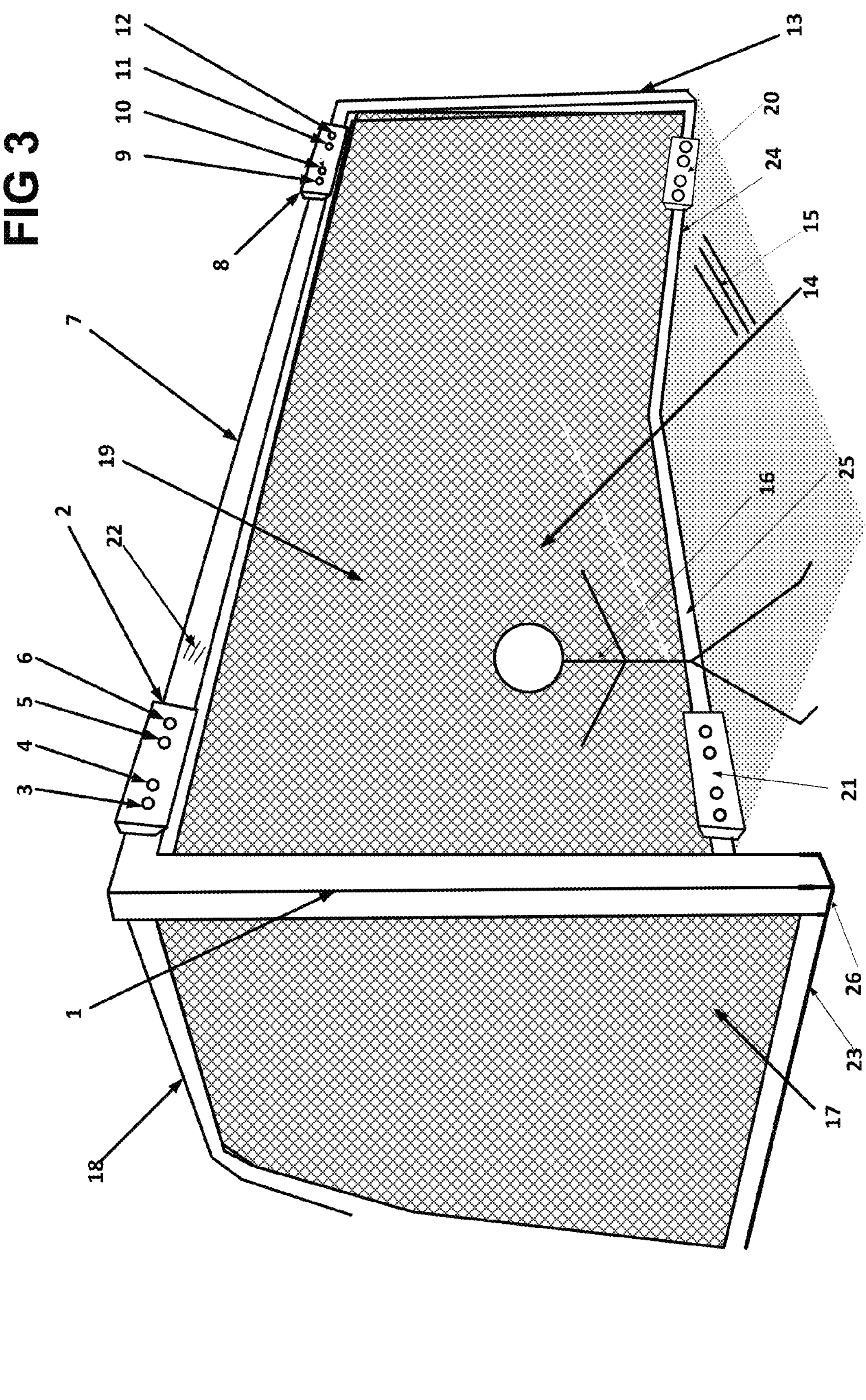
FIG. 3 shows a view of an instrumented soccer goal with five external four-camera instrumentation modules attached.
Figure 4:
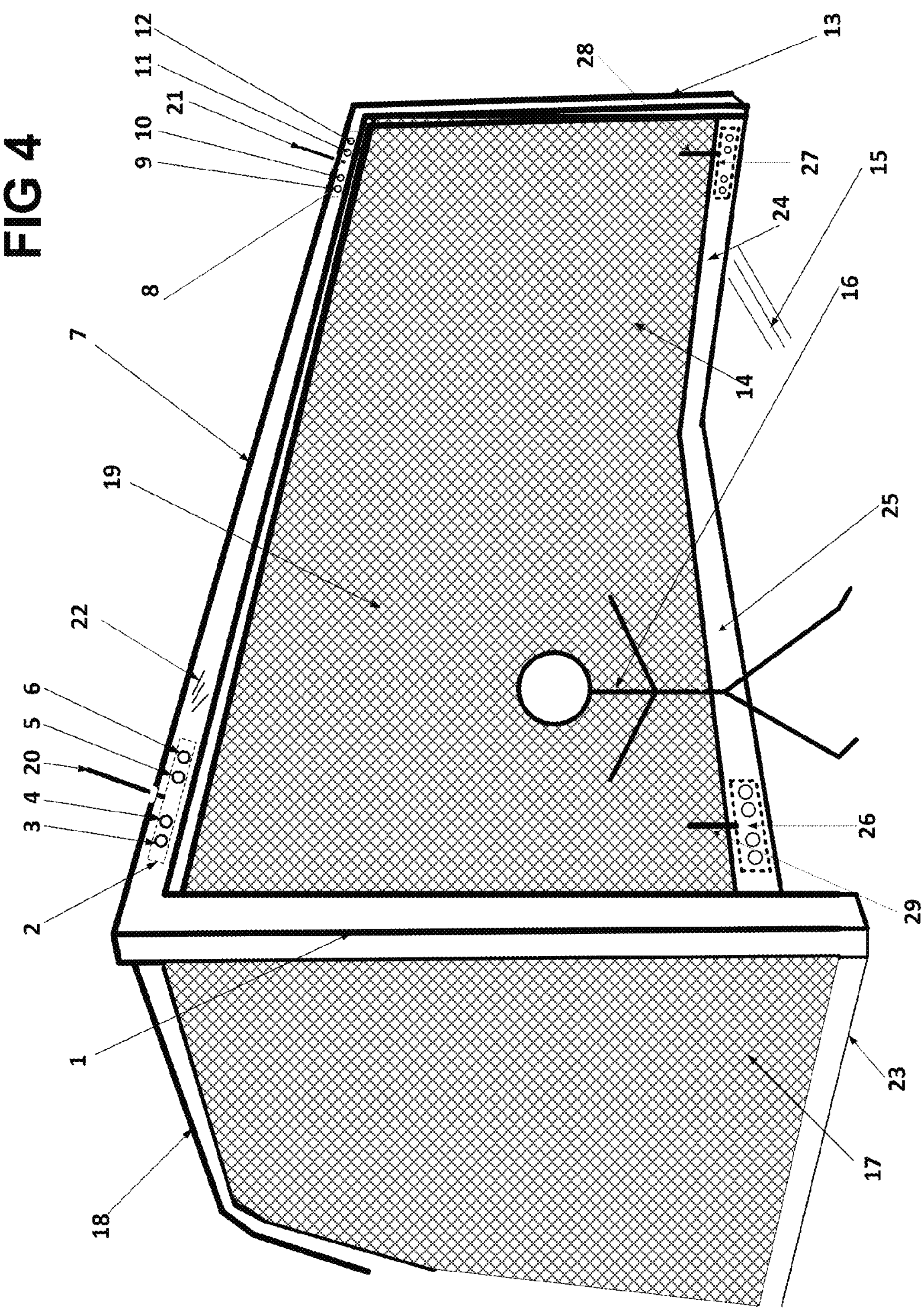
FIG. 4 shows a view of an instrumented soccer goal with five internally mounted four-camera instrumentation modules.

In preferred embodiments, the present invention contemplates instrumented soccer goals like those shown in drawings FIG. 3 and FIG. 4.

The present invention contemplates that the instrumented soccer goals be instrumented with a battery pack which is capable of being wirelessly charged from an external electrical power source.

"Instrumented Ice Hockey Goals" Preferred Embodiments and Contemplations

The present invention contemplates a system for televising professional league ice hockey games, college league ice hockey games, high school league ice hockey games, and little league ice hockey games from unique positions amongst the players on the ice hockey rink. The ice hockey goals are instrumented with TV cameras and microphones. Ice hockey goals instrumented in this manner in the present invention are referred to as instrumented ice hockey goals. The cameras and microphones are housed either inside each of the instrumented ice hockey goals in a module called an instrumentation module, or mounted and attached to the outside of the ice hockey goal in their instrumentation modules.

The present invention contemplates a system for televising professional league soccer games. The soccer goals are instrumented with instrumentation modules. Each instrumentation module contains four TV cameras and twelve microphones. The four cameras and twelve microphones are housed inside the soccer goal in an instrumentation module.

The present invention contemplates an additional system embodiment for televising professional league soccer games. The soccer goals are instrumented with instrumentation modules. Each instrumentation module contains four TV cameras and twelve microphones. The four cameras and twelve microphones are contained within an instrumentation module. The instrumentation module is mounted and attached to the outside of the soccer goal.

In another preferred embodiment, the present invention contemplates instrumentation modules which are mounted inside of the instrumented soccer goal, to wirelessly and/or by fiber optics, televise soccer games from its cameras and microphones to the remote base station.

In another preferred embodiment, the present invention contemplates an instrumentation module, which is mounted and attached to the outside of the instrumented soccer goal, to wirelessly and/or by fiber optics, televise soccer games from its cameras and microphones to the remote base station.

In yet another preferred embodiment, the pictures and sounds acquired by the TV cameras and microphones within the instrumentation module mounted inside the instrumented soccer goal are wirelessly transmitted from the instrumented soccer goal via a closed circuit transmitting and receiving network, to a remote base station. The pictures and sounds are processed and formatted at the remote base station, thus preparing them for presentation to a final live TV audience for viewing. An operator at the remote base station can control various electronic and optical functions of the instrumented soccer goal by wirelessly transmitting control signals to the instrumented soccer goal; and wirelessly receive signals from the instrumented soccer goal. In a preferred embodiment, the present invention contemplates an instrumented soccer goal, which when stationed on any soccer playing field at the traditional soccer goal locations can wirelessly and autonomously televise baseball games under the command and control of the remote base station. The remote base station is disclosed in FIG. 30A and FIG. 30B and FIG. 31A and FIG. 31B and FIG. 32A and FIG. 32B. The present invention contemplates that the instrumented soccer goal functions are enabled, commanded and controlled by and in response to signals it receives from the remote base station.

In yet another preferred embodiment, the pictures and sounds acquired by the TV cameras and microphones within the instrumentation module mounted on and attached to the outside of the instrumented soccer goal are wirelessly transmitted from the instrumented soccer goal via a closed circuit transmitting and receiving network, to a remote base station. The pictures and sounds are processed and formatted at the remote base station, thus preparing them for presentation to a final live TV audience for viewing. An operator at the remote base station can control various electronic and optical functions of the instrumented soccer goal by wirelessly transmitting control signals to the instrumented soccer goal; and wirelessly receive signals from the instrumented soccer goal. In a preferred embodiment, the present invention contemplates an instrumented soccer goal, which when stationed on any soccer playing field at the traditional soccer goal locations can wirelessly and autonomously televise baseball games under the command and control of the remote base station. The remote base station is disclosed in FIG. 30A and FIG. 30B and FIG. 31A and FIG. 31B and FIG. 32A and FIG. 32B. The present invention contemplates that the instrumented soccer goal functions are enabled, commanded and controlled by and in response to signals it receives from the remote base station.

In yet another preferred embodiment, the pictures and sounds acquired by the TV cameras and microphones from inside the instrumented soccer goal are transmitted wirelessly and/or by fiber optics from the instrumented soccer goal via a bi-directional closed circuit transmitting and receiving network to the remote base station. The pictures and sounds are processed and formatted at the remote base station, thus preparing them for presentation to a final live TV audience for viewing. The remote base station is disclosed in FIG. 30A and FIG. 30B and FIG. 31A and FIG. 31B and FIG. 32A and FIG. 32B. The present invention contemplates that the instrumented baseball base's functions are enabled, commanded, and controlled by signals it receives from the remote base station. An operator at the remote base station controls the various electronic and optical functions of the instrumented soccer goal by transmitting command and control signals wirelessly and by fiber optics/copper cable to the instrumented soccer goals from the remote base station.

The invention visually and audibly extends and enhances the audience's pleasure and excitement of the game by acquiring pictures and sounds from all the special spatial vantage points that the instrumented soccer goals traditionally occupy and sees and feels on the soccer field. Such intimate pictures and sounds taken so close and immediate to the soccer players have heretofore been unobtainable during a soccer game. For example, the microphones pick up and enable the audience to hear in real time the impacts and shocks when a soccer goal is hit by a player or a soccer ball. The audience can also hear the rush of the air as the soccer ball spins on a kick through the air. The present invention contemplates producing an instrumented soccer goal having substantially the same appearance and playing qualities of a conventional professional league soccer goal, so as to be accepted by the leagues and qualify it to substitute for conventional professional league soccer goals in the game. The present invention contemplates that the instrumented soccer goal be unobtrusive to the game and its players. In order to achieve this objective, the present invention contemplates preferred embodiments for the instrumented soccer goal having substantially the same appearance and playing qualities of the conventional professional league soccer goals, conventional college league soccer goals, conventional high school soccer goals, and junior and little league soccer goals so as to be accepted by the leagues and qualify the instrumented soccer goals to substitute for conventional league soccer goals in the game.

In preferred embodiments, the present invention contemplates instrumented soccer goals like those shown in drawings FIG. 3 and FIG. 4.

The present invention contemplates that the instrumented soccer goals be instrumented with a battery pack which is capable of being wirelessly charged from an external electrical power source.

"Instrumentation Modules" Preferred Embodiments and Contemplations

In a preferred embodiment, the present invention contemplates an instrumentation module, which when stationed on/or inside any instrumented sports paraphernalia like for example an instrumented soccer goal or instrumented ice hockey goal, can wirelessly and/or by fiber optics/copper cable autonomously televise soccer and ice hockey games to the remote base station under the command and control of the remote base station. The instrumented soccer goals and instrumented ice hockey goals are located at their traditional locations on the playing field/rink. The instrumentation modules allow the soccer goals and ice hockey goals to see, hear and feel the action on the playing field/rink. The remote base station is disclosed in FIG. 30A and FIG. 30B and FIG. 31A and FIG. 31B and FIG. 32A and FIG. 32B.

The present invention contemplates a system for televising professional league soccer and ice hockey games, college league soccer and ice hockey games, high school league soccer and ice hockey games, and junior and little league soccer and ice hockey games from a unique position amongst the players on the playing field/rink. Instrumentation modules are instrumented with TV cameras and microphones. The cameras and microphones are housed inside the instrumentation modules in units called instrumentation package assemblies. The present invention visually and audibly extends and enhances the audience's pleasure and excitement of the game by acquiring pictures and sounds from the special spatial vantage points that the instrumented soccer goals and instrumented ice hockey goals occupy on the field/rink relative to the players. Such intimate pictures and sounds taken so close and immediate to the players have heretofore been unobtainable during a soccer or ice hockey game. For example, the microphones pick up and enable the audience to hear in real time the impacts and shocks when a soccer ball or ice hockey puck is kicked or hit close to an instrumented soccer goal or ice hockey goal. The audience can also hear the rush of the air and ice as the soccer balls and ice hockey pucks spin through the air or on the ice.

The present invention contemplates that the instrumentation module's electronic and optical functions are enabled, commanded, and controlled by wireless and/or fiber optics/copper cable signals it receives from the remote base station. An operator at the remote base station controls the various electronic and optical functions of the instrumentation module's by transmitting command and control signals wirelessly and/or by fiber optics/copper cable to the instrumentation module's from the remote base station. The present invention contemplates that the instrumentation modules be unobtrusive to the game. In order to achieve this objective, the present invention contemplates producing preferred embodiments for instrumentation module's having substantially the same color as conventional professional league soccer goals and ice hockey goals, conventional college league soccer goals and ice hockey goals, and conventional high school soccer goals and ice hockey goals so as to be accepted by the leagues and qualify the instrumented soccer goals and ice hockey goals to substitute for conventional league soccer goals and ice hockey goals in the game. The present invention contemplates that the instrumentation modules be instrumented with a battery pack capable of being wirelessly electrically charged by a power source external to the instrumentation modules, like the charging station disclosed in FIG. 23A and FIG. 23B and FIG. 23C and FIG. 23D and FIG. 23E and FIG. 23G.

In a preferred embodiment, the present invention contemplates the instrumentation modules to be equipped with instrumentation package assemblies that are housed inside the instrumentation modules. The instrumentation package assemblies have the capability of wirelessly televising baseball games from their cameras and microphones contained therein. The instrumentation package assemblies are disclosed in FIG. 20A and FIG. 20B and FIG. 20C.

The present invention contemplates that the instrumentation module's functions are enabled, commanded and controlled by, and in response to, signals it receives from the remote base station; and that the instrumentation modules furnish control status signals to the remote base station to close the control feedback loop.

In a preferred embodiment, the present invention contemplates the instrumentation modules to be equipped with an instrumentation package assembly that is mounted inside the instrumentation modules which is capable of wirelessly televising baseball games from its cameras and microphones contained therein.

The present invention contemplates that TV cameras, microphones, supporting electronics and a battery pack are packaged within the instrumentation module. The instrumentation module is contemplated to endure the rigors of the hostile environment on the soccer playing field and ice hockey rink. The instrumentation package assembly is both airtight and watertight and is designed to endure the shock, vibration and temperature variations encountered by the sports paraphernalia during a game. Optical windows stationed on the outer skin of the instrumentation modules enable the cameras to look out onto the playing field. The pictures and sounds acquired by the TV cameras and microphones are encoded by the supporting electronics and wirelessly televised from the sports paraphernalia via a closed circuit bi-directional transmitting and receiving network, to a remote base station. The pictures and sounds are processed and formatted at the remote base station by hardware and software, preparing them for presentation to a final live TV audience for viewing. An operator at the remote base station can control the various electronic and optical functions of the instrumented sports paraphernalia by wirelessly transmitting control signals to the instrumented sports paraphernalia.

The present invention contemplates that the instrumentation modules contain four TV cameras, twelve microphones and supporting electronics. The cameras peer out through optical windows.

The present invention contemplates that the instrumentation modules possess all the elements including transceivers and antennas necessary to acquire and wirelessly transmit by encoded radio signals the video and sounds of the game to a remote base station from the vantage point of the sports paraphernalia during the course of a game. The present invention contemplates that the instrumentation modules possess all the elements necessary to acquire and transmit by fiber optics cable/copper cable the video and sound of the game to a remote base station from the vantage point of the sports paraphernalia during the course of a game.

The present invention contemplates that the instrumentation modules be instrumented with battery packs capable of being wirelessly charged by magnetic induction by an external electrical power source.

The present invention contemplates a wireless RF radio communications system for televising sports games like soccer and ice hockey, from instrumented sports paraphernalia like soccer goals and ice hockey goals that are located on the playing field amongst the players. The instrumented sports paraphernalia transmit an RF carrier signal modulated with the audio and video from its TV cameras and microphones to an antenna array located outside the boundaries of the playing field/rink. The RF carrier signal is received by the antenna array and relayed to a remote base station which decodes and processes the signal for broadcast to the TV viewing audience. The antenna array is called an "antenna array relay junction".

The present invention contemplates a fiber optics cable/copper cable communications system for televising sports games from the instrumented sports paraphernalia that are located on the playing field amongst the players. The instrumented sports paraphernalia transmit a signal modulated with the audio and video from the instrumentation module's TV cameras and microphones via a fiber optics cable/copper cable buried in the ground beneath it in the playing field/rink. The signal is received by an antenna array relay junction, located outside of the playing field/rink that relays the signal to a remote base station which decodes and processes the signal for broadcast to the TV viewing audience.

"Instrumented Ice Hockey Pucks" Preferred Embodiments and Contemplations

In a preferred embodiment, referring to the disclosed instrumented ice hockey pucks shown in FIG. 1A and FIG. 1B and FIG. 1C, and FIG. 9A and FIG. 9B of the present invention, the instrumented ice hockey pucks have substantially the same size, shape, texture, and color as the conventional regulation professional league ice hockey pucks.

The present invention contemplates a system for televising professional league ice hockey games, as well as ice hockey games in other venues. Ice hockey pucks are instrumented with television cameras and microphones. Ice hockey pucks that are instrumented in this manner are referred to in the present invention as "instrumented ice hockey pucks". TV cameras and microphones are packaged inside the instrumented ice hockey pucks within a unit referred to in the present invention as an "instrumentation package assembly".

In a preferred embodiment, the present invention contemplates the instrumented ice hockey pucks to be non-intrusive to the game. The optical windows in both the top and bottom sides of the instrumented ice hockey puck are made small and are tinted blue or grey to make them less noticeable to the players in comparison to the black color of the puck. The microphones pick up and enable the audience to hear in real time the impacts and shocks to its skin of the puck when the instrumented ice hockey puck is hit, sliding, striking or bouncing. The audience can also hear the rush and scraping of the ice as the instrumented ice hockey puck spins and moves on the ice.

The present invention particularly contemplates a system for televising professional league ice hockey games. The ice hockey pucks are instrumented with television cameras and microphones. The TV cameras are packaged inside the instrumented ice hockey puck within an instrumentation package assembly. Some of the microphones are packaged inside the instrumented ice hockey puck within its instrumentation package assemblies. Some of the microphones are mounted through the surface of the skin on both the top and bottom sides of the puck.

Compared to the prior art, the present invention provides a more close at hand method of televising fast action packed sports events, like ice hockey, by televising games from instrumented ice hockey puck used by the players in the game itself. Compared to the prior art, the present invention conveys a level of excitement and detail of the game heretofore unrealized by the viewing audience. The present invention enables cameras and microphones to be near to and amongst the hockey players themselves during each play on the ice rink. The invention visually and audibly extends and enhances the audience's pleasure and excitement of the game by acquiring pictures and sounds from all the special spatial vantage points that the instrumented ice hockey puck occupies and sees and feels on the ice rink. Such intimate pictures and sounds taken so close and immediate to the hockey players have heretofore been unobtainable during an ice hockey game. For example, the microphones pick up and enable the audience to hear in real time the impacts and shocks when the puck is moving or striking the goal post netting. The audience can also hear the whoosh of the ice as the instrumented ice hockey puck spins on a pass on the ice.

The present invention is specifically contemplated to endure the rigors of the hostile environment on the ice rink. The instrumentation package assembly is both airtight and watertight and is designed to endure shock, vibration and temperature variations. Inside the instrumentation package assembly, the TV cameras are deployed at the top and bottom of the instrumented ice hockey puck. Optical windows enable them to look out from the top bottom of the instrumented ice hockey puck onto the ice rink. The pictures and sounds acquired by the TV cameras and microphones are wirelessly transmitted from the instrumented ice hockey puck via a closed circuit transmitting and receiving network, to a remote base station. The pictures and sounds are processed and formatted at the remote base station, thus preparing them for presentation to a final live TV audience for viewing. An operator at the base station can control the various electronic and optical functions of the instrumented ice hockey puck by wirelessly transmitting control signals to the instrumented ice hockey puck from the remote base station. The present invention contemplates that the instrumented ice hockey puck electronic, mechanical and optical functions are enabled, commanded and controlled in response to signals it receives from the remote base station. The instrumented ice hockey puck transmits control status signals back to the remote base station to close the control feedback loop.

In a preferred embodiment, the present invention contemplates the instrumented ice hockey puck to be equipped with instrumentation package assemblies disclosed in patent application FIG. 19A and FIG. 19B and FIG. 19C, and FIG. 21A and FIG. 21B and FIG. 21C. The instrumentation package assemblies are mounted inside the instrumented ice hockey pucks shown in FIG. 1A and FIG. 1B and FIG. 1C, and FIG. 9A and FIG. 9B of the present invention. The instrumentation package assemblies are capable of wirelessly televising ice hockey games from their cameras and microphones contained therein. The instrumentation package assemblies are encapsulated and molded into the instrumented ice hockey pucks. The instrumentation package assemblies and the buffer plate assemblies and the protective cover plates are encapsulated and molded into the instrumented ice hockey puck to keep them aligned and secure.

In a preferred embodiment of the present invention, the instrumented ice hockey puck has substantially the same outward appearance as the conventional professional league ice hockey puck because its size, shape, texture and color are made identical to the conventional professional league ice hockey puck. This makes the instrumented ice hockey puck unobtrusive to the players in the game. In a preferred embodiment of the present invention, the instrumented ice hockey puck has substantially the same playing and handling qualities as the conventional professional league ice hockey puck because its weight, balance, center of gravity and moments of inertia are made identical to the conventional professional league ice hockey puck.

The present invention is contemplated to endure the rigors of the hostile environment on the rink. The instrumentation package assembly is both airtight and watertight and is designed to endure shock, vibration and temperature variations. Inside the instrumentation package assembly, the TV cameras are deployed to look out the top of the instrumented ice hockey puck. Small unobtrusive optical windows located on the top of the instrumented ice hockey puck enable them to look out onto the ice hockey rink through extremely wide angle lenses. Fish eye zoom lenses are one example of the camera lenses that are used. The real-time pictures and sounds acquired by the TV cameras and microphones are wirelessly transmitted from the instrumented ice hockey puck via a closed circuit bi-directional transmitting and receiving network, to a remote base station.

The remote base station used for the instrumented ice hockey pucks is disclosed in FIG. 33A and FIG. 33B and FIG. 33C and FIG. 33D and FIG. 33E and FIG. 35A and FIG. 35C.

The instrumented ice hockey puck's size, weight, balance, center of gravity, and moments of inertia affect the instrumented ice hockey puck's dynamic behavior. The instrumented ice hockey puck's dynamic behavior in turn affects the instrumented ice hockey puck's playing and handling qualities.

In preferred embodiments, the present invention contemplates instrumented ice hockey puck's to be equipped with the instrumentation package assemblies shown in FIG. 19A and FIG. 19B and FIG. 19C, and FIG. 21A and FIG. 21B and FIG. 21C. The instrumented ice hockey puck equipped with these instrumentation package assemblies, wirelessly televises ice hockey games from its cameras and microphones packaged therein.

The present invention contemplates that the instrumented ice hockey puck be instrumented with a battery pack capable of being inductively wirelessly charged by a battery charging unit similar to the one shown in FIG. 23A and FIG. 23B and FIG. 23C, and FIG. 23D and FIG. 23E and FIG. 23F and FIG. 23G.

"Antenna Array Relay Junctions" Preferred Embodiments and Contemplations

In a preferred embodiment of the present invention, the antenna array relay junction serves as a means to receive wirelessly televised video and sound signals from the instrumented sports paraphernalia, and also serves to relay these video and sound signals to the remote base station.

In a preferred embodiment of the present invention the antenna array relay junction, located off the playing field but within the sports stadium, serves as a means to receive and wirelessly relay televised video and sound signals from the instrumented ice hockey puck to the remote base station. In venues where there is no formal sports stadium/arena around the ice rink, the antenna array relay junction and the remote base station are located off of the playing field/rink, but in the vicinity of the field/rink.

In a preferred embodiment of the present invention, the antenna array relay junction is situated in the stadium to serve as a means to receive wirelessly televised video and sound signals from the instrumented sports paraphernalia.

In a preferred embodiment of the present invention, an antenna array relay junction is situated above the ground and outside the side lines of the playing field/rink.

In a preferred embodiment of the present invention, an antenna array relay junction is situated outside and above the side lines of the playing field and is carried aloft in a blimp or balloon.

In a preferred embodiment of the present invention, an antenna array relay junction which serves as a means to receive televised video and sound signals by fiber optics cable/copper cable from the instrumented sports paraphernalia is situated in the vicinity of the playing field in the sports stadium.

"System for Streaming Games on the Internet", Preferred Embodiments and Contemplations The present invention contemplates equipping existing prior art soccer playing fields and ice hockey rinks with a system for streaming soccer and ice hockey games on the internet.

The present invention contemplates, for example, that the parents of little league soccer players be able to see streaming video and audio of their children playing in games on the soccer field, as captured by the instrumented soccer goals.

The present invention contemplates equipping existing prior art baseball playing fields with a system for streaming baseball games on the internet.

The present invention contemplates a system for streaming video and audio of baseball games captured by instrumented baseball bases, instrumented baseball home plates and instrumented baseball pitcher's rubbers, wherein the baseball bases, baseball home plates and instrumented baseball pitcher's rubbers are instrumented using a multiplicity of TV cameras and microphones.

The present invention contemplates a system for streaming baseball games on the internet wherein the system is comprised of television cameras, microphones, audio processing units, video processing units, audio and video compression modules, high-speed terrestrial mobile broadband service units, antenna units, a local area WIFI interface, instrumented baseball bases and instrumented baseball home plates.

The present invention contemplates a system for streaming video and audio of soccer games and ice hockey games captured by instrumented soccer goals and instrumented ice hockey goals, wherein the soccer goals and ice hockey goals are instrumented using a multiplicity of TV cameras and microphones.

The present invention contemplates the soccer goals and ice hockey goals to be instrumented with a multiplicity of TV cameras and microphones.

The present invention contemplates that the TV cameras and microphones are housed in instrumentation modules.

The present invention contemplates a system for streaming soccer games on the internet wherein the system is comprised of television cameras, microphones, audio processing units, video processing units, audio and video compression modules, high-speed terrestrial mobile broadband service units, antenna units, a local area WIFI interface, and instrumented sports paraphernalia.

The present invention contemplates that the audio processing unit, video processing unit and compression modules respectively are used to buffer, process and compress the captured image and sound information prior to streaming by the high-speed terrestrial mobile broadband service unit.

In a preferred embodiment of the present invention, the system connects the camera(s) and microphones to a publicly accessible internet relay server for the purpose of real-time viewing of the game by audiences using their portable wireless devices—i.e. WIFI enabled Phones, Laptops, Touch Pads, PDA's, etc.

In a preferred embodiment of the present invention, the electronics package unit contains a minimum of one high definition video camera and one microphone whose captured video and audio, following suitable H.264/MPEG compression, is buffered and subsequently sent to an active broadband connection established using for example Mobile Broadband Hotspot Hardware Technology.

In a preferred embodiment of the present invention, the system conveys high definition video and multi-dimensional audio captured by the microphones mounted within and attached on and to the goals, to an audience which may or may not be spectator present at the game but wish to subscribe and view the game remotely on their personal wireless display devices.

The present invention contemplates that the instrumentation modules are equipped with an electronics package unit.

The present invention contemplates that the electronics package unit contains a high-speed terrestrial mobile broadband service unit and an antenna used to connect the camera(s) and microphones to a publicly accessible internet relay server for the purpose of real-time viewing of the game by audiences using their portable wireless devices—i.e. WIFI enabled Phones, Laptops, Touch Pads, PDA's, etc.

The present invention contemplates that the electronics package unit contains a minimum of one high definition video camera and one microphone whose captured video and audio, following suitable H.264/MPEG compression respectively, is buffered and subsequently sent to an active broadband connection established using for example Mobile Broadband Hotspot Hardware Technology.

The present invention contemplates that the system conveys high definition video and multi-dimensional audio captured by the microphones mounted within and/or attached on and to the goals, to an audience which may or may not be spectator present at the game but wish to subscribe and view the game remotely on their personal wireless display devices.

The present invention contemplates that the electronics package unit communicates wirelessly with a 4G/LTE or better equivalent Mobile Broadband Tower operating on the 1700 and/or 1900 MHz Frequency Band within a three to five bar signal strength radius of the desired site local to the Field of Play.

The present invention contemplates that the same Mobile Broadband Tower that is used to intercept the captured streams from the electronics package unit is also used simultaneously to supply the wireless internet access needed by spectators present at the field/rink of play whom wish to view the game on their personal wireless devices.

The present invention contemplates that in operation, the live captured MPEG streams are made accessible across the public internet via a relay server which need not be local to the field/rink of play.

The present invention contemplates that this relay server acts as a traffic router and is connected to an internet backbone with sufficient capacity to successfully convey the wideband data streams needed to render High-Definition video and sound to the viewing audience over the www.

The present invention contemplates that each person present at the field/rink of play in possession of a suitable mobile broadband wireless device wishing to view the televised game, will initially register or subscribe to the service via a URL that is pointed to the relay server IP address.

The present invention contemplates that once the viewer is registered, the viewer will have the option of choosing the desired video and/or audio streams available at the given field/rink of play currently broadcasted.

In an alternative preferred embodiment, the present invention contemplates that an operator seated in front of a display console located either at the field/rink of play or at the relay server will have the ability to select which cameras and/or microphones are associated with which streams prior to broadcast.

In an alternative preferred embodiment, the present invention contemplates that the operator can insert commercial content material at his discretion i.e. sports sponsor's advertisements, announcements and other insertions.

The present invention contemplates a system for streaming the video and audio of professional, college, high school and little league soccer games and ice hockey games captured by instrumented soccer goals and instrumented ice hockey goals, wherein the soccer goals and ice hockey goals are instrumented using a multiplicity of TV cameras and microphones and where the goals are located at their traditional positions on the playing field/ice rink amongst the players.

The present invention contemplates that the TV cameras and microphones, along with their supporting electronics, are packaged in modules which are housed inside selected sports paraphernalia like ice hockey pucks, ice hockey goals and soccer goals that are used in the game by the players on the playing field/rink.

The present invention contemplates that sports paraphernalia instrumented in this way are called "instrumented sports paraphernalia".

The present invention contemplates that the modules containing the TV cameras and microphones within the instrumented ice hockey goals and instrumented soccer goals are called "instrumentation modules".

The present invention contemplates that the modules containing the TV cameras and microphones within the instrumented ice hockey pucks are called "instrumentation package assemblies".

The present invention contemplates a system for wirelessly televising professional league soccer and ice hockey games from instrumented sports paraphernalia like soccer goals and ice hockey goals.

The present invention contemplates that the instrumentation modules which contain the television cameras and microphones can be either mounted inside, and/or externally attached to the structural members of the soccer goals and ice hockey goals.

The present invention contemplates that the video and audio signals from the instrumentation modules which are mounted inside, and/or externally attached to the structural members of the soccer goals and ice hockey goals are transmitted to a remote base station.

The Preferred Embodiments of the Major System Components of the "Instrumented Sports Paraphernalia System" disclosed in the present invention meet the objectives below. Besides the objectives given here below, there are further objectives that are discussed and will become apparent in the detailed descriptions of the accompanying drawings.

General Instrumented Sports Paraphernalia System

- Instrumented Sports Paraphernalia
- Instrumented Sports Stadiums/Arenas
- Instrumented Playing Fields, Rinks, Courts
- Remote Base Stations
- Antenna Array Relay Junctions
- Instrumented Ice Hockey Pucks
- Instrumented Ice Hockey Goals
- Instrumented Soccer Goals
- Instrumented Tennis Nets
- Instrumented Tennis Posts
- Instrumented Volleyball Nets
- Instrumented Volleyball Posts
- Instrumentation Modules
- Instrumentation Package Assemblies
- Battery Pack Charging Stations
- Hand Held Remotes
- System for Streaming Games on the Internet
- System for televising Games on broadcast TV General "Instrumented Sports Paraphernalia System" Objectives It is an objective of the present invention to equip existing prior art sports stadiums/arenas with "instrumented sports paraphernalia systems" comprised of instrumented sports paraphernalia, an antenna array relay junction, bi-directional communication links, and a remote base station to improve the quality of the sports stadium's/arena's TV broadcasts. It is an objective of the present invention to provide an improved method for audiences to view sports events and hear its sounds.

It is an objective of the present invention to televise and broadcast sports games by an improved method.

It is an objective of the present invention to televise sports games from camera angles and microphone vantage points from inside instrumented sports paraphernalia like instrumented soccer goals, instrumented ice hockey goals and instrumented ice hockey pucks used on the playing field/rink amongst the players.

It is an objective of the present invention to provide an improved method of gathering video and audio to be used by judges and referees making instant replay calls.

It is an objective of the present invention to improve the enjoyment, excitement and satisfaction of TV viewing audiences watching televised sports events.

It is an objective of the present invention to introduce an improved method of employing 3-D, HD and surround sound to televise and broadcast sports events.

It is an objective of the present invention to introduce an improved method of employing extremely wide angle zoom camera lenses to televise and broadcast sports events.

It is an objective of the present invention to introduce an improved method of employing extremely wide angle camera lenses to televise and broadcast sports events.

It is an objective of the present invention to introduce an improved method for getting close-up shots and sounds of the players from otherwise untapped spatial vantage points and angles in the game.

It is an objective of the present invention to acquire intimate pictures and sounds taken so close and immediate to the sports players from on the playing field that they have heretofore been unobtainable during a game.

It is an objective of the present invention to enhance the viewing experience of the viewing audience by capturing pictures and sounds of sports games in HD, 3-D and surround sound that were not possible before in the prior art.

It is an objective of the present invention to provide a means for wirelessly televising real time games from cameras and microphones mounted inside sports paraphernalia like instrumented soccer goals, instrumented ice hockey goals and instrumented ice hockey pucks on the field/rink of play.

It is an objective of the present invention to provide a means for wirelessly televising real time games from cameras and microphones mounted on and attached to sports paraphernalia like instrumented soccer goals and instrumented ice hockey goals on the playing field/rink.

It is an objective of the present invention to provide a means for televising real time games from cameras and microphones mounted inside sports paraphernalia like instrumented soccer goals and instrumented ice hockey goals on the playing field/rink, using a bi-directional fiber optics cable/copper cable communications link.

It is an objective of the present invention to provide a means for televising real time games from cameras and microphones mounted on and attached to sports paraphernalia like instrumented soccer goals and instrumented ice hockey goals on the playing field/rink, using a bi-directional fiber optics cable/copper cable communications link.

It is an objective of the present invention to capture pictures and sounds of sports events from on the field of play amongst the players during the game.

It is an objective of the present invention to overcome the shortcomings of the prior art by providing a means of televising more intimate and exciting shots of sports events from amongst the players on the playing field during a game.

It is an objective of the present invention to overcome the shortcomings of the prior art by providing a means of televising more intimate and exciting shots of sports events from amongst the players off of the playing field during warm-ups and training sessions.

It is an objective of the present invention to present pictures and sounds of the game to a viewing audience in a suitable viewing format.

It is an objective of the present invention to provide an improved method for audiences to see action sports up close; for example, the feet of a player kicking a soccer ball into the net; the view from above the goal keeper's head as he throws the soccer ball; the view of the goal handler as he fails to block an incoming puck; the player's face as he positions to make a goal; and all in 3-D, HD and surround sound for added pleasure and excitement.

It is an objective of the present invention to enable cameras and microphones to be near to and amongst the players themselves during each play.

It is an objective of the present invention to capture stabilized upright pictures and sounds from a moving and spinning instrumented ice hockey puck.

It is an objective of the present invention to present suitable picture and sound quality to a viewing audience.

It is an objective of the present invention to capture pictures and sounds on the field from amongst the players in a more unobtrusive and clandestine manner than TV cameras used on the sidelines in plain sight by cameramen in the prior art.

It is an objective of the present invention that the system disclosed for televising sports events from instrumented sports paraphernalia used on instrumented playing fields in instrumented sports stadiums, be compatible for use on any playing field/rink in any sports stadium venue.

It is an objective of the present invention that the system disclosed for televising sports events from instrumented sports paraphernalia used on instrumented playing fields, be compatible for use on any playing field/rink venue with no sports stadium.

It is an objective of the present invention that TV cameras will see out onto the playing fields from a whole selection of vantage points from inside and outside the instrumented sports paraphernalia.

It is an objective of the present invention that the instrumented sports paraphernalia will be flexible to contain a whole selection of TV camera and microphone configurations.

It is an objective of the present invention to improve the method of training athletes.

It is an objective of the present invention to improve the method of training athletes by using audio and video taken from static and dynamic instrumented sports paraphernalia during the game and of their training sessions.

"Instrumented Sports Paraphernalia" Objectives

It is an objective of the present invention to stabilize the TV picture televised from a spinning instrumented dynamic sports paraphernalia, by image processing the gyroscopic signals from the instrumented sports paraphernalia, for the purpose of making the TV picture comfortably viewable by a TV viewing audience.

It is an objective of the present invention to lock the TV picture televised from a spinning instrumented dynamic sports paraphernalia to the gravitationally upright view that would be seen with the line of sight of the TV cameras pointed in the direction of its forward motion, by image processing the gyroscopic signals from the instrumented sports paraphernalia, for the purpose of making the TV picture comfortably viewable by a TV viewing audience.

It is an objective of the present invention to stabilize the sound pattern televised from a spinning instrumented dynamic sports paraphernalia, by the electronic removal of the effects of the spinning on its microphones, by processing the gyroscopic signals from the instrumented sports paraphernalia, and calculating where the microphones are when the instrumented sports paraphernalia is upright, for the purpose of making the surround sound comfortably and accurately audible by a TV viewing audience.

It is an objective of the present invention to lock the sound televised from a spinning instrumented dynamic sports paraphernalia to the sound pattern that would be heard by the microphones from a non-spinning instrumented sports paraphernalia, while the non-spinning instrumented sports paraphernalia is moving in its direction of forward motion, for the purpose of making the surround sound comfortably and accurately audible by a TV viewing audience.

It is an objective of the present invention to stabilize and lock the sound to the direction of forward motion of the sports paraphernalia.

It is an objective of the present invention that the instrumented sports paraphernalia provide an improved means to televise sporting events.

It is an objective of the present invention that the instrumented sports paraphernalia's outward appearance looks substantially the same as its conventional counterpart professional league sports paraphernalia.

It is an objective of the present invention to provide instrumented sports paraphernalia that have the same handling and playability qualities as their conventional counterpart professional league sports paraphernalia.

It is an objective of the present invention that the instrumented sports paraphernalia provide an improved means to televise sporting events in professional league, college league, high school league, junior and little league venues.

It is an objective of the present invention for the instrumented sports paraphernalia to be non-intrusive to the game.

It is an objective of the present invention for the instrumented sports paraphernalia to withstand the rigors of the game.

It is an objective of the present invention for the instrumented sports paraphernalia to withstand the weather conditions on the playing field.

It is an objective of the present invention for the instrumented sports paraphernalia to be used to improve the training of the players.

It is an objective of the present invention to stabilize the imagery obtained from dynamic instrumented sports paraphernalia like an ice hockey puck, in an upright condition in the picture frame, regardless of the pitch, roll or yaw of the dynamic instrumented sports paraphernalia, using the direction of forward motion as a reference as viewed by a live TV audience in the HD CCD letterbox picture format by using gyroscopic encoders.

It is an objective of the present invention to stabilize the surround sound obtained from dynamic instrumented sports paraphernalia like an ice hockey puck, regardless of the pitch, roll or yaw of the dynamic instrumented sports paraphernalia, using the direction of forward motion as a reference as heard by a live TV audience in the HD CCD letterbox picture format by using gyroscopic encoders.

It is an objective of the present invention to stabilize the imagery obtained from the dynamic instrumented sports paraphernalia in an upright condition in the picture frame, regardless of the pitch, roll or yaw of the dynamic instrumented sports paraphernalia, as viewed by a live TV audience in the HD CCD letterbox picture format by image recognition processing.

It is an objective of the present invention to stabilize the imagery obtained from the dynamic instrumented sports paraphernalia in an upright condition in the picture frame, regardless of the pitch, roll or yaw of the dynamic instrumented sports paraphernalia, as viewed by a live TV audience in the HD CCD letterbox picture format by using gyroscopic encoders and image recognition processing.

It is an objective of the present invention to stabilize the imagery obtained from the dynamic instrumented sports paraphernalia in an upright condition in the picture frame, regardless of the pitch, roll or yaw of the dynamic instrumented sports paraphernalia, as viewed by a live TV audience in the HD CCD letterbox picture format by using image recognition processing of the archived data base derived from the tripod mounted set-up camera system.

It is an objective of the present invention to stabilize the imagery obtained from the dynamic instrumented sports paraphernalia in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station.

It is an objective of the present invention to provide views of the game not seen before during broadcasts by real time TV audiences. It is an objective of the present invention to provide views of the game from cameras mounted inside the instrumented sports paraphernalia.

It is an objective of the present invention to provide views of the game from cameras mounted on and attached to the outside of the instrumented sports paraphernalia.

It is an objective of the present invention to provide sounds of the game not heard before during broadcasts by real time TV audiences.

It is an objective of the present invention to provide sounds of the game to a real time TV audience from microphones mounted inside the instrumented sports paraphernalia.

It is an objective of the present invention to provide sounds of the game to a real time TV audience from microphones mounted on and attached to the outside of the instrumented sports paraphernalia.

It is an objective of the present invention to provide sounds of the game not heard before during broadcasts by real time TV audiences. It is an objective of the present invention to provide sounds of the game to a real time TV audience from microphones mounted inside the instrumented sports paraphernalia that are heard by the microphones by conduction of sound waves.

It is an objective of the present invention to provide sounds of the game to a real time TV audience from microphones mounted on and attached to the outside of the instrumented sports paraphernalia as heard by conduction of sound waves.

It is an objective of the present invention to provide sounds of the game to a real time TV audience from microphones mounted inside the instrumented sports paraphernalia that are heard by the microphones by compression of sound waves.

It is an objective of the present invention to provide sounds of the game to a real time TV audience from microphones mounted on and attached to the outside of the instrumented sports paraphernalia as heard by compression of sound waves.

It is an objective of the present invention to reduce the shock and vibration to the instrumentation module during the instrumented sports paraphernalia's use in a sports event by providing isolation and by providing padding and cushioning.

It is an objective of the present invention to provide an instrumentation module that can be assembled (loaded) into the instrumented sports paraphernalia through a convenient aperture in the instrumented sports paraphernalia.

It is an objective of the present invention to provide instrumented sports paraphernalia which has provisions for holding the instrumentation module inside itself and for isolating the instrumentation module from shocks received by the instrumented sports paraphernalia during the game.

It is an objective of the present invention to provide a means to load and unload the instrumentation module into and out from the instrumented sports paraphernalia host.

It is an objective of the present invention to provide a permanent position and nesting place for the instrumentation module inside the instrumented sports paraphernalia.

It is an objective of the present invention to maintain alignment of the instrumentation module relative to the instrumented sports paraphernalia during usage of the instrumented sports paraphernalia during a game.

It is an objective of the current invention to locate and firmly seat the instrumentation module inside the instrumented sports paraphernalia, and to provide a portal which is unobtrusive to the players through which the cameras inside the instrumentation module can peer outward through the cover of the instrumented sports paraphernalia.

It is an objective of the present invention to provide a means to wirelessly televise sounds from impacts to the instrumented sports paraphernalia used on the field of play during league games, sports events, warm-up sessions, and training sessions.

It is an objective of the present invention for the instrumented sports paraphernalia to be non-intrusive to the game.

It is an objective of the present invention to provide a means to wirelessly transmit pictures and sounds, from instrumented sports paraphernalia used on and off the field of play during league games, sports events, training sessions, and warm-up sessions.

It is an objective of the present invention to provide instrumented college sports paraphernalia which is substantially equivalent to the conventional college sports paraphernalia used in college league games.

It is an objective of the present invention to provide a college instrumented sports paraphernalia which is substantially of the same weight, balance, dynamic behavior, handling and general appearance as conventional college sports paraphernalia used in college league games.

It is an objective of the present invention to provide college instrumented sports paraphernalia which has the same general outward appearance as conventional college sports paraphernalia used in college league games, training, practice, demonstrations, promotions, film making and parades.

It is an objective of the present invention to capture pictures despite the erratic motion of the dynamic instrumented sports paraphernalia.

It is an objective of the present invention to present pictures to an audience that are suitable for their viewing.

It is an objective of the present invention for instrumented sports paraphernalia to wirelessly televise pictures and sounds from where they are positioned on the playing field.

It is an objective of the present invention for instrumented sports paraphernalia to televise pictures and sounds using bi-directional fiber optics cable communication links from where they are positioned on the playing field.

It is an objective of the present invention to visually and audibly extend and enhance the TV audience's pleasure and excitement of the game by acquiring pictures and sounds from all the special spatial vantage points that the instrumented sports paraphernalia have on the field in close proximity to the players.

It is an objective of the present invention to capture pictures and sounds from where the instrumented sports paraphernalia is positioned on the playing field/rink.

It is an objective of the present invention to provide a means to wirelessly transmit pictures and sounds, from instrumented sports paraphernalia used on the field of play during league games, sports events and training sessions, to a remote base station.

It is an objective of the present invention to provide a means to wirelessly transmit pictures and sounds to a remote base station, from instrumented sports paraphernalia used on or off the field of play during sports events, league games, training sessions, warming-up sessions, demonstrations, and promotions.

It is an objective of the present invention to capture pictures and sounds from where the dynamic instrumented sports paraphernalia was, and where it is going.

It is an objective of the present invention to capture pictures and sounds from moving instrumented sports paraphernalia yielding pictures and sounds showing the location where the dynamic instrumented sports paraphernalia was, and to where it is now moving.

It is an objective of the present invention that the system disclosed for televising sports events from instrumented sports paraphernalia used on instrumented playing fields in instrumented sports stadiums, be compatible for use on any playing field in any sports stadium venue.

It is an objective of the present invention that the system disclosed for televising sports events from instrumented sports paraphernalia used on instrumented playing fields, be compatible for use on any playing field venue with or without a sports stadium.

"Instrumented Sports Stadiums/Arenas" Objectives

It is an objective of the present invention to equip any sports stadium to wirelessly receive RF televised video and sound signals of soccer games and ice hockey games from TV cameras and microphones mounted inside instrumented soccer goals, instrumented ice hockey goals and instrumented ice hockey pucks which are on the playing field/rink, in real time. A sports stadium so equipped will be referred to as an "instrumented sports stadium" in the present invention to differentiate it from an ordinary sports stadium.

It is an objective of the present invention to equip any sports stadium to wirelessly receive RF televised video and sound signals of soccer games and ice hockey games from TV cameras and microphones mounted on instrumented soccer goals and instrumented ice hockey goals which are on the playing field/rink, in real time. A sports stadium so equipped will be referred to as an "instrumented sports stadium" in the present invention to differentiate it from an ordinary sports stadium.

It is an objective of the present invention to equip any soccer sports stadium with an instrumented soccer playing field, instrumented soccer goals, antenna array relay junction, remote base station, battery pack charging stations, and hand held remotes.

It is an objective of the present invention to equip the instrumented sports stadium with an antenna array relay junction means to relay the video and sound signals, received from the instrumented soccer goals, to a remote base station for processing and final broadcast to a TV viewing audience.

It is an objective of the present invention to equip the instrumented sports stadium with an antenna array relay junction means to relay the video and sound signals, received from the instrumented ice hockey goals, to a remote base station for processing and final broadcast to a TV viewing audience.

It is an objective of the present invention to equip the instrumented sports stadium with an antenna array relay junction means to relay the video and sound signals, received from the instrumented ice hockey pucks, to a remote base station for processing and final broadcast to a TV viewing audience.

It is an objective of the present invention that the instrumented sports stadium is equipped with bi-directional communication links between the instrumented sports paraphernalia and the antenna array relay junction, and bi-directional communication links between the antenna array relay junction and the remote base station.

It is an objective of the present invention to equip a sports stadium to televise sports events from both dynamic and static sports paraphernalia.

It is an objective of the present invention to provide a selection of alternative fiber optic cable/copper cable runs and configurations that can be buried beneath the ground of the soccer playing field.

It is an objective of the present invention to provide a selection of alternative fiber optic cable/copper cable runs and configurations that can be buried beneath the ice of the ice hockey rink.

It is an objective of the present invention to equip a sports stadium/arena to wirelessly receive RF televised video and sound signals from a multiplicity of instrumented sports paraphernalia simultaneously and transmit the signals to a remote base station via an antenna array relay junction for final processing and broadcast to a TV viewing audience.

"Instrumented Sports Playing Fields" Objectives

It is an objective of the present invention to equip playing fields/rinks/courts with both dynamic and static instrumented sports paraphernalia to be used by the players on the fields/rinks/courts for the purpose of televising sports events from the instrumented sports paraphernalia.

It is an objective of the present invention to outfit any tennis court with instrumented tennis nets positioned at their traditional locations on the court.

It is an objective of the present invention to outfit any ice hockey rink with an instrumented ice hockey puck for the purpose of televising ice hockey games from the instrumented ice hockey puck.

It is an objective of the present invention to outfit any football playing field with an instrumented football for the purpose of televising football games from the instrumented football.

It is an objective of the present invention to outfit any soccer playing field with instrumented soccer goals for the purpose of televising soccer games from the instrumented soccer goals.

It is an objective of the present invention to outfit any ice hockey rink with instrumented ice hockey goals for the purpose of televising ice hockey games from the instrumented ice hockey goals.

It is an objective of the present invention to outfit any tennis court with an instrumented tennis net for the purpose of televising tennis games from the instrumented tennis net.

It is an objective of the present invention to outfit any tennis court with instrumented tennis net posts for the purpose of televising tennis games from the instrumented tennis net posts.

It is an objective of the present invention to outfit any playing field, ice hockey rink, baseball playing field and tennis court with bi-directional fiber optic cable/copper cable communication links buried beneath the ground, whose electrical connectors come up through the ground and mate with the corresponding electrical connectors inside of the instrumented sport's paraphernalia footings.

It is an objective of the present invention to outfit any playing field, ice hockey rink, baseball playing field and tennis court with bi-directional fiber optic cable/copper cable communication links buried beneath the ground, where the cable is tied to the internet.

It is an objective of the present invention to outfit any playing field, ice hockey rink, baseball playing field and tennis court with bi-directional fiber optic cable/copper cable communication links buried beneath the ground, where the cable is tied to the remote base station via the antenna relay array junction.

It is an objective of the present invention to outfit any soccer playing field with bi-directional fiber optic cable/copper cable communication links buried beneath the ground, whose electrical connectors come up through the ground and mate with the corresponding electrical connectors inside of the instrumented soccer goal's footings.

It is an objective of the present invention to outfit any ice hockey rink with bi-directional fiber optic cable/copper cable communication links buried beneath the rink, whose electrical connectors come up through the ice and mate with the corresponding electrical connectors inside of the instrumented ice hockey goal's footings.

It is an objective of the present invention to outfit any tennis court with bi-directional fiber optic cable/copper cable communication links buried beneath the court, whose electrical connectors come up through the ground and mate with the corresponding electrical connectors inside of the instrumented tennis net post footings.

It is an objective of the present invention to outfit any baseball playing field with bi-directional fiber optic cable/copper cable communication links buried beneath the field, whose electrical connectors come up through the ground and mate with the corresponding electrical connectors inside of the instrumented bases, home plates and pitcher's rubbers.

It is an objective of the present invention to establish unobstructed air ways for transmission of televised RF signals above any typical soccer playing field for the purpose of achieving wireless connections to the internet via towers, and wireless connection to the remote base station via the antenna array relay junction.

It is an objective of the present invention to establish unobstructed air ways for transmission of televised RF signals above any typical ice hockey rink for the purpose of achieving wireless connections to the internet via towers, and wireless connection to the remote base station via the antenna array relay junction.

It is an objective of the present invention to establish unobstructed air ways for transmission of televised RF signals above any typical tennis court for the purpose of achieving wireless connections to the internet via towers, and wireless connection to the remote base station via the antenna array relay junction.

It is an objective of the present invention to establish unobstructed air ways for transmission of televised RF signals above any typical baseball playing field for the purpose of achieving wireless connections to the internet via towers, and wireless connection to the remote base station via the antenna array relay junction.

It is an objective of the present invention to establish unobstructed air ways for transmission of televised RF signals above any typical football playing field for the purpose of achieving wireless connections to the remote base station via the antenna array relay junction.

It is an objective of the present invention to outfit any soccer playing field, ice hockey rink, tennis court, and baseball playing field with a low voltage power cable buried beneath the ground/ice, whose electrical connectors come up through the ground/ice and mate with the corresponding electrical power connectors inside of the instrumented sports paraphernalia like instrumented soccer goals, instrumented ice hockey goals, instrumented tennis net posts, instrumented tennis nets, instrumented baseball bases, instrumented baseball home plates, and instrumented baseball pitcher's rubbers, for the purpose of supplying electrical power to the instrumented sports paraphernalia.

It is an objective of the present invention to provide a selection of alternative fiber optic cable/copper cable runs, configurations and geometries that can be buried beneath the ground/ice of the playing fields/rinks/courts for the purpose of reducing cost and maximizing bandwidth.

"Remote Base Station" Objectives

It is an objective of the present invention to provide a means to wirelessly transmit pictures and sounds, from instrumented sports paraphernalia used on the field of play during league games, sports events and training sessions, to a remote base station.

It is an objective of the present invention to provide a means to wirelessly transmit pictures and sounds, from instrumented sports paraphernalia used on and off the field of play before, during and after sports events, training sessions, demonstrations, and promotions to a remote base station.

It is an objective of the present invention to provide a means to wirelessly transmit HD and 3-D pictures and surround sound from instrumented sports paraphernalia used on the playing field during league games, sports events, and training sessions, to a remote base station.

It is an objective of the present invention to provide a means to wirelessly transmit HD and 3-D pictures and surround sound from instrumented sports paraphernalia used off of the playing field during warm-up sessions, promotions and training sessions, to a remote base station.

It is an objective of the present invention to provide the remote base station with means to receive the relayed video and sound signals from the instrumented sports stadium.

It is an objective of the present invention to provide the remote base station with a means to wirelessly command and control the electronic, optical and mechanical functions of the instrumentation modules and instrumentation package assemblies that are used to instrument the instrumented sports paraphernalia like instrumented soccer goals, instrumented ice hockey goals and instrumented ice hockey pucks on the playing field/rink.

It is an objective of the present invention to provide the remote base station with a means to wirelessly receive status control signals from the instrumentation modules and instrumentation package assemblies that are used to instrument the instrumented sports paraphernalia like instrumented soccer goals, instrumented ice hockey goals and instrumented ice hockey pucks on the playing field/rink, in order to close the control feedback loop between the sports paraphernalia and the remote base station.

It is an objective of the present invention to provide the remote base station with a means to wirelessly command and control the electronic and mechanical functions of the antenna array relay junction.

It is an objective of the present invention to provide the remote base station with a means to process the video and sound signals relayed to it from the instrumented sports paraphernalia.

It is an objective of the present invention to provide the remote base station with a means to telecast the video and sound signals from the instrumented sports paraphernalia to the TV viewing audience.

It is an objective of the present invention to provide a means to wirelessly televise pictures and sounds from instrumented sports paraphernalia used off the field of play during sports events and training sessions, to a remote base station.

It is an objective of the present invention to provide a means to wirelessly televise pictures and sounds from instrumented sports paraphernalia used on the field of play during league games, sports events and training sessions, to a remote base station.

It is an objective of the present invention to provide a means to wirelessly transmit pictures and sounds from instrumented sports paraphernalia used on the field of play during league games, sports events and training sessions, to a remote base station.

It is an objective of the present invention to process pictures televised by the cameras inside or on the instrumented sports paraphernalia to the remote base station, and make them appear upright to the viewing audience.

It is an objective of the present invention to enable the cameraman in the remote base station to align the 3-D stereo camera picture frames of the 3-D stereo camera pairs with one another.

It is an objective of the present invention to enable the cameraman in the remote base station to align the 3-D stereo camera picture frames with the horizon.

It is an objective of the present invention to enable the cameraman in the remote base station to align the 3-D stereo camera picture frames with the horizon and the direction of forward motion of the instrumented sports paraphernalia independent of any pitch, roll or yaw of the instrumented sports paraphernalia.

The system keeps the picture and sound that is televised to the TV viewing audience looking in the direction of forward motion of the instrumented sports paraphernalia. The system keeps the spatial sense of the pictures and sound oriented to look in the direction of forward motion of the instrumented sports paraphernalia.

It is an objective of the present invention to outfit any typical sports stadium/arena with bi-directional fiber optic cable/copper cable communication links between the remote base station and the antenna array relay junction.

It is an objective of the present invention to outfit any typical sports stadium/arena with a bi-directional RF wireless communication links between the remote base station and the antenna array relay junction.

"Antenna Array Relay Junction" Objectives

It is an objective of the present invention that the antenna array relay junction receives televised signals simultaneously from a multiplicity of static instrumented sports paraphernalia that are on the playing field during a game.

It is an objective of the present invention that the antenna array relay junction receives televised signals simultaneously from two instrumented soccer goals that are on the playing field during a soccer game.

It is an objective of the present invention that the antenna array relay junction receives televised signals simultaneously from two instrumented ice hockey goals that are on the rink during a ice hockey game.

It is an objective of the present invention that the antenna array relay junction receives televised signals simultaneously from an instrumented ice hockey puck that is on the rink during an ice hockey game.

It is an objective of the present invention that the antenna array relay junction receives televised signals from a single dynamic instrumented sports paraphernalia that is on the playing field/rink.

It is an objective of the present invention that the antenna array relay junction receives televised signals simultaneously from a multiplicity of instrumented sports paraphernalia that are on the playing field and relays them simultaneously to the remote base station.

It is an objective of the present invention that the antenna array relay junction receives wirelessly televised signals simultaneously from a multiplicity of static instrumented sports paraphernalia that are on the playing field during a game.

It is an objective of the present invention that the antenna array relay junction receives wirelessly televised signals simultaneously from two instrumented soccer goals that are on the playing field during a soccer game.

It is an objective of the present invention that the antenna array relay junction receives wirelessly televised signals simultaneously from two instrumented ice hockey goals that are on the rink during a ice hockey game.

It is an objective of the present invention that the antenna array relay junction receives wirelessly televised signals simultaneously from an instrumented ice hockey puck that is on the rink during an ice hockey game.

It is an objective of the present invention that the antenna array relay junction receives wirelessly televised signals from a single dynamic instrumented sports paraphernalia that is on the playing field/rink.

It is an objective of the present invention that the antenna array relay junction receives wirelessly televised signals simultaneously from a multiplicity of static instrumented sports paraphernalia that are on the playing field during a game and relays them simultaneously to the remote base station.

It is an objective of the present invention that the antenna array relay junction receives wirelessly televised signals simultaneously from two instrumented soccer goals that are on the playing field during a soccer game and relays them simultaneously to the remote base station.

It is an objective of the present invention that the antenna array relay junction receives wirelessly televised signals simultaneously from two instrumented ice hockey goals that are on the rink during an ice hockey game and relays them simultaneously to the remote base station.

It is an objective of the present invention that the antenna array relay junction receives wirelessly televised signals simultaneously from an instrumented ice hockey puck that is on the rink during an ice hockey game and relays them simultaneously to the remote base station.

It is an objective of the present invention that the antenna array relay junction receives wirelessly televised signals from a single dynamic instrumented sports paraphernalia that is on the playing field/rink and relays them simultaneously to the remote base station.

It is an objective of the present invention that the antenna array relay junction receives wirelessly televised signals simultaneously from a multiplicity of instrumented sports paraphernalia that are on the playing field/rink and relays them simultaneously to the remote base station.

It is an objective of the present invention that the antenna array relay junction receives wirelessly televised signals simultaneously from a multiplicity of static instrumented sports paraphernalia that are on the playing field during a game and wirelessly relays them simultaneously to the remote base station.

It is an objective of the present invention that the antenna array relay junction receives wirelessly televised signals simultaneously from two instrumented soccer goals that are on the playing field during a soccer game and wirelessly relays them simultaneously to the remote base station.

It is an objective of the present invention that the antenna array relay junction receives wirelessly televised signals simultaneously from two instrumented ice hockey goals that are on the rink during an ice hockey game and wirelessly relays them simultaneously to the remote base station.

It is an objective of the present invention that the antenna array relay junction receives wirelessly televised signals simultaneously from an instrumented ice hockey puck that is on the rink during an ice hockey game and wirelessly relays them simultaneously to the remote base station.

It is an objective of the present invention that the antenna array relay junction receives wirelessly televised signals from a single dynamic instrumented sports paraphernalia that is on the playing field/rink and wirelessly relays them simultaneously to the remote base station.

It is an objective of the present invention that the antenna array relay junction receives wirelessly televised signals simultaneously from a multiplicity of instrumented sports paraphernalia that are on the playing field/rink and wirelessly relays them simultaneously to the remote base station.

It is an objective of the present invention that the antenna array relay junction receives televised signals simultaneously transmitted to it wirelessly or via a bi-directional fiber optics/copper cable communications link from a multiplicity of static instrumented sports paraphernalia that are on the playing field during a game, and relays them simultaneously wirelessly or via a bi-directional fiber optics/copper cable communications link to the remote base station.

It is an objective of the present invention that the antenna array relay junction receives televised signals simultaneously transmitted to it wirelessly or via a bi-directional fiber optics/copper cable communications link from two instrumented soccer goals that are on the playing field during a soccer game and relays them simultaneously wirelessly or via a bi-directional fiber optics/copper cable communications link to the remote base station.

It is an objective of the present invention that the antenna array relay junction receives televised signals simultaneously wirelessly or via a bi-directional fiber optics/copper cable communications link from two instrumented ice hockey goals that are on the rink during an ice hockey game and wirelessly relays them wirelessly or via a bi-directional fiber optics/copper cable communications link to the remote base station.

It is an objective of the present invention that the antenna array relay junction receives televised signals simultaneously wirelessly or via a bi-directional fiber optics/copper cable communications link from a multiplicity of instrumented sports paraphernalia that are on the playing field/rink and relays them simultaneously wirelessly or via a bi-directional fiber optics/copper cable communications link to the remote base station.

It is an objective of the present invention that the antenna array relay junction receives command and control signals from the remote base station wirelessly or via a bi-directional fiber optics/copper cable communications link and relays them wirelessly to a single dynamic instrumented sports paraphernalia that is on the playing field/rink.

It is an objective of the present invention that the antenna array relay junction receives command and control signals from the remote base station wirelessly or via a bi-directional fiber optics/copper cable communications link and relays them wirelessly or via a bi-directional fiber optics/copper cable communications link simultaneously to a multiplicity of static instrumented sports paraphernalia that are on the playing field/rink.

It is an objective of the present invention that the antenna array relay junction wirelessly receives status control signals from a single dynamic instrumented sports paraphernalia that is on the playing field/rink and relays them wirelessly or via a bi-directional fiber optics/copper cable communications link simultaneously to the remote base station to close the control feedback loop.

It is an objective of the present invention that the antenna array relay junction wirelessly or via a bi-directional fiber optics/copper cable communications link simultaneously receives status control signals from a multiplicity of static instrumented sports paraphernalia that are on the playing field/rink and relays them wirelessly or via a bi-directional fiber optics/copper cable communications link simultaneously to the remote base station to close the control feedback loop.

It is an objective of the present invention that the antenna array relay junction wirelessly receives status control signals from an instrumented ice hockey puck that is on the rink and relays them wirelessly or via a bi-directional fiber optics/copper cable communications link simultaneously to the remote base station to close the control feedback loop.

It is an objective of the present invention that the antenna array relay junction wirelessly or via a bi-directional fiber optics/copper cable communications link simultaneously receives status control signals from two instrumented soccer goals that are on the playing field and relays them wirelessly or via a bi-directional fiber optics/copper cable communications link simultaneously to the remote base station to close the control feedback loop.

It is an objective of the present invention that the antenna array relay junction wirelessly or via a bi-directional fiber optics/copper cable communications link simultaneously receives status control signals from two instrumented ice hockey goals that are on the rink and relays them wirelessly or via a bi-directional fiber optics/copper cable communications link simultaneously to the remote base station to close the control feedback loop.

"Instrumented Ice Hockey Puck" Objectives

It is an objective of the present invention to instrument an ice hockey puck, which will be in play on the ice rink in a sports arena, with a means enabling it to capture video and sounds of the game from its vantage point amongst the players on the ice in real time. This ice hockey puck will be referred to as an "instrumented ice hockey puck" in the present invention to differentiate it from an ordinary conventional instrumented ice hockey puck.

It is an objective of the present invention to provide a two sided ice hockey puck, with a minimum of one TV camera peering out from each plano side, for the purpose of providing broadcast TV and internet streaming coverage to the viewing audience independent of which side is facing upward from the ice rink.

It is an objective of the present invention televise the games from the ice hockey puck to the remote base station, process and format the televised signals, and broadcast the games to a live TV audience; and also use the remote base station to put the processed and formatted games on to the internet for streaming by internet subscribers.

It is an objective of the present invention to provide a means for wirelessly televising ice hockey games from cameras and microphones mounted inside the ice hockey puck in play.

It is an objective of the present invention to instrument an ice hockey puck with CCD (or equivalent) sensor arrayed cameras and microphones.

It is an objective of the present invention to instrument an ice hockey puck with four 3-D stereo camera pairs.

It is an objective of the present invention for the instrumented ice hockey puck to be non-intrusive to the game.

It is an objective of the present invention to provide the instrumented ice hockey puck with a means to wirelessly televise the captured video and sounds of the game, from inside the instrumented ice hockey puck, to an antenna array relay junction which is positioned off the ice rink within the vicinity of the instrumented sports stadium/arena.

It is an objective of the present invention to enable the instrumented ice hockey puck to wirelessly televise the captured video and sound of the game from the instrumentation inside the instrumented ice hockey puck to an antenna array relay junction in the vicinity of the ice rink in real time.

It is an objective of the present invention to provide the instrumented ice hockey puck with a means to wirelessly receive signals from a remote base station via the antenna array relay junction in the instrumented sports stadium/arena to command and control the video and sound capturing functions of the instrumented ice hockey puck, as well as the other electrical, mechanical and optical functions inside the instrumented ice hockey puck.

It is an objective of the present invention to provide a means for wirelessly televising games from cameras and microphones mounted inside the instrumented ice hockey puck in play during a game.

It is an objective of the present invention to enable the instrumented ice hockey puck to wirelessly televise the captured video and sounds independent of the spatial attitude of the instrumented ice hockey puck during the game.

It is an objective of the present invention to stabilize the imagery obtained from dynamic instrumented sports paraphernalia like ice hockey pucks in an upright condition in the picture frame, regardless of the pitch, roll or yaw of the dynamic instrumented sports paraphernalia, as viewed by a live TV audience in the HD CCD letterbox picture format by using gyroscopic encoders, using the direction of forward motion of the instrumented ice hockey puck as the reference direction for its video and sound.

It is an objective of the present invention to stabilize the imagery obtained from the instrumented ice hockey pucks in an upright condition in the picture frame, regardless of the pitch, roll or yaw of the instrumented ice hockey pucks, as viewed by a live TV audience in the HD CCD letterbox picture format by image recognition processing in the remote base station.

It is an objective of the present invention to stabilize the imagery obtained from the instrumented ice hockey pucks in an upright condition in the picture frame, regardless of the pitch, roll or yaw of the instrumented ice hockey pucks, as viewed by a live TV audience in the HD CCD letterbox picture format by using gyroscopic encoders and image recognition processing, using the direction of forward motion of the instrumented ice hockey puck as the reference direction for its video and sound.

It is an objective of the present invention to stabilize the imagery obtained from the instrumented ice hockey pucks in an upright condition in the picture frame, regardless of the pitch, roll or yaw of the instrumented ice hockey pucks, as viewed by a live TV audience in the HD CCD letterbox picture format by using image recognition processing of the archived data base derived from the tripod mounted set-up camera system.

It is an objective of the present invention to stabilize the imagery obtained from the instrumented ice hockey pucks in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station.

It is an objective of the present invention that the instrumented ice hockey puck's outward appearance looks substantially the same as regulation conventional professional league ice hockey pucks.

It is an objective of the present invention that the instrumented ice hockey puck's playing and handling qualities be substantially the same as those of regulation conventional professional league ice hockey pucks.

It is an objective of the present invention to capture, stabilize, remove the spin and make upright TV pictures taken from the instrumented ice hockey puck and broadcast said pictures to a TV audience, despite the spinning and forward motion of the instrumented ice hockey puck.

It is an objective of the present invention to capture, stabilize, remove the spin and make upright HD TV pictures taken from the instrumented ice hockey puck, and broadcast said pictures to a TV audience, despite the spinning and forward motion of the instrumented ice hockey puck.

It is an objective of the present invention to capture, stabilize, remove the spin and make upright 3-D HD TV pictures taken from the instrumented ice hockey puck, and broadcast said pictures to a TV audience, despite the spinning and forward motion of the instrumented ice hockey puck.

It is an objective of the present invention to enable the cameras within the instrumented ice hockey puck to see out from the top and bottom of the instrumented ice hockey puck.

It is also an objective of the present invention to enable the cameras within the instrumented ice hockey puck be protected from the hazards on the ice rink such as ice, dirt and physical impacts.

It is an objective of the present invention to take pictures from both the top and bottom of the instrumented ice hockey puck with extremely wide angle fields of view of the ice hockey rink and the players using the cameras within the instrumented ice hockey puck.

"Instrumented Ice Hockey Goals" Objectives

It is an objective of the present invention that the two instrumented ice hockey goals that are disposed simultaneously on the ice hockey rink can transmit TV pictures and sound simultaneously by wireless means to a remote base station, and simultaneously receive wireless command and control signals from the remote base station to control the functions within the instrumented ice hockey goals, and the ice hockey goals simultaneously transmit status control signals to the remote base station to close the control feedback loop between them.

It is an objective of the present invention that the two instrumented ice hockey goals that are disposed simultaneously on the ice hockey rink can transmit TV pictures and sound simultaneously by wireless means to a remote base station, and simultaneously receive wireless command signals from the remote base station to control the functions within the instrumented ice hockey goals, and the ice hockey goals simultaneously transmit status control signals to the remote base station to close the control feedback loop between them.

It is an objective of the present invention to wirelessly capture pictures and sounds from the instrumented ice hockey goals from where they are positioned on the rink.

It is an objective of the present invention that the instrumented ice hockey goal's outward appearance looks substantially the same as conventional professional league ice hockey goals.

It is an objective of the present invention to outfit a typical ice hockey rink with a compliment of two instrumented ice hockey goals.

It is an objective of the present invention for the instrumented ice hockey goals to be non-intrusive to the game.

It is an objective of the present invention that the instrumented ice hockey goals outward appearance looks substantially the same as typical conventional professional league ice hockey goals.

It is an objective of the present invention that the instrumented ice hockey goals have substantially the same handling qualities by the ice hockey rink maintenance personnel as the conventional professional league ice hockey goals.

It is an objective of the present invention to enable the cameras mounted within and on the instrumented ice hockey goals to see out onto the ice hockey rink during a game.

It is an objective of the present invention to instrument a ice hockey goal with a minimum of one instrumentation module.

It is also an objective of the present invention to enable the cameras and microphones mounted within and on the instrumented ice hockey goals to be protected from the hazards on the playing field such as ice, snow, rain, dirt and physical impacts.

It is an objective of the current invention to provide a stable mounting means for the instrumentation module inside the instrumented ice hockey goal.

It is an objective of the present invention that the instrumented ice hockey puck has the same center of gravity location as the conventional ice hockey puck.

It is an objective of the present invention to connect the instrumented ice hockey goals to the bi-directional fiber optic cable/copper cable communication links buried beneath the ice of the rink linking it to the antenna array relay junction using connectors contained in its footings.

It is an objective of the present invention to connect the instrumented ice hockey goals to the low voltage electric power copper cable buried beneath the ice of the rink using connectors in its footings.

It is an objective of the present invention for the instrumented ice hockey goals to televise RF signals of the game from the instrumented ice hockey goals to the antenna array relay junction using the air ways above any typical ice hockey rink as bi-directional communication links.

It is an objective of the present invention for the instrumented ice hockey goals to televise signals from the instrumented ice hockey goals to the antenna array relay junction using the bi-directional fiber optic cable/copper cable communication links buried beneath the ice of the rink linking it to the antenna array relay junction.

It is an objective of the present invention for the instrumented ice hockey goals to receive signals from the remote base station via the antenna array relay junction using the bi-directional fiber optic cable/copper cable communication links buried beneath the ice of the rink linking the instrumented ice hockey goals to the antenna array relay junction.

It is an objective of the present invention for the instrumented ice hockey goals to receive RF signals from the remote base station via the antenna array relay junction using the air ways linking the instrumented ice hockey goals to the antenna array relay junction.

It is an objective of the present invention for the instrumented ice hockey goals to receive command and control signals from the remote base station via the antenna array relay junction using the bi-directional fiber optic cable/copper cable communication links thereby enabling the cameraman in the remote base station to control the functions of the instrumented ice hockey goals.

It is an objective of the present invention for the instrumented ice hockey goals to receive command and control signals from the remote base station via the antenna array relay junction using the air ways as communication links thereby enabling the cameraman in the remote base station to control the functions of the instrumented ice hockey goals.

"Instrumented Soccer Goals" Objectives

It is an objective of the present invention that the two instrumented soccer goals that are disposed simultaneously on the soccer playing field can transmit TV pictures and sound simultaneously by wireless means to a remote base station, and simultaneously receive wireless command signals from the remote base station to control the functions within the instrumented soccer goals, and the soccer goals simultaneously transmit status control signals to the remote base station to close the control feedback loop between them.

It is an objective of the present invention that the two instrumented ice hockey goals that are disposed simultaneously on the ice hockey rink can transmit TV pictures and sound simultaneously by wireless means to a remote base station, and simultaneously receive wireless command signals from the remote base station to control the functions within the instrumented ice hockey goals, and the ice hockey goals simultaneously transmit status control signals to the remote base station to close the control feedback loop between them.

It is an objective of the present invention to wirelessly capture pictures and sounds from the instrumented soccer goals from where they are positioned on the playing field.

It is an objective of the present invention that the instrumented soccer goal's outward appearance looks substantially the same as conventional professional league soccer goals.

It is an objective of the present invention to outfit a typical soccer playing field with a compliment of two instrumented soccer goals.

It is an objective of the present invention for the instrumented soccer goals to be non-intrusive to the game.

It is an objective of the present invention that the instrumented soccer goals outward appearance looks substantially the same as typical conventional professional league soccer goals.

It is an objective of the present invention that the instrumented soccer goals have substantially the same handling qualities by the soccer field maintenance personnel as the conventional professional league soccer goals.

It is an objective of the present invention to enable the cameras mounted within and on the instrumented soccer goals to see out onto the soccer playing field during a game.

It is an objective of the present invention to instrument a soccer goal with a minimum of one instrumentation module.

It is also an objective of the present invention to enable the cameras and microphones mounted within and on the instrumented soccer goals to be protected from the hazards on the playing field such as ice, snow, rain, dirt and physical impacts.

It is an objective of the present invention to enable each of the cameras inside the instrumentation module to have zoom capability and see extremely wide angle fields of view through the optical windows.

It is an objective of the present invention to enable instrumentation modules to each have four cameras arranged as two 3-D stereo camera pairs, and for each pair to see out respectively from the face of the instrumentation module through four optical windows onto the baseball field of play during a game.

It is an objective of the current invention to provide a means to prevent moisture and dirt from entering the instrumentation module and interfering with its functions.

It is an objective of the current invention to provide a stable mounting means for the instrumentation module inside the instrumented soccer goal.

It is an objective of the current invention to provide a means to prevent damage to the instrumentation module from debris entering the instrumentation module.

It is an objective of the present invention that the instrumented ice hockey puck has the same material, texture, weight, center of gravity and moments of inertia locations as the conventional ice hockey puck thereby making it play and handle exactly like a conventional regulation ice hockey puck.

It is an objective of the present invention to connect the instrumented soccer goals to the bi-directional fiber optic cable/copper cable communication links buried beneath the ground of the playing field linking it to the antenna array relay junction using connectors contained in its footings.

It is an objective of the present invention to connect the instrumented soccer goals to the low voltage electric power copper cable buried beneath the ground of the playing field using connectors in its footings.

It is an objective of the present invention for the instrumented soccer goals to televise RF signals of the game from the instrumented soccer goals to the antenna array relay junction using the air ways above any typical soccer playing field as bi-directional communication links.

It is an objective of the present invention for the instrumented soccer goals to televise signals from the instrumented soccer goals to the antenna array relay junction using the bi-directional fiber optic cable/copper cable communication links buried beneath the ground of the playing field linking it to the antenna array relay junction.

It is an objective of the present invention for the instrumented soccer goals to receive signals from the remote base station via the antenna array relay junction using the bi-directional fiber optic cable/copper cable communication links buried beneath the ground of the playing field linking the instrumented soccer goals to the antenna array relay junction.

It is an objective of the present invention for the instrumented soccer goals to receive RF signals from the remote base station via the antenna array relay junction using the air ways linking the instrumented soccer goals to the antenna array relay junction.

It is an objective of the present invention for the instrumented soccer goals to receive command and control signals from the remote base station via the antenna array relay junction using the bi-directional fiber optic cable/copper cable communication links thereby enabling the cameraman in the remote base station to control the functions of the instrumented soccer goals.

It is an objective of the present invention for the instrumented soccer goals to receive command and control signals from the remote base station via the antenna array relay junction using the air ways as communication links thereby enabling the cameraman in the remote base station to control the functions of the instrumented soccer goals.

"Instrumentation Modules" Objectives

It is an objective of the current invention to provide a means to prevent damage to the instrumentation module from debris entering the instrumentation module.

It is an objective of the present invention to enable each of the cameras inside the instrumentation module to have zoom capability and see extremely wide angle fields of view through the optical windows.

It is an objective of the present invention to enable instrumentation modules to each have four cameras arranged as two 3-D stereo camera pairs, and for each pair to see out respectively from the face of the instrumentation module through four optical windows onto the baseball field of play during a game.

It is an objective of the current invention to provide a means to prevent moisture and dirt from entering the instrumentation module and interfering with its functions.

It is an objective of the current invention to locate and firmly seat the instrumentation package assembly inside the instrumentation module, and to provide a portal which is unobtrusive to the players through which the cameras inside the instrumentation module can peer outward through the cover of the instrumentation module.

It is an objective of the current invention to preserve the alignment of the instrumentation package assembly with the mechanical axis of the instrumentation module, and to prevent damage and preserve normal operation of the instrumentation package assembly even when the instrumentation module is subjected to shock, vibration, dirt, humidity, moisture, and temperature variations during a game.

It is an objective of the present invention to provide the instrumentation module with provisions for holding the instrumentation package assembly inside itself, and provide provisions for isolating the instrumentation package assembly from shocks received by the instrumentation module during the game.

It is an objective of the current invention to preserve the alignment of the instrumentation package assembly with the mechanical axis of the instrumentation module, and to prevent damage and preserve normal operation of the instrumentation package assembly even when the instrumentation module is subjected to shock, vibration, dirt, humidity, moisture, and temperature variations during a game.

It is an objective of the present invention to reduce the shock and vibration to the instrumentation package assembly during the instrumentation module's use in a sports event by providing isolation and by providing padding and cushioning.

It is an objective of the present invention to provide a mounting means for the instrumentation package assembly inside the instrumentation module that will reduce the shock and vibration to the instrumentation package assembly during the instrumentation module's use in a sports event.

It is an objective of the present invention to provide a permanent position and nesting place for the instrumentation package assembly inside the instrumentation module.

It is an objective of the present invention to maintain alignment of the instrumentation package assembly relative to the instrumentation module during usage of the instrumentation module during a game.

It is an objective of the current invention to locate and firmly seat the instrumentation package assembly inside the instrumentation module, and to provide a portal which is unobtrusive to the players through which the cameras inside the instrumentation package assembly can peer outward through the cover of the instrumentation module.

It is an objective of the present invention to mount an instrumentation module inside or on an instrumented soccer goal where the instrumented soccer goal is located at its traditional position on the playing field.

It is an objective of the present invention to mount an instrumentation module inside or on an instrumented ice hockey goal where the instrumented ice hockey goal is located at its traditional position on the ice rink.

It is an objective of the present invention to equip the instrumentation module with four cameras, and for the four cameras to be split into two pairs, where each pair constitutes a 3-D stereo camera pair; and where a 3-D stereo camera pair is located at either end of the instrumentation module.

It is an objective of the present invention to connect the instrumentation module to the bi-directional fiber optic cable/copper cable communication links buried beneath the ground/ice of the playing field/rink linking it to the antenna array relay junction.

It is an objective of the present invention to connect the instrumentation module to the low voltage electric power copper cable buried beneath the ground/ice of the playing field/rink.

It is an objective of the present invention for the instrumentation module to televise RF signals from the instrumented soccer goal to the antenna array relay junction using the air ways above any typical soccer playing field as bi-directional communication links.

It is an objective of the present invention for the instrumentation module to televise RF signals from the instrumented ice hockey goal to the antenna array relay junction using the air ways above any typical ice hockey rink as bi-directional communication links.

It is an objective of the present invention for the instrumentation module to televise signals of the game from the instrumented soccer goal to the antenna array relay junction using the bi-directional fiber optic cable/copper cable communication links buried beneath the ground of the playing field linking it to the antenna array relay junction.

It is an objective of the present invention for the instrumentation module to televise signals of the game from the instrumented ice hockey goal to the antenna array relay junction using the bi-directional fiber optic cable/copper cable communication links buried beneath the ice of the rink linking it to the antenna array relay junction.

It is an objective of the present invention for the instrumentation module to receive signals from the remote base station via the antenna array relay junction using the bi-directional fiber optic cable/copper cable communication links buried beneath the ground of the playing field/rink linking the instrumentation module to the antenna array relay junction.

It is an objective of the present invention for the instrumentation module to receive RF signals from the remote base station via the antenna array relay junction using the air ways linking the instrumentation module to the antenna array relay junction.

It is an objective of the present invention for the instrumentation module to receive command and control signals from the remote base station via the antenna array relay junction using the bi-directional fiber optic cable/copper cable communication links thereby enabling the cameraman in the remote base station to control the functions of the instrumentation module.

It is an objective of the present invention for the instrumentation module to receive command and control signals from the remote base station via the antenna array relay junction using the air ways as communication links thereby enabling the cameraman in the remote base station to control the functions of the instrumentation module.

Battery Pack Charging Stations, Objectives

It is an objective of the present invention the battery charging stations can wirelessly by magnetic induction charge the battery packs inside instrumented sports paraphernalia such as instrumented soccer goals, instrumented ice hockey goals, instrumented tennis nets, instrumented tennis net posts, instrumented baseball bases, instrumented baseball home plates, instrumented baseball pitcher's rubbers, instrumented footballs and instrumented ice hockey pucks, and that they can perform this function on or off the playing field/rink/court.

Hand Held Remotes, Objectives

It is an objective of the present invention that an operator using a hand held remote in proximity to an instrumented sports paraphernalia such as instrumented soccer goals, instrumented ice hockey goals, instrumented tennis nets, instrumented tennis net posts, instrumented volleyball nets, instrumented volleyball net posts, instrumented baseball bases, instrumented baseball home plates, instrumented baseball pitcher's rubbers, instrumented footballs, and instrumented ice hockey pucks, can by magnetic induction interrogate and view the status of the functions that the instrumented sports paraphernalia performs, and change the state of those functions, and that they can perform this operation on or off the playing field/rink/court.

"System for Streaming Games on the Internet", Objectives

It is an objective of the present invention to equip existing prior art soccer playing fields and ice hockey rinks with a system for streaming soccer and ice hockey games on the internet.

It is an objective of the present invention to equip existing prior art soccer playing fields and ice hockey rinks with a system that permits the parents of little league soccer players be able to see streaming video and audio of their children playing in soccer games on the soccer field, as captured by the instrumented soccer goals.

It is an objective of the present invention to equip existing prior art soccer playing fields and ice hockey rinks with a system that uses instrumented soccer goals and instrumented ice hockey goals that permits the parents of little league soccer and ice hockey players be able to see streaming video and audio of their children playing in soccer games and ice hockey games on the soccer field/ice rink.

It is an objective of the present invention to equip existing prior art baseball playing fields with a system for streaming baseball games on the internet.

It is an objective of the present invention to equip existing prior art baseball playing fields with a system for streaming video and audio of baseball games captured by instrumented baseball bases and instrumented baseball home plates located at their traditional positions on the playing field, wherein the baseball bases and baseball home plates are instrumented using a multiplicity of TV cameras and microphones.

It is an objective of the present invention to equip existing prior art baseball playing fields with a system for streaming baseball games on the internet, wherein the system is comprised of television cameras, microphones, audio processing units, video processing units, audio and video compression modules, high-speed terrestrial mobile broadband service units, antenna units, a local area WIFI interface, instrumented baseball bases and instrumented baseball home plates (and all the other stuff on the field is not needed for streaming).

It is an objective of the present invention to equip existing prior art soccer playing fields and ice hockey rinks with a system for streaming video and audio of games captured by instrumented soccer goals and instrumented ice hockey goals, wherein the soccer goals and ice hockey goals are instrumented using a multiplicity of TV cameras and microphones.

It is an objective of the present invention that the soccer goals and ice hockey goals are to be instrumented with a multiplicity of TV cameras and microphones.

It is an objective of the present invention that the TV cameras and microphones are housed in instrumentation modules.

It is an objective of the present invention to provide a system for streaming soccer games on the internet wherein the system is comprised of television cameras, microphones, audio processing units, video processing units, audio and video compression modules, high-speed terrestrial mobile broadband service units, antenna units, a local area WIFI interface, and instrumented sports paraphernalia. (and all the other stuff on the field is not needed for streaming).

It is an objective of the present invention that the audio processing unit, video processing unit and compression modules respectively are used to buffer, process and compress the captured image and sound information prior to streaming by the high-speed terrestrial mobile broadband service unit.

It is an objective of the present invention that the system connects the camera(s) and microphones to a publicly accessible internet relay server for the purpose of real-time viewing of the game by audiences using their portable wireless devices—i.e. WIFI enabled Phones, Laptops, Touch Pads, PDA's, etc.

It is an objective of the present invention that the electronics package unit contains a minimum of one high definition video camera and one microphone whose captured video and audio, following suitable H.264/MPEG compression, is buffered and subsequently sent to an active broadband connection established using for example Mobile Broadband Hotspot Hardware Technology.

It is an objective of the present invention that the system conveys high definition (HD) video and multi-dimensional audio captured by the microphones mounted within and/or attached on and to the goals, to an audience which may or may not be spectator present at the game but wish to subscribe and view the game remotely on their personal wireless display devices.

It is an objective of the present invention that the instrumentation modules are equipped with an electronics package unit.

It is an objective of the present invention that the electronics package unit contains a high-speed terrestrial mobile broadband service unit and an antenna used to connect the camera(s) and microphones to a publicly accessible internet relay server for the purpose of real-time viewing of the game by audiences using their portable wireless devices—i.e. WIFI enabled Phones, Laptops, Touch Pads, PDA's, etc.

It is an objective of the present invention that the electronics package unit contains a minimum of one high definition video camera and one microphone whose captured video and audio, following suitable H.264/MPEG compression respectively, is buffered and subsequently sent to an active broadband connection established using for example Mobile Broadband Hotspot Hardware Technology.

It is an objective of the present invention that the system conveys high definition video and multi-dimensional audio captured by the microphones mounted within and/or attached on and to the goals, to an audience which may or may not be spectator present at the game but wish to subscribe and view the game remotely on their personal wireless display devices.

It is an objective of the present invention that the electronics package unit communicates wirelessly with a 4G/LTE or better equivalent Mobile Broadband Tower operating on the 1700 and/or 1900 MHz Frequency Band within a three to five bar signal strength radius of the desired site local to the Field of Play.

It is an objective of the present invention that the same Mobile Broadband Tower that is used to intercept the captured streams from the electronics package unit is also used simultaneously to supply the wireless internet access needed by spectators present at the field/rink of play whom wish to view the game on their personal wireless devices.

It is an objective of the present invention that in operation, the live captured MPEG streams are made accessible across the public internet via a relay server which need not be local to the field/rink of play.

It is an objective of the present invention that this relay server acts as a traffic router and is connected to an internet backbone with sufficient capacity to successfully convey the wideband data streams needed to render High-Definition video and sound to the viewing audience over the www.

It is an objective of the present invention that each person present at the field/rink of play in possession of a suitable mobile broadband wireless device wishing to view the televised game, will initially register or subscribe to the service via a URL that is pointed to the relay server IP address.

It is an objective of the present invention that once the viewer is registered, the viewer will have the option of choosing the desired video and/or audio streams available at the given field/rink of play currently broadcasted.

It is an objective of the present invention that in an alternative preferred embodiment, an operator seated in front of a display console located either at the field/rink of play or at the relay server will have the ability to select which cameras and/or microphones are associated with which streams prior to broadcast.

It is an objective of the present invention that in an alternative preferred embodiment, the operator can insert commercial content material at his discretion i.e. sports sponsor's advertisements, announcements and other insertions.

It is an objective of the present invention to provide a system for streaming the video and audio of professional, college, high school and little league soccer games and ice hockey games captured by instrumented soccer goals and instrumented ice hockey goals, wherein the soccer goals and ice hockey goals are instrumented using a multiplicity of TV cameras and microphones and where the goals are located at their traditional positions on the playing field/ice rink amongst the players.

It is an objective of the present invention that the TV cameras and microphones, along with their supporting electronics, are packaged in modules which are housed inside selected sports paraphernalia like ice hockey pucks, ice hockey goals and soccer goals that are used in the game by the players on the playing field/rink.

It is an objective of the present invention to provide a system for streaming professional league soccer and ice hockey games from instrumented sports paraphernalia like soccer goals and ice hockey goals.

It is an objective of the present invention that the instrumentation modules which contain the television cameras and microphones can either be mounted inside, and/or externally attached to the structural members of the soccer goals and ice hockey goals.

It is an objective of the present invention that the video and audio signals from the instrumentation modules which are mounted inside, and/or externally attached to the structural members of the soccer goals and ice hockey goals are transmitted to a remote base station.

DETAILED DESCRIPTION OF THE DRAWINGS

Figure 1A:
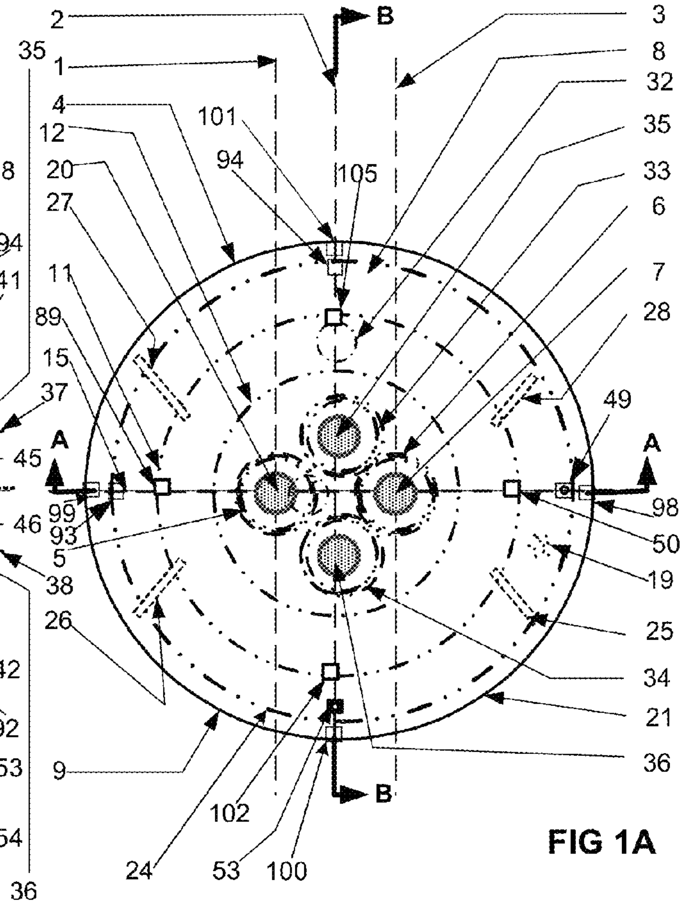
FIG. 1A shows a top view of the eight camera two sided instrumented ice hockey puck.
Figure 1B:
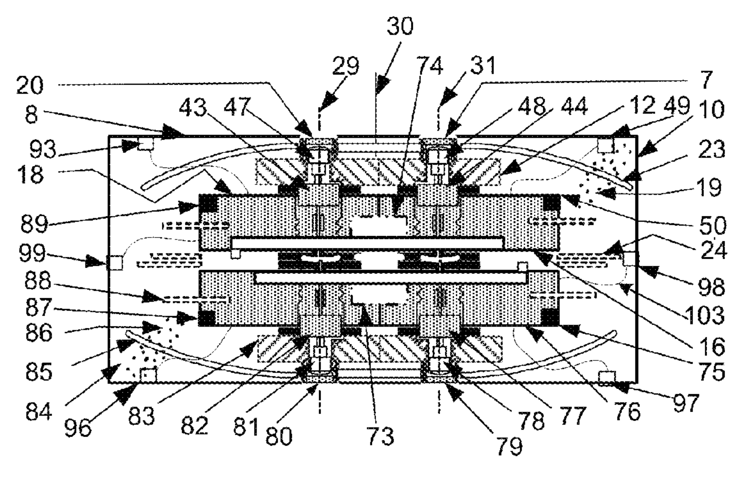
FIG. 1B shows a front view of the eight camera two sided instrumented ice hockey puck.

FIG. 1A and FIG. 1B and FIG. 1C

The detailed physical elements disclosed in the instrumented ice hockey puck drawings shown in FIG. 1A and FIG. 1B and FIG. 1C are identified as follows: 1 is the y-axis of camera 43. 2 is the y-axis of symmetry of the instrumented ice hockey puck. 3 is the y-axis of camera 44. 4 is the side of the instrumented ice hockey puck. 5 is a lower induction coil used to charge the battery pack inside the instrumentation package assembly. 6 is a lower induction coil used to charge the battery pack inside the instrumentation package assembly. 7 is a plane-parallel-flat optical window. 8 is the top of the instrumented ice hockey puck. 9 is the front side of the instrumented ice hockey puck. 10 is the side of the instrumented ice hockey puck. 11 is the central hub of the instrumentation package assembly containing the battery pack. 12 is the Type XI buffer plate. 13 is the bottom of the instrumented ice hockey puck. 14 is the bellows section of the instrumentation package assembly belonging to optical window 35. 15 is the x-axis of symmetry of the instrumented ice hockey puck. 16 is the bottom of the instrumentation package assembly. 17 (not shown). 18 is the top instrumentation package assembly. 19 is the molded encapsulating material of the instrumented ice hockey puck. 20 is the plane-parallel-flat optical window. 21 is the side of the instrumented ice hockey puck. 22 is the side of the instrumented ice hockey puck. 23 is the upper protective cover plate. 24 is the lower protective cover plate. 25 is a wireless radio antenna. 26 is a wireless radio antenna. 27 is a wireless radio antenna. 28 is a wireless radio antenna, 29 is the z-axis of the camera whose optical window is 20. 30 is the z-axis of the instrumentation package assembly and the instrumented ice hockey puck. 31 is the z-axis of the camera whose optical window is 7. 32 is a fiber optics/copper cable connector in the bottom of the instrumentation package assembly. 33 is a lower induction coil. 34 is a lower induction coil. 35 is an optical window. 36 is an optical window. 37 is the z-axis of the camera whose optical window is 35. 38 is the z-axis of the camera whose optical window is 36. 39 is the bellows section of the instrumentation package assembly belonging to optical window 36. 40 (not shown). 41 is a camera. 42 is a camera. 43 is a camera. 44 is a camera. 45 is a camera lens. 46 is a camera lens. 47 is a camera lens. 48 is a camera lens. 49 is a microphone. 50 is a microphone. 51 is a gas valve. 52 is an access lid heat sink. 53 is a microphone. 54 is the microphone cable. 55 is the microphone connector. 56 (not shown). 57 is the lower protective cover plate. 58 is the top of the instrumentation package assembly. 59 is the bottom surface of the ice hockey puck. 60 is a camera. 61 is an optical window. 62 is a camera lens. 63 is a camera lens. 64 is an optical window. 65 is a camera. 66 is a buffer plate assembly. 67 is a microphone. 68 is a microphone cable. 69 is the upper cover plate. 70 is the side of the ice hockey puck. 71 is a wireless radio antenna. 72 is a lower protective cover plate. 73 is a battery pack. 74 is a battery pack. 75 is a microphone. 76 is the bottom instrumentation package assembly. 77 is a camera. 78 is a camera lens. 79 is an optical window. 80 is an optical window. 81 is a camera lens. 82 is a camera. 83 is a buffer plate assembly. 84 is the molded encapsulating material of the instrumented ice hockey puck. 85 is the upper protective cover plate. 86 is the molded encapsulating material of the instrumented ice hockey puck. 87 is a microphone. 88 is a wireless radio antenna. 89 is a microphone. 90 is a microphone connector. 91 is an induction coil. 92 is an induction coil, 93 is a microphone. 94 is a microphone. 95 is a microphone. 96 is a microphone. 97 is a microphone. 98 is a microphone. 99 is a microphone. 100 is a microphone. 101 is a microphone. 102 is a microphone. 103 is a microphone. 104 is a microphone. 105 is a microphone.

FIG. 1A is a top view of the instrumented ice hockey puck.

FIG. 1B is a front view of the instrumented ice hockey puck.

FIG. 1C is a side view of the instrumented ice hockey puck.

The present invention contemplates that the instrumentation package assembly within the instrumented sports paraphernalia be instrumented with a transceiver and antenna capable of transmitting radio signals encoded with the picture and sound information to a remote base station via an antenna array relay junction. The remote base station then in turn broadcasts the video and audio to the TV viewing audience. The present invention contemplates that instrumented sports paraphernalia, that are in play on the playing field during professional league games and player training sessions, are instrumented with cameras and microphones enabling them to acquire pictures and sounds of the players from amongst the players on the playing field. Electronics within the instrumentation package assembly televises the pictures and sounds to a remote base station via an antenna array relay junction.

Referring to the preferred embodiment disclosed in FIG. 1A and FIG. 1B and FIG. 1C, an instrumented ice hockey puck equipped with four wireless radio wave 3-D stereo television camera pairs 41 and 42, 43 and 44, 60 and 65, and 77 and 82, and employing single point, multi point and/or multi point diversity reception techniques is specified. Two 3-D stereo camera pairs look out perpendicularly from each of the puck's two planar surfaces.

The preferred embodiment disclosed in the present invention in FIG. 1A and FIG. 1B and FIG. 1C has an advantage over ice hockey pucks having cameras and microphones peering and hearing from only one side. The instrumented ice hockey puck preferred embodiment in the present invention in FIG. 1A and FIG. 1B and FIG. 1C has cameras and microphones peering out from both of the puck's two planar surfaces enabling video and sound to be televised from both sides of the puck depending on which side is facing upward from the ice. This embodiment is advantageous in the game of ice hockey because either planar side of the puck may be facing upward from the ice during a game. When the ice hockey puck is struck by the hockey sticks during a game, the puck is frequently flipped over. If the ice hockey puck didn't have cameras peering through both of its planar surfaces, it would be blind when its only cameras faced downward toward the ice.

This embodiment is also advantageous because it provides for three additional microphone channels to be processed by the remote base station into surround sound for the TV viewing audience.

The instrumented ice hockey puck is equipped to be enabled, commanded and controlled by administrative data conveyed simultaneously and bi-directionally from/to the remote base station utilizing wireless radio communication. The instrumented ice hockey puck uses the same instrumentation package assemblies 18 and 76 as shown in FIG. 21A and FIG. 21B.

A conventional ice hockey puck is traditionally considered to be sport's paraphernalia. It is a black colored disk three inches in diameter by one inch thick. The instrumented ice hockey puck is instrumented sports paraphernalia. The instrumented ice hockey puck is three inches in diameter and one inch thick. Its size, shape, color, texture, weight, dynamic playability and outward appearance are identical to the conventional regulation ice hockey pucks.

The instrumented ice hockey puck contains two identical instrumentation package assemblies 18 and 76 inside it. Each instrumentation package assembly has a set of four TV cameras looking out from their respective sides of the instrumented ice hockey puck. Except for the small apertures of the optical windows which protect the cameras and their lenses, the outward appearance of the instrumented ice hockey puck is made identical to the conventional ice hockey puck so it will not be obtrusive to the game or to the players. The dynamics of the instrumented hockey puck are made identical to the dynamics of the conventional ice hockey puck. The instrumented ice hockey puck material 19, 84 and 86 is vulcanized hard black rubber just like the conventional regulation hockey puck. The weight of the instrumented hockey puck is 5.5 to 6.0 ounces which is the regulation weight of conventional ice hockey pucks. Its moments of inertia are made identical to the conventional regulation ice hockey puck by appropriately balancing and distributing its weight and the weight of its internal components around its x, y and z axes respectively. Voids in the vulcanized hard black rubber molding and encapsulating material are deliberately made at locations inside the body of the puck to achieve these moments of inertia. Very small lead counter weights are also encapsulated at selected locations inside the body of the puck to achieve these moments of inertia without affecting the RF. The instrumented ice hockey puck is used during a hockey game on the ice hockey rink in an arena by the players in the same way a conventional ice hockey puck is used. It is a direct substitute for conventional ice hockey pucks. The instrumented ice hockey puck is three inches in diameter and one inch thick. The distance between the instrumented ice hockey puck's top 8 and its bottom 13 is one inch, just like the conventional regulation ice hockey pucks. Surfaces 8 and 13 are flat and parallel to one another.

Referring to drawings FIG. 1A and FIG. 1B and FIG. 1C, in a preferred embodiment, the present invention contemplates an instrumented ice hockey puck, which when used on any hockey court can wirelessly and autonomously televise ice hockey games simultaneously from either or both of its instrumentation package assemblies 18 and 76 through the instrumented ice hockey puck under the command and control of the remote base station. The remote base station is disclosed in FIG. 30A and FIG. 30B, and FIG. 31A and FIG. 31B, and FIG. 32A and FIG. 32B, and FIG. 33A and FIG. 33B and FIG. 33C and FIG. 33D and FIG. 33E, and FIG. 35A and FIG. 35B and FIG. 35C, and FIG. 7, and FIG. 8 and elsewhere in the present invention. During the game of ice hockey, either of the two planar surfaces of the instrumented ice hockey puck may be facing and sliding on the ice. The other planar surface will be looking upward from the ice.

The instrumented ice hockey puck employs two four camera instrumentation package assemblies 18 and 76 substantially identical to the instrumentation package assembly shown in FIG. 21A and FIG. 21B. The instrumented ice hockey puck can be arranged at the beginning of the game with either of its planar surfaces facing upward from the ice with its cameras looking skyward.

Figure 8:
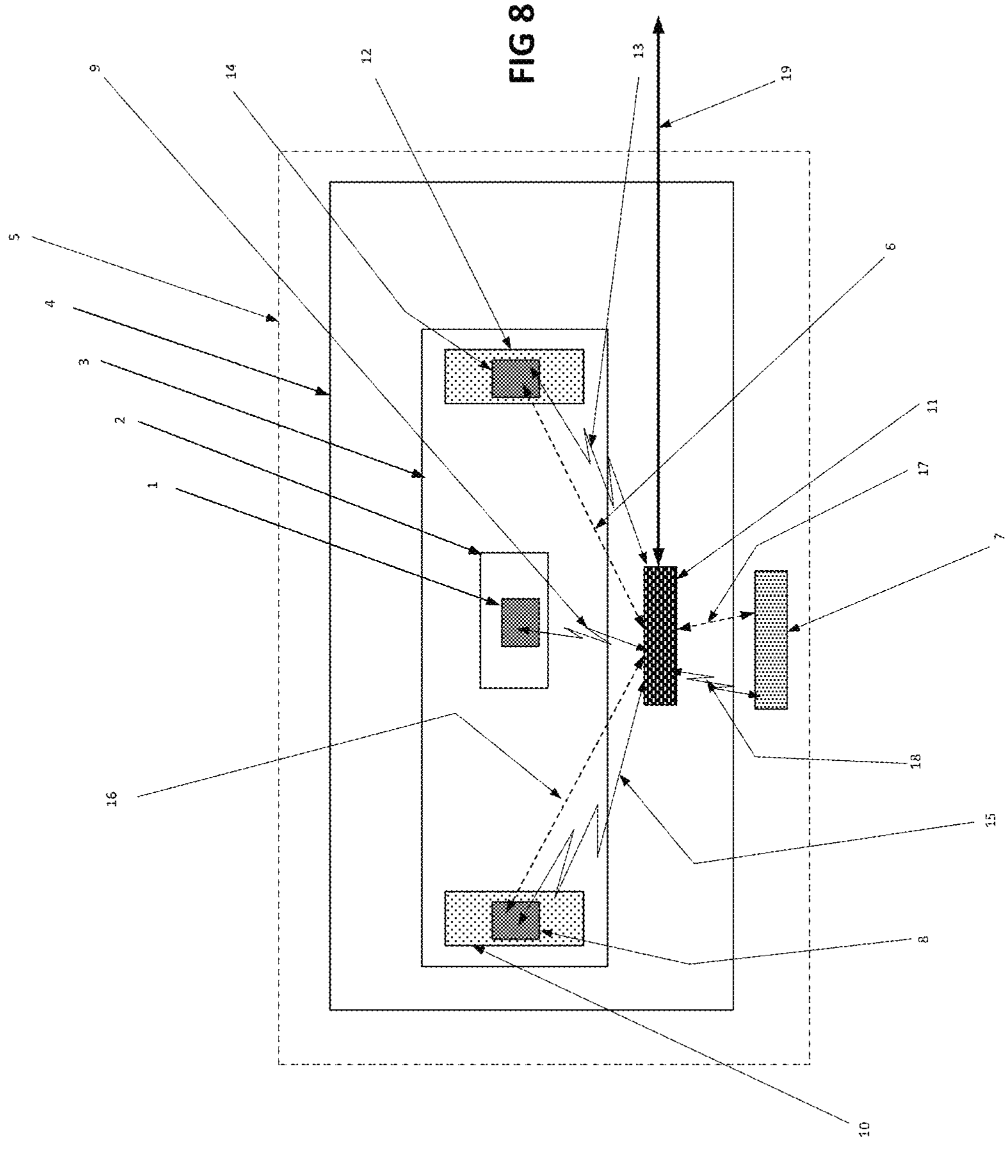
FIG. 8 is a top view of a typical ice hockey instrumented sports stadium/arena that has been configured and equipped for use with two instrumented ice hockey goals and an instrumented ice hockey puck, for televising games and streaming games from on the rink from the ice hockey goals and pucks.

FIG. 8 is a top view of a typical ice hockey instrumented sports stadium/arena that has been configured and equipped for use with two instrumented ice hockey goals and an instrumented ice hockey puck. Televising games from the ice hockey puck on the rink uses bi-directional wireless radio wave communication links between the ice hockey puck and the antenna array relay junction, and bi-directional wireless and/or fiber optics cable/bi-directional high speed copper network communications cable links between the antenna array relay junction and the remote base station. Televising games from the two ice hockey goals on the rink uses bi-directional wireless radio wave communication links between the ice hockey goals and the antenna array relay junction, and/or bi-directional wireless and/or fiber optics cable/high speed copper bi-directional network communications cable links between the ice hockey goals and the antenna array relay junction, and bi-directional wireless and/or fiber optics/high speed copper bi-directional network communications cable links between the antenna array relay junction and the remote base station.

Figures 26A, 26B, 26C:
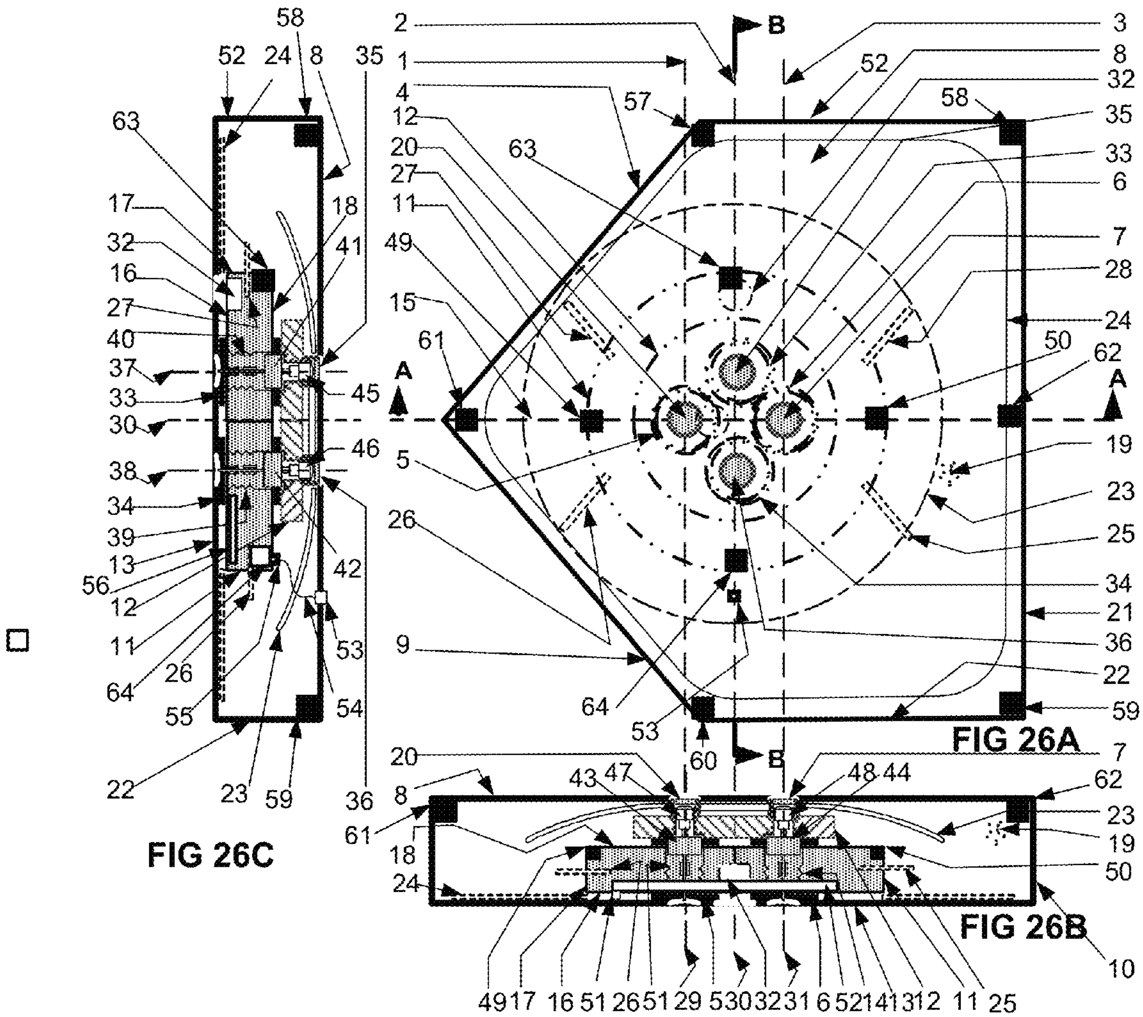
FIG. 26A is the top view of a four-camera instrumented baseball home plate.
FIG. 26B is the side view of a four-camera instrumented baseball home plate.
FIG. 26C is the side view of a four-camera instrumented baseball home plate.

As with the previous preferred embodiment shown in FIG. 26A and FIG. 26B and FIG. 26C, the present invention provides the TV viewing audience with 3-D stereo pictures and stereophonic surround sound.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

The instrumented ice hockey puck has two identical instrumentation package assemblies 18 and 76 mounted inside the puck. Details of instrumentation package assemblies 18 and 76 are specified in FIG. 19A and FIG. 19B and FIG. 19C. The two planar surfaces 8 and 13 of the instrumented ice hockey puck and those of the conventional ice hockey puck are identical, having the same size, shape, color and texture.

Each of the instrumentation package assemblies 18 and 76 each carry four CCD sensor arrayed cameras, for example 41, 42, 43, and 44, and 60, 65, 77 and 82 respectively.

The four cameras 41, 42, 43, and 44 in the instrumentation package assembly 18 are arranged into two pairs 41, 42 and 43, 44; where 41 and 42 constitute a stereo camera pair, and 43 and 44 constitute another stereo camera pair.

The four cameras 60, 65, 77 and 82 in the instrumentation package assembly 76 are arranged into two pairs 60, 65 and 77 and 82; where 60 and 65 constitute a stereo camera pair, and 77 and 82 constitute another stereo camera pair.

The instrumentation package assembly 18 carries two microphones 89, and 50. Microphones 89 and 50 are internal to the puck and part of instrumentation package assembly 18 and hear sounds created by any contact with the puck by conduction of sound. Four additional microphones 94, 49, 53 and 93 are mounted flush with the top surface 8 of the puck and phased at ninety degree intervals around central axis 30 and wired by cable to the instrumentation package assembly 18 and hear sounds above 8. An additional four microphones 99, 100, 98 and 101 are mounted and phased at ninety degree intervals flush and midway down around the cylindrical side 4 around 30 and wired by cable to the instrumentation package assembly 18.

The instrumentation package assembly 76 carries two microphones 75 and 87. Microphones 75 and 87 are internal to the puck and part of instrumentation package assembly 76 and hear sounds created by any contact with the puck by conduction of sound. Four additional microphones 67, 95, 96, and 97 are mounted flush with the bottom surface 13 of the puck and phased at ninety degree intervals around 30 and wired by cable (i.e. 68) to the instrumentation package assembly 76 and hear sounds above 13.

The instrumented ice hockey puck has a total of sixteen microphones. These microphones provide the audio inputs to the instrumentation package assemblies 18 and 76 which televise these audio channels via antennas 27, 28, 25, 26, 71, 88, etc. to the remote base station which processes the data to create the broadcast outputs needed by the TV viewing audience for the creation of surround sound.

The imagery from each camera in the stereo camera pairs is combined by the processors in the remote base station to be broadcast as 3-D video to the TV viewing audience. Each camera pair effectively becomes a 3-D stereo camera pair. The first 3-D stereo camera pair is comprised of cameras 41 and 42. The second 3-D stereo camera pair is comprised of cameras 43 and 44. The pairs of cameras 41, 42 and 43, 44 act independently of one another to simultaneously produce two 3-D stereo TV pictures of the game. Each of the cameras 41 and 42 that form the first 3-D stereo camera pair 41, 42 are separated by an interpupillary distance. Each of the cameras 43 and 44 that form the second 3-D stereo camera pair 43, 44 are separated by an interpupillary distance.

The linear distance separation of the optical axes of the two camera lenses that make up the stereo camera pairs is an important function of the buffer plate. The buffer plate establishes the distance measured between the optical axes of the lenses and is defined as the interpupilarly distance between the camera lenses. For example, the interpupilary distance between cameras 41 and 42 is the linear distance between optical axes 37 and 38; the interpupilary distance between cameras 43 and 44 is the linear distance between optical axes 29 and 31.

The diameter of the hockey puck is three inches. This dimension puts a practical limitation on the maximum interpupillary distance between the cameras that make up a 3-D stereo camera pairs. For today's state of the art SD/HD cameras with body diameters of 0.7 inches for example, and assuming a generous clearance of 0.25 inches between the walls of the puck and the camera bodies, this leaves 1.8 inches for interpupillary distance, or 45.72 mm. Therefore, the axial separation between each 3-D stereo pair of camera lenses can vary up to 46 mm in this example. Therefore in this example, the separation between 29 and 31 can vary up to 46 mm, and the separation between 37 and 38 can vary up to 46 mm also. It is understood that different interpupillary distances produce different 3-D effects. For example, larger interpupillary distance will produce more striking 3-D effects. In the future, as SD/HD cameras get smaller in diameter we may be able to raise the interpupillary distance to 46 to 57 mm.

The 3-D stereo camera pair 41 and 42 in the instrumentation package assembly 18 that forms the first 3-D stereo camera pair has optical windows 35 and 36 respectively. The 3-D stereo camera pair 43 and 44 in the instrumentation package assembly 18 that forms the second 3-D stereo camera pair has optical windows 20 and 7 respectively. The two cameras 41 and 42 in the instrumentation package assembly 18 that form the first 3-D stereo camera pair have optical axes 37 and 38. The two cameras 43 and 44 in the instrumentation package assembly 11 that form the second 3-D stereo camera pair have optical axes 29 and 31. The interpupillary distance for both of these 3-D stereo camera pairs is set to be identical.

The lines of sight of the first and of the second 3-D stereo camera pairs are both looking straight upward from the top 8 of the instrumented ice hockey puck along their respective optical axes. Their lines of sight are all parallel to one another. The SD/HD letter box picture formats of cameras 41 and 42 are aligned together. The SD/HD letter box picture formats of cameras 43 and 44 are aligned together also. Video information from all four cameras is transmitted simultaneously from the instrumented ice hockey puck to the remote base station where it is processed.

The SD/HD letter box picture formats of cameras 41 and 42 and 43 and 44 are aligned together so that any two of the four cameras can be configured to be a 3-D stereo camera pair in the remote base station's processing software. Gyroscope data from the instrumented ice hockey puck's gyroscopic encoders accompanies the video data transmitted from the instrumented ice hockey puck to the remote base station. The gyroscope data is processed by the remote base station software to yield the spin rate, spin sense and direction of forward motion of the instrumented ice hockey puck. The spin rate, spin sense and direction of forward motion is then used by the processor to remove the spin from the imagery through derotation processing which stabilizes the imagery in the SD/HD letterbox picture format and holds it upright for broadcast to viewing by the TV audience. Each of the eight instrumentation package assembly elements contains a pitch, roll and yaw encoder.

Figure 19A:
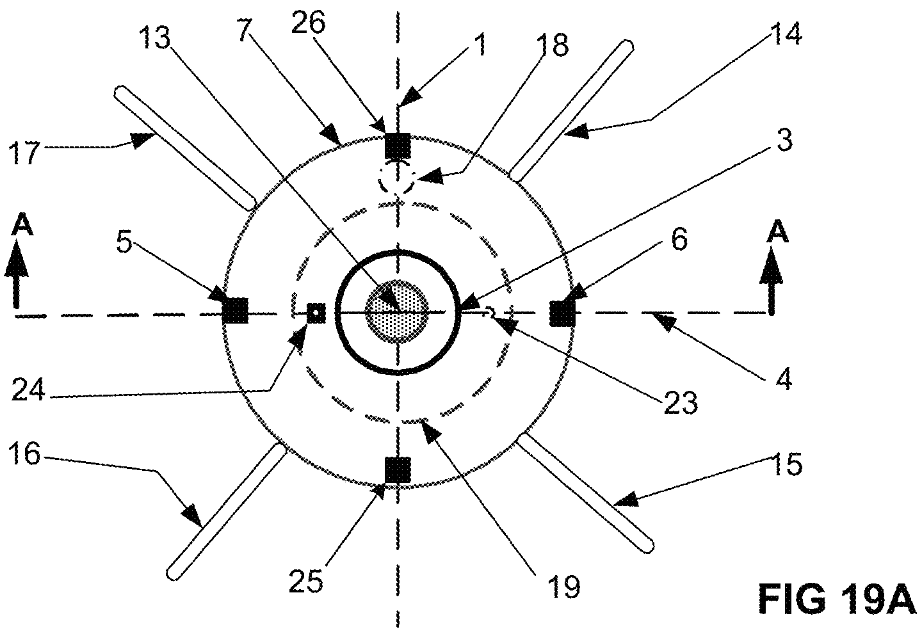
FIG. 19A is the top view of the one-camera instrumentation package assembly.
Figure 19B:
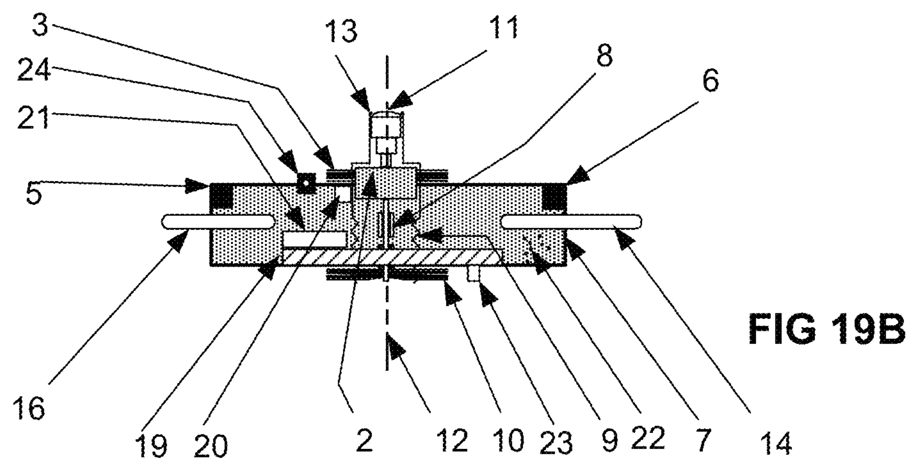
FIG. 19B is a side view of the one-camera wireless instrumentation package assembly.
Figure 19C:
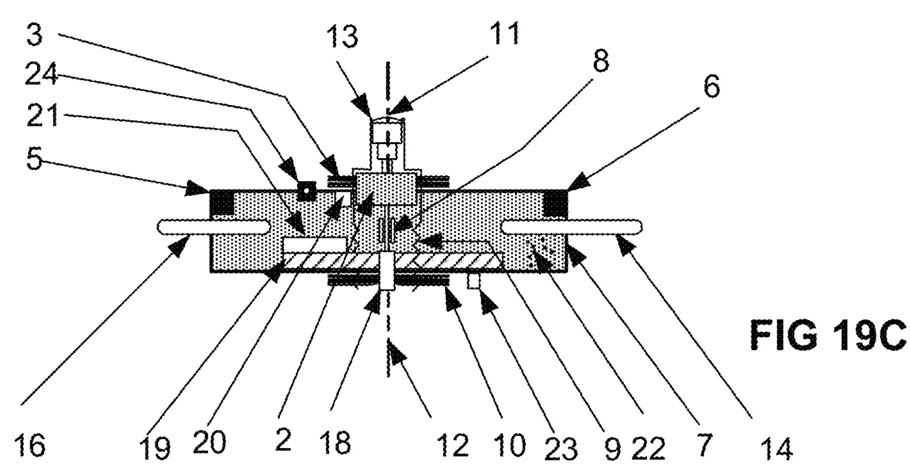
FIG. 19C is a side view of the one-camera wireless, fiber optics and bi-directional high speed copper network communications instrumentation package assembly.
Figure 21C:
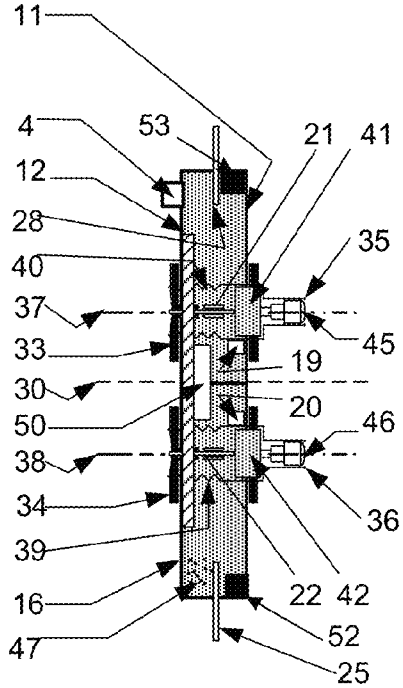
FIG. 21C is a side view of the four-camera wireless and fiber optics/copper cable instrumentation package assembly.
Figure 21A:
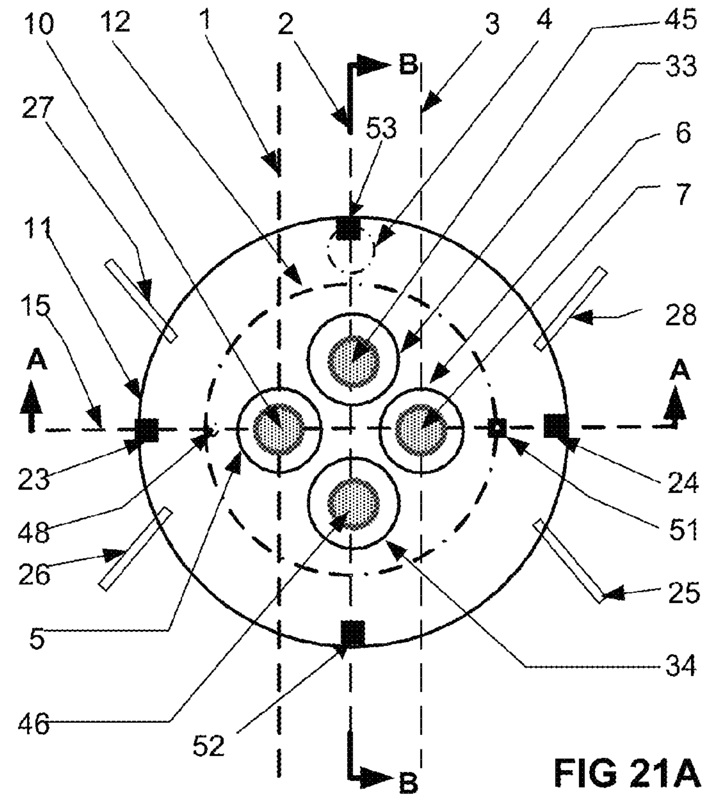
FIG. 21A is a top view of the four-camera and fiber optics/copper cable instrumentation package assembly.
Figure 21B:
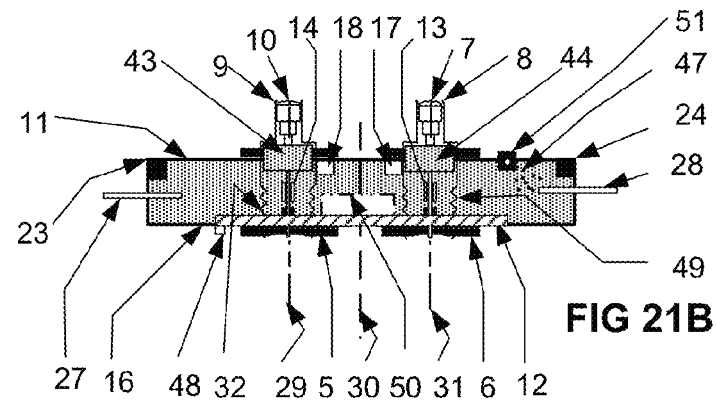
FIG. 21B is a side view of the four-camera wireless instrumentation package assembly.

The instrumented ice hockey puck disclosed in FIG. 1A and FIG. 1B and FIG. 1C uses the instrumentation package assembly shown in FIG. 21A and FIG. 21B and FIG. 21C. The instrumentation package assembly shown in FIG. 21A and FIG. 21B and FIG. 21C uses four of the instrumentation package assembly elements shown in FIG. 19D. The instrumentation package assembly elements shown in FIG. 19D use gyroscopic transducers which are specified in the electronics block diagram FIG. 19E. A detailed example of the operation of the gyroscopic transducers follows as applied to instrumented ice hockey pucks. Referring to FIG. 19E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis. Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software. The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall. This communications transport mechanism is formed whenever the microprocessor within the instrumented sports paraphernalia communicates with the remote base station over the particular mode of communications connectivity that the stadium has been equipped for i.e. fiber optics, copper cable or wireless radio. This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station. Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. For example, when the instrumented ice hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software. During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game.

Referring back to FIG. 1A and FIG. 1B and FIG. 1C, the instrumented ice hockey puck has two protective cover plates 23 and 85 embedded and molded into it facing either of the two planar sides of the puck. One protective cover plate 23 is on one side of the puck, and 85 is on the other side of the instrumented ice hockey puck. The bodies of the protective cover plates 23 and 85 are made spherically dome shaped. The two protective cover plates 24 and 72 are disk-like, and are located in the middle of the puck, and are made flat with rounded edges like the edges on protective cover plates 23 and 85. The materials chosen for the protective cover plates 23, 85, 24 and 72 in the present preferred embodiment are polycarbonates, ABS or fiber reinforced plastics. Although a variety of other materials would function equally as well, polycarbonates, ABS or fiber reinforced plastics have an advantage in that they are lightweight and stiff, enabling their thickness to remain thin while still delivering the significant stiffness needed to perform their mechanical shielding function in the limited space they can occupy within the instrumented ice hockey puck. They have an additional advantage in that they are transparent to the transmitted and received radio waves which need to move to and from the antennas 25, 26, 27, 28, 71, 88 etc. inside the instrumented ice hockey puck without absorption or reflection.

The two instrumentation package assemblies 18 and 76 are sandwiched between the top and bottom protective cover plates 23 and 85. The purpose of these protective cover plates 23 and 85 is to act as mechanical shields to protect the instrumentation package assemblies from being damaged during the game. During the normal course of the game, 8 and 13 of the instrumented ice hockey puck will be hit and crushed by the players and by their equipment. For example, the players may step on the instrumented ice hockey puck or slide into it, or hit it with their hockey sticks, or bounce it off of a wall. They may even drop their knees on it. The two protective cover plates 23 and 85 protect the instrumentation package assemblies within the instrumented ice hockey puck from physical damage due to these hits. The antennas 25, 26, 27, 28, 71, 88 etc. are further protect from damage by the flat disk-like plates 24 and 72.

The space between the planar surfaces 8 and 13 is filled with vulcanized hard rubber or synthetic rubber encapsulating material 10, 19, 84 and 86. A combination of encapsulation voids and encapsulated tiny lead spheres are used to carefully balance and set the moments of inertia of the instrumented puck to match those of the conventional regulation puck. Synthetic rubber is an example of an encapsulating material that is used besides vulcanized hard rubber to mold the disk. When cured, this encapsulating material 10, 19, 84 and 86 acts to absorb shock and vibration to the contents of instrumented ice hockey puck. The encapsulating material 10, 19, 84 and 86 encapsulates the protective cover plates 23 and 85 and maintains their positions inside the molded instrumented ice hockey puck. The space between the protective cover plates 23 and 85 and the instrumentation package assemblies and buffer plate assemblies is also filled with the same encapsulating material. When cured, this encapsulating material acts to absorb shock and vibration to the instrumentation package assemblies and buffer plate assemblies. The encapsulating material encapsulates the instrument package assemblies and buffer plate assemblies inside the instrumented ice hockey puck and thereby maintains their positions centered and coaxial with the mechanical z-axis 30 inside the molded instrumented ice hockey puck.

The protective cover plates 23 and 85 are made flat in their innermost regions close to their optical windows 35, 36 and 20, 7 and 61, 64, 79, and 80 respectively. The purpose of making them flat in their innermost regions is to provide maximum protection for the optical windows 35, 36 and 20, 7 and 61, 64, 79, and 80 whose flat surfaces are flush with the planar surfaces 8 and 73 of the instrumented ice hockey puck. The flat shape enables the protective cover plates 23 and 85 to surround the optical windows 35, 36 and 20, 7 and 61, 64, 79, and 80 of the instrumented ice hockey puck where the optical windows are most likely to be exposed to the greatest threat of damage due to hits to, and scraping on the ice by the instrumented ice hockey puck. The protective cover plates 23 and 85 are buried in encapsulating material at the center top of the instrumented ice hockey puck around the optical windows 35, 36 and 20, 7 and 61, 64, 79, and 80 by approximately 1/32 inch or more below 8 and 73 respectively. The dome shape enables the protective cover plates 23 and 85 to come very close to the top center of the instrumented ice hockey puck where the players will have only grazing contact with its curved surface if they crash into the instrumented ice hockey puck, thereby eliminating the threat of injury to the players if they hit the top of the instrumented ice hockey puck. Furthermore, the spherical shape of the protective cover plates 23 and 85 causes their edges to be rounded downward away from 8 and 73 and places them well below 8 and 73 respectively.

The protective cover plates 24 and 72 are disk-like and flat and are buried equidistant in encapsulating material approximately ½ inch from both 8 and 13. The bodies of protective cover plates 24 and 72 are made flat because they are buried inside the puck and there is no danger of the players coming into violent contact with them. The flat shape is easier and less expensive to manufacture. The thickness of the plates is made in the range of approximately 1/16 inches. In all cases, the rounded edges of the protective cover plates 23 and 24 come within no less than 1/4 inch or more from all sides of the instrumented ice hockey puck.

Alignment and sync of the four cameras of each of the instrumentation package assemblies inside the instrumented ice hockey puck is achieved using the following example of a representative alignment procedure. Identical ultra wide angle lenses 47, 48, 45, 46, and 62, 63, 78 and 81 are used in each of the instrumentation package assemblies 18 and 76 respectively. When the instrumented ice hockey puck is arranged on the ice so that the cameras of instrumentation package assembly 18 are pointed upward from the ice, and one of the ice hockey goal nets lies along the positive y-axis direction 2 of the instrumented ice hockey puck, the first 3D-stereo camera pair 43 and 44 is aligned and synched together in rotation about their respective z-axes within the instrumentation package assembly 18 so that they simultaneously yield wirelessly transmitted upright 3-D stereo images of the hockey net to the remote base station which appear between the center and the bottom of the TV picture frame, and have their letterbox picture frames aligned together. The instrumented ice hockey puck is then flipped over. The second camera pair 41 and 42 is aligned and synched together in rotation about their respective z-axes within the instrumentation package assembly 18 so that they simultaneously yield wirelessly transmitted upright 3-D stereo images of the hockey net which appear between the center and the bottom of the TV picture frame, and have their letterbox picture frames aligned together with those of cameras 43 and 44 so that they are all superimposed on one another. The cameras 60, 65, 77, 82 are aligned and synched together in a similar way. The eight cameras 41, 42, 43, 44 and 60, 65, 77. 82 are aligned and synched together in a similar way.

3-D stereo camera pair 43 and 44 will enable the TV audience to see what the instrumented ice hockey puck sees as it travels outward from the crack of the hockey stick on its body. The TV audience will see the hockey goal net get larger as the instrumented ice hockey puck gets closer to the net and the goal tender. Microphones 49, 50, 53 and 67, 75, 87, will deliver the sound of a loud crack to the TV viewing audience in surround sound as the player's hockey stick crashes against the instrumented ice hockey puck. The TV audience will see the goal tender drop down close-up as the instrumented ice hockey puck approaches the goal net and the goal tender tries to block its flight. Members of the TV viewing audience will duck to avoid being hit by the goal tender's hockey stick as he wields it to intercept the puck. The TV audience will hear the thud and groans of the goal tender as he blocks the puck. The TV audience will hear the scraping by the goal tender's skates as they dig into the ice on the rink. The TV audience will hear the players collide as they scramble for the puck. The sounds received from each of the microphones by the remote base station are processed using special software to produce surround sound which is broadcast to the TV viewing audience.

The televised images viewed by the TV audience are maintained upright in the HD letterbox picture frame despite the rotational motions of the instrumented ice hockey puck, by transmitting pitch, yaw and roll data from the gyroscopes along with the televised image data from the instrumented ice hockey puck's instrumentation package assemblies 18 and 76 to the remote base station which processes the imagery and gyroscope data in its hardware and software and derotates the imagery and holds it upright and stable for the TV audience. Pitch, yaw and roll gyroscopes and encoders are part of the supporting electronics in each of the eight instrumentation package elements that are inside the two instrumentation package assemblies 18 and 76.

In a preferred embodiment where standard SD/HD letterbox CCD chips are used in the cameras, since the shape of the CCD sensor array of pixel elements is a letterbox, this causes the common area of pixels of the physically spinning letterbox to be a square covering only 9/16 or 56% of the field of view of the whole letterbox. Therefore, in a preferred embodiment using standard camera chips we loose 44% of the field of view and are reduced essentially to a square picture format. We can recover the field of view by using physically larger sized standard chips and shorter focal length camera lenses.

Figures 34A, 34B, 34C:
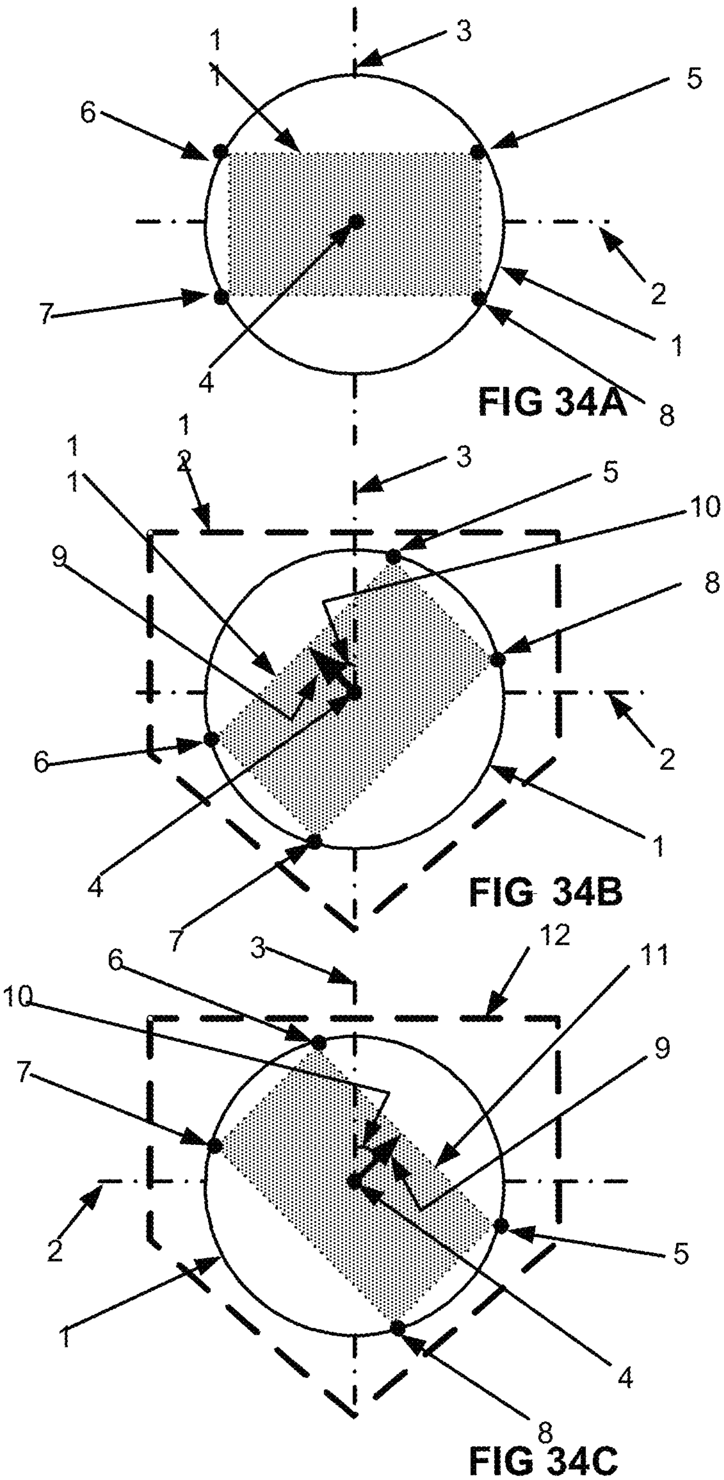
FIG. 34A is a top view of the circular CCD camera chip showing the scanned letterbox picture frame format superimposed on it at an angular direction of zero degrees.
FIG. 34B is a top view of a virtual instrumented baseball home plate showing the generalized orientation of the circular CCD camera's sensor chip with the electronically scanned letterbox format superimposed on it at an arbitrary angular direction.
FIG. 34C is a top view of a virtual instrumented baseball home plate showing the generalized orientation of the circular CCD camera's sensor chip with the electronically scanned letterbox format superimposed on it at an angular direction of minus forty five degrees.

In another preferred embodiment, the circular HD CCD TV camera sensor chips disclosed in drawings FIG. 34A and FIG. 34B and FIG. 34C are used in the eight cameras 41, 42, 43, 44 and 60, 65, 77. 82, rather than ordinary prior art CCD sensor chips. These circular HD CCD TV camera sensor chips have an advantage over ordinary HD CCD sensor chips because they permit transmission of the entire circular sensor array of each camera to the remote base station for processing, even though the instrumented ice hockey puck is spinning. The pixel elements of ordinary prior art CCD sensor chips cover only the area of the letterbox, thereby causing a loss of field of view when the ice hockey puck spins. Use of the circular HD CCD TV camera sensor chips in each of the eight cameras eliminates this problem of field of view loss when the puck spins. Using software, the SD/HD letterbox picture frame format is made to spin in sync with the spin of the instrumented ice hockey puck in the remote base station processor to derotate and stabilize the imagery and lock it in its upright position relative to the direction of forward motion of the ice hockey puck without loss of any of the field of view.

For example, with cameras 41, 42, 43, 44 facing upward from the ice as the instrumented ice hockey puck spins on the ice rink about its z-axis 30, the optical images formed on all four of the circular HD CCD TV camera sensor chips by the camera lenses 45, 46, 47 and 48, fully fill the circular sensor's surfaces of cameras 41, 42, 43, 44. Imagery from the entire circular CCD sensor surface of each camera is scanned because all the pixel elements on the sensor of each camera are active simultaneously. As the instrumented ice hockey puck spins on the ice, so does the optical images on the circular sensor's surfaces of all four chips. The circular sensors are large enough to cover and track the full SD/HD letterbox picture frame format of the images whatever their rotation angle may be. Image data from all the pixel elements on the face of the four circular sensors of the four cameras 41, 42, 43, 44 is wirelessly transmitted with the three microphone data from instrumentation package assembly 18 to the remote base station from the instrumented ice hockey puck for processing.

At the remote base station, the spinning virtual electronic SD/HD letterbox frame within the software processor collects the signals from only those pixel elements within the rectangular letterbox borders for transmission to the TV viewing audience. The roll gyroscopes detect the z-axis 30 spin of the instrumentation package assembly within the spinning instrumented ice hockey puck and encodes the spin data as well as the pitch and yaw data. The spin (roll) data along with pitch and yaw data, and the image data from the circular camera sensors are transmitted simultaneously to the remote base station wirelessly from the RF antennas 25, 26, 27 and 28 via the antenna array relay junction in the ice hockey arena. The remote base station software processes the encoded spin data with the image data and delivers a spin stable upright HD letterbox picture to the TV viewing audience. An advantage of this preferred embodiment is that it completely eliminates the need for the mechanical actuators and bearings associated with each of the instrumentation package elements specified in FIG. 19D. This reduces the weight and the volume requirements of the instrumentation package assembly inside the instrumented ice hockey puck.

In another preferred embodiment, we can accomplish the same performance as above by using standard square chips, where the dimension of each side of the square is equal to the diameter of the circular chip sensor array, and we only use the pixel elements inscribed in the circular region of the chip.

In another preferred embodiment, it should be noted at this point, in general, that any combination of any two of the four cameras of instrumentation package assembly 18 can be electronically commanded and controlled by the cameraman from the remote base station to act as 3-D stereo camera pairs. Using this process produces six possible 3-D stereo camera pairs. For example 41 and 42, 41 and 43, 41 and 44, 42 and 43, 42 and 44, 43 and 44. These combinations permit the cameraman to have a choice of different interpupillary distances.

This is also true for the four cameras of instrumentation package assembly 76. It should be noted that any combination of any two of the four cameras of instrumentation package assembly 76 can be electronically commanded and controlled by the cameraman from the remote base station to act as 3-D stereo camera pairs. Using this process produces six possible 3-D stereo camera pairs. For example 65 and 77, 65 and 60, 65 and 82, 77 and 60, 77 and 82, 60 and 82. These combinations also permit the cameraman to have a choice of different interpupillary distances.

With regard to audio, for example, each of the twelve microphones 49, 93, 94, 89, 50, 53 and 95, 96, 97, 67, 75, 87 listens for sounds from their respective vantage points inside and on the instrumented ice hockey puck. Sounds detected by these microphones have separate simultaneous channels to the remote base station where they are processed into a surround sound format for the audience to hear.

The condenser microphones enable the viewing audience to hear real-time contacts, impacts and shocks to the instrumented ice hockey puck. Microphones enable the TV audience to hear sounds that result from air or any physical contacts or vibrations to the instrumented ice hockey puck; like for example, the crash of a player sliding into the instrumented ice hockey puck. Microphones 49, 53, 93, 94 are on the surface of the puck and hear sounds of activity from sources outside the puck and from any physical contacts or vibrations to the instrumented ice hockey puck itself.

Microphones 67, 95, 96, 97 are on the surface of the puck and hear sounds of activity from sources outside the puck and from any physical contacts or vibrations to the instrumented ice hockey puck itself.

Microphones 49, 53, 93, 94 protrude through holes in the top planar surface of the instrumented ice hockey puck and are flush with the planar surface. Microphones 67, 95, 96, 97 protrude through holes in the bottom planar surface of the instrumented ice hockey puck and are flush with the planar surface.

For example, microphone 53 is connected by cable to electrical connector 55. 55 is connected to the electronics in the instrumentation package assembly 18. Microphone 53 enables the TV audience to hear sounds that occur on the hockey rink like extemporaneous remarks from the players or the scraping of skates on the ice. In certain venues the cameraman may be asked to disable these sounds. The cameraman may disable these sounds remotely by transmitting a microphone disabling signal to the ice hockey puck from the remote base station. Microphone 53 enables the TV audience to hear the whoosh of air as a hockey sticks wiz past the instrumented ice hockey puck, or as the goal tender blocks the puck with his legs.

Microphones 50, 89 and 75, 87 are internal to the puck and hear sounds created by any contact with the instrumented ice hockey puck by conduction of sound waves through the puck.

With the four cameras of instrumentation package assembly 18 looking upward from the ice, live 3D TV pictures are taken simultaneously by the TV cameras 41, 42, 43 and 44 of their respective field of views of the live action on the hockey rink. Cameras 41, 42, 43 and 44 will enable the TV audience to see close-ups from the pucks perspective as players maneuver to strike the instrumented ice hockey puck as it whizzes bye. This will be an action packed event never before witnessed by a TV audience. Some members of the TV audience will flinch as the puck is struck by an oncoming stick. Each of the plays will produce breath taking excitement and expectations by the TV viewing audience. In summary, the instrumented ice hockey puck provides video and sound to the viewing audience that is so exciting and realistic that it makes the individual members of the audience feel that they are in the game on the rink amongst the players. In many ways this is more exciting than viewing the game in person from the stands of the hockey stadium.

In alike fashion, with the four cameras of instrumentation package assembly 76 looking upward from the ice, live 3D TV pictures are taken simultaneously by the TV cameras 60, 65, 77, 82 of their respective field of views of the live action on the hockey rink. Cameras 60, 65, 77, 82 will enable the TV audience to see close-ups from the pucks perspective as players maneuver to strike the instrumented ice hockey puck as it whizzes bye.

The data from all six of the instrumented hockey puck's microphones is simultaneously transmitted to—and processed by—the remote base station software, and broadcast to the real time TV viewing audience to yield surround sound regardless of the spin motion of the instrumented ice hockey puck. By using the data from the gyroscope encoders, the surround sound processing software in the remote base station keeps track of the angular positions of each of the six microphones mounted in the puck relative to the direction of forward motion of the puck. Since the TV viewing audience always sees an upright picture of the scene looking in the direction of forward motion of the puck, and the surround sound processing software simultaneously removes the effect of the puck's spin from the six microphones and properly phases the sound to the picture, the surround sound is phased and synced front to back and right to left with the upright picture scene looking in the forward direction of the puck's motion.

The eight CCD sensor arrayed TV cameras 41, 42, 43, 44, 60, 65, 77, 82 are chosen to be identical to one another. The eight TV camera lenses 45, 46, 47, 48, 62, 63, 78, 81 are chosen to be identical to one another. The interpupillary distance between 41 and 42 is identical to the interpupillary distance between 43 and 44. The field of view of each of the lenses is an ultra wide angle approaching one hundred and eighty degrees. Except for the small parallax between the four images due to the interpupillary distances between the four camera lenses 45, 46, 47 and 48, the images of the ice arena as seen by the four TV cameras as projected onto their four HD circular CCD sensor arrays, are identical to one another. The cameras and their lenses are arranged symmetrically around the z-axis 30 of the puck. The center of gravity of the instrumented ice hockey puck is in its center and equidistant from 8 and 13.

The following is an example of how the remote base station does its image processing. Given that the hockey puck is initially located at rest at the center of the ice hockey rink at x-y-z coordinates P(0, 0, 0), with the puck arranged on the ice so that cameras 44 and 43 are aligned along x-axis of the rink, and its cameras 41 and 42 are aligned along the y-axis of the rink, and the two hockey goal nets are located at coordinates N(d, 0, 0) and N(−d, 0, 0) at either end of the rink, then the TV viewing audience will see the net N(d, 0, 0) appear upright near the bottom central edge of the HD letterbox picture frame screen format. When the instrumented ice hockey puck is at rest the letterbox formats of both cameras will be aligned to look along the positive x-axis by default.

The initial 3-D image of the net N(d, 0, 0) that the TV viewing audience sees is generated by the images from cameras 41 and 42 because these cameras, which comprise a 3-D stereo camera pair, offer the greatest parallax for objects like the net N(d, 0, 0) which lie along the x-axis. Initially, the 3-D stereo camera pair formed by cameras 43 and 44 offer minimum parallax for images of the goal net and will produce no 3-D effects for the net because cameras 43 and 44 lie inline together along the x-axis.

If the hockey puck is now struck so it accelerates to velocity V along the x-axis of the rink toward the goal net N(d, 0, 0), and if the puck has an arbitrary clockwise spin (or roll) about its z-axis 30, then as the hockey puck travels closer to the goal net N(d, 0, 0), the TV viewing audience will see the goal net N(d, 0, 0) be imaged upright above the bottom central edge of the HD letterbox picture frame screen format and see it appear to be growing larger and closer to the center of the letterbox picture frame in 3-D. The pitch, roll and yaw gyroscope data from each of the instrumentation package assembly elements inside the two instrumentation package assemblies 18 and 76 is simultaneously transmitted to the base station via the antenna array relay junction where the spin rate, spin sense, and the forward velocity direction of each of the four cameras is calculated by the processing software. The software in the remote base station processes the data it receives from the hockey puck's onboard instrumentation package assemblies 18 and 76 and aligns the HD letterbox picture frame screen formats of the four cameras so that they are stable relative to the direction of the goal net N(d, 0, 0). The software in the remote base station processes the data it receives from the hockey puck's onboard instrumentation package assembly, and derotates the spinning imagery that all four TV cameras see, and removes the spin from the imagery of all four cameras to stabilize it and make it upright in the HD letterbox picture frame screen format that the TV viewing audience sees. As the hockey puck spins, during each and every time interval, the remote base station's processors alternately select the imagery from the one of the two spinning 3-D stereo camera pairs with the most parallax, in order to maximize the 3-D effect and keep it uniform during any one time interval as the two 3-D stereo camera pairs spin. If this were not done, the TV viewing audience would see the 3-D effects change and fade and then alternately reoccur as the puck spins and the 3-D stereo camera pairs change angular places relative to the goal net N(d, 0, 0). The remote base station receives imagery from all eight cameras simultaneously. The remote base station software automatically processes the incoming data stream and sets up the order in time when the processors alternately select which 3-D stereo camera pair's imagery is to be televised to the TV viewing audience as the puck spins. Except for processing software and joy sticks, the remote base station used in conjunction with the instrumented ice hockey puck is substantially identical to those specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B. Block diagrams of the electronics circuitry signal and data flows are specified in FIG. 14A and FIG. 14B. The processing software is similar to that used for the instrumented football preferred embodiments disclosed in FIG. 39A and FIG. 39B and FIG. 40A and FIG. 40B and FIG. 40C to stabilize and maintain upright imagery using the data from the instrumented ice hockey puck gyroscope encoders and the image recognition data from the set-up camera system shown in FIG. 15A and FIG. 15B, and FIG. 16.

The 3-D stereo effects of the N(d, 0, 0) goal net's imagery, as seen by the TV audience as the puck moves forward towards the goal net, are maximized when the parallax in the images between the respective cameras comprising a 3-D stereo camera pair which are televising the goal net are maximized. At the point in the puck's spin where the full interpupillary distance between the cameras comprising the 3-D stereo camera pair televising the goal net is perpendicular to the forward direction of the puck toward the goal net, the 3-D effect of the goal net's image is at a maximum as seen by the TV audience. The parallax in the images between the two respective cameras comprising a 3-D stereo camera pair is maximized when a line drawn between the two cameras comprising the 3-D stereo camera pair is perpendicular to a line drawn from the center of the puck to the goal net N(d, 0, 0) which is the direction of the puck's forward motion. Since the two stereo camera pairs are imbedded in the puck, when the puck spins, the line drawn between the two cameras will spin also. This changes the angle between the line and the direction of forward motion of the puck, thereby continuously changing the parallax and the 3-D effects of the net's image. In order to minimize this modulation of the 3-D effect that the TV audience sees as the puck spins, the processors will alternately select and switch the 3-D stereo camera pair to broadcast to the TV viewers every ⅛ of a turn (or forty-five degree change in rotation angle) of the instrumented ice hockey puck. The processors easily calculate the time to make the switch based on the data stream transmitted to the remote base station from the roll (spin) gyros in the puck from which they derive the spin rate, spin sense and forward motion direction of the instrumented ice hockey puck.

In another preferred embodiment, the same four cameras 41, 42, 43, and 44 specified in the previous preferred embodiment are used, but instead of arranging the cameras into the two 3-D stereo camera pairs described previously as the first and second 3-D stereo camera pairs, where 41 and 42 constituted the first 3-D stereo camera pair, and where 43 and 44 constituted the second 3-D stereo camera pair, the cameras 41, 42, 43, and 44 are grouped into four additional unique 3-D stereo camera pairs. The four additional 3-D stereo camera pairs are cameras 41 and 43; cameras 43 and 42, cameras 42 and 44; cameras 44 and 41. We will call 41 and 43 the third 3-D stereo camera pair. We will call 43 and 42 the fourth 3-D stereo camera pair. We will call 42 and 44 the fifth 3-D stereo camera pair. We will call 44 and 41 the sixth 3-D stereo camera pair.

In order to use the 3-D composite pictures from any one of these four additional 3-D stereo camera pairs, the scan directions of the letterbox picture frame formats must be electronically rotated about the optical axes of the cameras to align their letterbox formats together before televising the TV pictures. Although electronic rotation of the scan direction of the letterbox can be achieved using standard CCD sensor chips, the circular CCD sensor arrayed chips referred to in FIG. 34A and FIG. 34B and FIG. 34C are particularly suitable for this application because the letterbox can be rotated without any loss of the field of view of the camera. The cameraman in the remote base station will verify that the letterbox formats of the pictures from the two cameras that make up each 3-D stereo camera pair are aligned. The letterbox formats must be aligned so that the resultant composite 3-D picture made up of the pictures from the two 3-D stereo cameras will overlay and register with proper parallax to produce the required 3-D sensation in the TV viewing audience.

The additional four 3-D stereo camera pairs act electronically and independently to simultaneously produce four additional 3-D stereo TV pictures of the game. They use the same electronics as before, and the same lenses as before as in the previous preferred embodiment. It should be understood from this example that each of the two instrumentation package assemblies inside the instrumented ice hockey puck produces its own six 3-D stereo camera pairs, for a total of twelve 3-D stereo camera pairs that act electronically and independently to simultaneously produce twelve 3-D stereo TV pictures of the game.

In the previous preferred embodiment, each of the cameras 41 and 42 that formed the first 3-D stereo camera pair 41, 42 are separated by as much as a 46 millimeter interpupillary distance. Each of the cameras 43 and 44 that formed the second 3-D stereo camera pair 43, 44 are separated by 46 millimeters also.

It can be seen from simple geometry that the interpupillary distance for the third, fourth, fifth and sixth 3-D stereo camera pairs is equal to one half the square root of two times the interpupillary distance for either the first or second 3-D stereo camera pairs. For example, if the interpupillary distance for the first 3-D stereo camera pair is 46 millimeters, then the interpupillary distance for the third 3-D stereo camera pair would be 0.707 times 46 millimeters or 32.5 millimeters.

75 millimeters is the maximum interpupillary distance of the average human's eyes. It is understood that other alternative interpupillary distances may be used to produce other alternative 3-D effects. For example, larger interpupillary distance will produce more striking 3-D effects.

As an example, the 3-D stereo camera pair 41 and 43 in the instrumentation package assembly 11 that forms the third 3-D stereo camera pair, has optical windows 35 and 20 respectively.

The 3-D stereo camera pair 43 and 42 in the instrumentation package assembly 11 that forms the fourth 3-D stereo camera pair has optical windows 20 and 36 respectively.

The 3-D stereo camera pair 42 and 44 in the instrumentation package assembly 11 that forms the fifth 3-D stereo camera pair, has optical windows 36 and 7 respectively.

The 3-D stereo camera pair 44 and 41 in the instrumentation package assembly 11 that forms the sixth 3-D stereo camera pair has optical windows 7 and 35 respectively.

The two cameras 41 and 43 in the instrumentation package assembly 11 that form the third 3-D stereo camera pair have optical axes 37 and 29 respectively.

The two cameras 43 and 42 in the instrumentation package assembly 11 that form the fourth 3-D stereo camera pair have optical axes 29 and 38 respectively.

The two cameras 42 and 44 in the instrumentation package assembly 11 that form the fifth 3-D stereo camera pair have optical axes 38 and 31 respectively.

The two cameras 44 and 41 in the instrumentation package assembly 11 that form the sixth 3-D stereo camera pair have optical axes 31 and 37 respectively.

Electronically, mechanically, and optically all of these twelve 3-D stereo camera pairs operate simultaneously. An advantage occurs when an optical window of one of the cameras is obscured by dirt; the remaining cameras then can be paired remotely by the cameraman operator in the remote base station to continue to produce 3-D imagery for the TV viewers.

The lines of sight of the first, second, third, fourth, fifth and sixth 3-D stereo camera pairs are all looking straight upward from 8 of the instrumented ice hockey puck along their respective optical axes which are all parallel to one another and 30. Their lines of sight are all parallel to one another. The four holes in 8 of the instrumented ice hockey puck used for the optical windows are made just large enough to prevent vignetting of the cameras field of view. Also, the four holes in 13 of the instrumented ice hockey puck used for the optical windows are made just large enough to prevent vignetting of the cameras field of view. The apertures of the optical windows in 8 and 13 are made identical.

In an alternate preferred embodiment where in certain venues stereo 3-D is not required or deemed useful from the instrumented ice hockey puck, a stereo 3-D camera pair that typically has two identical lenses, for example 47 and 48, may be replaced with two dissimilar lenses having different lens settings, focal lengths and fields of view for example. The weights of the lenses must be kept the same in order to maintain balance and the center of gravity location of the puck. Under these same circumstances, the identical cameras, for example 43 and 44 of the 3-D stereo camera pair may also be replaced with two dissimilar cameras. The weights of the cameras must be kept the same in order to maintain balance and the center of gravity location of the puck. For example, the two 3-D stereo camera pairs that face the net from the top of the instrumented ice hockey puck may be considered to be non-essential by the cameraman. Instead, the cameraman may elect to set four dissimilar focal lengths into the zoom lenses facing the net. One lens, 41 for example, may be set to a long focal length for close-up facial expressions of the players as they strike the puck, where another lens 42 may be set to a short focal length for wider shots of the players moving into position to strike the puck.

It should be noted at this point, that in general any combination of any two cameras comprising the instrumented ice hockey puck on a side can be electronically commanded and controlled by the cameraman from the remote base station to act as a 3-D stereo camera pair, for example 41 and 42, 41 and 43, 41 and 44, 42 and 43, 42 and 44, 43 and 44, 65 and 77, 65 and 60, 65 and 82, 77 and 60, 77 and 82, 60 and 82.

In general, for all the preferred embodiments disclosed in the present invention, the instrumented ice hockey puck uses the instrumentation package assembly shown in FIG. 21A and FIG. 21B and FIG. 21C. The instrumentation package assembly shown in FIG. 21A and FIG. 21B and FIG. 21C uses four of the instrumentation package assembly elements shown in FIG. 19D. The instrumentation package assembly elements shown in FIG. 19D use gyroscopic transducers which are specified in the electronics block diagram FIG. 19E.

A detailed example of the operation of the gyroscopic transducers follows. Referring to FIG. 33E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis. Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software. When the instrumented hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software. During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game. The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall. This communications transport mechanism is formed whenever the microprocessor within the instrumented sports paraphernalia communicates with the remote base station over the particular mode of communications connectivity that the stadium has been equipped for i.e. fiber optics, copper cable or wireless radio. This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station.

Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

Figure 19D:
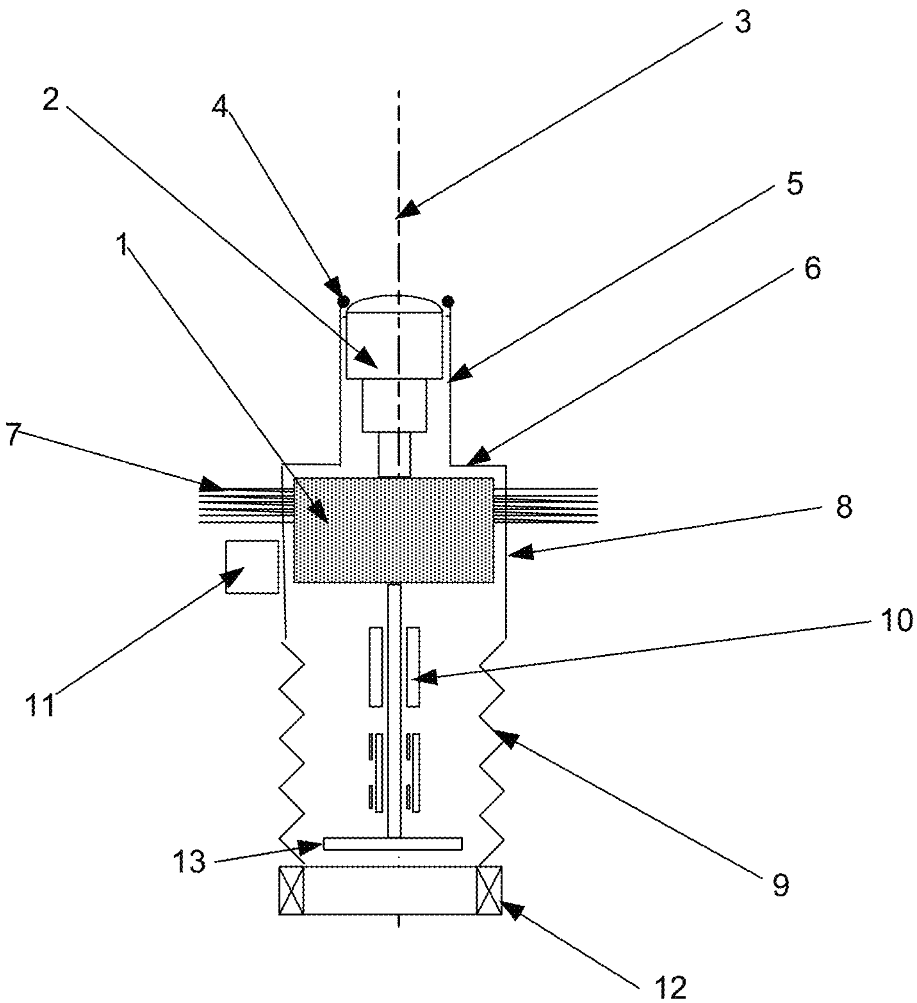
FIG. 19D is a side view of an instrumentation package assembly element.
Figure 19E:
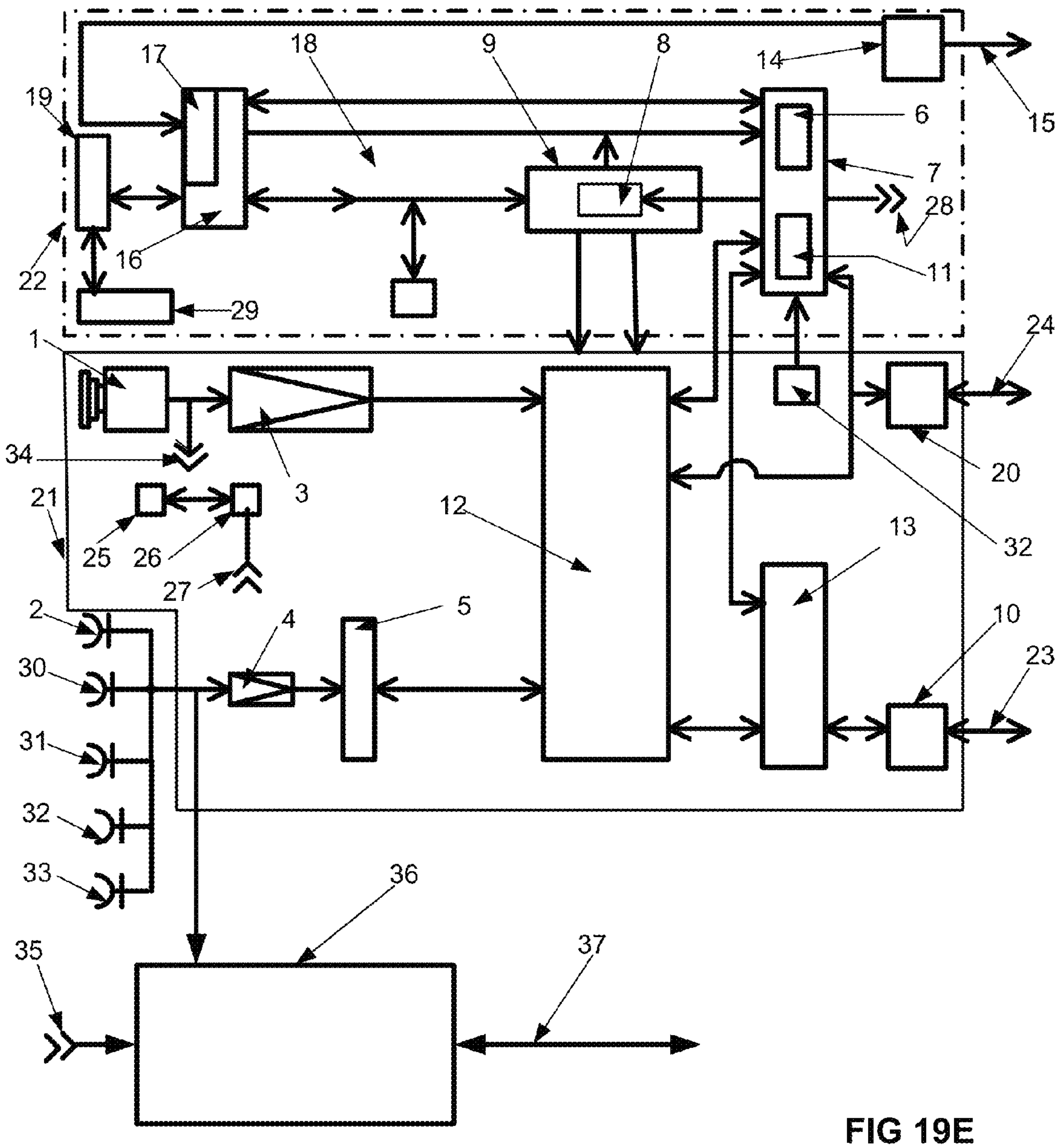
FIG. 19E is an instrumentation package assembly element signal and data electronics block diagram.

The instrumentation package assembly element shown in FIG. 19D is the identically same unit used in the four camera embodiment. The one camera embodiment uses the instrumentation package assembly shown in drawings FIG. 19A and FIG. 19B and FIG. 19C. The one camera embodiment does not produce 3-D. The instrumentation package assembly shown in FIG. 19A and FIG. 19B and FIG. 19C is mounted, aligned and encapsulated into the ice hockey puck in the same manner as the previous preferred embodiment that uses four cameras. The z-axis of the instrumentation package assemblies is aligned and made coincident with the z-axis 30 of the puck which is normal to the top center of the puck, so that the single camera sees out the top of the puck. The center of gravity is in the center of the ice hockey puck. The image stabilization is done by the remote base station. As the puck spins about its z-axis, so does the cameras and their CCD sensor arrays. As the CCD sensor arrays spin about the z-axis of the puck, the imagery formed on the sensor seems to spin relative to the CCD sensor. The instrumented ice hockey puck wirelessly communicates this data with the remote base station. The spinning pixel data and the gyroscope data are communicated to the remote base station. The remote base station uses processing software to de-rotate and stabilize the imagery and make it upright relative to the direction of forward motion of the instrumented puck. The instrumented ice hockey puck has the same appearance, playing and handling qualities, as the standard regulation puck.

The cameraman, in the remote base station, software selects the wireless mode of communication between the instrumented ice hockey puck and the remote base station. The cameraman uses the antenna array relay junction that is installed in the ice hockey stadium/arena with which to command and control his choice and communicate it to the instrumented ice hockey puck in the ice hockey rink.

The cameraman selects items from a software menu of control commands that go to the network transceiver at the remote base station that are subsequently transmitted to the instrumented sports paraphernalia (the instrumented ice hockey puck) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular sports stadium/arena.

These commands, when intercepted by the network transceiver within the instrumented sports paraphernalia, are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented sports paraphernalia that are being controlled.

Referring to the Preferred Embodiments Specified in FIG. 1A and FIG. 1B and FIG. 1C;

the instrumented ice hockey puck satisfies all of the following further objectives:

It is an objective of the present invention to replace existing prior art non-instrumented ice hockey pucks that are currently on existing prior art rinks with substitute instrumented ice hockey pucks.

It is an objective of the present invention to equip an ice hockey arena with an instrumented ice hockey system for the improvement of the TV broadcast quality of ice hockey games.

It is an objective of the present invention to provide an instrumented ice hockey puck comprised of two instrumentation package assemblies, two buffer plate assemblies, two upper protective cover shields, a lower protective cover shield, and a synthetic or vulcanized rubber encapsulation/molding material.

It is an objective of the present invention to provide an instrumentation package assembly wherein four cameras look out through the top of the puck, and another four cameras look out through the bottom of the puck.

It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format, by the remote base station processing gyroscopic encoder data for pitch, roll and yaw gotten from inside the instrumentation package assemblies of the puck, and by using image recognition processing in the remote base station of the archived data base derived from the tripod mounted set-up camera system used in the ice hockey arena venue.

It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format, by using image recognition processing of the archived data base derived from the tripod mounted set-up camera system in the remote base station.

It is an objective of the present invention to provide views of the game not seen before by real time TV audiences during broadcasts in the prior art taken from the surface of the ice rink, as seen from the top of the instrumented ice hockey puck It is an objective of the present invention to provide views of the ice hockey game from the vantage point of the instrumented ice hockey puck.

It is an objective of the present invention to provide views of the game from the surface of the ice rink, as seen from the top of the instrumented ice hockey puck.

It is an objective of the present invention to provide views of the game not seen before by real time TV audiences during broadcasts.

It is an objective of the present invention to provide views of the game from the instrumented ice hockey puck.

It is an objective of the present invention to provide sounds of the game not heard before by real time TV audiences during broadcasts.

It is an objective of the present invention to provide sounds of the game as heard by the instrumented ice hockey puck as it slides on the ice.

It is an objective of the present invention to provide sounds heard from the ice hockey puck as it is passed from player to player and hits the net.

It is an objective of the present invention to provide an instrumented ice hockey puck, where the electronics components needed to carry out all the electronic functions of the instrumentation package assembly defined above, be packaged into the confined space of the instrumentation package assembly inside the instrumented ice hockey puck, and that the weight limitations, center of gravity and moment of inertia considerations set out for the instrumentation package assembly be adhered to.

It is an objective of the present invention to provide an instrumented ice hockey puck where coaches who are on the sidelines during training sessions and during the game can hear the spoken dialog of their team's players from on the ice hockey rink.

It is an objective of the present invention to provide an instrumented ice hockey puck where the coaches who are on the sidelines during training sessions and during the game can view details of the team's player's detailed motions on the ice hockey rink.

It is an objective of the present invention to provide an instrumented ice hockey puck where referees who are on and off the rink during games can review details of the game from the instrumented ice hockey puck by instant replay.

It is an objective of the present invention to provide an instrumented ice hockey puck equipped to capture video and sounds on the ice hockey rink from the instrumented ice hockey puck, and to wirelessly televise the captured video and sounds to a remote base station via an antenna array relay junction stationed off the playing field but within (and around) the space of the instrumented sports stadium/arena.

It is an objective of the present invention to provide an instrumented ice hockey puck comprised of two instrumentation package assemblies, protective cover plate, and buffer plate assembly, wherein each instrumentation package assembly is comprised of four TV cameras, five microphones, four wireless antenna elements, wirelessly rechargeable battery pack and supporting electronics housed inside its enclosure to wirelessly televise the captured video and sounds from said cameras and microphones to a remote base station via an antenna array relay junction stationed off the ice rink but within (and around) the space of the instrumented sports stadium/arena, wherein the functions of the instrumented ice hockey puck are under the command and control of a cameraman in the remote base station.

It is an objective of the present invention to enable the instrumentation package assembly to be mounted inside the instrumented ice hockey puck in a manner permitting its two cameras and sixteen microphones to see and hear out of the instrumented ice hockey puck, and to be nested, cradled and isolated from shock and vibration and withstand axial and tangential compression and decompression loads exerted on it during play inside the instrumented ice hockey puck by the cushioning of the encapsulation and be protected from damage during the game on the ice from dirt, water, ice and weather conditions and to provide a permanent position and nesting place for the instrumentation package assembly inside the instrumented ice hockey puck to maintain its mechanical and optical alignment, and be sized so that it can be easily loaded and assembled into the instrumented ice hockey puck and permit easy assembly and alignment of the instrumentation package assembly in the instrumented ice hockey puck.

It is an objective of the present invention to provide an instrumented ice hockey puck equipped with two rechargeable battery packs that can be wirelessly charged by magnetic induction through its electronics charging circuitry with sufficient electrical energy to power the two cameras, lenses, antennas, electronics and all the functions of the hockey puck for the duration of the ice hockey game using the same charging unit as used for instrumented baseball bases, instrumented baseball home plates, instrumented pitcher's rubbers, instrumented tennis nets, instrumented tennis net posts, instrumented soccer goals, instrumented volleyball nets, instrumented volley ball posts and instrumented ice hockey goals.

It is an objective of the present invention to enable the instrumentation package assembly to be mounted inside the instrumented ice hockey puck in a manner permitting it to maintain its mechanical and optical alignment during the game on the ice.

It is an objective of the present invention to provide a permanent position and nesting place for the instrumentation package assembly inside the instrumented ice hockey puck.

It is an objective of the present invention to provide means to permit easy assembly and alignment of the instrumentation package assembly in the instrumented ice hockey puck.

It is an objective of the present invention to provide the instrumented ice hockey pucks with the identical weight, center of gravity and moment of inertia, handling and playability qualities as conventional regulation ice hockey pucks.

It is an objective of the present invention to provide an instrumentation package assembly that is sized so that it can be easily loaded and assembled into the instrumented ice hockey puck.

It is an objective of the present invention to provide the instrumented ice hockey puck with an instrumentation package assembly that can withstand axial and tangential compression and decompression loads exerted on it during play.

It is an objective of the present invention to provide the instrumented ice hockey puck with provisions for holding the instrumentation package assembly in alignment and for cushioning and isolating the instrumentation package assembly from shocks received by the instrumented ice hockey puck during the game.

It is an objective of the present invention to make the optical windows of the instrumented ice hockey puck small to be unobtrusive to the game without vignetting the field of view of the cameras under the prevailing lighting conditions on the rink in the arena be and be easily removed and replaced wherein the optical windows can withstand heavy blows received during the game and protect the instrumentation package assembly.

It is an objective of the present invention to make the optical windows of the instrumented ice hockey puck to be easily removed and replaced.

It is an objective of the present invention that since the TV viewing audience always sees an upright stabilized picture of the scene looking in the direction of forward motion of the puck, and the surround sound processing software in the remote base station simultaneously removes the effect of the puck's spin from the sound received from the puck's twenty two microphones and properly phases the sound to the picture, the surround sound is phased and synced front to back and right to left with the upright picture scene looking in the forward direction of the puck's motion.

It is an objective of the present invention to provide an instrumented ice hockey puck with two instrumentation package assemblies, wherein each instrumentation package assembly contains four cameras, wherein six 3-D stereo camera pairs are electronically configured from the four cameras.

It is an objective of the present invention to physically configure two 3-D stereo camera pairs from a total of four cameras looking out from the top of the instrumented ice hockey puck.

It is an objective of the present invention to provide views of the game not seen before during broadcasts by real time TV audiences taken from the surface of the ice rink, as seen from the top of the instrumented ice hockey puck using six 3-D stereo camera pairs electronically configured from a total of four cameras on the top of the instrumented ice hockey puck.

It is an objective of the present invention to provide views of the game from the surface of the ice rink, as seen from the top of the instrumented ice hockey puck using the two 3-D stereo camera pairs.

It is an objective of the present invention to provide the instrumented ice hockey puck with the identical weight, balance, center of gravity and moment of inertia of the instrumented ice hockey puck by controlling the volume and location of the encapsulation material in the encapsulation's voids, thereby producing the identical handling and playability qualities as conventional regulation ice hockey pucks.

It is an objective of the present invention to provide the instrumented ice hockey puck with optical windows made small to be unobtrusive to the game without vignetting the field of view of the cameras under the prevailing lighting conditions on the rink in the arena, and be made to be easily removed and replaced, wherein the optical windows can withstand heavy blows received during the game and protect the instrumentation package assembly.

It is an objective of the present invention to provide an instrumented ice hockey puck where any combination of any two of the four cameras of each of the instrumentation package assemblies can be electronically commanded and controlled by the cameraman from the remote base station to act as 3-D stereo camera pairs thereby giving the cameraman a choice of six 3-D stereo camera pairs.

It is an objective of the present invention to provide an instrumented ice hockey puck where any combination of any two of the four cameras of each of the instrumentation package assemblies can be electronically commanded and controlled by the cameraman from the remote base station to act as 3-D stereo camera pairs thereby giving the cameraman a choice of six 3-D stereo camera pairs, thereby permitting the cameraman a choice of different interpupillary distances.

It is an objective of the present invention to increase the accuracy of the surround sound by adding metal to the encapsulating material to increase the velocity of sound and thereby decrease the wavelength of the sounds in the medium to enhance the phase difference detected between microphones from the same sound source.

Figures 2A, 2B, 2C:
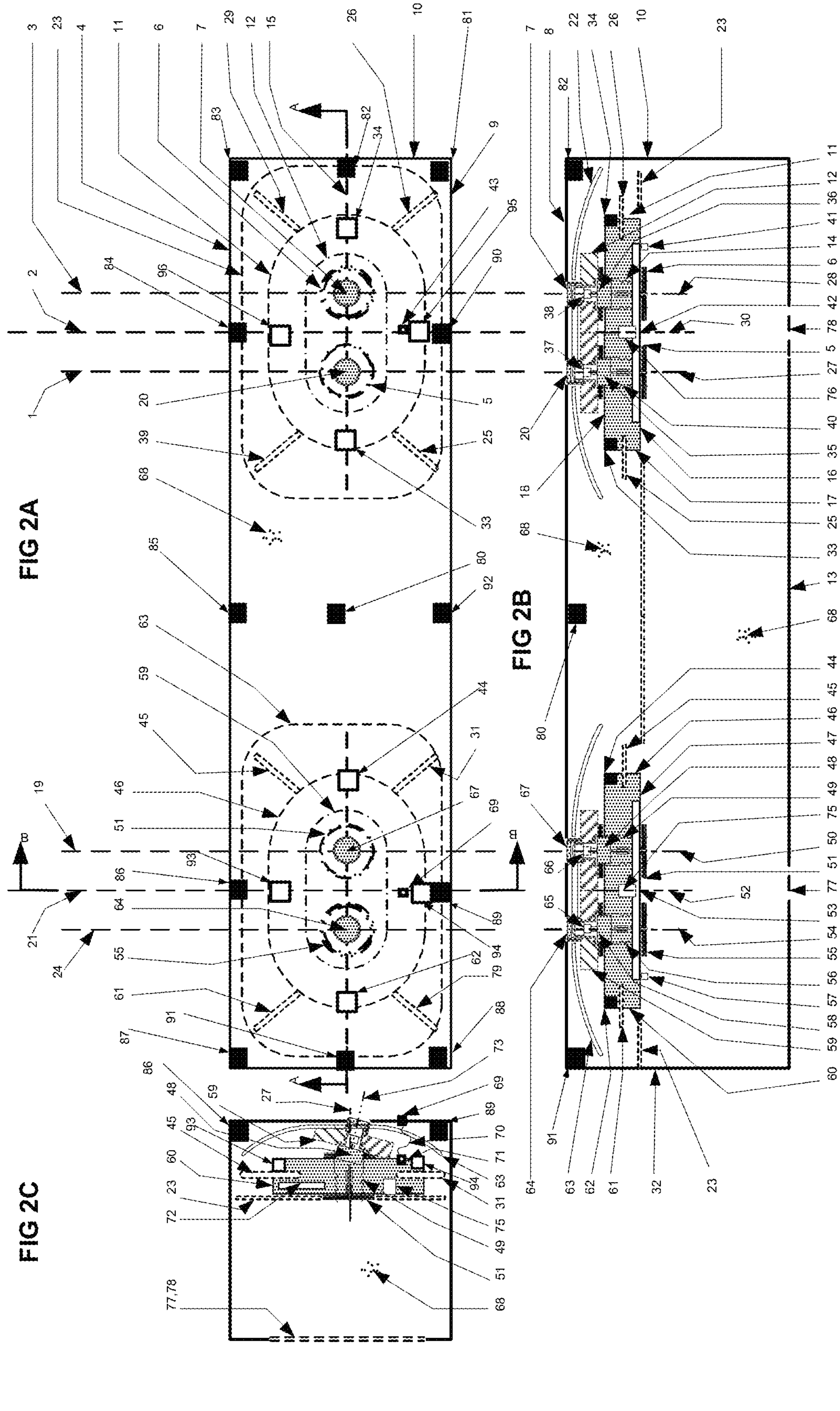
FIG. 2A shows a front view of the instrumentation module.
FIG. 2B shows a bottom view section of the instrumentation module.
FIG. 2C shows a side view section of the instrumentation module.

FIG. 2A and FIG. 2B and FIG. 2C

The detailed physical elements disclosed in the instrumentation module drawings shown in FIG. 2A and FIG. 2B and FIG. 2C are identified as follows: 1 is the y-axis of camera 35. 2 is the axis of symmetry of the instrumentation package assembly containing cameras 35 and 36. 3 is the y-axis of camera 36. 4 is the top side of the instrumentation module. 5 is the induction coil used to charge the battery pack inside the instrumentation package assembly 11. 6 is the induction coil used to charge the battery pack inside the instrumentation package assembly 11. 7 is the plane-parallel-flat optical window for camera 36. 8 is the front of the instrumentation module. 9 is the bottom side of the instrumentation module.

10 is the right side of the instrumentation module. 11 is the central hub of the instrumentation package assembly containing cameras 35 and 36. 12 is the Type XI buffer plate assembly. 13 is the rear of the instrumentation module. 14 is the bellows segment of the instrumentation package assembly element containing camera 36. 15 is the x-axis of symmetry of the instrumentation module. 16 is the bottom of the instrumentation package assembly containing cameras 35 and 36. 17 is the portion of the lower protective cover plate between the two instrumentation package assemblies 11 and 46. 18 is the top of the instrumentation package assembly 11. 19 is the y-axis of camera 48. 20 is the plane-parallel-flat optical window of camera 35. 21 is the y-axis of the instrumentation package assembly 46. 22 is the upper protective cover plate for instrumentation package assembly 11. 23 is a lower protective cover plate for instrumentation package assembly 11. 24 is the y-axis of camera 58. 25 is a wireless radio antenna element. 26 is a wireless radio antenna element. 27 is normal to the front 8 of the instrumentation module and is the optical axis direction of the cameras 35, 36, and 48 and 58 before they are tilted. 28 is the z-axis of the camera 36. 29 is a wireless radio antenna. 30 is the z-axis of the instrumentation package assembly 11. 31 is a wireless radio antenna. 32 is the left side of the instrumentation module. 33 is a microphone. 34 is a microphone. 35 is a camera. 36 is a camera. 37 is a camera lens. 38 is a camera lens. 39 is a wireless radio antenna element. 40 is the bellows segment of the instrumentation package assembly element containing camera 35. 41 is the gas valve. 42 is an access lid heat sink. 43 is the microphone. 44 is the microphone. 45 is a wireless radio antenna. 46 is an instrumentation package assembly that contains cameras 48 and 58. 47 is the bottom of the instrumentation package assembly 46. 48 is a camera. 49 is the bellows segment of the instrumentation package assembly element for camera 48. 50 is the optical axis of camera 48. 51 is the induction coil used to charge the battery pack 72. 52 is the z-axis of the instrumentation package assembly 46. 53 is an access lid heat sink. 54 is the optical axis of camera 58. 55 is the induction coil used to charge the battery pack 72. 56 is the bellows segment of the instrumentation package assembly element containing camera 58. 57 is the gas valve. 58 is a camera. 59 is the Type XI buffer plate assembly. 60 is the central hub of the instrumentation package assembly containing the battery pack 72 and cameras 48 and 58. 61 is a wireless radio antenna. 62 is a microphone. 63 is the upper protective cover plate. 64 is the plane-parallel-flat optical window for camera 58. 65 is a camera lens. 66 is a camera lens. 67 is the plane-parallel-flat optical window for camera 48. 68 is the molding and encapsulating material that fills the instrumentation module. 69 is a microphone that is flush with the front surface 8 of the instrumentation module. 70 is the microphone cable that connects the microphone 69 to the microphone connector 71. 71 is the microphone connector. 72 is the battery pack for instrumentation package assembly 46. 73 is the optical axis direction of the cameras 35, 36, and 48 and 58 after they are tilted together. 74 (not shown). 75 is the fiber optics cable/copper cable connector for instrumentation package assembly 46. 76 is the fiber optics cable/copper cable connector for instrumentation package assembly 11. 77 is the slotted opening in the instrumentation module for the fiber optics cable/copper cable access. 78 is the slotted opening in the instrumentation module for the fiber optics cable/copper cable access. 79 is a wireless radio antenna. 80 is a microphone. 81 is a microphone. 82 is a microphone. 83 is a microphone. 84 is a microphone. 85 is a microphone. 86 is a microphone. 87 is a microphone. 88 is a microphone. 89 is a microphone. 90 is a microphone. 91 is a microphone. 92 is a microphone. 93 is a microphone. 94 is a microphone. 95 is a microphone. 96 is a microphone.

FIG. 2A shows a front view of the instrumentation module.

FIG. 2B shows a bottom view section of the instrumentation module.

FIG. 2C shows a side view section of the instrumentation module.

The present invention contemplates that instrumented sports paraphernalia like soccer goals and ice hockey goals, that are in play on the playing field during professional league games and player training sessions, are instrumented with cameras and microphones enabling them to acquire pictures and sounds of the players from amongst the players on the playing field. The sports paraphernalia are equipped with instrumentation modules which carry the cameras and microphones. The instrumentation modules can both televise and stream the video and audio from the cameras and microphones.

The instrumentation modules carry transceivers and antennas capable of transmitting radio signals encoded with the picture and sound information to a remote base station via an antenna array relay junction located in the sports stadium. The remote base station processes and broadcasts these signals to the TV viewing audience.

Additionally, referring to drawings FIG. 2A and FIG. 2B and FIG. 2C, the instrumentation module can wirelessly and autonomously stream video and audio onto the internet. The instrumentation module contains two instrumentation package assemblies 11 and 46 which are each comprised of two instrumentation package assembly elements 49, 56 and 40, 14 respectively. Each of the instrumentation package assembly elements 49, 56, 40 and 14 contains an electronics package unit. The electronics package units channel the video from cameras 58, 48, 35 and 13 to radio antennas 45, 61, 79, 31, and 39, 25, 26 and 29 from which the signals are transmitted wirelessly to a mobile broadband tower for streaming onto the internet. The electronics package unit also channels the audio from 23 microphones 69, 43, 62, 44, 33, 34, 80, 81, 82, 83, 84, 85, 86, 87, 91, 88, 89, 90, 91, 92, 93, 94, 95, 96 to radio antennas 45, 61, 79, 31, and 39, 25, 26 and 29 from which the signals are transmitted wirelessly to a mobile broadband tower for streaming onto the internet. Besides being equipped to stream wirelessly, the electronics package units can stream directly onto the internet via their fiber optics cable/copper cable connectors 75 and 76 by connecting 75 and 76 to internet cable buried beneath the playing field/rink. The electronic package unit electronics are disclosed in FIG. 11A. The mobile broadband tower is shown in FIG. 11B.

Figure 11A:
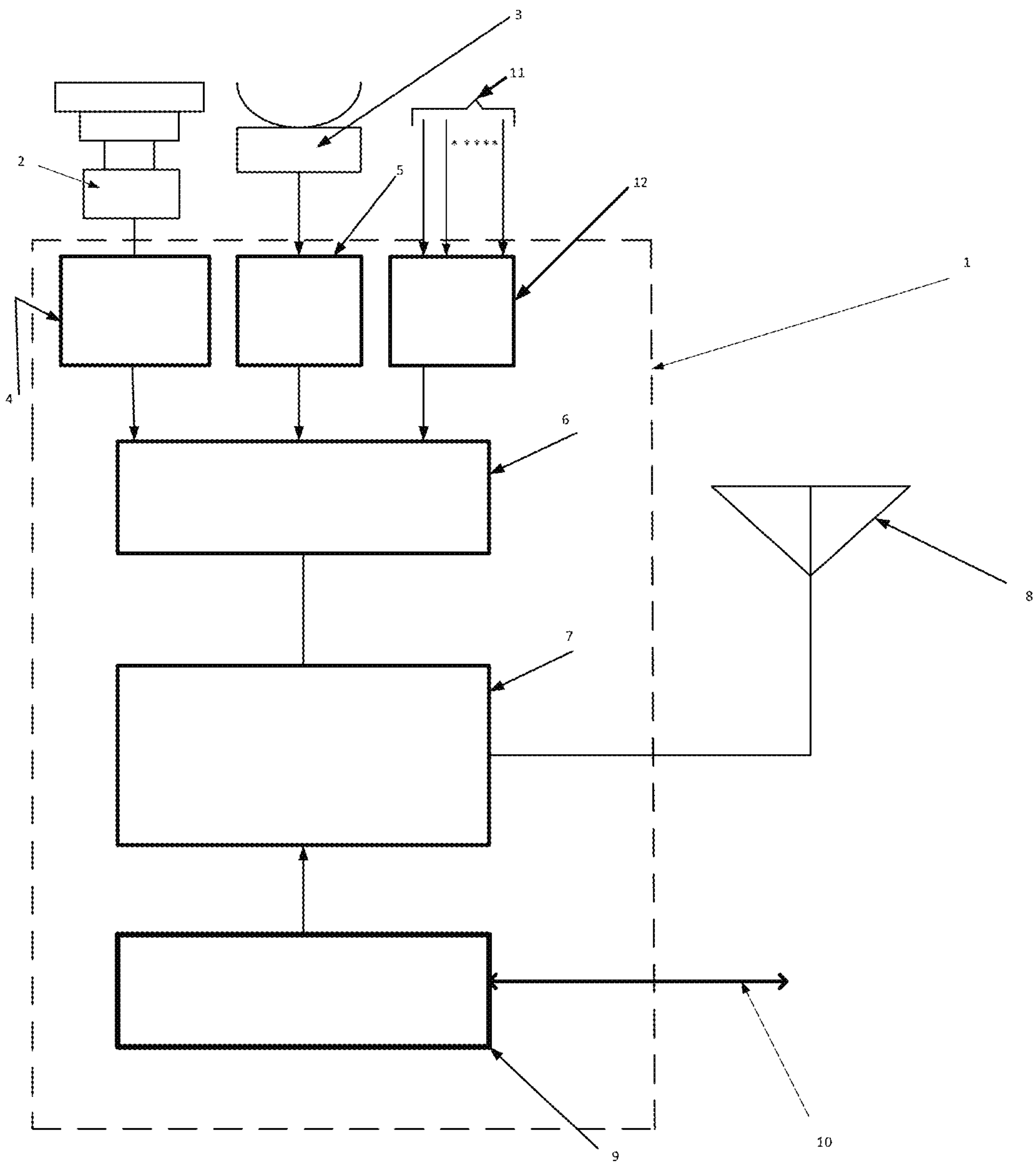
FIG. 11A is the electronics system block diagram for streaming soccer games, ice hockey games, and baseball games on the internet from instrumented sports paraphernalia like instrumented soccer goals, instrumented ice hockey goals, instrumented baseball bases, instrumented baseball home plates and instrumented baseball pitcher's rubbers.
Figure 11B:
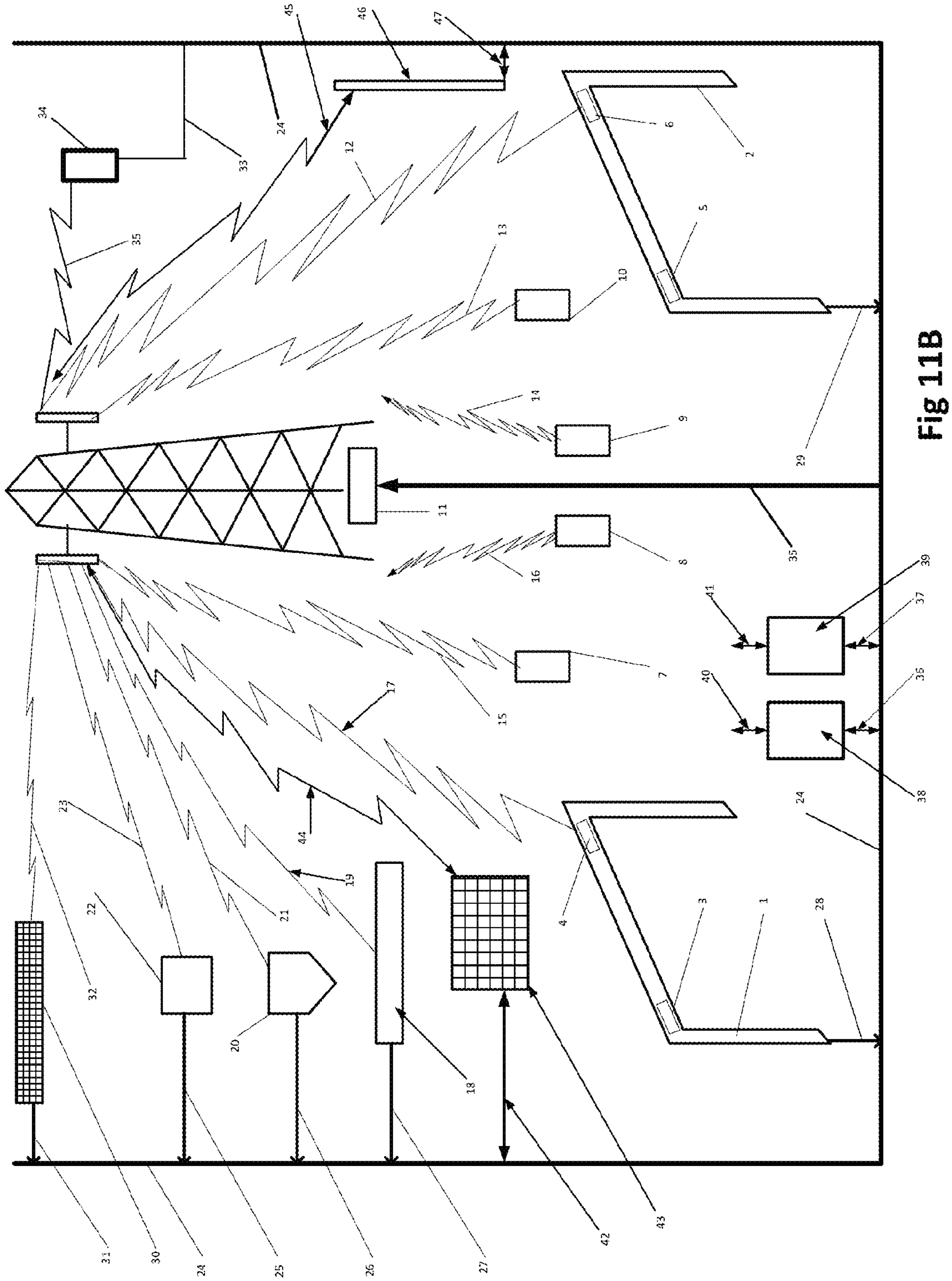
FIG. 11B is the wireless topography block diagram for streaming audio and video onto the internet from instrumented soccer goals, instrumented ice hockey goals, instrumented baseball bases, instrumented baseball home plates and instrumented baseball pitcher's rubbers.

FIG. 11B shows the architecture of the streaming system that conveys high definition video and multi-dimensional audio from the sports paraphernalia to the internet.

Referring to the preferred embodiment disclosed in FIG. 2A and FIG. 2B and FIG. 2C, an instrumentation module equipped for bi-directional wireless radio wave 3-D stereo television and/or bi-directional fiber optics cable/copper cable 3-D stereo television operation, employing single point non-diversity communication techniques and/or multi point diversity communication techniques, is specified. The instrumentation module is equipped to be enabled, commanded and controlled by administrative data conveyed simultaneously and bi-directionally from/to the remote base station utilizing bi-directional wireless radio wave and/or bi-directional fiber optics cable/copper cable communication. The remote base station and the antenna array relay junction are specified in FIG. 7 and FIG. 8 of the present invention.

The instrumentation modules carries a wirelessly rechargeable battery pack, RF antennas, and all the cameras, microphones and bi-directional electronics necessary to autonomously serve to televise sports events from the playing field/ice rink where the sports paraphernalia like soccer goals and ice hockey goals that are instrumented with the instrumentation modules are located. In venues where electrical power and bi-directional fiber optics/copper cable communication links are available and buried beneath the playing field/rink, the instrumentation modules are equipped to hook into and use the power and bi-directionally communicate their televised signals and control signals over the link.

Figure 7:
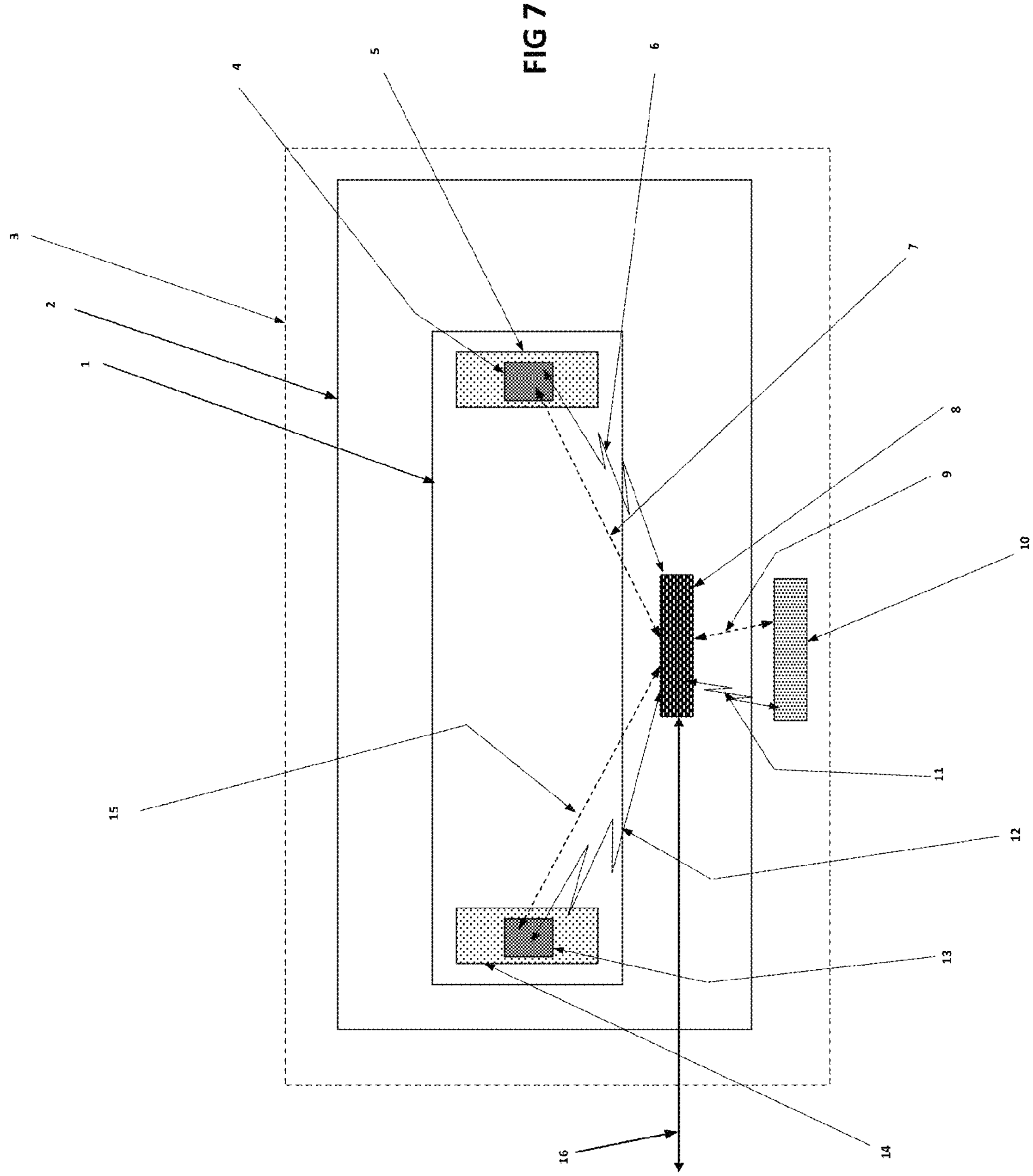
FIG. 7 is a top view of a typical soccer instrumented sports stadium that has been configured and equipped for use with two instrumented soccer goals, for televising games from on the playing field, and for streaming games from on the playing field, using bi-directional wireless radio wave communication links and/or bi-directional fiber optics cable and bi-directional high speed copper network communications cable links.

Soccer goals and ice hockey goals are examples of sports paraphernalia that are located on the playing field and rinks during a game. Conventional soccer goals and ice hockey goals are traditionally considered to be sport's paraphernalia. The instrumentation modules are used to instrument the soccer goals and ice hockey goals to televise the games. FIG. 7 is a top view of a typical soccer instrumented sports stadium that has been configured and equipped for use with two instrumented soccer goals located at either end of the field for televising games from on the playing field, using bi-directional wireless radio wave communication links and/or bi-directional fiber optics cable and bi-directional high speed copper network communications cable links. Each of the soccer goals shown is instrumented with instrumentation modules. The instrumentation modules are positioned at either end of the horizontal crossbar member of the soccer goal. The instrumentation modules for the instrumented soccer goals can be manufactured in a variety of different sizes. The bottom 13 of the instrumentation module is shaped/formed/molded to conform with the goal surfaces it is mounted to/or inside of.

FIG. 8 is a top view of a typical ice hockey instrumented sports stadium/arena that has been configured and equipped for use with two instrumented ice hockey goals located at either end of the rink and an instrumented ice hockey puck, for televising games from on the rink from the ice hockey goals and pucks. Each of the ice hockey goals shown is instrumented with two instrumentation modules. The instrumentation modules are positioned at either end of the horizontal crossbar member of the ice hockey goal. The instrumentation modules for the instrumented ice hockey goals can be manufactured in a variety of different lengths.

The instrumentation module contains two instrumentation package assemblies 11 and 46 inside it.

Instrumentation package assembly 11 contains two SD/HD CCD TV cameras 35 and 36. Cameras 35 and 36 form a 3-D stereo camera pair. Instrumentation package assembly 46 contains two SD/HD CCD TV cameras 48 and 58. Cameras 48 and 58 form a 3-D stereo camera pair. Each of the two 3-D stereo camera pairs comprised of cameras 35, 36 and cameras 48 and 58 respectively are tilted downward slightly toward the playing field/rink. Cameras 35, 36 and cameras 48 and 58 respectively are tilted downward by the same tilt angle in order to capture the action on the field/rink occurring in the vicinity near the instrumented soccer goals/instrumented ice hockey goals. The tilt angle is the angular difference between 73 and 27. The two instrumentation package assemblies 11 and 46 are identical to one another, and are disclosed in FIG. 20A and FIG. 20B and FIG. 20C.

Figure 6:
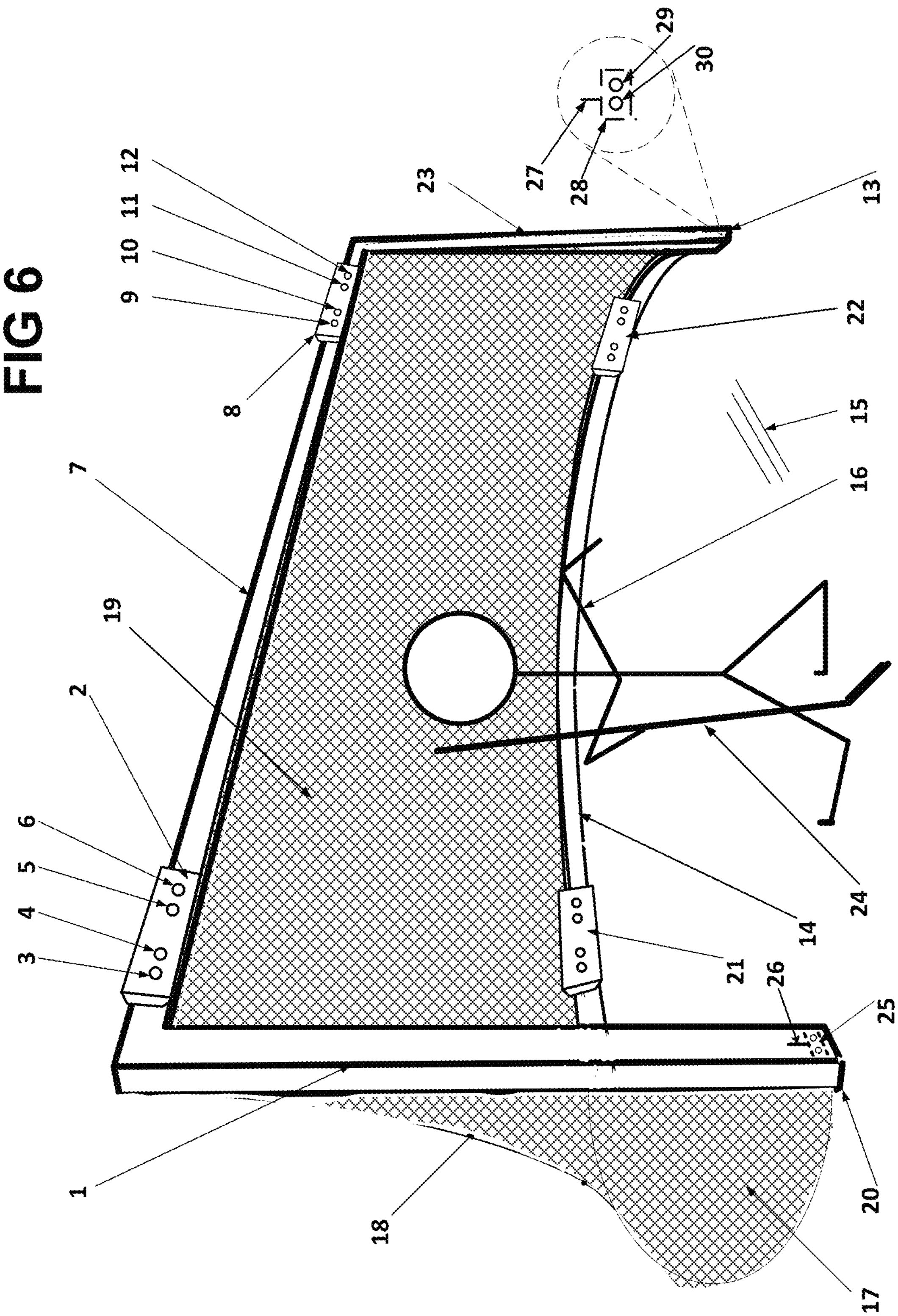
FIG. 6 shows a view of an instrumented ice hockey goal with five externally mounted four-camera instrumentation modules and two internally mounted two-camera instrumentation modules.

Typically two or more instrumentation modules are made to mount externally directly on to the front of the top horizontal crossbar member of the soccer goal net. FIG. 3 shows two instrumentation modules that are mounted directly on to the front of the top horizontal crossbar member of the soccer goal net. Typically also, two or more instrumentation modules are made to mount directly on to the front of the top horizontal crossbar member of the ice hockey goal net. FIG. 6 shows two instrumentation modules that are mounted directly on to the front of the top horizontal crossbar member of the ice hockey goal net. An instrumentation module is typically placed at either end of the horizontal crossbar member to give the widest coverage of the playing field/rink without being obscured by the goal keeper.

Figure 5:
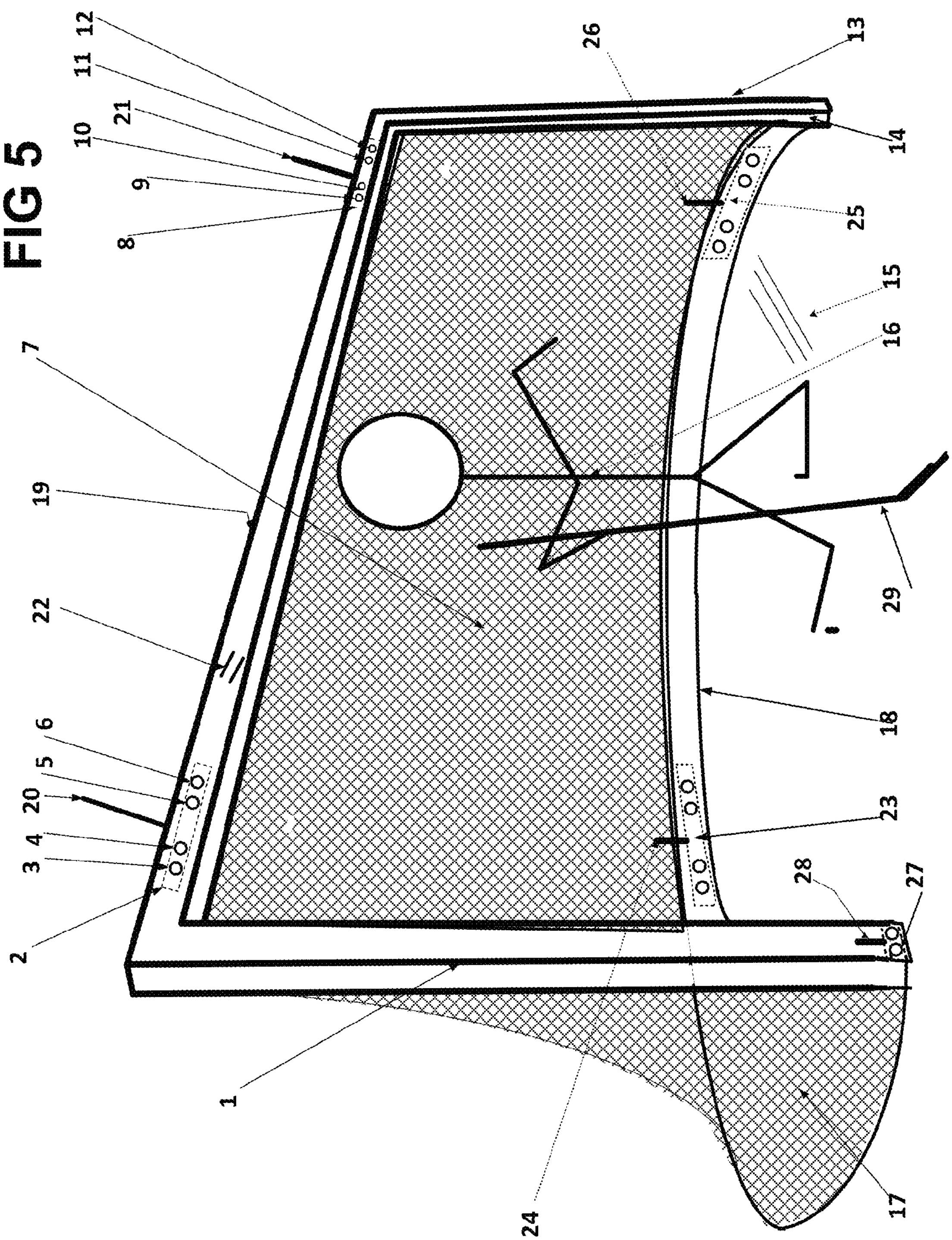
FIG. 5 shows a view of an instrumented ice hockey goal with five internally mounted four-camera instrumentation modules and two internally mounted two-camera instrumentation modules.

Typically two or more instrumentation modules are made to mount directly inside the tubular structure of the top horizontal crossbar member of the soccer goal net. FIG. 4 shows two instrumentation modules mounted directly inside the tubular structure of the top horizontal crossbar member of the soccer goal net. Typically also, two or more instrumentation modules are made to mount directly inside the tubular structure of the top horizontal crossbar member of the ice hockey goal net. FIG. 5 shows two instrumentation modules mounted directly inside the tubular structure of the top horizontal crossbar member of the ice hockey goal net. An instrumentation module is typically placed at either end of the horizontal crossbar member to give the widest coverage of the playing field/rink without being obscured by the goal keeper.

Referring to drawings FIG. 3 and FIG. 4 and FIG. 5 and FIG. 6, the present invention contemplates instrumented soccer goals and instrumented ice hockey goals, which when stationed on any playing field/rink at their traditional locations can both wirelessly and/or by using fiber optics/copper cable connectivity, autonomously televise soccer and ice hockey games under the command and control of the remote base station. The remote base station is disclosed in FIG. 30A and FIG. 30B, and FIG. 31A and FIG. 31B, and FIG. 32A and FIG. 32B, and FIG. 35A, and FIG. 35B, and FIG. 35C, and FIG. 7 and FIG. 8 of the present invention.

Preferred embodiments specifying the fiber optics/copper cable transmission link are disclosed in FIG. 31A and FIG. 31B, and FIG. 32A and FIG. 32B, FIG. 35B, and FIG. 35C.

Figure 30A:
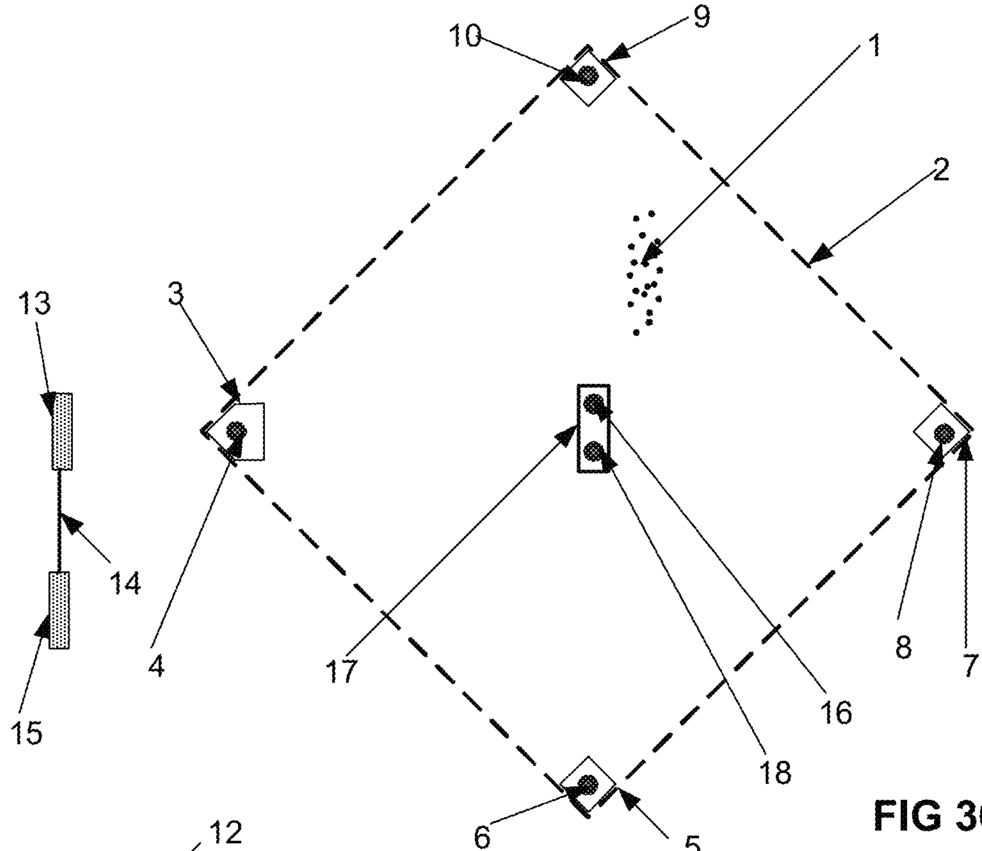
FIG. 30A is a diagram of the top view of a typical instrumented baseball stadium equipped to wirelessly televise baseball games from instrumented sports paraphernalia on the baseball playing field.
Figure 30B:
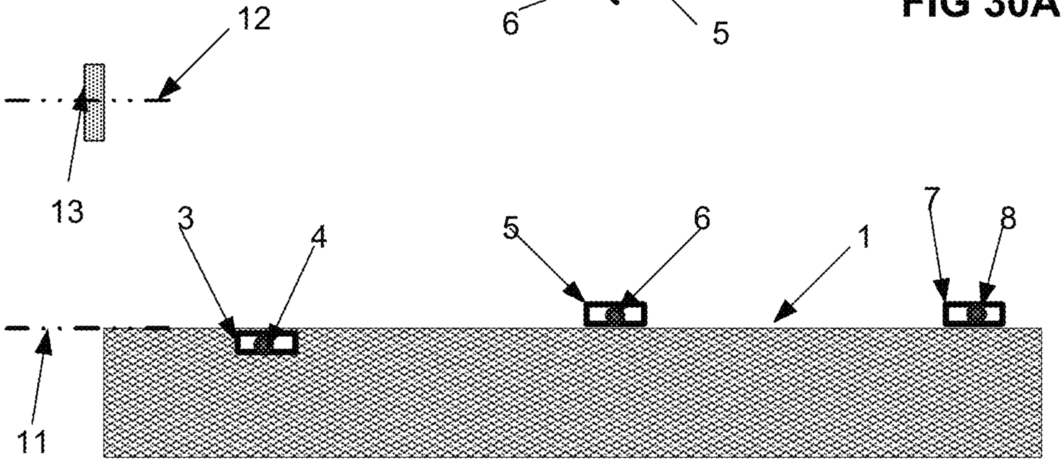
FIG. 30B is a diagram of the side view of a typical instrumented baseball stadium equipped to wirelessly televise baseball games from instrumented sports paraphernalia on the baseball playing field.
Figure 35A:
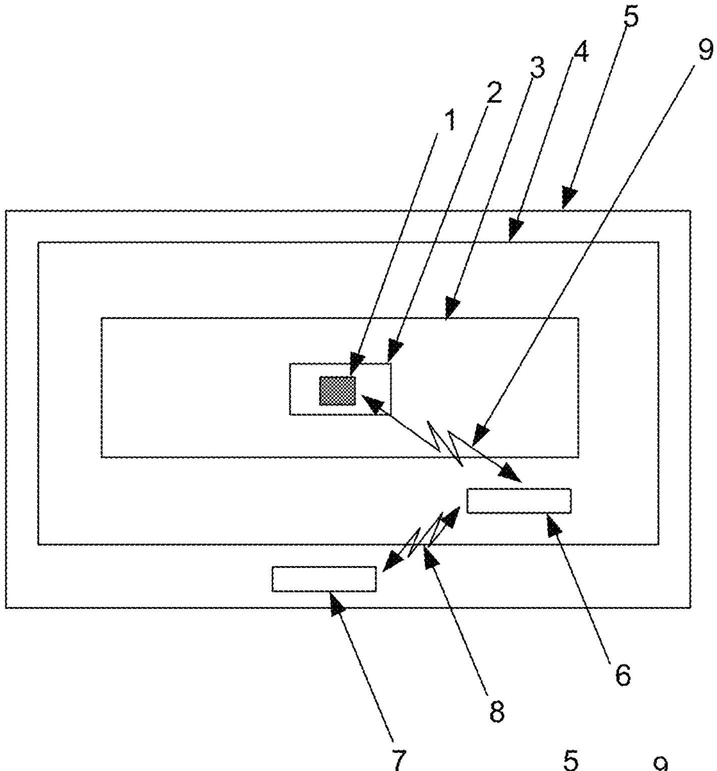
FIG. 35A is a top view of a typical instrumented sports stadium having been configured for use with both static and dynamic instrumented sports paraphernalia, for televising games from the playing field using wireless radio wave communication links.
Figure 35B:
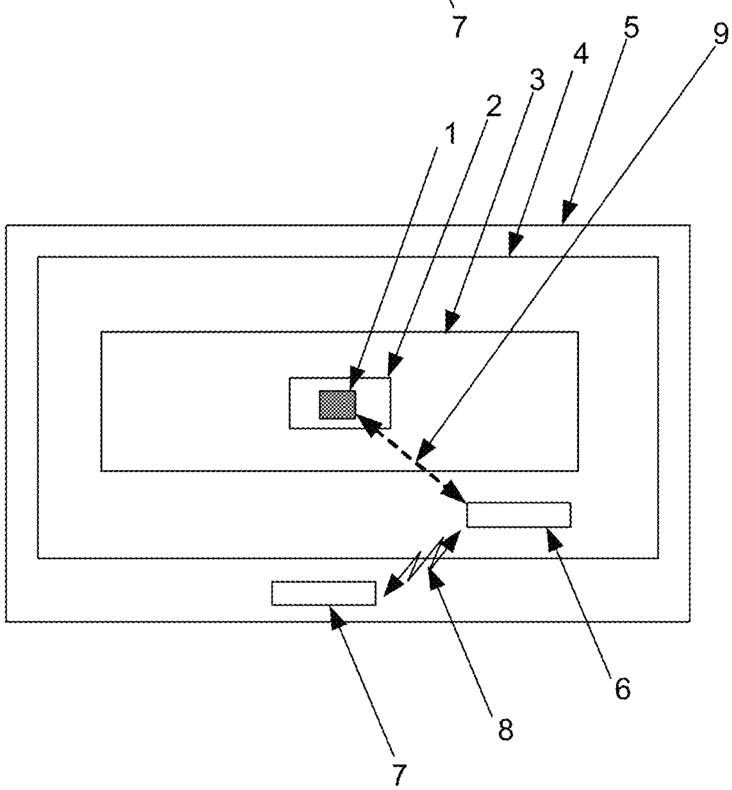
FIG. 35B is a top view of a typical instrumented sports stadium having been configured and equipped for use with static instrumented sports paraphernalia, for televising games from the playing field using fiber optics cable and bi-directional high speed copper network cable communication links.
Figure 35C:
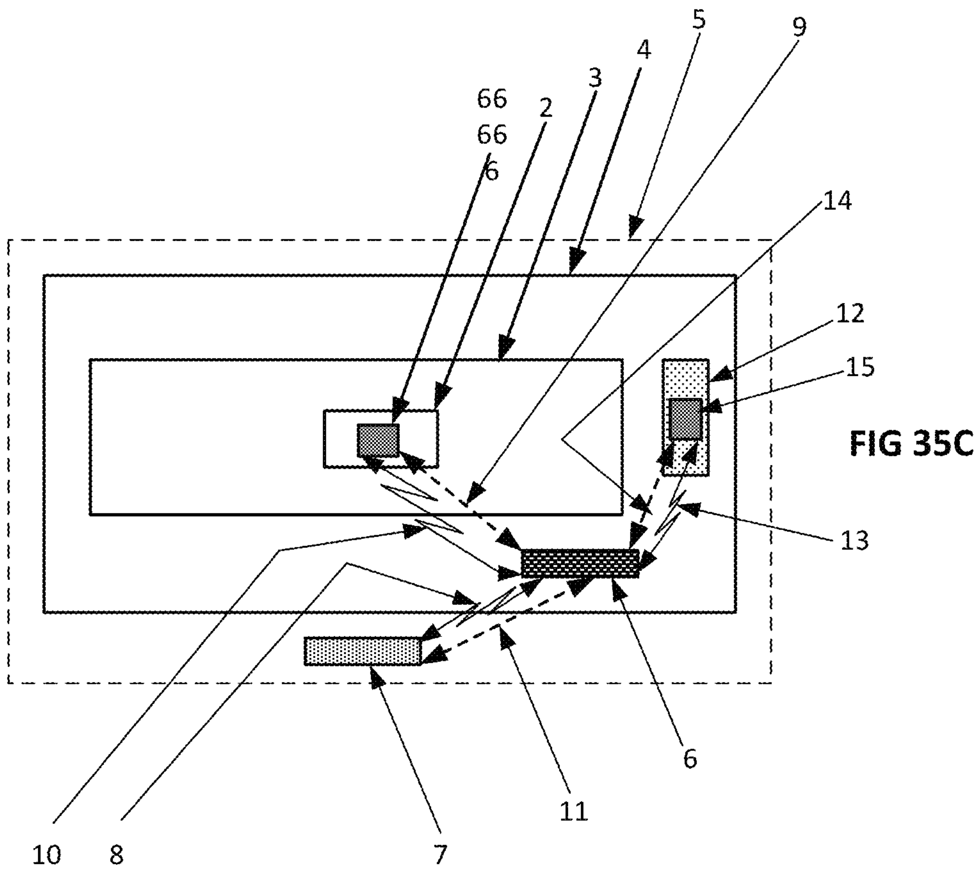
FIG. 35C is a top view of a typical instrumented sports stadium that has been configured and equipped for use with both static and dynamic instrumented sports paraphernalia, for televising games from both on the playing field, and off the playing field, using bi-directional wireless radio wave communication links and/or bi-directional fiber optics cable and bi-directional high speed copper network communications cable links.

The preferred embodiment specifying the wireless radio transmission link is disclosed in FIG. 30A and FIG. 30B, and FIG. 35C.

Figure 20A:
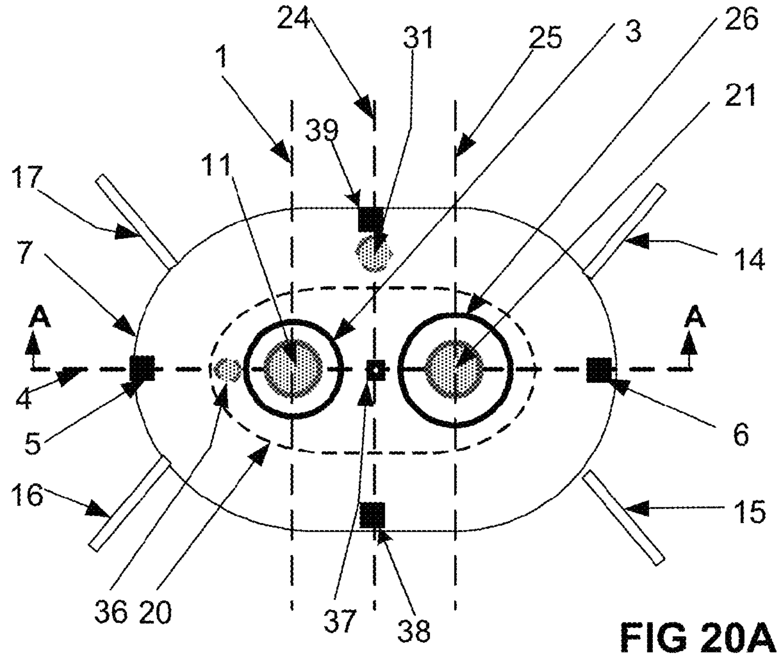
FIG. 20A is a top view of the two-camera and fiber optics/copper instrumentation package assembly.

The instrumentation modules is instrumented with two identical instrumentation package assemblies disclosed in FIG. 20A and FIG. 30C. Details of instrumentation package assembly elements are shown in FIG. 19D.

Each instrumentation module provides the TV viewing audience with vantage points from two separate 3-D stereo camera pairs whose instrumentation package assemblies 11 and 46 are spaced typically for most venues approximately ten to fourteen inches apart. If one of the 3-D stereo camera pairs is fouled by dirt and debris, then the other ones will still be available to televise the event.

Figure 31A:
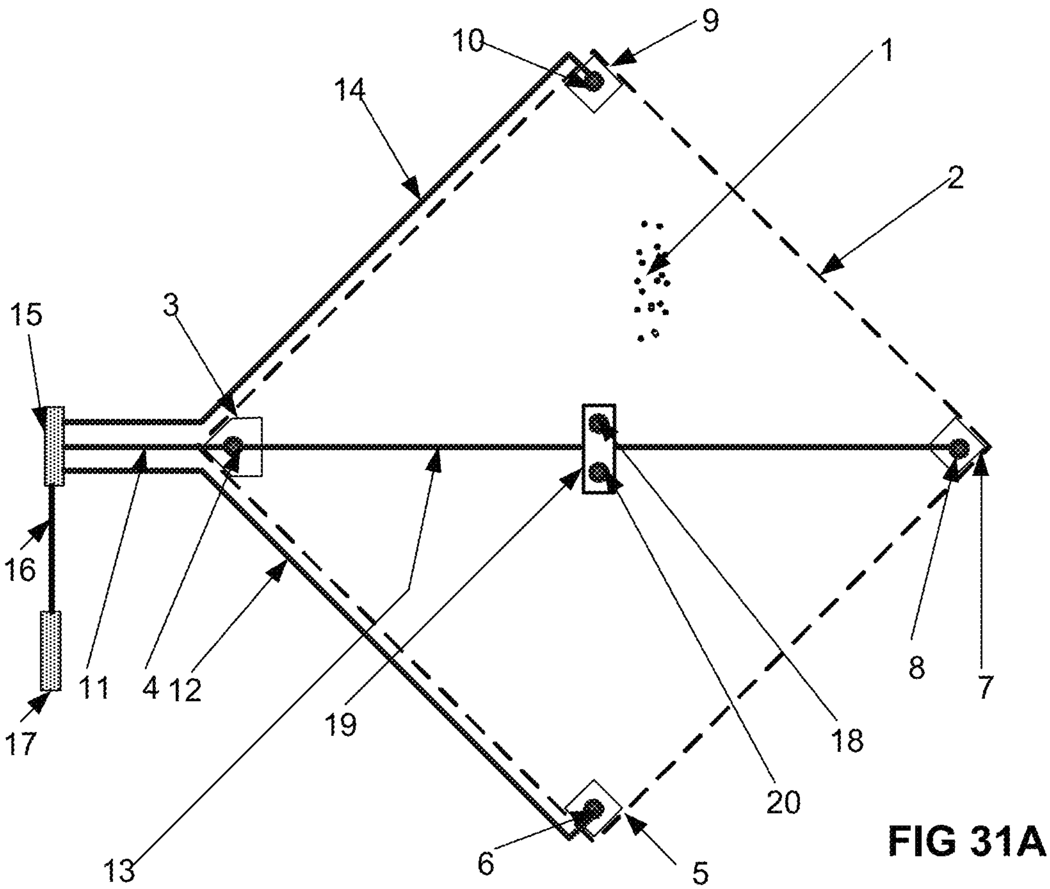
FIG. 31A is a diagram of the top view of a typical instrumented baseball stadium equipped to televise baseball games via fiber optics cable/copper cable from instrumented sports paraphernalia on the baseball playing field.
Figure 31B:
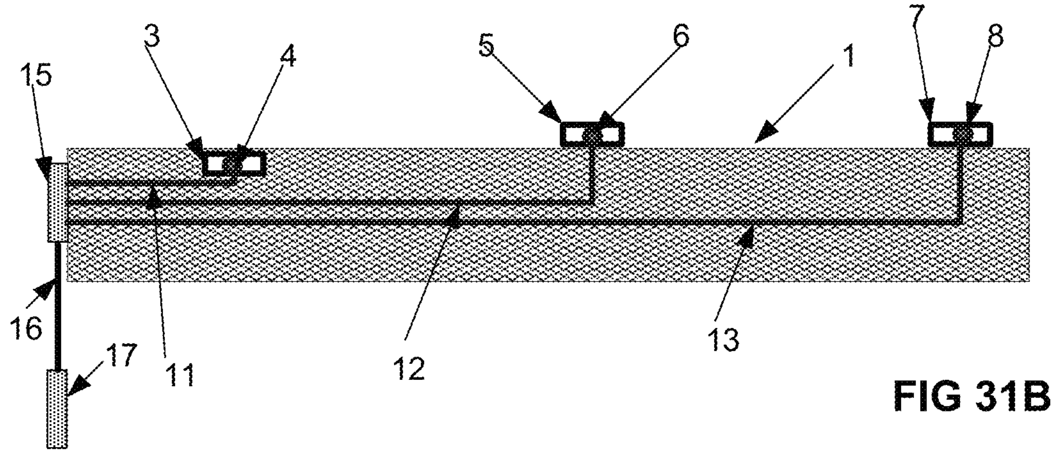
FIG. 31B is a diagram of the side view of a typical instrumented baseball stadium equipped to televise baseball games via fiber optics cable from instrumented sports paraphernalia on the baseball playing field.

The fiber optics/copper cable transmission link is disclosed in the preferred embodiment shown in FIG. 31A and FIG. 31B. The fiber optics/copper cable transmission link is also disclosed in two another preferred embodiments shown in FIG. 32A and FIG. 32B, and FIG. 35C.

Figure 20B:
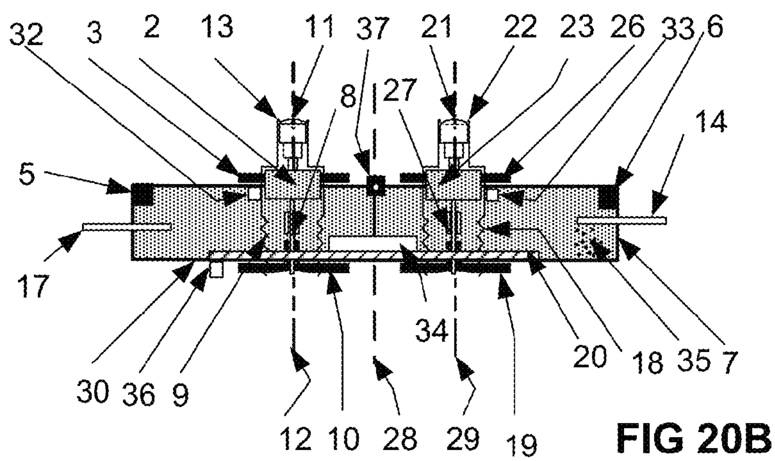
FIG. 20B is a side view of the two-camera wireless instrumentation package assembly.
Figure 20C:
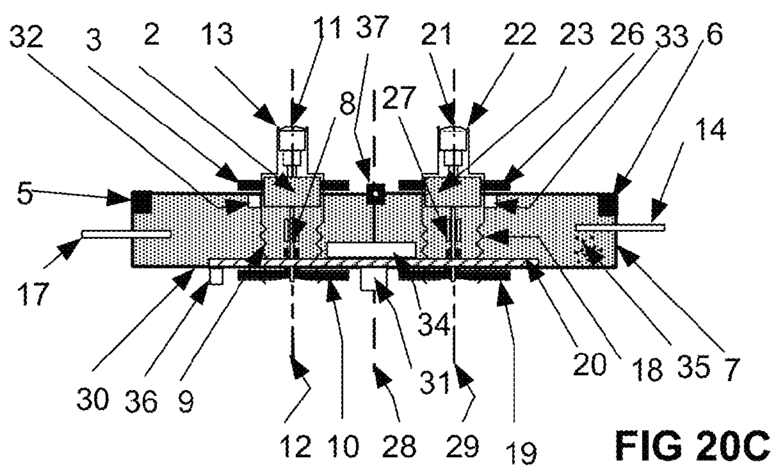
FIG. 20C is a side view of the two-camera wireless and fiber optics/copper cable instrumentation package assembly.

The instrumentation modules each employ two instrumentation package assemblies that are substantially identical to the instrumentation package assembly shown in FIG. 20A and FIG. 20B and FIG. 20C. Each of the instrumentation package assemblies uses the Type XI buffer plate assembly shown in FIG. 13ZA and FIG. 13ZB and FIG. 13ZC. Details of the instrumentation package assembly elements are shown in FIG. 19D.

It is understood that as the state of the art in TV camera technology advances, there will be other better TV cameras that use other than CCD technology. The present invention will work equally well with them as they become available.

Therefore, the present invention uses CCD TV cameras as an example of TV cameras that may be used simply because they are the best that today's technology offers, and is not confined only to their use now and in the future.

Referring to the disclosed instrumentation module shown in FIG. 2A and FIG. 2B and FIG. 2C, the instrumentation modules has two instrumentation package assemblies 11 and 46 mounted inside it. Details of buffer plate assemblies 59 and 36 are shown in FIG. 13ZA and FIG. 13ZB and FIG. 13ZC. Except for the optical windows 64, 67, 20 and 7, the outer appearance of the instrumentation module appears flat. The color of the instrumentation module is made to match the color of the horizontal crossbar member to which it is externally mounted, to minimize its presence and conspicuousness to the players and to the spectators. Except for the four small inconspicuous optical windows 7, 20, 67 and 64 on the front 8, both the instrumented soccer goal and the instrumented ice hockey goal have the same outward appearance as their conventional regulation counterparts as seen by the player's and spectators so as not to pose any distraction to the game.

Each of the instrumentation package assemblies 11 and 46 carries two CCD sensor arrayed cameras and three microphones. The third microphone is mounted above each of the instrumentation package assemblies through 8 of the instrumentation module. Each of the microphones in 8 is connected by an electrical cable to a cable connector on each of the instrumentation package assemblies. The two cameras in each of the instrumentation package assemblies are arranged side by side and form a 3-D stereo camera pair. The two cameras are separated by an interpupillary distance.

The linear distance separation of the optical axes of the two camera lenses that make up a stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

It is understood that other alternative interpupillary distances may be used to produce other alternative 3-D effects. For example, larger interpupillary distance will produce more striking 3-D effects.

The two cameras 35 and 36 that form one of the 3-D stereo camera pairs have optical windows 20 and 7 respectively. The interpupillary distance is the distance between the two camera's 35 and 36 optical axes. The cameras 35 and 36 that form the 3-D stereo camera pair, 35 and 36 look forward from the front of the instrumentation module along their common line of sight 73 which is tilted relative to the normal 27 to the top 8 of the instrumentation module.

The two cameras 48 and 58 that form one of the 3-D stereo camera pairs have optical windows 67 and 64 respectively. The interpupillary distance is the distance between the two camera's 48 and 58 optical axes 54 and 50. The cameras 48 and 58 that form the 3-D stereo camera pair 48 and 58 look outward from surface 8 of the instrumentation module along their common line of sight 73 which is tilted relative to the normal 27 to 8 of the instrumentation module.

The instrumentation module has six sides 8, 13, 4, 9, 10 and 32. When mounted externally on the crossbar member of the soccer goal as shown in FIG. 3; side 8 faces forward toward the playing field; side 13 is in contact with and faces the horizontal crossbar; 4 faces upward toward the sky; 9 faces downward toward the ground; 10 faces the right side of the goal; and 32 faces the left side of the goal. 4 sits horizontal to the soccer playing field being attached to its horizontal crossbar member of the soccer goal. The instrumentation module can be mounted to 7 using a variety of simple methods. Preferred methods are ones where the instrumentation module can be easily removed and replaced for routine maintenance, testing and repairs. For example, the instrumentation module can be positioned and held to 7 using ordinary plastic zip ties which can be easily cut; or the instrumentation module can be screwed to 7 with removable fasteners.

The instrumentation module has six sides 8, 13, 4, 9, 10 and 32. When mounted externally on the crossbar member of the ice hockey goal as shown in FIG. 6; side 8 faces forward toward the ice rink; side 13 is in contact with and faces the horizontal crossbar; 4 faces upward toward the sky; 9 faces downward toward the ice; 10 faces the right side of the goal; and 32 faces the left side of the goal. 4 sits horizontal to the ice rink being attached to its horizontal crossbar member of the ice hockey goal. The instrumentation module can be mounted to 7 using a variety of simple methods. Preferred methods are ones where the instrumentation module can be easily removed and replaced for routine maintenance, testing and repairs. For example, the instrumentation module can be positioned and held to 7 using ordinary plastic zip ties which can be easily cut; or the instrumentation module can be screwed to 7 with removable fasteners.

The instrumentation module has six sides 8, 13, 4, 9, 10 and 32. When mounted internally inside the crossbar member of the soccer goal as shown in FIG. 4; side 8 faces forward toward the playing field; side 13 is in contact with and faces the horizontal crossbar; 4 faces upward toward the sky; 9 faces downward toward the ground; 10 faces the right side of the goal; and 32 faces the left side of the goal. 4 sits horizontal to the soccer playing field being inside the horizontal crossbar member of the soccer goal.

The instrumentation module has six sides 8, 13, 4, 9, 10 and 32. When mounted internally inside the crossbar member of the ice hockey goal as shown in FIG. 5; side 8 faces forward toward the ice rink; side 13 is in contact with and faces the horizontal crossbar; 4 faces upward toward the sky; 9 faces downward toward the ice; 10 faces the right side of the goal; and 32 faces the left side of the goal. 4 sits horizontal to the ice rink being inside the horizontal crossbar member of the ice hockey goal.

Referring to FIG. 4, the instrumentation module is loaded into the tubular structure of the soccer goal's horizontal crossbar member 7 through a rectangular aperture 2. 2 is cut into the face 20 of the goal's horizontal crossbar member. The dimensions of the aperture are machined to match the dimensions of the instrumentation module. The instrumentation module is loaded into the aperture and nested inside the tubular structure with the plane of its optical windows flush with face 22 of the goal's horizontal crossbar member.

The antennas 20 and 21 are mounted to the top of 7 and are pointed skyward. The purpose of antennas 20 and 21 is to both bi-directionally transmit and receive control signals between the instrumentation module's and the antenna array relay junction in the sports stadium/arena, and transmit TV signals from the instrumentation module's to the antenna array relay junction in the sports stadium/arena. The antennas 20 and 21 are necessary whenever the instrumentation modules are mounted inside the horizontal crossbar member's 7 metal tubing because the metal tubing interferes with the radiation pattern of the antennas within the instrumentation modules and prevents them from transmitting. The antennas 20 and 21 are hooked up to the instrumentation modules via the instrumentation module's copper cable connectors. If electrical power is available on the playing field, its cabled wiring is routed up from the ground through the metal tubular structure of the goals and into the horizontal crossbar member of the goal and connected to the instrumentation modules using the copper cable connectors. If a bi-directional fiber optics/copper cable communications network is available on the playing field, its wiring is routed up from the ground through the goal's metal tubing structure into the horizontal crossbar member of the goal 7 and connected to the instrumentation module using the instrumentation module's fiber optics/copper cable connector.

Referring to FIG. 5, the instrumentation module is loaded into the tubular structure of the ice hockey goal's horizontal crossbar member 7 through a rectangular aperture 2. 2 is cut into the face 21 of the goal's horizontal crossbar member. The dimensions of the aperture are machined to match the dimensions of the instrumentation module. The instrumentation module is loaded into the aperture and nested inside the tubular structure with the plane of its optical windows flush with face 21 of the goal's horizontal crossbar member.

The antennas 20 and 21 are mounted to the top of 7 and are pointed skyward. The purpose of antennas 20 and 21 is to both bi-directionally transmit and receive control signals between the instrumentation module's and the antenna array relay junction in the sports stadium/arena, and transmit TV signals from the instrumentation module's to the antenna array relay junction in the sports stadium/arena. The antennas 20 and 21 are necessary whenever the instrumentation modules are mounted inside the horizontal crossbar member's 7 metal tubing because the metal tubing interferes with the radiation pattern of the antennas within the instrumentation modules and prevents them from transmitting. The antennas 20 and 21 are hooked up to the instrumentation modules via the instrumentation module's copper cable connectors. If electrical power is available on the playing field, its cabled wiring is routed up from the ground through the metal tubular structure of the goals and into the horizontal crossbar member of the goal and connected to the instrumentation modules using the copper cable connectors. If a bi-directional fiber optics/copper cable communications network is available on the playing field, its wiring is routed up from the ground through the goal's metal tubing structure into the horizontal crossbar member of the goal 7 and connected to the instrumentation module using the instrumentation module's fiber optics/copper cable connector.

Referring to FIG. 3 and FIG. 4 and FIG. 5 and FIG. 6 and FIG. 7 and FIG. 8, in a preferred embodiment a fiber optics cable/copper cable bi-directional communications link is buried underneath the ground of the playing field/rink. In addition to being a bi-directional communications link, the copper cable carries electrical power as well. The soccer goals and the ice hockey goals are constructed with fiber optics/copper cable connectors built into their ground footings which connect to the fiber optics cable/copper cable bi-directional communications and power link mating cable connectors that come up from the ground beneath the goal footings. The soccer goals and the ice hockey goals have fiber optics cable and copper cable running up from the connectors in their footings and through their tubular structure to fiber optics/copper cable connectors in the horizontal crossbar member where the instrumentation modules are located. The fiber optics/copper cable connectors in the horizontal crossbar member are then mated with the instrumentation module's fiber optics/copper cable connectors by passing the fiber optics cable/copper cable through the openings 77 and 78 in the instrumentation modules and mating them to the two fiber optics cable/copper cable connectors 75 and 76 within the instrumentation modules.

The z-axes 30 and 52 are perpendicular to the top 8 of the instrumentation modules. The line of sight direction 73 of the four cameras 35, 36, 48 and 58 that form the two 3-D stereo camera pairs is tilted forward toward the playing field/rink in order that the televised video from both 3-D stereo camera pairs show the viewers the images of the goal keeper and the players. In FIG. 49D the line of sight direction 24 is tilted toward the pitcher.

If the cameraman chooses to do so, in another preferred embodiment the lines of sight tilt angles of the two stereo camera pairs are set to different angles.

The two cameras 35 and 36 that form the 3-D stereo camera pair 35 and 36 and the two cameras 48 and 58 that form the 3-D stereo camera pair 48 and 58 are identical to each other. The two cameras 35 and 36 use the same identical lenses 37 and 38. The two cameras 48 and 58 use the same identical lenses 65 and 66. In one preferred embodiment, the lenses are wide angle zoom lenses.

In one preferred embodiment, the lens pair 37 and 38 is identical to the lens pair 48 and 58.

In another preferred embodiment, the lens pair 37 and 38 is different than the lens pair 48 and 58. This enables the cameraman to get different shots from the two 3-D stereo camera pairs.

In another preferred embodiment, lenses 37 and 38 are extremely wide angle lenses. These lenses have nearly 180 degree fields of view. It is noted that in other preferred embodiments, other lens types can be employed with other fields of view. An advantage of the extremely wide angle lenses is that the cameras can see the players on the entire playing field/rink right down to the horizon.

The two cameras 35 and 36 that form the 3-D stereo camera pair have optical windows 7 and 20. The two cameras 35 and 36 that form the 3-D stereo camera pair have the same line of sight 73. The line of sight 73 of the 3-D stereo camera pair is tilted relative to direction 27. Direction 27 is perpendicular to the top 8 of the instrumentation modules and the face of the horizontal crossbar member of the goal.

The two cameras 48 and 58 that form the 3-D stereo camera pair have optical windows 67 and 64. The two cameras 48 and 58 that form the 3-D stereo camera pair have the same line of sight direction 73. The line of sight direction 73 of the 3-D stereo camera pair is tilted relative to direction 27.

The interpupillary distance is the distance between 27 and 28, and between 50 and 54, which is the distance between the optical axes of camera lenses 37 and 38, and the distance between the optical axes of camera lenses 66 and 65. The line of sight direction 73 of the cameras 35 and 36, and cameras 48 and 58, that form the two 3-D stereo camera pairs are tilted slightly downward toward the playing field/rink so the TV viewing audience can see the goal keeper and the players.

In another preferred embodiment, the two cameras 35 and 36 are identical to each other. The two cameras 35 and 36 use the same two lenses 37 and 38. The two cameras 48 and 58 are identical to each other. The two cameras 48 and 58 use the same two lenses 65 and 66. At times, in order to produce more dramatic shots of the goal keeper during the game, the cameraman may want to pre-orchestrate the positioning of the 3-D camera's line of sight 73 before the games begin. This can be accomplished by pre-tilting, and encapsulating in-place, the 3-D cameras 35 and 36, and 48 and 58 inside the instrumented baseball pitcher's rubber in advance of the game when the field is being prepared before the game. The 3-D stereo camera's line of sight 73 is tilted toward the goal keeper in order to raise the image of the goal keeper above the lower edge of the TV picture frame and produce a larger picture of the goal keeper. This produces the dramatic effect of making the goal keeper seem closer to the TV viewing audience in 3-D.

Since the horizontal crossbar member is above the goal keeper, the sounds of the goal keeper's movements will seem to come from beneath the TV viewing audience. The TV viewing audience will experience a surround sound novelty. In addition to hearing sounds from in front and back, and sounds from the right and from the left of the ice hockey goal, the TV audience will be treated to hearing the sounds of the ice scraping from beneath them as the goal keeper's skates grind on the ice. The sounds of the scraping ice will appear to be coming up from directly beneath and between the audience's legs! This is very exciting. Additionally, the TV audience will be treated to hear the sound of the thud of the instrumented ice hockey puck as it hits the net from both the puck and the instrumentation modules on the goal. In addition to hearing sounds from in front and back, and sounds from the right and from the left of the soccer goal, the TV audience will be treated to hearing the sounds of the goal keeper intercepting and kicking the soccer ball beneath them as the goal keeper runs in front of the net. The sounds of the soccer ball being caught and return kicked by the goal keeper will seem to be coming up from the playing field directly beneath the audience and between the audience's legs! These sound effects are very exciting. Additionally, the TV audience will be treated to hear the sound of the soccer ball as it hits the net behind them. In this system, the TV viewing audience will have speakers appropriately placed beneath and above them, as well as speakers placed on their right and on their left, and in front and behind them at the audience's respective viewing venues.

The stabilized surround sound processing software in the remote base station simultaneously collects sounds from the microphones mounted in both of the goals at either end of the rink as well as from the instrumented ice hockey puck on the rink. This gives a wide separation between all of the microphones which adds to the TV audience's surround sound entertainment.

Referring to FIG. 3 and FIG. 4, the audience will see the soccer goalkeeper/goalie scramble and dive onto the ground to prevent the soccer ball from being kicked by a player into the net. The audience will see this event from the vantage point of the instrumentation modules 2 and 8 on the horizontal crossbar member of the goal which is the audience's virtual vantage point above and behind the goalkeeper.

Referring to FIG. 5 and FIG. 6, the audience will see the ice hockey goaltender scramble and dive onto the ice to prevent the puck from being hit by a player into the net. The audience will see this event from the vantage point of the instrumentation modules 2 and 8 on the horizontal crossbar member of the goal which is the audience's virtual vantage point above and behind the goaltender.

In summary, the instrumented soccer goal 1 shown in FIG. 3 and FIG. 4 provides video and sound to the viewing audience that is so exciting and realistic that it makes the individual members of the audience feel that they are with the goalkeeper in the game. In many ways this is more exciting than viewing the game in person from the stands of the soccer stadium. Therefore, the instrumented soccer goal not only provides a step forward in entertainment, but it also provides a great training tool to prospective soccer players by giving them the true life visual and auditory sensations and feelings of being in the game without actually being there.

In summary, the instrumented ice hockey goal 1 shown in FIG. 5 and FIG. 6 provides video and sound to the viewing audience that is so exciting and realistic that it makes the individual members of the audience feel that they are with the goaltender in the game. In many ways this is more exciting than viewing the game in person from the stands of the ice hockey stadium. Therefore, the instrumented ice hockey goal not only provides a step forward in entertainment, but it also provides a great training tool to prospective ice hockey players by giving them the true life visual and auditory sensations and feelings of being in the game without actually being there.

The instrumentation module sits horizontally on the playing field/rink. The four optical windows 64, 67, 20 and 7 are flush with surface 8 and are made just large enough to prevent vignetting of the camera's 58, 48, 35, and 36 fields of view. Camera's 35 and 36 are mounted inside the instrumentation package assembly 11. Camera's 48 and 58 are mounted inside the instrumentation package assembly 46. The cameraman has a choice of camera lenses to use. Utilization of extremely wide angle lenses allows the TV viewing audience to see out onto the playing field/rink past the goaltender and down behind the goaltender.

Tilting of the two 3-D stereo camera pairs line of sight direction 73 is accomplished by using the bellows sections 14 and 40, and 49 and 56 of the instrumentation package assemblies 11 and 46 respectively of the instrumentation module. The bellows sections 14, 40, 49 and 56 are flexible. The bellows sections 14 and 40, which connect the buffer plate assembly 12 to the instrumentation package assembly 11, are bent to the desired tilt angle for the camera's 35 and 36 line of sight direction 73. The bellows sections 49 and 56, which connect the buffer plate assembly 59 to the instrumentation package assembly 46, is bent to the desired tilt angle for the camera's 48 and 58 line of sight direction 73.

After the desired tilt angle is set by bending the bellows sections, all the components inside the instrumentation module are encapsulated in place using the white rubber encapsulating compound 68. In a preferred embodiment, the tilted line of sight 73 is common for all four cameras 35, 36, 48 and 58, their lenses 37, 38, 65 and 66, their optical window's 7, 20, 64 and 67, their buffer plates 12 and 59, and their bellows sections 14, 40, 49, and 56.

Keeping in mind that the line of sight 73 is common for the camera's, lenses, optical window's, and buffer plates, it follows from the specification discussed above that the line of sight 73 of cameras, lenses, optical windows, and buffer plates can be tilted in a like manner, upwards or downwards relative to 27 by bending the bellows sections as before. Tilting 73 downward towards the goaltender would bring the image of the goaltender closer to the center of the TV picture frame and make him look closer and larger. Tilting 73 upward and away from the goaltender would move the image of the goaltender away from the center of the TV picture frame and make him look further away and smaller. Utilization of extremely wide angle lenses allows the TV viewing audience to see down past the goaltender and behind the goaltender.

Referring to FIG. 5 and FIG. 6, when a player is skating toward the goaltender, the four 3-D stereo camera pairs mounted in the instrumented ice hockey goal can see where he is coming from. The cameras can see the player as he skates and collides with the instrumented ice hockey goal. The cameras can see the player as he is sliding on the ice into the instrumented ice hockey goal. The cameras can see the goaltender as he blocks the player before the player pushes the puck with his stick and scores a goal. From the vantage point of the instrumentation modules, the viewing audience can see the face of the strained player darting for the net. The viewing audience can see details of the goaltender as he attempts to cover the play. The viewing audience can see a close-up of the goaltender's attempt to cover the play. As the puck is passed between the approaching players, the viewing audience can see the goaltender reach down to block it close to the net. The camera's vantage point at the instrumented ice hockey goal on the rink gives the audience a viewing angle of the game never seen before by television viewing audiences. The instrumented ice hockey goal's cameras and microphones give the TV viewing audience unending contemporaneous shots and sounds that get across a sense of the action of being there—like a player in the game that prior art cameras looking on from their disadvantaged viewing points from outside the rink cannot get across.

Referring to FIG. 3 and FIG. 4, when a player is guiding the soccer ball toward the goalkeeper, the four 3-D stereo camera pairs mounted in the instrumented soccer goal can see where he is coming from. The cameras can see the player as he runs and collides with the instrumented soccer goal. The cameras can see the player as he is sliding on the ground into the instrumented soccer goal. The cameras can see the goalkeeper as he blocks the player before the player pushes the soccer ball into the net with his feet and scores a goal. From the vantage point of the instrumentation modules, the viewing audience can see the face of the strained player darting for the net. The viewing audience can see details of the goalkeeper as he attempts to cover the play. The viewing audience can see a close-up of the goalkeeper's attempt to cover the play. As the soccer ball is passed between the approaching players, the viewing audience can see the goalkeeper reach down to block and scoop up the ball close to the net. The camera's vantage point at the instrumented soccer goal on the playing field gives the audience a viewing angle of the game never seen before by television viewing audiences. The instrumented soccer goal's cameras and microphones give the TV viewing audience unending contemporaneous shots and sounds that get across a sense of the action of being there—like a player in the game that prior art cameras looking on from their disadvantaged viewing points from outside the playing field cannot get across.

In a preferred embodiment, cameras 35, 36, 48 and 58 when using common extremely wide angle lenses 37, 38, 65 and 66 with zoom capability, even though the cameras are pointed from 8 of the instrumented baseball pitcher's rubber, they can see past the goalkeeper right down to the horizon because of their near 180 degree field of view. This is a distinct advantage of extremely wide angle lenses over other types of lenses. However, it should be pointed out that the cameraman may in yet another preferred embodiment elect to use a variety of other camera lens pairs with different capabilities depending on the visual effects he wishes to convey to the TV viewing audience. For example, the cameraman may elect to use a camera lens pairs with a narrower more highly magnified field of view in order to concentrate the attention of the TV viewing audience on the goalkeeper's taut and sweaty stubble filled face.

The instrumentation package assemblies 11 and 46 are supported inside the instrumentation modules at their upper ends by their buffer plates 12 and 59 respectively. The instrumentation package assemblies 11 and 46 and their buffer plates 12 and 59 are permanently encapsulated inside of the instrumentation modules as the encapsulating material 68 around them cures. After the encapsulating material 68 sets, it becomes a weatherproof shock absorbing padding material. The small diameter ends of the buffer plates 12 and 59 peer through 8 and upper protective cover plates 22 and 63 of the instrumentation modules. The small diameter ends of the buffer plates 12 and 59 are sealed and molded into the shock absorbing padding 68 around their circumferences. The encapsulating material 68 is a permanent resilient compound that is air-tight and water-tight.

The buffer plates are encapsulated by the encapsulating material 68 inside the instrumentation modules. Synthetic rubber is another example of encapsulating material besides natural rubber that is used. The mechanical axes of the bores in the buffer plates are tilted to 8 of the instrumentation modules so that they have common line of sight directions 73. The ends of the instrumentation package assemblies 11 and 46 are inserted into the bores in the buffer plates 12 and 59, thereby tilting the mechanical axis of the ends of instrumentation package assemblies 11 and 46 to 8 of the instrumentation modules.

The buffer plates 12 and 59 act as mechanical bearings for the instrumentation package assemblies 11 and 46, and thereby restricts and restrains the motion of the instrumentation package assemblies 11 and 46 inside the instrumentation modules. Besides functioning as bearings to support the instrumentation package assemblies 11 and 46 within the instrumentation modules, the buffer plates provides a hollow portal through which the cameras inside the instrumentation package assemblies 11 and 46 may peer out of the instrumentation modules at the playing field/rink along line of sight direction 73.

Referring to FIG. 4 and FIG. 5, except for the four small holes in 8 used for the optical windows 64, 67, 20 and 7, the instrumented soccer goal and the instrumented ice hockey goal's outward appearance looks substantially the same as the conventional regulation goals, and plays the same as these goals, and meets the official requirements for these goals and is interchangeable with them in all venues as substitutes.

The buffer plates 12 and 59 are Type XI buffer plates and are disclosed in FIG. 13ZA and FIG. 13ZB and FIG. 13ZC. The buffer plate 12 and 59 are molded into the instrumentation modules using the white rubber encapsulating material 68. The small diameter end of the buffer plates 12 and 59 pass through the upper cover protective cover plates 22 and 63 and protrude through the molded rubber surface 8 of the instrumentation modules. The buffer plates carry the optical windows 20, 7, 64 and 67. The optical windows tilt with their buffer plates. The flat surfaces of optical windows 20, 7, 64 and 67 are tilted and made relatively flush with 8 of the instrumentation modules.

The cameras 35 and 36, and 48 and 58 are aligned together within their respective instrumentation package assemblies 11 and 46 respectively so that they yield wirelessly transmitted upright 3-D images of objects within the HD TV picture frame. This is achieved by physically rotating the cameras and their lenses together about their optical axes.

The instrumentation modules have two upper protective cover plates 22 and 63 embedded and molded into it. The protective cover plates 22 and 63 are on the face 8 of the instrumentation modules. The outer body of the protective cover plates are made spherically dome shaped so their edges do not come close to 8 of the instrumentation modules to protect the players from hitting their edges. The entire body of the bottom protective cover plate 23 is made flat and has rounded edges like the edges on the top protective plate 22. Its purpose is to protect the instrumentation package assemblies and prevent the instrumentation modules from bending to maintain camera alignment.

The materials chosen for the protective cover plates 22, 63 and 23 in the present invention are polycarbonates, ABS, or fiber reinforced plastics. Although a variety of other materials would function almost equally as well, these have an advantage in that they are lightweight and stiff, enabling the thickness of the protective cover plates 22, 63 and 23 to remain thin while still delivering the significant stiffness needed to perform their mechanical shielding function in the limited space they can occupy within the instrumented baseball home plate. These materials have an additional advantage in that they are transparent to the transmitted and received radio waves which need to radiate to and from the antennas inside the instrumented baseball home plate without absorption or reflection.

The instrumentation package assemblies 46 and 11 are sandwiched between the top and bottom protective cover plates. The purpose of these protective cover plates is to act as a shield to protect the instrumentation package assemblies from being damaged during the game by the pitcher stepping on the instrumented baseball pitcher's rubber. During the normal course of the game, the instrumentation modules may be hit. The protective cover plates 22 and 63 protect the instrumentation package assemblies within the instrumentation modules from physical damage due to these hits.

Around the top, bottom and sides of the instrumentation modules, the space between the outer covering and the protective cover plates is filled with white rubber encapsulating material 68. When cured, this encapsulating material 68 acts as cushioning to absorb shock and vibration to the instrumentation modules. The molting material 68 encapsulates the upper and lower protective cover plates 22, 63 and 23 and maintains their positions inside the molded instrumentation modules. The space between the protective cover plates 22, 63 and 23 and the instrumentation package assemblies 11 46 is also filled with the same encapsulating material 68. When cured, this encapsulating material 68 acts as cushioning to absorb shock and vibration to the instrumentation package assemblies within the instrumentation modules. The molding material 68 encapsulates the instrumentation package assemblies inside the instrumentation modules and thereby maintains their positions inside the molded instrumentation modules.

The top protective cover plates 22 and 63 are spherically dome shaped in their outer regions. The major purpose of making them spherically dome shaped is to provide maximum protection for the optical windows 20, 7, 64 and 67 whose surfaces are at the surface 8 of the instrumentation modules. The upper protective cover plates are flat in their inner regions close to the optical windows. The flat shape enables the upper protective cover plates to surround the optical windows at 8 of the instrumentation modules where the optical windows are most likely to be exposed to the greatest threat of damage due to hits to the instrumentation modules. The upper protective cover plates are buried in molding material 68 at the center of 8 of the instrumentation modules around the optical windows by approximately 1/32 to 1/8 inch below 8. The dome shape enables the upper protective cover plates to come very close to 8 of the instrumentation modules where the players will have only grazing contact with its curved surface if they crash into the instrumentation modules, thereby eliminating the threat of injury to the players if they hit the instrumentation modules. The spherical shape of the protective cover plates causes their edges to be curved downward and away from the top of the outer skin and places them approximately over 1 inch below the top surface 8 of the instrumentation modules.

The lower protective cover plate 23 is entirely flat and is buried in encapsulating material 68 over a quarter inch or more above the bottom surface of the instrumentation modules. The lower protective cover plate spans the distance between one side of the instrumentation modules to the other. It physically supports the bottom of each of the instrumentation package assemblies containing the two 3-D stereo camera pairs and contributes toward holding them in optical and mechanical alignment with one another. The body of the lower protective cover plate 23 is made flat because there is no danger of the players coming into violent contact with it. The flat shape is easier to make and less expensive to manufacture. Its thickness is also made in the range of approximately 1/8 to 1/2 inches. However, its thickness is not physically restrained because of its location, as is the case with the upper protective cover plates. In all cases, the edges of the protective cover plates 22, 63 and 23 come within no less than 1/4 inches from all sides of the instrumented baseball pitcher's rubber.

Each of the microphones 43 and 69 listens for sounds from the outside vicinity of 8 of the instrumentation modules. Each of the eight microphones 33, 34, 44, 94, 93, 96, 95 and 67 listens for sounds of impacts to the instrumentation modules and conducted through the frame of the goal structure into the instrumentation modules. The condenser microphones enable the viewing audience to hear real-time contacts, impacts and shock directly to and conducted to the instrumentation modules.

Microphones 43 and 69 protrude through and are flush with 8 of the instrumentation modules. Microphones 43 and 69 are mounted above the upper protective cover plates and connected by cables from each to an electrical connector on each of the instrumentation package assemblies respectively.

Microphones 80, 81, 82, 83, 84, 85, 86, 87, 88, 89, 90, 91 and 92 are flush with 8 and are mounted above the upper protective cover plates and connected by cables from each to an electrical connector on each of the instrumentation package assemblies respectively. Each of these microphones listens for sounds from the outside vicinity of 8 of the instrumentation modules.

Referring to FIG. 3 and FIG. 4, in a further preferred embodiment, the present invention contemplates an instrumented soccer goal, which when located on any playing field, can wirelessly by RF radio and/or by fiber optics cable and/or by coaxial copper cable, autonomously televise soccer practice and warm-up sessions under command and control of a remote base station. The remote base station is disclosed in FIG. 30A and FIG. 30B and FIG. 31A and FIG. 31B and FIG. 32A and FIG. 32B, and FIG. 35A and FIG. 35B, and FIG. 35C. In addition to adding an element to the entertainment of the TV viewing audience, this embodiment serves to aid the players and the coaches in evaluating the quality of the player's progress, prowess, fitness and "stuff" in the game of soccer.

Referring to FIG. 5 and FIG. 6, in a further preferred embodiment, the present invention contemplates an instrumented ice hockey goal, which when located on any rink, can wirelessly by RF radio and/or by fiber optics cable and/or by coaxial copper cable, autonomously televise ice hockey practice and warm-up sessions under command and control of a remote base station. The remote base station is disclosed in FIG. 30A and FIG. 30B and FIG. 31A and FIG. 31B and FIG. 32A and FIG. 32B, and FIG. 35A and FIG. 35B, and FIG. 35C. In addition to adding an element to the entertainment of the TV viewing audience, this embodiment serves to aid the players and the coaches in evaluating the quality of the player's progress, prowess, fitness and "stuff" in the game of ice hockey.

The instrumented soccer goal is an example of a static instrumented sports paraphernalia.

The instrumented ice hockey goal is an example of a static instrumented sports paraphernalia.

For televising games from off the playing field, for example in the pitcher's bullpen, refer to FIG. 35C which is a top view of a general sports stadium that has been configured and equipped for use with both static and dynamic instrumented sports paraphernalia, using both bi-directional wireless RF radio wave communication links and/or bi-directional fiber optics cable communication links and/or coaxial copper cable communication links.

In another preferred embodiment, the interpupillary distances may be increased by electronically forming a 3-D stereo camera pair with cameras 35 and 48.

In another preferred embodiment, the interpupillary distances may be increased by electronically forming a 3-D stereo camera pair with cameras 35 and 58.

In another preferred embodiment, the interpupillary distances may be increased by electronically forming a 3-D stereo camera pair with cameras 36 and 48.

In another preferred embodiment, the interpupillary distances may be increased by electronically forming a 3-D stereo camera pair with cameras 36 and 58.

Electronically, mechanically and optically all four of these 3-D stereo camera pairs operate simultaneously with the 3-D stereo camera pair formed with cameras 36 and 35, and the 3-D stereo camera pair formed with cameras 48 and 58. An advantage of these four embodiments in certain venues is that the 3-D effect to the TV viewers is magnified in these four alternative embodiments relative to the present embodiment. This occurs because their interpupillary distances are larger due to the increased spatial separations across the instrumented baseball pitcher's rubber between the cameras in the electronically formed 3-D stereo camera pairs. Another advantage occurs when an optical window is obscured by dirt; the remaining cameras can be paired to continue to produce 3-D imagery for the TV viewers. A disadvantage of this arrangement is that the alignment of the cameras in these 3-D stereo camera pairs is more difficult to maintain owing to the increased distance between the cameras. In each of these four embodiments the four cameras are identical to one another, the four camera lenses are identical to one another, and the four line of sight directions of the cameras are identical to one another. The SD/HD letter box picture formats of cameras 43 and 44 are aligned together. The SD/HD letter box picture formats of cameras 41 and 42 and 43 and 44 are aligned together so that any two of the four cameras can be a 3-D stereo camera pair.

Charging the battery pack in the instrumentation modules is accomplished in the same fashion as charging the instrumented baseball home plate and the instrumented baseball bases as is shown in FIG. 23A and FIG. 23B and FIG. 23C, and FIG. 23E and FIG. 23F and FIG. 23G. The charging station unit is placed near surface 8 of the instrumentation modules in order to inductively couple electricity into the coils of the instrumentation modules to charge its battery packs.

The cameraman, in the remote base station, software selects either the wireless mode of communication, and/or the fiber optics/copper cable mode of communication between the instrumentation modules and the remote base station. The cameraman can use whichever equipment (antenna array relay junction or fiber optics cable/copper cable) that is installed in the stadium with which to command and control his choice and communicate it to the instrumentation modules on the playing field/rink. These choices are also physically switch selectable by the cameraman with his access through the opening in the bottom of the instrumentation modules.

The cameraman selects items from a software menu of control commands that go to the network transceiver at the remote base station that are subsequently transmitted to the instrumented sports paraphernalia (the instrumented soccer goal or the instrumented ice hockey goal) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation modules to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented sports paraphernalia that are being controlled.

In yet another preferred embodiment, the instrumentation module shown in FIG. 2A is physically divided in half into two separate but equal two camera instrumentation modules. The division takes place in the middle of FIG. 2A equidistant between 2 and 21. The result is two smaller instrumentation modules. Each of the two smaller instrumentation modules halves preserves all of the electronic functions of the instrumentation module shown in FIG. 2A except that they are physically half the size and possess only two cameras rather than four. Since they are physically smaller they can easily be inserted into the base of the vertical structural members, as for example as shown in FIG. 5 and FIG. 6. This vantage point gives the 3-D cameras and surround sound microphones the ability to capture rare views from the edge of the goals. Additionally in another preferred embodiment, their small size allows them to be easily inserted into the vertical structural members anywhere along their length so their cameras may look out onto the playing field/ice rink from the edge of the goal. This holds true for both the ice hockey goals and the soccer goals.

Referring to the Preferred Embodiments Specified in FIG. 2A and FIG. 2B and FIG. 2C, the instrumentation module satisfies all of the following further objectives:

It is an objective of the present invention to instrument sports paraphernalia with instrumentation modules comprised of four TV cameras, eight induction coils, four plane-parallel-flat optical windows, two central hubs of the instrumentation package assembly, two battery packs, two buffer plate assemblies, four bellows segments, two upper protective cover plates, two lower protective cover plates, eight wireless radio antenna elements, four tilted cameras, twenty three microphones, four camera lenses, gas valves, access lid heat sinks, encapsulating rubber material, power and fiber optics cable/copper cable connector, and a slotted openings for access to the connectors.

It is an objective of the present invention to instrument sports paraphernalia with instrumentation modules comprised of two instrumentation package assemblies, two buffer plate assemblies, two upper protective cover plates, two lower protective cover plates, two additional microphones, encapsulation/molding material, wherein the four TV cameras are arranged as two stereo camera pairs, and can see out from the instrumentation modules, and can wirelessly by RF radio, and/or by using a fiber optics/copper cable connectivity, autonomously televise games from instrumented sports paraphernalia under the command and control of the remote base station via an antenna array relay junction, and where the cameraman in a remote base station can select either the wireless mode of communication and/or the fiber optics/copper cable mode of communication for the instrumented sports paraphernalia, and where the cameraman can use whichever equipment (RF radio or fiber optics cable/copper cable) which is installed in the sports stadium with which to command and control his choice, and communicate it to the instrumented sports paraphernalia on the stadium playing field or in the bullpen, where his choices are also physically switch selectable with his access through the bottom slot of the instrumentation module, and where the cameraman in the remote base station can electronically command and control any combination of any two of the four cameras in the instrumentation module to act as a 3-D stereo camera pair, and can control the zoom, focus and f-stop setting of the camera lenses.

It is an objective of the present invention to instrument sports paraphernalia with instrumentation modules which can stream games onto the internet.

It is an objective of the present invention to provide an instrumentation module whose battery packs can be wirelessly charged by magnetic induction.

It is an objective of the present invention to provide an instrumentation module where the status of its functions can be read by the hand held remote.

It is an objective of the present invention for the instrumentation module to act as a common building block for instrumenting a variety of different sports paraphernalia including soccer goals, ice hockey goals, tennis nets, and tennis net posts.

It is an objective of the current invention to provide a means to prevent damage from moisture and dirt entering the instrumentation module.

It is an objective of the current invention to provide a means to isolate the instrumentation modules from the shock and vibration encountered by the instrumentation modules during games.

It is an objective of the present invention to provide an instrumentation module with means to protect its cameras and other components within the instrumentation module from ice, snow, rain, dirt and physical impacts.

It is an objective of the present invention to hold the interpupillary distance and alignment of the stereo camera pairs stable during use.

FIG. 3

The detailed physical elements disclosed in the externally instrumented soccer goal drawing shown in FIG. 3 are identified as follows: 1 is the externally instrumented soccer goal shown with five externally mounted four camera instrumentation modules. 2 is a four camera instrumentation module. 3 is an optical window. 4 is an optical window. 5 is an optical window. 6 is an optical window. 7 is the horizontal crossbar structural member on the front top of the externally instrumented soccer goal. 8 is a four camera instrumentation module. 9 is an optical window. 10 is an optical window. 11 is an optical window. 12 is an optical window. 13 is the right side vertical structural member. 14 is the soccer net on the right side. 15 is the ground of the soccer field. 16 is the goalkeeper/goalie. 17 is the soccer net on the left side. 18 is the left top side bar structural member. 19 is the soccer net on the rear side. 20 is a four camera instrumentation module that is attached to the front surface of the rear ground footing structural member of the goal on the right side. 21 is a four camera instrumentation module that is centered on 25. 22 is the forward face of 7. 23 is the ground footing structural member on the left side. 24 is the rear ground footing structural member of the goal on the right side. 25 is the rear ground footing structural member on the rear side. 26 is the base of the soccer goal structural member 1 that is touching the ground of the playing field. 27 is an instrumentation module that is attached to the front surface of the rear ground footing structural member of the goal on the left side (and cannot be seen in this view).

FIG. 3 shows a view of an instrumented soccer goal equipped with five external four camera instrumentation modules attached.

In a preferred embodiment, the instrumentation modules are mounted on and attached to the soccer goal's structural members. It is contemplated that the present invention affords the viewing audience with the ability to see and hear unique views and sounds of the game which will enhance their viewing pleasure beyond the prior art. It is further contemplated that the instrumentation modules are made easily removable and replaceable for maintenance and repair, and that their size, color, shape, orientation and appearance does not pose a distraction to the players or an impediment to the game.

The present invention contemplates that the instrumentation modules attached to the instrumented soccer goals be instrumented with transceivers and antennas capable of wirelessly transmitting radio signals encoded with the televised picture and sound information to a remote base station via an antenna array relay junction located in the stadium. The present invention contemplates that the instrumented soccer goals, that are in play on the playing field during professional league games and player training sessions, are instrumented with cameras and microphones enabling them to acquire pictures and sounds of the players from amongst the players on the playing field. Electronics within the instrumentation modules televises the pictures and sounds to a remote base station via an antenna array relay junction.

Soccer goals are frequently made of tubular aluminum or steel structural members. Typically two or more instrumentation modules are attached to the structural members by mounting them externally directly on to the front of the top horizontal crossbar member 7 of the externally instrumented soccer goal shown in FIG. 3. FIG. 3 shows two instrumentation modules that are mounted directly on to the front surface 22 of the top horizontal crossbar member 7 of the externally instrumented soccer goal. Instrumentation modules like 2 and 8 are typically positioned on the instrumented soccer goal at either end of the top horizontal crossbar member 7 to give the widest coverage of the soccer field without being obscured by the goal keeper. The cameras within the instrumentation modules 2 and 8 peer out onto the soccer field through optical windows 3, 4, 5, 6, 9, 10, 11 and 12 on the front forward facing surface 22 of 7. These vantage points allow the cameras and microphones to see and hear pucks coming into the net from both sides of the soccer field.

Referring to FIG. 3, except for the presence of instrumentation modules 2 and 8, the externally instrumented soccer goal's 1 outward appearance looks substantially the same as the conventional regulation goals, and plays the same as these goals, and meets the official requirements for these goals and is interchangeable with them in all venues as substitutes.

The present invention contemplates instrumented soccer goals, which when stationed on any playing field at their traditional locations can both wirelessly and/or by using fiber optics/copper cable connectivity, autonomously televise soccer games under the command and control of a remote base station. The remote base station is disclosed in FIG. 30A and FIG. 30B, and FIG. 31A and FIG. 31B, and FIG. 32A and FIG. 32B, and FIG. 35A, and FIG. 35B, and FIG. 35C, and FIG. 7 and FIG. 8 of the present invention.

When mounted externally to the top horizontal crossbar member 7 of the externally instrumented soccer goal as shown in FIG. 3, the instrumentation modules containing optical windows 3, 4, 5, 6, 9, 10, 11, and 12 faces forward toward the playing field. The instrumentation modules are mounted to the front surface 22 of the top horizontal crossbar member 7 of the soccer goal. The instrumentation module can be mounted to 7 using a variety of simple methods. Preferred methods are ones where the instrumentation module can be easily removed and replaced for routine maintenance, testing and repairs. For example, the instrumentation module can be positioned and held to 7 using ordinary plastic zip ties which can be easily cut; or the instrumentation module can be screwed to 7 with removable fasteners or Velcro sandwiches.

Referring to FIG. 3, except for the instrumentation module's eight small optical windows 3, 4, 5, 6, 9, 10, 11 and 12, the instrumented soccer goal's outward appearance looks substantially the same as the conventional regulation goals, and plays the same as these goals, and meets the official requirements for these goals and is interchangeable with them in all venues as substitutes.

In another preferred embodiment, the externally instrumented soccer goal 1 has power cable, fiber optics cable and copper bi-directional cable routed up through the tubular structure of the externally instrumented soccer goal from the ground to the externally mounted instrumentation module via electrical connectors mounted into and on 7. If the cable feed is not already available, then it is installed as part of implementing this embodiment. In this preferred embodiment a fiber optics cable/copper cable bi-directional communications link is buried underneath the ground of the soccer playing field. In addition to being a bi-directional communications link, the copper cable carries electrical power as well. The soccer goals are constructed with fiber optics/copper cable connectors built into their ground footings which connect to the fiber optics cable/copper cable bi-directional communications and power link mating cable connectors that come up from the ground beneath the goal footings. The soccer goals have fiber optics cable and copper cable running up from the connectors in their footings and through their tubular structure to fiber optics/copper cable connectors in the top horizontal crossbar member 7 where the instrumentation modules are located. The fiber optics/copper cable connectors in the top horizontal crossbar member 7 protrude through their mounting holes in 22. The fiber optics/copper cable connectors in the horizontal crossbar member are then mated with the instrumentation module's fiber optics/copper cable connectors by passing the fiber optics cable/copper cable through the openings in the instrumentation modules and mating them to the two fiber optics cable/copper cable connectors within the instrumentation modules.

In yet another preferred embodiment, in low budget venues the cables coming up from beneath the soccer field ground can be externally routed up to the instrumentation modules by attaching them with tie wraps to the structural members of the goal structure.

Referring to FIG. 3, looking down from the vantage point in the top horizontal crossbar member 7, the audience will see the goal keeper scramble and dive onto the ground to prevent the soccer ball from being kicked by a player into the net. The audience will see and hear this event from the vantage point of the cameras and microphones within the instrumentation modules 2 and 8 located on the top horizontal crossbar member 7 of the goal which is the audience's virtual vantage point above and behind the goal keeper. This action packed view of the soccer ball has never before been seen and heard by a viewing audience. The viewing audience sees the action in 3-D and hears the action in surround sound.

In summary, the externally instrumented soccer goal 1 shown in FIG. 3 provides video and sound to the viewing audience that is so exciting and realistic that it makes the individual members of the audience feel that they are with the goalkeeper in the game. In many ways this is more exciting than viewing the game in person from the stands of the soccer stadium. Therefore, the instrumented soccer goal not only provides a step forward in entertainment, but it also provides a great training tool to prospective soccer players by giving them the true life visual and auditory sensations and feelings of being in the game without actually being there.

In FIG. 3, when a player is guiding the soccer ball toward the goalkeeper, the four 3-D stereo camera pairs mounted in the instrumented soccer goal can see where he is coming from. The cameras can see the player as he runs and collides with the instrumented soccer goal. The cameras can see the player as he is sliding on the ground into the instrumented soccer goal. The cameras can see the goalkeeper as he blocks the player before the player pushes the soccer ball into the net with his feet and scores a goal. From the vantage point of the instrumentation modules 2 and 8 above the goal keeper, the viewing audience can see the face of the strained offensive player darting for the net. The viewing audience can see details looking down on the goalkeeper as he attempts to cover the play. The viewing audience can see a close-up of the goalkeeper's attempt to cover the play. As the soccer ball is passed between the approaching players, the viewing audience can see the goalkeeper reach down to block and scoop up the ball close to the net. The viewing audience can see the soccer ball pass below the cameras as a goal is scored. The camera's vantage point at the instrumented soccer goal on the playing field gives the audience a viewing angle of the game never seen before by television viewing audiences. The instrumented soccer goal's cameras and microphones give the TV viewing audience unending contemporaneous shots and sounds that get across a sense of the action of being there—like a player in the game that prior art cameras looking on from their disadvantaged viewing points from outside the playing field cannot get across.

In FIG. 3, in yet a further preferred embodiment, the present invention contemplates an instrumented soccer goal wherein three instrumentation modules 20, 27 and 21 are attached to the rear ground footing structural member 24, 25 and 23 of the goal. These instrumentation modules permit the viewing audience to see action coming into the end corners of the soccer goal. From the vantage point of the instrumentation modules 20, 27 and 21 at ground level below the body of the goal keeper, the viewing audience can see the face of the strained offensive players darting for the net.

The viewing audience can see details looking up at the goalkeeper as he attempts to cover the play. The viewing audience can see the soccer ball pass above the cameras as a goal is scored. This action packed view of the soccer ball has never before been seen and heard by a viewing audience. The viewing audience sees the action in 3-D and hears the action in surround sound.

In FIG. 3, in yet a further preferred embodiment, the present invention contemplates an instrumented soccer goal, which when located on any playing field, can wirelessly by RF radio and/or by fiber optics cable and/or by coaxial copper cable, autonomously televise soccer practice and warm-up sessions under the command and control of a remote base station. The remote base station is disclosed in FIG. 30A and FIG. 30B and FIG. 31A and FIG. 31B and FIG. 32A and FIG. 32B, and FIG. 35A and FIG. 35B, and FIG. 35C. In addition to adding an element to the entertainment of the TV viewing audience, this embodiment serves to aid the players and the coaches in evaluating the quality of the player's progress, prowess, fitness and "stuff" in the game of soccer.

In yet still another preferred embodiment, the instrumented soccer goal shown in FIG. 3 is equipped to wirelessly stream its audio and video onto the internet.

The instrumented soccer goal is instrumented with instrumentation modules.

The instrumentation modules contain an electronics circuit called an electronics package unit. The electronics package unit is shown in FIG. 11A. The electronics package unit enables the instrumented soccer goal to communicate with and stream on the internet.

The instrumentation modules are shown in FIG. 2A and FIG. 2B and FIG. 2C.

Referring to FIG. 11B, FIG. 11B shows the architecture of the streaming system that conveys high definition video and multi-dimensional audio from instrumented soccer goals, captured by the cameras and microphones contained within their instrumentation modules, to stream to an audience which may or may not have spectators 7, 8, 9 and 10 respectively present at the games but wish to subscribe and view the games remotely on their personal wireless display devices. The electronics package units inside the instrumentation modules communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the soccer playing field who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given soccer field of play currently broadcasted.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

Referring to FIG. 11A, FIG. 11A is the electronics system block diagram for streaming soccer games on the internet from instrumented sports paraphernalia like instrumented soccer goals. FIG. 11A shows the block diagram for the system for streaming the video and audio of soccer games captured by the cameras and microphones aboard the instrumented sports paraphernalia like instrumented soccer goals. The primary component of the system for connecting the instrumented sports paraphernalia like soccer goals to the internet is the electronic package unit 1. The electronics package unit 1 enables the instrumented soccer goals to communicate with and stream on the internet. The electronics package unit 1 collects video and audio from the cameras 2 and microphones 3 aboard the instrumentation modules attached to the soccer goals, and channels the video and audio to the antenna 8 for wireless transmission to a Mobile Broadband Tower. The wireless topography for the system is shown in FIG. 11B.

The instrumented soccer goals are instrumented with instrumentation modules. An example of an instrumentation module is shown in FIG. 2A and FIG. 2B and FIG. 2C. Referring to FIG. 2A and FIG. 2B and FIG. 2C, each instrumentation module is equipped typically with four electronics package units 1. Each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology. Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

Referring to FIG. 11A, in some venues the internet is available to the instrumented soccer goals by a fiber optics/copper cable feed buried beneath the ground of the soccer field. In venues where the internet is available by such cable, the cable feed 10 is brought up from the ground and connected to the electronic package unit 1 via 9 using the cable connectors in the instrumentation module. If the cable feed is not already available, then it is installed as part of implementing this embodiment.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Each electronics package unit 1 referred to in FIG. 11A uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

There are typically four instrumentation modules per soccer goal. The soccer goals are instrumented using a multiplicity of sixteen TV cameras and seventeen microphones inside each of the four camera instrumentation modules. The TV cameras and microphones are housed inside each instrumentation module.

20 is a four camera instrumentation module that is attached to the front surface of the rear ground footing structural member 24 of the goal on the right side. Its line of sight is angled toward the left side of the entrance to the goal. Its purpose is to provide the televised and streaming viewing audiences with a view of the action coming in from the left side of the goal. 27 is an instrumentation module (that cannot be seen in this view because it is hidden behind 23) that is attached to the front surface of the rear ground footing structural member 23 of the goal on the left side. Its line of sight is angled toward the right side of the entrance to the goal. Its purpose is to provide the televised and streaming viewing audiences with a view of the action coming in from the right side of the goal. 21 is a four camera instrumentation module that is attached to the front surface of the rear ground footing structural member of the goal in its center. Its line of sight is angled toward the center of the entrance to the goal. Its purpose is to provide the televised and streaming viewing audiences with a view of the action coming in from the center of the goal. Together with the two instrumentation modules on the top crossbar, no matter where the soccer ball enters the goal net, the viewing audience will see it in 3-D, and hear it in surround sound.

Referring to the Preferred Embodiments Specified in FIG. 3, the externally instrumented soccer goal satisfies all of the following objectives:

It is an objective of the present invention that two instrumented soccer goals be mounted on the soccer field at their traditional locations.

It is an objective of the present invention that each instrumented soccer goal be comprised of a standard regulation soccer goal equipped with five instrumentation modules attached to it.

It is an objective of the present invention that the five instrumentation modules mounted on the soccer goal be identical to one another, where each of the instrumentation modules is equipped with four cameras and twenty three microphones, and each instrumentation module is able to simultaneously provide for 3D and surround sound.

It is an objective of the present invention that a standard regulation soccer goal be equipped with five instrumentation modules attached to it, where two instrumentation modules are attached to the front surface of the top crossbar structural member, and one instrumentation module is attached to the front surface of the rear ground footing structural member of the goal on the right side, and one instrumentation module is attached to the front surface of the rear ground footing structural member of the goal on the left side, and one instrumentation module is attached to the front surface of the rear ground footing structural member of the goal in the center.

It is an objective of the present invention that the instrumentation module that is attached to the front surface of the rear ground footing structural member of the goal on the right side of the goal, has its line of sight covering and looking at the left side opening of the goal, and that the instrumentation module that is attached to the front surface of the rear ground footing structural member of the goal on the left side of the goal, has its line of sight covering and looking at the right side opening of the goal.

It is an objective of the present invention that the instrumentation modules be mounted to the soccer goals using a Velcro sandwich.

It is an objective of the present invention that power cable and bi-directional fiber optics/copper cable carrying the internet, be buried in the ground beneath the soccer field, and routed to the footing of each of the soccer goals.

It is an objective of the present invention that power cable and bi-directional fiber optics/copper cable connected to a remote base station via an antenna array relay junction, be buried in the ground beneath the soccer field, and routed to the footing of each of the soccer goals.

It is an objective of the present invention that power cable and fiber optics/copper cable be buried in the ground beneath the soccer goals carrying the internet, be routed up from the ground through the base footing of the soccer goals, and connected to the five instrumentation modules mounted on the soccer goals thereby connecting them to stream on the internet to subscribers.

It is an objective of the present invention that power cable and fiber optics/copper cable bi-directional communication links to the remote base station, be buried in the ground beneath the soccer goals, and be routed up from the ground through the base footing of the soccer goals, and connected to the five instrumentation modules mounted on the soccer goals, thereby connecting them to televise to the remote base station to broadcast to a TV viewing audience.

It is an objective of the present invention to enable the cameraman to set the tilt angle of the instrumentation modules on the mounting surfaces of the goals so the camera's lines of sight can be angled and aligned.

It is an objective of the present invention to enable the cameraman in the remote base station to software select either the wireless mode of communication, and/or the fiber optics/copper cable mode of communication between the instrumented soccer goals and the remote base station by sending a control signal to the instrumented soccer goals.

It is an objective of the present invention to enable the cameraman to select either the wireless mode of communication, and/or the fiber optics/copper cable mode of communication between the instrumented soccer goals and the remote base station by physically setting a switch in the bottom of the instrumentation modules with access through the bottom of the instrumentation modules on the goals.

It is an objective of the present invention to enable the cameraman to software select either the wireless mode of communication, and/or the fiber optics/copper cable mode of communication between the instrumented soccer goals and the remote base station by sending a control signal to the instrumented soccer goals from his hand held remote.

FIG. 4

The detailed physical elements disclosed in the internally instrumented soccer goal drawing shown in FIG. 4 are identified as follows: 1 is the internally instrumented soccer goal with five internally mounted four camera instrumentation modules. 2 is a four camera instrumentation module. 3 is an optical window. 4 is an optical window. 5 is an optical window. 6 is an optical window. 7 is the horizontal crossbar structural member of the internally instrumented soccer goal. 8 is a four camera instrumentation module. 9 is an optical window. 10 is an optical window. 11 is an optical window. 12 is an optical window. 13 is the right side vertical structural member. 14 is the soccer netting on the right side. 15 is the soccer field ground. 16 is the goalkeeper/goalie. 17 is the soccer netting on the left side. 18 is the left top side bar structural member. 19 is the soccer netting on the rear side. 20 is an RF wireless antenna. 21 is an RF wireless antenna. 22 is the forward facing surface of 7. 23 is the ground footing structural member on the left side. 24 is the rear ground footing structural member of the goal. 25 is the ground footing structural member on the rear side. 26 is a four camera instrumentation module that is centered on 25. 27 is a four camera instrumentation module. 28 is an RF wireless antenna. 29 is an RF wireless antenna. 30 is an instrumentation module that is mounted inside the rear ground footing structural member of the goal on the left side (and cannot be seen).

FIG. 4 shows a view of an instrumented soccer goal equipped with five internally mounted four camera instrumentation modules.

In a preferred embodiment, the instrumentation modules are mounted inside the tubing structure of the soccer goal's structural members. It is contemplated that the present invention affords the viewing audience with the ability to see and hear unique views and sounds of the soccer game which will enhance their viewing pleasure beyond the prior art. It is further contemplated that the instrumentation modules are made easily removable and replaceable for maintenance and repair, and that their size, color, shape, orientation and appearance does not pose a distraction to the players or an impediment to the game.

The present invention contemplates that the instrumentation package assembly within the instrumented sports paraphernalia be instrumented with a transceiver and antenna capable of transmitting radio signals encoded with the picture and sound information to a remote base station via an antenna array relay junction. The present invention contemplates that instrumented sports paraphernalia, that are in play on the playing field during professional league games and player training sessions, are instrumented with cameras and microphones enabling them to acquire pictures and sounds of the players from amongst the players on the playing field. Electronics within the instrumentation package assembly televises the pictures and sounds to a remote base station via an antenna array relay junction.

Soccer goals are frequently made of tubular aluminum or steel structural members. Typically two or more instrumentation modules 2 and 8 are inserted directly inside the hollow tubular structure of the top horizontal crossbar member 7 of the soccer goal. The instrumentation modules 2 and 8 are inserted into the hollow tubular member 7 through a machined rectangular aperture in its face 22. FIG. 4 shows two instrumentation modules 2 and 8 mounted directly inside the tubular structure of the top horizontal crossbar member 7 of the soccer goal. An instrumentation module is typically positioned at either end of the top horizontal crossbar member 7 to give the widest coverage of the soccer playing field without being obscured by the goal keeper. The cameras within the instrumentation modules 2 and 8 peer out onto the soccer field through optical windows 3, 4, 5, 6, 9, 10, 11 and 12 which are flush with the front forward facing surface 22 of 7. These vantage points allow the cameras and microphones to see and hear soccer balls coming into the net from both sides of the field.

Referring to FIG. 4, the present invention contemplates instrumented soccer goals, which when stationed on any soccer playing field at their traditional locations can both wirelessly and/or by using fiber optics/copper cable connectivity, autonomously televise soccer under the command and control of a remote base station. The remote base station is disclosed in FIG. 30A and FIG. 30B, and FIG. 31A and FIG. 31B, and FIG. 32A and FIG. 32B, and FIG. 35A, and FIG. 35B, and FIG. 35C, and FIG. 7 and FIG. 8 of the present invention.

The instrumentation module has six sides. When mounted internally inside the top horizontal crossbar member 7 of the soccer goal as shown in FIG. 4; the side with the four cameras faces forward toward the playing field past surface 22.

Referring to FIG. 4, the instrumentation modules 2 and 8 are loaded into the top hollow tubular structure of the soccer goal's horizontal crossbar member 7 through rectangular apertures. The cross-sections of the instrumentation modules 2 and 8 are rectangular. The rectangular apertures are machined into the face 22 of the goal's top horizontal crossbar member 7. The dimensions of the apertures are machined to match the cross-sectional dimensions of the instrumentation modules. The instrumentation modules are loaded into the apertures and nested inside the tubular structure with the plane of their optical windows flush with face 22 of the goal's horizontal crossbar member 7. The instrumentation modules can be easily unloaded from their nests and replaced with a replacement.

The antennas 20 and 21 are mounted to the top of 7 and are pointed skyward. The purpose of antennas 20 and 21 is to both bi-directionally transmit and receive control signals between the instrumentation module's and the antenna array relay junction in the sports stadium/arena, and transmit TV signals from the instrumentation module's to the antenna array relay junction in the sports stadium. The antennas 20 and 21 are necessary whenever the instrumentation modules 2 and 8 are mounted inside the top horizontal crossbar member's 7 metal tubing because the metal tubing interferes with the radiation pattern of the internal antennas located within the instrumentation modules and prevents them from transmitting and receiving. The antennas 20 and 21 have electrical connectors that are hooked up to the instrumentation modules via the instrumentation module's copper cable connectors. If electrical power is available on the playing field, its cabled wiring is routed up from the ground through the metal tubular structure of the goals and into the top horizontal crossbar member of the goal and connected to the instrumentation modules using the copper cable connectors. If a bi-directional fiber optics/copper cable communications network is made available beneath the soccer playing field, its wiring is routed up from the ground through the goal's metal tubing structure through its footing into the top horizontal crossbar member 7 of the goal 1 and connected to the instrumentation module using the instrumentation module's fiber optics/copper cable connector.

Referring to FIG. 4, in a preferred embodiment a fiber optics cable/copper cable bi-directional communications link is buried underneath the ground of the playing field/rink. In addition to being a bi-directional communications link, the copper cable carries electrical power as well. The soccer goals are constructed with fiber optics/copper cable connectors built into their ground footings which connect to the fiber optics cable/copper cable bi-directional communications and power link mating cable connectors that come up from the ground beneath their goal footings. The soccer goals have fiber optics cable and copper cable running up from the connectors in their ground footings and through their tubular structure to fiber optics/copper cable connectors in the top horizontal crossbar member 7 where the instrumentation modules are located. The fiber optics/copper cable connectors in the top horizontal crossbar member 7 are then mated with the instrumentation module's fiber optics/copper cable connectors by passing the fiber optics cable/copper cable through the openings in the instrumentation modules and mating them to the two fiber optics cable/copper cable connectors within the instrumentation modules.

Referring to FIG. 4, looking down from the vantage point in the top horizontal crossbar member 7, the audience will see the goal keeper scramble and dive onto the ground to prevent the soccer ball from being kicked by a player into the net. The audience will see and hear this event from the vantage point of the cameras and microphones within the instrumentation modules 2 and 8 located on the top horizontal crossbar member 7 of the goal which is the audience's virtual vantage point above and behind the goal keeper. This action packed view of the soccer ball has never before been seen and heard by a viewing audience. The viewing audience sees the action in 3-D and hears the action in surround sound.

Referring to FIG. 4, in a further preferred embodiment, the present invention contemplates an instrumented soccer goal wherein three instrumentation modules 26, 27 and 30 are mounted within the ground footing structural members 24, 25 and 23 of the goal. These instrumentation modules permit the viewing audience to see action coming into the end corners of the soccer goal. From the vantage point of the instrumentation modules 26, 30 and 27 at ground level below the body of the goal keeper, the viewing audience can see the face of the strained offensive players darting for the net. The viewing audience can see details looking up at the goalkeeper as he attempts to cover the play. The viewing audience can see the soccer ball pass above the cameras as a goal is scored. This action packed view of the soccer ball has never before been seen and heard by a viewing audience. The viewing audience sees the action in 3-D and hears the action in surround sound.

The instrumentation modules 26, 30 and 27 are inserted directly inside the hollow tubular structure of the ground footing structural members 24, 25 and 23 of the soccer goal. The instrumentation modules 26, 30 and 27 are inserted into the hollow tubular members 24, 25 and 23 through machined rectangular apertures in their faces.

In summary, the instrumented soccer goal 1 shown in FIG. 4 provides video and sound to the viewing audience that is so exciting and realistic that it makes the individual members of the audience feel that they are with the goalie in the game. In many ways this is more exciting than viewing the soccer game in person from the stands of the soccer stadium. Therefore, the instrumented soccer goal not only provides a step forward in entertainment, but it also provides a great training tool to prospective soccer players by giving them the true life visual and auditory sensations and feelings of being in the game without actually being there.

Referring to FIG. 4, when a player is guiding the soccer ball toward the goalkeeper, the four 3-D stereo camera pairs mounted in the two instrumentation modules inside the instrumented soccer goal can see and hear where he is coming from. The cameras can see and hear the player as he runs and collides with the instrumented soccer goal. The cameras can see and hear the player as he is sliding on the ground into the instrumented soccer goal. The cameras can see and hear the scuffle between the goalkeeper and the player as the goalkeeper blocks the player before the player pushes the soccer ball into the net with his feet and scores a goal. From the vantage point of the instrumentation modules looking down on the soccer field, the viewing audience can see the face and hear the panting of the strained player's body as he darts for the net. The viewing audience can see and hear details of the goalkeeper as he attempts to cover the play. The viewing audience can see a close-up of the goalkeeper's attempt to cover the play. As the soccer ball is passed between the approaching players, the viewing audience can see and hear the goalkeeper rustle to reach down to block and scoop up the ball close to the net. The camera's vantage point at the instrumented soccer goal on the playing field gives the audience a viewing and hearing angle of the game never seen or heard before by television viewing audiences. The instrumented soccer goal's cameras and microphones give the TV viewing audience unending contemporaneous shots and sounds that get across a sense of the action of being there—like a player in the game that prior art cameras and microphones looking on from their disadvantaged viewing points from outside the playing field cannot get across.

Referring to FIG. 4, except for the instrumentation module's eight small optical windows 3, 4, 5, 6, 9, 10, 11 and 12, the instrumented soccer goal's outward appearance looks substantially the same as the conventional regulation goals, and plays the same as these goals, and meets the official requirements for these goals and is interchangeable with them in all venues as substitutes.

Referring to FIG. 4, in a further preferred embodiment, the present invention contemplates an instrumented soccer goal, which when located on any playing field, can wirelessly by RF radio and/or by fiber optics cable and/or by coaxial copper cable, autonomously televise soccer games, soccer practice and warm-up sessions under the command and control of a remote base station. The remote base station is disclosed in FIG. 30A and FIG. 30B and FIG. 31A and FIG. 31B and FIG. 32A and FIG. 32B, and FIG. 35A and FIG. 35B, and FIG. 35C. In addition to adding an element to the entertainment of the TV viewing audience during games, this embodiment serves to aid the players and the coaches in evaluating the quality of the player's progress, prowess, fitness and "stuff" in the game of soccer. This action packed view of the soccer ball has never before been seen and heard by a viewing audience. The viewing audience sees the action in 3-D and hears the action in surround sound.

In yet another preferred embodiment, the instrumented soccer goal shown in FIG. 4 is equipped to wirelessly stream its audio and video onto the internet.

The instrumented soccer goal is instrumented with instrumentation modules.

The instrumentation modules contain an electronics circuit called an electronics package unit. The electronics package unit is shown in FIG. 11A. The electronics package unit enables the instrumented soccer goal to communicate with and stream on the internet.

The instrumentation modules are shown in FIG. 2A and FIG. 2B and FIG. 2C.

Referring to FIG. 11B, FIG. 11B shows the architecture of the streaming system that conveys high definition video and multi-dimensional audio from instrumented soccer goals, captured by the cameras and microphones contained within their instrumentation modules, to stream to an audience which may or may not have spectators 7, 8, 9 and 10 respectively present at the games but wish to subscribe and view the games remotely on their personal wireless display devices. The electronics package units inside the instrumentation modules communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the soccer playing field who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given soccer field of play currently broadcasted.

Referring to FIG. 11A, FIG. 11A is the electronics system block diagram for streaming soccer games on the internet from instrumented sports paraphernalia like instrumented soccer goals. FIG. 11A shows the block diagram for the system for streaming the video and audio of soccer games captured by the cameras and microphones aboard the instrumented sports paraphernalia like instrumented soccer goals. The primary component of the system for connecting the instrumented sports paraphernalia like soccer goals to the internet is the electronic package unit 1. The electronics package unit 1 enables the instrumented soccer goals to communicate with and stream on the internet. The electronics package unit 1 collects video and audio from the cameras 2 and microphones 3 aboard the instrumentation modules attached to the soccer goals, and channels the video and audio to the antenna 8 for wireless transmission to a Mobile Broadband Tower. The wireless topography for the system is shown in FIG. 11B.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

The instrumented soccer goals are instrumented with instrumentation modules. An example of an instrumentation module is shown in FIG. 2A and FIG. 2B and FIG. 2C. Referring to FIG. 2A and FIG. 2B and FIG. 2C, each instrumentation module is equipped typically with four electronics package units 1. Each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology. Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

20 is a four camera instrumentation module that is attached to the front surface of the rear ground footing structural member of the goal on the right side. Its line of sight is angled toward the left side of the entrance to the goal. Its purpose is to provide the televised and streaming viewing audiences with a view of the action coming in from the left side of the goal. 27 is an instrumentation module (that cannot be seen in this view because it is hidden behind 23) that is attached to the front surface of the rear ground footing structural member 23 of the goal on the left side. Its line of sight is angled toward the right side of the entrance to the goal. Its purpose is to provide the televised and streaming viewing audiences with a view of the action coming in from the right side of the goal.

Referring to FIG. 11A, in some venues the internet is available to the instrumented soccer goals by a fiber optics/copper cable feed buried beneath the ground of the soccer field. In venues where the internet is available by such cable, the cable feed 10 is brought up from the ground and connected to the electronic package unit 1 via 9 using the cable connectors in the instrumentation module.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Each electronics package unit 1 referred to in FIG. 11A uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

There are typically four instrumentation modules per soccer goal. The soccer goals are instrumented using a multiplicity of sixteen TV cameras and twenty three microphones inside each of the four camera instrumentation modules. The TV cameras and microphones are housed inside each instrumentation module.

27 is a four camera instrumentation module that is mounted inside the front surface of the rear ground footing structural member 24 of the goal on the right side. Its line of sight is angled toward the left side of the entrance to the goal. Its purpose is to provide the televised and streaming viewing audiences with a view of the action coming in from the left side of the goal. 30 is an instrumentation module (that cannot be seen in this view because it is hidden behind 23) that is mounted inside the front surface of the rear ground footing structural member 23 of the goal on the left side. Its line of sight is angled toward the right side of the entrance to the goal. Its purpose is to provide the televised and streaming viewing audiences with a view of the action coming in from the right side of the goal. 26 is a four camera instrumentation module that is attached to the front surface of the rear ground footing structural member of the goal in its center. Its line of sight is angled toward the center of the entrance to the goal. Its purpose is to provide the televised and streaming viewing audiences with a view of the action coming in from the center of the goal. Together with the two instrumentation modules on the top crossbar, no matter where the soccer ball enters the goal net, the viewing audience will see it in 3-D, and hear it in surround sound.

Referring to the Preferred Embodiments Specified in FIG. 4, the internally instrumented soccer goal satisfies all of the following objectives:

It is an objective of the present invention that two instrumented soccer goals be mounted on the soccer fields at their traditional locations.

It is an objective of the present invention that each instrumented soccer goal be comprised of a standard regulation soccer goal equipped with five instrumentation modules mounted inside it.

It is an objective of the present invention that the five instrumentation modules mounted inside the soccer goal be identical to one another, where each of the instrumentation modules is equipped with four cameras and seventeen microphones, and each instrumentation module is able to simultaneously provide for 3D and surround sound.

It is an objective of the present invention that a standard regulation soccer goal be equipped with five instrumentation modules mounted inside it, where two instrumentation modules are mounted inside the front surface of the top crossbar structural member, and one instrumentation module is mounted inside the front surface of the rear ground footing structural member of the goal on the right side, and one instrumentation module is mounted inside the front surface of the rear ground footing structural member of the goal on the left side, and one instrumentation module is mounted inside the front surface of the rear ground footing structural member of the goal in the center.

It is an objective of the present invention that the instrumentation module that is mounted inside the front surface of the rear ground footing structural member of the goal on the right side of the goal, has its line of sight covering and looking at the left side opening of the goal, and that the instrumentation module that is mounted inside the front surface of the rear ground footing structural member of the goal on the left side of the goal, has its line of sight covering and looking at the right side opening of the goal.

It is an objective of the present invention that the instrumentation modules be mounted inside the soccer goals in their own rectangular hollow cavities.

It is an objective of the present invention that power cable and bi-directional fiber optics/copper cable carrying the internet, be buried in the ground beneath the soccer field, and routed to the footing of each of the soccer goals.

It is an objective of the present invention that power cable and bi-directional fiber optics/copper cable connected to a remote base station via an antenna array relay junction, be buried in the ground beneath the soccer field, and routed to the footing of each of the soccer goals.

It is an objective of the present invention that power cable and fiber optics/copper cable be buried in the ground beneath the soccer goals carrying the internet, be routed up from the ground through the base footing of the soccer goals, and connected to the five instrumentation modules mounted on the soccer goals thereby connecting them to stream on the internet to subscribers.

It is an objective of the present invention that power cable and fiber optics/copper cable bi-directional communication links to the remote base station, be buried in the ground beneath the soccer goals, and be routed up from the ground through the base footing of the soccer goals, and connected to the five instrumentation modules mounted inside the soccer goals, thereby connecting them to televise to the remote base station to broadcast to a TV viewing audience.

It is an objective of the present invention to enable the cameraman to set the tilt angle of the instrumentation modules mounted inside of the goals so the camera's lines of sight can be angled and aligned.

It is an objective of the present invention to enable the cameraman in the remote base station to software select either the wireless mode of communication, and/or the fiber optics/copper cable mode of communication between the instrumented soccer goals and the remote base station by sending a control signal to the instrumented soccer goals.

It is an objective of the present invention to enable the cameraman to select either the wireless mode of communication, and/or the fiber optics/copper cable mode of communication between the instrumented soccer goals and the remote base station by physically setting a switch in the bottom of the instrumentation modules with access through the bottom of the instrumentation modules on the goals.

It is an objective of the present invention to enable the cameraman to software select either the wireless mode of communication, and/or the fiber optics/copper cable mode of communication between the instrumented soccer goals and the remote base station by sending a control signal to the instrumented soccer goals from his hand held remote.

FIG. 5

The detailed physical elements disclosed in the internally instrumented ice hockey goal drawing shown in FIG. 5 are identified as follows: 1 is the internally instrumented ice hockey goal with five internally mounted four camera instrumentation modules. 2 is a four camera instrumentation module. 3 is an optical window. 4 is an optical window. 5 is an optical window. 6 is an optical window. 7 is the ice hockey goal netting. 8 is a four camera instrumentation module. 9 is an optical window. 10 is an optical window. 11 is an optical window. 12 is an optical window. 13 is the right side vertical structural member. 14 is a two camera instrumentation module inside the base of 13. 15 is the ice on the hockey rink. 16 is the goaltender. 17 is the ice hockey goal netting on the left side of the goal. 18 is the ground footing structural member of the goal. 19 is the top horizontal crossbar structural member of the internally instrumented ice hockey goal. 20 is an RF wireless antenna. 21 is an RF wireless antenna. 22 is the forward facing surface of 19. 23 is a four camera instrumentation module that is centered on 18. 24 is an RF wireless antenna. 25 is a four camera instrumentation module. 26 is an RF wireless antenna. 27 is a two camera instrumentation module. 28 is an RF wireless antenna. 29 is an ice hockey stick. 30 is an instrumentation module that is mounted inside the rear ground footing structural member of the goal on the left side (and cannot be seen).

FIG. 5 shows a view of an instrumented ice hockey goal with five internally mounted four-camera instrumentation modules and two internally mounted two-camera instrumentation modules.

In a preferred embodiment, the instrumentation modules are mounted inside the tubing structure of the instrumented ice hockey goal's structural members. It is contemplated that the present invention affords the viewing audience with the ability to see and hear unique views and sounds of the ice hockey game which will enhance their viewing pleasure beyond the prior art. It is further contemplated that the instrumentation modules are made easily removable and replaceable for maintenance and repair, and that their size, color, shape, orientation and appearance does not pose a distraction to the players or an impediment to the game.

The present invention contemplates that instrumented sports paraphernalia like ice hockey goals be instrumented with instrumentation modules like those disclosed in FIG. 2A and FIG. 2B and FIG. 2C. The instrumentation modules contain transceivers and antennas capable of transmitting televised radio signals, encoded with picture and sound information gathered by their cameras and microphones, to a remote base station via an antenna array relay junction. The present invention contemplates that instrumented sports paraphernalia, that are in play on the playing field during professional league games and player training sessions, are instrumented with cameras and microphones enabling them to acquire pictures and sounds of the players from their positions and vantage points amongst the players on the playing field. Electronics within the instrumentation modules televises the pictures and sounds to a remote base station via an antenna array relay junction.

Ice hockey goals are frequently made of hollow tubular aluminum or steel structural members. Typically two or more instrumentation modules are mounted directly inside the hollow tubular structure of the top horizontal crossbar member 7 of the internally instrumented ice hockey goal 1. FIG. 5 shows two instrumentation modules 2 and 8 mounted directly inside the tubular structure of the top horizontal crossbar member 7 of the ice hockey goal net. Instrumentation module like 2 and 8 are typically positioned inside the instrumented ice hockey goal at either end of the top horizontal crossbar member 7 to give the widest coverage of the ice rink without being obscured by the goal handler. The cameras within the instrumentation modules 2 and 8 peer out onto the ice hockey rink through optical windows 3, 4, 5, 6, 9, 10, 11 and 12 which are flush with the front forward facing surface 22 of 7. These vantage points allow the cameras and microphones to see and hear pucks coming into the net from both sides of the rink.

Referring to FIG. 5, except for the presence of optical windows 3, 4, 5, 6, 9, 10, 11 and 12, the internally instrumented ice hockey goal's 1 outward appearance looks substantially the same as the conventional regulation goals, and plays the same as these goals, and meets the official requirements for these goals and is interchangeable with them in all venues as substitutes.

Referring to FIG. 5, the present invention contemplates instrumented ice hockey goals, which when stationed on any rink at their traditional locations can both wirelessly and/or by using fiber optics/copper cable connectivity, autonomously televise ice hockey games under the command and control of a remote base station. The remote base station is disclosed in FIG. 30A and FIG. 30B, and FIG. 31A and FIG. 31B, and FIG. 32A and FIG. 32B, and FIG. 35A, and FIG. 35B, and FIG. 35C, and FIG. 7 and FIG. 8 of the present invention.

The instrumentation module has six sides. When mounted internally inside the top horizontal crossbar member 7 of the ice hockey goal, the side having the optical windows faces forward toward the playing field flush with 22.

Referring to FIG. 5, the instrumentation modules are loaded into the hollow tubular structure of the ice hockey goal's horizontal crossbar member 7 through rectangular apertures. The cross-sections of the instrumentation modules 2 and 8 are rectangular. The rectangular apertures are machined into the face 22 of the goal's top horizontal crossbar member 7. The dimensions of the apertures are machined to match the cross-sectional dimensions of the instrumentation modules. The instrumentation modules are loaded into the apertures and nested inside the tubular structure with the plane of their optical windows flush with face 22 of the goal's horizontal crossbar member 7. The instrumentation modules can be easily unloaded from their nests and replaced with a replacement.

The wireless RF antennas 20 and 21 are mounted to the top of 7 and are pointed skyward. The purpose of antennas 20 and 21 is to both bi-directionally transmit and receive control signals between the instrumentation module's and the antenna array relay junction in the sports arena, and transmit TV signals from the instrumentation module's to the antenna array relay junction in the sports arena. The antennas 20 and 21 are necessary whenever the instrumentation modules are mounted inside the horizontal crossbar member's 7 metal hollow tubing because the metal tubing interferes with the radiation pattern of the antennas within the instrumentation modules and prevents them from transmitting or receiving. The antennas 20 and 21 are hooked up to the instrumentation modules via the instrumentation module's copper cable connectors. If electrical power is available on the rink, its wiring is routed up from beneath the ice and through the hollow metal tubular structure of the goals and into the top horizontal crossbar member of the goal and connected to the instrumentation modules using its copper cable connectors. If a bi-directional fiber optics/copper cable communications network is available on the rink, its wiring is routed up from beneath the ice through the goal's hollow metal tubing structure into the top horizontal crossbar member of the goal 7 and connected to the instrumentation module using the instrumentation module's fiber optics/copper cable connector.

Referring to FIG. 5, in another preferred embodiment, the present invention contemplates an instrumented ice hockey goal wherein three instrumentation modules 23, 30 and 25 are mounted within the rear ground footing structural member 18 of the goal. These instrumentation modules permit the viewing audience to see action coming into the end corners of the goal. From the vantage point of the instrumentation modules 26, 30 and 27 at ground level below the body of the goal keeper, the viewing audience can see the face of the strained offensive players darting for the net. The viewing audience can see details looking up at the goalkeeper as he attempts to cover the play. The viewing audience can see the soccer ball pass above the cameras as a goal is scored. The instrumentation modules 26, 30 and 27 are inserted directly inside the hollow tubular structure of the rear ground footing structural member 18 of the soccer goal. The instrumentation modules 26, 30 and 27 are inserted into the hollow tubular member 18 through a machined rectangular aperture in its face.

Referring to FIG. 5, in yet another preferred embodiment, a fiber optics cable/copper cable bi-directional communications link is buried underneath the ice of the rink. In addition to being a bi-directional communications link, the copper cable carries electrical power as well. The ice hockey goals are constructed with fiber optics/copper cable connectors built into their footings which connect to the fiber optics cable/copper cable bi-directional communications and power link mating cable connectors that come up from the ice beneath the goal footings. The ice hockey goals have fiber optics cable and copper cable running up from the connectors in their footings and through their tubular structure to fiber optics/copper cable connectors in the top horizontal crossbar member 7 where the instrumentation modules are located. The fiber optics/copper cable connectors in the top horizontal crossbar member are then mated with the instrumentation module's fiber optics/copper cable connectors by passing the fiber optics cable/copper cable through the openings in the instrumentation modules and mating them to the two fiber optics cable/copper cable connectors within the instrumentation modules.

Referring to FIG. 5, looking down from the vantage point in the top horizontal crossbar member 7, the audience will see and hear the goal handler scramble and dive onto the ice to prevent the puck from being hit by a player into the net. The audience will see and hear this event from the vantage point of the cameras and microphones within the instrumentation modules 2 and 8 located on the top horizontal crossbar member 7 of the goal which is the audience's virtual vantage point above and behind the goal handler. This action packed view of the hockey puck has never before been seen and heard by a viewing audience. The viewing audience sees the action in 3-D and hears the action in surround sound.

Referring to FIG. 5, in yet a further preferred embodiment, the present invention contemplates an instrumented ice hockey goal, which when located on any ice rink, can wirelessly by RF radio and/or by fiber optics cable and/or by coaxial copper cable, autonomously televise ice hockey games, ice hockey practice and warm-up sessions under the command and control of a remote base station. The remote base station is disclosed in FIG. 30A and FIG. 30B and FIG. 31A and FIG. 31B and FIG. 32A and FIG. 32B, and FIG. 35A and FIG. 35B, and FIG. 35C. In addition to adding an element to the entertainment of the TV viewing audience during games, this embodiment serves to aid the players and the coaches in evaluating the quality of the player's progress, prowess, fitness and "stuff" in the game of ice hockey.

Referring to FIG. 5, the audience will see the ice hockey goaltender scramble and dive onto the ice to prevent the puck from being hit by a player into the net. The audience will see this event from the vantage point of the instrumentation modules 2 and 8 on the top horizontal crossbar member 7 of the goal which is the audience's virtual vantage point above and behind the goaltender. This action packed view of the ice hockey puck has never before been seen and heard by a viewing audience. The viewing audience sees the action in 3-D and hears the action in surround sound.

Referring to FIG. 5, when an offensive player is guiding the puck toward the goal handler, the four 3-D stereo camera pairs mounted in the two instrumentation modules inside the instrumented ice hockey goal can see and hear where he is coming from. The cameras can see and hear the player as he skates and collides with the instrumented goal and its goal handler. The cameras can see and hear the player as he is sliding on the ice into the instrumented soccer goal. The cameras can see and hear the scuffle between the goal handler and the player as the goal handler blocks the player before the player pushes the puck into the net and scores a goal. From the vantage point of the instrumentation modules looking down on the ice rink, the viewing audience can see the face and hear the panting of the strained player's body as he darts for the net. The viewing audience can see and hear details of the goal handler as he attempts to cover the play. The viewing audience can see a close-up of the goal handler attempt to cover the play. As the puck is passed between the approaching offensive players, the viewing audience can see and hear the goal handler rustle to reach down to block the puck close to the net. The camera's vantage point at the instrumented ice hockey goal on the ice with and among the players gives the audience a viewing and hearing angle of the game never seen or heard before by television viewing audiences. The instrumented ice hockey goal's cameras and microphones give the TV viewing audience unending contemporaneous shots and sounds that get across a sense of the action of being there—like a player in the game that prior art cameras and microphones looking on from their disadvantaged viewing points from outside the playing field cannot get across.

Referring to FIG. 5, except for the four small holes used for the optical windows 3, 4, 5, 6, 9, 10, 11 and 12 the instrumented ice hockey goal's outward appearance looks substantially the same as the conventional regulation goals, and plays the same as these goals, and meets the official requirements for these goals and is interchangeable with them in all venues as substitutes.

27 is a two camera instrumentation module.

In summary, the instrumented ice hockey goal 1 shown in FIG. 5 provides video and sound to the viewing audience that is so exciting and realistic that it makes the individual members of the audience feel that they are with the goaltender in the game. In many ways this is more exciting than viewing the game in person from the stands of the ice hockey stadium. Therefore, the instrumented ice hockey goal not only provides a step forward in entertainment, but it also provides a great training tool to prospective ice hockey players by giving them the true life visual and auditory sensations and feelings of being in the game without actually being there.

The instrumentation module 27 is constructed from one half the instrumentation module shown in FIG. 2A and FIG. 2B and FIG. 2C. The instrumentation module 27 is devised by physically dividing in half the four camera instrumentation module shown in FIG. 2A and FIG. 2B and FIG. 2C into two separate but equal two-camera instrumentation modules. The division takes place physically in the middle of FIG. 2A and FIG. 2B and FIG. 2C. The result is two smaller instrumentation modules. Each of the two smaller two camera instrumentation modules halves preserves all of the electronic functions of the four camera instrumentation module shown in FIG. 2A and FIG. 2B and FIG. 2C except that they are physically half the size and possess only two cameras rather than four, and eight microphones rather than nineteen. Since they are physically smaller they can easily be inserted into the base of the goal's vertical structural members like 1, as for example as shown in FIG. 5. This vantage point gives the stereo 3-D cameras and surround sound microphones of 27 the ability to capture rare unique views and sounds from the edge of the ice hockey goal as their cameras and microphones look out onto the ice rink from the edge of the goal. The antenna 28 is external to 1 and is used with 27 because the vertical structural members are likely to be metal which would prevent transmission of RF signals emanating from 27 from inside 1.

In yet an additional preferred embodiment, the instrumented ice hockey goal shown in FIG. 5 is equipped to wirelessly stream its audio and video onto the internet.

The instrumented ice hockey goal is instrumented with instrumentation modules.

The instrumentation modules contain an electronics circuit called an electronics package unit. The electronics package unit is shown in FIG. 11A. The electronics package unit enables the instrumented ice hockey goal to communicate with and stream on the internet.

The instrumentation modules are shown in FIG. 2A and FIG. 2B and FIG. 2C.

Referring to FIG. 11B, FIG. 11B shows the architecture of the streaming system that conveys high definition video and multi-dimensional audio from instrumented ice hockey goals, captured by the cameras and microphones contained within their instrumentation modules, to stream to an audience which may or may not have spectators 7, 8, 9 and 10 respectively present at the games but wish to subscribe and view the games remotely on their personal wireless display devices. The electronics package units inside the instrumentation modules communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the ice hockey rink who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given ice hockey rink of play currently broadcasted.

Referring to FIG. 11A, FIG. 11A is the electronics system block diagram for streaming ice hockey games on the internet from instrumented sports paraphernalia like instrumented ice hockey goals. FIG. 11A shows the block diagram for the system for streaming the video and audio of soccer games captured by the cameras and microphones aboard the instrumented sports paraphernalia like instrumented ice hockey goals. The primary component of the system for connecting the instrumented sports paraphernalia like ice hockey goals to the internet is the electronic package unit 1. The electronics package unit 1 enables the instrumented ice hockey goals to communicate with and stream on the internet. The electronics package unit 1 collects video and audio from the cameras 2 and microphones 3 aboard the instrumentation modules attached to the ice hockey goals, and channels the video and audio to the antenna 8 for wireless transmission to a Mobile Broadband Tower. The wireless topography for the system is shown in FIG. 11B.

The instrumented ice hockey goals are instrumented with instrumentation modules. An example of an instrumentation module is shown in FIG. 2A and FIG. 2B and FIG. 2C. Referring to FIG. 2A and FIG. 2B and FIG. 2C, each instrumentation module is equipped typically with four electronics package units 1. Each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology. Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

Referring to FIG. 11A, in some venues the internet is available to the instrumented ice hockey goals by a fiber optics/copper cable feed buried beneath the ice of the ice hockey rink. In venues where the internet is available by such cable, the cable feed 10 is brought up from the ground and connected to the electronic package unit 1 via 9 using the cable connectors in the instrumentation module. If the cable feed is not already available, then it is installed as part of implementing this embodiment.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Each electronics package unit 1 referred to in FIG. 11A uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

25 is a four camera instrumentation module that is mounted inside the front surface of the rear ground footing structural member 18 of the goal on the right side. Its line of sight is angled toward the left side of the entrance to the goal. Its purpose is to provide the televised and streaming viewing audiences with a view of the action coming in from the left side of the goal. 30 is an instrumentation module (that cannot be seen in this view because it is hidden behind 18) that is mounted inside the front surface of the rear ground footing structural member 18 of the goal on the left side. Its line of sight is angled toward the right side of the entrance to the goal. Its purpose is to provide the televised and streaming viewing audiences with a view of the action coming in from the right side of the goal. 23 is a four camera instrumentation module that is attached to the front surface of the rear ground footing structural member 18 of the goal in its center. Its line of sight is angled toward the center of the entrance to the goal. Its purpose is to provide the televised and streaming viewing audiences with a view of the action coming in from the center of the goal. Together with the two instrumentation modules inside the top crossbar, no matter where the ice hockey puck enters the goal net, the viewing audience will see it in 3-D, and hear it in surround sound. 27 and 14 are small two-camera instrumentation modules that are mounted inside the face of the footings of the structural members 1 and 13. The lines of sight of their cameras can be adjusted by the cameraman. The purpose of these instrumentation modules is to permit the viewing audience to witness player action in 3-D and surround sound coming into the net from directly in front of the goals near their ends.

Referring to the Preferred Embodiments Specified in FIG. 5, the internally instrumented ice hockey goal satisfies all of the following objectives:

It is an objective of the present invention that two instrumented ice hockey goals be mounted on the ice hockey rink at their traditional locations.

It is an objective of the present invention that each instrumented ice hockey goal be comprised of a standard regulation ice hockey goal equipped with five instrumentation modules mounted inside it.

It is an objective of the present invention that the five instrumentation modules mounted inside the ice hockey goal be identical to one another, where each of the instrumentation modules is equipped with four cameras and twenty three microphones, and each instrumentation module is able to simultaneously provide for 3D and surround sound.

It is an objective of the present invention that an internally mounted two-camera instrumentation module is mounted inside each of the bases of the two vertical structural members.

It is an objective of the present invention that a standard regulation ice hockey goal be equipped with five instrumentation modules mounted inside it, where two instrumentation modules are mounted inside the front surface of the top crossbar structural member, and one instrumentation module is mounted inside the front surface of the rear ground footing structural member of the goal on the right side, and one instrumentation module is mounted inside the front surface of the rear ground footing structural member of the goal on the left side, and one instrumentation module is mounted inside the front surface of the rear ground footing structural member of the goal in the center.

It is an objective of the present invention that the instrumentation module that is mounted inside the front surface of the rear ground footing structural member of the goal on the right side of the goal, has its line of sight covering and looking at the left side opening of the goal, and that the instrumentation module that is mounted inside the front surface of the rear ground footing structural member of the goal on the left side of the goal, has its line of sight covering and looking at the right side opening of the goal.

It is an objective of the present invention that the instrumentation modules be mounted inside the ice hockey goals in their own rectangular hollow cavities.

It is an objective of the present invention that power cable and bi-directional fiber optics/copper cable carrying the internet, be buried in the ground beneath the ice hockey rink, and routed to the footing of each of the ice hockey goals.

It is an objective of the present invention that power cable and bi-directional fiber optics/copper cable connected to a remote base station via an antenna array relay junction, be buried in the ground beneath the ice hockey rink, and routed to the footing of each of the ice hockey goals.

It is an objective of the present invention that power cable and fiber optics/copper cable be buried in the ground beneath the ice hockey goals carrying the internet, be routed up from the ground through the base footing of the ice hockey goals, and connected to the five instrumentation modules mounted on the ice hockey goals thereby connecting them to stream on the internet to subscribers.

It is an objective of the present invention that power cable and fiber optics/copper cable bi-directional communication links to the remote base station, be buried in the ground beneath the ice hockey goals, and be routed up from the ground through the base footing of the ice hockey goals, and connected to the five instrumentation modules mounted inside the ice hockey goals, thereby connecting them to televise to the remote base station to broadcast to a TV viewing audience.

It is an objective of the present invention to enable the cameraman to set the tilt angle of the instrumentation modules mounted inside of the goals so the camera's lines of sight can be angled and aligned.

It is an objective of the present invention to enable the cameraman in the remote base station to software select either the wireless mode of communication, and/or the fiber optics/copper cable mode of communication between the instrumented ice hockey goals and the remote base station by sending a control signal to the instrumented ice hockey goals.

It is an objective of the present invention to enable the cameraman to select either the wireless mode of communication, and/or the fiber optics/copper cable mode of communication between the instrumented ice hockey goals and the remote base station by physically setting a switch in the bottom of the instrumentation modules with access through the bottom of the instrumentation modules on the goals.

It is an objective of the present invention to enable the cameraman to software select either the wireless mode of communication, and/or the fiber optics/copper cable mode of communication between the instrumented ice hockey goals and the remote base station by sending a control signal to the instrumented ice hockey goals from his hand held remote.

FIG. 6

The detailed physical elements disclosed in the externally and internally instrumented ice hockey goal drawing shown in FIG. 6 are identified as follows: 1 is the externally instrumented ice hockey goal with five externally mounted four camera instrumentation modules. 2 is a four camera instrumentation module. 3 is an optical window. 4 is an optical window. 5 is an optical window. 6 is an optical window. 7 is the horizontal crossbar structural member of the externally instrumented ice hockey goal. 8 is a four camera instrumentation module. 9 is an optical window. 10 is an optical window. 11 is an optical window. 12 is an optical window. 13 is the base of the right side vertical structural member. 14 is the ground footing structural member. 15 is the ice on the hockey rink. 16 is the goaltender. 17 is the ice hockey goal netting on the left side. 18 is the ice hockey goal netting on the rear. 19 is the goal netting. 20 is the base of the ground footing of the left side vertical structural member. 21 is a four camera instrumentation module that is centered on 14. 22 is a four camera instrumentation module. 23 is the right side vertical structural member. 24 is an ice hockey stick. 25 is a two camera internally mounted instrumentation module. 26 is an RF antenna for televising and for streaming. 27 is an enlarged view of the two-camera instrumentation module internally mounted in the base of the right side vertical structural member. 28 is the two-camera instrumentation module. 29 is an RF antenna for televising and for streaming. 30 is an instrumentation module that is attached to the front surface of the rear ground footing structural member of the goal on the left side (and cannot be seen).

FIG. 6 shows a view of an instrumented ice hockey goal with five externally mounted four-camera instrumentation modules and two internally mounted two-camera instrumentation modules.

In a preferred embodiment, the instrumentation modules are mounted on and attached to the instrumented ice hockey goal's structural members. It is contemplated that the present invention affords the viewing audience with the ability to see and hear unique views and sounds of the ice hockey game which will enhance their viewing pleasure beyond the prior art. It is further contemplated that the instrumentation modules are made easily removable and replaceable for maintenance and repair, and that their size, color, shape, orientation and appearance does not pose a distraction to the players or an impediment to the game.

The present invention contemplates that instrumented sports paraphernalia like ice hockey goals be instrumented with instrumentation modules like those disclosed in FIG. 2A and FIG. 2B and FIG. 2C. The instrumentation modules contain transceivers and antennas capable of transmitting radio signals, encoded with picture and sound information gathered by their cameras and microphones, to a remote base station via an antenna array relay junction. The present invention contemplates that instrumented sports paraphernalia, that are in play on the playing field during professional league games and player training sessions, are instrumented with cameras and microphones enabling them to acquire pictures and sounds of the players from their positions and vantage points amongst the players on the playing field. Electronics within the instrumentation modules televises the pictures and sounds to a remote base station via an antenna array relay junction.

Ice hockey goals are frequently made of hollow tubular aluminum or steel structural members. Two or more instrumentation modules are mounted directly on the hollow tubular structure of the top horizontal crossbar member 7 of the externally instrumented ice hockey goal 1. FIG. 6 shows two instrumentation modules 2 and 8 mounted directly on the front forward facing surface 22 of the tubular structure of the top horizontal crossbar member 7 of the ice hockey goal net. Instrumentation module like 2 and 8 are typically positioned on the instrumented ice hockey goal at either end of the top horizontal crossbar member 7 to give the widest coverage of the ice rink without being obscured by the goal handler. The cameras within the instrumentation modules 2 and 8 peer out onto the ice hockey rink through optical windows 3, 4, 5, 6, 9, 10, 11 and 12. These vantage points allow the cameras and microphones to see and hear pucks coming into the net from both sides of the rink.

Referring to FIG. 6, except for the presence of instrumentation modules 2 and 8, the externally instrumented ice hockey goal's 1 outward appearance looks substantially the same as the conventional regulation goals, and plays the same as these goals, and meets the official requirements for these goals and is interchangeable with them in all venues as substitutes.

When mounted externally to the top horizontal crossbar member 7 of the externally instrumented ice hockey goal as shown in FIG. 6, the instrumentation modules containing optical windows 3, 4, 5, 6, 9, 10, 11, and 12 faces forward toward the ice rink. The instrumentation modules are mounted to the front surface 22 of the top horizontal crossbar member 7 of the goal. The instrumentation module can be mounted to 7 using a variety of simple methods. Preferred methods are ones where the instrumentation module can be easily removed and replaced for routine maintenance, testing and repairs. For example, the instrumentation module can be positioned and held to 7 using ordinary plastic zip ties which can be easily cut; or the instrumentation module can be screwed to 7 with removable fasteners.

Referring to FIG. 6, the present invention contemplates instrumented ice hockey goals, which when stationed on any rink at their traditional locations can both wirelessly and/or by using fiber optics/copper cable connectivity, autonomously televise ice hockey games under the command and control of a remote base station. The remote base station is disclosed in FIG. 30A and FIG. 30B, and FIG. 31A and FIG. 31B, and FIG. 32A and FIG. 32B, and FIG. 35A, and FIG. 35B, and FIG. 35C, and FIG. 7 and FIG. 8 of the present invention.

Referring to FIG. 6, in a preferred embodiment a fiber optics cable/copper cable bi-directional communications link is buried underneath the ice of the rink. In addition to being a bi-directional communications link, the copper cable carries electrical power as well. The ice hockey goals are constructed with fiber optics/copper cable connectors built into their footings which connect to the fiber optics cable/copper cable bi-directional communications and power link mating cable connectors that come up from the ice beneath the goal footings. The ice hockey goals have fiber optics cable and copper cable running up from the connectors in their footings and through their tubular structure to fiber optics/copper cable connectors in the top horizontal crossbar member 7 where the instrumentation modules are located. The fiber optics/copper cable connectors in the top horizontal crossbar member 7 protrude through their mounting holes in 22. The fiber optics/copper cable connectors in the top horizontal crossbar member 7 are then mated with the instrumentation module's fiber optics/copper cable connectors by passing the fiber optics cable/copper cable through the openings in the instrumentation modules and mating them to the two fiber optics cable/copper cable connectors within the instrumentation modules.

Referring to FIG. 6, looking down from the vantage point in the top horizontal crossbar member 7, the audience will see and hear the goal handler scramble and dive onto the ice to prevent the puck from being hit by a player into the net. The audience will see and hear this event from the vantage point of the cameras and microphones within the instrumentation modules 2 and 8 located on the top horizontal crossbar member 7 of the goal which is the audience's virtual vantage point above and behind the goal handler. This action packed view of the hockey puck has never before been seen and heard by a viewing audience. The viewing audience sees the action in 3-D and hears the action in surround sound.

Referring to FIG. 6, in a further preferred embodiment, the present invention contemplates an instrumented ice hockey goal wherein three instrumentation modules 21, 30 and 22 are attached to the rear ground footing structural member 14 of the goal. These instrumentation modules permit the viewing audience to see action coming into the end corners of the ice hockey goal. From the vantage point of the instrumentation modules 21, 30 and 22 at ground level below the body of the goal keeper, the viewing audience can see the face of the strained offensive players darting for the net. The viewing audience can see details looking up at the goalkeeper as he attempts to cover the play. The viewing audience can see the hockey puck pass in front of the cameras as a goal is scored. This action packed view of the hockey puck has never before been seen in the prior art and heard by a viewing audience. The viewing audience sees the action in 3-D and hears the action in surround sound.

Referring to FIG. 6, in a further preferred embodiment, the present invention contemplates an externally instrumented ice hockey goal, which when located on any ice rink, can wirelessly by RF radio and/or by fiber optics cable and/or by coaxial copper cable, autonomously televise ice hockey games, ice hockey practice and warm-up sessions under the command and control of a remote base station. The remote base station is disclosed in FIG. 30A and FIG. 30B and FIG. 31A and FIG. 31B and FIG. 32A and FIG. 32B, and FIG. 35A and FIG. 35B, and FIG. 35C. In addition to adding an element to the entertainment of the TV viewing audience during games, this embodiment serves to aid the players and the coaches in evaluating the quality of the player's progress, prowess, fitness and "stuff" in the game of ice hockey.

Referring to FIG. 6, the audience will see the ice hockey goaltender scramble and dive onto the ice to prevent the puck from being hit by a player into the net. The audience will see this event from the vantage point of the instrumentation modules 2 and 8 on the top horizontal crossbar member 7 of the goal which is the audience's virtual vantage point above and behind the goaltender.

Referring to FIG. 6, when an offensive player is guiding the puck toward the goal handler, the four 3-D stereo camera pairs mounted in the two instrumentation modules inside the instrumented ice hockey goal can see and hear where he is coming from. The cameras can see and hear the player as he skates and collides with the instrumented goal and its goal handler. The cameras can see and hear the player as he is sliding on the ice into the instrumented soccer goal. The cameras can see and hear the scuffle between the goal handler and the player as the goal handler blocks the player before the player pushes the puck into the net and scores a goal. From the vantage point of the instrumentation modules looking down on the ice rink, the viewing audience can see the face and hear the panting of the strained player's body as he darts for the net. The viewing audience can see and hear details of the goal handler as he attempts to cover the play. The viewing audience can see a close-up of the goal handler attempt to cover the play. As the puck is passed between the approaching offensive players, the viewing audience can see and hear the goal handler rustle to reach down to block the puck close to the net. The camera's vantage point at the instrumented ice hockey goal on the ice with and among the players gives the audience a viewing and hearing angle of the game never seen or heard before by television viewing audiences. The instrumented ice hockey goal's cameras and microphones give the TV viewing audience unending contemporaneous shots and sounds that get across a sense of the action of being there—like a player in the game that prior art cameras and microphones looking on from their disadvantaged viewing points from outside the playing field cannot get across.

Referring to FIG. 6, except for the four small optical windows 3, 4, 5, 6, 9, 10, 11 and 12, the instrumented ice hockey goal's outward appearance looks substantially the same as the conventional regulation goals, and plays the same as these goals, and meets the official requirements for these goals and is interchangeable with them in all venues as substitutes.

The instrumentation module 25 is constructed from one half the instrumentation module shown in FIG. 2A. The instrumentation module 25 is devised by physically dividing in half the four camera instrumentation module shown in FIG. 2A into two separate but equal two camera instrumentation modules. The division takes place physically in the middle of FIG. 2A. The result is two smaller instrumentation modules. Each of the two smaller two camera instrumentation modules halves preserves all of the electronic functions of the four camera instrumentation module shown in FIG. 2A except that they are physically half the size and possess only two cameras rather than four and eight microphones rather than nineteen. Since they are physically smaller they can easily be inserted into the base of the goal's vertical structural members like 1, as for example as shown in FIG. 6. This vantage point gives the stereo 3-D cameras and surround sound microphones of 25 the ability to capture rare unique views and sounds from the edge of the ice hockey goal as their cameras and microphones look out onto the ice rink from the edge of the goal. The antenna 26 is external to 1 and is used with 25 because the vertical structural members are likely to be metal which would prevent transmission of RF signals emanating from 25 from inside 1.

In summary, the externally and internally instrumented ice hockey goal 1 shown in FIG. 6 provides video and sound to the viewing audience that is so unique, exciting and realistic that it makes the individual members of the audience feel that they are with the goaltender in the game. In many ways this is more exciting than viewing the game in person from the stands of the ice hockey stadium. Therefore, the instrumented ice hockey goal not only provides a step forward in entertainment, but it also provides a great training tool to prospective ice hockey players by giving them the true life visual and auditory sensations and feelings of being in the game without actually being there.

In yet another preferred embodiment, the instrumented ice hockey goal shown in FIG. 6 is equipped to wirelessly stream its audio and video onto the internet.

The instrumented ice hockey goal is instrumented with instrumentation modules.

The instrumentation modules contain an electronics circuit called an electronics package unit. The electronics package unit is shown in FIG. 11A. The electronics package unit enables the instrumented ice hockey goal to communicate with and stream on the internet.

The instrumentation modules are shown in FIG. 2A and FIG. 2B and FIG. 2C.

Referring to FIG. 11B, FIG. 11B shows the architecture of the streaming system that conveys high definition video and multi-dimensional audio from instrumented ice hockey goals, captured by the cameras and microphones contained within their instrumentation modules, to stream to an audience which may or may not have spectators 7, 8, 9 and 10 respectively present at the games but wish to subscribe and view the games remotely on their personal wireless display devices. The electronics package units inside the instrumentation modules communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the ice hockey rink who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given ice hockey rink of play currently broadcasted.

Referring to FIG. 11A, FIG. 11A is the electronics system block diagram for streaming ice hockey games on the internet from instrumented sports paraphernalia like instrumented ice hockey goals. FIG. 11A shows the block diagram for the system for streaming the video and audio of soccer games captured by the cameras and microphones aboard the instrumented sports paraphernalia like instrumented ice hockey goals. The primary component of the system for connecting the instrumented sports paraphernalia like ice hockey goals to the internet is the electronic package unit 1. The electronics package unit 1 enables the instrumented ice hockey goals to communicate with and stream on the internet. The electronics package unit 1 collects video and audio from the cameras 2 and microphones 3 aboard the instrumentation modules attached to the ice hockey goals, and channels the video and audio to the antenna 8 for wireless transmission to a Mobile Broadband Tower. The wireless topography for the system is shown in FIG. 11B.

The instrumented ice hockey goals are instrumented with instrumentation modules. An example of an instrumentation module is shown in FIG. 2A and FIG. 2B and FIG. 2C. Referring to FIG. 2A and FIG. 2B and FIG. 2C, each instrumentation module is equipped typically with four electronics package units 1. Each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology. Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

Referring to FIG. 11A, in some venues the internet is available to the instrumented ice hockey goals by a fiber optics/copper cable feed buried beneath the ice of the ice hockey rink. In venues where the internet is available by such cable, the cable feed 10 is brought up from the ground and connected to the electronic package unit 1 via 9 using the cable connectors in the instrumentation module.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Each electronics package unit 1 referred to in FIG. 11A uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

22 is a four camera instrumentation module that is mounted on to the front surface of the rear ground footing structural member 14 of the goal on the right side. Its line of sight is angled toward the left side of the entrance to the goal. Its purpose is to provide the televised and streaming viewing audiences with a view of the action coming in from the left side of the goal. 30 is an instrumentation module (that cannot be seen in this view because it is hidden behind 14) that is mounted on to the front surface of the rear ground footing structural member 14 of the goal on the left side. Its line of sight is angled toward the right side of the entrance to the goal. Its purpose is to provide the televised and streaming viewing audiences with a view of the action coming in from the right side of the goal. 21 is a four camera instrumentation module that is mounted on to the front surface of the rear ground footing structural member 14 of the goal in its center. Its line of sight is angled toward the center of the entrance to the goal. Its purpose is to provide the televised and streaming viewing audiences with a view of the action coming in from the center of the goal. Together with the two instrumentation modules inside the top crossbar, no matter where the ice hockey puck enters the goal net, the viewing audience will see it in 3-D, and hear it in surround sound. 25 and 13 are small two-camera instrumentation modules that are mounted inside the face of the footings of the structural members 1 and 23. The lines of sight of their cameras can be adjusted by the cameraman. The purpose of these instrumentation modules is to permit the viewing audience to witness player action in 3-D and surround sound coming into the net from directly in front of the goals near their ends.

Referring to the Preferred Embodiments Specified in FIG. 6, the externally instrumented ice hockey goal satisfies all of the following objectives:

It is an objective of the present invention that two instrumented ice hockey goals be mounted on the ice hockey rink at their traditional locations.

It is an objective of the present invention that each instrumented ice hockey goal be comprised of a standard regulation ice hockey goal equipped with five instrumentation modules attached to it.

It is an objective of the present invention that the five instrumentation modules mounted on the ice hockey goal be identical to one another, where each of the instrumentation modules is equipped with four cameras and twenty three microphones, and each instrumentation module is able to simultaneously provide for 3D and surround sound.

It is an objective of the present invention that an internally mounted two-camera instrumentation module is mounted inside each of the bases of the two vertical structural members.

It is an objective of the present invention that a standard regulation ice hockey goal be equipped with five instrumentation modules attached to it, where two instrumentation modules are attached to the front surface of the top crossbar structural member, and one instrumentation module is attached to the front surface of the rear ground footing structural member of the goal on the right side, and one instrumentation module is attached to the front surface of the rear ground footing structural member of the goal on the left side, and one instrumentation module is attached to the front surface of the rear ground footing structural member of the goal in the center.

It is an objective of the present invention that the instrumentation module that is attached to the front surface of the rear ground footing structural member of the goal on the right side of the goal, has its line of sight covering and looking at the left side opening of the goal, and that the instrumentation module that is attached to the front surface of the rear ground footing structural member of the goal on the left side of the goal, has its line of sight covering and looking at the right side opening of the goal.

It is an objective of the present invention that the instrumentation modules be mounted to the ice hockey goals using a Velcro sandwich.

It is an objective of the present invention that power cable and bi-directional fiber optics/copper cable carrying the internet, be buried in the ground beneath the ice hockey rink, and routed to the footing of each of the ice hockey goals.

It is an objective of the present invention that power cable and bi-directional fiber optics/copper cable connected to a remote base station via an antenna array relay junction, be buried in the ground beneath the ice hockey rink, and routed to the footing of each of the ice hockey goals.

It is an objective of the present invention that power cable and fiber optics/copper cable be buried in the ground beneath the ice hockey goals carrying the internet, be routed up from the ground through the base footing of the ice hockey goals, and connected to the five instrumentation modules mounted on the ice hockey goals thereby connecting them to stream on the internet to subscribers.

It is an objective of the present invention that power cable and fiber optics/copper cable bi-directional communication links to the remote base station, be buried in the ground beneath the ice hockey goals, and be routed up from the ground through the base footing of the ice hockey goals, and connected to the five instrumentation modules mounted on the ice hockey goals, thereby connecting them to televise to the remote base station to broadcast to a TV viewing audience.

It is an objective of the present invention to enable the cameraman to set the tilt angle of the instrumentation modules on the mounting surfaces of the goals so the camera's lines of sight can be angled and aligned.

It is an objective of the present invention to enable the cameraman in the remote base station to software select either the wireless mode of communication, and/or the fiber optics/copper cable mode of communication between the instrumented ice hockey goals and the remote base station by sending a control signal to the instrumented ice hockey goals.

It is an objective of the present invention to enable the cameraman to select either the wireless mode of communication, and/or the fiber optics/copper cable mode of communication between the instrumented ice hockey goals and the remote base station by physically setting a switch in the bottom of the instrumentation modules with access through the bottom of the instrumentation modules on the goals.

It is an objective of the present invention to enable the cameraman to software select either the wireless mode of communication, and/or the fiber optics/copper cable mode of communication between the instrumented ice hockey goals and the remote base station by sending a control signal to the instrumented ice hockey goals from his hand held remote.

FIG. 7

The detailed physical elements disclosed in the typical instrumented sports soccer stadium drawing shown in FIG. 7 are identified as follows: 1 is the instrumented soccer playing field. 2 is the instrumented sports stadium. 3 is the boundary of the typical instrumented sports soccer stadium parking lot including the air space above the sports stadium. 4 are the instrumentation modules mounted on the instrumented soccer goal 5. 5 is the instrumented soccer goal. 6 is the bidirectional wireless radio wave communication link between the instrumented soccer goal 5 and the antenna array relay junction 8. 7 is the bidirectional fiber optics cable/copper cable communication and power link between the instrumented soccer goal 5 and the antenna array relay junction 8. 8 is the antenna array relay junction. 9 is the bidirectional fiber optics cable/copper cable communication link between the antenna array relay junction 8 and the remote base station 10. 10 is the remote base station. 11 is the bidirectional wireless radio wave communication link between the antenna array relay junction 8 and the remote base station 10. 12 is the bidirectional wireless radio wave communication link between the instrumented soccer goal 14 and the antenna array relay junction 8. 13 are the instrumentation modules mounted on the instrumented soccer goal 14. 14 is the instrumented soccer goal. 15 is the bidirectional fiber optics cable/copper cable communication and power link between the instrumented soccer goal 14 and the antenna array relay junction 8. 16 is a bi-directional fiber optics cable/copper cable carrying the internet to the antenna array relay junction.

FIG. 7 is a top view of a typical soccer instrumented sports stadium that has been configured and equipped for use with two instrumented soccer goals, for televising games from on the playing field, and for streaming games from on the playing field, using bi-directional wireless radio wave communication links and/or bi-directional fiber optics cable and bi-directional high speed copper network communications cable links. Instrumented soccer goals are shown in FIG. 3 and FIG. 4.

The present invention contemplates that the instrumentation package assembly within the instrumented sports paraphernalia be instrumented with a transceiver and antenna capable of transmitting radio signals encoded with the picture and sound information to a remote base station via an antenna array relay junction. The present invention contemplates that instrumented sports paraphernalia, that are in play on the playing field during professional league games and player training sessions, are instrumented with cameras and microphones enabling them to acquire pictures and sounds of the players from amongst the players on the playing field. Electronics within the instrumentation package assembly televises the pictures and sounds to a remote base station via an antenna array relay junction.

Instrumented soccer goals 5 and 14 are examples of instrumented sports paraphernalia that are located on a typical soccer playing field 1 during a game. The instrumented soccer goals 5 and 14 are located at the traditional locations for conventional soccer goals. The conventional soccer goals are traditionally considered to be sport's paraphernalia. The instrumentation modules 4 and 13 are used to instrument the soccer goals to televise the games. FIG. 7 is a top view of a typical instrumented sports stadium that has been configured and equipped for use with two instrumented soccer goals 5 and 14 located at either end of the field for televising games from on the playing field, using bi-directional wireless radio wave communication links 6 and 12, and/or bi-directional fiber optics cable and bi-directional high speed copper network communications cable links 7 and 15. The instrumented soccer goals 5 and 14 are each instrumented with two instrumentation modules. The two instrumentation modules are positioned at either end of the top horizontal crossbar member of the instrumented soccer goal as shown in FIG. 3 and FIG. 4. The instrumentation modules for the instrumented soccer goals can be manufactured in a variety of different sizes.

Referring to the preferred embodiment disclosed in FIG. 2A and FIG. 2B and FIG. 2C, an instrumentation module is equipped for bi-directional wireless radio wave 3-D stereo television and/or bi-directional fiber optics cable/copper cable 3-D stereo television operation, employing single point non-diversity communication techniques and/or multi point diversity communication techniques, is specified. The instrumentation module is equipped to be enabled, commanded and controlled by administrative data conveyed simultaneously and bi-directionally from/to the remote base station utilizing both bi-directional wireless radio wave and bi-directional fiber optics cable/copper cable communication.

The remote base station and the antenna array relay junction are specified in FIG. 7 and FIG. 8 of the present invention.

The instrumentation module's bi-directionally transmit and receive control signals between the instrumentation module's and the antenna array relay junction in the sports stadium/arena, and transmit TV signals from the instrumentation module's to the antenna array relay junction in the sports stadium/arena. The instrumentation module's can do this wirelessly and/or by employing a bi-directional fiber optics/copper cable communications network if it is available on the playing field at the particular stadium venue where the soccer game is being played. If electrical power is available on the playing field, it too is cabled and routed up from the playing field ground into the instrumented soccer goal's footing and through the metal tubular structure of the instrumented soccer goal and into the top horizontal crossbar member of the goal, and then connected to the instrumentation modules using the copper cable connectors. If a bi-directional fiber optics/copper cable communications network is available on the playing field, its cabling is also routed up from the playing field ground through the goal's metal tubing structure into the top horizontal crossbar member of the instrumented soccer goal and connected to the instrumentation module using the instrumentation module's fiber optics/copper cable connector.

In a preferred embodiment, a fiber optics cable/copper cable bi-directional communications link is buried underneath the ground of the playing field/rink. In addition to being a bi-directional communications link, the copper cable carries electrical power as well. The soccer goals are constructed with fiber optics/copper cable connectors built into their ground footings which connect to the fiber optics cable/copper cable bi-directional communications and power link mating cable connectors that come up from the ground beneath the goal footings. The soccer goals have fiber optics cable and copper cable running up from the connectors in their footings and through their tubular structure to fiber optics/copper cable connectors in the top horizontal crossbar member where the instrumentation modules are located. The fiber optics/copper cable connectors in the horizontal crossbar member are then mated with the instrumentation module's fiber optics/copper cable connectors by passing the fiber optics cable/copper cable through the openings in the instrumentation modules and mating them to the two fiber optics cable/copper cable connectors within the instrumentation modules.

In another preferred embodiment, the internet cable 16 is connected directly to the antenna array relay junction 8. The internet is then wirelessly 12 and 6 connected to the instrumentation modules 4 and 13 aboard the soccer goals 14 and 5 by RF transmission between the antenna array relay junction 8 and the soccer goals 14 and 5. The internet 16 is also routed by the antenna array relay junction 8 to the soccer goals 14 and 5 by underground cables 15 and 7. This embodiment has an advantage in that it gives the soccer goals 14 and 5 two additional ways to stream on the internet besides communicating wirelessly with the internet using a cell tower. This is useful especially when the cell tower provides low signal strength to the soccer goals 14 and 5. This embodiment has an additional advantage of providing greater bandwidth.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

FIG. 8

The detailed physical elements disclosed in the typical instrumented ice hockey sports arena drawing shown in FIG. 8 are identified as follows: 1 is the instrumentation package assembly inside the instrumented ice hockey puck 2. 2 is the instrumented ice hockey puck. 3 is the instrumented ice hockey rink. 4 is the instrumented sports arena. 5 is the boundary of the typical instrumented sports arena parking lot including the air space above the sports arena. 6 is the bidirectional fiber optics cable/copper cable communication and power link between the instrumented ice hockey goal 12 and the antenna array relay junction 11. 7 is the remote base station. 8 are the instrumentation modules mounted on the instrumented ice hockey goal 10. 9 is the bidirectional wireless radio wave communication link between the instrumented ice hockey puck 2 and the antenna array relay junction 11. 10 is the instrumented ice hockey goal. 11 is the antenna array relay junction. 12 is the instrumented ice hockey goal. 13 is the bidirectional wireless radio wave communication link between the instrumentation modules 14 mounted on the instrumented ice hockey goal 12 and the antenna array relay junction 11. 14 are the instrumentation modules mounted on the instrumented ice hockey goal 12. 15 is the bidirectional wireless radio wave communication link between the instrumentation modules 8 mounted on instrumented ice hockey goal 10 and the antenna array relay junction 11. 16 is the bidirectional fiber optics cable/copper cable communication and power link between the instrumented ice hockey goal 10 and the antenna array relay junction 11. 17 is the bidirectional fiber optics cable/copper cable communication link between the antenna array relay junction 11 and the remote base station 7. 18 is the bidirectional wireless radio wave communication link between the antenna array relay junction 11 and the remote base station 7. 19 is a bi-directional fiber optics cable/copper cable carrying the internet to the antenna array relay junction.

FIG. 8 is a top view of a typical ice hockey instrumented sports stadium/arena that has been configured and equipped for use with two instrumented ice hockey goals and an instrumented ice hockey puck, for televising games and streaming games from on the rink from the ice hockey goals and pucks. Instrumented ice hockey goals are shown in FIG. 5 and FIG. 6.

Instrumented ice hockey goals 10 and 12, and ice hockey puck 2 are examples of instrumented sports paraphernalia that are located on a typical ice hockey rink 3 during a game. The instrumented ice hockey goals 10 and 12 are located at the traditional locations for conventional ice hockey goals. The conventional ice hockey goals are traditionally considered to be sport's paraphernalia. The instrumentation modules 8 and 14 are used to instrument the ice hockey goals to televise the games. FIG. 8 is a top view of a typical instrumented ice hockey sports stadium that has been configured and equipped for use with two instrumented ice hockey goals 10 and 12 located at either end of the rink for televising games from on the ice hockey rink, using bi-directional wireless radio wave communication links 13 and 15, and/or bi-directional fiber optics cable and bi-directional high speed copper network communications cable links 6 and 16. The instrumented ice hockey goals 10 and 12 are each instrumented with two instrumentation modules. The two instrumentation modules are positioned at either end of the top horizontal crossbar member of the instrumented ice hockey goals as shown in FIG. 5 and FIG. 6. The instrumentation modules for the instrumented ice hockey goals can be manufactured in a variety of different sizes.

Referring to the preferred embodiment disclosed in FIG. 2A and FIG. 2B and FIG. 2C, an instrumentation module is equipped for bi-directional wireless radio wave 3-D stereo television and/or bi-directional fiber optics cable/copper cable 3-D stereo television operation, employing single point non-diversity communication techniques and/or multi point diversity communication techniques, is specified. The instrumentation module is equipped to be enabled, commanded and controlled by administrative data conveyed simultaneously and bi-directionally from/to the remote base station utilizing both bi-directional wireless radio wave and bi-directional fiber optics cable/copper cable communication.

The remote base station and the antenna array relay junction are specified in FIG. 8 of the present invention.

The instrumentation module's bi-directionally transmit and receive control signals between the instrumentation module's and the antenna array relay junction 11 in the ice hockey sports stadium/arena 4, and transmit TV signals from the instrumentation module's to the antenna array relay junction 11 in the sports stadium/arena 4. The instrumentation module's can do this wirelessly 13, 15 and/or by employing a bi-directional fiber optics/copper cable communications networks 6 and 16 if they are available on the ice rink at the particular ice hockey stadium venue where the ice hockey game is being played. If electrical power is available on the rink, it too is cabled and routed up from the ice hockey rink into the instrumented ice hockey goal's footing and through the metal tubular structure of the instrumented ice hockey goal and into the top horizontal crossbar member of the goal, and then connected to the instrumentation modules using the copper cable connectors. If a bi-directional fiber optics/copper cable communications network is available on the ice hockey rink, its cabling is also routed up from the ice hockey rink through the goal's metal tubing structure into the top horizontal crossbar member of the instrumented ice hockey goal and connected to the instrumentation module using the instrumentation module's fiber optics/copper cable connector.

In a preferred embodiment, a fiber optics cable/copper cable bi-directional communications link is buried underneath the ice of the ice hockey rink. In addition to being a bi-directional communications link, the copper cable carries electrical power as well. The ice hockey goals are constructed with fiber optics/copper cable connectors built into their footings which connect to the fiber optics cable/copper cable bi-directional communications and power link mating cable connectors that come up from the ice beneath the ice hockey goal footings. The ice hockey goals have fiber optics cable and copper cable running up from the connectors in their footings and through their tubular structure to fiber optics/copper cable connectors in the top horizontal crossbar member where the instrumentation modules are located. The fiber optics/copper cable connectors in the horizontal crossbar member are then mated with the instrumentation module's fiber optics/copper cable connectors by passing the fiber optics cable/copper cable through the openings in the instrumentation modules and mating them to the two fiber optics cable/copper cable connectors within the instrumentation modules.

In another preferred embodiment, FIG. 8 is a top view of a typical instrumented sports stadium/arena that has been configured and equipped for use with both static and dynamic instrumented sports paraphernalia for televising games from on the playing field/rink using both bi-directional wireless radio wave communication links and/or bi-directional fiber optics cable/copper cable communication links. Examples of two static sports paraphernalia are the two instrumented ice hockey goals 10 and 12. An example of a dynamic instrumented sports paraphernalia is the instrumented ice hockey puck 2.

Typical static instrumented sports paraphernalia used in an instrumented sports stadium/arena are like the instrumented ice hockey goals are shown in FIG. 5 and FIG. 6. Typical dynamic instrumented sports paraphernalia used in an instrumented sports stadium/arena are like the instrumented ice hockey puck shown in FIG. 1A, FIG. 1B, FIG. 1C and FIG. 9A, FIG. 9B in the present invention, and FIG. 37A, FIG. 37B, FIG. 37C.

Referring to the preferred embodiment disclosed in FIG. 8, a typical instrumented sport stadium/arena equipped for both bi-directional wireless radio wave television and bi-directional fiber optics cable/copper cable television operation employing single point non-diversity reception techniques is specified. The typical instrumented sport stadium 4 is physically configured with instrumented sports paraphernalia 2, 10, 12; and fiber optics cable/copper cable links 6, 16 17; remote base station 7; and antenna array relay junction 11. The remote base station 7 exercises command and control of the sports paraphernalia 2, 10, 12. The electronics, signals and data flows of the remote base station 7 of the present invention are specified in FIG. 14A and FIG. 14B. Except for differences in processing software, the remote base stations specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B are substantially identical.

Static instrumented sports paraphernalia 10, 12 are sports paraphernalia that have been instrumented and whose locations on the playing field/rink 3 are fixed during the game. Dynamic instrumented sports paraphernalia 2 are sports paraphernalia that have been instrumented and whose locations on the playing field/rink 3 are varying during the game, and have the capability to televise games wirelessly via radio waves.

Some typical instrumented sports stadiums are larger than others and can economically justify the cost of using fiber optics cable/copper cable communication links between the fixed sports paraphernalia on the playing field/rink 3 and the antenna array relay junction 11; and between the antenna array relay junction 11 and the remote base station 7. The cost of a bi-directional fiber optics cable/copper cable communication link 6 and 16 installation exceeds the cost of a bi-directional wireless radio wave communication link installation. Therefore, the bi-directional wireless radio wave communication link installation has a cost advantage over the bi-directional fiber optics cable/copper cable communication link installation.

The bi-directional fiber optics cable/copper cable communication link has a distinct performance advantage over the bi-directional wireless radio wave communication link. The bi-directional fiber optics cable/copper cable communication link has a much greater bandwidth than the bi-directional wireless radio wave communication link. Consequently, the bi-directional fiber optics cable/copper cable communication link has both a much greater capability and flexibility in producing HD video and sound than the bi-directional wireless radio wave communication link.

10 and 12 are typical static instrumented sports paraphernalia on the playing field/rink 3. The sport stadium/arena 4 is configured to handle the simultaneous television signals from a multiplicity of such static instrumented sports paraphernalia that are on the playing field at a multiplicity fixed locations respectively.

Each dynamic instrumented sports paraphernalia 2 has a bi-directional radio wave communications link 9 which runs in the air above the playing field/rink 3 between 2 and 6 as the location of 2 on the playing field varies.

Each static instrumented sports paraphernalia 2 has a bi-directional radio wave communications link 10 which runs in the air above the playing field 3 between 2 and 11, as well as a bi-directional fiber optics/copper cable communications link 6 that runs beneath the playing field/rink 3 between 2 and 11, as well as a bi-directional fiber optics/copper cable communications link 16 that runs beneath the playing field/rink 3 between 10 and 11.

The antenna array relay junction 11 has a bi-directional radio wave communications link 18 which runs in the air above the stadium/arena 4 between 11 and 7. The antenna array relay junction 11 also has a bi-directional fiber optics/copper cable communications link 17 that runs between 11 and 7.

18 is the wireless radio communication link between the fiber optics/copper cable/wireless radio antenna array relay junction 11 and the remote base station 7.

The typical instrumented sport stadium/arena 4 is configured with the antenna array relay junction 11. The antenna array relay junction 11 is located within the sport stadium/arena 4 but outside the limits of the playing field 3. The antenna array relay junction 11 is located above the ground level of the playing field/rink 3.

11 is a bi-directional radio antenna array relay junction wirelessly linking the sports paraphernalia 2 to the remote base station 7 which is located outside or inside the sport stadium 4 but within the boundaries of the sport stadium parking lot 5. 17 is also a bi-directional fiber optics cable/copper cable communications link connecting the signals to/from the sports paraphernalia 2 via the antenna array relay junction 11 to the remote base station 7.

The purpose of 11 is to relay televised radio wave signals between 2 and 11 to 7. The purpose of 11 is also to relay televised fiber optics cable/copper cable signals between 12 and 11 to 7; and to relay televised fiber optics cable/copper cable signals between 10 and 11 to 7; and to relay televised radio wave signals between 12 and 11 to 7; and to relay televised radio wave signals between 10 and 11 to 7.

There is a bi-directional radio wave link between 12 and 11, and another radio wave link between 11 and 7. 11 relays television and system status signals from 12 to 7, and relays command and control signals from 7 to 12.

There is a bi-directional radio wave link between 10 and 11, and another radio wave link between 11 and 7. 11 relays television and system status signals from 10 to 7, and relays command and control signals from 7 to 10.

There is a bi-directional radio wave link between 2 and 11, and another radio wave link between 11 and 7. 11 relays television and system status signals from 2 to 7, and relays command and control signals from 7 to 2.

There is a bi-directional fiber optics/copper cable communications link between 12 and 11, and another bi-directional fiber optics/copper cable communications link between 11 and 7. 11 relays television and system status signals from 12 to 7, and relays command and control signals from 7 to 12.

There is a bi-directional fiber optics/copper cable communications link between 10 and 11, and another bi-directional fiber optics/copper cable communications link between 11 and 7. 11 relays television and system status signals from 10 to 7, and relays command and control signals from 7 to 10.

2 is configured to communicate wirelessly with the remote base station 7 employing single point non-diversity reception techniques via a fixed point multi-directional antenna array 11. This feature set enables the complete system to be used in virtually any sport stadium or training field environment unobtrusively i.e. no underground cabling or trenching of the field/rink, and with only a minimal amount of set-up time required prior to use.

At the time the complete system consisting of 2, 10 and 12 is initially placed into operation at a given sport stadium/arena or training field, testing to determine the very best received signal strength, location and optimal placement of 11 relative to 2, 10, 12 and 7 relative to 11 is performed by field-side personnel. familiar with the system. These tests are conducted with 2 being spotted at a wide variety of typical locations on the rink.

The aerial position of 11 mounted above 3 is set to ensure that during a typical game or training session, 7 may operate and receive the high quality images and sound made simultaneously in real-time from 2, 10, and 12.

Single point non diversity reception and multipoint diversity reception techniques are referred to in several places in the present invention; a description of these techniques follows.

Single point non diversity reception refers to a wireless communication technique whereby a single physical repeater antenna array 11 location within a sports stadium/arena 4 is used to convey the radio frequency signals traveling to and from the instrumented sports paraphernalia 2, 10 and 12 and the remote base station 7. The quality and reliability of the signals received at the remote base station 7 when using this technique relies heavily on the assumption that a decent signal to noise ratio is attainable even while the dynamic sports paraphernalia is moving from place to place on the playing field/rink during a game.

Multipoint diversity reception refers to a wireless communication technique whereby a network of multiple physical repeater antenna arrays are located within a sports stadium/arena and are used to convey the radio frequency signals traveling to and from the dynamic instrumented sports paraphernalia 2 i.e. instrumented ice hockey puck, and the remote base station 7. The signals intercepted at each repeater 11 location are individually compared by the network transceiver at the remote base station 7 and the strongest signal with the best signal to noise ratio is automatically selected for application to the other electronics at the remote base station. The quality and reliability of the signals received at the remote base station 7 when using this technique is far less dependent on the assumption that a decent signal to noise ratio is attainable from what a single repeater antenna array location would achieve while the sports paraphernalia is moving from place to place on the playing field/rink during a game.

Figure 33A:
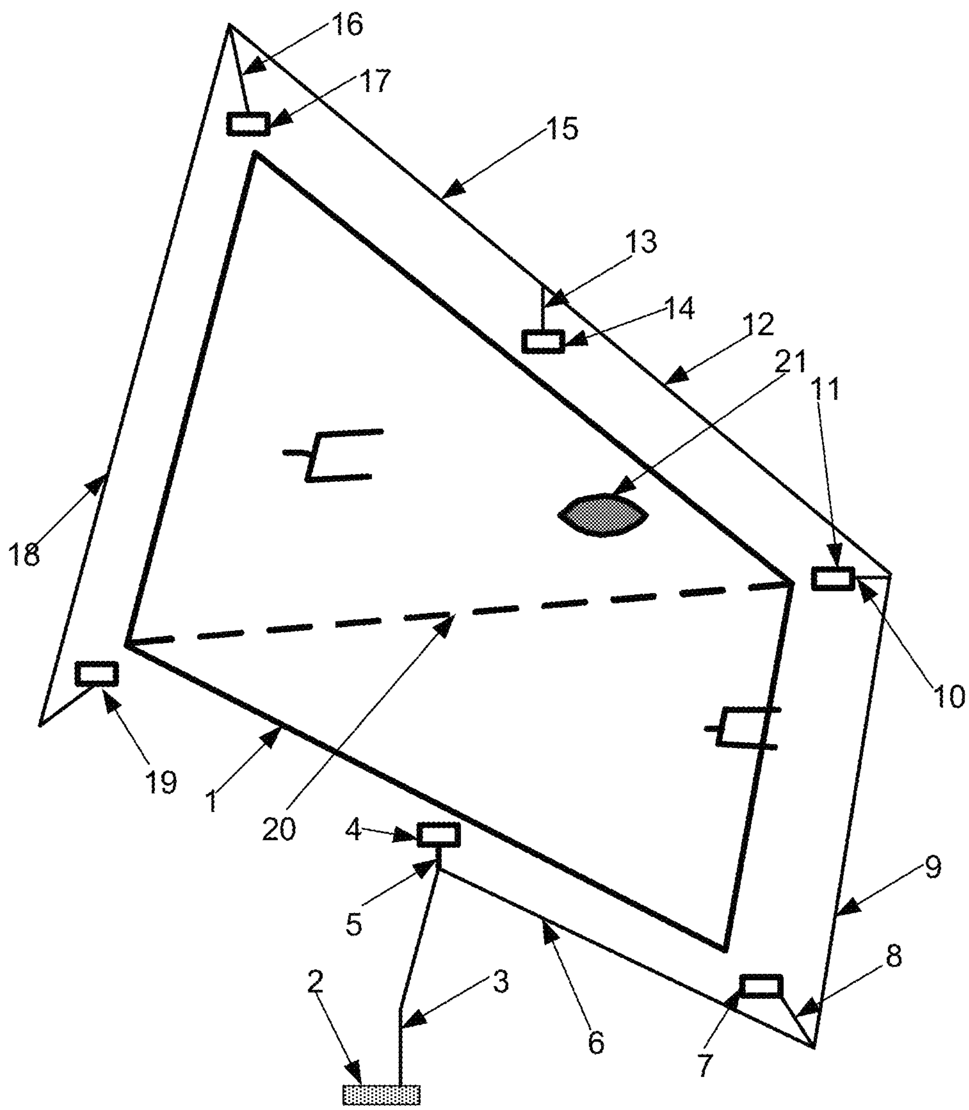
FIG. 33A is a diagram of a typical instrumented football stadium equipped with a wireless RF bi-directional communications link to televise football games, from an instrumented football which is in play on the football playing field, and a remote base station via the antenna array relay junction.

In a further preferred embodiment, 2, 10 and 12 is configured to communicate wirelessly with the remote base station 7 employing multipoint diversity reception techniques via a multitude of multi-directional antenna arrays connected to 11 where the multi-directional antenna arrays are located around the rink in a manner similar to FIG. 33A. This feature set enables the complete system to be used in virtually any sport stadium/arena or training field environment unobtrusively i.e. no underground cabling or trenching of the field/rink, and with only a minimal amount of set-up time required prior to use.

At the time the complete system consisting of 2, 10 and 12 is initially placed into operation at a given sport stadium/arena or training field, testing to determine the very best received signal strength, location and optimal placement of 11 relative to 2, 10, 12 and 7 relative to 11 is performed by field-side personnel familiar with the system. These tests are conducted with 2 being spotted at a wide variety of typical locations on the rink.

The aerial position of 11 mounted above 3 is set to ensure that during a typical game or training session, 7 may operate and receive the high quality images and sound made simultaneously in real-time from 2, 10, and 12.

In yet still another preferred embodiment, the internet cable 19 is connected directly to the antenna array relay junction 11. The internet is then wirelessly 15 and 13 connected to the instrumentation modules 8 and 14 aboard the ice hockey goals 10 and 12 by RF transmission between the antenna array relay junction 11 and the ice hockey goals 10 and 12. The internet 19 is also routed by the antenna array relay junction 11 to the ice hockey goals 10 and 12 by underground cables 16 and 6. This embodiment has an advantage in that it gives the ice hockey goals 10 and 12 two additional ways to stream on the internet besides communicating wirelessly with the internet using a cell tower. This is a useful method especially when the cell tower provides low signal strength to the ice hockey goals 10 and 12. This embodiment has the additional advantage of providing greater bandwidth.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

Referring to the Preferred Embodiments Specified in FIG. 8, the typical instrumented ice hockey sports arena satisfies all of the following further objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio and fiber optics/copper cable bidirectional antenna array relay junction, a remote base station, a bidirectional wireless radio wave communication link between the antenna array relay junction and the remote base station, a bidirectional fiber optics/copper cable communication link between the instrumented sports paraphernalia and the antenna array relay junction, a bidirectional wireless radio wave communication link between the antenna array relay junction and the instrumented sports paraphernalia, and a bidirectional fiber optics/copper cable communication link between the remote base station and the antenna array relay junction. It is an objective of the present invention to equip any sport stadium/arena with instrumented sports paraphernalia, an antenna array relay junction, wireless and/or fiber optics/copper cable communication links, and a remote base station. It is an objective of the present invention to equip any sport stadium to simultaneously wirelessly televise sports games from a multiplicity of both dynamic and static sports paraphernalia i.e. footballs, 1$^{st}$, 2$^{nd}$, 3$^{rd}$ baseball bases, pitcher's rubbers, ice hockey pucks, and baseball home plates located on the playing field to a remote base station. It is an objective of the present invention to equip any sport stadium to simultaneously wirelessly televise sports activity from a multiplicity of both dynamic and static sports paraphernalia i.e. pitcher's rubbers and baseball home plates located off the playing field to a remote base station. It is an objective of the present invention to configure and equip any sports training field to both wirelessly/and by use of fiber optics cable/copper cable, simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sport stadium to simultaneously televise sports games using both wireless and bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single dynamic instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 9A and FIG. 9B

The detailed physical elements disclosed in the instrumented ice hockey puck drawings shown in FIG. 9A and FIG. 9B are identified as follows: 1 is the y-axis of cameras 24 and 17. 2 is the z-axis of the instrumented ice hockey puck. 3 is the upper induction coil used to charge the battery pack inside the instrumentation package assembly 7. 4 is the x-axis of the instrumented ice hockey puck. 5 is the side of the instrumented ice hockey puck. 6 is the planar surface of the instrumented ice hockey puck. 7 is an instrumentation package assembly. 8 is a Type XI buffer plate assembly. 9 is a corrugated bellows section of an instrumentation package assembly element. 10 is an induction coil used to charge the battery pack inside the instrumentation package assembly 7. 11 is a plane-parallel-flat optical window. 12 is the side of the instrumented ice hockey puck. 13 is a plane-parallel-flat optical window. 14 is a microphone connector which is cabled to microphone 48 located on the planar surface 6. 15 is a protective cover plate. 16 is the molded encapsulating material of the instrumented ice hockey puck. 17 is a camera. 18 is the rounded edge of the protective cover plate. 19 is a flat disk-like protective cover plate. 20 is a wireless radio antenna. 21 is a wireless radio antenna. 22 is a wireless radio antenna. 23 is a wireless radio antenna. 24 is a camera. 25 is a camera lens. 26 is a camera lens. 27 is a microphone. 28 is a microphone. 29 is a gas valve. 30 is a gastight access lid heat sink on the bottom of instrumentation package assembly 7. 31 is a battery pack that supplies electricity to instrumentation package assembly 7. 32 is the electronics in the instrumentation package assembly element. 33 is a flat disk-like protective cover plate. 34 is a microphone. 35 is a microphone. 36 is a microphone connector which is cabled to a microphone 47 located on the planar surface 37. 37 is a planar surface of the instrumented ice hockey puck. 38 is a cable from 36 to the microphone 47 located on planar surface 37. 39 is a wireless radio antenna. 40 is a wireless radio antenna. 41 is the electronics in the instrumentation package assembly element. 42 is a buffer plate assembly. 43 is a cable from 14 to the microphone 48 located on planar surface 6. 44 is a battery pack that supplies electricity to instrumentation package assembly 46. 45 is an induction coil used to charge the battery pack inside the instrumentation package assembly 46. 46 is an instrumentation package assembly. 47 is a microphone which is flush with planar surface 37. 48 is a microphone which is flush with planar surface 6. 49 is the molded encapsulating material of the instrumented ice hockey puck.

50 is a microphone. 51 is a microphone. 52 is a microphone. 53 is a microphone. 54 is a microphone (not shown). 55 is a microphone (not shown). 56 is a microphone. 57 is a microphone. 58 is a microphone. 59 is a microphone. 60 is not shown but is directly below and opposite 51. 61 is not shown but is directly below and opposite 52. 62 is a microphone. 63 is a microphone. 64 is a microphone that is not shown but is directly below and opposite 58. 65 is a microphone that is not shown but is directly below and opposite 59.

FIG. 9A is a top view of the two sided two-camera instrumented ice hockey puck.

FIG. 9B is a front view of the two sided two-camera instrumented ice hockey puck.

Referring to the preferred embodiment disclosed in FIG. 9A and FIG. 9B, an instrumented ice hockey puck equipped with two television cameras employing wireless single point, multi point and/or multi point diversity reception techniques is specified. One of the cameras looks out perpendicularly from one planar surface of the puck, while the other camera looks out perpendicularly from the other planar surface of the puck. The cameras look out in opposite directions from one another and are coaxial. The instrumented ice hockey puck is comprised of two identical halves which are mirror images of one another. TV camera 24 which is part of instrumentation package assembly 7 peers out thru planar surface 6 of the instrumented ice hockey puck. TV camera 17 which is part of instrumentation package assembly 46 peers out thru planar surface 37 of the instrumented ice hockey puck. Instrumentation package assemblies 7 and 46 are disclosed in FIG. 19A and FIG. 19B and FIG. 19C.

The present invention contemplates that the instrumentation package assemblies 7 and 46 within the instrumented ice hockey puck be instrumented with a transceiver and antenna capable of transmitting radio signals encoded with the picture and sound information gathered from the instrumented ice hockey puck to a remote base station via an antenna array relay junction. The present invention contemplates that instrumented ice hockey pucks, that are in play on the playing field during professional league games and player training sessions, are instrumented with cameras and microphones enabling them to acquire pictures and sounds of the players from amongst the players on the rink. Electronics within the instrumentation package assembly televises the pictures and sounds to a remote base station via an antenna array relay junction.

Figure 37C:
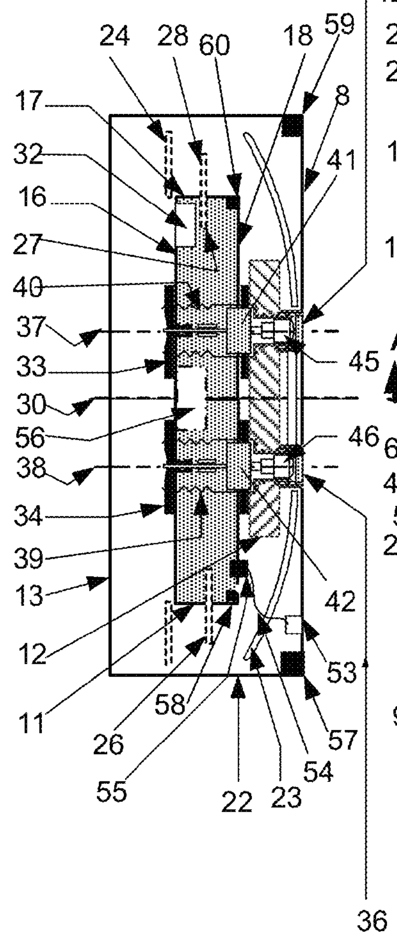
FIG. 37C is a side view of the instrumented hockey puck.
Figure 37A:
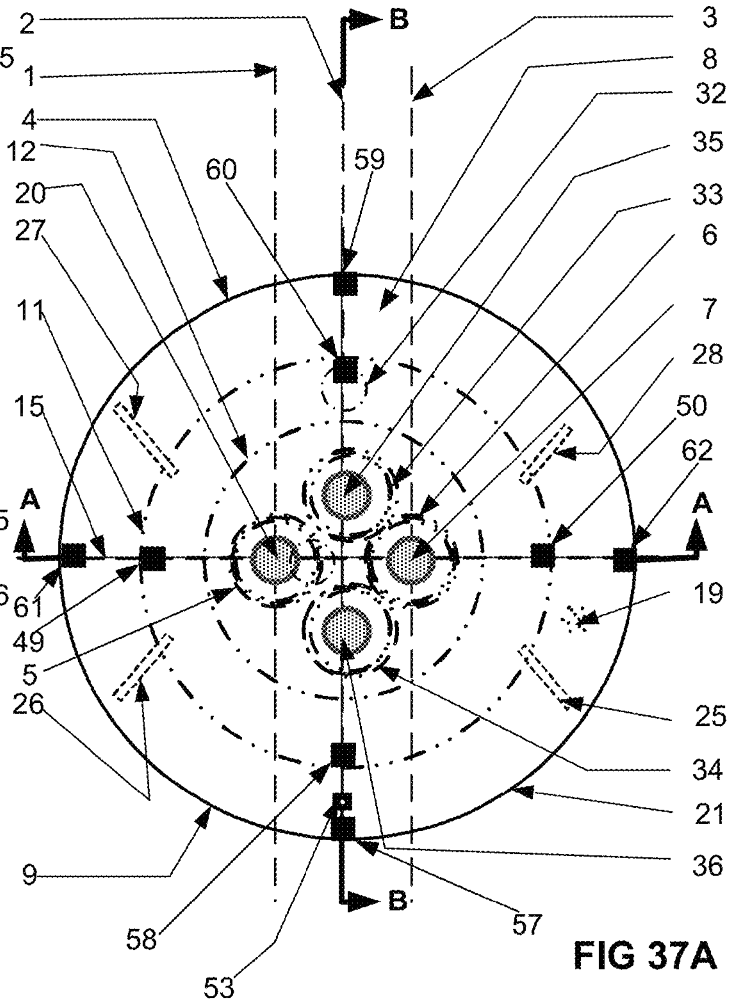
FIG. 37A is a top view of the instrumented hockey puck.
Figure 37B:
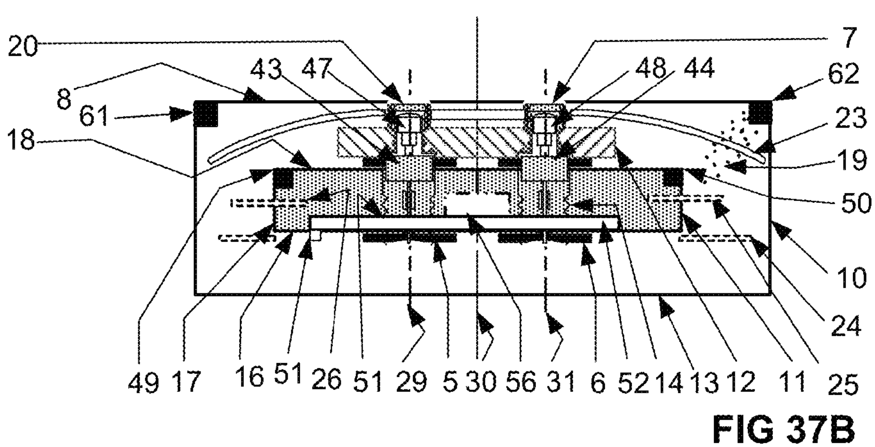
FIG. 37B is a front view of the instrumented hockey puck.

The preferred embodiment disclosed in the present invention in FIG. 9A and FIG. 9B has an advantage over the ice hockey puck shown in FIG. 37A and FIG. 37B and FIG. 37C. The instrumented ice hockey puck disclosed in the preferred embodiment in the present invention in FIG. 9A and FIG. 9B has cameras and microphones peering out from both of the puck's two planar surfaces enabling video and sound to be televised from both sides of the puck. In the game of ice hockey, when the ice hockey puck is struck by hockey sticks during a game, the puck is frequently flipped over. Also, at the beginning of the ice hockey game when the puck is spotted, either of the instrumented ice hockey puck's planar surfaces may be facing upward from the ice rink with its respective camera looking skyward from the ice rink. Obviously, video of the game can only be transmitted from the camera peering through the planar surface of the puck which is facing upward from the ice rink. The camera peering through the planar surface of the puck that is facing downward on the rink, and is in contact with the ice rink, is blinded and cannot see the game. The embodiment shown in FIG. 9A and FIG. 9B is advantageous in the game of ice hockey, because since the instrumented ice hockey puck has a camera peering through both planar surfaces of the puck, it always has least one camera peering upward from the ice rink during a game.

The embodiment shown in FIG. 9A and FIG. 9B is also advantageous over the ice hockey puck shown in FIG. 37A and FIG. 37B and FIG. 37C because it provides for three additional microphone channels to be processed by the remote base station into surround sound for the TV viewing audience.

The embodiment shown in FIG. 9A and FIG. 9B is also advantageous over the embodiment shown in FIG. 1A and FIG. 1B and FIG. 1C of the present invention because it's cost to manufacture is considerably lower owing to the fact that it uses six fewer cameras, lenses and electronics. Even though this embodiment offers fewer broadcast features than that shown in FIG. 1A and FIG. 1B and FIG. 1C, it is more affordable for use in low income venues that have tight budgets.

The instrumented ice hockey puck is equipped to be enabled, commanded and controlled by administrative data conveyed simultaneously and bi-directionally from/to the remote base station utilizing wireless radio communication.

A conventional regulation ice hockey puck is traditionally considered to be sport's paraphernalia. It is a black colored disk three inches in diameter and one inch thick. The instrumented ice hockey puck is instrumented sports paraphernalia. The instrumented ice hockey puck is three inches in diameter and one inch thick like the conventional regulation ice hockey puck. Its size, shape, color, texture, weight, dynamic playability and outward appearance are identical to the conventional regulation ice hockey pucks. The optical axis of both cameras 24 and 17 is z-axis 2 which is centered on the puck and is perpendicular to 6 and 37.

The instrumented ice hockey puck contains two identical instrumentation package assemblies 7 and 46 inside it. Each instrumentation package assembly has one TV camera looking out from their respective planar surfaces of the instrumented ice hockey puck. Except for the small apertures of the optical windows which protect the cameras and their lenses, the outward appearance and texture of the instrumented ice hockey puck is made identical to the conventional ice hockey puck so it will not be obtrusive to the game or to the players. The dynamics of the instrumented hockey puck are made identical to the dynamics of the conventional regulation ice hockey puck. The center of gravity is located at the geometrical center of the puck. The instrumented ice hockey puck molding and encapsulation material 16 and 49 is vulcanized hard black rubber just like the conventional regulation hockey puck. Its surfaces have the same texture and sliding qualities as the conventional regulation ice hockey puck. The weight of the instrumented hockey puck is 5.5 to 6.0 ounces which is the regulation weight of conventional ice hockey pucks. Its moments of inertia are made identical to the conventional regulation ice hockey puck by appropriately balancing and distributing its weight and the weight of its internal components around its x, y and z axes respectively. Voids in the vulcanized hard black rubber molding and encapsulating material are deliberately made at locations inside the body of the puck to achieve these moments of inertia. Very small lead counter weights are also encapsulated at selected locations inside the body of the puck to achieve these moments of inertia without affecting the RF.

The instrumented ice hockey puck is used during an ice hockey game on the ice hockey rink in an arena by the players in the same way a conventional ice hockey puck is used. It is a direct substitute for conventional regulation ice hockey pucks. The instrumented ice hockey puck is three inches in diameter and one inch thick. The distance between the instrumented ice hockey puck's top planar surface 6 and its bottom planar surface 37 is one inch, just like the conventional regulation ice hockey pucks. Surfaces 6 and 37 are flat and parallel to one another.

Referring to drawings FIG. 9A and FIG. 9B, in a preferred embodiment, the present invention contemplates an instrumented ice hockey puck, which when used on any hockey court can by RF radio signals wirelessly and autonomously televise ice hockey games simultaneously from either or both of its instrumentation package assemblies 7 and 46 through the instrumented ice hockey puck under the command and control of the remote base station. The remote base station is disclosed in FIG. 35A and FIG. 35C and elsewhere in the present invention.

During the game of ice hockey, either of the two planar surfaces of the instrumented ice hockey puck may be facing downward and sliding on the ice. The other planar surface will be looking upward from the ice.

The instrumented ice hockey puck employs two single camera instrumentation package assemblies 7 and 46 substantially identical to the instrumentation package assembly shown in FIG. 19A and FIG. 19B. The instrumented ice hockey puck uses the Type XIII buffer plate assembly shown in FIG. 12A and FIG. 12B and FIG. 12C. The instrumented ice hockey puck uses the upper protective cover plate shown in FIG. 27A and FIG. 27B and FIG. 27C.

FIG. 8 is a top view of a typical ice hockey instrumented sports stadium/arena that has been configured and equipped for use with two instrumented ice hockey goals and an instrumented ice hockey puck. Televising games from the ice hockey puck on the rink utilizes bi-directional wireless radio wave communication links between the ice hockey puck and the antenna array relay junction, and bi-directional wireless and/or fiber optics cable/bi-directional high speed copper network communications cable links between the antenna array relay junction and the remote base station. Televising games from the two ice hockey goals on the rink uses bi-directional wireless radio wave communication links between the ice hockey goals and the antenna array relay junction, and/or bi-directional wireless and/or fiber optics cable/high speed copper bi-directional network communications cable links between the ice hockey goals and the antenna array relay junction, and bi-directional wireless and/or fiber optics/high speed copper bi-directional network communications cable links between the antenna array relay junction and the remote base station.

As with the previous preferred embodiment shown in FIG. 26A and FIG. 26B and FIG. 26C, the present invention provides the TV viewing audience with stereophonic surround sound.

It is understood that as the state of the art in TV camera technology advances, that there will be other better TV cameras that use other than CCD technology. The present invention will work equally well with them as they become available. Therefore, the present invention uses CCD TV cameras as an example of SD/HD TV cameras that may be used simply because they are the best that today's technology offers, and is not confined only to their sole use in the future.

The instrumented ice hockey puck has two identical instrumentation package assemblies 7 and 46 mounted inside the puck. Details of instrumentation package assemblies 7 and 46 are disclosed in FIG. 19A and FIG. 19B and FIG. 19C and FIG. 19D and FIG. 19E and FIG. 19F. The two planar surfaces of the instrumented ice hockey puck and those of the conventional ice hockey puck are identical, having the same size, shape, color and texture.

Each of the instrumentation package assemblies 7 and 46 each carry a single CCD sensor arrayed camera, for example 24 and 17 respectively.

There are nine microphones 50, 51, 52, 48, 27, 28, 58, 59, 63 belonging to the top section of the hockey puck. All nine are electrically connected by cables to instrumentation package assembly 7. Microphones 50, 51, 52, 48, 63 protrude through holes in the top planar surface 6 and are flush with the planar surface 6 and hear sounds above and around 6.

There are nine microphones 47, 53, 34, 35, 60, 61, 62, 64, 65 belonging to the bottom section of the hockey puck. All nine are electrically connected by cables to instrumentation package assembly 46. Microphones 47, 53, 54, 55, 62 protrude through holes in the bottom planar surface 37 and are flush with the planar surface 37 and hear sounds above and around 37. 60 is not shown but is directly below and opposite 51. 61 is not shown but is directly below and opposite 52. 64 is not shown but is directly below and opposite 58. 65 is not shown but is directly below and opposite 59.

Microphones 27, 28, 58, 59 are internal to the puck and are parts of instrumentation package assembly 7, and hear sounds created by any contacts with the instrumented ice hockey puck by conduction of sound waves through the puck.

Microphones 34, 35, 64, 65 are internal to the puck and are parts of instrumentation package assembly 46 and hear sounds created by any contacts with the instrumented ice hockey puck by conduction of sound waves through the puck.

Sounds detected by all these microphones have separate simultaneous channels to the remote base station where they are processed into a surround sound format for the audience to hear.

Microphones 54, 55, 56 and 57 are mounted and phased at ninety degree intervals flush and midway down around the cylindrical side 5 around 2 and wired by cable to the instrumentation package assemblies.

The instrumentation package assembly 76 carries two microphones 75 and 87. Microphones 75 and 87 are internal to the puck and part of instrumentation package assembly 76 and hear sounds created by any contact with the puck by conduction of sound. Four additional microphones 67, 95, 96, and 97 are mounted flush with the bottom surface 13 of the puck and phased at ninety degree intervals around 30 and wired by cable (i.e. 68) to the instrumentation package assembly 76 and hear sounds above 13.

The instrumented ice hockey puck has a total of sixteen microphones. These microphones provide the audio inputs to the instrumentation package assemblies 18 and 76 which televise these audio channels via antennas 27, 28, 25, 26, 71, 88, etc. to the remote base station which processes the data to create the broadcast outputs needed by the TV viewing audience for the creation of surround sound.

The lines of sight of the two cameras are both looking straight outward from 6 and 37 of the instrumented ice hockey puck along their respective optical axis 2. Their lines of sight are parallel and coaxial with one another. The SD/HD letter box picture frame formats of cameras 24 and 17 are aligned together. Video information from the two cameras is transmitted simultaneously from the instrumented ice hockey puck to the remote base station where it is processed. Gyroscope data from the instrumented ice hockey puck's gyroscopic encoders accompanies the video data transmitted from the instrumented ice hockey puck to the remote base station. Each of the two instrumentation package assembly elements contains a pitch, roll and yaw encoder. The gyroscope data is processed by the remote base station software to yield the spin rate, spin sense and direction of forward motion of the instrumented ice hockey puck. The spin rate, spin sense and direction of forward motion is then used by the processor to remove the spin from the imagery through derotation processing which stabilizes the imagery in the SD/HD letterbox picture format and holds it upright relative to its direction of forward motion for broadcast to viewing by the TV audience.

The instrumented ice hockey puck disclosed in the present invention uses the instrumentation package assembly shown in FIG. 19A and FIG. 19B and FIG. 19C. The instrumentation package assembly shown in FIG. 19A and FIG. 19B and FIG. 19C uses the instrumentation package assembly element shown in FIG. 19D. The instrumentation package assembly elements shown in FIG. 19D use gyroscopic transducers which are specified in the electronics block diagram FIG. 19E.

A detailed example of the operation of the gyroscopic transducers follows as applied to instrumented ice hockey pucks. Referring to FIG. 19E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis. Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software. The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall. This communications transport mechanism is formed whenever the microprocessor within the instrumented sports paraphernalia communicates with the remote base station over the particular mode of communications connectivity that the stadium has been equipped for i.e. fiber optics, copper cable or wireless radio. This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station. Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. For example, when the instrumented ice hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software. During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game.

Referring back to FIG. 9A and FIG. 9B, the instrumented ice hockey puck has two protective cover plates 18 and 15 embedded and molded into it facing either of the two planar surfaces 6 and 37 of the puck. One protective cover plate 18 is on one side of the puck, and 15 is on the other side of the instrumented ice hockey puck. The bodies of the protective cover plates 18 and 15 are made spherically dome shaped. The two protective cover plates 19 and 33 are disk-like, and are located in the middle of the puck, and are made flat with rounded edges like the edges on protective cover plates 18 and 15. The materials chosen for the protective cover plates 18, 15, 19 and 23 in the present preferred embodiment are polycarbonates, ABS or fiber reinforced plastics. Although a variety of other materials would function equally as well, polycarbonates, ABS or fiber reinforced plastics have an advantage in that they are lightweight and stiff, enabling their thickness to remain thin while still delivering the significant stiffness needed to perform their mechanical shielding function in the limited space they can occupy within the instrumented ice hockey puck. They have an additional advantage in that they are transparent to the transmitted and received radio waves which need to move to and from the RF antennas 20, 21, 22, 23, 39, 40 etc. inside the instrumented ice hockey puck without absorption or reflection.

The two instrumentation package assemblies 7 and 46 are sandwiched between the protective cover plates 18 and 15. The purpose of these protective cover plates 18 and 15 is to act as mechanical shields to protect the instrumentation package assemblies from being damaged during the game. During the normal course of the game, 6 and 37 of the instrumented ice hockey puck will be hit and crushed by the players and by their equipment. For example, the players may step on the instrumented ice hockey puck or slide into it, or hit it with their hockey sticks, or bounce it off of a wall. They may even drop their knees on it. The two protective cover plates 18 and 15 protect the instrumentation package assemblies within the instrumented ice hockey puck from physical damage due to these hits. The antennas 20, 21, 22, 23, 39, 40 etc. are further protected from damage by the flat disk-like plates 19 and 33.

The space between the planar surfaces 6 and 37 is filled with vulcanized hard rubber or synthetic rubber encapsulating material 16. A combination of encapsulation voids and encapsulated tiny lead spheres are used to carefully balance and set the moments of inertia of the instrumented puck to match those of the conventional regulation puck. Synthetic rubber is an example of an encapsulating material that is used besides vulcanized hard rubber to mold the ice hockey puck disk. When cured, this encapsulating material 16 acts to absorb shock and vibration to the contents of instrumented ice hockey puck. The encapsulating material 16 encapsulates the protective cover plates 18 and 15 and maintains their positions inside the molded instrumented ice hockey puck. The space between the protective cover plates 18 and 15 and the instrumentation package assemblies and buffer plate assemblies is also filled with the same encapsulating material. When cured, this encapsulating material acts to absorb shock and vibration to the instrumentation package assemblies and buffer plate assemblies. The encapsulating material encapsulates the instrument package assemblies and buffer plate assemblies inside the instrumented ice hockey puck and thereby maintains their positions centered and coaxial with the mechanical z-axis 2 inside the molded instrumented ice hockey puck.

The protective cover plates 18 and 15 are made flat in their innermost regions close to their optical windows 13 and 11 respectively. The purpose of making them flat in their innermost regions is to provide maximum protection for the optical windows 13 and 11 whose flat surfaces are flush with the planar surfaces 6 and 37 of the instrumented ice hockey puck. The flat shape near their centers enables the protective cover plates 18 and 15 to surround the optical windows 13 and 11 of the instrumented ice hockey puck where the optical windows are most likely to be exposed to the greatest threat of damage due to hits to, and scraping on the ice by the instrumented ice hockey puck. The protective cover plates 18 and 15 are buried in encapsulating material at the center top of the instrumented ice hockey puck around the optical windows 13 and 11 by approximately 1/32 inch or more below 6 and 37 respectively. The dome shape enables the protective cover plates 18 and 15 to come very close to the top center of the instrumented ice hockey puck where the players will have only grazing contact with its curved surface if they crash into the instrumented ice hockey puck, thereby eliminating the threat of injury to the players if they hit the top of the instrumented ice hockey puck. Furthermore, the spherical shape of the protective cover plates 18 and 15 causes their edges to be rounded downward away from 6 and 37 and places them well below 6 and 37 respectively.

The protective cover plates 19 and 33 are disk-like and flat and are buried equidistant in encapsulating material approximately ½ inch from both 6 and 37. The bodies of protective cover plates 19 and 33 are made flat because they are buried inside the puck and there is no danger of the players coming into violent contact with them. The flat shape is easier and less expensive to manufacture. The thickness of the plates is made in the range of approximately 1/16 inches. In all cases, the rounded edges of the protective cover plates 19 and 33 come within no less than ¼ inch or more from all sides of the instrumented ice hockey puck.

Alignment and sync of the two cameras 17 and 24 in each of the instrumentation package assemblies respectively inside the instrumented ice hockey puck is achieved using the following example of a representative alignment procedure. Identical ultra wide angle zoom lenses 25 and 26 are used in each of the instrumentation package assemblies 7 and 46 respectively. When the instrumented ice hockey puck is arranged on the ice so that the camera 24 of instrumentation package assembly 7 is pointed upward from the ice, and one of the ice hockey goal nets lies along the positive y-axis direction 1 of the instrumented ice hockey puck, camera 24 is aligned and synched in rotation about it's respective z-axis 2 within the instrumentation package assembly 7 so that it's wirelessly transmitted upright image of the hockey net that it transmits to the remote base station appears between the center and the bottom of the TV picture frame, and it has it's letterbox picture frame aligned also. The instrumented ice hockey puck is then flipped over. The second camera 17 is aligned and synched together in rotation about it's respective z-axis 2 within the instrumentation package assembly 46 so that it simultaneously yields a wirelessly transmitted upright image of the hockey goal net which appears between the center and the bottom of the TV picture frame, and has it's letterbox picture frame aligned also. The two cameras 24 and 17 are then aligned and synched together. If the instrumented ice hockey puck is struck by a hockey stick so that the puck moves along the positive y-axis, the TV audience will see a stabilized upright picture looking in the direction of the puck's forward motion along the positive y-axis. The TV audience will see an upright stabilized picture of the goal net.

The cameras 24 and 17 enable the TV audience to see what the instrumented ice hockey puck sees as it travels outward from the crack of the hockey stick on its body. The TV audience will see the hockey goal net get larger as the instrumented ice hockey puck gets closer to the net and the goal tender. Microphones 27, 28, 48, 34, 35 and 47 will deliver the sound of a loud crack to the TV viewing audience in surround sound as the player's hockey stick crashes against the instrumented ice hockey puck. Despite the fact that the puck may be spinning, the TV audience will see an upright stabilized picture of the goal tender drop down close-up as the instrumented ice hockey puck approaches the goal net and see the goal tender as he tries to block its flight. Members of the TV viewing audience may flinch to avoid being hit by the goal tender's hockey stick as he wields it to intercept the puck. The TV audience will hear the thud and groans of the goal tender as he blocks the puck. The TV audience will hear the scraping by the goal tender's skates as they dig into the ice on the rink. The TV audience will hear the players collide as they scramble for the puck. The sounds received from each of the microphones 27, 28, 48, 34, 35 and 47 by the remote base station are processed using special software to produce surround sound which is broadcast to the TV viewing audience.

The televised images viewed by the TV audience are maintained upright in the HD letterbox picture frame despite the rotational motions of the instrumented ice hockey puck, by transmitting pitch, yaw and roll data from its gyroscopes along with the televised image data from the instrumented ice hockey puck's instrumentation package assemblies 7 and 46 to the remote base station which processes the imagery and gyroscope data in its hardware and software and derotates the imagery and holds it upright and stable for the TV audience. The pitch, yaw and roll gyroscopes and encoders are part of the supporting electronics in each of the two instrumentation package elements that are inside the two instrumentation package assemblies 7 and 46.

In a preferred embodiment where standard SD/HD letterbox CCD chips are used in the cameras, since the shape of the CCD sensor array of pixel elements is a letterbox, this causes the common area of pixels of the physically spinning letterbox to be a square covering only 9/16 or 56% of the field of view of the whole letterbox. Therefore, in a preferred embodiment using standard camera chips we loose 44% of the field of view and are reduced essentially to a square picture format. We can recover the field of view by using physically larger sized standard chips and shorter focal length camera lenses.

In another preferred embodiment, the circular HD CCD TV camera sensor chips disclosed in drawings FIG. 34A and FIG. 34B and FIG. 34C are used in the two cameras 24 and 17 rather than ordinary prior art CCD sensor chips. These circular HD CCD TV camera sensor chips have an advantage over ordinary HD CCD sensor chips because they permit transmission of the entire circular sensor array of each camera to the remote base station for processing, even though the instrumented ice hockey puck is spinning. The pixel elements of ordinary prior art CCD sensor chips cover only the area of the letterbox, thereby causing a loss of field of view when the ice hockey puck spins. Use of the circular HD CCD TV camera sensor chips in each of the two cameras 24 and 17 eliminates this problem of field of view loss when the puck spins. Using the processing software in the remote base station, the SD/HD letterbox picture frame format is made to spin in sync with the spin of the instrumented ice hockey puck to derotate and stabilize the imagery and lock it in its upright position relative to the direction of forward motion of the instrumented ice hockey puck without loss of any of the field of view.

For example, with camera 24 facing upward from the ice rink as the instrumented ice hockey puck spins on the ice rink about its z-axis 2, the optical image of the rink formed on the circular HD CCD TV camera 24 sensor chip by camera lens 25, fully fills the circular sensor's surface. Camera 17, which faces the ice rink, produces a blank image on its circular CCD sensor. The entire circular surface of the CCD sensors of both cameras is scanned because all the pixel elements on the sensor of each camera are active simultaneously. As the instrumented ice hockey puck spins on the ice, so does the optical images on the circular sensor's surface. The circular sensors are large enough to cover and track the full SD/HD letterbox picture frame format of the images whatever their rotation angle may be. Image data from all the pixel elements on the face of the circular sensors of cameras 24 and 17 is simultaneously wirelessly transmitted with the audio data from the six microphones from instrumentation package assemblies 7 and 46 to the remote base station from the instrumented ice hockey puck for processing.

At the remote base station, the spinning virtual electronic SD/HD letterbox frame within the software processor collects the signals from only those pixel elements within the rectangular letterbox borders for transmission to the TV viewing audience. The roll gyroscopes detect the z-axis 2 spin of the instrumentation package assembly within the spinning instrumented ice hockey puck on the ice rink and encodes the spin data as well as the pitch and yaw data. The spin (roll) data along with pitch and yaw data, and the image data from the two circular camera sensors, and the audio data from the six microphones are transmitted simultaneously to the remote base station wirelessly from the RF antennas 25, 26, 27 and 28 via the antenna array relay junction in the ice hockey arena. The remote base station software processes the encoded spin data with the image data and the audio data and delivers a spin stable upright HD letterbox picture and sound to the TV viewing audience.

An advantage of this preferred embodiment is that it completely eliminates the need for the mechanical actuators and bearings associated with each of the instrumentation package elements specified in FIG. 19D. This reduces the weight and the volume requirements of the instrumentation package assembly inside the instrumented ice hockey puck.

In another preferred embodiment, we can accomplish the same performance as above by using standard square chips, where the dimension of each side of the square is equal to the diameter of the circular chip sensor array, and we only use the pixel elements inscribed in the circular region of the chip.

With regard to audio, each of the six microphones 27, 28, 48, 35, 36 and 47 listens for sounds from their respective vantage points inside and on the instrumented ice hockey puck. The condenser microphones enable the viewing audience to hear real-time contacts, impacts and shocks to the instrumented ice hockey puck. Microphones 27, 28, 48, 35, 36 and 47 enable the TV audience to hear sounds that result from the air or any physical contacts or vibrations to the instrumented ice hockey puck; like for example, the sound of the puck sliding on the ice and the crash of a player sliding into the instrumented ice hockey puck. Microphones 47 and 48 are on the opposite surfaces of the puck and hear sounds of activity from sources outside the puck and from any physical contacts or vibrations to the instrumented ice hockey puck itself.

Microphone 48 protrudes through a hole in the planar surface 6 of the instrumented ice hockey puck. Microphone 48 is mounted through a hole in the upper protective cover plate 18. Microphone 48 is connected by cable 43 to electrical connector 14. 14 is connected to the electronics in the instrumentation package assembly 7. Microphone 48 enables the TV audience to hear sounds that occur on the hockey rink like extemporaneous remarks from the players or the scraping of skates on the ice. In certain venues the cameraman may be asked to disable these sounds. The cameraman may disable these sounds remotely by transmitting a microphone disabling signal to the ice hockey puck from the remote base station. Microphone 48 enables the TV audience to hear the whoosh of air as a hockey sticks wiz past the instrumented ice hockey puck, or as the goal tender blocks the puck with his legs.

Microphone 47 protrudes through a hole in the planar surface 37 of the instrumented ice hockey puck. Microphone 47 is mounted through a hole in the protective cover plate 15. Microphone 47 is connected by cable 38 to electrical connector 36. 36 is connected to the electronics in the instrumentation package assembly 46. Microphone 47 enables the TV audience to hear sounds that occur on the hockey rink like extemporaneous remarks from the players or the scraping of skates on the ice. In certain venues the cameraman may be asked to disable these sounds. The cameraman may disable these sounds remotely by transmitting a microphone disabling signal to the ice hockey puck from the remote base station. Microphone 47 enables the TV audience to hear the whoosh of air as a hockey sticks wiz past the instrumented ice hockey puck, or as the goal tender blocks the puck with his legs.

For example, with the camera 24 of instrumentation package assembly 7 looking upward from the ice rink, live TV pictures are taken simultaneously by TV camera 24 of its respective extremely wide angle field of view of the live action on the hockey rink. Camera 24 will enable the TV audience to see close-ups from the puck's perspective as players maneuver to strike the instrumented ice hockey puck as it whizzes bye. This will be an action packed event never before witnessed by a TV audience. Some members of the TV audience will flinch as the puck is struck by an oncoming stick. Each of the plays will produce breath taking excitement and expectations by the TV viewing audience. In summary, the instrumented ice hockey puck provides video and sound to the viewing audience that is so exciting and realistic that it makes the individual members of the audience feel that they are in the game on the rink amongst the players. In many ways this is more exciting than viewing the game in person from the stands of the hockey stadium. In a similar fashion, with the puck flipped over so that camera 17 of instrumentation package assembly 46 is looking upward from the ice rink, live TV pictures are taken simultaneously by TV camera 17 with its equally extremely wide angle field of view of the live action on the hockey rink enabling the TV audience to see close-ups from the puck's perspective as players maneuver to strike the instrumented ice hockey puck as it whizzes bye.

The data from all six of the instrumented ice hockey puck's microphones is simultaneously transmitted to—and processed by—the remote base station software, and broadcast to the real time TV viewing audience to yield surround sound regardless of the spin motion of the instrumented ice hockey puck. By using the data from the gyroscope encoders, the surround sound processing software in the remote base station keeps track of the angular positions of each of the six microphones mounted in the puck relative to the direction of forward motion of the puck. When the TV viewing audience looks at their TV screens they always see an upright picture of the scene looking in the direction of forward motion of the puck. The surround sound processing software in the remote base station simultaneously removes the effect of the puck's spin from the six microphones and properly phases the sound to the picture the audience sees. The surround sound is phased and synced front to back and right to left and top to bottom with the upright picture scene as seen looking in the direction of forward motion of the puck. The direction of forward motion of the puck becomes the audience's sound reference point as well as its spatial reference point. So, even though the instrumented ice hockey puck is spinning, the system produces "stabilized surround sound" for the TV viewing audience to hear as though the audience were fixed to that spatial reference point. "Stabilized surround sound" enables the TV audience to hear the same surround sound they would ordinarily hear if the puck were not spinning. The "stabilized surround sound" is essentially synched to the direction of the puck's forward motion, where the upright stabilized picture that the audience sees on their screens represents the reference direction of the puck's forward motion. The TV viewing audience will experience a surround sound novelty. The TV audience will be treated also to an added dimension of "stabilized surround sound". In addition to hearing sounds from in front and back, and sounds from the right and from the left of the puck, the TV audience will be treated to hearing the sound of the ice scraping from beneath them as the puck spins and slides on the ice. Imagine that the audience is inside the puck. The sounds of the scraping ice beneath the puck will appear to be coming up from directly beneath and between the audience's legs! This is very exciting. Additionally, the TV audience will be treated to hearing the sound of the air apparently coming from above their heads as the air rushes along the top of the puck above them as the puck spins and whizzes forward along on the ice rink. As a hockey stick hits the top of the puck, the audience will hear an apparent crash to the top of their heads. As a hockey stick hits the side of the puck, the audience will hear an apparent crash to that side of the puck. In this system, the TV viewing audience will have speakers appropriately placed beneath and above them, as well as speakers placed on their right and on their left, and in front and behind them at the audience's respective viewing sites.

The following is an example of how the remote base station does its stabilized surround sound processing. Given that the hockey puck is initially located at rest at the center of the ice hockey rink at x-y-z coordinates P(0, 0, 0), and that the planar surface 6 is facing upward from the ice rink with the positive x-axis 4 of the puck pointing toward N(d, 0, 0), and with the two ice hockey goal nets located at coordinates N(d, 0, 0) and N(−d, 0, 0) at either end of the rink, then using camera 24 the TV viewing audience will see the net N(d, 0, 0) appear upright near the bottom central edge of the HD letterbox picture frame screen format. If the instrumented ice hockey puck is now struck so it accelerates to velocity V along the x-axis of the rink toward the goal net at N(d, 0, 0), and if the puck has an arbitrary clockwise spin (or roll) about its z-axis 2, then as the hockey puck travels closer to the goal net N(d, 0, 0), the TV viewing audience will see and hear the goal net get closer. The goal net N(d, 0, 0) is imaged upright above the bottom central edge of the HD letterbox picture frame screen format and it appears to be growing larger and closer to the center of the letterbox picture frame. The pitch, roll and yaw gyroscope data from each of the two instrumentation package assembly elements inside the two instrumentation package assemblies 7 and 46 along with the video data from the two cameras 24 and 17 and audio data from the six microphones 48, 47, 27, 28, 34 and 35 is simultaneously transmitted to the base station via the antenna array relay junction where the spin rate, spin sense, and the forward velocity direction of each of the cameras and microphones is calculated by the processing software. The software in the remote base station processes the data it receives from the hockey puck's onboard instrumentation package assemblies 7 and 46 and aligns the HD letterbox picture frame screen formats of the two cameras so that they are stable relative to the direction of the goal net N(d, 0, 0). It also aligns the sounds it transmits to the audience's speakers to the forward velocity direction of the microphones. The software in the remote base station simultaneously processes the audio and video data it receives from both of the hockey puck's onboard instrumentation package assemblies, and derotates the spinning sounds and imagery that the TV cameras sees and hears, and removes the spin from the audio and imagery of the two cameras and six microphones to stabilize them and sync them to the upright HD letterbox picture frame screen format. Even though all the sounds heard by all six microphones are processed and broadcast to the TV viewing audience, only the imagery from TV camera 24 is broadcast to the TV viewing audience for them to see because the video from TV camera 17 is blank since it faces the ice rink. The remote base station receives imagery from both cameras simultaneously, and sound from all six microphones simultaneously. Except for the processing software and joy sticks, the remote base station used in conjunction with the instrumented ice hockey puck is substantially identical to those specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B. Block diagrams of the electronics circuitry signal and data flows are specified in FIG. 14A and FIG. 14B. The processing software is similar to that used for the instrumented football preferred embodiments disclosed in FIG. 39A and FIG. 39B and FIG. 40A and FIG. 40B and FIG. 40C to stabilize and maintain upright imagery using the data from the instrumented ice hockey puck gyroscope encoders and the image recognition data from the set-up camera system shown in FIG. 15A and FIG. 15B, and FIG. 16.

The CCD sensor arrayed TV cameras 24 and 17 are chosen to be identical to one another. The two TV camera lenses 25 and 26 are extremely wide angle zoom lenses and are chosen to be identical to one another. The focal lengths produced by the zoom are synched together and made identical to one another.

The following is an example of how the remote base station does its image processing. Given that the hockey puck is initially located at rest at the center of the ice hockey rink at x-y-z coordinates P(0, 0, 0), and that the planar surface 6 is facing upward from the ice rink with the positive x-axis 4 of the puck pointing toward N(d, 0, 0), and with the two ice hockey goal nets located at coordinates N(d, 0, 0) and N(−d, 0, 0) at either end of the rink, then using camera 24 the TV viewing audience will see the net N(d, 0, 0) appear upright near the bottom central edge of the HD letterbox picture frame screen format. If the instrumented ice hockey puck is now struck so it accelerates to velocity V along the x-axis of the rink toward the goal net at N(d, 0, 0), and if the puck has an arbitrary clockwise spin (or roll) about its z-axis 2, then as the hockey puck travels closer to the goal net N(d, 0, 0), the TV viewing audience will see the goal net N(d, 0, 0) be imaged upright above the bottom central edge of the HD letterbox picture frame screen format and see it appear to be growing larger and closer to the center of the letterbox picture frame. The pitch, roll and yaw gyroscope data from each of the two instrumentation package assembly elements inside the two instrumentation package assemblies 7 and 46 along with the video data from the two cameras 24 and 17 and audio data from the six microphones is simultaneously transmitted to the base station via the antenna array relay junction where the spin rate, spin sense, and the forward velocity direction of each of the cameras is calculated by the processing software. The software in the remote base station processes the data it receives from the hockey puck's onboard instrumentation package assemblies 7 and 46 and aligns the HD letterbox picture frame screen formats of the two cameras so that they are stable relative to the direction of the goal net N(d, 0, 0). The software in the remote base station simultaneously processes the data it receives from both of the hockey puck's onboard instrumentation package assemblies, and derotates the spinning imagery that the TV cameras see, and removes the spin from the imagery of the two cameras to stabilize it and make them upright in the HD letterbox picture frame screen format. Only the imagery from TV camera 24 is broadcast to the TV viewing audience for them to see because the video from TV camera 17 is blank since it faces the ice rink. The remote base station receives imagery from both cameras simultaneously. Except for processing software and joy sticks, the remote base station used in conjunction with the instrumented ice hockey puck is substantially identical to those specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B. Block diagrams of the electronics circuitry signal and data flows are specified in FIG. 14A and FIG. 14B. The processing software is similar to that used for the instrumented football preferred embodiments disclosed in FIG. 39A and FIG. 39B and FIG. 40A and FIG. 40B and FIG. 40C. to stabilize and maintain upright imagery using the data from the instrumented ice hockey puck gyroscope encoders and the image recognition data from the set-up camera system shown in FIG. 15A and FIG. 15B, and FIG. 16.

Although electronic rotation of the scan direction of the letterbox can be achieved using standard CCD sensor chips, the circular CCD sensor arrayed chips referred to in FIG. 34A and FIG. 34B and FIG. 34C are particularly suitable for this application because the letterbox can be rotated without any loss of the field of view of the camera. The cameraman in the remote base station will verify that the letterbox formats of the pictures from the two cameras are aligned. When the instrumented ice hockey puck is at rest the letterbox formats of both cameras will be aligned to look along the positive x-axis by default.

In general, for all the preferred embodiments disclosed in the present invention, the instrumented ice hockey puck uses the instrumentation package assembly shown in FIG. 19A and FIG. 19B. The instrumentation package assembly shown in FIG. 19A and FIG. 19B uses the instrumentation package assembly element shown in FIG. 19D. The instrumentation package assembly element shown in FIG. 19D use gyroscopic transducers which are specified in the electronics block diagram FIG. 19E. A detailed example of the operation of the gyroscopic transducers follows. Referring to FIG. 33E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis. Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software. When the instrumented hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software. During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game. The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall. This communications transport mechanism is formed whenever the microprocessor within the instrumented sports paraphernalia communicates with the remote base station over the particular mode of communications connectivity that the stadium has been equipped for i.e. fiber optics, copper cable or wireless radio. This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station. Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

The instrumentation package assembly element shown in FIG. 19D is the identically same unit used in the eight camera embodiment of the present invention shown in FIG. 1A and FIG. 1B and FIG. 1C. The two camera embodiment shown in FIG. 39A and FIG. 39B uses the instrumentation package assembly shown in drawings FIG. 19A and FIG. 19B. The two camera embodiment does not produce 3-D. The instrumentation package assembly shown in FIG. 19A and FIG. 19B is mounted, aligned and encapsulated into the ice hockey puck in the same manner as the previous preferred embodiment that uses eight cameras. The z-axis 2 of the instrumentation package assemblies 7 and 46 is aligned and made coincident with the z-axis of the puck which is normal to the top center of the puck, so that the cameras sees out the planar surfaces 6 and 37 of the puck. The center of gravity is in the center of the ice hockey puck as in the previous preferred embodiment. The image stabilization is done by the remote base station in the same way as before also. As the puck spins about its z-axis, so does the cameras and their CCD sensor arrays. As the CCD sensor arrays spin about the z-axis of the puck, the imagery formed on each of the sensors seems to spin relative to the CCD sensors. The instrumented ice hockey puck wirelessly communicates with the remote base station in the identical manner as before. The spinning pixel data and the gyroscope data are communicated to the remote base station as before. The remote base station uses the same processing software as before to de-rotate and stabilize the imagery and make it upright relative to the direction of forward motion of the instrumented puck. The instrumented ice hockey puck has the same appearance, playing and handling qualities, as before.

The cameraman, in the remote base station, software selects the wireless mode of communication between the instrumented ice hockey puck and the remote base station. The cameraman uses the antenna array relay junction that is installed in the ice hockey stadium/arena with which to command and control his choice and communicate it to the instrumented ice hockey puck in the ice hockey rink.

The cameraman selects items from a software menu of control commands that go to the network transceiver at the remote base station that are subsequently transmitted to the instrumented sports paraphernalia (the instrumented ice hockey puck) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular sports stadium/arena.

These commands, when intercepted by the network transceiver within the instrumented sports paraphernalia, are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented sports paraphernalia that are being controlled.

Referring to the Preferred Embodiments Specified in FIG. 9A and FIG. 9B, the instrumented ice hockey puck satisfies all of the following further objectives:

It is an objective of the present invention to replace existing prior art non-instrumented ice hockey pucks that are currently on existing prior art rinks with substitute instrumented ice hockey pucks.

It is an objective of the present invention to equip an ice hockey arena with an instrumented ice hockey system for the improvement of the TV broadcast quality of ice hockey games.

It is an objective of the present invention to provide an instrumented ice hockey puck comprised of two instrumentation package assemblies, two buffer plate assemblies, two upper protective cover shields, a lower protective cover shield, and a synthetic or vulcanized rubber encapsulation/molding material.

It is an objective of the present invention to provide an instrumentation package assembly wherein one camera looks out through the top of the puck, and another camera looks out through the bottom of the puck.

It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format, by the remote base station processing gyroscopic encoder data for pitch, roll and yaw from inside the instrumentation package assemblies of the puck, and by using image recognition processing in the remote base station of the archived data base derived from the tripod mounted set-up camera system used in the ice hockey arena venue.

It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using image recognition processing of the archived data base derived from the tripod mounted set-up camera system in the remote base station.

It is an objective of the present invention to provide views of the game not seen before by real time TV audiences during broadcasts in the prior art taken from the surface of the ice rink, as seen from the top of the instrumented ice hockey puck It is an objective of the present invention to provide views of the ice hockey game from the vantage point of the instrumented ice hockey puck.

It is an objective of the present invention to provide views of the game from the surface of the ice rink, as seen from the top of the instrumented ice hockey puck.

It is an objective of the present invention to provide views of the game not seen before by real time TV audiences during broadcasts.

It is an objective of the present invention to provide views of the game from the instrumented ice hockey puck.

It is an objective of the present invention to provide sounds of the game not heard before by real time TV audiences during broadcasts.

It is an objective of the present invention to provide sounds of the game as heard by the instrumented ice hockey puck as it slides on the ice.

It is an objective of the present invention to provide sounds heard from the ice hockey puck as it is passed from player to player and hits the net.

It is an objective of the present invention to provide an instrumented ice hockey puck, where the electronics components needed to carry out all the electronic functions of the instrumentation package assembly defined above, be packaged into the confined space of the instrumentation package assembly inside the instrumented ice hockey puck, and that the weight limitations, center of gravity and moment of inertia considerations set out for the instrumentation package assembly be adhered to.

It is an objective of the present invention to provide an instrumented ice hockey puck where coaches who are on the sidelines during training sessions and during the game can hear the spoken dialog of their team's players from on the ice hockey rink.

It is an objective of the present invention to provide an instrumented ice hockey puck where coaches who are on the sidelines during training sessions and during the game can view details of the team's players detailed motions on the ice hockey rink.

It is an objective of the present invention to provide an instrumented ice hockey puck where referees who are on and off the rink during games can review details of the game from the instrumented ice hockey puck by instant replay.

It is an objective of the present invention to provide an instrumented ice hockey puck equipped to capture video and sounds on the ice hockey rink from the instrumented ice hockey puck, and to wirelessly televise the captured video and sounds to a remote base station via an antenna array relay junction stationed off the playing field but within (and around) the space of the instrumented sports stadium/arena.

It is an objective of the present invention to provide an instrumented ice hockey puck comprised of two instrumentation package assemblies, protective cover plate, and buffer plate assembly, wherein each instrumentation package assembly is comprised of one TV camera, five microphones, four wireless antenna elements, wirelessly rechargeable battery pack and supporting electronics housed inside its enclosure to wirelessly televise the captured video and sounds from said cameras and microphones to a remote base station via an antenna array relay junction stationed off the ice rink but within (and around) the space of the instrumented sports stadium/arena, wherein the functions of the instrumented ice hockey puck are under the command and control of a cameraman in the remote base station.

It is an objective of the present invention to enable the instrumentation package assembly to be mounted inside the instrumented ice hockey puck in a manner permitting its two cameras and sixteen microphones to see and hear out of the instrumented ice hockey puck, and to be nested, cradled and isolated from shock and vibration and withstand axial and tangential compression and decompression loads exerted on it during play inside the instrumented ice hockey puck by the cushioning of the encapsulation and be protected from damage during the game on the ice from dirt, water, ice and weather conditions and to provide a permanent position and nesting place for the instrumentation package assembly inside the instrumented ice hockey puck to maintain its mechanical and optical alignment, and be sized so that it can be easily loaded and assembled into the instrumented ice hockey puck and permit easy assembly and alignment of the instrumentation package assembly in the instrumented ice hockey puck.

It is an objective of the present invention to provide an instrumented ice hockey puck equipped with two rechargeable battery packs that can be wirelessly charged by magnetic induction through its electronics charging circuitry with sufficient electrical energy to power the two cameras, lenses, antennas, electronics and all the functions of the hockey puck for the duration of the ice hockey game using the same charging unit as used for instrumented baseball bases, instrumented baseball home plates, instrumented pitcher's rubbers, instrumented tennis nets, instrumented tennis net posts, instrumented soccer goals and instrumented ice hockey goals.

It is an objective of the present invention to enable the instrumentation package assembly to be mounted inside the instrumented ice hockey puck in a manner permitting it to maintain its mechanical and optical alignment during the game on the ice.

It is an objective of the present invention to provide a permanent position and nesting place for the instrumentation package assembly inside the instrumented ice hockey puck.

It is an objective of the present invention to provide means to permit easy assembly and alignment of the instrumentation package assembly in the instrumented ice hockey puck.

It is an objective of the present invention to provide the instrumented ice hockey pucks with the identical weight, center of gravity and moment of inertia, handling and playability qualities as conventional regulation ice hockey pucks.

It is an objective of the present invention to provide an instrumentation package assembly that is sized so that it can be easily loaded and assembled into the instrumented ice hockey puck.

It is an objective of the present invention to provide the instrumented ice hockey puck with an instrumentation package assembly that can withstand axial and tangential compression and decompression loads exerted on it during play.

It is an objective of the present invention to provide the instrumented ice hockey puck with provisions for holding the instrumentation package assembly in alignment and for cushioning and isolating the instrumentation package assembly from shocks received by the instrumented ice hockey puck during the game.

It is an objective of the present invention to make the optical windows of the instrumented ice hockey puck small to be unobtrusive to the game without vignetting the field of view of the cameras under the prevailing lighting conditions on the rink in the arena be and be easily removed and replaced wherein the optical windows can withstand heavy blows received during the game and protect the instrumentation package assembly.

It is an objective of the present invention to make the optical windows of the instrumented ice hockey puck to be easily removed and replaced.

It is an objective of the present invention to simplify the instrumented ice hockey puck and reduce its cost for low budget venues by using only two TV cameras, wherein the simplified instrumented ice hockey puck has the same appearance, playability and handling qualities as the conventional regulation ice hockey pucks, and uses the same sports stadium/arena, remote base station, wireless communication links and antenna array relay junction are used as the four camera preferred embodiment.

It is an objective of the present invention for the simplified one camera instrumented ice hockey puck to operate in the same sports stadium/arena and use the same remote base station, wireless communication links and antenna array relay junction as the four camera preferred embodiments.

It is an objective of the present invention that since the TV viewing audience always sees an upright stabilized picture of the scene looking in the direction of forward motion of the puck, and the surround sound processing software in the remote base station simultaneously removes the effect of the puck's spin from the sound received from the puck's twenty two microphones and properly phases the sound to the picture, the surround sound is phased and synced front to back and right to left with the upright picture scene looking in the forward direction of the puck's motion.

FIG. 10

Figure 10:
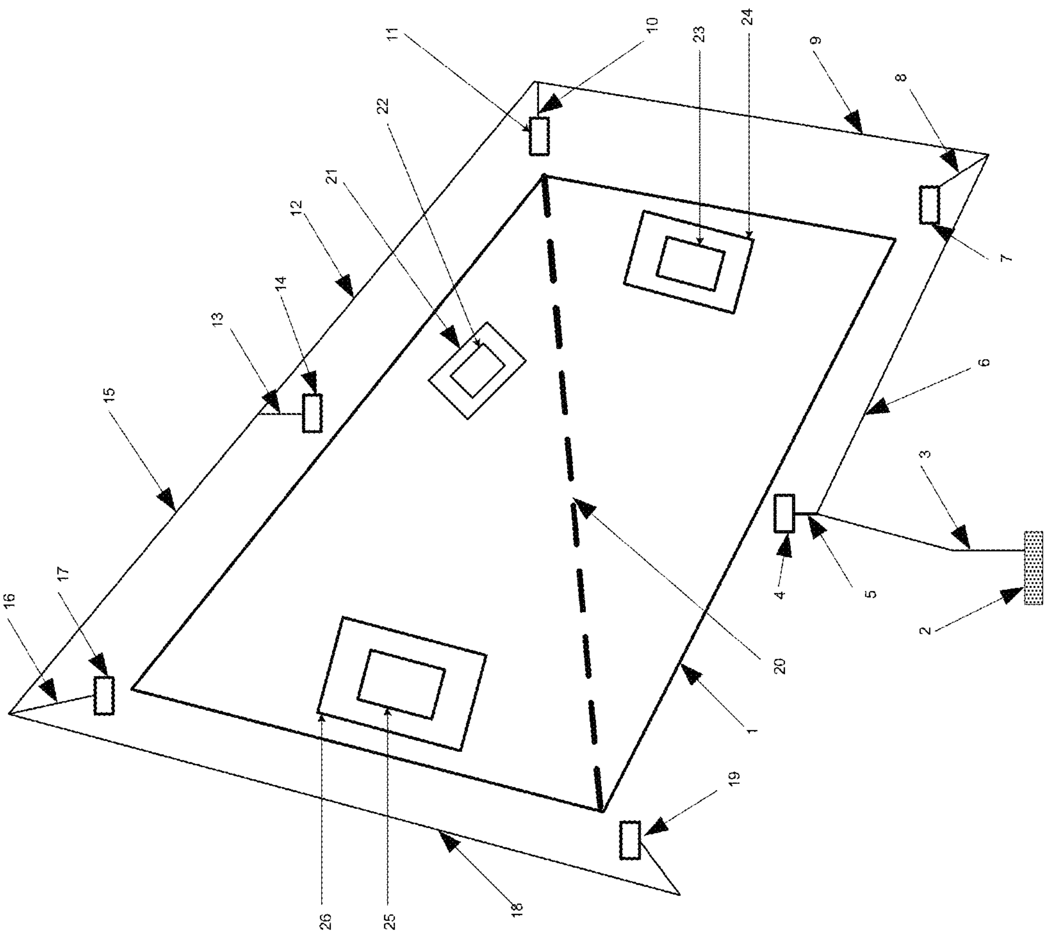
FIG. 10 is a diagram of a typical instrumented ice hockey stadium/arena equipped with a wireless RF bi-directional communications link to televise ice hockey games from an instrumented ice hockey puck, which is in play on the rink, and a remote base station; and televise and stream ice hockey games from the two instrumented ice hockey goals, which are fixed at their traditional locations on the rink, and the remote base station.

The detailed physical elements disclosed in the instrumented ice hockey arena drawing shown in FIG. 10 are identified as follows: 1 is the ice hockey rink. 2 is the remote base station. 3 is the bi-directional communications cable to the first antenna location. 4 is the first antenna location. 5 is the bi-directional communications cable junction of the first antenna location. 6 is the bi-directional communications cable to second antenna location. 7 is the second antenna location. 8 is the bi-directional communications cable junction of the second antenna location. 9 is the bi-directional communications cable to the third antenna location. 10 is the bi-directional communications cable junction of the third antenna location. 11 is the third antenna location. 12 is the bi-directional communications cable to the fourth antenna location. 13 is the bi-directional communications cable junction of the fourth antenna location. 14 is the fourth antenna location. 15 is the bi-directional communications cable to the fifth antenna location. 16 is the bi-directional communications cable junction of the fifth antenna location. 17 is the fifth antenna location. 18 is the bi-directional communications cable to the sixth antenna location. 19 is the sixth antenna location. 20 is the linear dimension of the distance measured across the ice rink diagonally. 21 is the instrumented ice hockey puck. 22 are the instrumentation package assemblies. 23 are the instrumentation modules. 24 is an instrumented ice hockey goal. 25 are the instrumentation modules 26 is an instrumented ice hockey goal.

FIG. 10 is a diagram of a typical instrumented ice hockey stadium/arena equipped with a wireless RF bi-directional communications link to televise ice hockey games from an instrumented ice hockey puck, which is in play on the rink, and a remote base station; and televise and stream ice hockey games from the two instrumented ice hockey goals, which are fixed at their traditional locations on the rink, and the remote base station.

FIG. 10 shows an instrumented ice hockey arena equipped for televising pictures and sounds from an instrumented ice hockey puck 21 employing multipoint diversity reception techniques. Examples of the instrumented ice hockey puck are those shown in FIG. 1A, FIG. 1B, FIG. 1C and FIG. 9A, FIG. 9B, and FIG. 37A, FIG. 37B, FIG. 37C of the present invention. These techniques are similar to the techniques used for the instrumented football field disclosed in FIG. 33A. FIG. 10 also shows a typical instrumented ice hockey arena equipped for televising pictures and sound from instrumented ice hockey goals 22, 23 employing multipoint diversity reception techniques. Examples of the instrumented ice hockey goals are those shown in FIG. 5 and FIG. 6 of the present invention.

Some arenas are located in areas where only a poor signal to noise ratio can be achieved due to radio frequency interference from other sources within the vicinity while attempting to receive real-time televised images and sounds from an instrumented ice hockey puck 21 using systems that employ only a single antenna point.

Six antenna arrays 4, 7, 11, 14, 17 and 19 are each equipped with electronics that facilitate high-speed real-time bi-directional communication, with the instrumented ice hockey puck 21 using the 802.11(xx0 protocol operating within the unlicensed 2.4 ghz or 5.8 ghz spectrum, and the remote base station 2 via Ethernet or fiber optic cabling. The communication link between the antenna arrays and the instrumented ice hockey puck is wireless, whereas the communication link between the antenna arrays and the remote base station 2 is hard wired.

The remote base station 2 receives the high quality real-time pictures and sound captured by the instrumented ice hockey puck 21 during game play using multiple antenna arrays placed at strategic points. These points may be located near the ground level or at a substantial height above the field of play depending on the radio frequency architecture and/or noise floor and interference characteristics of the particular stadium/arena.

In this preferred embodiment, a set of bi-directional communications cables 3, 6, 9, 12, 15 and 18 are used to connect each of the six antenna arrays 4, 7, 11, 14, 17 and 19 to the remote base station 2 via bi-directional communications cable junctions 5, 8, 10, 13, and 16.

Each of 3, 6, 9, 12, 15 and 18 consist of a separate category six UTP unshielded twisted pair cable assembly. Due to the large area of a ice hockey rink throughout which 3, 6, 9, 12, 15 and 18 must span, category six cables should be used since they are capable of handling the required bandwidth with minimal losses to the signal path. Other types of cabling can also be used including multi-function fiber optic cable assemblies, provided such cabling can handle the required signal bandwidth.

The cabling system segments and related hardware 3, 5, 6, 8, 9, 10, 12, 13, 15, 16 and 18 are also used to convey electric power supplied by electronic hardware within the remote base station 2 to the electronics within each antenna array 4, 7, 11, 14, 17 and 19.

Bi-directional communications cable junctions 5, 8, 10, 13, and 16 are points in the cable installation that facilitate ease of access to 3, 6, 9, 12, 15 and 18 by personnel in the event servicing or future upgrades of the wired network is required.

Installation of 3, 5, 6, 8, 9, 10, 12, 13, 15, 16 and 18 within the stadium/arena structure can be accomplished in several ways depending on the stadium's/arena's architecture. For example a run of electrical conduit containing 3, 6, 9, 12, 15 and 18 can be used between each antenna array location and the remote base station 2.

It is also possible that an existing wired or optical data network, already present within the stadium, be used in lieu of 3, 5, 6, 8, 9, 10, 12, 13, 15, 16 and 18, provided such existing network is capable of handling the required bandwidth and power.

The electronics within each antenna array 4, 7, 11, 14, 17 and 19, convey to the electronic hardware located at the remote base station 2, received signal strength indication and status data information along with the specific payload data packet which consists primarily of the image and audio data captured previously by the instrumented ice hockey puck 21.

The electronic hardware located at the remote base station 2 executes an algorithm that in real-time continuously monitors and compares the received signal strength indication and status data information from each of the corresponding antenna arrays 4, 7, 11, 14, 17 and 19 and determines dynamically which antenna array to use to receive the best overall specific payload data packet from the instrumented ice hockey puck 21.

Additionally, the electronic hardware located at the remote base station 2 executes an algorithm that in real-time continuously monitors, compares and determines dynamically the radio frequency, gain, polarization and error correction that should be applied by the antenna array's electronics to receive the best overall specific payload data packet from the instrumented ice hockey puck 21.

By proper real-time selection of the radio frequency, gain and polarization the electronics hardware at remote base station 2 can ensure that the images and sounds captured by the instrumented ice hockey puck 21 will be of high quality and will have sufficient stability to allow additional decoding and post processing of the payload data packet by the other electronics hardware and software located at remote base station 2.

By proper real-time selection of the correct antenna arrays, the electronics hardware at remote base station 2 can ensure that the images and sounds captured by the instrumented ice hockey puck 21 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium/arena is used to convey the radio frequency signals traveling to and from the instrumented sports paraphernalia i.e. the instrumented ice hockey puck 21 and goals 22, 23, and the remote base station.

The quality and reliability of the signals received at the remote base station when using this technique relies heavily on the assumption that a decent signal to noise ratio is attainable even while the sports paraphernalia 21 is moved on the stadium's/arena's ice rink during the game. 22 and 23 are positioned at fixed locations during the game Multipoint diversity reception refers to a wireless communication technique whereby a network of multiple physical repeater antenna arrays are located within a sports stadium/arena around the outside boundary of the ice rink 1 and are used to convey the radio frequency signals traveling to and from the instrumented sports paraphernalia 21, 22, 23 and the remote base station 2. The signals intercepted at each repeater location are individually compared by the network transceiver at the remote base station 2 and the strongest signal with the best signal to noise ratio is automatically selected for application to the other electronics at the remote base station 2. The quality and reliability of the signals received at the remote base station 2 when using this technique is far less dependent on the assumption that a decent signal to noise ratio is attainable from what a single repeater antenna array location would achieve even while the sports paraphernalia is in moved throughout such a stadium/arena, i.e. during a game.

Referring to the Preferred Embodiments Specified in FIG. 10, the wireless football stadium satisfies all of the following further objectives:

It is an objective of the present invention to equip existing prior art football stadiums with instrumented sports paraphernalia systems comprised of instrumented sports paraphernalia, an antenna array relay junction, bi-directional communication links, and a remote base station to improve the quality of the stadium's sports TV broadcasts.

It is an objective of the present invention to provide a low cost version for low budget users like, for example sandlot players and high school leagues.

It is an objective of the present invention to equip a football stadium to televise football games using a wireless bi-directional communications link between instrumented footballs in play on the stadium football playing field and a remote base station via an antenna array relay junction.

It is an objective of the present invention to equip a football stadium with an instrumented sports paraphernalia system employing six antenna arrays to overcome poor signal to noise ratios in those football stadiums having radio frequency interference.

It is an objective of the present invention to equip a football stadium with an instrumented sports paraphernalia system employing six antenna arrays linked by hard wiring to the remote base station.

It is an objective of the present invention to equip a football stadium with an instrumented sports paraphernalia system employing a remote base station having hardware that executes a real time algorithm that continuously monitors and compares the received signal strength indication and status data information from each of the corresponding six antenna arrays and determines dynamically which antenna array to use to receive the best overall specific payload data packet from the instrumented football.

It is an objective of the present invention to equip a football stadium with an instrumented sports paraphernalia system employing a remote base station having hardware that executes a real time algorithm that continuously monitors, compares and determines dynamically the radio frequency, gain, polarization and error correction that should be applied by the six antenna array's electronics to receive the best overall specific payload data packet from the instrumented football.

FIG. 11A

The detailed physical elements shown in the system disclosed in FIG. 11A for streaming soccer, ice hockey, tennis and baseball games on the internet using instrumented soccer goals, instrumented ice hockey goals, instrumented tennis nets, instrumented baseball bases, instrumented baseball home plates and instrumented baseball pitcher's rubbers are identified as follows: 1 is the electronics package unit. 2 is the high definition TV cameras. 3 is the microphones. 4 is the video processing hardware. 5 is the audio processing hardware. 6 is the audio and video compression hardware. 7 is the 4G/LTE cellular streaming high-speed terrestrial mobile broadband service hardware. 8 is the cellular and Wifi band antenna hardware. 9 is the Wifi band hardware interface. 10 is the bi-directional internet fiber optics/copper cable feed. 11 are inputs to 12 by a variety of different sensors which measure both physical and chemical states. 12 is digital and analog sensor processing hardware and software.

FIG. 11A is the electronics system block diagram for streaming soccer games, ice hockey games, and baseball games on the internet from instrumented sports paraphernalia like instrumented soccer goals, instrumented ice hockey goals, instrumented baseball bases, instrumented baseball home plates and instrumented baseball pitcher's rubbers.

FIG. 11A shows the block diagram for the system for streaming the video and audio of soccer games, ice hockey games, tennis games and baseball games captured by the cameras and microphones aboard the instrumented sports paraphernalia like instrumented soccer goals, instrumented ice hockey goals, instrumented tennis nets, instrumented tennis posts, instrumented baseball bases, instrumented baseball home plates and instrumented baseball pitcher's rubbers. The primary component of the system for connecting the instrumented sports paraphernalia to the internet is the electronic package unit 1. The electronics package unit 1 enables the instrumented soccer goals, instrumented ice hockey goals, instrumented tennis nets, instrumented tennis posts, instrumented baseball bases, instrumented baseball home plates and instrumented baseball pitcher's rubbers to communicate with and stream on the internet. The electronics package unit 1 collects video and audio from the cameras 2 and microphones 3 aboard the sports paraphernalia, and channels the video and audio to the antenna 8 for wireless transmission to a Mobile Broadband Tower. The wireless topography for the system is shown in FIG. 11B.

Examples of instrumented soccer goals are shown in FIG. 3 and FIG. 4.

Examples of instrumented ice hockey goals are shown in FIG. 5 and FIG. 6.

An example of an instrumented tennis net is shown in FIG. 42A, FIG. 42B, FIG. 42C.

An example of an instrumented tennis net post is shown in FIG. 42D, FIG. 42E.

Figure 24A:
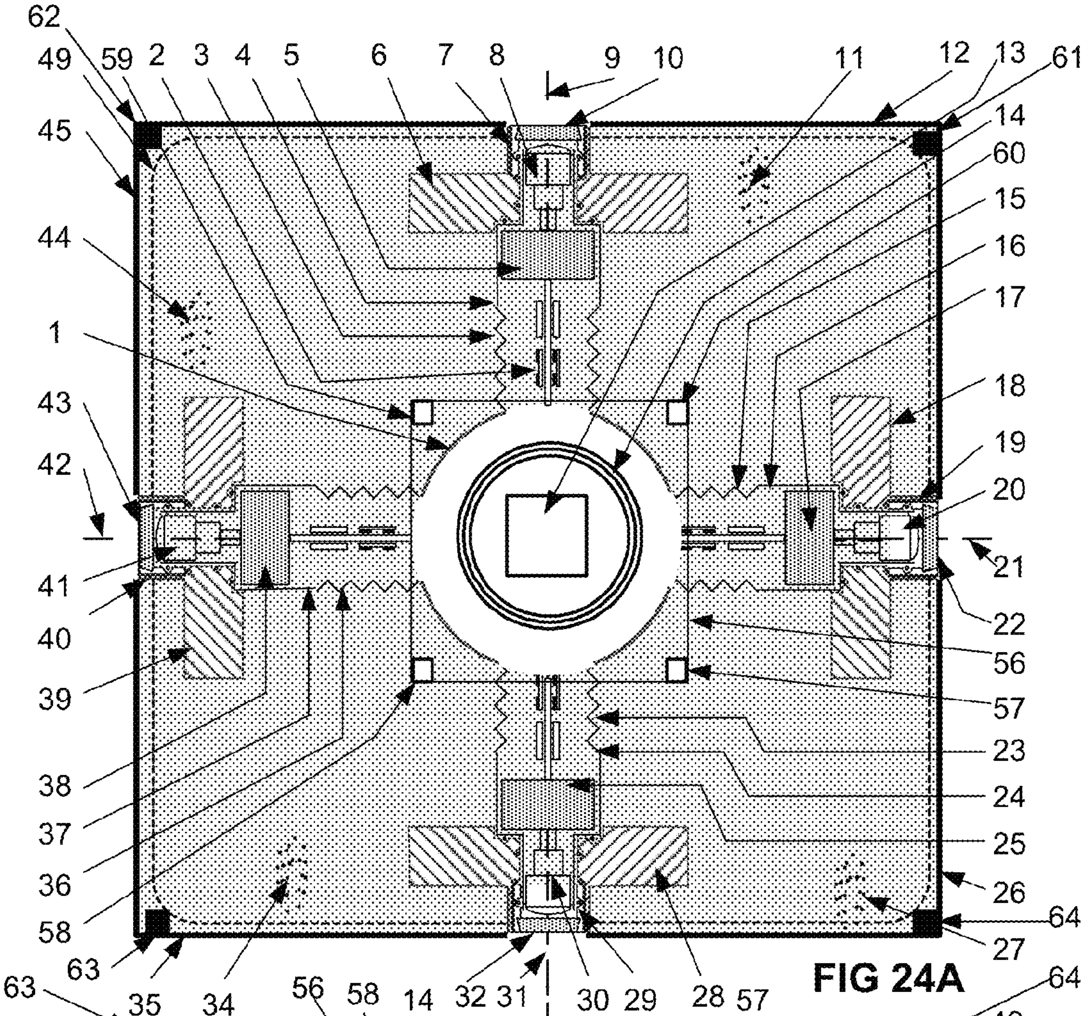
FIG. 24A is a top view of a four-tilted camera instrumented baseball base.
Figure 24B:
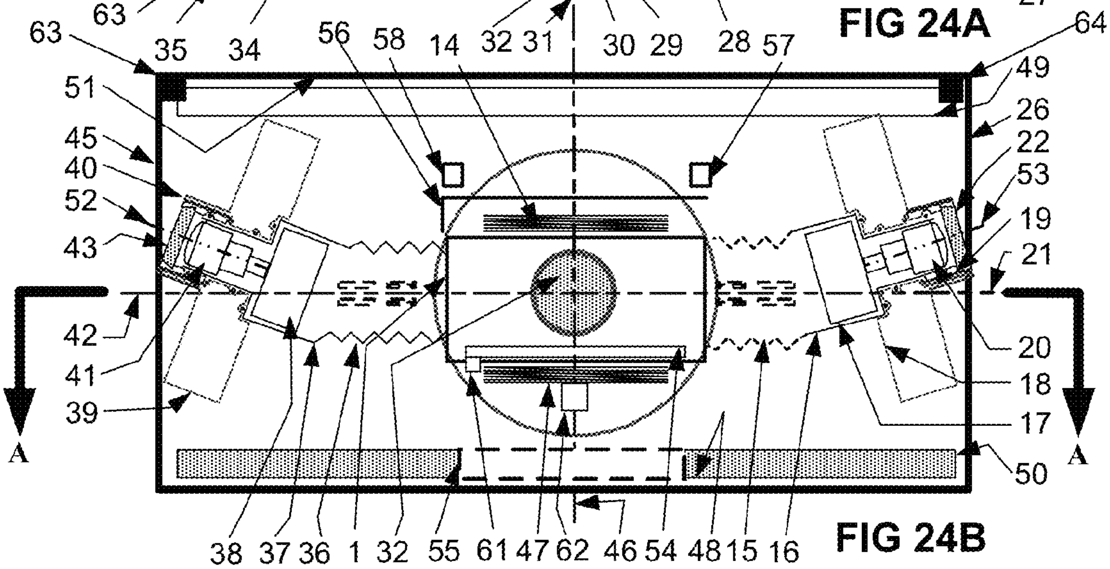
FIG. 24B is a side view of a four-tilted camera instrumented baseball base.

An example of an instrumented baseball base is shown in FIG. 24A and FIG. 24B.

Examples of instrumented baseball home plates are shown in FIG. 25A, FIG. 25B, FIG. 25C, FIG. 25D, and FIG. 26A, FIG. 26B, FIG. 26C, and FIG. 41A, FIG. 41B.

Figures 36A, 36B, 36C:
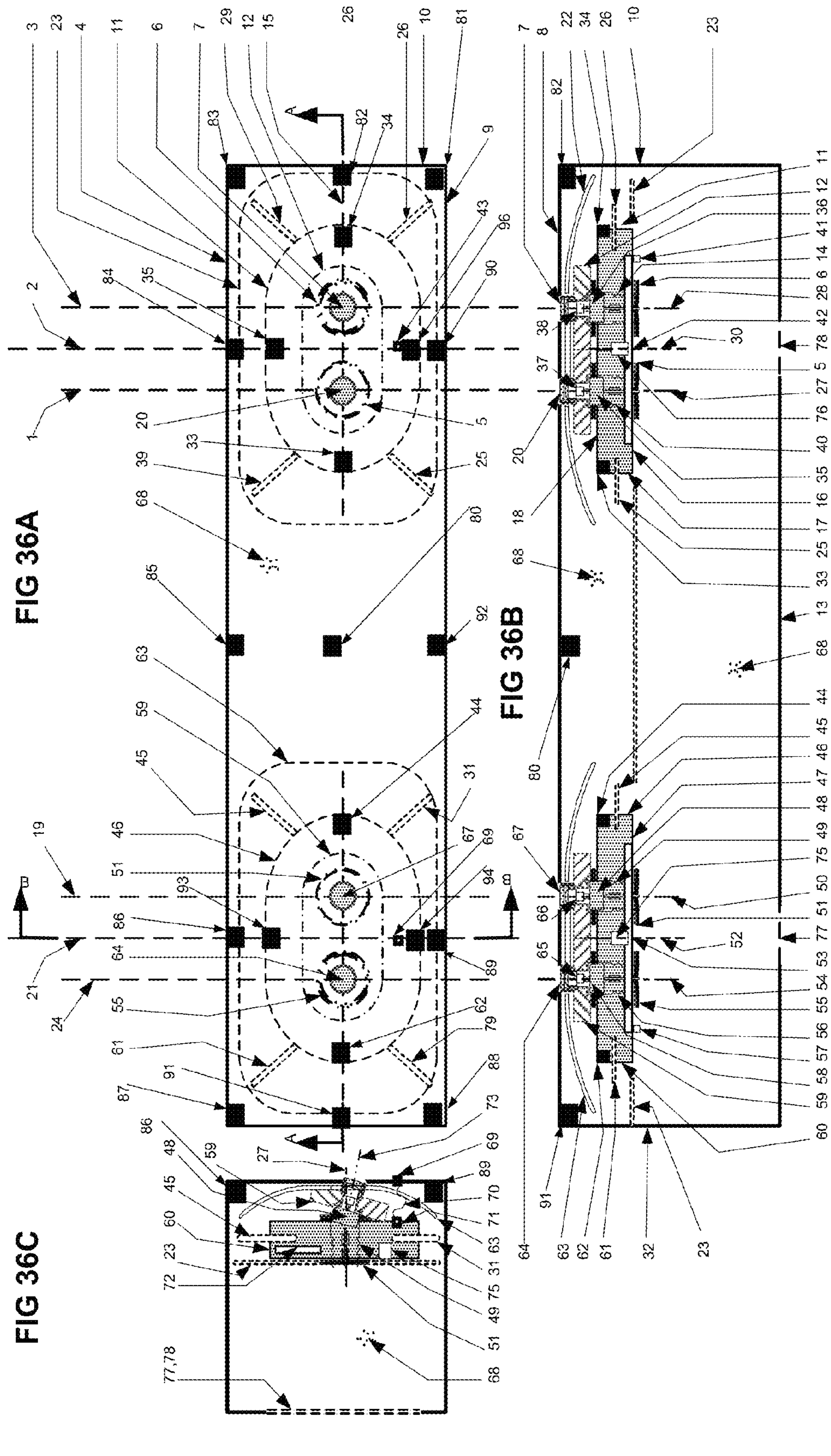
FIG. 36A is a top view of the instrumented baseball pitcher's rubber.
FIG. 36B is a side view of the instrumented baseball pitcher's rubber.
FIG. 36C is an end view of the instrumented baseball pitcher's rubber.

Examples of instrumented baseball pitcher's rubbers are shown in FIG. 36A, FIG. 36B, FIG. 36C.

The soccer goals, ice hockey goals, tennis nets and tennis net posts are instrumented with instrumentation modules. An example of an instrumentation module is shown in FIG. 2A and FIG. 2B and FIG. 2C. Each instrumentation module is equipped typically with four electronics package units 1.

Each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology.

Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

In some venues, the internet is available to the instrumented sports paraphernalia by a fiber optics/copper cable feed buried beneath the ground of the playing field or beneath the ice of the rink. In venues where the internet is available by cable, the cable feed 10 is brought up from the ground/ice and connected to the electronic package unit 1 via 9.

In venues where the internet is available by a 4G/LTE or better equivalent Mobile Broadband Tower, as shown in FIG. 11B, the electronic package unit 1 accesses the internet wirelessly via its 4G/LTE cellular streaming high-speed terrestrial mobile broadband service hardware 7 which is connected to the cellular and Wifi band antenna hardware 8.

Each electronics package unit 1 uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

There are typically one to six instrumentation modules per goal. The soccer goals and ice hockey goals are instrumented using a multiplicity of four TV cameras and seventeen microphones inside each four camera instrumentation module. The TV cameras and microphones are housed inside each instrumentation module. The ice hockey goals also use two of the two camera instrumentation modules as shown in FIG. 5 and FIG. 6.

FIG. 11A also shows the same typical electronics system for streaming video and audio of baseball games. The video and audio are captured by instrumented baseball bases, instrumented baseball home plates and instrumented baseball pitcher's rubbers. The instrumented baseball bases, instrumented baseball home plates and instrumented baseball pitcher's rubbers are instrumented with instrumentation package assemblies.

An example of an instrumentation package assembly used to instrument baseball bases is shown in FIG. 24A and FIG. 24B.

Examples of instrumentation package assemblies used to instrument baseball home plates are shown in FIG. 19A and FIG. 19B and FIG. 19C and FIG. 19D and FIG. 19E and FIG. 19F.

Examples of instrumentation package assemblies used to instrument baseball home plates and pitcher's rubbers are shown in FIG. 20A and FIG. 20B and FIG. 20C.

Examples of instrumentation package assemblies used to instrument baseball home plates are shown in FIG. 21A and FIG. 21B and FIG. 21C.

Each instrumentation package assembly is equipped with a minimum of one electronics package unit 1.

Each instrumentation package assembly is equipped typically with four electronics package units 1.

As before, each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology.

Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

Each electronics package unit 1 uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

The electronic package unit 1 shown in FIG. 11A contains the primary electronics for making streaming video and audio of soccer games, ice hockey games, tennis games and baseball games captured by the instrumented sports paraphernalia used in those games. The soccer goals and ice hockey goals are instrumented using a multiplicity of TV cameras and microphones. For example, the TV cameras 2 and microphones 3 are housed in instrumentation modules which are specified in FIG. 2A, FIG. 2B, FIG. 2C. Audio, video processing and compression modules 4, 5 and 6 respectively are used to buffer, process and compress the captured image and sound information prior to streaming by high-speed terrestrial mobile broadband service unit 7. The instrumentation modules are equipped with electronics package units 1. The electronics package unit contains a high-speed terrestrial mobile broadband service unit 7 and an antenna 8 used to connect the camera(s) and microphones to a publicly accessible internet relay server for the purpose of real-time viewing of the game by audiences using their portable wireless devices—i.e. WIFI enabled Phones, Laptops, Touch Pads, PDA's, etc. The electronics package unit contains a minimum of one high definition video camera 2 and one microphone 3 whose captured video and audio, following suitable H.264/MPEG compression by 4, 5 and 6 respectively, is buffered and subsequently sent to an active broadband connection established using for example Mobile Broadband Hotspot Hardware Technology.

The system conveys high definition video and multi-dimensional audio captured by the microphones mounted within and attached on and to the goals, to an audience which may or may not be spectator present at the game but wish to subscribe and view the game remotely on their personal wireless display devices.

The electronics package unit communicates wirelessly with a 4G/LTE or better equivalent Mobile Broadband Tower operating on the 1700 and/or 1900 MHz Frequency Band within a three to five bar signal strength radius of the desired site local to the Field of Play. The same Mobile Broadband Tower that is used to intercept the captured streams from the electronics package unit is also used simultaneously to supply the wireless internet access needed by spectators present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the field/rink/court of play in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given field/rink of play currently broadcasted. Alternately, an operator seated in front of a display console located either at the field/rink of play or the relay server will have the ability to select which cameras and/or microphones are associated with which streams prior to broadcast. Commercial content material insertion i.e. sports sponsor's advertisements and announcements and other insertions are also available at the discretion of the operator.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

In yet another preferred embodiment, internet users can view the physical and chemical states on the instrumented sports paraphernalia. 11 are inputs to 12 from a variety of different sensors which measure both physical and chemical states at the instrumented sports paraphernalia site. For example, if a parent wants to know the temperature at the soccer goal site, the parent can go on the internet and see a real-time temperature reading measured by a digital thermometer mounted on the soccer goal. For example, if a parent wants to know if it's raining at the soccer goal site, the parent can go on the internet and see a real-time rain gage reading from on the soccer goal, as well as view and hear the real-time state of the field from the cameras and microphones aboard the instrumentation modules. Analog and digital sensors which measure physical and chemical states are mounted on the instrumented sports paraphernalia. These sensors input their data into 12 which is the digital and analog sensor processing and formatting hardware and software. 12 inputs its processed and formatted data into 6 which is same audio and video compression hardware used for the cameras and microphones.

FIG. 11B

The detailed physical elements disclosed in the wireless topography diagram for streaming soccer, ice hockey, and baseball games on the internet using instrumented soccer goals, instrumented ice hockey goals, instrumented baseball bases, instrumented home plates, and instrumented pitcher's rubbers as shown in FIG. 11B are identified as follows: 1 are instrumented soccer goals. 2 are instrumented ice hockey goals. 3 are instrumentation modules. 4 are instrumentation modules. 5 are instrumentation modules. 6 are instrumentation modules. 7 are spectators with personal wireless display devices. 8 are spectators with personal wireless display devices. 9 are spectators with personal wireless display devices. 10 are spectators with personal wireless display devices. 11 is a 4G/LTE or better equivalent Mobile Broadband Tower. 12 is a bi-directional RF wireless access to the internet. 13 is a bi-directional RF wireless access to the internet. 14 is a bi-directional RF wireless access to the internet. 15 is a bi-directional RF wireless access to the internet. 16 is a bi-directional RF wireless access to the internet. 17 is a bi-directional RF wireless access to the internet. 18 are instrumented baseball pitcher's rubbers. 19 is a bi-directional RF wireless access to the internet. 20 are instrumented baseball home plates. 21 is a bi-directional RF wireless access to the internet. 22 are instrumented baseball bases. 23 is a bi-directional RF wireless access to the internet. 24 is the buried bi-directional cable access to the internet beneath the playing field. 25 is the bi-directional cable access from the instrumented baseball bases 22 to 24. 26 is the bi-directional cable access from the instrumented baseball home plates 20 to 24. 27 is the bi-directional cable access from the instrumented baseball rubbers 18 to 24. 28 is the bi-directional cable access from the instrumented soccer goals 1 to 24. 29 is the bi-directional cable access from the instrumented ice hockey goals 2 to 24. 30 is an instrumented tennis net/instrumented volleyball net. 31 is the bi-directional cable access from the instrumented tennis net 30 to 24. 32 is a bi-directional RF wireless access to the internet. 33 is the bi-directional cable access from the instrumented net post 34 to 24. 34 is the instrumented tennis net post/instrumented volleyball net post. 35 is a bi-directional RF wireless access to the internet. 36 is a bi-directional fiber optics/copper cable access to the internet from the remote base station 38. 37 is a bi-directional fiber optics/copper cable access to the internet from the antenna array relay junction 39. 38 is a remote base station with access to the internet 24. 39 is an antenna array relay junction with access to the internet 24. 40 are input signals to the remote base station 38 from any or all of the instrumented sports paraphernalia. 41 are input signals to the antenna array relay junction from any or all of the instrumented sports paraphernalia. 42 is a bi-directional fiber optics/copper cable access to the internet 24 from the instrumented volleyball net 43. 43 is the instrumented volleyball net. 44 is a bi-directional RF wireless access to the internet.

FIG. 11B is the wireless topography block diagram for streaming audio and video onto the internet from instrumented soccer goals, instrumented ice hockey goals, instrumented tennis nets, instrumented tennis net posts, instrumented volleyball nets, instrumented volleyball net posts, instrumented baseball bases, instrumented baseball home plates and instrumented baseball pitcher's rubbers.

The soccer goals, tennis nets, tennis net posts and ice hockey goals are instrumented with instrumentation modules.

The baseball bases, baseball home plates and baseball pitcher's rubbers are instrumented with instrumentation package assemblies.

The instrumentation modules and instrumentation package assemblies both contain an electronics circuit called an electronics package unit. The electronics package unit is shown in FIG. 11A. The electronics package unit enables the instrumented soccer goals, instrumented ice hockey goals, instrumented tennis nets, instrumented tennis net posts, instrumented baseball bases, instrumented baseball home plates and instrumented baseball pitcher's rubbers to communicate with and stream on the internet simultaneously.

The instrumentation modules are shown in FIG. 2A and FIG. 2B and FIG. 2C.

The instrumentation package assemblies are shown in FIG. 12A, FIG. 12B, FIG. 12C, FIG. 13A, FIG. 13B, FIG. 13C, FIG. 19A, FIG. 19B, FIG. 19C and FIG. 20A, FIG. 20B, FIG. 20C and FIG. 21A, FIG. 21B, FIG. 21C and FIG. 22A, FIG. 22B, FIG. 22C, FIG. 22D, FIG. 22E.

FIG. 11B shows the architecture of the streaming system that conveys high definition video and multi-dimensional audio from soccer, ice hockey, tennis and baseball games, captured by the cameras and microphones contained within typical instrumentation modules 3, 4, 5 and 6 that are positioned and attached on and to soccer goals 1, ice hockey goals 2, baseball bases 22, baseball home plates 20, baseball pitcher's rubbers 18, tennis nets 30 and tennis net posts 34, volleyball nets 43 and volleyball posts 46, to an audience which may or may not have spectators 7, 8, 9 and 10 respectively present at the games but wish to subscribe and view the games remotely on their personal wireless display devices.

The electronics package units inside the instrumentation modules communicate wirelessly with the 4G/LTE or better equivalent Mobile Broadband Tower 11 operating on the 1700 and/or 1900 MHz Frequency Band within a three to five bar signal strength radius of the desired site local to the field of play. The electronics package units are disclosed in FIG. 11A.

FIG. 11B also shows that the system conveys high definition video and multi-dimensional audio from baseball games, captured by the cameras and microphones contained inside the baseball instrumented sports paraphernalia within their instrumentation packages assemblies located inside the instrumented baseball bases 22, instrumented baseball home plates 20 and instrumented baseball pitcher's rubbers 18 respectively, to an audience which may or may not have spectators 7, 8, 9 and 10 respectively present at the games but wish to subscribe and view the game remotely on their personal wireless display devices.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

The electronics package units inside the instrumentation package assemblies within the bases, plates and pitcher's rubbers communicate wirelessly with the 4G/LTE or better equivalent Mobile Broadband Tower 11 operating on the 1700 and/or 1900 MHz Frequency Band within a three to five bar signal strength radius of the desired site local to the Field of Play. The electronics package units are disclosed in FIG. 11A.

The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices.

In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www.

Each person present at the field/rink of play in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given field/rink of play currently broadcasted.

Alternately, an operator seated in front of a display console located either at the field/rink of play or the relay server will have the ability to select which cameras and/or microphones are associated with which streams prior to broadcast. Commercial content material insertion i.e. sports sponsor's advertisements and announcements and other insertions are also available at the discretion of the operator.

Additionally in the preferred embodiment shown in FIG. 11B, the electronics package units inside both the instrumentation modules and the instrumentation package assemblies within the soccer goals, ice hockey goals, tennis nets, tennis net posts, baseball bases, baseball home plates and baseball pitcher's rubbers, can communicate directly by cable in those venues where the cable is buried beneath the ground/ice of the playing field/rink/courts. The advantage of having a direct cable connection to the internet is higher bandwidth. 24 is the bi-directional cable access to the internet buried beneath the playing field. 25 is the bi-directional cable access from the instrumented baseball bases 22 to 24. 26 is the bi-directional cable access from the instrumented baseball home plates 20 to 24. 27 is the bi-directional cable access from the instrumented baseball rubbers 18 to 24. 28 is the bi-directional cable access from the instrumented soccer goals 1 to 24. 31 is the bi-directional cable access from the instrumented tennis net 30 to 24. 29 is the bi-directional cable access from the instrumented ice hockey goals 2 to 24. 29 is the bi-directional cable access from the instrumented volleyball net posts 46 to 24.

Alternately in the preferred embodiment shown in FIG. 11B, the remote base station 38 can each serve as an additional portal 36 through which inputs from any of the instrumented sports paraphernalia 40 routed to the remote base station 38 can be processed and formatted by the remote base station 38 and put on the internet 24. The antenna array relay junction 39 also can serve as an additional portal 37 through which raw inputs 41 from any of the instrumented sports paraphernalia which are routed to the antenna array relay junction 39 can be put on the internet 24.

Figure 12A:
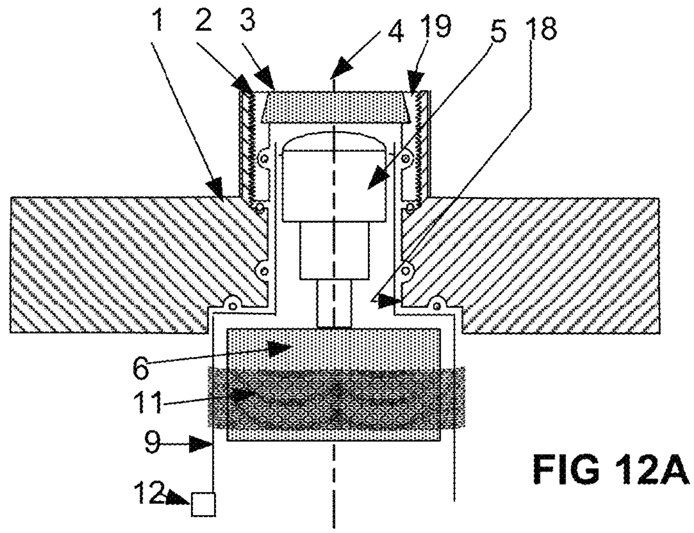
FIG. 12A shows a side view section of the Type XIII buffer plate and instrumentation package assembly.
Figure 12B:
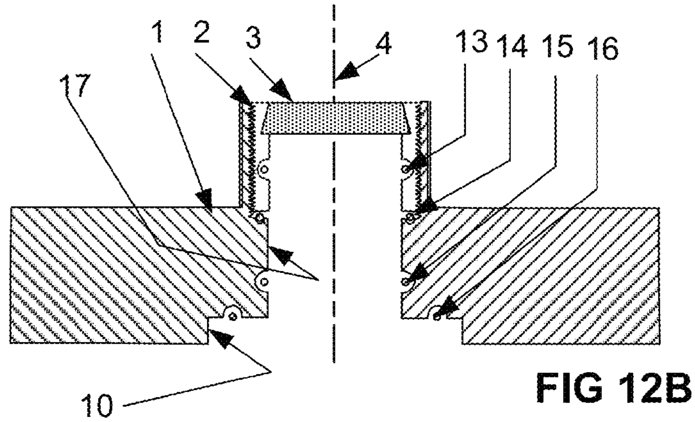
FIG. 12B shows a side view section of just the buffer plate alone.
Figure 12C:
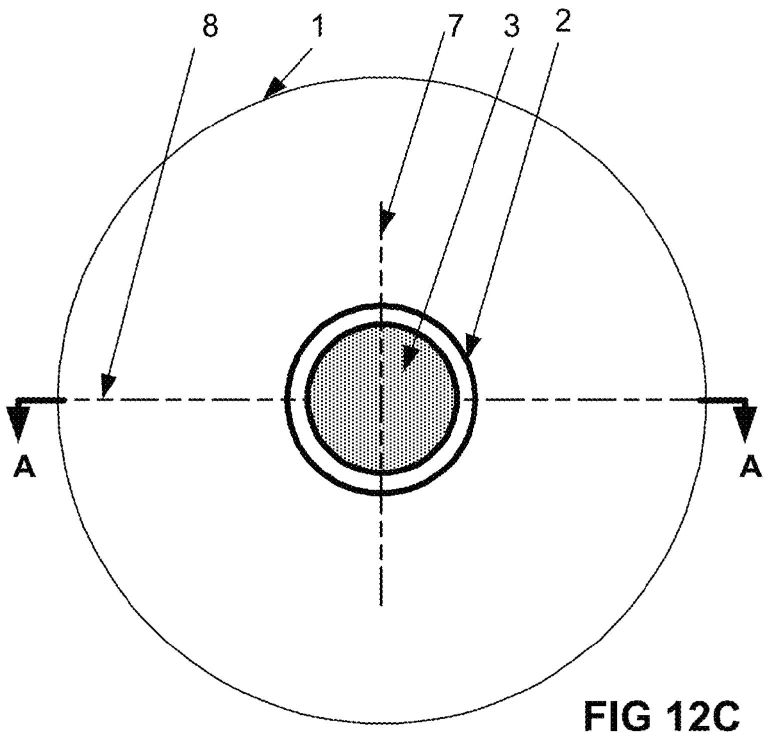
FIG. 12C shows an end view of just the buffer plate alone.

FIG. 12A and FIG. 12B and FIG. 12C

The detailed physical elements disclosed in the Type XIII buffer plate assembly drawings shown in FIG. 12A and FIG. 12B and FIG. 12C are identified as follows: 1 is the body of the Type XIII circular buffer plate. 2 is the small cylindrical outside diameter end of the circular buffer plate. 3 is the plane-parallel-flat optical window mounted on and sealed to the small cylindrical diameter end of the rectangular buffer plate. 4 is the optical and mechanical y-axis of the camera and buffer plate defined as the z-axis. 5 is the camera lens. 6 is the camera. 7 is the z-axis of the camera and buffer plate. 8 is the x-axis of the camera and buffer plate. 9 is the cylindrical skin of the instrumentation package assembly element's enclosure. 10 is the buffer plate 1 large bore's inside diameter. 11 is an induction coil. 12 is an electro-mechanical actuating mechanism. 13 is a bearing. 14 is an o-ring seal. 15 is a bearing. 16 is an o-ring seal. 17 is the small inside diameter of the buffer plate 1. 18 is the small diameter section of the instrumentation package assembly element's enclosure. 19 is the threaded sleeve that holds the optical window.

FIG. 12A shows a side view section of the Type XIII buffer plate and instrumentation package assembly.

FIG. 12B shows a side view section of just the buffer plate alone.

FIG. 12C shows an end view of just the buffer plate alone.

Referring to drawings FIG. 12A and FIG. 12B and FIG. 12C, in a preferred embodiment, a Type XIII buffer plate assembly is disclosed. The buffer plate assembly is comprised of buffer plate 1, flat optical window 3, and threaded sleeve 19. The buffer plate is constructed of plastic foams, polycarbonates, ABS or fiber reinforced plastics to keep it strong but light weight.

A distinguishing feature of the present preferred embodiment is that the Type XIII buffer plate assembly body 1 is circular and mounts a single instrumentation package assembly element. The buffer plate assembly has one plane-parallel-flat optical window mounted flush to its end in a threaded cell-like sleeve.

Referring to the Preferred Embodiments Specified in Drawings FIG. 12A and FIG. 12B and FIG. 12C, the Type XIII buffer plate assembly satisfies all of the following further objectives:

It is an objective of the present invention for the buffer plate assembly to be composed of the circular body of the Type XIII buffer plate for one camera, small cylindrical outside diameter end of the circular buffer plate, flush plane-parallel-flat optical window mounted on and sealed to the small cylindrical diameter end of the rectangular buffer plate, buffer plate large bore's inside diameter, o-ring seals, small inside diameter of the buffer plate, threaded sleeve that holds the optical window. It is an objective of the present invention for the circular buffer plate assembly to hold one flush plane-parallel-flat optical window with one threaded cell-like sleeve. It is an objective of the current invention to provide a means for the cameras inside the instrumentation package assembly to look out from the sports paraphernalia. It is an objective of the current invention to provide a means to prevent moisture and dirt from entering and interfering with the functions of the instrumentation package assembly. It is an objective of the current invention to provide a means to prevent damage to the instrumentation package assembly from debris. It is an objective of the current invention to provide a means to isolate the instrumentation package assembly from the shock and vibration. It is an objective of the current invention to provide a means to solidly hold the buffer plate assembly inside the sports paraphernalia. It is an objective of the current invention to provide a straightforward means to permit damaged optical windows to be replaced easily. It is an objective of the present invention to provide optical windows suitable for less than extremely wide fields of view. It is an objective of the present invention to provide optical windows which do not produce optical aberrations for extremely wide fields of view. It is an objective of the present invention to provide a straightforward means to enable the interchange of optical windows where the windows have different curvatures ranging from plane flat surfaces to shell-like-concentric surfaces.

Figure 13A:
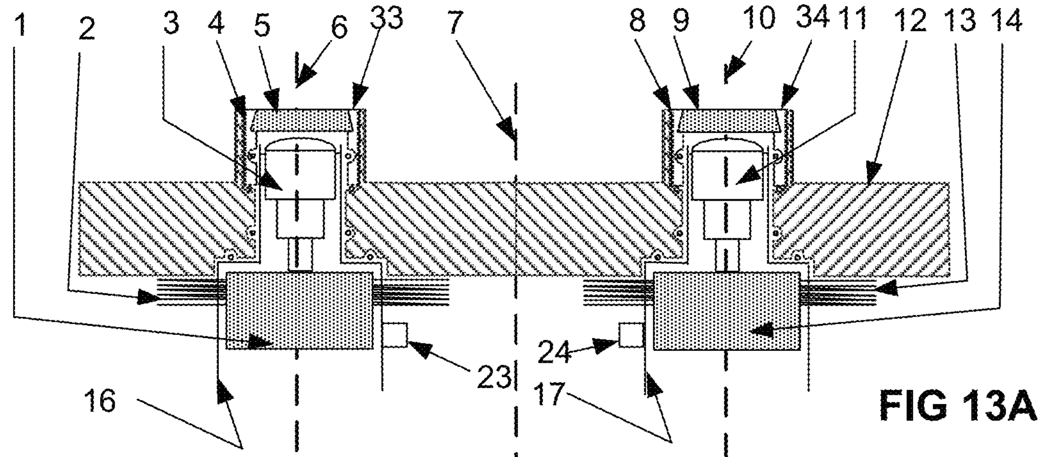
FIG. 13A shows a side view section of the Type XI buffer plate and instrumentation package assembly.
Figure 13B:
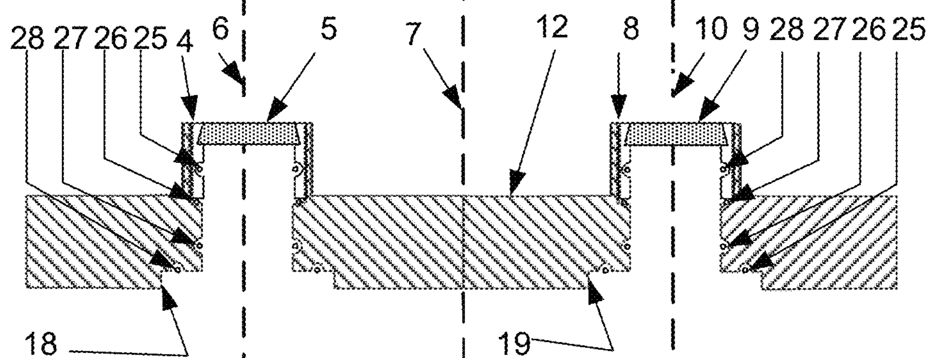
FIG. 13B shows a side view section of just the buffer plate alone.
Figure 13C:
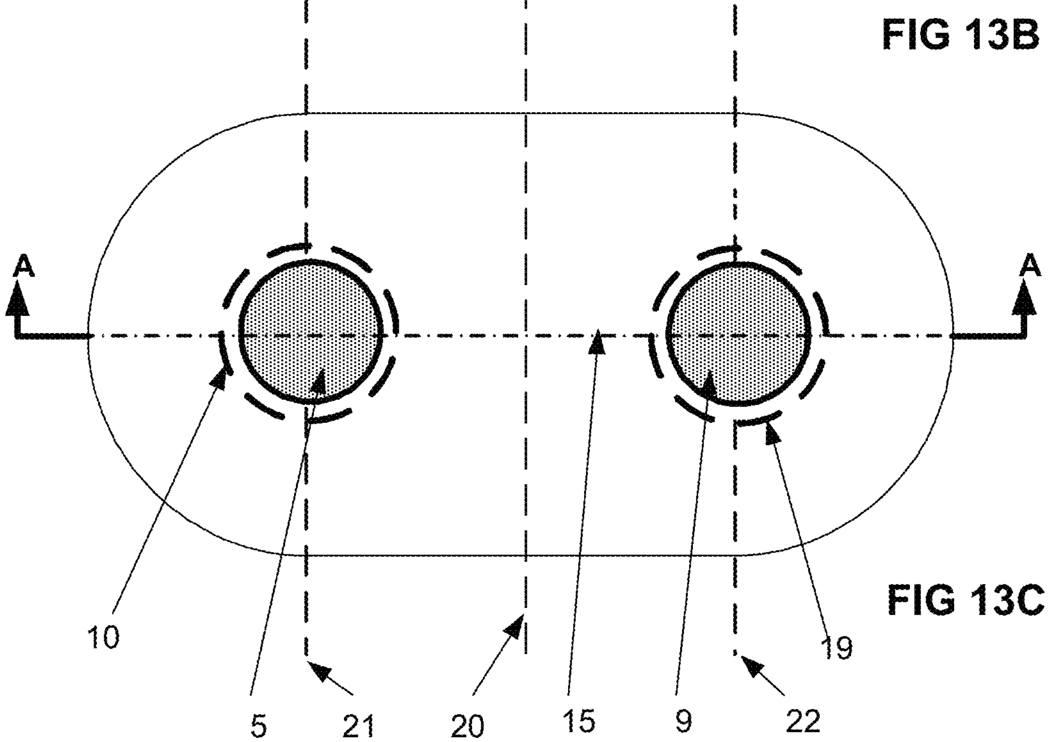
FIG. 13C shows an end view of just the buffer plate alone.

FIG. 13A and FIG. 13B and FIG. 13C

The detailed physical elements disclosed in the Type XI buffer plate assembly drawings shown in FIG. 13A and FIG. 13B and FIG. 13C are identified as follows: 1 is a camera. 2 is an induction coil for charging the battery pack. 3 is the camera lens. 4 is the small cylindrical outside diameter end of the buffer plate. 5 is the plane-parallel-flat optical window mounted on and sealed to the threaded cell-like sleeve. 6 is the optical and mechanical y-axis of the camera 1. 7 is the mechanical y-axis of symmetry of the Type XI buffer plate. 8 is the small cylindrical outside diameter end of the buffer plate. 9 is plane-parallel-flat optical window mounted on and sealed to the small cylindrical diameter end of the buffer plate. 10 is the optical and mechanical y-axis of the camera 12. 11 is the camera lens. 12 is the body of the Type XI buffer plate. 13 is an induction coil for charging the battery pack. 14 is a camera. 15 is the x-axis of symmetry of the buffer plate and the y-axis of camera 1 and camera 14. 16 is the cylindrical skin section of the instrumentation package assembly element's enclosure that houses camera 1. 17 is the cylindrical skin section of the instrumentation package assembly element's enclosure that houses camera 14. 18 is the inside diameter of the large bore in the buffer plate for instrumentation package assembly element 16. 19 is the inside diameter of the large bore in the buffer plate for instrumentation package assembly element 17. 20 is the z-axis of symmetry of the buffer plate 12. 21 is the z-axis of camera 1. 22 is the z-axis of camera 14. 23 is an electro-mechanical actuating device. 24 is an electro-mechanical actuating device. 25 is a bearing. 26 is an o-ring seal. 27 is a bearing. 28 is an o-ring seal. 29 is a bearing. 30 is an o-ring seal. 31 is a bearing. 32 is an o-ring seal. 33 is a threaded sleeve that holds the optical window. 34 is a threaded cell-like sleeve that holds the optical window.

FIG. 13A shows a side view section of the Type XI buffer plate and instrumentation package assembly.

FIG. 13B shows a side view section of just the buffer plate alone.

FIG. 13C shows an end view of just the buffer plate alone.

Referring to the drawings FIG. 13A and FIG. 13B and FIG. 13C, in a preferred embodiment, a Type XI buffer plate assembly is disclosed. The buffer plate assembly is comprised of buffer plate 12, optical windows 5 and 9, and threaded sleeves 33 and 34. The bores in the body of the buffer plate assembly are precisely machined parallel to one another to align the instrumentation package assembly elements for 3-D. In some cases, the bores are machined with a small angle between them to accommodate 3-D imagery of closer objects.

A distinguishing feature of the present preferred embodiment is that the Type XI buffer plate assembly body 12 mounts two instrumentation package assembly elements which form a 3-D stereo camera pair. The buffer plate assembly has two flat optical windows mounted flush to its end 4 in threaded cell-like sleeves.

Unlike the embodiments where the buffer plates are mounted inside an instrumented football whose handling is sensitive to weight, the weight of the buffer plate for the Type XI embodiment is less restricted because the instrumented baseball home plate where the buffer plate is used therein, is immobile and fixed to the ground.

Like the Type IX and Type X buffer plates, the Type XI buffer plate enables 3-dimensional pictures to be captured from instrumented sports paraphernalia, like for example instrumented baseball home plates. Like the Type X buffer plate, the Type XI buffer plate enables two cameras to look out simultaneously at a common object on the baseball playing field, from the top of the instrumented baseball home plate.

The buffer plate has bearings which permit the instrumentation package assembly elements to smoothly and precisely rotate about their mechanical axis respectively. The o-rings seal the instrumentation package assembly element enclosures from moisture and dirt from the baseball playing field environment.

Unlike its predecessors, the Type IX and Type X buffer plates that enable their 3-D stereo camera pairs to look out horizontally from the sides of the instrumented baseball bases, the Type XI buffer plate enables its 3-D stereo camera pair to look skyward from instrumented baseball home plates. From its vantage point at the instrumented baseball home plate, the 3-D stereo camera pairs (when using a 180 degree field angle fish eye lens) can simultaneously see the batter, the catcher, the pitcher, and the baseball being pitched.

The preferred embodiment shown in FIG. 13A and FIG. 13B and FIG. 13C shows two cameras 1 and 14 housed in their respective instrumentation package assemblies 16 and 17. The instrumentation package assemblies are mounted to the buffer plate 12. The buffer plate is constructed of plastic foams, polycarbonates, ABS or fiber reinforced plastics to keep it strong but light weight.

The Type XI buffer plate embodiment shown in FIG. 13A and FIG. 13B and FIG. 13C physically supports and separates the two instrumentation package assemblies which contain the two cameras that each produce a conventional image format which taken as a pair is suitable for producing 3-dimensional pictures of sports events to a viewing audience.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm.

The minimum IPD for children as young as five is around 40 mm.

The present invention captures pictures from instrumented sports paraphernalia that produce a 3-dimensional image format for viewing by an audience. The buffer plate shown in FIG. 13A and FIG. 13B and FIG. 13C provides the camera lenses 3 and 11 with a suitable interpupillary distance to enable the cameras 1 and 14 to capture pictures from the sports paraphernalia which can be used to generate a 3-dimensional format for the TV viewing audience. The two cameras together make up a stereo camera pair. The buffer plate holds the optical axes of the two cameras parallel to one-another.

An advantage of the Type XI buffer plate embodiment over the previous Type I, Type II, Type III, Type IV, Type V, Type VI, Type VII, and Type VIII embodiments is that (like the Type X buffer plate embodiment) the Type XI buffer plate embodiment supports two instrumentation package assemblies with two cameras, separated by the proper interpupillary distance, and thereby enables two sets of pictures of the same object to be simultaneously captured from instrumented sports paraphernalia that the buffer plate is mounted therein, like for example an instrumented baseball home plate, produce a 3-dimensional composite SD/HD picture format for viewing by a TV audience. The Type I, Type II, Type III, Type IV, Type V, Type VI, Type VII, and Type VIII embodiments only support one instrumentation package assembly with one camera and consequently cannot produce 3-dimensional picture formats.

Referring to the Preferred Embodiments Specified in Drawings FIG. 13A and FIG. 13B and FIG. 13C, the Type XI buffer plate assembly satisfies all of the following further objectives:

It is an objective of the present invention for the buffer plate assembly to be composed of the oval Type XI buffer plate assembly body for two cameras, small cylindrical outside diameter end of the buffer plate, two flush plane-parallel-flat optical windows mounted on and sealed to the small cylindrical diameter end of the buffer plate, small cylindrical outside diameter end of the buffer plate, inside diameter of the large bore in the buffer plate, o-ring seals, threaded cell-like sleeves that holds the optical windows. It is an objective of the present invention to provide a buffer plate assembly body that mounts two instrumentation package assembly elements which form a 3-D stereo camera pair. It is an objective of the present invention to provide a buffer plate assembly has two flat optical windows mounted flush to its ends. It is an objective of the present invention for the buffer plate assembly to hold and precisely separate and align two optical windows with two threaded cell-like sleeves. It is an objective of the present invention for the buffer plate assembly to enable 3-dimensional pictures to be captured from instrumented sports paraphernalia, like for example instrumented baseball home plates. It is an objective of the present invention for the buffer plate assembly to enable two cameras to look out simultaneously at a common object on the baseball playing field, from the top of the instrumented baseball home plate. It is an objective of the present invention for the buffer plate assembly to permit the instrumentation package assembly elements to smoothly and precisely rotate about their mechanical axis respectively. It is an objective of the present invention for the buffer plate assembly to seal the instrumentation package assembly element enclosures from moisture and dirt from the baseball playing field environment. It is an objective of the present invention for the buffer plate assembly to look skyward onto the playing field from instrumented baseball home plates. It is an objective of the present invention for the buffer plate assembly to physically support and separate the two instrumentation package assemblies by a precise interpulillary distance for producing 3-dimensional pictures of sports events to a viewing audience. It is an objective of the present invention for the buffer plate assembly to provide the camera lenses with a suitable interpupillary distance to enable the cameras to capture pictures from the sports paraphernalia which can be used to generate a 3-dimensional format for the TV viewing audience. It is an objective of the present invention for the buffer plate assembly to precisely align the instrumentation package assemblies and their cameras relative to one another.

FIG. 14A

Figure 14A:
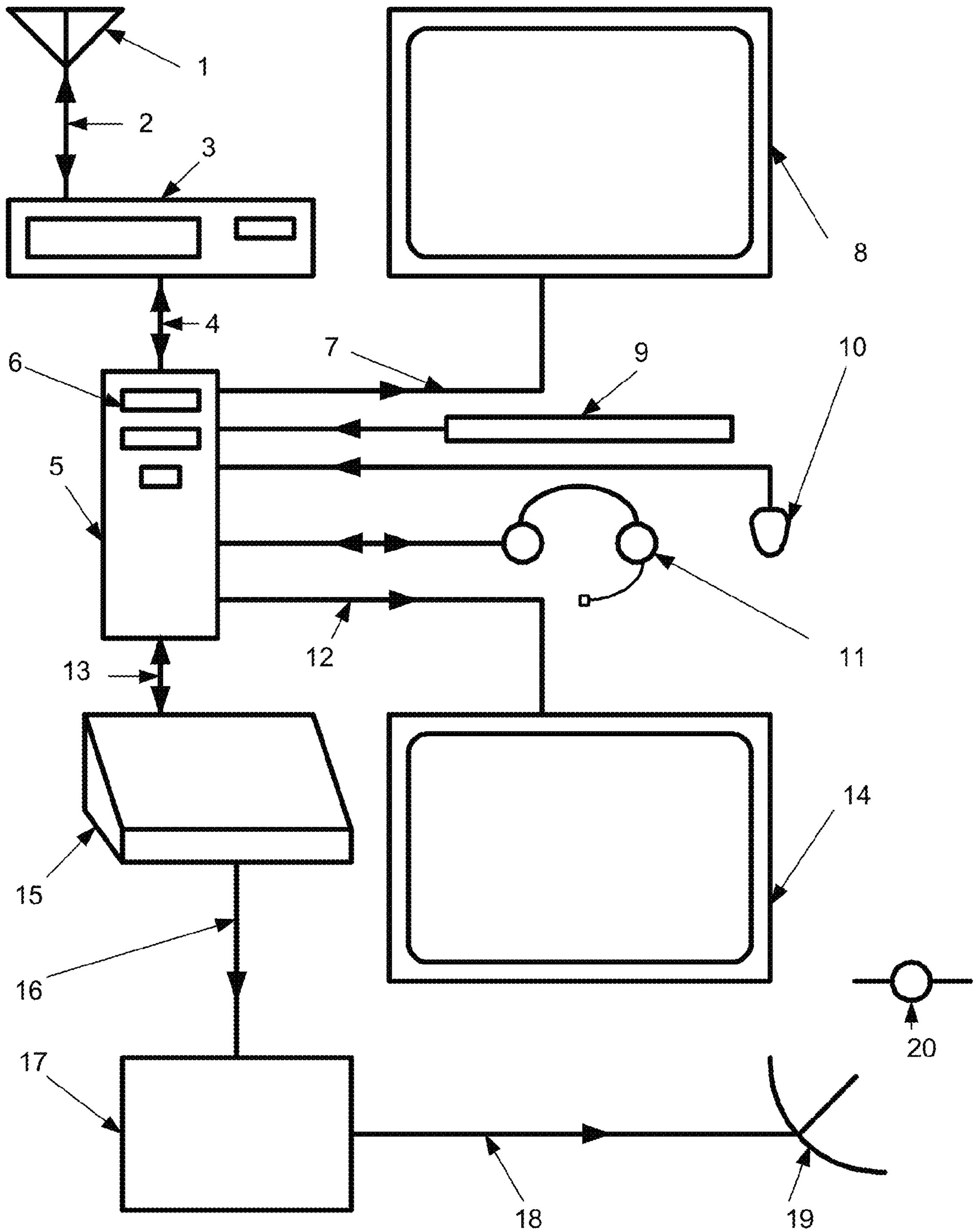
FIG. 14A is a block diagram showing the signals and data flows inside the remote base station.

The detailed physical elements disclosed in the signals and data flows in the remote base station drawing shown in FIG. 14A are identified as follows: 1 is the 24 dbi 2.4 or 5.8 GHz antenna or antenna array that communicates with the antenna array relay junction in the instrumented sports stadium. 2 is the coaxial cable assembly. 3 is the remote base station network transceiver. 4 is the Ethernet CAT5E or CAT6 Cable. 5 is the desktop PC. 6 is the special system software. 7 is the high definition monitor cable. 8 is the high definition monitor. 9 is the keyboard. 10 is the mouse. 11 are the headphones. 12 is the high definition monitor cable. 13 is the HD-SDI along with SPDIF fiber and talkback multi-cable assembly. 14 is the high definition monitor. 15 is the broadcast console. 16 is the typical satellite uplink cabling hardware. 17 is the typical satellite uplink transmission hardware. 18 is the typical satellite uplink feed line. 19 is the typical satellite uplink satellite antenna. 20 is the geosynchronous satellite orbiting the earth. 21 is the bi-directional fiber optics cable and/or copper cable link with the antenna array relay junction in the instrumented sports stadium.

FIG. 14A is a block diagram showing the signals and data flows inside the remote base station.

Referring to the drawing FIG. 35A, in a preferred embodiment a remote base station with means to wirelessly receive, decode, and process video and sound transmitted to it via an antenna array relay junction mounted in the instrumented stadium off the playing field, is disclosed. The RF antenna array relay junction is linked by RF signals with the dynamic sports paraphernalia, like for example instrumented footballs and instrumented ice hockey pucks, and with the static sports paraphernalia i.e. instrumented baseball bases, instrumented baseball home plates, and instrumented baseball pitcher's rubbers that are on the playing field. The remote base station has means to prepare the video and sounds that it receives via the antenna array relay junction, from the instrumented sports paraphernalia, for presentation to a live TV audience, i.e. make the pictures upright and stable regardless of the motions of the dynamic sports paraphernalia. In addition, the remote base station has means to command and control the electronic and optical functions inside the instrumented sports paraphernalia. The remote base station sends RF signals to the antenna array relay junction which in turn relays the RF signals to the instrumented sports paraphernalia on the playing field. Except for differences in processing software, the remote base stations specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B are substantially identical to one another. The antenna array relay junction, which is also a part of the instrumented sports stadium, is specified in these same figures and discussed elsewhere in the present invention.

In FIG. 14A, 1 operates within either of the unlicensed 802.11(xx) 2.4 or 5.8 GHZ bands and has an isotropic gain of 15 db. During game-play, 1 is used to convey radio frequency signals between the instrumented football cameras and the remote base station network transceiver 3 via the antenna array relay junction. These signals contain various control data, system status, life span of battery information as well as the photographic images from the two cameras and sound picked up by microphones located inside the football. To ensure proper reception, 1 is typically placed close to the field of play at a suitable altitude above the field, for example 10 feet, so as to achieve a strong signal to noise ratio.

FIG. 14A shows the typical components of the remote base station. Network Transceiver 3 is used to buffer, convey and process the image, sound and control data signals traveling between the instrumented sports paraphernalia, transceiver 3 and the computer at the remote base station. This transceiver is equipped with an input/output port 21 to support the selected mode of connectivity utilized by the particular stadium i.e. fiber optic, copper cabling or wireless radio communication.

Network transceiver 3 consists of an 802.11(xx) protocol transceiver that operates in the radio frequency bands previously mentioned. The LAN Ethernet port of 3 is connected to desktop computer 5 via category-6 cable 4.

State of the art desktop computer 5 consists of a multi core CPU, several gigabytes of memory, video graphics card, sound card, high definition studio interface card and special system software 6. 5 is also equipped with traditional human interface hardware such as a keyboard 9, mouse 10 and headphones 11.

Receiving from 3, 5 in turn processes the photographic images and sounds captured by the cameras and microphones located inside the instrumented football.

Figure 15A:
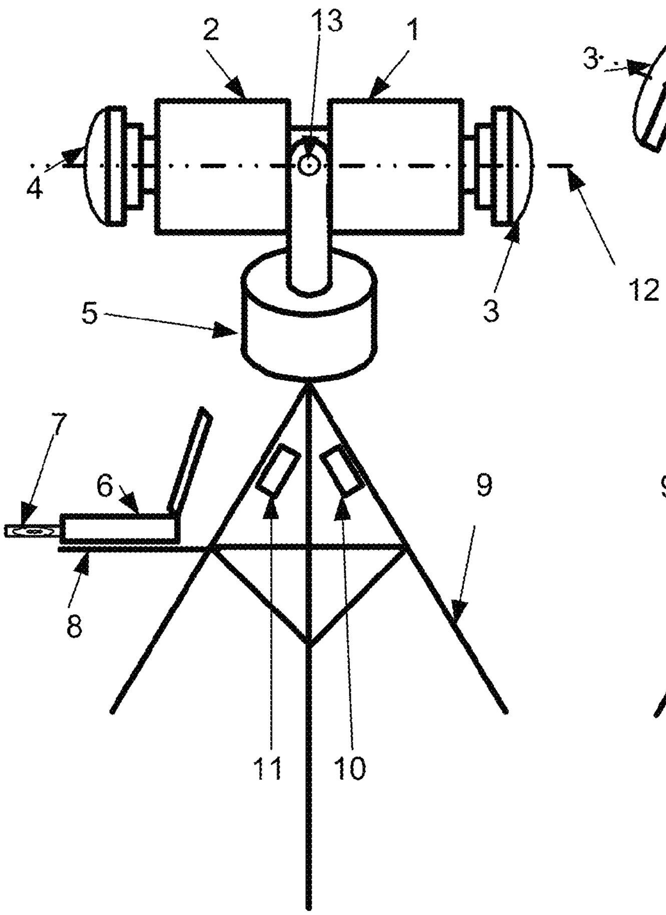
FIG. 15A is a right side mechanical diagram of the tripod mounted set-up camera system.
Figure 15B:
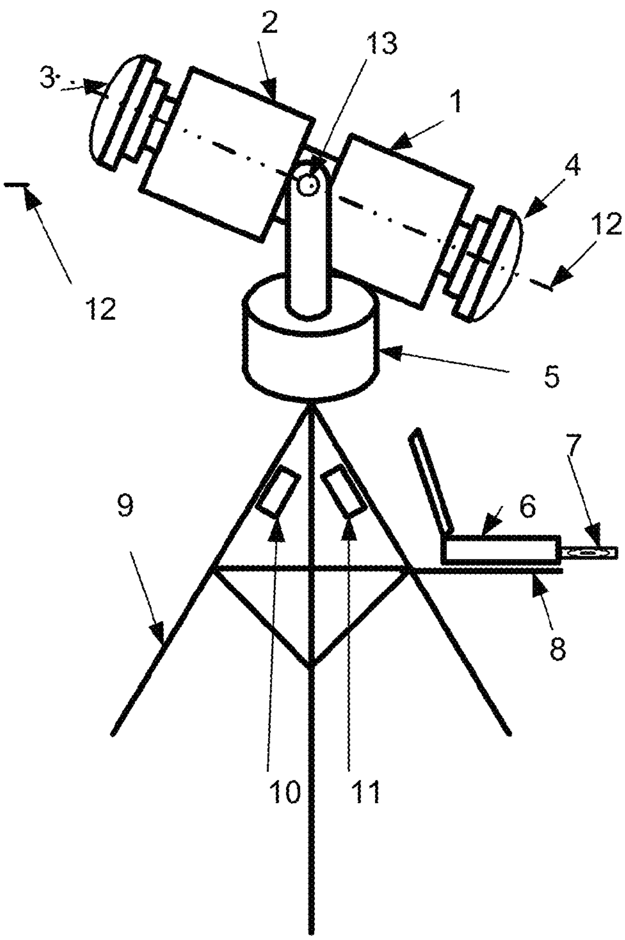
FIG. 15B is a left side mechanical diagram of the tripod mounted set-up camera system.

Prior to game-time the database of photographic images of the present playing field previously captured and stored by the set-up camera system disclosed in FIG. 15A and FIG. 15B are loaded onto the hard disk drive of 5. This database is subsequently used by 6 to establish reference points within the photographic image stream received by 5 from 3 as described earlier.

Whilst running on 5, 6 permits rapid real-time processing, enhancement and stabilization making upright the photographic images received from the instrumented football cameras during game-play despite the roll, pitch and yaw of the instrumented football. Therefore the photographic images viewed by a typical TV audience will be viewable in a coherent and intelligible form at the discretion of the remote base station operator.

Typically, as the system operates, 6 will frequently transmit required administrative commands via 5 and in turn 3 to the instrumentation package assembly inside the instrumented football. These commands may initiate a lens function change by either camera, i.e. focusing, as well as changes to the aspect, format and resolution, etc.

High definition multimedia interface cables 7 and 12 are used to interconnect the video graphics and sound card output of 5 to high definition TV monitors 8 and 14.

If over the course of a game the battery inside the football goes weak or there is a loss of a camera signal due to damage, the software onboard the instrumentation package assembly will transmit a warning message to 5 that will in turn alert base station operator both audibly and visually using 8, 11 and 14.

During game-play 8 and 14 in conjunction with 5 and 6 may be used as desired by the base station operator to: view before and after software image stabilization, edit and/or add special effects such as instant replay, to the photographic images received from the football cameras.

Additionally, the remote base station operator can use 11 to hear the sound picked up by the microphones located inside the instrumented football as received by 5 and prepare it for broadcast using 5 as desired.

An HD-SDI along with SPDIF fiber and talkback multicable assembly 13 is typically used to connect the output of 5 to the TV studio's broadcast console 15. It is also used to convey cueing and commentary between the remote base station operator via 5 and other TV studio personnel using 15.

Prior to passing through to the input of satellite uplink hardware 16, 17, 18, 19 and final broadcast by satellite 20, TV studio personnel may wish to perform further editing and/or add other functions such as time coding to the photographic images and/or sounds reaching 15 from 5. Such commands can be easily implemented by 6 using well-known broadcast equipment communication protocols.

Using 6, the remote base station described essentially decodes the motion video material acquired as imagery from the TV cameras aboard the football, and eliminates the effects that have been unintentionally encoded that render the pictures unintelligible to TV audiences because of the roll, pitch, and yaw motions of the instrumented football that carries the cameras. Processing in the remote base station eliminates the unintended and uncontrolled spinning of the pictures for example, that can cause dizzying effects and disorientation among the viewers. In a similar fashion, processing using 6 in the remote base station, eliminates the unintended and uncontrolled spinning of the pictures for instrumented ice hockey pucks disclosed in FIG. 1A and FIG. 1B and FIG. 1C, and FIG. 9A and FIG. 9B, and FIG. 37A and FIG. 37B and FIG. 37C as well to produce an upright stabilized picture for the TV viewing audience.

At the beginning of play on the field, before the instrumented football carrying the two TV cameras is in motion, the base station operator initially selects which TV camera is defined to be the forward TV camera, and which TV camera is defined to be the rearward TV camera. The remote base station operator makes this selection depending on which initial direction inside the football stadium the cameras face. Once the instrumented football is in motion, using 6, the TV camera that looks in the direction of the instrumented football's travel on the field is defined as the forward or front TV camera. Once the instrumented football is in motion, the TV camera that looks in the direction opposite to the direction of the instrumented football's travel on the field is defined as the rearward or rear TV camera.

In one preferred embodiment, the TV audience will always see an upright picture. In this embodiment, the image seen by the TV audience will be upright independent of the roll, pitch or yaw orientation of the instrumented football relative to the ground.

Also mounted inside the instrumented football are the TV camera's supporting electronics, which provide for the wireless radio transmission of the imagery of the game from the two TV cameras, from the vantage point of the instrumented football, to a remote ground station external to the instrumented football. In addition, the instrumented football's TV camera's supporting electronics are used to communicate command and control signals from the remote base station to the instrumented football, and thereby control the two TV camera's and their video and sound data transmitted to the remote base station from the instrumented football. External electronics and software, located at the remote base station, are used to transmit and communicate command and control signals to the two TV cameras inside the instrumented football, and process the transmitted data to and from the instrumented football. All of these components taken together are referred to herein as "the system".

Even though each camera is working independently of the other, the remote base station's software 6 upright stabilization algorithm knows that the roll angle R of each camera is identical but opposite in sign, and that the roll angle rate of change for both cameras is identical. The software 6 is coded/written so that the picture seen by the TV audience is upright and free of the effects of the instrumented football's roll on the picture.

In one preferred embodiment, the client instrumented football in play is activated by loading the client instrumented football's hosting software on the computer at the remote base station, by clicking an icon that opens the software program.

Now from a dropdown menu, a football is selected from the list of choices of available footballs that can be put into play; hit enter on the computer keyboard, and a signal is generated and sent over the wireless network to that particular football that has been selected, telling it to wake-up and turn on. Now the pictures of the field, from the two TV cameras on board the selected instrumented football will be seen on a monitor on the broadcaster's remote base station equipment console; and the sounds from the playing field can be heard on the broadcaster's remote base station equipment console, coming from the microphone on board the selected instrumented football.

The software in the remote base station computer can command and control the instrumented football's implementation of a variety of features such as still motion, full motion, camera #1, camera #2, both camera #1 and camera #2, automatic focus, automatic pupil setting, zoom-in, zoom-out, and fish-eye zoom selection. The software in the base station computer can implement features like special processing of the imagery transmitted from the instrumented football in play, to the remote base station. The user may select spin de-rotation of the imagery. The user may select various other image processing effects that make the images comfortably viewable by the TV audience.

In one preferred embodiment, in general, the variety of features set forth in the software to command and control the client football in play, is user selectable, and is activated by loading the client football's hosting software on the computer at the base station, and by clicking an icon that opens the software program on the remote base station computer.

Now, from a dropdown menu on the computer monitor's screen, the user selects features from the list of choices; hits enter on the computer keyboard, and a signal is generated and sent over the wireless network to that particular instrumented football that has been selected, telling it to implement those features on that selected instrumented football. Now the pictures of the field, from the two TV cameras executing those features, will be seen on a TV monitor on the broadcaster's equipment console; and the sounds from the playing field can also be heard on the broadcaster's equipment console, coming from the instrumented football's microphone executing those features.

The antenna array relay junction are hooked up to the wireless access point and must be strategically placed and centrally located close to the field of play in order to provide for the back and forth transmission of satisfactory signals from the remote base station to the instrumented football in play. The typical antenna can be about a foot in length, with at least a 9 db gain to cover the action on the full football field. The antennas can be placed on a twenty foot mast above the playing field. For optimized operation, the antenna placement height off the ground can be calculated for the worst case for each football stadium, to enable the antenna to cover the instrumented football during its maximum expected trajectory anywhere in the air above the ground.

In another preferred embodiment, the access point not only contains the wireless transceiver, but also contains the signal decoding hardware that can be controlled remotely, and can feed high definition video in whatever desirable format, into the base station's broadcast console, and be treated by the broadcast console like any other camera feed.

At the transmission frequencies used, there is so much signal bounce inside the football stadium, that the directivity of the remote base station's ground based antenna, is not a major problem.

In one preferred embodiment, a vertical antenna and a horizontal antenna, and a 45 degree antenna is used to insure a quality signal under less than ideal conditions.

In one preferred embodiment, the wireless access point is a box that fits into a standard 19 inch rack mount environment to interface with the remote base station's broadcast console equipment.

Figure 16:
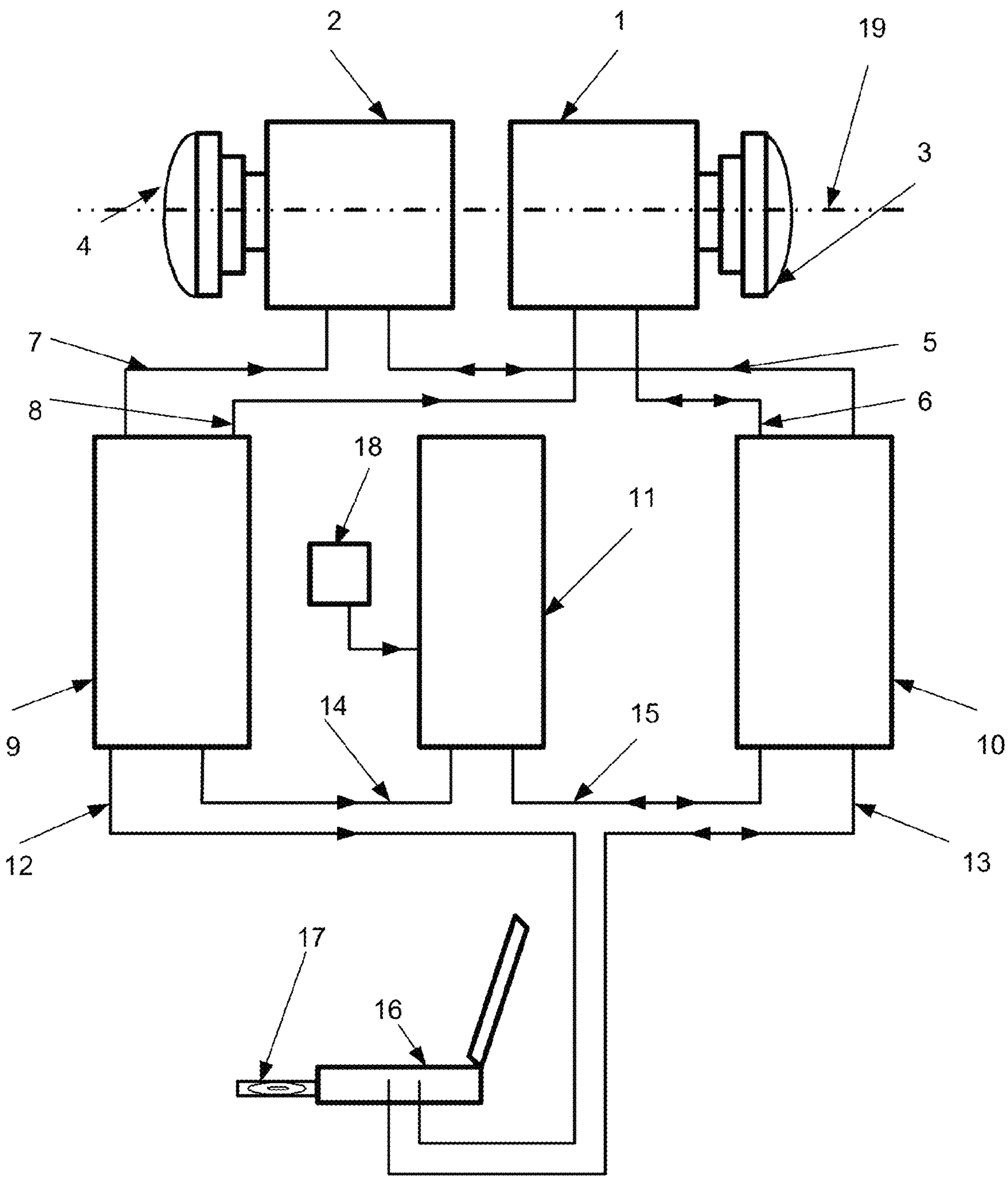
FIG. 16 is a block diagram showing the signal and data flows circuits in the tripod mounted set-up camera system shown in FIG. 15A and FIG. 15B.

In a preferred embodiment, the remote base station computer will store all the pre-game data from the stadium that it has acquired from the flash memory cards created by the laptop computer disclosed in the tripod mounted set-up camera system shown in FIG. 15A and FIG. 15B, and FIG. 16. Using this data, it scales the visual aspects of the playing field, and establishes upright vertical references throughout the game using only the additional data from the instrumented football's cameras in play. The system establishes its own references by extracting them from the existing flash memory card data and correlating with the data from the instrumented football's cameras in play. This is done without the need for extensive site preparation, such as added backdrops, special lighting, and complex radio antenna configurations.

The remote base station computer contains image recognition software which has the ability to operate quickly and successively overlay and match image frames at speeds much higher than the frame rate from the high definition cameras. This enables the computer to do image processing during short time intervals compared to the camera frame rates, and thereby remove the effects of roll, pitch and yaw jitter from the pictures seen by the TV audience.

When the operator initiates a scan command, the tripod mounted set-up camera system shown in FIG. 15A and FIG. 15B, and FIG. 16 lets the system learn what the stadium looks like in the upright position of the cameras in all pitch and yaw angles for a roll angle of zero degrees.

From this data base, all of the required vertical upright references required data bases may be determined. It only has to do it only one time for that stadium. After that, it can supply all the other data the system requires to automatically stabilize a picture in pitch, yaw and roll of the instrumented football. The system overlays sequential images from each picture frame onto one another, thereby requiring very little site preparation to use the system.

In another preferred embodiment, the user at the remote base station console may point on his computer screen to objects that are off the center of the field of view of one or both cameras, and command the camera lenses to set the iris to accommodate the lighting on those objects, and focus on those objects. The user at the base station console may also use the remote base station's computer software to instantly zoom-in or zoom-out from those off-axis objects.

In order to provide for flexibility and special effects, the user at the remote base station console may select a feature which allows varying degrees of picture rotation of the imagery received from one or both TV cameras mounted inside the instrumented football. This feature is used depending on the effect that the user at the remote base station wishes to convey to the TV audience, given the ways the players carry and handle the instrumented football. It is exciting to the TV audience to see pictures from the changing perspective of the instrumented football's different spatial attitudes, as it is passed from one player to the next, like when it is being hiked; or carried by a player who is running and being pursued and tackled by an opposing player.

When and after the instrumented football is hiked to the quarterback, the TV audience may see how being sacked looks to the quarterback from the vantage point of the football he is carrying. In most cases the TV audience will want to see an upright stabilized image of the player who is about to sack and crush the quarterback. In some cases the TV audience will want to see and hear the impact when the quarterback is sacked. In such cases, some jitter and rotation of the picture is useful at impact to produce the desired realistic effects of shock expected in a collision of this kind.

The fish-eye lens setting in each TV camera, essentially permits a solid viewing angle of 180 degrees for each TV camera. The combined effect of two back-to-back TV cameras is a near 360 degree solid viewing angle.

In one preferred embodiment, the combined effect of simultaneously using two fish-eye camera lenses, is that it facilitates the taking of pictures on the field with nearly a 360 degree solid angle coverage of uninterrupted view, thereby allowing the combined 360 degree camera angle to have an uninterrupted view of most immediate events on the field where the view is not blocked, independent of the instrumented football's angular and spatial orientation on the field. It also allows outdoor stadium's skyline horizon to be viewed independent of the angular and spatial orientation of the instrumented football on the playing field.

Of course, if a player or players are physically on top of the football, the TV audience will see a black picture because the field of view to both TV camera lenses is blocked simultaneously. The lack of pictures in this special case is ok and acceptable, since the TV audience expects this to happen when the football's view is physically covered.

When the instrumented football has been kicked to score a field goal, it may be tumbling around its pitch axis. An image of the rotating stadium's skyline horizon will occur at both the far right and far left hand sides of the picture. The system will lock onto this skyline horizon and use it as a field reference to stabilize the picture.

When the football is tumbling in flight when an attempt at a field goal has been kicked, and the football nears the goal posts, the TV audience will see the goal posts start near the center of the picture, and as they come closer they will move in from the front of the field of view, and pass by—one on the right, and—one on the left hand side of the TV screen. The TV audience will hear the rush of air past the football as it soars between the goal posts and strikes the netting, and hear the roar of the crowd as the goal is scored.

When the instrumented football has been kicked by a player to attempt a punt, it may be tumbling around its pitch axis. When the instrumented football is tumbling in flight and nears the opposing team's players, the TV audience will see the designated player catch the instrumented football, or see the player let the instrumented football hit, bounce and settle to the ground.

When the instrumented football is sitting motionlessly on the ground as the referees are measuring its location to determine a down, the TV audience will see the flag and chain as they are brought close to the instrumented football.

When the instrumented football is passed and fumbled, the TV audience will see up-close the players desperate scramble to recover the instrumented football. These pictures all come from the football's vantage point. The TV audience will hear the groans of the players as they are being heaped upon as they strain to protect the instrumented football. The TV audience will see the field of view grow black as the instrumented football and its handler are covered from view by the other players.

During play, the instrumented football can roll about it long axis, tumble around its pitch axis, and tumble around its yaw axis. A common vertical reference needs to be established for the imagery from each of the two TV cameras to be stabilized to render final pictures that are stable and upright without rotation to the TV audience.

In one preferred embodiment, each of the two TV cameras has a zoom lens equipped with fish-eye capability as its shortest focal length. Each of the fish-eyes produces an image with nearly a 180 degree solid angular field of view.

The focal length of the fish-eye is selected sufficient for its image to fill the pixels of the TV cameras imaging sensor array, thereby yielding maximum resolution per pixel for objects in the field of view. Both TV camera's sensor array axis are mechanically and optically aligned with one-another. Both TV cameras are mounted and aligned inside the football, so that when the football lies on the ground and its laces are on top and aligned skyward, both TV cameras simultaneously produce an upright image of the playing field. The fish-eye view of each TV camera yields the image of stadium's skyline horizon in real-time, with the sky on top, and the ground on the bottom.

Outdoor stadiums have a visible skyline horizon. In most situations, at least one of the TV camera zoom lenses is kept in the fish-eye mode in order to enable it to see the skyline horizon and provide the system with a real-time horizon with which to decode picture rotation and provide a final stable upright picture to the TV viewing audience. The real-time stadium skyline horizon which is present in the images received by the base station from the on-board TV cameras is used by the base station image pattern recognition software in the image processor, to establish when the picture is upright, and holds and stabilizes the picture in its upright position. Each frame, in sequence, is rotated electronically until it is upright using the stadium skyline horizon as reference. The frames are then broadcast or cabled in sequence to the TV and/or Internet and/or cell-phone audience. The remote base station console essentially decodes Motion Video Material that has been unintentionally and previously encoded and rendered unintelligible to TV audiences because of the pitch, roll and yaw motions of the instrumented football that carries the TV cameras.

The cameraman, in the remote base station, software selects either the wireless mode of communication, and/or the fiber optics/copper cable mode of communication between each of the instrumented sports paraphernalia (like for example, instrumented footballs, instrumented baseball bases, instrumented baseball home plates, instrumented baseball pitcher's rubbers, and instrumented ice hockey pucks)

and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia. Refer to FIG. 7, and FIG. 8, and FIG. 10, and FIG. 30A and FIG. 30B, and FIG. 31A and FIG. 31B, and FIG. 32A and FIG. 32B, and FIG. 33A, and FIG. 33B, and FIG. 33C, and FIG. 33D, and FIG. 33E, FIG. 35A and FIG. 35B and FIG. 35C for further disclosures regarding the remote base station and the antenna array relay junction.

The cameraman selects items from a software menu of control commands that go to the network transceiver 3 at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

Figure 38:
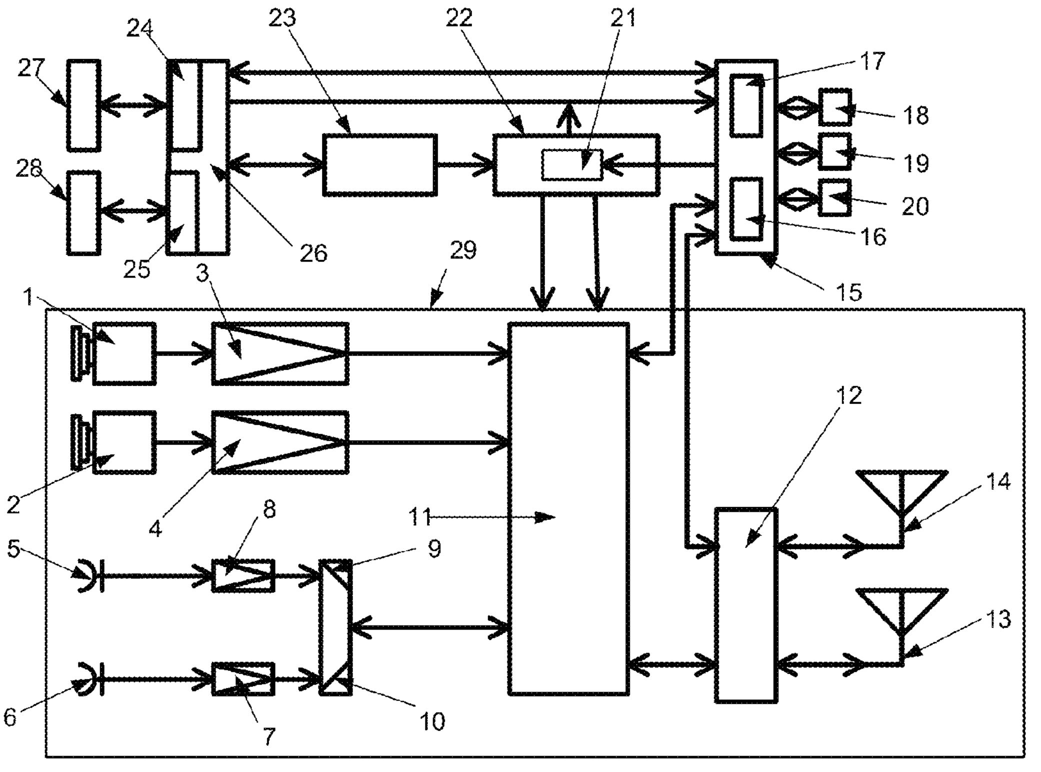
FIG. 38 is a block diagram showing the circuitry, electronic signals and data flows in the instrumentation package assembly disclosed in FIG. 40A and FIG. 40B and FIG. 40C.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 38 and FIG. 19E and FIG. 22D, which is represented by dotted lines, consists of the electrical control wiring to and from the electronic components of the instrumented sports paraphernalia that are being controlled.

The antenna array relay junction simultaneously receives the televised RF signals transmitted by each and all of the static instrumented sports paraphernalia on the ground. The televised RF signals from each of the instrumented sports paraphernalia have different carrier frequencies to differentiate them from one another and improve the S/N ratio. The antenna array relay junction 13 simultaneously relays these televised signals to the remote base station 15 over the bi-directional communications link. Depending on the total number of HD TV cameras contained in the instrumented sports paraphernalia that are simultaneously on the playing field, and the noise levels in the air ways in the stadium, the cameraman in the remote base station can conserve bandwidth to insure the quality of the HD that is broadcast to the TV viewing audience by the remote base station. The cameraman can conserve bandwidth by transmitting a control signal to each of the instrumented sports paraphernalia instructing them to operate all their cameras in a low resolution mode. The cameraman then selects which of the instrumented sports paraphernalia's camera's video is going to be broadcast to the TV viewing audience, and sends a control signal to those instrumented sports paraphernalia cameras to televise their signals in the HD resolution mode. The instrumented sports paraphernalia then transmits its camera's HD video televised signal to the remote base station 15 via the antenna array relay junction. As an example, the low resolution mode can be realized using TDM (time division multiplexing) or FDM (frequency division multiplexing) or HDT (high definition thumbnails).

Referring to the Preferred Embodiments Specified in FIG. 14A, the remote base station satisfies all of the following further objectives:

It is an objective of the current invention to provide the remote base station with a 24 dbi 2.4 or 5.8 GHz antenna or antenna array that communicates with the antenna array relay junction in the instrumented sports stadium, a coaxial cable assembly, a remote base station network transceiver, an Ethernet CAT5E or CAT6 Cable, a desktop PC, special system software, two high definition monitor cables, two high definition monitors, keyboard, mouse, headphones, HD-SDI along with SPDIF fiber and talkback multi-cable assembly, broadcast console, typical satellite uplink cabling hardware, typical satellite uplink transmission hardware, typical satellite uplink feed line, typical satellite uplink satellite antenna link to a geosynchronous satellite orbiting the earth, bi-directional fiber optics cable and/or copper cable link with the antenna array relay junction in the instrumented sports stadium. It is an objective of the current invention to provide the remote base station which has means to prepare the video and sounds that it receives via the antenna array relay junction, from the instrumented sports paraphernalia, for presentation to a live TV audience, and make the pictures upright and stable regardless of the motions of the dynamic sports paraphernalia. It is an objective of the current invention to provide the remote base station with software means to process, stabilize and make upright the video it receives from the dynamic instrumented sports paraphernalia, by using the gyroscopic encoder data it also receives from the instrumented sports paraphernalia to remove the pitch, yaw and roll motion effects of the instrumented sports paraphernalia on the video. It is an objective of the current invention to provide the remote base station with image recognition software means to process, stabilize and make upright the video it receives from the dynamic instrumented sports paraphernalia, by using the data it receives from the tripod mounted camera system to remove the pitch, yaw and roll motion effects of the instrumented sports paraphernalia on the video. It is an objective of the current invention to provide the remote base station with software means to combine the processing of the data received from the tripod mounted camera system with the data received from the gyroscopic encoders to jointly process, stabilize and make upright the video it receives from the dynamic instrumented sports paraphernalia. It is an objective of the current invention to provide the remote base station which has means to command and control the electronic and optical functions inside the instrumented sports paraphernalia by sending RF signals to the antenna array relay junction which in turn relays the RF signals to the instrumented sports paraphernalia on the playing field. It is an objective of the current invention to provide the remote base station which has means to wirelessly receive, decode, and process video and sound transmitted to it via an antenna array relay junction mounted in the instrumented stadium off the playing field. It is an objective of the current invention to provide the remote base station which an RF antenna array relay junction linked by RF signals with the dynamic sports paraphernalia, like for example instrumented footballs and instrumented ice hockey pucks, and with the static sports paraphernalia i.e. instrumented baseball bases, instrumented baseball home plates, and instrumented baseball pitcher's rubbers that are on the playing field. It is an objective of the current invention to provide the remote base station with means to wirelessly receive, decode and process pictures and sounds transmitted to it by the instrumented football, and prepare those pictures and sounds for presentation to a live TV audience. It is the an objective of the present invention to provide an instrumentation package assembly with onboard electronics contained within it to transmit TV pictures and sounds via radio antennas to a remote base station via an antenna array relay junction located in the sports stadium. It is an objective of the present invention to command and control the TV cameras and lenses from the remote base station via an antenna array relay junction located in the sports stadium. It is an objective of the present invention to command and control the power from the battery pack to the electronics from the remote base station via an antenna array relay junction located in the sports stadium. It is an objective of the present invention to stabilize the TV pictures using gyroscopic control. It is an objective of the present invention to control the charging of the battery pack from the remote base station via an antenna array relay junction located in the sports stadium. It is an objective of the present invention to monitor the battery pack charge status from the remote base station via an antenna array relay junction located in the sports stadium. It is a further objective of the current invention to provide the remote base station with means to prepare pictures and sounds for presentation to a live TV audience. It is a further objective of the current invention that, at the discretion of the remote base station operator, the TV audience will see stabilized upright pictures of the game despite the roll, pitch and yaw orientation of the instrumented football relative to the ground. It is a further objective to wirelessly command and control the functions within the instrumentation package assembly from the remote base station via an antenna array relay junction located in the sports stadium. It is an objective of the current invention to make the remote base station operator aware when the battery is charging properly, or when it is charging improperly. If the battery charges improperly, the instrumented football must be removed from the charger and repaired.

FIG. 14B

Figure 14B:
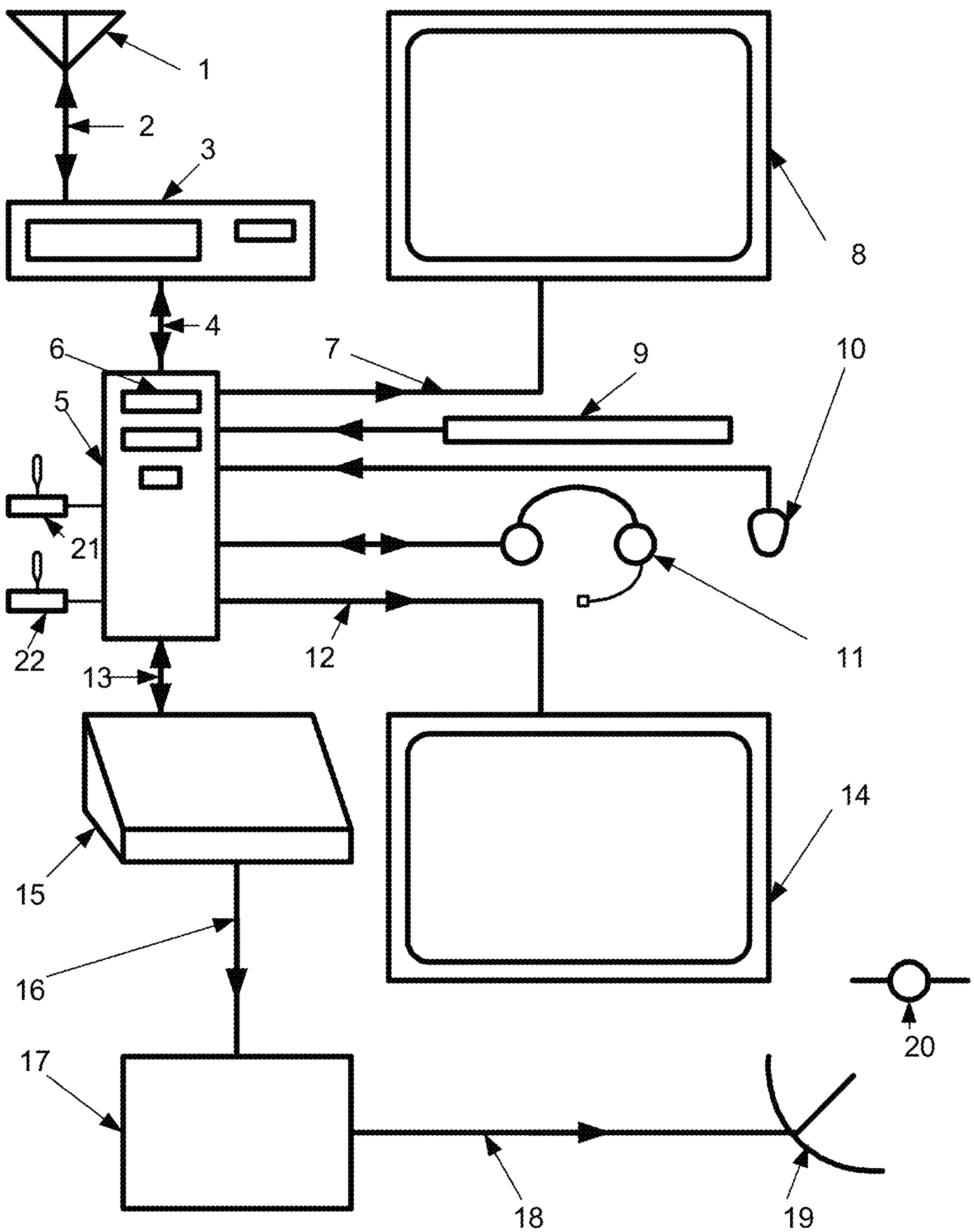
FIG. 14B is a block diagram showing the signals and data flows in the remote base station.

The detailed physical elements disclosed in the signals and data flows for the remote base station drawing shown in FIG. 14B are identified as follows: 1 is the 24 dbi 2.4 or 5.8 GHz antenna or antenna array. 2 is the coaxial cable assembly. 3 is the remote base station network transceiver. 4 is the Ethernet CAT5E or CAT6 Cable. 5 is the desktop PC. 6 is the special system software. 7 is the high definition monitor cable. 8 is the high definition monitor. 9 is the keyboard. 10 is the mouse. 11 are the headphones. 12 is the high definition monitor cable. 13 is the HD-SDI along with SPDIF fiber and talkback multi-cable assembly. 14 is the high definition monitor. 15 is the broadcast console. 16 is the typical satellite uplink cabling hardware. 17 is the typical satellite uplink transmission hardware. 18 is the typical satellite uplink feed line. 19 is the typical satellite uplink satellite antenna. 20 is the geosynchronous satellite orbiting the earth. 1 is a 180 degree directional circular polarized antenna. 21 is a dynamic tactical input device like a joystick. 22 is a dynamic tactical input device like a joystick. 23 is the bi-directional fiber optics cable and/or copper cable link with the antenna array relay junction in the instrumented sports stadium.

FIG. 14B is a block diagram showing the signals and data flows in the remote base station.

FIG. 14B is a block diagram showing the signals and data flows inside the remote base station referred to in FIG. 35B and referred to elsewhere in the specification for the present invention.

Referring to the drawing FIG. 35B, in a preferred embodiment, a remote base station with means to wirelessly receive, decode, and process video and sound transmitted to it via an antenna array relay junction mounted in the instrumented stadium off the playing field, is disclosed. The RF antenna array relay junction is linked by fiber optics cable/copper cable with the static sports paraphernalia i.e. instrumented baseball bases, instrumented baseball home plates, and instrumented baseball pitcher's rubbers that are on the playing field. The remote base station has means to prepare the video and sounds that it receives via the antenna array relay junction, from the instrumented sports paraphernalia on the playing field, for presentation to a live TV audience. In addition, the remote base station has means to command and control the electronic and optical functions inside the instrumented sports paraphernalia on the playing field. The remote base station sends RF signals to the antenna array relay junction which in turn relays the signals to the instrumented sports paraphernalia on the playing field by fiber optics cable/copper cable buried beneath the playing field. Except for differences in processing software, the remote base stations specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B are substantially identical to one another. The antenna array relay junction, which is also a part of the instrumented sports stadium, is specified in these same figures and discussed elsewhere in the present invention.

The block diagram in FIG. 14B showing the signals and data flows in the remote base station is identical to the block diagram in FIG. 14A except for the addition of the joy sticks 21 and 22 in FIG. 14B.

A 180 degree directional circular polarized antenna 1 is shown in FIG. 14B. 1 operates within either of the unlicensed 802.11(xx) 2.4 or 5.8 GHz bands and has an isotropic gain of 15 dbi.

During game-play, 1 is used to convey radio frequency signals between the football cameras and the base station network transceiver 3 via coaxial cable 2. These signals contain various control data, system status, life span of battery information as well as the photographic images from the two cameras and sound picked up by microphones located inside the football. To ensure proper reception, 1 is typically placed close to the field of play at a suitable altitude so as to achieve a strong signal to noise ratio.

FIG. 14B shows the typical components of the remote base station. Network Transceiver 3 is used to buffer, convey and process the image, sound and control data signals traveling between the instrumented sports paraphernalia, transceiver 3 and the computer at the remote base station. This transceiver is equipped with an input/output port 23 to support the selected mode of connectivity utilized by the particular stadium i.e. fiber optic, copper cabling or wireless radio communication.

Network transceiver 3 consists of an 802.11(xx) protocol transceiver that operates in the radio frequency bands previously mentioned. The LAN Ethernet port of 3 is connected to desktop computer 5 via cat-6 cable 4.

State of the art Desktop computer 5 consists of a multi core CPU, several gigabytes of memory, video graphics card, sound card, high definition studio interface card and special system software 6. 5 is also equipped with traditional human interface hardware such as a keyboard 9, mouse 10 and headphones 11.

When the picture signals received by the remote base station from the cameras within the respective instrumentation package assembly (either wirelessly or via fiber optic connectivity) contain three dimensional images that are to be processed in turn by 5, it is necessary to ensure that these images be in proper alignment and have the correct orientation when viewed within the letterbox aspect ratio. To accomplish this function, 5 is additionally equipped with a set of dynamic tactile input joystick devices 21 and 22 which can be used by the cameraman to manually position each selected camera within the respective instrumentation package assembly. Alternately Special software operating within 5 can perform this function automatically as well as provide aid in the positioning of the respective images from the selected cameras to the cameraman.

Receiving from 3, 5 in turn processes the photographic images and sounds captured by the cameras and microphones located inside the football.

Prior to game-time the database of photographic images of the present playing field previously captured and stored by the set-up camera system are loaded onto the hard disk drive of 5. This database is subsequently used by 6 to establish reference points within the photographic image stream received by 5 from 3 as described earlier.

Whilst running on 5, 6 permits rapid real-time processing, enhancement and stabilization making upright the photographic images received from the football cameras during game-play.

Typically, as the system operates, 6 will frequently transmit required administrative commands via 5 and in turn 3 to the instrumentation package inside the football. These commands may initiate a lens change by either camera, focusing, as well as changes to the aspect, format and resolution, etc.

High definition multimedia interface cables 7 and 12 are used to interconnect the video graphics and sound card output of 5 to high definition TV monitors 8 and 14.

If over the course of a game the battery inside the football goes weak or there is a loss of a camera signal due to damage, the software onboard the instrumentation package will transmit a warning message to 5 that will in turn alert base station operator both audibly and visually using 8, 11 and 14.

During game-play 8 and 14 in conjunction with 5 and 6 may be used as desired by the base station operator to: view before and after software image stabilization, edit and/or add special effects such as instant replay, to the photographic images received from the football cameras.

Additionally, the base station operator can use 11 to hear the sound picked up by the microphones located inside the football as received by 5 and prepare it for broadcast using 5 as desired.

An HD-SDI along with SPDIF fiber and talkback multi-cable assembly 13 is typically used to connect the output of 5 to the TV studio's broadcast console 15 normally present at a televised football game. It is also used to convey cueing and commentary between the base station operator via 5 and other TV studio personnel using 15.

Prior to passing through to the input of satellite uplink hardware 16, 17, 18, 19 and final broadcast by satellite 20, TV studio personnel may wish to perform further editing and/or add other functions such as time coding to the photographic images and for sounds reaching 15 from 5. Such commands can be easily implemented by 6 using well-known broadcast equipment communication protocols.

When an instrumented baseball home plate is equipped with an instrumentation package assembly containing four cameras that is used to capture three dimensional images, any combination of two cameras out of the four may be selected at the remote base station manually by the cameraman and/or under the automatic control of special software. An instrumentation package assembly containing four such cameras is disclosed in FIG. 21A and FIG. 21B and FIG. 21C.

Additionally, the remote base station is equipped to issue control commands with a single or multiple joystick, control yoke or other dynamic tactile input device to facilitate the easy, rapid and smooth adjustment of each camera's rotational axis in real-time by camera personnel. This is necessary to ensure that the images from each of the two selected cameras will have the proper alignment and letterbox aspect ratio so as to produce the proper three-dimensional display irrespective of the line of sight's angular direction to the instrumented baseball home plate.

The control commands intended for each camera are conveyed to the instrumented home plate via an independent administrative data link that is established whenever the system is initialized and placed into operation This link is formed by the same bi-directional connection path either wirelessly or via a fiber optic cable system that conveys the picture and sound signals between the instrumented home plate and the remote base station depending on the selection made by personnel at the time of setup at the particular stadium.

Selection of the desired telecommunication path of (i.e. wireless or fiber optic connectivity) between each instrumented baseball base, instrumented baseball home plate and the remote base station at the time of setup can be made by personnel in one of three ways.

Firstly, a three position switch located within the respective instrumentation package assembly accessed merely by removing its access cover can be set such that when the system is operated it will always utilize the choice selected. Secondly, if the aforementioned switch is left in its neutral position the system will await a selection command from the remote base station via whichever telecommunications path is being used.

Figures 23A, 23B, 23C:
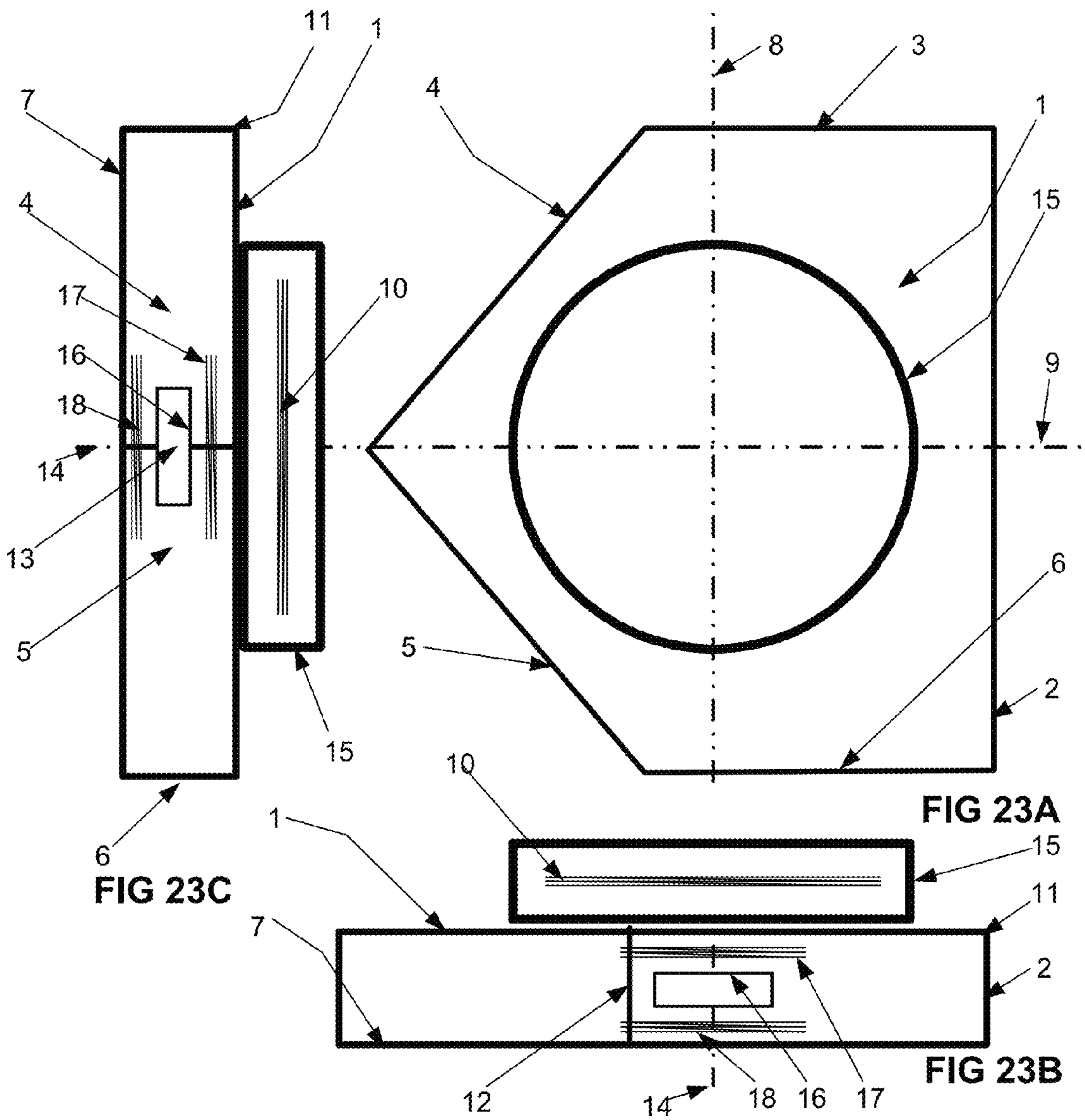
FIG. 23A is a diagram of the top view of the battery pack charging unit sitting on top of and charging the instrumented baseball home plate.
FIG. 23B is a diagram of the side view of the battery pack charging unit sitting on top of and charging the instrumented baseball home plate.
FIG. 23C is a diagram of the front view of the battery pack charging unit sitting on top of and charging the instrumented baseball home plate.

Thirdly, if the aforementioned switch is left in its neutral position the system will also respond to selection commands issued by the recharging station referenced in FIG. 23A over the administrative data link established via the 250 kHz induction coils. This is an especially useful feature for sports personnel who are using a common set of sports equipment i.e. instrumented home plates and play in a variety of baseball stadiums whose connectivity requirements vary.

Since the bi-directional administrative/control data link, picture and sound signal telecommunication paths of each camera are essentially independent with respect to their physical location on the stadium field relative to the remote base station, personnel can operate the system from a remote base station at a distant location such as from inside a broadcast equipment van in the stadium parking lot or a studio located many miles away from the stadium.

As an example, FIG. 31A and FIG. 31B show a typical baseball stadium equipped with an instrumented home plate connected to the remote base station via a series of fiber optic cables. This remote base station can be located inside the aforementioned broadcast equipment van.

The cameraman, in the remote base station, software selects either the wireless mode of communication, and/or the fiber optics/copper cable mode of communication between each of the instrumented sports paraphernalia (like for example, instrumented footballs, instrumented baseball bases, instrumented baseball home plates, instrumented baseball pitcher's rubbers, and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium/ arena playing field/rink. These choices are also physically switch selectable by the cameraman with his access through the opening in the bottom of some of the instrumented sports paraphernalia. Refer to FIG. 30A and FIG. 30B, and FIG. 31A and FIG. 31B, and FIG. 32A and FIG. 32B, and FIG. 33A, and FIG. 33B, and FIG. 33C, and FIG. 33D, and FIG. 33E, FIG. 35A and FIG. 35B and FIG. 35C for further disclosures regarding the remote base station and the antenna array relay junction.

The cameraman selects items from a software menu of control commands that go to the network transceiver 3 at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 38 and FIG. 19E and FIG. 22D, which is represented by dotted lines, consists of the electrical control wiring to and from the electronic components of the instrumented sports paraphernalia that are being controlled.

The antenna array relay junction simultaneously receives the televised RF signals transmitted by each and all of the static instrumented sports paraphernalia on the ground. The televised RF signals from each of the instrumented sports paraphernalia have different carrier frequencies to differentiate them from one another and improve the S/N ratio. The antenna array relay junction simultaneously relays these televised signals to the remote base station over the bi-directional communications link. Depending on the total number of HD TV cameras contained in the instrumented sports paraphernalia that are simultaneously on the playing field, and the noise levels in the air ways in the stadium, the cameraman in the remote base station can conserve bandwidth to insure the quality of the HD that is broadcast to the TV viewing audience by the remote base station. The cameraman can conserve bandwidth by transmitting a control signal to each of the instrumented sports paraphernalia instructing them to operate all their cameras in a low resolution mode. The cameraman then selects which of the instrumented sports paraphernalia's camera's video is going to be broadcast to the TV viewing audience, and sends a control signal to those instrumented sports paraphernalia cameras to televise their signals in the HD resolution mode. The instrumented sports paraphernalia then transmits its camera's HD video televised signal to the remote base station via the antenna array relay junction. As an example, the low resolution mode can be realized using TDM (time division multiplexing) or FDM (frequency division multiplexing) or HDT (high definition thumbnails).

Referring to the Preferred Embodiments Specified in FIG. 14B, the remote base station satisfies all of the following objectives:

It is an objective of the current invention to provide the remote base station with a 24 dbi 2.4 or 5.8 GHz antenna or antenna array that communicates with the antenna array relay junction in the instrumented sports stadium, a coaxial cable assembly, a remote base station network transceiver, an Ethernet CAT5E or CAT6 Cable, a desktop PC, special system software, two high definition monitor cables, two high definition monitors, keyboard, mouse, headphones, HD-SDI along with SPDIF fiber and talkback multi-cable assembly, broadcast console, typical satellite uplink cabling hardware, typical satellite uplink transmission hardware, typical satellite uplink feed line, typical satellite uplink satellite antenna link to a geosynchronous satellite orbiting the earth, bi-directional fiber optics cable and/or copper cable link with the antenna array relay junction in the instrumented sports stadium, two dynamic tactical input devices like joysticks. It is an objective of the current invention to provide the remote base station which has means to prepare the video and sounds that it receives via the antenna array relay junction, from the instrumented sports paraphernalia, for presentation to a live TV audience, and make the pictures upright and stable regardless of the motions of the dynamic sports paraphernalia. It is an objective of the current invention to provide the remote base station with software means to process, stabilize and make upright the video it receives from the dynamic instrumented sports paraphernalia, by using the gyroscopic encoder data it also receives from the instrumented sports paraphernalia to remove the pitch, yaw and roll motion effects of the instrumented sports paraphernalia on the video. It is an objective of the current invention to provide the remote base station with image recognition software means to process, stabilize and make upright the video it receives from the dynamic instrumented sports paraphernalia, by using the data it receives from the tripod mounted camera system to remove the pitch, yaw and roll motion effects of the instrumented sports paraphernalia on the video. It is an objective of the current invention to provide the remote base station with software means to combine the processing of the data received from the tripod mounted camera system with the data received from the gyroscopic encoders to jointly process, stabilize and make upright the video it receives from the dynamic instrumented sports paraphernalia. It is an objective of the current invention to provide the remote base station which has means to command and control the electronic and optical functions inside the instrumented sports paraphernalia by sending RF signals to the antenna array relay junction which in turn relays the RF signals to the instrumented sports paraphernalia on the playing field. It is an objective of the current invention to provide the remote base station which has means to wirelessly receive, decode, and process video and sound transmitted to it via an antenna array relay junction mounted in the instrumented stadium off the playing field. It is an objective of the current invention to provide the remote base station which an RF antenna array relay junction linked by RF signals with the dynamic sports paraphernalia, like for example instrumented footballs and instrumented ice hockey pucks, and with the static sports paraphernalia i.e. instrumented baseball bases, instrumented baseball home plates, and instrumented baseball pitcher's rubbers that are on the playing field. It is an objective of the current invention to provide the remote base station with means to wirelessly receive, decode and process pictures and sounds transmitted to it by the instrumented football, and prepare those pictures and sounds for presentation to a live TV audience. It is the an objective of the present invention to provide an instrumentation package assembly with onboard electronics contained within it to transmit TV pictures and sounds via radio antennas to a remote base station via an antenna array relay junction located in the sports stadium. It is an objective of the present invention to command and control the TV cameras and lenses from the remote base station via an antenna array relay junction located in the sports stadium. It is an objective of the present invention to command and control the power from the battery pack to the electronics from the remote base station via an antenna array relay junction located in the sports stadium. It is an objective of the present invention to stabilize the TV pictures using gyroscopic control. It is an objective of the present invention to control the charging of the battery pack from the remote base station via an antenna array relay junction located in the sports stadium. It is an objective of the present invention to monitor the battery pack charge status from the remote base station via an antenna array relay junction located in the sports stadium. It is a further objective of the current invention to provide the remote base station with means to prepare pictures and sounds for presentation to a live TV audience. It is a further objective of the current invention that, at the discretion of the remote base station operator, the TV audience will see stabilized upright pictures of the game despite the roll, pitch and yaw orientation of the instrumented football relative to the ground. It is a further objective to wirelessly command and control the functions within the instrumentation package assembly from the remote base station via an antenna array relay junction located in the sports stadium. It is an objective of the current invention to make the remote base station operator aware when the battery is charging properly, or when it is charging improperly. If the battery charges improperly, the instrumented football must be removed from the charger and repaired.

FIG. 15A and FIG. 15B

The detailed physical elements disclosed in the tripod mounted set-up camera system drawings shown in FIG. 15A and FIG. 15B are disclosed as follows: 1 is a high definition camera. 2 is a high definition camera. 3 is a fish eye lens. 4 is a fish eye lens. 5 is a motorized tripod mount. 6 is a laptop computer. 7 is a special software package. 8 is a laptop support shelf—folding. 9 setup camera tripod. 10 is a rechargeable battery pack. 11 is a USB 3.0 high-speed hub. 12 is a optical centerline of cameras.

FIG. 15A is a right side mechanical diagram of the tripod mounted set-up camera system.

FIG. 15B is a left side mechanical diagram of the tripod mounted set-up camera system.

Referring to drawings FIG. 15A and FIG. 15B, in a preferred embodiment, the tripod mounted set-up camera system (also called the Pre-game Set-up Camera Apparatus) is used to gather sample photographic images from the playing fields/rinks of instrumented sports stadiums/arenas needed by the remote base station software to create an image database that is subsequently utilized by the remote base station software to enhance, stabilize and make upright the real-time images received from the instrumented sport's paraphernalia i.e. instrumented footballs and instrumented ice hockey pucks, during game time, is disclosed. The remote base station is disclosed in FIG. 14A and FIG. 14B, FIG. 33A, FIG. 33B, FIG. 33C, FIG. 33D, FIG. 33E, FIG. 35A, FIG. 35B, and FIG. 35C and elsewhere in the present invention. The same remote base station is a part of the instrumentation used to equip other typical instrumented sports stadiums besides football stadiums, for example ice hockey stadiums/arenas.

Tripod mounted set-up camera 1 is shown in FIG. 15A and FIG. 15B. 1 is used prior to game time in order to gather sample photographic images needed by the remote base station software to create an image database that is subsequently utilized by the remote base station software to enhance, stabilize and/or make upright the real-time images received from the football's cameras during game time.

1 is equipped with dual high-definition imaging devices, compression hardware and optics including a set of fish-eye zoom lenses that are identical in function to those used by the cameras located inside the football. 1 is configured so that photographic images from opposite directions 180 degrees apart may be output simultaneously. 1 may be used to photograph and output still non-motion images as well as those with motion in a multitude of image formats including hi-definition. 1 is mounted on the top of 2. 2 is a motorized camera mount that provides 1 with horizontal & vertical axis rotation as well as height adjustments. 1 & 2 are connected to 5 via 3 & 4. 3 & 4 are high-speed USB cables. 5 is a portable laptop computer. 5 is loaded with 6. 6 is a software package that when initialized by the set-up camera operator is used to determine and control the position of 1 via commands to 2 and in turn capture and store the photographic images output by 1 needed by the remote base station as previously described.

During operation, 1 receives commands from 6 via 5. These commands determine various operational parameters of 1 such as image format and resolution, aspect ratio, focus, bulb, shutter and iris settings as well as whether or not to apply additional optical features i.e. fish-eye zoom.

Photographic images output by 1 are subsequently captured and stored by 5 under the control of 6 respectively.

A human interface to 6 can be made by the set-up camera operator via the keyboard and mouse of 5. Various operating functions of 6 once initialized by the set-up camera operator may be executed by remote control or automatically. This permits the set-up camera operator to position himself/herself out of the field of view when using the set-up camera system. Typically during operation, 5 will be secured to 7 such that the set-up camera operator may access and views the laptop screen easily while the system acquires the required photographic images automatically. 7 is an adjustable shelf attached to the rear legs of 8. 8 is a collapsible three-legged tripod. 8 can be used in such a way as to allow 1 to photograph images at or near ground level. 9 is a rechargeable battery like a lithium-ion battery pack. 9 supply's electrical power to 1 & 2 via 10 & 11. 9 may also serve as a backup power source for 5 via 12. 9 is recharged whenever necessary by 13. 10, 11 and 12 are multi-pin power cables. 13 is a small switching type power supply used to convert utility mains power to that utilized by 9 while being recharged.

The setup camera basically surveys the stadium and takes pictures of the playing field and of the stadium at different pitch and yaw angles of the setup camera from a variety of pre-selected coordinate points on the playing field. The setup camera is stationed both at ground level on the playing field and six feet above the playing field. The pictures taken by the setup camera will be used by the remote base station processing software to run image recognition algorithms to establish the upright reference for each picture taken by the football used during a game.

Photographic samples are taken with the setup camera inside each stadium from on the playing field. The scanning and scaling is automatically done by the software in the setup camera.

The resultant bit maps are subsequently loaded into the remote base station by transmission from the setup camera to the remote base station using a wireless link or by memory card. The setup camera will take all the pictures that the system needs to establish a data base for the image recognition algorithms.

In a preferred embodiment, there is a bit map created for every stadium on a removable flash memory card. A bit map for every stadium played in the season is stored on a flash memory card. An operator comes to the stadium prior to game-time with the setup camera, and sets up the setup camera on the playing field on a tripod, at designated points on the field, by following the menus set forth in the associated software loaded into the operator's laptop computer. The setup camera is plugged into the laptop computer, which contains the scanning software the setup camera needs to acquire and store the playing field bit maps needed by the base station computer to create a virtual playing field database. The playing field bit maps stored in the laptop computer are subsequently loaded into the base station computer by transmission from the laptop computer to the base station computer using a wireless link, or by recording the bit maps in the laptop computer on flash memory cards, which can be removed from the laptop computer and plugged into the base station computer.

Closed indoor stadiums do not have real skyline horizons. In situations where a real skyline horizon is not available, the closed indoor stadium may be prepared before the game with horizontal stripes of paint, whose lengths and widths are sufficiently long and wide, and whose locations allow them to be conspicuous to the TV cameras. In closed indoor stadiums where there are sufficient horizontal structures in the stadium, like horizontal barrier walls and horizontal structural members, painted stripes may become unnecessary for the decoding system to perform. When the operator initiates a scan command, the tripod mounted set-up camera system shown in FIG. 15A and FIG. 15B, and FIG. 16 lets the system learn what the stadium looks like in the upright position of the cameras in all pitch and yaw angles for a roll angle of zero degrees. From this data base, all of the required vertical upright references required data bases may be determined. It only has to do it only one time for that stadium. After that, it can supply all the other data the system requires to automatically stabilize a picture in pitch, yaw and roll of the instrumented football. The system overlays sequential images from each picture frame onto one another, thereby requiring very little site preparation to use the system.

The same processing software that is used in the remote base station to stabilize and make upright the imagery from the instrumented footballs is used to stabilize and make upright the imagery from ice hockey pucks disclosed in FIG. 1A and FIG. 1B and FIG. 1C, and FIG. 9A and FIG. 9B, and FIG. 37A and FIG. 37B and FIG. 37C of the present invention.

Referring to the Preferred Embodiments Specified in FIG. 15A and FIG. 15B, the tripod mounted set-up cameras satisfy all of the following further objectives:

It is an objective of the present invention to gather sample photographic images needed by the remote base station software from the tripod mounted set-up camera system consisting of a two high definition cameras, two fish eye camera lenses, a motorized tripod mount, a laptop computer, a special software package, a laptop support shelf—folding, setup camera tripod, a rechargeable battery pack, and a USB 3.0 high-speed hub. It is an objective of the present invention to gather sample photographic images to create an image database that is subsequently utilized by the remote base station software to enhance, stabilize and/or make upright the real-time images received from the football's cameras during game time. It is an objective of the present invention to gather sample photographic images to create an image database that is subsequently utilized by the remote base station software to enhance, stabilize and/or make upright the real-time images received from the instrumented sports paraphernalia cameras during game time. It is an objective of the present invention that the pre-game set-up camera apparatus be used for photographically scanning the sports event venue to build an archive of images to be utilized by the remote base station in processing encoded pictures received from the instrumented paraphernalia on the field of play to make them stable and upright to the TV viewing audience.

FIG. 16

The detailed physical elements disclosed in the signal and data flow circuits in the tripod mounted set-up camera system drawing shown in FIG. 16 are identified as follows: 1 is a high definition camera. 2 is a high definition camera. 3 is a camera fish eye lens. 4 is a camera fish eye lens. 5 is a high speed USB cable. 6 is a high speed USB cable. 7 is a camera dc power cable. 8 is a camera dc power cable. 9 is a dc power supply hub. 10 is a high speed USB hub. 11 is a rechargeable battery pack. 12 is a laptop computer dc power cable. 13 is a high speed laptop computer USB cable. 14 is a dc power cable. 15 is a dc power cable USB hub. 16 is a laptop computer. 17 is a special system software package.

FIG. 16 is a block diagram showing the signal and data flows circuits in the tripod mounted set-up camera system shown in FIG. 15A and FIG. 15B.

Referring to FIG. 16, in a preferred embodiment, the signal and data flows circuits that comprise the tripod mounted set-up camera system shown in FIG. 15A and FIG. 15B, are disclosed. 1 and 2 are two independent cameras identical in function to those located inside the instrumented football's instrumentation package assembly. 1 and 2 are also provided with Fish eye lenses 3 and 4 that may be utilized by the system software 17 whilst the set-up camera system is in operation.

High-speed USB cables 5 and 6 are used to interconnect 1 and 2 with high-speed USB hub 10. In order to enable automated positioning of 1 and 2 under the control of 17, a motorized tripod mount 11 is connected via high-speed USB cable 15 to 10.

A laptop computer 16 is connected to 10 via high-speed USB cable 13. During operation, 10 behaves as a junction box for 16. Since most laptop computers posses a maximum of two USB ports, 10 is needed. When the system is in operation, 17 may issue control commands to 1, 2 and 11. These control commands from 17 is conveyed between 16, 1, 2 and 11 using 5, 6, 10, 13 and 15 respectively. Photographic images captured by 1 and 2 are transferred to 16 via 5, 6, and 13 for further processing, storage and future use by the remote base station system software.

The set-up camera system is equipped with a high-capacity metal-hydride rechargeable battery pack 9. During operation, 9 supplies electrical power to 1, 2, 10, and 11. Back-up power for 16 is also provided by 9. Multi-pin dc power cables 7, 8, 12 and 14 are used to connect 9 to 1, 2, 10 and 16 respectively. 9 is recharged whenever necessary by small switching power supply 18.

18 is used to convert utility mains power to that utilized by 9 while being recharged.

Referring to the Preferred Embodiments Specified in FIG. 16, the tripod mounted set-up camera signal and data flow circuits satisfy all of the following further objectives:

It is an objective of the present invention that the tripod mounted set-up camera system signal and data flow circuits consist of two high definition cameras, two fish eye camera lenses, two high speed USB cables, two camera dc power cables, dc power supply hub, high speed USB hub, a rechargeable battery pack, a laptop computer dc power cable, a high speed laptop computer USB cable, dc power cables, dc power cable USB hub, a laptop computer, and a special system software package.

Figure 17A:
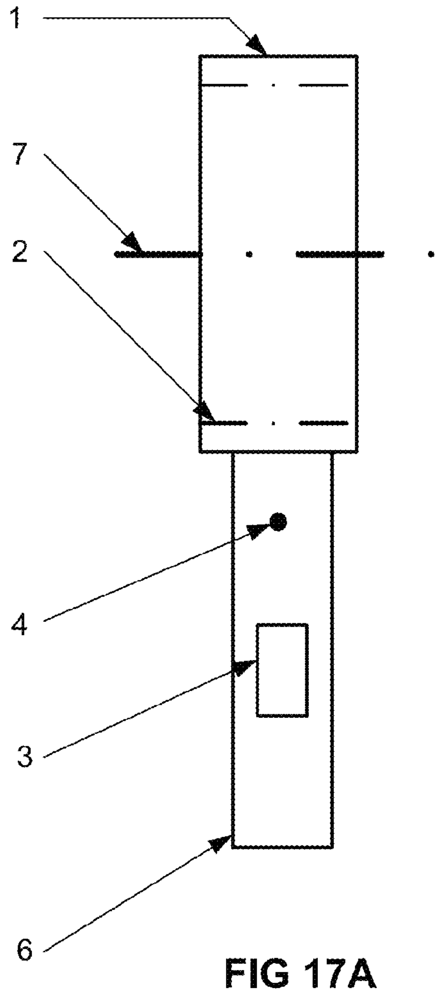
FIG. 17A shows a side view a hand-held remote control unit.
Figure 17B:
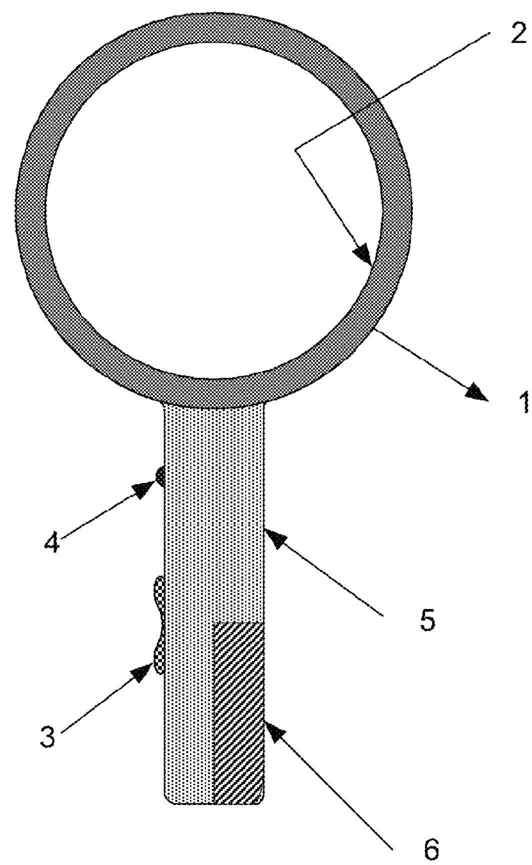
FIG. 17B shows a top view of a hand-held remote control unit.

FIG. 17A and FIG. 17B

The detailed physical elements disclosed in the hand-held remote control unit drawings shown in FIG. 17A and FIG. 17B are identified as follows: 1 is a hand-held remote control unit for the instrumented football. 2 is a 250 kHz induction coil. 3 is a multi function toggle switch. 4 is a LED/visual indicator. 5 is a handle. 6 is a rechargeable battery pack. 7 is a horizontal centerline of the hand-held remote control.

FIG. 17A shows a side view a hand-held remote control unit.

FIG. 17B shows a top view of a hand-held remote control unit.

Referring to drawings FIG. 17A and FIG. 17B, in a preferred embodiment, a hand-held remote control unit used to enable and disable the instrumentation package assembly mounted inside the instrumented football, is disclosed. 1 is a hand-held remote control unit used to enable and disable the instrumentation package assembly mounted inside the instrumented football. 2 is a 250 kHz induction coil used to magnetically couple the administrative/control data signals to and from the instrumentation package assembly mounted inside the instrumented football. The administrative/control data signals consist of control commands and status information that enable the field personnel to manipulate the various functions inside the instrumentation package assembly i.e. camera operating parameters, and obtain status information on the condition of the instrumentation package assembly i.e. battery life. The administrative/control data signals are also used to enable and disable the operation of the instrumentation package assembly inside the instrumented football, and to designate the desired wireless radio frequency. The administrative data link is accessible using either the 250 kHz coupling or the wireless capability of the instrumentation package assembly. 3 is a multi function toggle switch used to activate and deactivate the instrumentation package assembly mounted inside the instrumented football. 4 is a LED/visual indicator used to indicate the status of the instrumentation package assembly mounted inside the instrumented football, and the status of the battery inside 1. 5 is a handle used to be held by field personnel to hold the hand held remote control unit physically against the instrumented football. 6 is a rechargeable battery pack located inside the hand held remote control unit. 7 is a horizontal centerline of the hand-held remote control which lines up with the centerline of the instrumented football when the hand held remote control unit is placed physically against the instrumented football.

The administrative data link referenced in FIG. 17A and FIG. 17B is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

Referring to the Preferred Embodiments Specified in FIG. 17A and FIG. 17B, the hand-held remote control unit satisfies all of the following objectives:

It is an objective of the present invention that the hand-held remote control unit is composed of a hand-held remote control unit for the instrumented football, a 250 kHz induction coil, a multi function toggle switch, an LED/visual indicator, a handle, and a rechargeable battery pack.

It is an objective of the present invention to provide a hand-held remote control unit to enable and disable the instrumentation package assembly mounted inside the instrumented football. It is an objective of the present invention to provide a hand-held remote control unit with a 250 kHz induction coil used to magnetically couple or wirelessly link the administrative/control data signals to and from the instrumentation package assembly mounted inside the instrumented football. It is an objective of the present invention to provide a hand-held remote control unit that sends administrative/control data signals that consist of control commands and status information that enable the field personnel to manipulate the various functions inside the instrumentation package assembly i.e. camera operating parameters, and obtain status information on the condition of the instrumentation package assembly i.e. battery life. It is an objective of the present invention to provide a hand-held remote control unit that sends administrative/control data signals to enable and disable the operation of the instrumentation package assembly inside the instrumented football, and to designate the desired wireless radio frequency. It is an objective of the present invention to provide a hand-held remote control unit with a multi function toggle switch used to activate and deactivate the instrumentation package assembly mounted inside the instrumented football. It is an objective of the present invention to provide a hand-held remote control unit with a LED/visual indicator used to indicate the status of the instrumentation package assembly mounted inside the instrumented football, and the status of the battery. It is an objective of the present invention to provide a hand-held remote control unit with a handle to be held by field personnel to hold the hand held remote control unit physically against the instrumented football. It is an objective of the present invention to provide a hand-held remote control unit with a rechargeable battery pack located inside the hand held remote control unit.

It is an objective of the present invention to provide a hand-held remote control unit with an administrative data link that is a bi-directional communications path over which control commands, as well as status data between the instrumented sports paraphernalia and the remote base station are conveyed, where the data consists of data packets or streams that are independent in function from those that are used to convey image and/or sound information to the remote base station but share the same communications transport mechanism overall It is an objective of the present invention to provide a hand-held remote control unit with a communications transport mechanism formed whenever the microprocessor within the instrumented sports paraphernalia communicates with the remote base station over the particular mode of communications connectivity that the stadium has been equipped for i.e. fiber optics, copper cable or wireless radio. It is an objective of the present invention to provide a hand-held remote control unit with a microprocessor connected via an I/O port to the network transceiver within the instrumented sports paraphernalia and periodically monitors this port for activity. It is an objective of the present invention to provide a hand-held remote control unit with a microprocessor that executes a series of instructions contained in ROM in such a way that it will respond and act only on those commands that are correctly identified based on a unique identification integer code present in the signal that immediately precedes the control data stream contents. It is an objective of the present invention to provide a hand-held remote control unit with a microprocessor that will execute the received command as determined by the firmware stored in ROM and transmit a status data acknowledgement to the remote base station when it receives a data stream that is identified as valid. It is an objective of the present invention to provide a hand-held remote control unit where the status data it receives from the remote base station transceiver is handled in a manner similar to that of the instrumented sports paraphernalia. It is an objective of the present invention to provide a hand-held remote control unit which when the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. It is an objective of the present invention to provide a hand-held remote control unit capable of wirelessly interrogating the status of the instrumented sports paraphernalia.

FIG. 18

Figure 18:
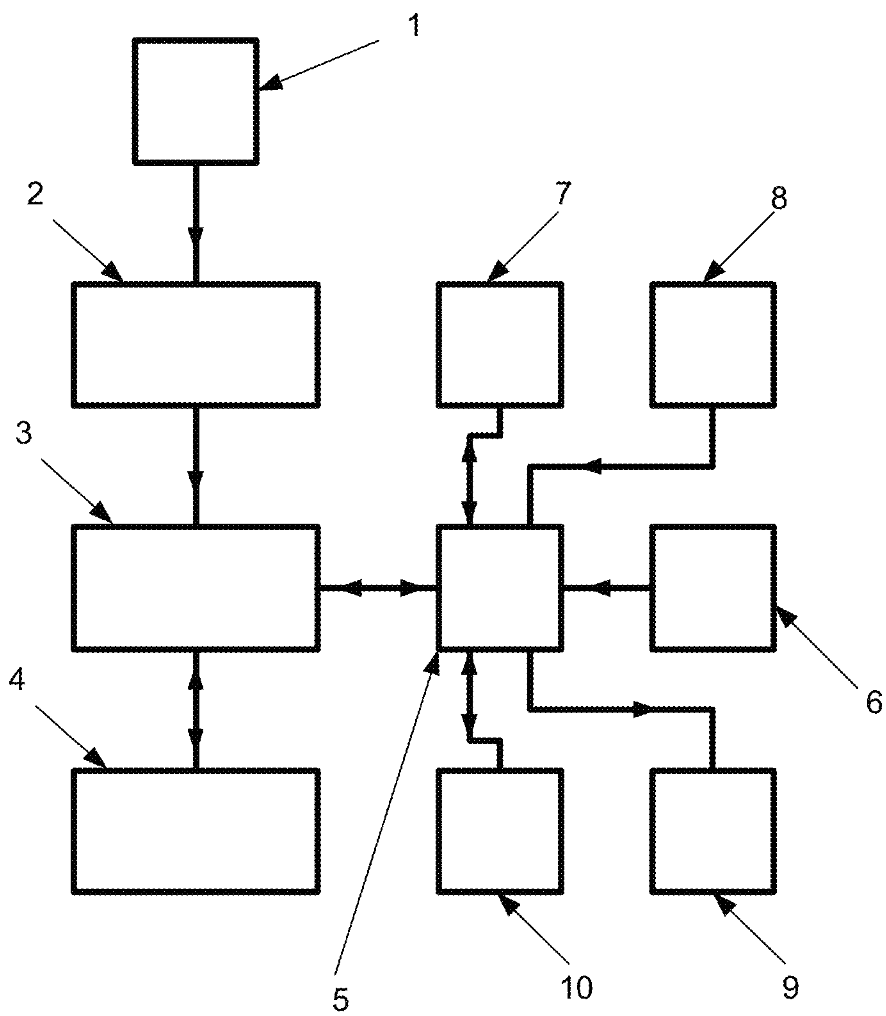
FIG. 18 is a block diagram showing the signal and data flow circuits inside the hand-held remote control unit in FIG. 17A and FIG. 17B.

The detailed physical elements disclosed in the hand-held remote control unit signal and data flow circuits drawing in FIG. 18 are identified as follows: 1 is a small switching power supply. 2 is a lithium-ion battery pack. 3 is a frequency converter. 4 is an induction coil. 5 is a microprocessor. 6 is a multi function toggle switch. 7 is a ROM—read only memory. 8 is a light emitting diode visual indicator. 9 is an audio transducer. 10 is a RAM random access memory.

FIG. 18 is a block diagram showing the signal and data flow circuits inside the hand-held remote control unit in FIG. 17A and FIG. 17B.

Referring to drawing FIG. 18, in a preferred embodiment, the signal and data flow circuits inside the hand-held remote control unit in FIG. 17A and FIG. 17B, are disclosed. A small switching power supply 1 is shown. 1 is used to recharge the lithium-ion battery pack 2 of the hand-held remote electronics package. This allows the hand-held remote to be used more conveniently and free of utility mains whilst activating or deactivating a instrumented football containing the instrumentation package assembly.

When 2 is sufficiently charged, low voltage dc power to operate frequency converter 3 and microprocessor 5 is available. By momentarily depressing multi-position toggle switch 6, 5 will initiate a boot-up sequence and load a firmware image stored at the time of manufacture on ROM 7 into RAM 10. If at the same time, whilst 6 is being depressed, induction coil 4 is placed in a position with sufficiently close contact to either end of the instrumented football containing the instrumentation package assembly then 5 will transmit an encoded signal command at a frequency near 250 kHz via 3 and 4 respectively to query the electronic identification number that is stored within the firmware ROM of the instrumentation package assembly. This step is necessary to eliminate the problems associated with unwanted interference from neighboring sources of radio frequencies that might otherwise occur resulting in the false activation or deactivation of said instrumented football(s).

Once 5 has successfully queried and received the said instrumented football's electronic identification number as mentioned previously, status light emitting diode display 8 is illuminated briefly following a short confirmation tone sounded by audio transducer 9 via a command from 5. At such time activation or deactivation of the instrumented football may be performed by again momentarily depressing 6 to the desired function whilst continuing to hold 4 in close contact with the desired end of said instrumented football and awaiting confirmation of the operation by a visual indication from 8. If no further operation is performed or 4 is moved a significant distance away from the end of the instrumented football for a time-out period previously loaded into 10, 5 will subsequently enter the self-shutdown sequence loaded in 10 placing the hand-held remote into a powered off state thus preserving the lifespan of 2.

In the event that an attempt to activate or deactivate said instrumented football is made while the instrumentation package assembly or the battery on-board said package is in a damaged, weakened or sub-discharged state, upon receiving such status data from the instrumentation package assembly 5 will alert personnel to this important condition by visual and audible indications from 8 and 9 respectively. This step will prevent field personnel from inadvertently using a instrumented football in need of attention by service personnel.

Referring to the Preferred Embodiments Specified in FIG. 18, the hand-held remote control unit satisfies all of the following further objectives:

It is an objective of the present invention that the hand-held remote control unit circuits be composed of a small switching power supply, a lithium-ion battery pack, a frequency converter, an induction coil, a microprocessor, a multi function toggle switch, a ROM—read only memory, a light emitting diode visual indicator, an audio transducer, and a RAM random access memory. It is an objective of the present invention to provide a hand-held remote control unit circuit where by momentarily depressing a multi-position toggle switch it will initiate a boot-up sequence and load a firmware image stored at the time of manufacture on ROM into RAM. It is an objective of the present invention to provide a hand-held remote control unit circuit where if at the same time the multi-position toggle switch is being depressed, the induction coil is placed in a position with sufficiently close contact to either end of the instrumented football containing the instrumentation package assembly, then 5 will transmit an encoded signal command at a frequency near 250 kHz and respectively query the electronic identification number that is stored within the firmware ROM of the instrumentation package assembly. It is an objective of the present invention to provide a hand-held remote control unit circuit where once the microprocessor has successfully queried and received the instrumented football's electronic identification number, a status light emitting diode display is illuminated briefly following a short confirmation tone sounded by audio transducer via a command from microprocessor. It is an objective of the present invention to provide a hand-held remote control unit circuit where an attempt to activate or deactivate the instrumented football is made while the instrumentation package assembly or the battery on-board is in a damaged, weakened or sub-discharged state, upon receiving such status data from the instrumentation package assembly the microprocessor will alert personnel to this important condition by visual and audible indications from the light emitting diode visual indicator and an audio transducer. It is an objective of the present invention to provide a hand-held remote control unit circuits consisting of a small switching power supply, a lithium-ion battery pack, a frequency converter, an induction coil, a microprocessor, a multi function toggle switch, a ROM—read only memory, a light emitting diode visual indicator, an audio transducer, and a RAM random access memory.

FIG. 19A and FIG. 19B and FIG. 19C

The detailed physical elements disclosed in the instrumentation package assembly drawings shown in FIG. 19A and FIG. 19B and FIG. 19C are identified as follows: 1 is the y-axis of symmetry of the instrumentation package assembly. 2 is a camera. 3 is the top induction coil for charging the battery. 4 is the x-axis of symmetry of the instrumentation package assembly. 5 is a microphone. 6 is a microphone. 7 is the instrumentation package assembly. 8 is the electronics. 9 is an instrumentation package assembly element showing a corrugated bellows segment. 10 is the bottom induction coil for charging the battery. 11 is the camera lens. 12 is the z-axis of symmetry of the instrumentation package assembly. 13 is the camera lens seal. 14 is a radio antenna. 15 is a radio antenna. 16 is a radio antenna. 17 is a radio antenna. 18 is the fiber optics and copper cable connector. 19 is the bottom lid heat sink of the instrumentation package assembly. 20 is the camera and camera lens electro-mechanical actuating device. 21 is the battery. 22 is dry nitrogen gas. 23 is the gas valve. 24 is the microphone electrical connector. 25 is a microphone. 26 is a microphone.

FIG. 19A is the top view of the one-camera instrumentation package assembly.

FIG. 19B is a side view of the one-camera wireless instrumentation package assembly.

FIG. 19C is a side view of the one-camera wireless, fiber optics and bi-directional high speed copper network communications cable instrumentation package assembly.

Referring to drawings FIG. 19A and FIG. 19B and FIG. 19C, in two preferred embodiments, two different instrumentation package assemblies, are disclosed. The present invention contemplates each instrumentation package assembly to be equipped with a single TV camera, a TV camera lens, and four microphones, supporting electronics, battery pack, two induction coils, a mechanical actuating device and four antennas. Electrical connector allows the audio from additional microphones to be inputted to the instrumentation package assembly.

The single TV camera, single TV camera lens, supporting electronics, induction coil, mechanical actuating device and corrugated bellows segment are the parts of the instrumentation package assembly element disclosed in FIG. 19D which is a primary part of each of the two different instrumentation package assemblies. The instrumentation package assembly preferred embodiment contains one instrumentation package assembly element as disclosed in FIG. 19D.

The instrumentation package assembly is used to instrument the baseball home plate by mounting it inside the baseball home plate. A baseball home plate instrumented with an instrumentation package assembly is referred to as an instrumented baseball home plate.

The instrumentation package assembly can be used to instrument ice hockey pucks and other sports paraphernalia as well.

The preferred embodiment shown in FIG. 19B uses wireless RF radio transmission to televise pictures and sounds. The preferred embodiment shown in FIG. 33C uses both wireless, fiber optics and bi-directional high speed copper network communications cable transmission to televise pictures and sounds from the baseball playing field. The only difference between the two embodiments is that FIG. 19B has wireless capability only, whereas FIG. 19C has both wireless, fiber optics and bi-directional high speed copper network communications cable capabilities. The one that has wireless capability only is cheaper to produce than the one that has wireless, fiber optics and bi-directional high speed copper network communications cable capabilities thereby giving it a cost advantage for venues with lower budgets, like for example some colleges and high schools. The one with wireless, fiber optics and bi-directional high speed copper network communications cable capabilities has better bandwidth and lower noise.

It is contemplated in the present invention in FIG. 19B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its instrumentation package assembly cameras and microphones, to a remote base station.

A baseball stadium instrumented for wirelessly televising baseball games from instrumented baseball home plates is shown in FIG. 30A and FIG. 30B. A baseball stadium instrumented for televising baseball games from instrumented baseball home plates via fiber optics cable and/or copper cable buried beneath the playing field is shown in FIG. 31A and FIG. 31B, and FIG. 32A and FIG. 32B, and FIG. 35A and FIG. 35B, and FIG. 35C.

The alternate preferred embodiment shown in FIG. 19C televises baseball games to the remote base station from its cameras and microphones via a fiber optics communication link and bi-directional high speed copper network communications cable. The fiber optics and copper cable connector built into the bottom of the instrumentation package assembly, which is mounted inside the instrumented baseball home plate, is connected to fiber optics cable and/or copper cable buried in the ground of the baseball playing field. The fiber optics cable and/or copper cable that is buried in the ground is connected to the remote base station via an antenna array junction. Refer to FIG. 31A and FIG. 31B and FIG. 32A and FIG. 32B for the specification of the antenna array junction and the remote base station.

The preferred embodiment shown in FIG. 19B uses wireless radio wave transmission of the televised pictures and sounds. The preferred embodiment shown in FIG. 19C uses fiber optics and/or copper cable transmission. It also has the capability of televising pictures and sounds by wireless transmission.

It is contemplated in the present invention in FIG. 19B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its cameras and microphones contained within the instrumentation package assembly, to a remote base station.

The instrumentation package assembly has one instrumentation package assembly element. The instrumentation package assembly element is disclosed in FIG. 19D. The TV camera, TV camera lens, supporting electronics, induction coil and mechanical actuating device are the primary parts of the instrumentation package assembly element.

It is understood that as the state of the art in TV camera technology advances, that there will be other better TV cameras that use other than CCD technology. The present invention will work equally well with them as they become available.

Therefore, the present invention uses CCD TV cameras as an example of TV cameras that may be used simply because they are the best that today's technology offers, and is not confined only to their sole use in the future.

Referring to the instrumentation package assembly shown in FIG. 19A and FIG. 19B and FIG. 19C, FIG. 19A is a top view of the instrumentation package assembly, FIG. 19B is an A-A section view of the instrumentation package assembly, FIG. 19C is an A-A section view of the alternative instrumentation package assembly preferred embodiment showing the fiber optics cable and copper cable connector 18. The instrumentation package assembly element 9 is disclosed in FIG. 19D.

The instrumentation package assembly 7 contains all the electronics for wirelessly televising pictures and sounds. The picture and sounds are taken directly by the instrumentation package assembly's camera 2 and microphones 5 and 6. Both preferred embodiments shown in FIG. 20B and FIG. 20C communicate the pictures and sounds from the instrumented baseball home plates on the field to a remote base station located near the field for final processing and dissemination.

The instrumentation package assembly electronics showing the detailed flow of electrical signals and data in the instrumentation package assembly is shown in the preferred embodiment given in FIG. 22D and FIG. 22E.

The instrumentation package assembly 7 is a compressed assemblage of all the optical and electronic components that gather and transmit TV pictures and sounds into a single enclosure. The main body of the instrumentation package assembly 7 is essentially a short cylinder about ½ inch or more high that resembles a can of tuna fish. It is made strong to resist being crushed. Material examples such as polycarbonates, ABS and fiber reinforced plastics are used in its construction. The x-axis of symmetry of the instrumentation package assembly 7 is 4. The y-axis of symmetry of the instrumentation package assembly 7 is 1. The center of the instrumentation package assembly 7 is located at the intersection of the x-axis and the y-axis. The z-axis 12 of the main body of the instrumentation package assembly 7 is mutually orthogonal to 4 and 1.

The instrumentation package assembly 7 contains cameras 2, camera lens 11, supporting electronics 8, induction coils 3 and 10, battery pack 19, radio antennas 14, 15, 16, and 17, electro-mechanical actuating device 20, corrugated bellows section 9, microphones 5 and 6, and bottom lid 19.

The part of the instrumentation package assembly 7 that contains the camera 2, camera lens 11, supporting electronics 8, induction coil 3, electro-mechanical actuating device 20, and corrugated bellows section 9 is the instrumentation package assembly element specified and shown enlarged in FIG. 19D.

Figure 33B:
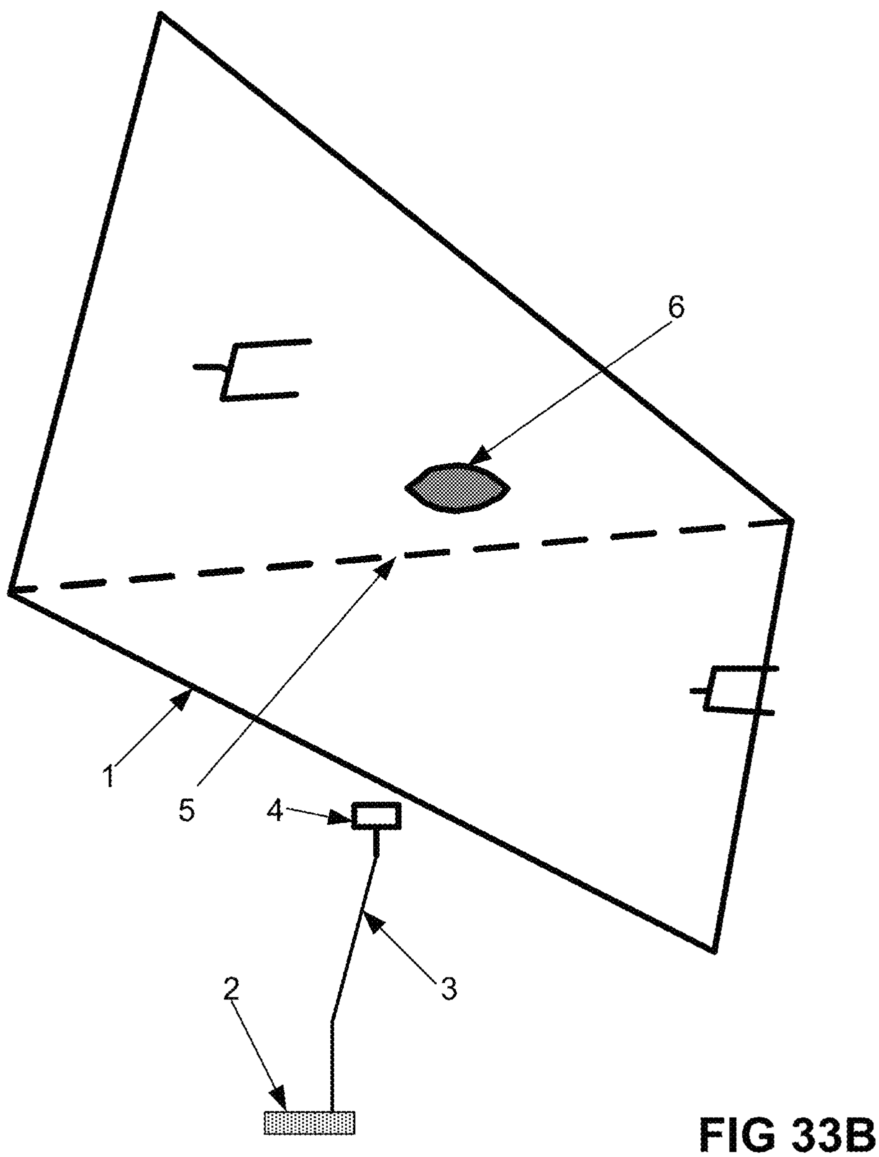
FIG. 33B shows a typical instrumented football stadium equipped with a wireless bi-directional RF communications link to televise football games from an instrumented football, which is in play on the football playing field, and a remote base station via the antenna array relay junction.

Camera 2, camera lens 11, supporting electronics 8, induction coil 3, electro-mechanical actuating device 20, and corrugated bellows section 9 shown in FIG. 33B are identical to camera 2, camera lens 11, supporting electronics 8, induction coil 3, electro-mechanical actuating device 20, and corrugated bellows section 9 shown in FIG. 19C.

The supporting electronics 8 shown in FIG. 19B are different from the supporting electronics shown in FIG. 19C. The supporting electronics shown in FIG. 19C have an additional capability beyond that specified for the supporting electronics shown in FIG. 19B. The supporting electronics in FIG. 19B can only televise wirelessly to the remote base station. The supporting electronics shown in FIG. 19C can televise pictures and sounds via a fiber optics cable link and by copper cable to the remote base station, as well as televise wirelessly to the remote base station.

The picture and sounds are taken directly by the camera 2 and microphones 5 and 6 inside the instrumentation package assembly 7. The instrumentation package assembly 7 is mounted within the instrumented baseball home plate that is in play on the baseball field. The instrumentation package assembly may wirelessly or by fiber optics or by copper cable communicate and televise the pictures and sounds from inside the instrumented baseball home plate to a remote base station located near the baseball field for final processing and dissemination.

The instrumentation package assembly 7 contains all the electronics 8 for wirelessly televising pictures and sounds. The camera 2, camera lens 11, and electronics 8 are joined to the main body of the instrumentation package assembly by the corrugated bellows segment.

In FIG. 19B, the instrumentation package assembly 7 contains all the electronics 8 for wirelessly televising pictures and sounds. The electronics 8 is identical to the electronics 27 in FIG. 19B.

Figure 33C:
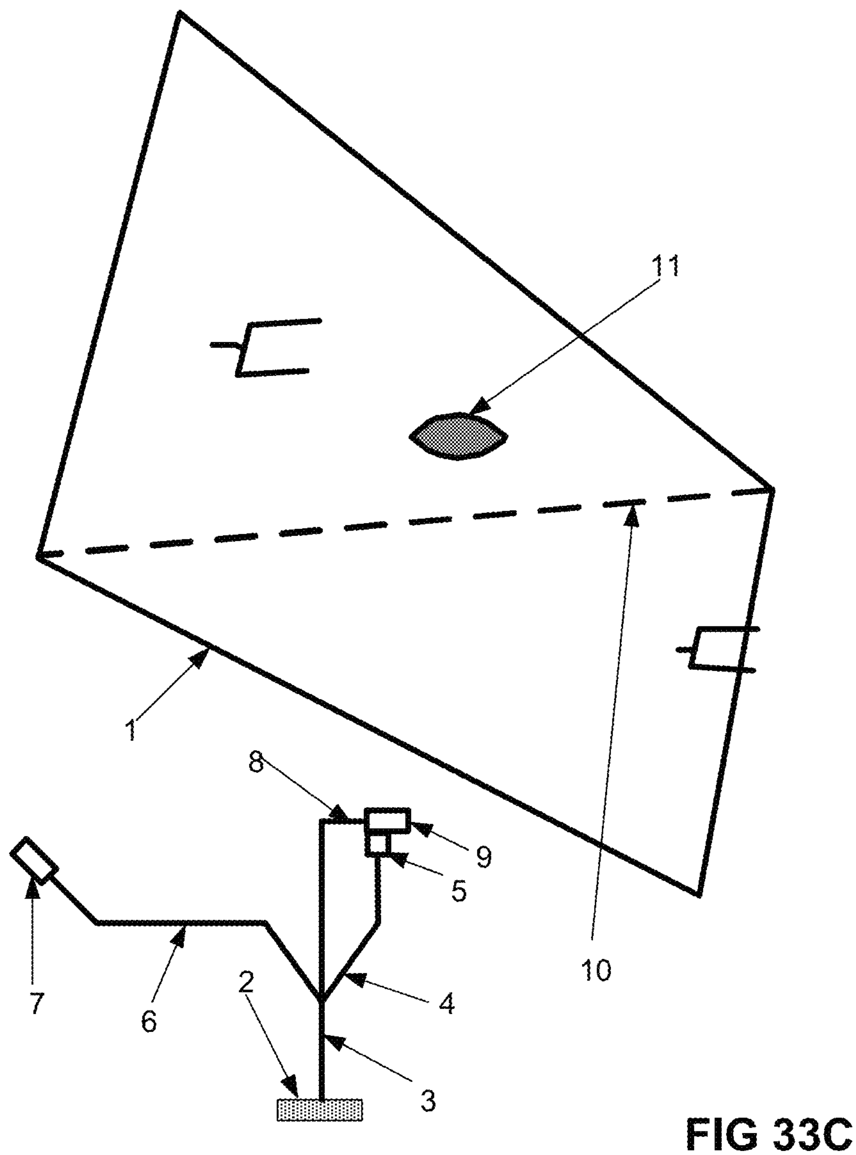
FIG. 33C shows a typical instrumented football stadium equipped with a wireless bi-directional RF communications link to televise football games from an instrumented football which is in play on the football playing field, and a remote base station via the antenna array relay junction.

In FIG. 33C, the instrumentation package assembly 7 contains all the electronics 8 for televising pictures and sounds using a fiber optics cable link and/or copper cable link, in addition to televising pictures and sounds wirelessly like in FIG. 19B.

In a preferred embodiment where we have disclosed a baseball playing field with a fiber optics cable link and/or copper cable link buried beneath the ground, and in particular beneath the instrumented baseball home plate and beneath the three instrumented baseball bases, and where the fiber optics cable link and/or copper cable link is connected to the remote base station at its other end, and where the electronics in FIG. 19C includes the capability to televise baseball games from inside the instrumented baseball home plate to the remote base station via the fiber optics/copper cable link by connecting to the fiber optics/copper cable link using the fiber optics/copper cable connector 18. The instrumentation package assembly 7 in the preferred embodiment shown in FIG. 19C uses a fiber optics cable/copper cable connector 18 with which to connect to a fiber optics/copper cable link buried beneath the baseball playing field grounds and beneath the instrumented baseball home plate.

The diameter of the instrumentation package assembly is kept to a minimum in order to minimize its footprint inside the instrumented baseball home plate. The dimension of the outside diameter of the instrumentation package assembly is governed largely by the physical diagonal dimension of the largest components within the instrumentation package assembly, like the SD/HD camera's CCD sensor array and the battery package.

The instrumentation package assembly is mounted inside the instrumented baseball home plate using a buffer plate that acts as a bearing for the instrumentation package assembly.

The buffer plate supports the upper end of the instrumentation package assembly.

The instrumentation package assembly 7 contains one miniature SD/HD TV camera 2 and two condenser microphones and 6 and supporting electronics. The camera, microphones 5 and 6 and supporting electronics are housed together within the enclosure cavity of the instrumentation package assembly 7. The condenser microphones 5 and 6 are attached to the top interior wall of the instrumentation package assembly. The microphones 5 and 6 hear any sounds produced by physical contact of the instrumented baseball home plate with any external thing, including for example air currents felt on the instrumented baseball home plate during the baseball's flight in the air over the instrumented baseball home plate when it is pitched.

Microphone electrical connector 24 is mounted on the instrumentation package assembly. 24 mates with an electrical connector which is wired by a cable to microphones mounted on the top surface of the instrumented baseball home plate and instrumented ice hockey puck. These microphones protrude through the top of the instrumented baseball home plate and instrumented ice hockey puck. These microphones listen for sounds of the game that occur on the baseball playing field above the top of the instrumented baseball home plate and above the ground; and also for sounds of the game that occur on the ice rink above the top of the instrumented ice hockey puck. These microphones also listen for sounds of the game that occur beneath the ice hockey puck as it slides on the ice. The microphone cables from each of these microphones carry electrical sound signals from the microphones to the microphone's electrical connectors which are plugged into mating electrical connector 24 on the instrumentation package assembly shown in the referenced drawings.

The instrumentation package assembly 7 is a sealed unit and is filled with a dry pressurized gas like nitrogen to prevent the entry of moisture or dirt. Seals between the lid 19 and main body of the instrumentation package assembly 7 prevent the dry gas from leaking out of the instrumentation package assembly enclosure. A desiccant is disposed near the SD/HD lenses and cameras to collect and prevent any moisture build-up within the instrumentation package assembly 7. The lid 19 is a heat sink used to cool the contents of the instrumentation package assembly.

The diameter of the instrumentation package assembly 7 is kept to a minimum in order to minimize the space taken up inside the instrumented baseball home plate. The dimension of the outside diameter of the instrumentation package assembly is governed largely by the physical diagonal dimensions of its largest components like the quad antennas 14, 15, 16 and 17 and the battery pack 21.

The line of sight of camera 2 is mutually perpendicular to the top of the instrumentation package assembly 7. Camera 2 looks out perpendicularly from the top of the instrumentation package assembly 7.

The optical axis of the camera 2 is aligned perpendicular to the top of the instrumentation package assembly 7.

Therefore its line of sight is perpendicular to the top of the instrumentation package assembly 7.

The optical axis of camera 2 within the instrumentation package assembly 7 is aligned to be coaxial with the instrumentation package assembly's 7 mechanical z-axis 12. The camera 2 is positioned at the top of the instrumentation package assembly and looks out through the camera lens 11 which is positioned above it.

The camera lens 11 is positioned at the very top of the instrumentation package assembly 7, with the camera 2 directly beneath it. The camera essentially looks out of the top of the instrumentation package assembly 7.

The camera lens 11 provides imagery to camera 2. The camera lens 11 images the objects it sees onto camera 2. The optical and mechanical axis of camera 2 and camera lens 11 is 12.

The camera lens 11 has an o-ring seal 13. The purpose of the seal 13 is to hold and prevent leakage of the pressurized dry nitrogen gas from the cavity of the instrumentation package assembly. The seal prevents dirt and moisture from entering the cavity and damaging and interfering with the performance of its contents. The seal 13 is made from rubber. The seal 13 is located between the front of the camera lens 11 and the camera lens cylindrical mounting.

In variants of the present preferred embodiment, a variety of different camera lens types with different lens setting capability can be used providing they are small in size (so as not to be prominent and conspicuous to the players) and also physically fit within the instrumentation package assembly. The auto iris setting permits the camera lens to automatically adjust for varying lighting conditions on the field. The auto focus setting permits the camera lens to adjust focus for varying distances of the players and action subjects on the field.

The functions of the camera lens 13 such as focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lens 13 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions.

When a baseball is hit and a player is rounding the bases, the distance of a player from one base may be decreasing while the distance to another base may be increasing. The camera 2 can be independently and simultaneously commanded and controlled to auto focus on their respective players. If the player slides into the instrumented sports paraphernalia carrying the instrumentation package assembly, the camera 2 will catch the slide up close. The microphones 5 and 6 will capture all the sounds of the action. While the player is running, his pictures and sounds are wirelessly being transmitted by the instrumentation package assembly 7 inside the instrumented sports paraphernalia.

Figure 19F:
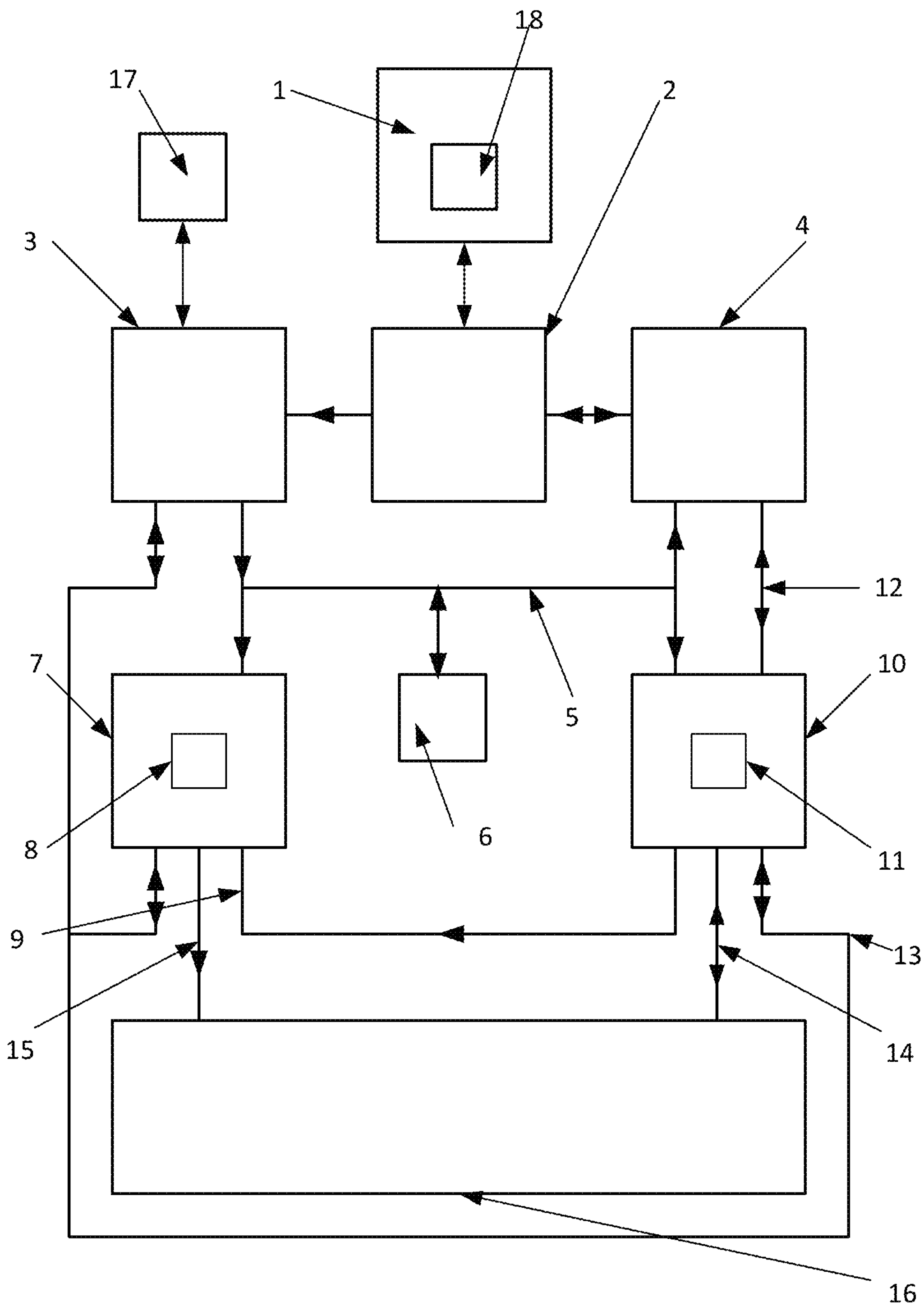
FIG. 19F is an instrumentation package assembly element power supply and battery charging circuits electronics block diagram.

A block diagram showing the detailed flow of electrical signals and data in the instrumentation package assembly electronic circuits is shown in the preferred embodiment given in FIG. 19E and FIG. 19F. The instrumentation package assembly's network transceiver is part of the electronics in 8. The network transceiver wirelessly transmits real-time pictures and sounds from the camera 2 and microphones 5 and 6 via quad antenna array elements 14, 15, 16 and 17, also known as intentional radiators, to the remote base station. The quad antenna array elements 14, 15, 16 and 17 are mounted radially between the two circular circuit boards that comprise 8.

As is shown in the alternative preferred embodiment in FIG. 19C, a fiber optics/copper cable connector 18 is employed to connect to a fiber optics cable link buried in the playing field grounds beneath the instrumented baseball home plate, to televise the pictures and sounds of the game to the remote base station which is connected to the fiber optics cable link at its other end. Should fiber optics/copper cable buried in the playing field grounds not exist in a baseball stadium, the baseball games may be televised wirelessly using radio signals and antennas 14, 15, 16 and 17 using the preferred embodiment shown in FIG. 19B. It is clear that the preferred embodiment shown in FIG. 19C is superior in this regard because it is capable of televising baseball games by both methods i.e. either wirelessly or by a fiber optics/copper cable link. The preferred embodiment shown in FIG. 19C is more expensive to manufacture than the preferred embodiment shown in FIG. 19B because its electronics 8 must provide for the additional fiber optics and/or copper cable related electronic functions.

In an alternate preferred embodiment, the quad antenna array elements 14, 15, 16 and 17 are replaced with a helix antenna (not shown) with similar dimensions wound on the inside diameter of the instrumentation package assembly 7.

The battery's charging coils 3 and 10 are wound on the outside at both the top and bottom of the instrumentation package assembly 7 and act electrically as a transformer's secondary winding. The coils are wound on the outside of the instrumentation package assembly 7 to keep any heat they may produce away from the contents of the instrumentation package assembly 7 while the battery pack is being charged. The number of turns in each charging coil 3 and 10 is made large enough to inductively couple a sufficient number of magnetic lines of flux from the primary coil of the external battery charging unit so as to charge the battery pack in a reasonably short time before games. When the external charging unit is placed on top of the instrumented baseball base, the charging coils 3 and 10 receive electrical energy inductively coupled from the primary coils of the external charging unit.

Induction coil 3 is located on the top of the instrumentation package assembly 7. Induction coil 10 is located on the bottom of the instrumentation package assembly 7. Induction coil 26 is located on the top of the instrumentation package assembly 7. Induction coil 19 is located on the bottom of the instrumentation package assembly 7. The purpose of the induction coils 3, 10 and 19, 26 is to inductively couple electrical energy into the instrumentation package assembly 7 to charge the battery pack 21. The induction coils 3 and 10 are located on the exterior of the enclosure so as to minimize their heat transfer into the instrumentation package assembly 7 enclosure cavity that would raise the temperature of the electronics within the enclosure cavity. The induction coils 3 and 10 are electrically connected through the enclosure walls to the electronics inside the enclosure cavity.

When the instrumentation package assembly 7 is mounted inside the host sports paraphernalia, such as an instrumented baseball home plates, an external electrical induction coil which is part of a battery pack charging unit is used to magnetically inductively couple electrical power into induction coils 3 and 10 through the instrumented baseball home plate and into the instrumentation package assembly 7 for the purpose of charging the battery pack 21. A block diagram showing the electrical battery charging circuit involving the induction coils 3 and 10 and the battery pack 21 are shown in FIG. 23. A source of electrical power from the charging unit, which is external to the instrumentation package assembly 7, is inductively coupled into these induction coils 3 and 10 by laying the external induction coil of the charging unit flat on the top of the host sports paraphernalia coaxially above coils 3 and 10. The induction coils 3 and 10 feed this power to the battery pack 21 in order to charge it.

The main body of the instrumentation package assembly 7 houses the battery pack which supplies electrical power to each of the elements within the instrumentation package assembly that requires electrical power.

The instrumentation package assembly's battery pack 21 is inductively wirelessly charged before games on an as needed basis, by an external primary winding placed on the top of the instrumented baseball home plate. Charging of the battery pack 21 is accomplished wirelessly by inductive coupling. The instrumentation package assembly's inductive pickup coils 3 and 10 act as the secondary windings on an air core transformer with an external primary winding as their power source. Inductively coupled time varying magnetic flux is furnished to 3 and 10 by the external primary winding placed on the top of the instrumented baseball home plate.

The instrumentation package assembly's battery pack 21 is wirelessly charged before games on an as needed basis, using the charging station disclosed in preferred embodiment FIG. 23A and FIG. 23B and FIG. 23C. The battery pack charging station is placed on the top of the instrumented baseball home plate when it is charging the battery pack 21. Charging of the battery pack 21 is accomplished wirelessly by inductive coupling. The instrumented baseball base's two inductive pickup coils 3 and 10 act as the secondary windings on an air core transformer. Time varying magnetic flux is furnished to 3 and 10 by the primary windings of the battery charging station unit FIG. 23A and FIG. 23B and FIG. 23C.

The battery's 19 charging coils 27 and 28 are wound on the outside of the instrumentation package assembly's 7 and act electrically as a transformer's secondary winding. The coils are wound on the outside of the instrumentation package assembly 7 to keep any heat they may produce away from the contents of the instrumentation package assembly 7 while the battery 19 is being charged. The number of turns in each charging coil is made large enough to inductively couple a sufficient number of magnetic lines of flux from the external primary coil so as to charge the battery in a reasonably short time before games. When the external primary coil is placed on top of the instrumentation package assembly the charging coils 3 and 10 receive electrical energy inductively coupled from the primary coils.

The instrumentation package assembly's network transceiver electronics 8 wirelessly transmits real-time pictures and sounds from the instrumentation package assembly's camera and microphones via quad antenna array elements 14, 15, 16 and 17 also known as intentional radiators, to the remote base station disclosed in FIG. 30A and FIG. 30B and FIG. 32A and FIG. 32B and elsewhere in the present invention. The quad antenna array elements 14, 15, 16 and 17 are mounted in a horizontal plane 90 degrees apart from one another and extend outward through the cylindrical wall of the main body of the instrumentation package assembly 7.

As is shown in the alternative preferred embodiment in FIG. 19C, a fiber optics/copper cable connector 18 is employed to connect to a fiber optics/copper cable link buried in the playing field grounds beneath the instrumented baseball home plate, to televise the pictures and sounds of the game to the remote base station which is connected to the fiber optics/copper cable link at its other end. The fiber optics/copper cable is brought up from the ground beneath the instrumented baseball home plate and connected to the instrumented baseball home plate via the fiber optics/copper cable connector 18. Should fiber optics/copper cable buried in the playing field grounds not exist in a baseball stadium, the baseball games may be televised wirelessly using radio signals and antennas 14, 15, 16 and 17 using the preferred embodiment shown in FIG. 19B. It is clear that the preferred embodiment shown in FIG. 19C is superior in this regard because it is capable of televising baseball games by both methods i.e. either wirelessly or by a fiber optics/copper cable link. The preferred embodiment shown in FIG. 19C is more expensive to manufacture than the preferred embodiment shown in FIG. 19B because its electronics 8 must provide for the additional fiber optics/copper related electronic functions.

In an alternate preferred embodiment, the quad antenna array 14, 15, 16 and 17 can be replaced with a helix antenna (not shown) with similar dimensions wound on the inside diameter of the instrumentation package assembly 7 down the length of its cylindrical wall.

An antenna array relay junction shown in FIG. 30A and FIG. 30B is deployed in the baseball stadium and receives radio signals from the quad antenna array 14, 15, 16 and 17. Antenna array elements 14, 15, 16 and 17 are in quadrature to radiate radio signals to the antenna array relay junction with sufficient gain so as to overcome RF noise, and provide a large enough gain bandwidth product to accommodate real-time SD/HD picture quality requirements. The instrumentation package assembly's network transceiver electronics 8 also provides a wireless means for the instrumentation package assembly's in the instrumented baseball home plate to receive command and control radio signals from the remote base station's antenna.

The corrugated bellows segment 9 acts to mechanically connect the camera lens 11, camera 2 and electronics 8 to the main body of the instrumentation package assembly. The corrugated bellows segment 9 is mechanically flexible. This flexibility allows the optical axis of the camera 2 and its lens 11 to be mechanically tilted relative to the z-axis 12 of the main body of the instrumentation package assembly 7 and pre-set in place if so desired by the cameraman at the time the instrumentation package assembly 7 is encapsulated inside the host sports paraphernalia.

The corrugated bellows section 9 of the instrumentation package assembly is flexible and allows the section containing the camera 2 and its camera lens 11 to be bent in order to tilt the line of sight of the camera 2 and its lens 11 relative to the top of the instrumentation package assembly if so desired by the cameraman. Additionally, the corrugated section 9 allows the instrumentation package assembly 7 to act as a spring and absorb shocks and compress or expand its length without damaging the contents of the instrumentation package assembly. When circumstances arise where the players tend to crush the instrumentation package assembly 7, it will compress or expand.

The instrumentation package assembly 7 has a flexible corrugated bellows section 9. The corrugated bellows section 9 of the instrumentation package assembly 7 allows for the part of the instrumentation package assembly 7 containing camera 2 and its lens 11 to flex and bend, stretch and compress when it is impacted. This enables the instrumentation package assembly 7 to resist shock and vibration. Additionally, the corrugated bellows section 9 allows the instrumentation package assembly 7 to act as a spring and compress or expand its length without damaging the contents of the instrumentation package assembly 7. When circumstances arise where the baseball players tend to crush the instrumented baseball home plate, the instrumentation package assembly 7 will compress or expand instead of breaking.

An antenna array relay junction shown in FIG. 30A and FIG. 30B is deployed in the baseball stadium and receives radio signals from the instrumented baseball base's antenna array elements 14, 15, 16 and 17. Antenna array elements 14, 15, 16 and 17 are in quadrature to radiate radio signals to the antenna array relay junction with sufficient gain so as to overcome RF noise and provide for a large enough gain bandwidth product to accommodate real-time SD/HD picture quality requirements. The instrumentation package assembly's network transceiver electronics which is part of 8 also provides a wireless means for the instrumented baseball base to receive command and control radio signals from the remote base station.

The two condenser microphones 5 and 6 enable the viewing audience to hear real-time contacts, impacts and shocks to the instrumented baseball base. Simultaneously live SD/HD TV pictures are taken by the TV camera 2 of its field of view of the live action on the playing field. Condenser microphones have good fidelity for their small size, weight and power consumption. In the future higher quality small sized microphones are likely to become available as the state of the art improves. It is anticipated that we will use these microphones as they become available.

The instrumentation package assembly 7 is filled with a dry pressurized gas 22 like nitrogen to prevent the entry of moisture or dirt into its cavity. The o-ring seal 24 between the bottom lid 19 and the enclosure prevents the dry gas from leaking out of the enclosure. Dry nitrogen gas 22 is inserted into the instrumentation package assembly 7 through gas valve 23. A desiccant is also disposed inside the cavity to collect moisture and prevent any moisture build-up.

The instrumentation package assembly 7 has a removable lid 19 on its bottom to allow access to the contents inside the cavity of the instrumentation package assembly 7. The lid 19 allows access to the battery pack 21 for servicing. The removable lid 19 also allows access to camera 2, camera lens 11, electronics 8, quad antennas 14, 15, 16 and 17, and mechanical actuating device 19 for servicing. The lower inductive coil 10 is attached to the bottom outside of the lid 19. The fiber optics/copper cable connector 18 is attached through the bottom of lid 19. The lid 19 has a gas valve 23 mounted on it to allow dry nitrogen gas 22 to be injected into the cavity to pressurize the enclosure of the instrumentation package assembly after the lid 19 is closed. The purpose of the dry nitrogen gas is to protect the contents of the instrumentation package assembly from moisture. There is an o-ring seal around lid 19 to prevent the pressurized dry nitrogen gas from escaping from the cavity of the instrumentation package assembly 7 enclosure.

The instrumentation package assembly element described in FIG. 19D is assembled into the instrumentation package assembly hub 7 by loading the corrugated bellows enclosure segment 9 with the sealed roller bearing 12 into a mating machined seat in the hub 7. Assembling the instrumentation package assembly element into the instrumentation package assembly hub 7 in this manner assures that the optical/mechanical axis of the instrumentation package assembly element is coincident with the mechanical axis 12. The angular position of the 1st primary mechanical stop is now adjusted to be aligned with the y-axis 1 angular direction on the hub 7. In particular, the 1st primary mechanical stop is set at twelve o'clock in FIG. 19A and then locked in place on the hub 7. The previous alignment procedure assures that camera 2 will now produce precisely centered upright images of any objects that lie along the y-axis 1 in the twelve o'clock direction relative to the hub 7 of the instrumentation package assembly.

The fiber optic/copper s cable connector 18 is offset at a distance of about ¾ of the hub radius from the center of hub 7 at twelve o'clock along the hub's y-axis and is accessible from the bottom of the instrumentation package assembly. The fiber optics/copper cable connector 18 lies along side the instrumentation package assembly element which it is electrically connected to. Prior to the time when the instrumentation package assembly 7 is encapsulated inside the mold of the instrumented baseball home plate, the mechanical/optical axis 17 of the instrumentation package assembly is carefully positioned in the mold, and then aligned normal to the top of the mold. The instrumentation package assembly 7 is then precisely aligned in rotation in the mold about its mechanical/optical axis 17 so that its 1st primary stop is aligned with the y-axis's twelve o'clock direction of the instrumented baseball home plate. The previous alignment procedure assures that the four primary stops of the electro-mechanical actuator inside the instrumentation package assembly are aligned to the vertex, side 14 and side 5 of the instrumented baseball home plate respectively, and that the camera 2 will now produce precisely centered upright images of any objects that lie along the y-axis 1 in the twelve o'clock direction relative to the instrumented baseball home plate. When the instrumented baseball home plate is placed horizontally on the baseball playing field at its traditional location on the baseball diamond, it is then carefully positioned so its y-axis is aligned with the centerline of the baseball diamond running from the instrumented baseball home plate to second base. Now, whenever the cameraman in the remote base station commands the camera 1 to rotate and go to the 1st mechanical stop, the electro-mechanical actuator 20 drives the enclosure against the 1st mechanical stop and locks it there. When using an extremely wide field camera lens, the TV audience will see a picture of the pitcher standing upright on the pitcher's mound of the baseball playing field.

Referring to the Preferred Embodiments Specified in FIG. 19A and FIG. 19B and FIG. 19C, the instrumented baseball home plate instrumentation package assembly satisfies all of the following further objectives:

It is an objective of the present invention not to block, absorb or reflect radio waves that are transmitted or received by the instrumentation package assembly. It is an objective of the present invention that the instrumentation package assembly is composed of a camera, a top induction coil, two microphones, electronics, instrumentation package assembly element, corrugated bellows segment, bottom induction coil, camera lens, camera lens seal, four radio antennas, fiber optics and copper cable connector, bottom lid, electro-mechanical actuating device, battery, dry nitrogen gas, gas valve, and microphone connector. It is an objective of the present invention to provide an instrumentation package assembly an instrumentation package assembly element. It is an objective of the present invention to provide an instrumentation package assembly that can be used to instrument baseball home plates, ice hockey pucks and other sports paraphernalia as well. It is an objective of the present invention to provide an instrumentation package assembly that uses wireless RF radio transmission to televise pictures and sounds from inside sports paraphernalia on the playing field. It is an objective of the present invention to provide an instrumentation package assembly that uses wireless, fiber optics and bi-directional high speed copper network communications cable transmission to televise pictures and sounds from inside instrumented baseball plates on the baseball playing field. It is an objective of the present invention to provide an instrumentation package assembly that is a sealed unit. It is an objective of the present invention to provide an instrumentation package assembly that is a sealed autonomous unit for being mounted inside a baseball home plate and making the instrumented baseball home plate capable of wirelessly televising baseball games from its cameras and microphones, to a remote base station. It is an objective of the present invention to provide an instrumentation package assembly that is a sealed autonomous unit for being mounted inside a baseball home plate and making the instrumented baseball home plate capable of televising baseball games from its cameras and microphones, to a remote base station via a fiber optics communication link and bi-directional high speed copper network communications cable. It is an objective of the present invention to provide an instrumentation package assembly that is a sealed autonomous unit for being mounted inside a baseball home plate and making the instrumented baseball home plate capable of televising baseball games from its cameras and microphones, to a remote base station via a fiber optics communication link and bi-directional high speed copper network communications cable buried in the ground of the baseball playing field and connected to the remote base station via an antenna array relay junction. It is an objective of the present invention to provide an instrumentation package assembly with improved state of the art TV camera technology as it becomes available. It is an objective of the present invention to provide an instrumentation package assembly with all the electronics for wirelessly televising pictures and sounds taken directly by the instrumentation package assembly's camera and microphones and communicating the pictures and sounds from the instrumented baseball home plates on the playing field to a remote base station located near the field for final processing and dissemination. It is an objective of the present invention to provide an instrumentation package assembly with a fiber optics cable link and/or copper cable link buried beneath the ground, and beneath the instrumented baseball home plate, and where the fiber optics cable link and/or copper cable link is connected to the remote base station at its other end, and where the electronics includes the capability to televise baseball games from inside the instrumented baseball home plate to the remote base station via the fiber optics/copper cable link by connecting to the fiber optics/copper cable link using the fiber optics/copper cable connector. It is an objective of the present invention to mount the instrumentation package assembly inside the instrumented baseball home plate using a buffer plate that supports the upper end of the instrumentation package assembly and acts as a bearing for the instrumentation package assembly. It is an objective of the present invention to hear any sounds produced by physical contact of the instrumented baseball home plate with any external thing, including for example air currents felt on the instrumented baseball home plate during the baseball's flight in the air over the instrumented baseball home plate when it is pitched. It is an objective of the present invention to listen for sounds of the game that occur on the baseball playing field above the top of the instrumented baseball home plate and above the ground. It is an objective of the present invention to seal the instrumentation package assembly and fill it with a dry pressurized gas to prevent the entry of moisture or dirt, and dispose a desiccant near the SD/HD lenses and cameras to collect and prevent any moisture build-up within the instrumentation package assembly. It is an objective of the present invention to align the optical axis of the camera perpendicular to the top of the instrumentation package assembly and the instrumented baseball home plate and any other sports paraphernalia that it is mounted into. It is an objective of the present invention that the electronics in the instrumentation package assembly are configured so that the functions of the camera lens such as focus adjustment settings, zoom settings and iris adjustment settings are controlled wirelessly by the cameraman from the remote base station by sending command and control signals from the remote base station to the instrumentation package assembly inside the instrumented sports paraphernalia. It is an objective of the present invention that the electronics in the instrumentation package assembly are configured so that the cameraman sends command and control signals from the remote base station to the instrumentation package assembly to put camera lens settings on automatic under the control of the camera electronics. It is an objective of the present invention that the electronics in the instrumentation package assembly are configured so that the optical and electronic zoom functions of the camera lens are operated by the cameraman by sending command and control signals from the remote base station to the instrumentation package assembly. It is an objective of the present invention that the electronics in the instrumentation package assembly are configured so that the battery's charging coils are wound on the outside at both the top and bottom of the instrumentation package assembly and act electrically as a transformer's secondary windings and keep any heat they may produce away from the contents of the instrumentation package assembly 7 while the battery pack is being charged. It is an objective of the present invention that the electronics in the instrumentation package assembly are configured so that the number of turns in each charging coil is made large enough to inductively couple a sufficient number of magnetic lines of flux from the primary coil of the external battery charging unit so as to charge the battery pack in a reasonably short time before games when the external charging unit is placed on top of the instrumented baseball base. It is an objective of the present invention that the electronics in the instrumentation package assembly be configured with a battery pack which supplies electrical power to each of the elements within the instrumentation package assembly that requires electrical power. It is an objective of the present invention that the antenna array elements are in quadrature to radiate radio signals to the antenna array relay junction with sufficient gain so as to overcome RF noise, and provide a large enough gain bandwidth product to accommodate real-time SD/HD picture quality requirements. It is an objective of the present invention that the corrugated bellows segment be flexible and act to mechanically connect the camera lens, camera and electronics to the main body of the instrumentation package assembly, and permit the instrumentation package assembly elements to be mechanically tilted relative to the z-axis of the main body of the instrumentation package assembly, and be pre-set in place at the time the instrumentation package assembly is encapsulated inside the host sports paraphernalia. It is an objective of the present invention that the corrugated bellows segment is flexible to act as a spring and absorb shocks and compress or expand its length to resist shock and vibration without damaging the contents of the instrumentation package assembly and its elements. It is an objective of the present invention that the condenser microphones enable the viewing audience to hear real-time contacts, impacts and shocks to the instrumented baseball base.

FIG. 19D

The detailed physical elements disclosed in the instrumentation package assembly element's drawing shown in FIG. 19D are identified as follows: 1 is a camera. 2 is the camera lens. 3 is the optical axis of the camera and camera lens. 4 is the lens seal. 5 is the small diameter cylindrical segment of the instrumentation package assembly element enclosure. 6 is the enclosure shoulder. 7 is the top induction coil for recharging the battery pack in the instrumentation package assembly. 8 is the cylindrical segment of the enclosure. 9 is the corrugated bellows segment of the enclosure. 10 is the electronics. 11 is an electro-mechanical actuating device. 12 is a sealed roller bearing. 13 is the electronic package unit for streaming on the internet.

FIG. 19D is a side view of an instrumentation package assembly element.

Referring to drawing FIG. 19D, in a preferred embodiment, an instrumentation package assembly element is disclosed. The instrumentation package assembly element is a primary component of the instrumentation package assemblies which are contained inside the instrumented sports paraphernalia such as the instrumented baseball home plates, instrumented baseball pitcher's rubbers, instrumented ice hockey pucks, instrumented soccer goals, instrumented tennis nets and instrumented ice hockey goals.

The instrumentation package assembly element shown in FIG. 19D is used inside all the instrumented sports paraphernalia such as instrumented soccer goals, instrumented tennis nets, instrumented tennis net posts, instrumented ice hockey goals, instrumented baseball home plates, instrumented pitcher's rubbers, and instrumented ice hockey pucks disclosed in FIG. 1A, FIG. 1B, FIG. 1C, FIG. 3, FIG. 4, FIG. 5, FIG. 6, FIG. 9A, FIG. 9B, FIG. 24A, FIG. 24B, FIG. 25A, FIG. 25B, FIG. 25C, FIG. 25D, FIG. 26A, FIG. 26B, FIG. 26C, FIG. 36A, FIG. 36B, FIG. 36C, FIG. 37A FIG. 37B, FIG. 37C, FIG. 41A, FIG. 41B, FIG. 42A, FIG. 42B, FIG. 42C, FIG. 42D, FIG. 42E.

The instrumented ice hockey pucks are shown in FIG. 1A, FIG. 1B, FIG. 1C, FIG. 9A, FIG. 9B, FIG. 37A FIG. 37B, FIG. 37C.

The instrumented baseball home plates are shown in FIG. 25A, FIG. 25B, FIG. 25C, FIG. 25D, FIG. 26A, FIG. 26B, FIG. 26C, FIG. 41A, FIG. 41B.

The instrumented baseball pitcher's rubber's are shown in FIG. 36A, FIG. 36B, FIG. 36C.

The instrumented soccer goals are shown in FIG. 3, FIG. 4.

The instrumented ice hockey goals are shown in FIG. 5, FIG. 6.

The instrumented tennis nets are shown in FIG. 42A, FIG. 42B, FIG. 42C.

The instrumented tennis net posts are shown in FIG. 42D, FIG. 42E.

The instrumentation package assembly element in FIG. 19D is used in the instrumentation package assemblies shown in FIG. 12A, FIG. 12B, FIG. 12C, FIG. 13A, FIG. 13B, FIG. 13C, FIG. 19A, FIG. 19B, FIG. 19C and FIG. 20A, FIG. 20B, FIG. 20C and FIG. 21A, FIG. 21B, FIG. 21C.

The instrumentation package assembly element in FIG. 19D is used in the instrumented ice hockey pucks shown in FIG. 1A, FIG. 1B, FIG. 1C and FIG. 9A, FIG. 9B and FIG. 19A, FIG. 19B, FIG. 19C and FIG. 37A, FIG. 37B, FIG. 37C.

The instrumentation package assembly element in FIG. 19D is used in the instrumented baseball home plates shown in FIG. 25A, FIG. 25B, FIG. 25C, FIG. 25D and FIG. 26A, FIG. 26B, FIG. 26C and FIG. 41A, FIG. 41B.

The instrumentation package assembly element in FIG. 19D is used in the instrumented pitcher's rubber shown in FIG. 36A, FIG. 36B, FIG. 36C.

The instrumentation package assembly element in FIG. 19D is used in the instrumentation module shown in FIG. 2A, FIG. 2B, FIG. 2C.

The instrumentation module shown in FIG. 2A, FIG. 2B, FIG. 2C is used in the instrumented soccer goals shown in FIG. 3 and FIG. 4.

The instrumentation module shown in FIG. 2A, FIG. 2B, FIG. 2C is used in the instrumented ice hockey goals shown in FIG. 5 and FIG. 6.

The instrumentation module shown in FIG. 2A, FIG. 2B, FIG. 2C is used in the instrumented tennis net shown in FIG. 42A, FIG. 42B, FIG. 42C.

The instrumentation module shown in FIG. 2A, FIG. 2B, FIG. 2C is used in the instrumented tennis net post shown in FIG. 42D, FIG. 42E.

The instrumentation package assembly element contains electronics 10 for televising pictures and sounds wirelessly, as well as all the electronics for televising pictures and sounds using fiber optics/copper cable. An electronics block diagram for FIG. 19D is shown in FIG. 19E.

The instrumentation package assembly element also contains the electronic package unit 13 for streaming the pictures and sounds onto the internet. An electronics block diagram for 13 is shown in FIG. 11A.

The present invention contemplates the instrumentation package assembly element to be equipped with a single TV camera, a single TV camera lens, supporting electronics, one induction coil, a mechanical actuating device and one corrugated bellows segment. The TV camera, TV camera lens, supporting electronics, induction coil and mechanical actuating device and corrugated bellows segment are the primary parts of the instrumentation package assembly element.

The instrumentation package assembly, shown in FIG. 19A and FIG. 19B and FIG. 19C has one of these instrumentation package assembly elements. The instrumentation package assembly, shown in FIG. 20A and FIG. 20B and FIG. 20C has two of these instrumentation package assembly elements. The instrumentation package assembly, shown in FIG. 21A and FIG. 21B and FIG. 21C has four of these instrumentation package assembly elements.

It is understood that the state of the art in TV camera technology is changing rapidly and as it advances there will be other better TV cameras that use other than CCD technology. The present invention will work equally well with them as they become available. Therefore, the present invention uses CCD TV cameras as an example of TV cameras that may be used at this time simply because they are the best that today's technology offers, and is not confined only to their sole use in the future.

An enlarged side view A-A section of just the instrumentation package assembly element of the instrumentation package assembly that is disclosed in FIG. 19A, FIG. 19B, FIG. 19C is shown in FIG. 19D.

The pictures of the game are taken directly by the instrumentation package assembly element camera 1. The video signals from camera 1 are fed to the electronics 10 within the instrumentation package assembly element which communicates the video to the remote base station by either a wireless transmission network or by a fiber optics/copper cable transmission network. Refer to FIG. 30A and FIG. 30B for the wireless transmission network specification, and to FIG. 31A and FIG. 31B and FIG. 32A and FIG. 32B for the fiber optics/copper cable transmission network specification.

The detailed flow of electrical signals and data in the instrumentation package assembly element's electronics 10 is shown in the preferred embodiment given in FIG. 19E and FIG. 19F. The electronics 10 derives its electrical power from a battery pack that is external to the instrumentation package assembly element. The battery packs, like the instrumentation package assembly elements, are principal parts of the instrumentation package assemblies which contains them both.

FIG. 19E is a block diagram that explains the detailed circuitry, flow of electrical signals and data in the general operation of the instrumentation package assembly element electronics used for televising and streaming pictures and sounds, controlling the electrical and mechanical functions within the instrumentation package assembly element, and charging the battery pack. FIG. 19F is a block diagram showing the signals and data flows in the power supply and battery charging circuits inside the instrumentation package assembly element.

The instrumentation package assembly element is a compressed assemblage of all the optical components camera 1 and camera lens 2 that gather TV pictures, and the electronic 10 components that televise the TV pictures and sound, and the electronic package unit 13 used for streaming the pictures and sound onto the internet.

The electronic components 10 and the electronic package unit 13 receive electrical signals from the microphones that are external to the instrumentation package assembly element but housed within the instrumentation package assembly and on the sports paraphernalia. The electronic components 10 and the electronic package unit 13 transmit those sound signals along with the TV picture signals to the wireless transmission network or the fiber optics/copper cable transmission network. The electronics 10 also do all the command and control bi-directional handshaking between the remote base station and the instrumented sports paraphernalia. The electronics 10 also does all the battery pack power control and management. All these functions are done in each of the instrumentation package assembly element's single contiguous enclosure. Details of the electronics package unit 13 are disclosed in FIG. 11A.

The electronics package unit 13 enables the instrumented soccer goals, instrumented ice hockey goals, instrumented tennis nets, instrumented tennis posts, instrumented baseball bases, instrumented baseball home plates and instrumented baseball pitcher's rubbers to communicate with and stream on the internet. The electronics package unit 13 collects video and audio from the cameras and microphones aboard the sports paraphernalia, and channels the video and audio to the antenna for wireless transmission to a Mobile Broadband Tower. The wireless topography for the system is shown in FIG. 11B. 13 also channels the video and audio to hardwire internet cable if it is available. The hardwire internet cable is also shown in FIG. 11B.

The electronic package unit 1 shown in FIG. 11A contains the primary electronics for making streaming video and audio of soccer games, ice hockey games, tennis games and baseball games captured by the instrumented sports paraphernalia used in those games. The soccer goals and ice hockey goals are instrumented using a multiplicity of TV cameras and microphones. For example, the TV cameras 2 and microphones 3 are housed in instrumentation modules which are specified in FIG. 2A, FIG. 2B, FIG. 2C. Audio, video processing and compression modules 4, 5 and 6 respectively are used to buffer, process and compress the captured image and sound information prior to streaming by high-speed terrestrial mobile broadband service unit 7. The instrumentation modules are equipped with electronics package units 1. The electronics package unit contains a high-speed terrestrial mobile broadband service unit 7 and an antenna 8 used to connect the camera(s) and microphones to a publicly accessible internet relay server for the purpose of real-time viewing of the game by audiences using their portable wireless devices—i.e. WIFI enabled Phones, Laptops, Touch Pads, PDA's, etc. The electronics package unit contains a minimum of one high definition video camera 2 and one microphone 3 whose captured video and audio, following suitable H.264/MPEG compression by 4, 5 and 6 respectively, is buffered and subsequently sent to an active broadband connection established using for example Mobile Broadband Hotspot Hardware Technology.

The system conveys high definition video and multi-dimensional audio captured by the microphones mounted within and attached on and to the goals, to an audience which may or may not be spectator present at the game but wish to subscribe and view the game remotely on their personal wireless display devices.

The electronics package unit communicates wirelessly with a 4G/LTE or better equivalent Mobile Broadband Tower operating on the 1700 and/or 1900 MHz Frequency Band within a three to five bar signal strength radius of the desired site local to the Field of Play. The same Mobile Broadband Tower that is used to intercept the captured streams from the electronics package unit is also used simultaneously to supply the wireless internet access needed by spectators present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the field/rink/court of play in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given field/rink of play currently broadcasted. Alternately, an operator seated in front of a display console located either at the field/rink of play or the relay server will have the ability to select which cameras and/or microphones are associated with which streams prior to broadcast. Commercial content material insertion i.e. sports sponsor's advertisements and announcements and other insertions are also available at the discretion of the operator.

The instrumentation package assembly element enclosure is essentially a short cylinder about one inch or more long that is comprised of three sections. The first section is a small diameter cylinder 5 that contains the camera lens 2. The second section is a larger diameter cylinder 8 that contains the camera 1. The shoulder section 6 connects 5 and 8. The third section is a corrugated bellows segment 9 that contains the electronics 10. The electronics 10 are mounted on a common multilayer printed circuit board down the center of the instrumentation package assembly element. The third section 9 is connected to a sealed air tight roller bearing 12. All the section connections are air tight including the roller bearing 12. When the instrumentation package assembly element is mounted into a mating seat in any one of the instrumentation package assemblies specified in FIG. 19A, FIG. 19B, FIG. 19C and FIG. 20A, FIG. 20B, FIG. 20C and FIG. 21A, FIG. 21B, FIG. 21C, the instrumentation package assembly element is air tight. It is then pressurized with a dry gas like dry nitrogen in order to keep out dirt and moisture.

The instrumentation package assembly element enclosure is made strong to protect its contents from shock and vibration and resist being crushed. Material examples such as polycarbonates, ABS and fiber reinforced plastics are used in its construction.

The camera 1 is a HD TV CCD sensor arrayed camera. The camera 1 uses a camera lens 2 which images objects along the camera's optical axis and line of sight 3 onto the camera's CCD sensor array. There is a rubber O-ring seal 4 between the camera lens 2 and the instrumentation package assembly element's enclosure 5. 5 is the small diameter cylindrical end segment of the instrumentation package assembly element's cylindrical enclosure.

The enclosure has a sealed roller bearing 12 attached to the corrugated bellows segment 9 of the enclosure. The sealed roller bearing 12 permits the entire enclosure to rotate around its axis 3. The enclosure houses the camera lens 2, camera 1, and electronics 10. The electro-mechanical actuator 11 precisely rotates the camera 1 and its letterbox shaped CCD sensor array around its picture frame's center about the optical/mechanical axis 3 of the camera 1 and its lens 2. The electro-mechanical actuator 11 precisely rotates the entire enclosure containing the camera and its lens around its mechanical axis 3. Camera 1 and camera lens 2 have optical axis 3. Therefore, when the electro-mechanical actuator 11 rotates the enclosure, it rotates the camera 1 and its lens 2 together inside the enclosure as a unit around their optical/mechanical axis 3. The electro-mechanical actuator 11 has a sequence of eight precision detented mechanical stops that are forty-five degrees apart positioned sequentially around the axis 3.

The electro-mechanical actuator 11 is powered electrically by the electronics 10 to servo on command to any one of the eight detented mechanical stops. The cameraman in the remote base station controls the electro-mechanical actuator 11. The cameraman controls which of the eight detented mechanical stops the electro-mechanical actuator 11 rotates the camera 1 and lens 2 to, and then stops at. An example of the electro-mechanical actuation mechanism 11, which physically rotates the camera and camera lens together, is a geared micro-motor drive with indexed micro switch stops. An alternate example of an electro-mechanical actuation mechanism is the relay-ratchet. In either case, smooth precise rotation about axis 3 is achieved using the sealed precision roller bearing 12 which is attached to the corrugated bellows 9 end of the instrumentation package assembly element's enclosure.

Four of the eight mechanical stops are primary mechanical stops and are set precisely ninety degrees apart from one another around the optical and mechanical axis 3. The remaining four mechanical stops are secondary stops and are positioned at forty-five degrees between the primary stops.

The primary mechanical stops are electronically labeled and recorded in memory in counter-clockwise order as the 1st, the 3rd, the 5th and the $7^{th}$ primary stops. The secondary mechanical stops are electronically labeled and recorded in memory in counter-clockwise order as the 2nd, the 4th, the 6th and the 8th secondary stops. The labeling of these mechanical stops assists the software in the remote base station to know precisely how the camera images are rotationally oriented in space relative to reference points in the instrumentation package assembly element, instrumentation package assembly, and the instrumented baseball home plate.

The camera 1 is positioned in rotation inside the cylindrical enclosure segment 8 so that the line of its vertical pixels that run through the precise electronic image center of the CCD sensor array picture frame will align precisely with the 1st primary mechanical stop.

The sealed precision roller bearing 12 is used to connect and seat the instrumentation package assembly's element into the main central hub of the instrumentation package assembly. The sealed roller bearing 12 is used to seal the joint between the corrugated bellows 9 and the main central hub of the instrumentation package assembly. The sealed bearing 12 holds pressurized dry nitrogen gas inside the instrumentation package assembly element, and prevents dirt and moisture from entering its cavity which might damage its contents. The bearing 12 rotation axis is made coincident with the optical/mechanical axis 3 of camera 1 and camera lens 2. Elsewhere in the present invention, the instrumentation package assembly's element's small diameter cylindrical ends of the enclosure 5 are shown plugged into a buffer plate assembly. Also elsewhere in the present invention, the instrumentation package assembly's element's are also shown attached at their corrugated bellows' open end 13 to the hub of their instrumentation package assembly. The small diameter cylindrical end 5 allows the camera lens 2 to peer through the buffer plate assembly when 5 it is plugged into and mounted in the buffer plate assembly.

The top induction coil 7 is wound around the outside of the large diameter cylindrical section 8 of the enclosure close to the enclosure's upper end, to put it in close proximity to the top of the instrumented baseball home plate and instrumented ice hockey puck to improve its magnetic coupling efficiency with the battery pack charging unit. Also, the top induction coil 7 is wound around the outside of the large diameter cylindrical section 8 of the enclosure to minimize the heat flow into the enclosure that is generated in its turns while the battery pack is charging. The top induction coil 7 is wired to the electronics 10 inside the enclosure which handles battery charging and power management. The purpose of induction coil 7 is to act as an air core secondary winding to magnetically couple to the time varying lines of flux introduced from the primary winding of the battery pack charging unit which is placed flat on top of the instrumented baseball home plate and instrumented ice hockey puck while charging the battery pack. The battery pack charging unit is disclosed in FIG. 23A and FIG. 23B and FIG. 23C.

The electronics 10 is also wired to the lower induction coil (not shown) which is not a part of the instrumentation package assembly element. The lower induction coil is mounted on the outside of the access lid heat sink of the instrumentation package assembly and is external to the instrumentation package assembly element. The lower induction coil is also used to charge the battery pack. For example, the lower induction coil is shown in FIG. 19B and FIG. 19C.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

The functions of the camera lens 2 such as zoom, focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lens 2 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions.

Referring to the Preferred Embodiments Specified in FIG. 19D, the instrumentation package assembly element satisfies all of the following further objectives:

It is an objective of the present invention that the instrumentation package assembly element be composed of one camera, one camera lens, one lens seal, one small diameter cylindrical enclosure segment, one enclosure shoulder, one top induction coil, one cylindrical enclosure segment, one enclosure corrugated bellows segment, one electronics, one electro-mechanical actuating device, and one sealed roller bearing. It is an objective of the present invention for the instrumentation package assembly element to act as a common building block for construction of all the instrumented baseball home plate's instrumentation package assemblies, all the instrumented baseball pitcher's rubber's instrumentation package assemblies, and all the instrumented ice hockey puck's instrumentation package assemblies. It is an objective of the present invention to make images of objects that appear below the center of the TV picture frame, appear upright to the TV viewing audience. It is an objective of the present invention for the instrumentation package assembly element to align and provide a stable mounting means for its optical, electronic and mechanical components.

It is an objective of the current invention to provide a means to hold the cameras inside the instrumentation package assembly to look out from the top of the instrumentation package assembly. It is an objective of the current invention to provide a means to prevent moisture and dirt from entering the instrumentation package assembly. It is an objective of the current invention to provide a means to prevent damage to the instrumentation package assembly from dirt, moisture and debris encountered during baseball games and ice hockey games. It is an objective of the current invention to provide a means to isolate the instrumentation package assembly from the shock and vibration encountered by the instrumentation package assembly during baseball games and ice hockey games. It is an objective of the current invention to provide a means to align and hold the instrumentation package assembly inside the instrumented baseball home plate, instrumented baseball pitcher's rubber, and instrumented ice hockey puck. It is an objective of the current invention to provide straightforward access to permit servicing of the component parts of the instrumentation package assembly. It is an objective of the present invention to provide the instrumentation package assembly with a means to mechanically mount and be aligned to a buffer plate. It is an objective of the present invention to instrument sports paraphernalia such as footballs, basket balls, soccer balls, volleyballs, hockey pucks, baseball's 1st and 2$^{nd}$ and 3rd bases and home plates, baseball pitcher's rubbers, etc. It is an objective of the present invention that the instrumentation package assembly must be made physically small so it can be mounted inside sports paraphernalia without changing the appearance or functionality of the sports paraphernalia to the players and field crews. It is an objective of the present invention to produce an instrumented baseball home plate having substantially the same weight, balance, appearance and playing qualities of a conventional professional league baseball home plate, so as to be accepted by the leagues and qualify it to substitute for conventional professional league home plates in the game. It is an objective of the present invention to provide a means to wirelessly transmit pictures and sounds, from sports paraphernalia used on the field of play during major league games, sports events and training sessions, to a remote base station. It is an objective of the present invention to provide a means to wirelessly transmit pictures and sounds, from sports paraphernalia used on or off the field of play during sports events, training sessions, demonstrations, and promotions to a remote base station. It is an objective of the present invention to provide a means to transmit pictures and sounds of the game by fiber optics/copper cable buried in the baseball field, from sports paraphernalia used on the field of play during major league games, sports events and training sessions, to a remote base station. It is an objective of the present invention to enable the camera and other components within the instrumentation package assembly to be protected from the hazards on the baseball playing field such as ice, snow, rain, dirt and physical impacts. It is an objective of the present invention that the packaging design used to mount the electronic components inside the instrumentation package assembly element be as light-weight as possible. It is an objective of the present invention to arrange the instrumentation package assembly elements in pairs to make 3-D stereo camera pairs. It is an objective of the present invention to hold the interpupillary distance, of the optical and mechanical axes of each 3-D stereo camera pair to a value suitable for a 3-dimension format needed by the TV viewing audience.

FIG. 19E

The detailed physical elements disclosed in the instrumentation package assembly element's signal and data electronics block diagram shown in FIG. 19E are identified as follows: 1 is a high definition camera. 2 is a condenser microphone. 3 is a video MPEG encoder. 4 is an audio operational amplifier. 5 is an audio MPEG encoder. 6 is a random access memory. 7 is a microprocessor. 8 is a power control switch. 9 is a power regulator. 10 is an RF antenna phasing and impedance matching module. 11 is a firmware read only memory. 12 is an MPEG stream encoder. 13 is a network transceiver. 14 is a dc power over fiber line interface. 15 is a dc power from fiber optics/copper port. 16 is a battery recharging and data isolation network. 17 is a 250 kHz tuning capacitor. 18 is a rechargeable battery. 19 is an induction coil interface. 20 is a fiber optics/copper line driver interface. 21 is a main image, sound and RF components. 22 is a control, power supply and battery charging components. 23 is an RF feed line to the antenna assembly of the instrumentation package assembly for televising. 24 is a fiber optic feed line to fiber optic receptacle. 25 is a camera position actuator. 26 is a camera position driver. 27 is an actuator mating plug. 28 is an actuator mating receptacle. 29 is a 250 kHz induction coil. 30 is a condenser microphone. 31 is a condenser microphone. 32 is a condenser microphone. 33 is a condenser microphone. 34 is the camera output plug. 35 is the camera output plug mating receptacle. 36 is the electronic package unit for streaming onto the internet. 37 is an RF feed line to the antenna assembly of the instrumentation package assembly for streaming.

FIG. 19E is the instrumentation package assembly element's signal and data electronics block diagram.

Referring to drawing FIG. 19E, in a preferred embodiment, the instrumentation package assembly element's signal and data electronics are disclosed. The instrumentation package assembly element is specified in FIG. 19D. The instrumentation package assembly element shown in FIG. 19D is used in the instrumented sports paraphernalia such as the instrumented baseball home plates, instrumented baseball pitcher's rubbers, instrumented ice hockey pucks, instrumented soccer goals and instrumented ice hockey goals.

Referring to drawing FIG. 19E, in a preferred embodiment, the instrumentation package assembly element electronics is disclosed. The instrumentation package assembly element is specified in FIG. 19D.

Camera 1 is a Hi-Definition 1080i CCD Camera, whose output is a broadcast grade HD-SDI format signal. In this embodiment this 1 has a native 16:9 letter-box aspect ratio. The signal of 1 is fed to the input of video MPEG encoder compression hardware 3. 1 is also equipped with an auto-focus/iris feature set that can be over-ridden by commands from the system CPU 7 in turn issued by the remote base station system software. During game play 1 is used to capture the action occurring around either end of the instrumented baseball base or instrumented home plate and convey these captured pictures and sounds via MPEG stream encoder 12 and network transceiver 13 to the remote base station for further processing. Compression hardware 3 is a real time H.264 MPEG compression hardware module.

Compression hardware module 3 compresses the signals inputted to them from 1 into MPEG format using the H.264 Protocol and provides an elementary MPEG stream to the input of MPEG stream encoder 12. Compression is needed to reduce the bandwidth requirements prior to transmission via radio using network transceiver 13. Compression hardware module 3, also receives commands from the CPU 7, which set the compression parameters associated with the H.264 protocol. Alternatively camera 1 may contain part of or all the functions of compression hardware module 3 as part of their own internal circuitry, thus saving some board space during manufacturing, in which case the additional control commands from CPU 7 would be sent directly to cameras 1 in-lieu of compression hardware module 3.

Remote rotational movement of the camera 1 about its y-axis is achieved by actuator 25. Actuator 25 in turn receives a set of instructions from microprocessor 7 via actuator driver 26 whenever a positioning command is received by 7 from the remote base station. 25 operates in the form of a closed-loop servo mechanism and is equipped with an encoder to convey its instantaneous position information to the remote base station via 7, thus enabling the remote base station to know the physical position of the camera 1 relative to its point of mounting within the instrumented baseball home plate. 25 is connected to 7 via an actuator mating plug 27 and actuator receptacle 28.

A set of three condenser microphones, 2, 30 and 31 are shown in FIG. 19E located inside the instrumented baseball home plate. Their purpose is to capture the ambient sounds of players around the baseball base or home plate as well as the sound of players striking or sliding into the instrumented baseball base or instrumented home plate itself. These microphones used during game play serves as the signal source for operational amplifier 4. 4 is configured as a low noise high gain microphone pre-amplifier. 4 amplifies the signals inputted from the condenser microphones and provides adequate voltage gain and equalization to drive the analog to digital converters inside MPEG Audio Encoder 5. which further combines the resultant elementary audio data packets into a single stream and applies them to MPEG stream encoder 12 where they are combined with the MPEG stream supplied by 3 prior to transmission to the remote base station by 13.

13 is a network transceiver. This transceiver is inputted composite encapsulated MPEG Stream image and audio data from 3 and 5 along with system control status data packets from system control microprocessor 7. Network transceiver 13 then transmits this data, for example, using the 802.11(xx) protocol via the unlicensed 2.4 or 5.8 GHz radio spectrum via radio using 13 and an antenna located within the instrumentation package assembly of the instrumented baseball base or instrumented home plate to the remote base station, 13 also outputs control commands from the remote base station when they are received by this antenna via the unlicensed 2.4 or 5.8 GHz radio spectrum. These control commands are inputted to 7. 7 is used to control the flow of system command functions. These command functions are used to adjust the operating parameters of the system based on instructions that it receives from the remote base station.

Additionally, 13 will also communicate and convey high quality picture and sound information data packets along with the aforementioned system control commands over a fiber optic and/or copper cable connection via fiber optics/copper line driver interface 20 via a fiber optic feed line 24 which is interconnected with a fiber optic receptacle located on the bottom of the instrumented baseball base or instrumented home plate. Use of such a fiber optic connection between the instrumented baseball base or instrumented home plate completely eliminates bandwidth and/or interference issues that are sometimes encountered with a solely RF based system. Stadium owners can also benefit by using fiber optic connectivity since it permits easier future systems upgrades.

System command function instructions can alternately be received by 7 from battery charging and stand-by data separator circuit 16. This is needed to allow initialization of the instrumentation package inside the instrumented baseball base or instrumented home plate. 7 utilizes an operating firmware stored at the time of manufacture on system ROM 11 and executes this firmware upon loading system RAM 6 with its contents. 13 is a network transceiver. 13 is used to provide a wireless RF link operating on the unlicensed 2.4 or 5.8 GHz radio spectrum between the instrumented base or instrumented home plate and the remote base station, utilizing, for example, the 802.11(xx) Protocol. 13 transmits MPEG stream data packets from 12 and also transmits and receives control commands from system control microprocessor 7. These control commands specify the exact RF channel frequency, RF channel power output and antenna phasing via an impedance matching and phase shift network 10 when an instrumented baseball base or instrumented home plate equipped with a phased antenna array is being used.

Signals traveling to and from 13 as RF signals are coupled, via an RF feed line 23 and impedance matching network 30, to the atmosphere by an antenna system located within the instrumented baseball base or instrumented home plate. This antenna system, operating within the unlicensed 2.4 or 5.8 GHz radio spectrum, provides an isotropic gain of 3 db or better is used to capture and radiate the RF energy transmitted and/or received between the remote base station and an instrumented baseball base or instrumented home plate so equipped with an instrumentation package assembly.

The instrumentation package assembly utilizing a phased antenna array is shown. A phased array is desirable since it permits a finite adjustment of the transmitted and/or received RF propagation pattern such that an optimum RF path between the remote base station and the instrumented home plate is maintained. This allows interference issues which can occur in some stadiums to be resolved.

Power supply regulator 9 supplies power to all the elements showed in FIG. 22D. 9 receives power from a rechargeable battery pack 18 located within the instrumentation package assembly. In a preferred embodiment, a lithium ion battery pack is used because of the heavy current requirements expected during the length of time of a typical baseball game. Alternately 9 can receive dc power from a dc power port of a fiber optics/copper receptacle located on the bottom of the instrumented baseball base or instrumented home plate via fiber optics/copper dc power interface 14 and dc power feed line 15 from the aforementioned fiber optics/copper receptacle.

The rechargeable battery pack 18 delivers 3.3 volt dc to 9 which in turn supplies power to all the elements shown in FIG. 22D. However, to ensure long battery life, the main functional electronic components shown within the boundaries of dotted lines 21 receive dc power in a reduced state or can be switched off.

The control, power supply and battery charging electronic components within the dotted line boundaries of 22, receive dc power from 18 whenever 18 is sufficiently charged to place the components of 22 into a steady stand-by state.

The instrumentation package assembly also contains a set of inductive pickup coils 29 that are used to couple electrical energy from outside of the instrumented baseball base or instrumented home plate via induction coil interface 19 to the aforementioned battery pack during the recharging of the battery pack via battery charging and stand-by data separator circuit 22. The aforementioned inductive pickup coil is tuned by a capacitor 17 so as to resonate at a frequency near 250 kHz. 22 contains a switching circuit 8 that receives control commands from system control microprocessor 7. These commands instruct and enable 22 to supply power to the rest of the electronic components that comprise FIG. 22D. These commands take 9 out of the stand-by mode and put it in the power-on mode.

The instrumented ice hockey puck disclosed in FIG. 37A and FIG. 37B and FIG. 37C uses the instrumentation package assembly shown in FIG. 21A and FIG. 21B and FIG. 21C. The instrumentation package assembly shown in FIG. 21A and FIG. 21B and FIG. 21C uses four of the instrumentation package assembly elements shown in FIG. 19D. The instrumentation package assembly elements shown in FIG. 19D use gyroscopic transducers which are specified in the present electronics block diagram FIG. 19E.

A detailed example of the operation of the gyroscopic transducers follows as applied to instrumented ice hockey pucks. Referring to FIG. 19E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis.

Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software.

The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station.

Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

For example, when the instrumented ice hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software.

During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game.

The cameraman, in the remote base station, software selects either the wireless mode of communication, and/or the fiber optics/copper cable mode of communication between each of the instrumented sports paraphernalia and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia. Refer to FIG. 30A and FIG. 30B, and FIG. 31A and FIG. 31B, and FIG. 32A and FIG. 32B, and FIG. 35A and FIG. 35B and FIG. 35C and elsewhere in the present invention for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium/arena.

These commands, when intercepted by the network transceiver 13 within the instrumented sports paraphernalia are applied to its microprocessor 7, which then in turn upon executing the instructions stored within the contents of its firmware 6 applies a pulse coded control signal via the power and control interconnect interface 21 inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface 21 as shown in FIG. 19E, which is represented by dotted lines, consists of the electrical control wiring to and from the electronic components of the instrumented sports paraphernalia that are being controlled.

Referring to the Preferred Embodiment Specified in FIG. 19E, the instrumentation package assembly element signal and data electronics satisfies all of the following further objectives:

It is an objective of the present invention that the instrumentation package assembly element electronics be composed of a high definition camera, three condenser microphone inputs, a video MPEG encoder, an audio operational amplifier, an audio MPEG encoder, a random access memory, a microprocessor, a power control switch, a power regulator, an RF antenna phasing and impedance matching module, a firmware read only memory, an MPEG stream encoder, a network transceiver, a dc power over fiber line interface, dc power from a fiber optics/copper port (if available), a battery recharging and data isolation network, a 250 kHz tuning capacitor, a rechargeable battery pack, an induction coil interface, a fiber optics/copper line driver interface, main image-sound and RF components, a control, power supply and battery charging components, an RF feed line to antenna assembly, a fiber optic feed line to fiber optic receptacle, a camera position actuator, a camera position driver, an actuator mating plug, an actuator mating receptacle, and a 250 kHz induction coil, and power and control interconnect interface.

FIG. 19F

The detailed physical elements disclosed in the instrumentation package assembly element power supply and battery charging circuits electronics drawing shown in FIG. 19F are identified as follows: 1 is an induction coil interface. 2 is an impedance matching data and power isolation network. 3 is a battery charging circuit. 4 is a 250 kHz data modem. 5 is a dc power bus. 6 is a rechargeable lithium ion battery pack. 7 is a power supply regulator circuit. 8 power control switch. 9 is a power control data bus. 10 is a microprocessor. 11 is a read only memory. 12 is a communications data bus. 13 is a status information data bus. 14 is a system control data bus. 15 switched dc power bus. 16 switched components block. 17 is a dc power receptacle within fiber optic jack assembly. 18 is a 250 kHz induction coil.

FIG. 19F is a block diagram of the instrumentation package assembly element power supply and battery charging circuits electronics.

Referring to drawing FIG. 19F, in a preferred embodiment, the instrumentation package assembly element power supply and battery charging circuits electronics are disclosed.

FIG. 19F shows a light-weight air core induction coil 1 located onboard the instrumentation package assembly. 1 is wound of only a few turns of a relatively small gauge magnet wire with sufficient capacity to handle the required current to recharge the batteries also onboard the instrumentation package assembly with minimal temperature rise.

Impedance matching diverter 2 is connected to 1 forming a parallel resonant tank circuit tuned to approximately 250 kHz. When the instrumentation package assembly is placed near a recharging station such that coil 1 is subject to the intense magnetic flux created by the coil within the recharging station, 2 will supply magnetically coupled electrical power from the recharging station via 1 and 2 to battery charging circuit 3. In addition, 2 also conveys a packet of administrative and control data signals between the recharging station, via 1 and 2, and Data transceiver 4. Furthermore, 2 includes a high-stability fail-safe protection circuit which prevents 4 from being catastrophically destroyed by the high voltage present across 1 that is necessary during a typical recharging cycle. Circuits 1, 2 and 3 are so arranged that whenever the baseball base or home plate containing the instrumentation package assembly is not placed or is improperly placed on the recharging station or is being used in a game, the circuits comprised of 1, 2 and 3 do not present an electrical load on 7. This feature set also ensures the longest possible life of the battery during idle periods of no-use by not permitting unnecessary loading of 7 by 1, 2 and 3

In the event that the voltage level appearing at battery bus line 5 has fallen below the charging set-point threshold of 3, charging of rechargeable battery 6 will begin to commence automatically as charging current is applied to 6 via 3 and 5 whilst the instrumentation package assembly is placed near to an active recharging station.

As the back voltage detected by 3 appearing at 6 rises abruptly above a set-point threshold of 3, charging current is automatically reduced to prevent over-charging of the batteries, this also protects the remainder of the system 16 from damage due to over heating while its batteries are charging.

Throughout a recharging cycle, main power supply 7, microprocessor 10 and 4 also receive dc power from 3 via 5 so as to avoid any unnecessary battery consumption until charging is complete.

Whenever dc power is supplied to 7 via 5, power to the remaining hardware 16 will remain in an off-state until a turn-on command is received by main power supply switch 8 from 10 via main power control data bus line 9. This will in turn cause 8 to energize Switched Power Bus 14 and begin supplying regulated DC power to the rest of the instrumentation package 16. 8 will continue to supply such power until 8 receives a shutdown command from 10 via 9 or a failure of 6 occurs. As long as 8 is keeping 14 active 10 may issue commands to 16 via bi-directional Instrumentation Package Control Data Bus Line 15. 15 is also used to collect status information about 16 including modes of failures which may occur throughout the use of the instrumentation package assembly. These failures in turn cause software parameters of 10 stored within 11 to be executed by 10 and communicate these fault indications back to the base station. Such indications are intended to alert personnel of the fault condition which might otherwise result in an embarrassment to personnel i.e.: an aging battery in need of recharging.

Each instrumentation package assembly is equipped with a unique identification code and operating firmware embedded in the read only memory 11 areas of 10. As soon as power to 10 via 5 becomes available initialization of 10 is commenced loading this id code and operating firmware into 10 via 11. Once this initialization of 10 is complete, synchronization of 4 with the recharging station's onboard data transceiver begins, via data transceiver bus line 12, thereby establishing an administrative and control data link between 10 and the recharging station's human interface panel via 1, 2, 3, 4 and 12 respectively.

The overall rate and length of time at which 3 will continue to supply charging current and hence recharge the batteries within the instrumentation package assembly is dependent on the specific rating and initial condition of the battery, and the entries made in the user adjustable settings menu of the recharging station's human interface panel based on the operating parameters contained in 11 transferred to the microprocessor onboard the recharging station during synchronization of 4 as previously described.

As soon as a typical charging cycle is commenced, continuous fail-safe monitoring data of the charging current and voltage supplied by 3 is sent to 10 via Power control data bus line 13. If at any time a problem develops during a charging cycle that could result in catastrophic destruction of the instrumentation package assembly, batteries and/or the recharging station, a total system shutdown sequence is initiated and personnel advisory warning displayed on the recharging station's human interface panel, thereby removing power and safeguarding the hardware as described.

While an instrumentation package assembly is properly placed in the recharging station a series of self diagnostic and power consumption tests may be performed on 16. The results of which are forwarded to the human interface panel of the recharging station via 1, 2, 4, 10 and 11 respectively and are useful to personnel in evaluating the instrumentation package assembly's overall condition prior to its use in a game.

Since a finite number of instrumented sports paraphernalia equipped with instrumentation package assemblies may be in play on the playing fields at any one time, a means of cataloging and archiving the charge, recharge, usage, power consumption and diagnostic testing cycles associated with each is provided by 10 via 11. This information is available to personnel via the human interface panel on the recharging station upon command from personnel and furthermore may be stored by a Personal Computer connected to the data logging port of the recharging station charging the base or plate(s) concerned. As previously described, each instrumented sports paraphernalia instrumentation package assembly contains a unique identification number; therefore the book-keeping for each is independent respectively.

After 6 has assumed a full and complete charge, the instrumentation package assembly is placed into a powered-off state and except for a very small stand-by current through 4 and 10, battery consumption is minimized until future use is desired.

Prior to using the instrumentation package assembly in a game, 8 must be activated in order to supply dc power to 16. Upon receiving a power-on command from 10 via 9 and 10 will take 8 out of the power-off state thus allowing 7 to supply dc power to 16.

Invocation of the power-on command by 10 may be accomplished by either of two methods: Firstly, if the instrumentation package assembly concerned is properly placed on a recharging station, its human interface panel may be used to invoke a power-on command sequence to 10 via 1, 2, 4 and 12 respectively. Secondly, the hand-held remote control device may be placed near to an instrumentation package assembly to invoke this command to 10 via 1, 2, 4 and 12 if desired.

Activation of 8 by either method places the entire instrumentation package assembly into a fully powered-on state and may then be synchronized with the base station hardware, tested and subsequently utilized in a base or plate game.

While the instrumentation package assembly is in a fully powered on state and not placed in the recharging station i.e. it is being used in a real game, administrative data, Identification code and control signals along with photographic image and sound accompaniment will be transmitted and available to the base station hardware.

If throughout a game, a low battery condition, power supply or any other technical fault develops, 7 via 13 will cause 10 to transmit an appropriate warning message to the base station's human interface display via the 802.11(x) transceiver in 16.

False signaling and invocation of the instrumentation package assembly by other nearby potential sources of interference is avoided by the decoding algorithm stored in 11 and used by 10 when communicating critical information over either of the two distinct administrative and control data link techniques utilized by the base or plate camera instrumentation package. Until 6 falls to a low level set-point threshold within 7, The instrumentation package assembly will remain in a fully powered-on state unless 7 is de-activated via 8 after a shutdown sequence is issued by a power-off command from 10. To preserve the life of 6, upon completion of its use, i.e. at the end of a game, the instrumentation package assembly should be placed into a powered-off state by causing 10 to issue a power-off signal to 7 via 8 and 9.

This may be accomplished in one of several methods: Firstly using the human interface hardware, display and software at the base station, personnel may transmit and invoke a power-off command to 10 via the 802.11(x) administrative and control data link of 16 via 13. Secondly, the field personnel of a typical game may wish to conclude the operation of the instrumentation package assembly by placing the hand-held remote control near the instrumentation package assembly and depressing the power-off key on the human interface panel of said remote control invoking a power-off command to 10 via 1, 2, 3, 4 and 12 respectively.

Finally, personnel may place certain instrumented sports paraphernalia into the cradle of the recharging station. As described previously, whenever a instrumented sports paraphernalia is properly placed into the cradle of an active recharging station the instrumentation package assemblies are automatically put into a powered-off state unless otherwise instructed by personnel using the human interface panel of the recharging station concerned whenever 4 is synchronized with the recharging station via 1, 2 and 3.

Confirmation in any of the methods just described that the instrumentation package assembly has indeed been placed into a powered-off state is assured to personnel by both visual and audible indication from the human interface concerned when 10 via 1, 2, 3, 4 and 12 acknowledges receipt and execution of the power-off invocation.

Referring to the Preferred Embodiments Specified in FIG. 19F, the Instrumentation Package Assembly Element Power Supply Electronics Satisfies all of the Following Further Objectives:

It is an objective of the present invention that the instrumentation package assembly element power supply electronics be composed of an induction coil interface, an impedance matching data and power isolation network, a battery charging circuit, a 250 kHz data modem, a dc power bus, a rechargeable battery pack, a power supply regulator circuit, power control switch, a power control data bus, a microprocessor, a read only memory, a communications data bus, a status information data bus, a system control data bus, switched dc power bus, switched components block, a dc power receptacle within fiber optic jack assembly, and a 250 kHz induction coil.

FIG. 20A and FIG. 20B and FIG. 20C

The detailed physical elements disclosed in the instrumentation package assembly drawing shown in FIG. 20A and FIG. 20B and FIG. 20C are identified as follows: 1 is the y-axis of camera 3. 2 is a camera. 3 is a top induction coil for charging the battery. 4 is the x-axis of symmetry of the instrumentation package assembly. 5 is a microphone. 6 is a microphone. 7 is the instrumentation package assembly. 8 is the electronics. 9 is the instrumentation package assembly element showing the corrugated bellows segment. 10 is a bottom induction coil for charging the battery pack 34. 11 is a camera lens. 12 is the optical axis of camera 2. 13 is a camera lens. 14 is a radio antenna. 15 is a radio antenna. 16 is a radio antenna. 17 is a radio antenna. 18 is the instrumentation package assembly element showing the corrugated bellows segment. 19 is a bottom induction coil for charging the battery pack. 20 is the bottom lid heat sink of the instrumentation package assembly. 21 is a camera lens. 22 is a camera lens seal. 23 is a camera. 24 is the y-axis of symmetry of the instrumentation package assembly. 25 is the y-axis of camera 23. 26 is a top induction coil for charging the battery. 27 is the electronics. 28 is the z-axis of symmetry for the instrumentation package assembly. 29 is the optical axis of camera 23. 30 is the bottom of the instrumentation package assembly. 31 is the fiber optics/copper cable connector. 32 is a camera and camera lens actuating device. 33 is a camera and camera lens actuating device. 34 is the battery pack. 35 is dry nitrogen gas. 36 is a gas valve. 37 is the microphone connector. 38 is a microphone. 39 is a microphone.

FIG. 20A is a top view of the two-camera and fiber optics/copper instrumentation package assembly.

FIG. 20B is a side view of the two-camera wireless instrumentation package assembly.

FIG. 20C is a side view of the two-camera wireless and fiber optics/copper cable instrumentation package assembly.

Referring to drawings FIG. 20A and FIG. 20B and FIG. 20C, two different instrumentation package assembly preferred embodiments are disclosed. The only difference between the two embodiments is that one has wireless capability only, whereas the other has both wireless and fiber optics/copper cable capabilities. The one that has wireless capability only is cheaper to produce than the one that has both wireless and fiber optics/copper cable capabilities thereby giving it a cost advantage for venues with lower budgets, like for example some colleges and high schools. The one with both wireless and fiber optics/copper cable capabilities have better bandwidth and lower noise.

The present invention contemplates each instrumentation package assembly embodiment to be equipped with two TV cameras, two TV camera lenses, two microphones, two supporting electronics, one battery pack, four induction coils, two mechanical actuating devices and four antennas.

Each of the instrumentation package assembly preferred embodiments each contains two instrumentation package assembly elements disclosed in FIG. 19D. The single TV camera, single TV camera lens, supporting electronics, induction coil, mechanical actuating device and corrugated bellows segment are the parts of the instrumentation package assembly element disclosed in FIG. 19D which is a primary part of the instrumentation package assembly.

The instrumentation package assembly is used to instrument the baseball home plate by mounting it inside the baseball home plate. A baseball home plate instrumented with an instrumentation package assembly is referred to as an instrumented baseball home plate.

The present invention contemplates the instrumentation package assembly to be equipped with two TV cameras, two TV camera lenses, two microphones, and four induction coils, two mechanical actuating devices, supporting electronics, a battery pack and four antennas. The instrumentation package assembly has two instrumentation package assembly elements. The instrumentation package assembly element is disclosed in FIG. 19D. The TV camera, TV camera lens, supporting electronics, one induction coil and mechanical actuating device are the primary parts of each of the instrumentation package assembly elements.

The preferred embodiment shown in FIG. 20B televises its pictures and sounds using wireless transmission. The alternate preferred embodiment shown in FIG. 20C televises its pictures and sounds using fiber optics/copper cable transmission. It also has the capability of televising picture and sounds by wireless transmission.

It is contemplated in the present invention in FIG. 20B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its cameras and microphones contained within the instrumentation package assembly, to a remote base station.

The alternate preferred embodiment shown in FIG. 20C televises baseball games to the remote base station from its camera and microphones via a fiber optics/copper cable communication link. The fiber optics/copper cable connector built into the bottom of the instrumentation package assembly which is mounted inside the instrumented baseball home plate, is connected to fiber optics/copper cable buried in the ground of the baseball field. The fiber optics/copper cable buried in the ground is connected to the remote base station.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the instrumentation package assembly 7 shown in FIG. 20A and FIG. 20B and FIG. 20C, FIG. 20A is a top view of the instrumentation package assembly, FIG. 20B is an A-A section view of the instrumentation package assembly 7, FIG. 20C is an A-A section view of the alternative instrumentation package assembly 7, preferred embodiment showing the fiber optics/copper cable connector 31.

The instrumentation package assembly 7 shown in FIG. 20B contains all the electronics for wirelessly televising pictures and sounds. The instrumentation package assembly 7 shown in FIG. 20C contains all the electronics for televising pictures and sounds using fiber optics/copper cable.

The instrumentation package assembly 7 shown in FIG. 20A and FIG. 20B and FIG. 20C contains two instrumentation package assembly elements 9 and 18. The instrumentation package assembly elements are disclosed in FIG. 19D.

The picture and sounds are taken directly by the instrumentation package assembly's two cameras 2 and 23 and microphones 5 and 6. The instrumentation package assembly 7 is mounted within the instrumented baseball home plates shown in FIG. 25. Both preferred embodiments shown in FIG. 20B and FIG. 20C communicate the pictures and sounds from the instrumentation package assembly 7 mounted inside the instrumented baseball home plates on the field to a remote base station located near the field for final processing and dissemination. The remote base station is disclosed in FIG. 30A and FIG. 30B and FIG. 31A and FIG. 31B and FIG. 32A and FIG. 32B and elsewhere in the present invention.

Microphone electrical connector 37 is mounted on the instrumentation package assembly. 24 mates with an electrical connector which is wired by a cable to a third condenser microphone. This microphone protrudes through the top of the instrumented baseball home plate. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 37 on the instrumentation package assembly shown in the referenced drawings.

The instrumentation package assembly 7 is a compressed assemblage of all the optical and electronic components that gather and transmit TV pictures and sounds, into a single enclosure. The main body of the instrumentation package assembly 7 is essentially a short cylinder roughly about ½ inch or more high that resembles a can of tuna fish. It is made strong to resist being crushed. Material examples such as polycarbonates, ABS and fiber reinforced plastics are used in its construction. The x-axis of symmetry of the instrumentation package assembly 7 is 4. The y-axis of symmetry of the instrumentation package assembly 7 is 24. The center of the instrumentation package assembly 7 is located at the intersection of the x-axis and the y-axis. The z-axis 28 of the main body of the instrumentation package assembly 7 is mutually orthogonal to 4 and 24.

The instrumentation package assembly 7 contains cameras 2 and 23, camera lenses 11 and 21, supporting electronics 8 and 27, induction coils 3, 10, 26 and 19, battery pack 34, radio antennas 14, 15, 16, and 17, mechanical actuating devices 32 and 33, corrugated bellows sections 9 and 18, microphones 5 and 6, bottom lid 20, and fiber optics/copper cable connector 31.

In FIG. 20B, the part of the instrumentation package assembly 7 that contains the camera 2, camera lens 11, supporting electronics 8, induction coil 3, mechanical actuating device 32, and corrugated bellows section 9 is shown enlarged in FIG. 19D.

In FIG. 20B, the part of the instrumentation package assembly 7 that contains the cameras 23, camera lens 21, supporting electronics 27, induction coil 3, mechanical actuating device 33, and corrugated bellows section 18 is shown enlarged in FIG. 19D.

In FIG. 20B, camera 2 is identical to camera 23. Camera lens 11 is identical to camera lens 21. Induction coil 3 is identical to induction coil 26. Mechanical actuating device 32 is identical to mechanical actuating device 33. The corrugated bellows segment 9 is identical to corrugated bellows segment 18.

In FIG. 20C, the part of the instrumentation package assembly 7 that contains the camera 2, camera lens 11, supporting electronics 8, induction coil 3, mechanical actuating device 32, and corrugated bellows section 9 is shown enlarged in FIG. 19D. FIG. 19D is the instrumentation package assembly element.

Figure 33D:
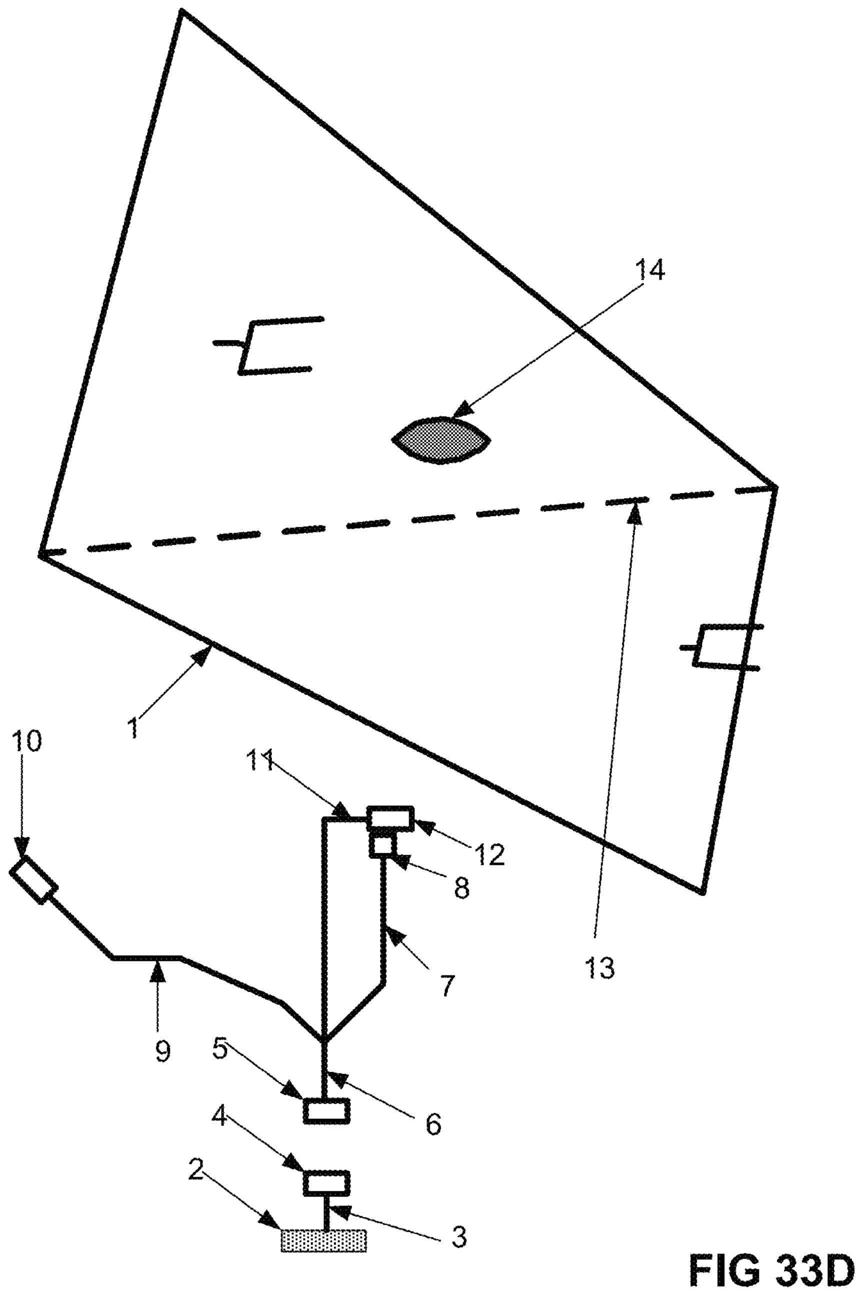
FIG. 33D shows a typical instrumented football stadium equipped with a wireless bi-directional communications link to televise football games from an instrumented football which is in play on the football playing field, and a remote base station via the antenna array relay junction.
Figure 33E:
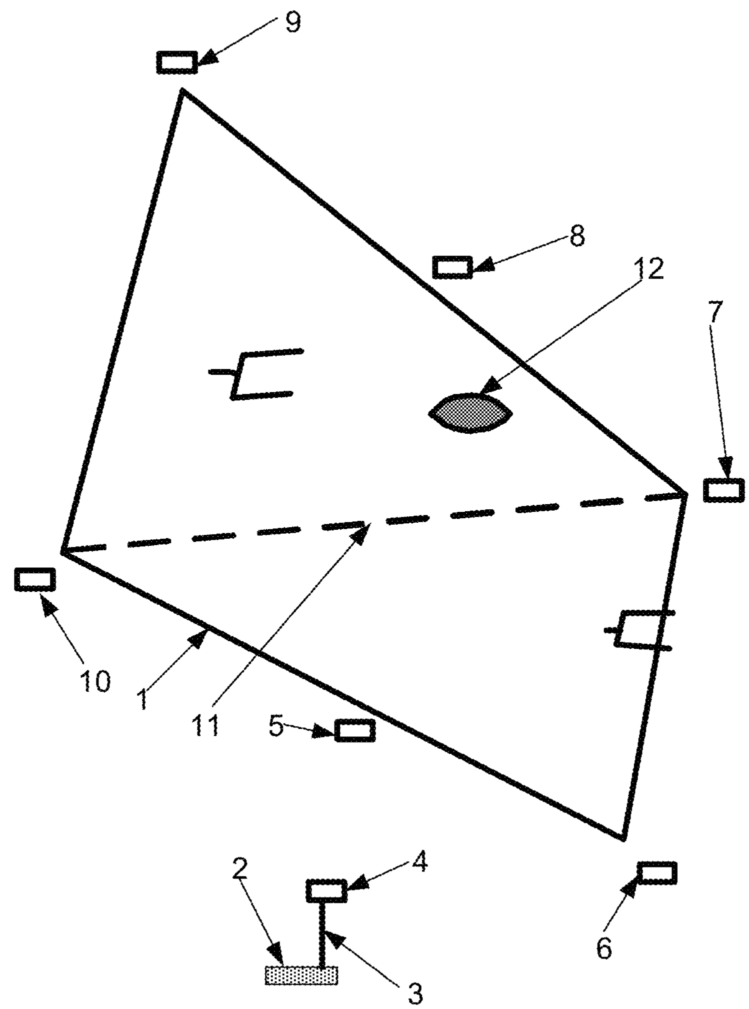
FIG. 33E shows a typical instrumented football stadium equipped with a wireless bi-directional communications link to televise football games from an instrumented football which is in play on the football playing field, and a remote base station via the antenna array relay junction.

In FIG. 20C, the part of the instrumentation package assembly 7 that contains the cameras 23, camera lens 21, supporting electronics 27, induction coil 3, mechanical actuating device 33, and corrugated bellows section 18 is shown enlarged in FIG. 33D.

In FIG. 20C, Camera 2 is identical to camera 23. Camera lens 11 is identical to camera lens 21. Supporting electronics 8 are identical to supporting electronics 27. Induction coil 3 is identical to induction coil 26. Mechanical actuating device 32 is identical to mechanical actuating device 33. The corrugated bellows segment 9 is identical to corrugated bellows segment 18.

The supporting electronics 8 and 27 shown in FIG. 20B are different from the supporting electronics 8 and 27 shown in FIG. 20C. The supporting electronics 8 and 27 shown in FIG. 20C have an additional capability beyond that specified for the supporting electronics 8 and 27 shown in FIG. 20B. The supporting electronics 8 and 27 in FIG. 20B can only televise wirelessly to the remote base station; whereas the supporting electronics 8 and 27 shown in FIG. 20C can televise pictures and sounds via a fiber optics/copper cable link to the remote base station, as well as televise wirelessly to the remote base station is disclosed in FIG. 30A and FIG. 30B and FIG. 32A and FIG. 32B.

The picture and sounds are taken directly by the cameras 2 and 23 and microphones 5 and 6 inside the instrumentation package assembly 7. The instrumentation package assembly 7 is mounted within the instrumented baseball home plate that is in play on the baseball field. The instrumentation package assembly may wirelessly or by fiber optics/copper cable communicate and televise the pictures and sounds from inside the instrumented baseball home plate to a remote base station located near the baseball field for final processing and dissemination.

In FIG. 20B, the instrumentation package assembly 7 contains all the electronics 8 and 27 for wirelessly televising pictures and sounds. The electronics 8 is identical to the electronics 27 in FIG. 20B.

In FIG. 20C, the instrumentation package assembly 7 contains all the electronics 8 and 27 for televising pictures and sounds using fiber optics/copper cable in addition to televising pictures and sounds wirelessly like FIG. 20B. The electronics 8 is identical to the electronics 27 in FIG. 20C.

Comparing the electronics in FIG. 20B with those in FIG. 20C, the electronics in FIG. 20C includes additional functions for televising baseball games using a fiber optics/copper cable link to the remote base station.

In FIG. 20C, the instrumentation package assembly 7 contains all the electronics 8 and 27 for televising pictures and sounds using a fiber optics/copper cable link, in addition to televising pictures and sounds wirelessly like in FIG. 20B.

In a preferred embodiment where we have disclosed a baseball playing field with a fiber optics cable/copper cable link buried beneath the ground, and in particular beneath the instrumented baseball home plate and beneath the three instrumented baseball bases, and where the fiber optics cable/copper cable link is connected to the remote base station at its other end, and where the electronics in FIG. 20C includes the capability to televise baseball games from inside the instrumented baseball home plate to the remote base station via the fiber optics cable/copper cable link by connecting to the fiber optics cable/copper cable link using the fiber optics cable/copper cable connector 31. The instrumentation package assembly 7 in the preferred embodiment shown in FIG. 19C uses a fiber optics cable/copper cable connector 31 with which to connect to a fiber optics cable/copper cable link buried beneath the baseball playing field grounds and beneath the instrumented baseball home plate.

The cameras 2 and 23, camera lenses 11 and 21, and electronics 8 and 27 are joined to the main body of the instrumentation package assembly by the corrugated bellows segments 9 and 18.

Cameras 2 and 23 are identical to one another. Camera lenses 11 and 21 are identical to one another. Mechanical actuating devices 32 and 33 are identical to one another.

The diameter of the instrumentation package assembly 7 is kept to a minimum in order to minimize its footprint inside the instrumented baseball home plate. The dimension of the outside diameter of the instrumentation package assembly 7 is governed largely by the physical diagonal dimension of the largest components within the instrumentation package assembly 7, like the SD/HD camera's 2 and 23 CCD sensor arrays and the battery pack 34.

The instrumentation package assembly 7 is mounted inside the instrumented baseball home plate using a buffer plate that acts as a bearing for the instrumentation package assembly 7. The buffer plate supports the upper end of the instrumentation package assembly 7.

The instrumentation package assembly 7 contains two miniature SD/HD TV cameras 2 and 23, two condenser microphones 5 and 6 and supporting electronics 8 and 27. The cameras 2 and 23, microphones 5 and 6, and supporting electronics 8 and 27, are housed together within the enclosure cavity of the instrumentation package assembly 7. The condenser microphones 5 and 6 are attached to the top interior wall of the main body of the instrumentation package assembly 7. The microphones 5 and 6 hear any sounds produced by physical contact of the instrumented baseball home plate with any external thing, including for example air currents felt on the instrumented baseball home plate during the baseball's flight in the air over the instrumented baseball home plate when it is pitched.

The instrumentation package assembly 7 is filled with a dry pressurized gas like nitrogen to prevent the entry of moisture or dirt. The seals between the lid heat sink 20 and main body of the instrumentation package assembly 7 prevent the dry gas from leaking out of the instrumentation package assembly enclosure. A desiccant is disposed near the SD/HD lenses and cameras to collect and prevent any moisture build-up within the instrumentation package assembly 7. The lid heat sink 20 cools the contents of the instrumentation package assembly.

The diameter of the instrumentation package assembly 7 is kept to a minimum in order to minimize the space taken up inside the instrumented baseball home plate. The dimension of the outside diameter of the instrumentation package assembly is governed largely by the physical diagonal dimensions of its largest components like the quad antennas 14, 15, 16 and 17 and the battery pack 19.

The lines of sight 12 and 29 of the cameras 2 and 23 are parallel to one another and the mechanical axis 29 of the instrumentation package assembly.

The camera lenses 11 and 21 are positioned at the very top of the instrumentation package assembly 7, with the cameras 2 and 23 directly beneath them. The cameras essentially look out of the top of the instrumentation package assembly 7 through camera lenses 11 and 21.

The camera lenses 11 and 21 provide imagery to cameras 2 and 23. The camera lenses 11 and 21 image the objects they see onto cameras 2 and 23. The optical and mechanical axis of cameras 2 and 23 and camera lenses 11 and 21 are parallel to one another.

The camera lenses 11 and 21 have o-ring seals 13 and 22. The purpose of the seals 13 and 22 is to hold and prevent leakage of the pressurized dry nitrogen gas from the cavity of the instrumentation package assembly. The seals 13 and 22 prevent dirt and moisture from entering the cavity and damaging and interfering with the performance of its contents.

The seal 13 and 22 are made from rubber. The seals 13 and 22 are located between the front of the camera lenses 11 and 21 and the camera lens' cylindrical mounting.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

The functions of the camera lenses 11 and 21 such as focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lenses 11 and 21 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. For HD 3-D effects where cameras 2 and 23 form a 3-D stereo camera pair, the camera lenses 11 and 21 are chosen by the cameraman to be identical and identical lens settings are used for each.

When a baseball is hit and a player is rounding the bases, the distance of a player from one base may be decreasing while the distance to another base may be increasing. The camera 2 can be independently and simultaneously commanded and controlled to auto focus on their respective players. If the player slides into the instrumented baseball home plate, the cameras 2 and 23 will catch the slide action up close. The microphones 5 and 6 will capture all the sounds of the action. While the player is running, his pictures and sounds are wirelessly being transmitted by the instrumentation package assembly 7 inside the instrumented baseball home plate.

The instrumentation package assembly electronics showing the detailed flow of electrical signals and data in the instrumentation package assembly is shown in the preferred embodiment given in FIG. 22D and FIG. 22E.

The instrumentation package assembly's network transceiver is part of the electronics 8 and 27.

In FIG. 20B, the network transceiver wirelessly transmits real-time pictures and sounds from the cameras 2 and 23 and microphones 5 and 6 via quad antenna array elements 14, 15, 16 and 17, also known as intentional radiators, to the remote base station. The quad antenna array elements 14, 15, 16 and 17 are mounted radially in a horizontal plane 90 degrees apart from one another and extend outward through the cylindrical wall of the main body of the instrumentation package assembly 7.

In an alternate preferred embodiment to FIG. 20B, the quad antenna array elements 14, 15, 16 and 17 can be replaced with a helix antenna (not shown) with similar dimensions wound on the inside diameter of the instrumentation package assembly 7.

The battery's charging coils 3, 10 and 19, 26 are wound on the outside at both the top and bottom of the instrumentation package assembly 7 and act electrically as a transformer's secondary winding. The coils are wound on the outside of the instrumentation package assembly 7 to keep any heat they may produce away from the contents of the instrumentation package assembly 7 while the battery pack is being charged. The number of turns in each of the charging coils 3, 10 and 19, 26 is made large enough to inductively couple a sufficient number of magnetic lines of flux from the primary coil of the external battery charging unit so as to charge the battery pack in a reasonably short time before games. When the charging unit is placed on top of the instrumented baseball base, the charging coils 3, 10 and 19, 26 receive electrical energy inductively coupled from the primary coils of the external charging unit.

Induction coil 3 is located on the top of the instrumentation package assembly 7. Induction coil 10 is located on the bottom of the instrumentation package assembly 7. The purpose of the induction coils 3, 10 and 19, 26 is to inductively couple electrical energy into the instrumentation package assembly 7 to charge the battery pack 34. The induction coils 3, 10 and 19, 26 are located on the exterior of the enclosure so as to minimize their heat transfer into the instrumentation package assembly 7 enclosure cavity that would raise the temperature of the electronics within the enclosure cavity. The induction coils 3, 10 and 19, 26 are electrically connected through the enclosure walls to the electronics inside the enclosure.

When the instrumentation package assembly 7 is mounted inside the host sports paraphernalia, such as an instrumented baseball home plate, an external electrical induction coil, which is part of a battery pack charging unit, is used to magnetically inductively couple electrical power into induction coils through the instrumented baseball home plate and into the instrumentation package assembly 7 for the purpose of charging the battery pack 34. A block diagram showing the electrical battery charging circuit involving the induction coils 3, 10 and 19, 26 and the battery pack 34 are shown in FIG. 23. A source of electrical power from the charging unit, which is external to the instrumentation package assembly 7, is inductively coupled into these induction coils 3, 10 and 19, 26 by laying the external induction coil of the charging unit flat on the top of the host sports paraphernalia coaxially above coils 3, 10 and 19, 26. The induction coils 3, 10 and 19, 26 feed this power to the battery pack 34 in order to charge it.

The main body of the instrumentation package assembly 7 houses the battery pack 34 which supplies electrical power to each of the elements within the instrumentation package assembly that requires electrical power.

The instrumentation package assembly's battery pack 34 is inductively wirelessly charged before games on an as needed basis, by an external primary winding placed on the top of the instrumented baseball home plate. Charging of the battery pack 34 is accomplished wirelessly by inductive coupling. The instrumentation package assembly's inductive pickup coils 3, 10 and 19, 26 act as the secondary windings on an air core transformer with an external primary winding as their power source. Inductively coupled time varying magnetic flux is furnished to coils 3, 10 and 19, 26 by the external primary winding placed on the top of the instrumented baseball home plate.

The instrumentation package assembly's battery pack 34 is wirelessly charged by magnetic induction before baseball games on an as needed basis, using the charging station unit shown in preferred embodiment shown in FIG. 23A and FIG. 23B and FIG. 23C. The charging station is placed on the top of the instrumented baseball home plate when it is charging the battery pack 34. Charging of the battery pack 34 is accomplished wirelessly by inductive coupling. The instrumented baseball base's four inductive pickup coils 3, 10 and 19, 26 act as the secondary windings on an air core transformer. Time varying magnetic flux is furnished to 3, 10, 19 and 26 by the primary windings of the charging station FIG. 23A and FIG. 23B and FIG. 23C.

The battery's 34 charging coils 3, 10 and 19, 26 are wound on the outside of the instrumentation package assembly's 7 and act electrically as a transformer's secondary winding. The coils 3, 10 and 19, 26 are wound on the outside of the instrumentation package assembly 7 to keep any heat they may produce away from the contents of the instrumentation package assembly 7 while the battery pack 34 is being charged. The number of turns in each charging coil is made large enough to inductively couple a sufficient number of magnetic lines of flux from the external primary coil so as to charge the battery pack 34 in a reasonably short time before games. When the external primary coil is placed on top of the instrumentation package assembly the charging coils 3, 10 and 19, 26 receive electrical energy inductively coupled from the primary coils.

The instrumentation package assembly's network transceiver electronics 8 and 27 wirelessly transmits real-time pictures and sounds from the instrumentation package assembly's cameras 2 and 23 and microphones 5 and 6 via quad antenna array elements 14, 15, 16 and 17 also known as intentional radiators, to the remote base station. The quad antenna array elements 14, 15, 16 and 17 are mounted in a horizontal plane 90 degrees apart from one another and extend outward through the cylindrical wall of the main body of the instrumentation package assembly 7.

As is shown in the alternative preferred embodiment in FIG. 20C, a fiber optics cable/copper cable connector 31 is employed to connect to a fiber optics cable link buried in the playing field grounds beneath the instrumented baseball home plate, to televise the pictures and sounds of the game to the remote base station which is connected to the fiber optics cable/copper cable link at its other end. The fiber optics cable/copper cable is brought up from the ground beneath the instrumented baseball home plate and connected to the instrumented baseball home plate via the fiber optics cable connector 31. Should fiber optics cable or copper cable buried in the playing field grounds not exist in a baseball stadium, the baseball games may be televised wirelessly using radio signals and antennas 14, 15, 16 and 17 using the preferred embodiment shown in FIG. 20B. It is clear that the preferred embodiment shown in FIG. 20C is superior in this regard because it is capable of televising baseball games by both methods i.e. either wirelessly or by a fiber optics cable/copper cable link. The preferred embodiment shown in FIG. 20C is more expensive to manufacture than the preferred embodiment shown in FIG. 20 because its electronics 8 and 27 must provide for the additional fiber optics/copper cable related electronic functions.

In an alternate preferred embodiment, the quad antenna array 14, 15, 16 and 17 can be replaced with a helix antenna (not shown) with similar dimensions wound on the inside diameter of the instrumentation package assembly down the length of its cylindrical wall.

A antenna array relay junction shown in FIG. 30A and FIG. 30B is deployed in the baseball stadium and receives radio signals from the quad antenna array 14, 15, 16 and 17. Antenna array elements 14, 15, 16 and 17 are in quadrature to radiate radio signals to the antenna array relay junction with sufficient gain so as to overcome RF noise, and provide a large enough gain bandwidth product to accommodate real-time SD/HD picture quality requirements. The instrumentation package assembly's network transceiver electronics 8 also provides a wireless means for the instrumentation package assembly's in the instrumented baseball home plate to receive command and control radio signals from the remote base station's antenna.

The corrugated bellows segment 9 acts to mechanically connect the camera lens 11, camera 2 and electronics 8 to the main body of the instrumentation package assembly. The corrugated bellows segment 9 is mechanically flexible. This flexibility allows the optical axis of the camera 2 and its lens 11 to be mechanically tilted relative to the z-axis 28 of the main body of the instrumentation package assembly 7 and pre-set in place if so desired by the cameraman at the time the instrumentation package assembly 7 is encapsulated inside the host sports paraphernalia.

The corrugated bellows segment 18 acts to mechanically connect the camera lens 21, camera 23 and electronics 27 to the main body of the instrumentation package assembly. The corrugated bellows segment 18 is mechanically flexible. This flexibility allows the optical axis of the camera 23 and its lens 21 to be mechanically tilted relative to the z-axis 28 of the main body of the instrumentation package assembly 7 and pre-set in place if so desired by the cameraman at the time the instrumentation package assembly 7 is encapsulated inside the host sports paraphernalia.

The corrugated bellows sections 9 and 18 of the instrumentation package assembly are flexible and allow the sections containing the cameras 2 and 23 and their camera lenses 11 and 21 to be bent together in order to tilt the lines of sight of the cameras 2 and 23 and their lenses 11 and 21 relative to the top of the instrumentation package assembly if so desired by the cameraman. Additionally, the corrugated sections 9 and 18 allow the instrumentation package assembly 7 to act as a spring and absorb shocks and compress or expand its length without damaging the contents of the instrumentation package assembly. When circumstances arise where the players tend to crush the instrumentation package assembly 7, it will compress or expand.

The instrumentation package assembly 7 has flexible corrugated bellows sections 9 and 18. The corrugated bellows sections 9 and 18 of the instrumentation package assembly 7 allow for the part of the instrumentation package assembly 7 containing cameras 2 and 23 and their lenses 11 and 21 to flex and bend, stretch and compress when it is impacted. This enables the instrumentation package assembly 7 to resist shock and vibration. Additionally, the corrugated bellows sections 9 and 18 allow the instrumentation package assembly 7 to act as a spring and compress or expand its length without damaging the contents of the instrumentation package assembly 7. When circumstances arise where the baseball players tend to crush the instrumented baseball home plate, the instrumentation package assembly 7 will compress or expand instead of breaking.

A antenna array relay junction shown in FIG. 30A and FIG. 30B is deployed in the baseball stadium and receives radio signals from the instrumented baseball base's antenna array elements 14, 15, 16 and 17. Antenna array elements 14, 15, 16 and 17 are in quadrature to radiate radio signals to antenna array relay junction with sufficient gain so as to overcome RF noise and provide for a large enough gain bandwidth product to accommodate real-time SD/HD picture quality requirements. The instrumentation package assembly's network transceiver electronics which is part of 8 also provides a wireless means for the instrumented baseball base to receive command and control radio signals from the base station.

The two condenser microphones 5 and 6 enable the viewing audience to hear real-time contacts, impacts and shocks to the instrumented baseball base. Simultaneously live SD/HD TV pictures are taken by the TV camera 2 of its field of view of the live action on the playing field.

Condenser microphones have good fidelity for their small size, weight and power consumption. In the future higher quality small sized microphones are likely to become available as the state of the art improves. It is anticipated that we will use these microphones as they become available.

The instrumentation package assembly 7 is filled with a dry pressurized gas 22 like nitrogen to prevent the entry of moisture or dirt into its cavity. The o-ring seal 24 between the bottom lid 19 and the enclosure prevents the dry gas from leaking out of the enclosure. Dry nitrogen gas 22 is inserted into the instrumentation package assembly 7 through gas valve 23. A desiccant is also disposed inside the cavity to collect moisture and prevent any moisture build-up.

The instrumentation package assembly 7 has a removable lid 19 on its bottom to allow access to the contents inside the cavity of the instrumentation package assembly 7. The lid 19 allows access to the battery pack 21 for servicing. The removable lid 19 also allows access to camera 2, camera lens 11, electronics 8, quad antennas 14, 15, 16 and 17, and mechanical actuating device 19 for servicing. The lower inductive coil 10 is attached to the bottom outside of the lid 19. The fiber optics/copper cable connector 18 is attached through the bottom of lid 19. The lid 19 has a gas valve 36 mounted on it to allow dry nitrogen gas 22 to be injected into the cavity to pressurize the enclosure of the instrumentation package assembly after the lid 19 is closed. The purpose of the dry nitrogen gas is to protect the contents of the instrumentation package assembly from moisture. There is an o-ring seal around lid 19 to prevent the pressurized dry nitrogen gas from escaping from the cavity of the instrumentation package assembly 7 enclosure.

In many venues, the two cameras are chosen to be identical to each other. However, there are occasions when they may be chosen to be different from one another when in order to accomplish their joint mission of maximizing the entertainment of the viewing audience. The cameraman can choreograph the playing field coverage and set up the cameras and their respective lens combinations like a symphony orchestra to maximize the entertainment and viewing pleasure of the on-looking television audience.

Two of the instrumentation package assembly elements, described in FIG. 19D are assembled into the instrumentation package assembly hub 7 by loading their two corrugated bellows enclosure segments 9 and 18 into two mating machined seats in the hub 7 using their roller bearing ends of the enclosures. Assembling the instrumentation package assembly elements into the instrumentation package assembly hub 7 in this manner assures that the optical/mechanical axes of the instrumentation package assembly elements is coincident with the mechanical axes 12 and 29 of the hub 7 respectively. The angular position of the 1st primary mechanical stop for each of the instrumentation package assembly elements is now adjusted to be aligned with the y-axis 24 direction on the hub 7. In particular, the 1st primary mechanical stop for each of the instrumentation package assembly elements is precisely set at twelve o'clock and then locked in place on the hub 7. This alignment procedure assures that cameras 2 and 23 will now produce precisely centered upright images of any objects that lie along the y-axis 24 of the hub 7 in the twelve o'clock direction relative to the hub 7 of the instrumentation package assembly. This alignment procedure also assures that the 3-D stereo picture frames of both cameras 34 and 35 are mutually congruent at each of the eight mechanical stop positions.

The fiber optics cable/copper cable connector 31 is offset at a distance of about ¾ of the hub radius from the center of hub 7 at twelve o'clock along the hub's y-axis 24 and is accessible from the bottom of the instrumentation package assembly. The fiber optics cable/copper cable connector 31 lies along side and between the instrumentation package assembly elements which it is electrically connected to.

The cameraman, in the remote base station, software selects either the wireless mode of communication, and/or the fiber optics/copper cable mode of communication between each of the instrumented sports paraphernalia (for example, instrumented baseball home plates and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium playing field. These choices are also physically switch selectable by the cameraman with his access through the opening in the bottom of some of the instrumented sports paraphernalia. Refer to FIG. 30 and FIG. 30B, and FIG. 31A and FIG. 31B, and FIG. 32A and FIG. 32B, and FIG. 35A and FIG. 35B and FIG. 35C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented baseball base that are being controlled.

Referring to the Preferred Embodiments Specified in FIG. 20A and FIG. 20B and FIG. 20C, the instrumentation package assembly satisfies all of the following objectives:

It is an objective of the present invention that the instrumentation package assembly is composed of two microphones, two instrumentation package assembly elements, two bottom induction coils, four radio antenna elements, bottom lid, fiber optics/copper cable connector, battery pack, dry nitrogen gas, gas valve, and a microphone connector. It is an objective of the present invention not to block, absorb or reflect radio waves that are transmitted or received by the instrumentation package assembly.

FIG. 21A and FIG. 21B and FIG. 21C

The detailed physical elements disclosed in the instrumentation package assembly drawing shown in FIG. 21A and FIG. 21B and FIG. 21C are identified as follows: 1 is the y-axis of camera 43. 2 is the y-axis of symmetry of the instrumentation package assembly. 3 is the y-axis of camera 44. 4 is the fiber optics/copper cable connector. 5 is an upper induction coil. 6 is an upper induction coil. 7 is a camera lens. 8 is a camera lens seal. 9 is a camera lens seal. 10 is a camera lens. 11 is the instrumentation package assembly. 12 is the bottom lid heat sink of the instrumentation package assembly. 13 is the electronics. 14 is the electronics. 15 is the x-axis of symmetry of the instrumentation package assembly, 16 is the bottom of the instrumentation package assembly. 17 is the actuating device for camera 44 and camera lens 7. 18 is the actuating device for camera 43 and camera lens 10. 19 is the actuating device for camera 41 and camera lens 45. 20 is the actuating device for camera 42 and camera lens 46. 21 is the electronics. 22 is the electronics. 23 is a microphone. 24 is a microphone. 25 is a radio antenna. 26 is a radio antenna. 27 is a radio antenna. 28 is a radio antenna. 29 is the optical axis of camera 43. 30 is the z-axis of symmetry of the instrumentation package assembly. 31 is the optical axis of camera 44. 32 is an instrumentation package assembly element showing a corrugated bellows segment. 33 is an upper induction coil. 34 is an upper induction coil. 35 is the camera lens 45 seal. 36 is the camera lens 46 seal. 37 is the optical axis of camera 41. 38 is the optical axis of camera 42. 39 is an instrumentation package assembly element showing a corrugated bellows segment. 40 is an instrumentation package assembly element showing a corrugated bellows segment. 41 is a camera. 42 is a camera. 43 is a camera. 44 is a camera. 45 is a camera lens for camera 41. 46 is a camera lens for camera 42. 47 is dry nitrogen gas. 48 is a gas valve. 49 is an instrumentation package assembly element showing a corrugated bellows segment. 50 is the battery pack. 51 is the microphone connector. 52 is a microphone. 53 is a microphone.

FIG. 21A is a top view of the four-camera and fiber optics/copper cable instrumentation package assembly.

FIG. 21B is a side view of the four-camera wireless instrumentation package assembly.

FIG. 21C is a side view of the four-camera wireless and fiber optics/copper cable instrumentation package assembly.

Referring to drawings FIG. 21A and FIG. 21B and FIG. 21C, two different instrumentation package assembly preferred embodiments are disclosed. The only difference between the two embodiments is that one has wireless communications capability only, whereas the other has both wireless and fiber optics cable/copper cable communications capabilities. The one that has wireless capability only, is cheaper to produce than the one that has both wireless and fiber optics or copper cable capabilities thereby giving it a cost advantage for venues with lower budgets, like for example some colleges and high schools. The instrumentation package assembly shown in FIG. 21B, which has only wireless capability, is used to instrument ice hockey pucks. The one with both wireless and fiber optics/copper cable capabilities has better bandwidth and lower noise and is used to instrument baseball home plates.

The present invention contemplates each of the instrumentation package assembly embodiments to be equipped with four TV cameras, four TV camera lenses, two microphones, four supporting electronics, one battery pack, eight induction coils, four mechanical actuating devices and four antennas.

Each of the present instrumentation package assembly preferred embodiments contains four instrumentation package assembly elements disclosed in FIG. 19D. The single TV camera, single TV camera lens, supporting electronics, induction coil, mechanical actuating device and corrugated bellows segment are the parts of the instrumentation package assembly element disclosed in FIG. 19D which is a primary part of the instrumentation package assembly.

The preferred embodiment shown in FIG. 21B televises its pictures and sounds using wireless RF transmission. The alternate preferred embodiment shown in FIG. 21C televises its pictures and sounds using both fiber optics cable/copper cable transmission and wireless RF transmission.

It is contemplated in the present invention in FIG. 21B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its cameras and microphones contained within the instrumentation package assembly, to a remote base station. The remote base station is disclosed in FIG. 30A and FIG. 30B and FIG. 31A and FIG. 31B and FIG. 32A and FIG. 32B.

The alternate preferred embodiment shown in FIG. 21C televises baseball games to the remote base station from its camera and microphones via a fiber optics/copper cable communication link. The fiber optics/copper cable connector built into the bottom of the instrumentation package assembly which is mounted inside the instrumented baseball home plate, is connected to fiber optics cable/copper cable buried in the ground of the baseball field. The fiber optics cable/copper cable buried in the ground is connected to the remote base station.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the instrumentation package assembly shown in FIG. 21A and FIG. 21B and FIG. 21C, FIG. 21A is a top view of the instrumentation package assembly, FIG. 21B is an A-A section view of the instrumentation package assembly, FIG. 21C is an A-A section view of the alternative instrumentation package assembly preferred embodiment showing the fiber optics/copper cable connector 4.

The instrumentation package assembly 11 shown in FIG. 21B contains all the electronics for wirelessly televising pictures and sounds. The instrumentation package assembly 11 shown in FIG. 21C contains all the electronics for televising pictures and sounds using fiber optics cable/copper cable.

The picture and sounds are taken directly by the instrumentation package assembly's two cameras 41, 42, 43 and 44 and microphones 23 and 24. The instrumentation package assembly 11 is mounted within the instrumented baseball home plates shown in FIG. 26 and FIG. 26. Both preferred embodiments shown in FIG. 21B and FIG. 21C communicate the pictures and sounds from the instrumentation package assembly 11 mounted inside the instrumented baseball home plates on the field to a remote base station located near the field for final processing and dissemination.

The instrumentation package assembly 11 is a compressed assemblage of all the optical and electronic components that gather and transmit TV pictures and sounds, into a single enclosure. The main body of the instrumentation package assembly 11 is essentially a short cylinder about ½ inch or more high that resembles a can of tuna fish. It is made strong to resist being crushed. Material examples such as polycarbonates, ABS and fiber reinforced plastics are used in its construction. The x-axis of symmetry of the instrumentation package assembly 11 is 15. The y-axis of symmetry of the instrumentation package assembly 11 is 2. The center of the instrumentation package assembly 11 is located at the intersection of the x-axis and the y-axis. The z-axis 30 of the main body of the instrumentation package assembly 11 is mutually orthogonal to 4 and 24.

The instrumentation package assembly 11 contains cameras 41, 42, 43 and 44, camera lenses 11 and 21, supporting electronics 21, 22, 14, and 13, induction coils 5, 6, 33, and 34, radio antennas 25, 26, 27, and 28, mechanical actuating devices 19, 20, 18, and 17, corrugated bellows sections 40, 39, 32, and 49, microphones 23 and 24, bottom lid 12, fiber optics cable/copper cable connector 4, gas valve 48, dry gas 47, and the battery pack 50.

In FIG. 21B, the part of the instrumentation package assembly 11 that contains the camera 43, camera lens 10, supporting electronics 14, induction coil 5, mechanical actuating device 18, and corrugated bellows section 32 is shown enlarged in FIG. 19D.

In FIG. 21B, the part of the instrumentation package assembly 11 that contains the cameras 44, camera lens 7, supporting electronics 13, induction coil 6, mechanical actuating device 17, and corrugated bellows section 49 is shown enlarged in FIG. 19D.

In FIG. 21B, camera 41 is identical to camera 42. Camera lens 45 is identical to camera lens 46. Supporting electronics 14 is identical to supporting electronics 13. Induction coil 33 is identical to induction coil 34. Mechanical actuating device 18 is identical to mechanical actuating device 17. The corrugated bellows segment 32 is identical to corrugated bellows segment 49.

In FIG. 21C, the part of the instrumentation package assembly 11 that contains the camera 41, camera lens 45, supporting electronics 21, induction coil 33, mechanical actuating device 19, and corrugated bellows section 40 is shown enlarged in FIG. 19D.

In FIG. 21C, the part of the instrumentation package assembly 11 that contains the camera 42, camera lens 46, supporting electronics 22, induction coil 34, mechanical actuating device 20, and corrugated bellows section 39 is shown enlarged in FIG. 19D.

In FIG. 21C, camera 41 is identical to camera 42. Camera lens 45 is identical to camera lens 46. All the induction coils 5, 6, 33 and 34 are identical. Mechanical actuating device 19 is identical to mechanical actuating device 20. The corrugated bellows segment 40 is identical to corrugated bellows segment 39.

In FIG. 21C, the part of the instrumentation package assembly 11 that contains the camera 43, camera lens 10, supporting electronics 14, induction coil, mechanical actuating device 18, and corrugated bellows section 32 is shown enlarged in FIG. 19D.

In FIG. 21C, the part of the instrumentation package assembly 11 that contains the camera 44, camera lens 7, supporting electronics 13, induction coil, mechanical actuating device 17, and corrugated bellows section 49 is shown enlarged in FIG. 19D.

In FIG. 21C, Camera 43 is identical to camera 44. Camera lens 10 is identical to camera lens 7. Supporting electronics 14 are identical to supporting electronics 13. Induction coil is identical to induction coil. Mechanical actuating device 18 is identical to mechanical actuating device 17. The corrugated bellows segment 32 is identical to corrugated bellows segment 49.

The supporting electronics 14 and 13 shown in FIG. 21B are different from the supporting electronics 21 and 22 shown in FIG. 21C. The supporting electronics 21 and 22 shown in FIG. 21C have an additional capability beyond that specified for the supporting electronics 14 and 13 shown in FIG. 21B. The supporting electronics 21 and 27 in FIG. 21B can only televise wirelessly to the remote base station; whereas the supporting electronics 14 and 13 shown in FIG. 21C can televise pictures and sounds via a fiber optics cable/copper cable link to the remote base station, as well as televise wirelessly to the remote base station.

The picture and sounds are taken directly by the cameras 41, 42, 43 and 44 and microphones 23 and 24 inside the instrumentation package assembly 11. The instrumentation package assembly 11 is mounted within the instrumented baseball home plate that is in play on the baseball field. The instrumentation package assembly may wirelessly or by fiber optics/copper cable communicate and televise the pictures and sounds from inside the instrumented baseball home plate to a remote base station located near the baseball field for final processing and dissemination.

Microphone electrical connector 51 is mounted on the instrumentation package assembly. 51 mates with an electrical connector which is wired by a cable to a third condenser microphone. This microphone protrudes through the top of the instrumented baseball home plate. Refer to instrumented baseball home plate embodiments shown in drawings FIG. 26A and FIG. 26B and FIG. 26C. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 51 on the instrumentation package assembly shown in the referenced drawings.

In FIG. 21B, the instrumentation package assembly 11 contains all the electronics 14 and 13 for wirelessly televising pictures and sounds. The electronics 14 is identical to the electronics 13 in FIG. 21B.

In FIG. 21C, the instrumentation package assembly 11 contains all the electronics 21 and 22 for televising pictures and sounds using fiber optics cable/copper cable in addition to televising pictures and sounds wirelessly like FIG. 21B. The electronics 21 is identical to the electronics 22 in FIG. 21C.

Comparing the electronics in FIG. 21B with those in FIG. 21C, the electronics in FIG. 21C includes additional functions for televising baseball games using a fiber optics cable/copper cable link to the remote base station.

In FIG. 21C, the instrumentation package assembly 11 contains all the electronics 21 and 22 for televising pictures and sounds using a fiber optics cable/copper cable link, in addition to televising pictures and sounds wirelessly by radio like in FIG. 21B.

In a preferred embodiment where we have disclosed a baseball playing field with a fiber optics cable/copper cable link buried beneath the ground, and in particular beneath the instrumented baseball home plate and beneath the three instrumented baseball bases, and where the fiber optics cable/copper cable link is connected to the remote base station at its other end, and where the electronics in FIG. 21C includes the capability to televise baseball games from inside the instrumented baseball home plate to the remote base station via the fiber optics cable/copper cable link by connecting to the fiber optics cable/copper cable link using the fiber optics cable/copper cable connector 4. The instrumentation package assembly 11 in the preferred embodiment shown in FIG. 21C uses a fiber optics cable/copper cable connector 31 with which to connect to a fiber optics cable/copper cable link buried beneath the baseball playing field grounds and beneath the instrumented baseball home plate.

The cameras 41 and 42, camera lenses 45 and 46, and electronics 21 and 22 are joined to the main body of the instrumentation package assembly 11 by the corrugated bellows segments 40 and 39.

The cameras 43 and 44, camera lenses 10 and 7, and electronics 14 and 13 are joined to the main body of the instrumentation package assembly 11 by the corrugated bellows segments 32 and 49.

Cameras 41 and 42 are identical to one another. Camera lenses 45 and 46 are identical to one another. Mechanical actuating devices 19 and 20 are identical to one another.

Cameras 43 and 44 are identical to one another. Camera lenses 10 and 7 are identical to one another. Mechanical actuating devices 18 and 17 are identical to one another.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

The functions of the camera lenses such as focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lenses are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. For HD 3-D effects where cameras form a 3-D stereo camera pair, the camera lenses are chosen by the cameraman to be identical and identical lens settings are used for each.

The diameter of the instrumentation package assembly 11 is kept to a minimum in order to minimize its footprint inside the instrumented baseball home plate. The dimension of the outside diameter of the instrumentation package assembly 11 is governed largely by the physical diagonal dimension of the largest components within the instrumentation package assembly 11, like the SD/HD camera's 41, 42, 43, and 44 CCD sensor arrays and the battery pack 50.

The instrumentation package assembly 11 is mounted inside the instrumented baseball home plate using a buffer plate that acts as a bearing for the instrumentation package assembly 11. The buffer plate supports the upper end of the instrumentation package assembly 11.

The instrumentation package assembly 11 contains four miniature SD/HD TV cameras 41, 42, 43, and 44, two condenser microphones 23 and 24 and supporting electronics 21, 22, 14, and 13. The cameras 41, 42, 43, and 44, microphones 23 and 24, and supporting electronics 21, 22, 14, and 13, are housed together within the enclosure cavity of the instrumentation package assembly 11. The condenser microphones 23 and 24 are attached to the top interior wall of the main body of the instrumentation package assembly 11. The microphones 23 and 24 hear any sounds produced by physical contact of the instrumented baseball home plate with any external thing, including for example air currents felt on the instrumented baseball home plate during the baseball's flight in the air over the instrumented baseball home plate when it is pitched.

The instrumentation package assembly 11 is filled with a dry pressurized gas like nitrogen to prevent the entry of moisture or dirt. The rubber o-ring seals between the lid 12 and main body of the instrumentation package assembly 11 prevent the dry gas from leaking out of the instrumentation package assembly enclosure. A desiccant is disposed near the SD/HD lenses 45, 46, 10, and 7 and cameras 41, 42, 43, and 44 to collect and prevent any moisture build-up within the instrumentation package assembly 11.

The diameter of the instrumentation package assembly 11 is kept to a minimum in order to minimize the space taken up inside the instrumented baseball home plate. The dimension of the outside diameter of the instrumentation package assembly is governed largely by the physical diagonal dimensions of its largest components like the quad antennas 14, 15, 16 and 17 and the battery pack 50.

The lines of sight of the cameras 41 and 42 are parallel to one another.

The lines of sight of the cameras 43 and 44 are parallel to one another.

The camera lenses 45, 46, 10 and 7 are positioned at the very top of the instrumentation package assembly 11, with the cameras 41, 42, 43, and 44 directly beneath them. The cameras 41, 42, 43, and 44 essentially look out of the top of the instrumentation package assembly 11 through camera lenses 45, 46, 10 and 7.

The camera lenses 45, 46, 10 and 7 provide imagery to cameras 41, 42, 43, and 44. The camera lenses 45, 46, 10 and 7 image the objects they see onto cameras 41, 42, 43, and 44. The optical and mechanical axis of cameras 41 and 42 and camera lenses 45 and 46 are parallel and coaxial to one another.

The camera lenses 45, 46, 10 and 7 have o-ring seals 35, 36, 9 and 8 respectively. The purpose of the seals 35, 36, 9 and 8 is to hold and prevent leakage of the pressurized dry nitrogen gas from the cavity of the instrumentation package assembly. The seals 35, 36, 9 and 8 prevent dirt and moisture from entering the cavity and damaging and interfering with the performance of its contents. The seals 35, 36, 9 and 8 are made from rubber. The seals 35, 36, 9 and 8 are located between the front of the camera lenses 45, 46, 10 and 7 and the camera lens' cylindrical mountings.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

When a baseball is hit and a player is rounding the bases, the distance of a player from one base may be decreasing while the distance to another base may be increasing. The camera 2 can be independently and simultaneously commanded and controlled to auto focus on their respective players. If the player slides into the instrumented baseball home plate, the cameras 41, 42, 43, and 44 will catch the slide action up close. The microphones 23 and 24 will capture all the sounds of the action. While the player is running, his pictures and sounds are wirelessly being transmitted by the instrumentation package assembly 7 inside the instrumented baseball home plate.

The instrumentation package assembly electronics showing the detailed flow of electrical signals and data in the instrumentation package assembly is shown in the preferred embodiment given in FIG. 22D and FIG. 22E.

The instrumentation package assembly's network transceiver is part of the electronics 21, 22, 14 and 13.

In FIG. 21B, the network transceiver wirelessly transmits real-time pictures and sounds from the cameras 41, 42, 43, and 44 and microphones 23 and 24 via quad antenna array elements 14, 15, 16 and 17, also known as intentional radiators, to the remote base station. The remote base station is disclosed in FIG. 30A and FIG. 30B and FIG. 32A and FIG. 32B and elsewhere in the present invention.

The quad antenna array elements 25, 26, 27 and 28 are mounted radially in a horizontal plane 90 degrees apart from one another and extend outward through the cylindrical wall of the main body of the instrumentation package assembly 11.

In an alternate preferred embodiment to FIG. 21B, the quad antenna array elements 25, 26, 27 and 28 can be replaced with a helix antenna (not shown) with similar dimensions wound on the inside diameter of the instrumentation package assembly 11.

The battery's charging coils 5, 6, 33, and 34 are wound on the outside at both the top and bottom of the instrumentation package assembly 11 and act electrically as a transformer's secondary winding. The coils are wound on the outside of the instrumentation package assembly 11 to keep any heat they may produce away from the contents of the instrumentation package assembly 11 while the battery pack is being charged. The number of turns in each of the charging coils 5, 6, 33, and 34 is made large enough to inductively couple a sufficient number of magnetic lines of flux from the primary coil of the external battery charging unit so as to charge the battery pack in a reasonably short time before games. When the charging unit is placed on top of the instrumented baseball base, the charging coils 5, 6, 33, and 34 receive electrical energy inductively coupled from the primary coils of the external charging unit.

Induction coil 5 is located on the bottom of the instrumentation package assembly 11.

Induction coil 6 is located on the bottom of the instrumentation package assembly 11.

The purpose of the induction coils 5, 6, 33, and 34 is to inductively couple electrical energy into the instrumentation package assembly 11 to charge the battery pack 50. The induction coils 5, 6, 33, and 34 are located on the exterior of the enclosure so as to minimize their heat transfer into the instrumentation package assembly 11 enclosure cavity that would raise the temperature of the electronics within the enclosure cavity. The induction coils 5, 6, 33, and 34 are electrically connected through the enclosure walls to the electronics inside the enclosure.

When the instrumentation package assembly 11 is mounted inside the host sports paraphernalia, such as an instrumented baseball home plates, an external electrical induction coil, which is part of a battery pack charging unit, is used to magnetically inductively couple electrical power into induction coils through the instrumented baseball home plate and into the instrumentation package assembly 11 for the purpose of charging the battery pack 50. A block diagram showing the electrical battery charging circuit involving the induction coils 5, 6, 33, and 30 and the battery pack 50 are shown in FIG. 23. A source of electrical power from the charging unit, which is external to the instrumentation package assembly 11, is inductively coupled into these induction coils 5, 6, 33, and 34 by laying the external induction coil of the charging unit flat on the top of the host sports paraphernalia coaxially above coils 5, 6, 33, and 34. The induction coils 5, 6, 33, and 34 feed this power to the battery pack 50 in order to charge it.

The main body of the instrumentation package assembly 11 houses the battery pack 50 which supplies electrical power to each of the elements within the instrumentation package assembly that requires electrical power.

The instrumentation package assembly's battery pack 50 is inductively wirelessly charged before games on an as needed basis, by an external primary winding placed on the top of the instrumented baseball home plate. Charging of the battery pack 50 is accomplished wirelessly by inductive coupling. The instrumentation package assembly's inductive pickup coils 5, 6, 33, and 34 act as the secondary windings on an air core transformer with an external primary winding as their power source. Inductively coupled time varying magnetic flux is furnished to coils 5, 6, 33, and 34 by the external primary winding placed on the top of the instrumented baseball home plate.

The instrumentation package assembly's battery pack 50 is wirelessly charged by magnetic induction before baseball games on an as needed basis, using the charging station unit shown in preferred embodiment shown in FIG. 23A and FIG. 23B and FIG. 23C. The charging station is placed on the top of the instrumented baseball home plate when it is charging the battery pack 50. Charging of the battery pack 50 is accomplished wirelessly by inductive coupling. The instrumented baseball base's four inductive pickup coils 5, 6, 33, and 34 act as the secondary windings on an air core transformer. Time varying magnetic flux is furnished to 5, 6, 33, and 34 by the primary windings of the charging station unit FIG. 23A and FIG. 23B and FIG. 23C.

The battery's 50 charging coils 5, 6, 33, and 34 are wound on the outside of the instrumentation package assembly 11 and act electrically as a transformer's secondary winding. The coils 5, 6, 33, and 34 are wound on the outside of the instrumentation package assembly 11 to keep any heat they may produce away from the contents of the instrumentation package assembly 11 while the battery pack 50 is being charged. The number of turns in each charging coil is made large enough to inductively couple a sufficient number of magnetic lines of flux from the external primary coil so as to charge the battery pack 50 in a reasonably short time before games. When the external primary coil is placed on top of the instrumentation package assembly the charging coils 5, 6, 33, and 34 receive electrical energy inductively coupled from the primary coils.

The instrumentation package assembly's network transceiver electronics 21, 22, 14 and 13 wirelessly transmits real-time pictures and sounds from the instrumentation package assembly's cameras 41, 42, 43, and 44 and microphones 23 and 24 via quad antenna array elements 25, 26, 27 and 28 also known as intentional radiators, to the remote base station. The quad antenna array elements 25, 26, 27 and 28 are mounted in a horizontal plane 90 degrees apart from one another and extend outward through the cylindrical wall of the main body of the instrumentation package assembly 11.

As is shown in the alternative preferred embodiment in FIG. 21C, a fiber optics cable/copper cable connector 4 is employed to connect to a fiber optics cable/copper cable link buried in the playing field grounds beneath the instrumented baseball home plate, to televise the pictures and sounds of the game to the remote base station which is connected to the fiber optics cable/copper cable link at its other end. Should fiber optics cable/copper cable buried in the playing field grounds not exist in a baseball stadium, the baseball games may be televised wirelessly using radio signals and antennas 25, 26, 27 and 28 using the preferred embodiment shown in FIG. 35B. It is clear that the preferred embodiment shown in FIG. 21C is superior in this regard because it is capable of televising baseball games by both methods i.e. either wirelessly or by a fiber optics cable/copper cable link. The preferred embodiment shown in FIG. 21C is more expensive to manufacture than the preferred embodiment shown in FIG. 21B because its electronics 21 and 22 must provide for the additional fiber optics/copper cable related electronic functions.

In an alternate preferred embodiment, the quad antenna array 25, 26, 27 and 28 can be replaced with a helix antenna (not shown) with similar dimensions wound on the inside diameter of the instrumentation package assembly down the length of its cylindrical wall.

A antenna array relay junction shown in FIG. 30A and FIG. 30B is deployed in the baseball stadium and receives radio signals from the quad antenna array 25, 26, 27 and 28. Antenna array elements 25, 26, 27 and 28 are in quadrature to radiate radio signals to the antenna array relay junction with sufficient gain so as to overcome RF noise, and provide a large enough gain bandwidth product to accommodate real-time SD/HD picture quality requirements. The instrumentation package assembly's network transceiver electronics 8 also provides a wireless means for the instrumentation package assembly's in the instrumented baseball home plate to receive command and control radio signals from the remote base station's antenna.

The corrugated bellows segment 40 acts to mechanically connect the camera lens 45, camera 41 and electronics 21 to the main body of the instrumentation package assembly. The corrugated bellows segment 40 is mechanically flexible. This flexibility allows the optical axis of the camera 41 and its lens 45 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows segment 39 acts to mechanically connect the camera lens 46, camera 42 and electronics 22 to the main body of the instrumentation package assembly. The corrugated bellows segment 39 is mechanically flexible. This flexibility allows the optical axis of the camera 42 and its lens 46 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows sections 40 and 39 of the instrumentation package assembly are flexible and allow the sections containing the cameras 41 and 42 and their camera lenses 45 and 46 to be bent together in order to tilt the lines of sight of the camera 41 and 42 and their lenses 45 and 46 relative to the top of the instrumentation package assembly if so desired by the cameraman. Additionally, the corrugated sections 40 and 39 allow the instrumentation package assembly 11 to act as a spring and absorb shocks and compress or expand its length without damaging the contents of the instrumentation package assembly. When circumstances arise where the players tend to crush the instrumentation package assembly 11, it will compress or expand.

The corrugated bellows segment 32 acts to mechanically connect the camera lens 10, camera 43 and electronics 14 to the main body of the instrumentation package assembly. The corrugated bellows segment 32 is mechanically flexible. This flexibility allows the optical axis of the camera 43 and its lens 10 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows segment 49 acts to mechanically connect the camera lens 7, camera 44 and electronics 13 to the main body of the instrumentation package assembly. The corrugated bellows segment 49 is mechanically flexible. This flexibility allows the optical axis of the camera 44 and its lens 7 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows sections 32 and 49 of the instrumentation package assembly are flexible and allow the sections containing the cameras 43 and 44 and their camera lenses 10 and 7 to be bent together in order to tilt the lines of sight of the camera 43 and 44 and their lenses 10 and 7 relative to the top of the instrumentation package assembly if so desired by the cameraman. Additionally, the corrugated bellows sections 32 and 49 allow the instrumentation package assembly 11 to act as a spring and absorb shocks and compress or expand its length without damaging the contents of the instrumentation package assembly. When circumstances arise where the players tend to crush the instrumentation package assembly 11, it will compress or expand.

The instrumentation package assembly 11 has flexible corrugated bellows sections 40 and 39. The corrugated bellows section 40 and 39 of the instrumentation package assembly 11 allow for the part of the instrumentation package assembly 11 containing cameras 41 and 42 and its lens 45 and 46 to flex and bend, stretch and compress when it is impacted. This enables the instrumentation package assembly 11 to resist shock and vibration. Additionally, the corrugated bellows sections 40 and 39 allow the instrumentation package assembly 11 to act as a spring and compress or expand its length without damaging the contents of the instrumentation package assembly 11. When circumstances arise where the baseball players tend to crush the instrumented baseball home plate, the instrumentation package assembly 11 will compress or expand instead of breaking.

An antenna array relay junction shown in FIG. 30A and FIG. 30B is deployed in the baseball stadium and receives radio signals from the instrumented baseball base's antenna array elements 25, 26, 27 and 28. Antenna array elements 25, 26, 27 and 28 are in quadrature to radiate radio signals to the antenna array relay junction with sufficient gain so as to overcome RF noise and provide for a large enough gain bandwidth product to accommodate real-time SD/HD picture quality requirements. The instrumentation package assembly's network transceiver electronics which is part of electronics 21, 22, 14 and 13 also provides a wireless radio transmission means for the instrumented baseball base to receive command and control radio signals from the base station.

The two condenser microphones 23 and 24 enable the viewing audience to hear real-time contacts, impacts and shocks to the instrumented baseball base. Simultaneously live SD/HD TV pictures are taken by the TV cameras 41, 32, 43 and 44 of their field of view of the live action on the playing field.

Microphone electrical connector 51 is mounted on the instrumentation package assembly. 51 mates with an electrical connector which is wired by a cable to a third condenser microphone. This microphone protrudes through the top of the instrumented baseball home plate. Refer to instrumented baseball home plate embodiments shown in drawings FIG. 26A and FIG. 26B and FIG. 26C. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 51 on the instrumentation package assembly shown in the referenced drawings.

The instrumentation package assembly 11 is filled with a dry pressurized gas 47 like nitrogen to prevent the entry of moisture or dirt into its cavity. The o-ring seal between the bottom lid 12 and the enclosure prevents the dry gas 47 from leaking out of the enclosure. Dry nitrogen gas 47 is inserted into the instrumentation package assembly 11 through gas valve 48. A desiccant is also disposed inside the cavity of 11 to collect moisture and prevent any moisture build-up.

The instrumentation package assembly 11 has a removable lid heat sink 12 on its bottom to allow access to the contents inside the cavity of the instrumentation package assembly 11. The lid heat sink 12 allows access to the battery pack 50 for servicing. The removable lid heat sink 12 also allows access to cameras 41, 42, 43 and 44, camera lenses 45, 46, 10 and 7, electronics 21, 22, 14 and 13, quad antennas 25, 26, 27 and 28, and mechanical actuating devices 19, 20, 18 and 17 for servicing. The lower inductive coils 5, 6, 33 and 34 are attached to the bottom outside of the lid heat sink 12. The lid heat sink 12 cools the contents of the instrumentation package assembly.

The fiber optics cable/copper cable connector 4 is attached to the electronics through the bottom of lid heat sink 12. The lid heat sink 12 has a gas valve 48 mounted on it to allow dry nitrogen gas 47 to be injected into the cavity to pressurize the enclosure of the instrumentation package assembly after the lid heat sink 12 is closed. The purpose of the dry nitrogen gas 47 is to protect the contents of the instrumentation package assembly from moisture, dirt and any foreign contaminants. There is an o-ring seal around lid heat sink 12 to prevent the pressurized dry nitrogen gas from escaping from the cavity of the instrumentation package assembly 11 enclosure.

In many venues, the four cameras are chosen to be identical to each other. However, there are occasions when one or more of the four cameras may be chosen to be different from the others in order to accomplish their joint mission of maximizing the entertainment of the viewing audience. For example, the view of different baseball stadiums may be covered more optimally by using a special 3-D stereo camera pair. The cameraman can choreograph the playing field coverage and set up the cameras and their respective lens combinations like a symphony orchestra to maximize the entertainment and viewing pleasure of the on-looking television audience.

Condenser microphones have good fidelity, low weight and low power consumption for their small size. In the future higher quality small sized microphones are likely to become available as the state of the art improves. It is anticipated that we will use these microphones as they become available.

Four of the instrumentation package assembly elements, described in FIG. 19D are assembled into the instrumentation package assembly hub 16 by loading their four corrugated bellows enclosure segments 32, 49, 39 and 40 into four mating machined seats in the hub 16 using their roller bearing ends of the enclosures. Assembling the instrumentation package assembly elements into the instrumentation package assembly hub 16 in this manner assures that the optical/mechanical axes of the instrumentation package assembly elements is coincident with the mechanical axes 29, 31, 38 and 37 of the hub 16 respectively. The angular position of the 1st primary mechanical stop for each of the instrumentation package assembly elements is now adjusted to be aligned with the y-axis 2 direction on the hub 16. In particular, the 1st primary mechanical stop for each of the instrumentation package assembly elements is precisely set at twelve o'clock and then locked in place on the hub 16. This alignment procedure assures that cameras 43, 44, 42 and 41 will now produce precisely centered upright images of any objects that lie along the y-axis 2 of the hub 16 in the twelve o'clock direction relative to the hub 16 of the instrumentation package assembly. This alignment procedure also assures that the picture frames of all six possible combinations of the four cameras 43, 44, 42 and 41 that make up the 3-D stereo camera pairs, are mutually congruent at each of the eight stop positions. The six possible 3-D stereo camera pairs are 41 and 42, 41 and 43, 41 and 44, 42 and 43, 42 and 44, and 43 and 44.

The fiber optics cable/copper cable connector 4 is offset at a distance of about ¾ of the hub radius from the center of hub 16 at twelve o'clock along the hub's y-axis 2 and is accessible from the bottom of the instrumentation package assembly. The fiber optics cable/copper cable connector 4 lies along side and between the instrumentation package assembly elements which it is electrically connected to.

The cameraman, in the remote base station, software selects either the wireless mode of communication, and/or the fiber optics/copper cable mode of communication between each of the instrumented sports paraphernalia (for example, instrumented baseball home plates and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium playing field. These choices are also physically switch selectable by the cameraman with his access through the opening in the bottom of some of the instrumented sports paraphernalia. Refer to FIG. 30A and FIG. 30B, and FIG. 31A and FIG. 31B, and FIG. 32A and FIG. 32B, and FIG. 35A and FIG. 35B and FIG. 35C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented baseball base that are being controlled.

Referring to the Preferred Embodiments Specified in FIG. 21A and FIG. 21B and FIG. 21C, the instrumentation package assembly satisfies all of the following objectives:

It is an objective of the present invention that the instrumentation package assembly is composed of a fiber optics/copper cable connector, four instrumentation package assembly elements, bottom lid, two microphones, four radio antenna elements, four lower induction coils, four instrumentation package assembly elements, dry nitrogen gas, gas valve, battery pack, and microphone connector. It is an objective of the present invention not to block, absorb or reflect radio waves that are transmitted or received by the instrumentation package assembly. It is an objective of the present invention to enable the cameraman in the remote base station to electronically command and control any combination of any two of the four cameras in the instrumented baseball home plate to act as a 3-D stereo camera pair FIG. 22A and FIG. 22B and FIG. 22C The detailed physical elements disclosed in the instrumentation package assembly element drawing shown in FIG. 22A and FIG. 22B and FIG. 22C are identified as follows: 1 is the high definition camera. 2 is the camera lens system. 3 is the optical center line of camera. 4 is the front lens element of the camera lens system. 5 is the front end of the instrumentation package assembly element enclosure containing the camera lens. 6 is the camera lens o-ring seal. 7 is the shoulder of the instrumentation package assembly element enclosure. 8 is the not shown. 9 is not shown. 10 is not shown. 11 is not shown. 12 is not shown. 13 is the vertically mounted pc board section. 14 is the not shown. 15 is the random access memory. 16 is the horizontally mounted printed circuit section. 17 is the Microprocessor. 18 is the solid outer casing section of the instrumentation package assembly element enclosure. 19 is the flexible bellows section of the instrumentation package assembly element enclosure. 20 is the dry gas—nitrogen. 21 is the video MPEG encoder. 22 is the audio MPEG encoder. 23 is the power control switch. 24 is the power regulator. 25 is not shown. 26 is the firmware read only memory. 27 is the MPEG stream encoder. 28 is the network transceiver. 29 is the fiber optics/copper cable line interface. 30 is the impedance matching network. 31 is the antenna phase shift network. 32 is the battery recharging and data isolation network. 33 is the 250 kHz tuning capacitor. 34 is the audio operational amplifier. 35 is an unused slot for future electronic functions. 36 is an unused slot for future electronic functions. 37 is an unused slot for future electronic functions. 38 is an unused slot for future electronic functions. 39 is an unused slot for future electronic functions. 40 is an unused slot for future electronic functions. 41 is an unused slot for future electronic functions. 42 is an unused slot for future electronic functions. 43 is an unused slot for future electronic functions. 44 is an unused slot for future electronic functions. 45 is the electronic package unit for streaming.

Figure 22A:
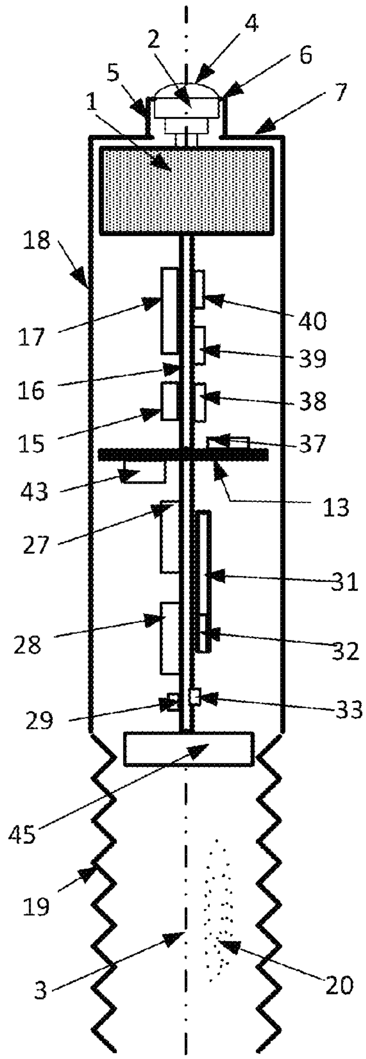
FIG. 22A shows a side view section of the instrumentation package assembly element.

FIG. 22A shows a side view section of the instrumentation package assembly element.

Figure 22B:
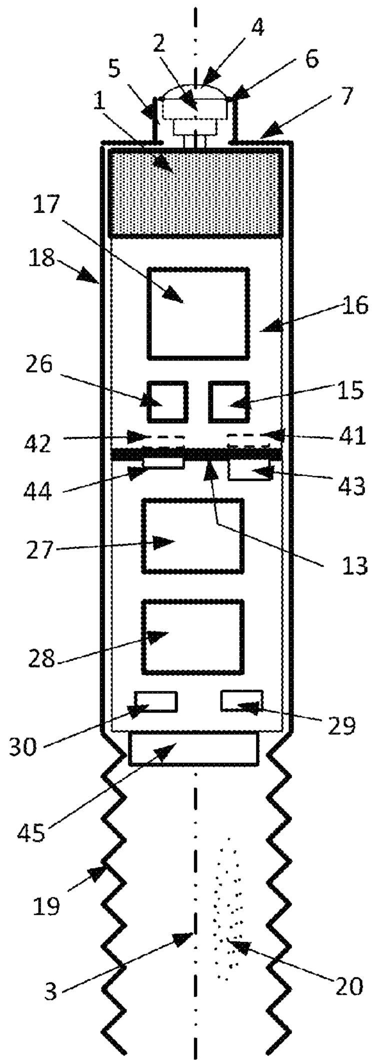
FIG. 22B shows a top view section of the instrumentation package assembly element.

FIG. 22B shows a top view section of the instrumentation package assembly element.

Figure 22C:
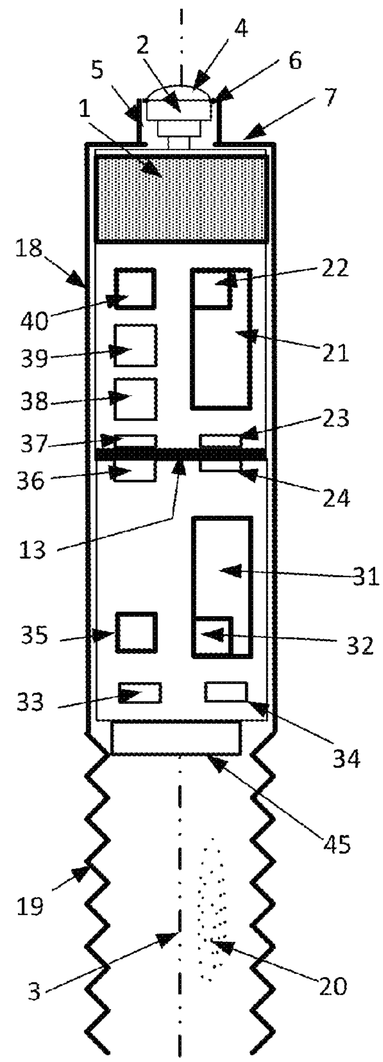
FIG. 22C shows a bottom view section of the instrumentation package assembly element.
Figure 22D:
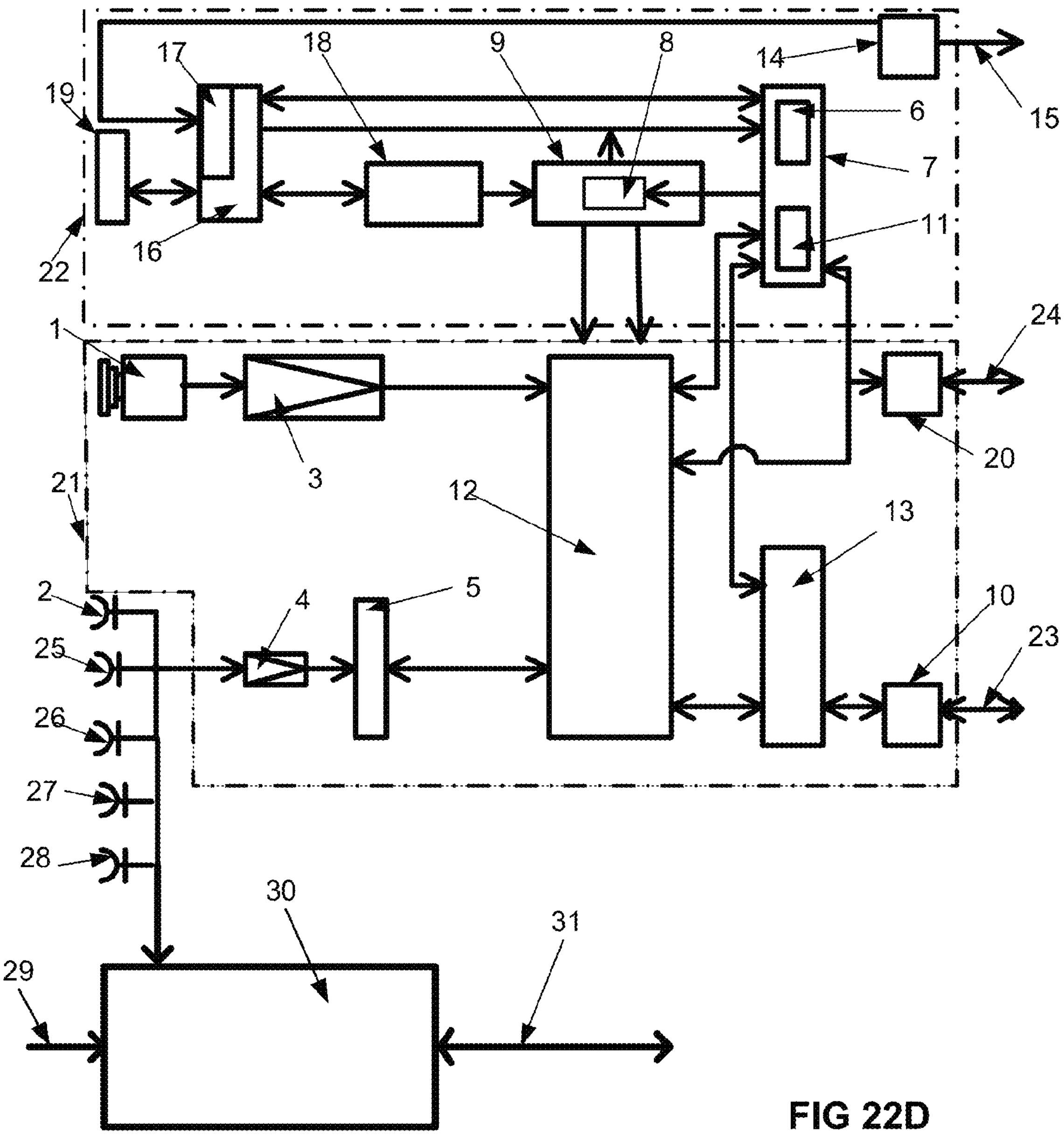
FIG. 22D is a block diagram of the instrumented baseball base instrumentation package assembly element electronics circuit

FIG. 22C shows a bottom view section of the instrumentation package assembly element.

Referring to drawings FIG. 22A and FIG. 22B and FIG. 22C, in a preferred embodiment, the instrumentation package assembly element which is used in the instrumentation package assembly of the instrumented baseball bases, is disclosed. The instrumentation package assembly element is a primary component of the instrumentation package assembly which is contained inside the instrumented baseball bases. The electronics block diagram for FIG. 22A, FIG. 22B, FIG. 22C is shown in FIG. 22D. The instrumentation package assembly element in FIG. 22A, FIG. 22B, FIG. 22C is used in the instrumentation package assembly inside the instrumented baseball bases shown in FIG. 24A, FIG. 24B.

The instrumentation package assembly element contains all the electronics for televising pictures and sounds wirelessly, as well as all the electronics for televising pictures and sounds using fiber optics/copper cable. The instrumentation package assembly element in FIG. 22A, FIG. 22B, FIG. 22C also contains the electronic package unit 45 for streaming the pictures and sounds onto the internet. An electronics block diagram for 45 is shown in FIG. 11A.

FIG. 22D is a block diagram that explains the detailed circuitry, flow of electrical signals and data in the general operation of the instrumentation package assembly element electronics used for televising pictures and sounds, streaming pictures and sounds, controlling the electrical and mechanical functions within the instrumentation package assembly element, and charging the battery pack. FIG. 22E is a block diagram showing the signals and data flows in the power supply and battery charging circuits inside the instrumentation package assembly element.

The vertically mounted pc board section 13 carries the electronics package unit shown in FIG. 11A. The electronics package unit 45 enables the instrumentation package assembly element shown in FIG. 22A and FIG. 22B and FIG. 22C to stream the video from camera 1 onto the internet. The electronics package unit enables the instrumentation package assembly element shown in FIG. 22A and FIG. 22B and FIG. 22C to stream the audio from the microphones that are onboard the instrumented baseball bases onto the internet.

The camera 1 is a Hi-Definition 1080i CCD Camera, whose output is a broadcast grade HD-SDI format signal. In this embodiment 1 has a native 16:9 letter-box aspect ratio. The signal of 1 is fed to the input of compression hardware 21. 1 is also equipped with an auto-focus/iris feature set that may be over-ridden by commands from the system CPU 17. During game play 1 is used to capture the visual action occurring around the sides of the instrumented baseball bases and the instrumented baseball home plate equipped with a instrumentation package assembly and convey those pictures via MPEG stream encoder 27 and network transceiver 28 to the remote base station for further processing. Compression hardware 21 is a real time H.264 MPEG compression hardware module. Compression hardware module 21 compresses the signals inputted to them from 1 into MPEG format using the H.264 Protocol and applies this elementary stream to MPEG stream encoder 27. Compression is needed to reduce bandwidth requirements prior to transmission via radio using network transceiver 28. Compression hardware module 21, also receives commands from the CPU 17, which set the compression parameters associated with the H.264 protocol.

In another preferred embodiment, camera 1 contains part of or all the functions of compression hardware module 21 as part of its own internal circuitry, thus saving some board space during manufacturing, in which case the additional control commands from CPU 17 would be sent directly to cameras 1 in-lieu of compression hardware module 21.

A microphone referred to in FIG. 22D that is used during game play serves as the signal source for operational amplifiers 34. 34 is configured as a low noise high gain microphone pre-amplifier. 34 amplifies signals inputted from the condenser microphone and provides adequate voltage gain and equalization to drive the analog to digital converters inside MPEG Audio Encoder 22. which further combines the resultant elementary audio data packets into a single elementary stream and applies it to MPEG stream encoder 27 prior to transmission to the remote base station by 28.

28 is a network transceiver. This transceiver is inputted composite IP MPEG Stream image and audio data from 27 along with system control status data packets from system control microprocessor 17. Network transceiver 28 then transmits this data using, for example, the 802.11(xx) protocol via the unlicensed 2.4 or 5.8 GHz radio spectrum via radio using an antenna located within the instrumentation package assembly to the remote base station. 28 also transmits and receives control commands to and from the remote base station when they are intercepted by this antenna using the via the unlicensed 2.4 or 5.8 GHz radio spectrum. This control commands are coupled to and from 17. 17 is used to control the flow of system command functions. This command functions are used to adjust the operating parameters of the system based on instructions that it receives from the remote base station.

Additionally, 28 will also communicate and convey high quality picture and sound information data packets along with the aforementioned system control commands over a fiber optic connection via fiber optics/copper cable line driver interface 29. Use of such a fiber optic/copper cable connection between the instrumented baseball base or instrumented home plate completely eliminates bandwidth and/or interference issues that are sometimes encountered with a solely RF based system. Stadium owners can also benefit by using fiber optic connectivity since it permits easier future systems upgrades. System command function instructions are received by 17 from battery charging and stand-by data isolation network circuit 32. This is needed to allow initialization of the instrumentation package inside the instrumented baseball base or instrumented home plate.

17 utilizes an operating firmware stored at the time of manufacture on system ROM 26 and executes this firmware upon loading system RAM 15 with its contents. 28 is a network transceiver. 28 is used to provide a wireless RF link operating on the unlicensed 2.4 or 5.8 GHz radio spectrum between the instrumented base or instrumented home plate and the base station, utilizing for example the 802.11(xx) Protocol. 28 transmits and receives control commands from system control microprocessor 17. These control commands specify the exact RF channel frequency, RF channel power output and antenna phasing via phase shift network 31 when an instrumented baseball base or instrumented home plate equipped with a phased antenna array is being used. Signals traveling to and from 28 as RF signals are coupled, via an impedance matching network 30, to the atmosphere by an antenna system located within the instrumented baseball base or instrumented home plate. This antenna system, operating within the unlicensed 2.4 or 5.8 GHz radio spectrum, provides an isotropic gain of 3 db or better is used to capture and radiate the RF energy transmitted and/or received between the remote base station and an instrumented baseball base or instrumented home plate so equipped with a instrumentation package assembly.

The instrumentation package assembly utilizing a phased antenna array is shown. A phased array is desirable since it permits a finite adjustment of the transmitted and/or received RF propagation pattern such that an optimum RF path between the remote base station and the instrumented home plate is maintained. This allows interference issues which can occur in some stadiums to be resolved.

Power supply regulator 24 supplies power to all the elements shown in FIG. 22A and FIG. 22B and FIG. 22C. 24 receives power from a rechargeable battery pack located within the instrumentation package. In a preferred embodiment, a lithium ion battery pack is used because of the heavy current requirements expected during the length of time of a typical baseball game.

Alternately 24 can receive dc power from a dc power port from a fiber optics/copper cable receptacle located on the bottom of the instrumented baseball base or instrumented baseball home plate. The battery pack or aforementioned dc power port delivers 3.3 volt dc to 24 which in turn supplies power to all the elements shown in FIG. 22A and FIG. 22B and FIG. 22C.

The instrumentation package assembly also contains a set of inductive pickup coils that are used to couple electrical energy from outside of the instrumented baseball base or instrumented home plate to the aforementioned battery pack during the recharging of the battery pack via battery charging and stand-by data separator circuit 32. The aforementioned inductive pickup coil is tuned by a capacitor 33 so as to resonate at a frequency near 250 kHz. 24 contains a switching circuit 23 that receives control commands from system control microprocessor 17. These commands instruct and enable 24 to supply power to the rest of the electronic components that comprise FIG. 22A and FIG. 22B and FIG. 22C. These commands take 24 out of the stand-by mode and put it in the power-on mode.

A condenser microphone and an antenna array are parts of the instrumentation package assembly, but are not part of the instrumentation package assembly element. They are mounted separately and external to the instrumentation package assembly element's enclosure 18. The condenser microphone and the antenna array are electrically connected to the electronics inside the instrumentation package assembly element's enclosure 18.

The purpose of the condenser microphone located inside the instrumentation package assembly is to capture the sounds of the players striking or sliding into the instrumented baseball bases and instrumented baseball home plate equipped with the instrumentation package assembly. The condenser microphone which is used during game play serves as the signal source for operational amplifiers 34. 34 is configured as low noise high gain microphone pre-amplifier. 34 amplifies signals inputted from the condenser microphone and provides adequate voltage gain and equalization to drive the analog to digital converters inside MPEG Audio Encoder 22 which further combines the resultant elementary audio data packets into a single stream and applies them to the input of 27 prior to transmission to the antenna array relay junction referred to in FIG. 30A and FIG. 30B by 28.

Condenser microphones have good fidelity for their small size, weight and power consumption. In the future higher quality smaller sized microphones are likely to become available as the state of the art improves. It is anticipated that we will use these microphones as they become available.

27 is an MPEG stream encoder whose function is to combine the resultant individual elementary MPEG streams that represent the images and sounds into a single MPEG stream prior to transmission to the remote base station via network transceiver 28. This transceiver is inputted composite MPEG stream image and audio data from 27 along with system control status data packets from system control microprocessor 17. Network transceiver 28 then transmits this data using, for example, the 802.11(xx) protocol via the unlicensed 2.4 or 5.8 GHz radio spectrum via radio using 28 and an antenna located within the instrumentation package assembly to the antenna array relay junction referred to in FIG. 30A and FIG. 30B. 28 also outputs control commands from the remote base station when they are received by this antenna via the unlicensed 2.4 or 5.8 GHz radio spectrum. This control commands are inputted to 17. 17 is used to control the flow of system command functions. This command functions are used to adjust the operating parameters of the system based on instructions that it receives from the antenna array relay junction.

Alternately, system command function instructions may be received by 17 from the battery charging and stand-by data separator circuit 32. This is needed to allow initialization of the instrumentation package inside the instrumented baseball base and instrumented baseball home plate. 17 utilizes an operating firmware stored at the time of manufacture on system ROM 26 and executes this firmware upon loading system RAM 15 with its contents.

28 is a network transceiver. 28 is used to provide a wireless RF link operating on the unlicensed 2.4 or 5.8 GHz radio spectrum between the instrumented baseball bases and instrumented baseball home plates and the antenna array relay junction, utilizing, for example, the 802.11(xx) Protocol. 28 transmits the MPEG stream from 27 and also transmits and receives control commands to and from system control microprocessor 17. These control commands specify the exact RF channel frequency and RF channel power output that will be used during subsequent operation of the system. Signals traveling to and from 28 as RF signals are coupled to the atmosphere by an antenna within the instrumentation package assembly inside the instrumented baseball bases and instrumented baseball home plates. This antenna system, operating within the unlicensed 2.4 or 5.8 GHz radio spectrum, provides an isotropic gain of 3 db or better to reach the remote base station's antenna's wireless network access point referred to in FIG. 30A and FIG. 30B.

The instrumented baseball base and instrumented baseball home plate antennas are used to capture and radiate the RF energy transmitted and/or received between the antenna array relay junction and the instrumented baseball bases and instrumented baseball home plate so equipped with the instrumentation package assembly.

Power supply regulator 24 supplies power to all the elements shown in FIG. 22A and FIG. 22B and FIG. 22C. 24 receives power from a rechargeable battery pack located within the instrumentation package assembly. In a preferred embodiment, a lithium ion battery pack is used because of the heavy current requirements expected during the length of time of a typical baseball game. This battery pack delivers 3.3 volt dc to 24 which in turn supplies power to all the electrical elements.

The instrumentation package assembly also contains inductive pickup coils that are used to couple electrical energy from outside of the instrumented baseball base and instrumented baseball home plate to the battery pack during the charging of the battery pack via battery charging and stand-by data separator circuit 32. The inductive pickup coils are tuned by a capacitor 33 so as to resonate at a frequency near 250 kHz. 24 contains a switching circuit 23 that receives control commands from system control microprocessor 17. These commands instruct and enable 24 to supply power to the rest of the electronic components in the instrumentation package assembly. These commands take 24 out of the stand-by mode and put it in the power-on mode.

The instrumentation package assembly element has an air-tight enclosure that houses all of its components. The enclosure is contiguous and constructed from polycarbonates, ABS and fiber reinforced plastics. The enclosure has three sections. 5 is the small diameter cylindrical section. 18 is the large diameter cylindrical section. 19 is the flexible corrugated bellows section.

Camera lens 2 is mechanically and electrically attached to camera 1. Camera lens 2 images objects in its field of view onto the CCD sensor array of camera 1. Camera 1 is mounted inside the large diameter cylindrical enclosure section 18. The camera lens 2 is mounted within the small diameter cylindrical section 5. The camera lens 2 is sealed inside 5 with the o-ring seal 6. O-ring seal 6 is air-tight and moisture proof. The supporting electronics components 13, 17, 21, 22, 23, 24, 27, 28, 31, 32, 33 and 34 are all mounted inside the cylindrical enclosure 18 and electrically connected to camera 1.

The corrugated bellows section 19 allows the instrumentation package assembly element to flex, stretch and compress and absorb shock and vibration. The corrugated bellows section 19 is attached to the main center hub of the instrumentation package assembly (not shown) with an air-tight seal. The optical and mechanical axes of camera 1, camera lens 2, section 5 and section 18 is 3.

It is desirable to keep the size and weight of the instrumentation package assembly elements as small as possible. The diameter of section 18 is dependent on the size of the largest physical component that is contained inside 18. In today's technology, camera 1 is the largest physical component.

Today Camera 1 keeps the minimum diameter of section 18 to about ¾ inch. As the technology for HD-SDI TV cameras improves, camera 1 will become physically smaller, and the ¾ inch diameter will be reduced.

The diameter of section 5 is dependent on the size of the largest physical component that is contained inside 5. The largest physical component that is contained inside 5 is camera lens 2. In today's technology, camera lens 2 is about ⅛ to ⅜ inch in diameter. As the technology for both HD-SDI TV cameras and lenses improves, miniaturization will improve and camera lens 2 will become physically smaller, and the diameter of section 5 will be reduced. It is desirable to keep the diameter of section 5 as small as possible in order to keep the diameter of the circular opening in the baseball base's cover as small as possible to make the openings unobtrusive to the baseball players.

The cavities of enclosure sections 5, 18 and 19 are filled with dry nitrogen gas 20 under pressure to prevent dirt and moisture from entering the enclosure.

Camera lens 2 is chosen by the cameraman. A variety of camera lens types can be chosen for camera lens 2. These types range from extremely wide angle lenses to more standard lens types with narrower fields of view. Extremely wide angle lenses of the fish-eye variety and ones with nearly 180 degree fields of view are accommodated by 5.

Different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

The functions of the camera lens 2 such as zoom, focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lens 2 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. Items 35, 36, 37, 38, 39, 40, 41, 42, 43 and 44 are unused slots for future expansion of electronic functions.

Referring to the Preferred Embodiment Specified in FIG. 22A and FIG. 22B and FIG. 22C, the instrumentation package assembly element satisfies all of the following objectives:

It is an objective of the present invention that the instrumentation package assembly element is composed of a high definition camera, camera lens system, enclosure, camera lens shell o-ring seal, shoulder of the enclosure, vertically mounted pc board section, random access memory, horizontally mounted printed circuit section, microprocessor, solid outer casing section of the enclosure, flexible bellows section of the enclosure, dry gas, video MPEG encoder, audio MPEG encoder, power control switch, power regulator, firmware read only memory, MPEG stream encoder, network transceiver, fiber optics/copper cable line interface, impedance matching network, antenna phase shift network, battery recharging and data isolation network, 250 kHz tuning capacitor, audio operational amplifier, unused slots for future electronic functions. It is an objective of the present invention not to block, absorb or reflect radio waves that are transmitted or received by the instrumentation package assembly.

FIG. 22D

The detailed physical elements disclosed in the instrumented baseball base's instrumentation package assembly element electronics block diagram shown in FIG. 22D are identified as follows: 1 is a high definition camera. 2 is a condenser microphone. 3 is a video MPEG encoder. 4 is a audio operational amplifier. 5 is a audio MPEG encoder. 6 is a random access memory. 7 is a microprocessor. 8 is a power control switch. 9 is a power regulator. 10 is a rf antenna phasing and impedance matching module. 11 is a firmware read only memory. 12 is an MPEG stream encoder. 13 is a network transceiver. 14 is a dc power over fiber line interface. 15 is a dc power from fiber optics/copper cable port. 16 is a battery recharging and data isolation network. 17 is a 250 kHz tuning capacitor. 18 is a rechargeable battery. 19 is a induction coil interface. 20 is a fiber optics/copper cable line driver interface. 21 is the power and control interconnect interface for image, sound and RF components etc. 22 is a control, power supply and battery charging components. 23 RF feed line to antenna assembly. 24 is a fiber optic/copper cable feed line to a fiber optic/copper cable receptacle located in the bottom of the instrumented baseball base. 25 is a condenser microphone. 26 is a condenser microphone. 27 is a condenser microphone. 28 is a condenser microphone. 29 is the camera 1 output feed. 30 is the electronic package unit for streaming onto the internet. 32 is an RF feed line to the antenna of the instrumentation package assembly.

FIG. 22D is a block diagram of the instrumented baseball base instrumentation package assembly element electronics circuit.

Referring to FIG. 22D, in a preferred embodiment, the electronic circuit within the instrumentation package assembly element specified in FIG. 22A and FIG. 22B and FIG. 22C is disclosed. The signals and data flows in the electronic circuit shown in FIG. 22D is specified.

Camera 1 is a Hi-Definition 1080i CCD camera, whose output is a broadcast grade HD-SDI format signal. In this embodiment this 1 has a native 16:9 letter-box aspect ratio. The signal of 1 is fed to the input of video MPEG encoder compression hardware 3. 1 is also equipped with an auto-focus/iris feature set that can be over-ridden by commands from the system CPU 7 in turn issued by the remote base station system software. During game play 1 is used to capture the action occurring around either end of the instrumented baseball base or instrumented home plate and convey these captured pictures and sounds via MPEG stream encoder 12 and network transceiver 13 to the remote base station for further processing. Compression hardware 3 is a real time H.264 MPEG compression hardware module. Compression hardware module 3 compresses the signals inputted to them from 1 into MPEG format using the H.264 Protocol and applies the resultant elementary MPEG stream to 12. Compression is needed to reduce the bandwidth requirements prior to transmission via radio using network transceiver 13.

Compression hardware module 3, also receives commands from the CPU 7, which set the compression parameters associated with the H.264 protocol.

Camera 1 may contain part of or all the functions of compression hardware module 3 as part of their own internal circuitry, thus saving some board space during manufacturing, in which case the additional control commands from CPU 7 would be sent directly to cameras 1 in-lieu of compression hardware module 3.

A set of three condenser microphones, shown as 2, 30 and 31 in FIG. 22D are located inside the instrumented baseball bases. Their purpose is to capture the ambient sounds of players around the baseball bases as well as the sound of players striking or sliding into the instrumented baseball base itself. These microphones used during game play serve as the signal source for operational amplifier 4. 4 is configured as a low noise high gain microphone pre-amplifier. 4 amplifies the signals inputted from the condenser microphones and provides adequate voltage gain and equalization to drive the analog to digital converters inside MPEG Audio Encoder 5 which further combines the resultant elementary audio data packets into a single stream and applies it to MPEG stream encoder 12 prior to transmission to the remote base station by 13.

A condenser microphone, 2 shown in FIG. 22D is located inside the instrumented baseball base or instrumented home plate. Its purpose is to capture the sounds of players striking or sliding into the instrumented baseball base or instrumented home plate. This microphone used during game play serves as the signal source for operational amplifiers 4. 4 is configured as low noise high gain microphone pre-amplifier. 4 amplifies signals inputted from the condenser microphone and provides adequate voltage gain and equalization to drive the analog to digital converters inside MPEG Audio Encoder 5 which further combines the resultant elementary audio data packets into a single stream and applies it to MPEG stream encoder 12 prior to transmission to the remote base station by 13.

13 is a network transceiver. This transceiver is inputted composite MPEG Stream image and audio data from 12 along with system control status data IP packets from system control microprocessor 7. Network transceiver 13 then transmits this data using, for example, the 802.11(xx) protocol via the unlicensed 2.4 or 5.8 GHz radio spectrum via radio using an antenna located within the instrumentation package assembly of the instrumented baseball base or instrumented home plate to the remote base station; 13 also outputs control commands from the remote base station when they are received by this antenna via the unlicensed 2.4 or 5.8 GHz radio spectrum. These control commands are inputted to 7. 7 is used to control the flow of system command functions. These command functions are used to adjust the operating parameters of the system based on instructions that it receives from the remote base station.

Additionally, 13 can communicate and convey high quality picture and sound information data packets along with the aforementioned system control commands over a fiber optic and/or copper cable connection via fiber optics/copper cable line driver interface 20 via a fiber optic/copper cable feed line 24 which is interconnected with a fiber optic/copper cable receptacle located on the bottom of the instrumented baseball base or instrumented home plate. Use of such a fiber optic/copper cable connection between the instrumented baseball base or instrumented baseball home plate completely eliminates bandwidth and/or interference issues that are sometimes encountered with a solely RF based system. Stadium owners can also benefit by using fiber optic connectivity since it permits easier future systems upgrades.

System command function instructions can alternately be received by 7 from battery charging and stand-by data separator circuit 16. This is needed to allow initialization of the instrumentation package inside the instrumented baseball base or instrumented home plate. 7 utilizes an operating firmware stored at the time of manufacture on system ROM 11 and executes this firmware upon loading system RAM 6 with its contents. 13 is a network transceiver. 13 is used to provide a wireless RF link operating on the unlicensed 2.4 or 5.8 GHz radio spectrum between the instrumented base or instrumented home plate and the remote base station, utilizing, for example, the 802.11(xx) Protocol. 13 transmits the MPEG stream from 12 and also transmits and receives control commands to and from system control microprocessor 7. These control commands specify the exact RF channel frequency, RF channel power output and antenna phasing via an impedance matching and phase shift network 10 when an instrumented baseball base or instrumented home plate equipped with a phased antenna array is being used.

Signals traveling to and from 13 as RF signals are coupled, via an RF feed line 23 and impedance matching network 30, to the atmosphere by an antenna system located within the instrumented baseball base or instrumented home plate. This antenna system, operating within the unlicensed 2.4 or 5.8 GHz radio spectrum, provides an isotropic gain of 3 db or better is used to capture and radiate the RF energy transmitted and/or received between the remote base station and an instrumented baseball base or instrumented home plate so equipped with a instrumentation package assembly.

The instrumentation package assembly utilizing a phased antenna array is shown. A phased array is desirable since it permits a finite adjustment of the transmitted and/or received RF propagation pattern such that an optimum RF path between the remote base station and the instrumented home plate be maintained. This allows interference issues which can occur in some stadiums to be resolved.

Power supply regulator 9 supplies power to all the elements showed in FIG. 22D. 9 receives power from a rechargeable battery pack 18 located within the instrumentation package assembly. In a preferred embodiment, a lithium ion battery pack is used because of the heavy current requirements expected during the length of time of a typical baseball game. Alternately 9 can receive dc power from a dc power port of a fiber optics/copper cable receptacle located on the bottom of the instrumented baseball base or instrumented home plate via fiber optics/copper cable dc power interface 14 and dc power feed line 15 from the aforementioned fiber optics/copper cable receptacle. The rechargeable battery pack 18 delivers 3.3 volt dc to 9 which in turn supplies power to all the elements shown in FIG. 22D. However, to ensure Long Battery Life, the main functional electronic components shown within the boundaries of dotted lines 21 receive dc power in a reduced state or can be switched off. The control, power supply and battery charging electronic components within the dotted line boundaries of 22 receive dc power from 18 whenever 18 is sufficiently charged to place the components of 22 into a steady stand-by state.

The instrumentation package assembly also contains a set of inductive pickup coils that is used to couple electrical energy from outside of the instrumented baseball base or instrumented home plate via induction coil interface 19 to the battery pack during the recharging of the battery pack via battery charging and stand-by data separator circuit 22. The aforementioned inductive pickup coil is tuned by a capacitor 17 so as to resonate at a frequency near 250 kHz. 22 contains a switching circuit 8 that receives control commands from system control microprocessor 7. These commands instruct and enable 22 to supply power to the rest of the electronic components that comprise FIG. 22D. These commands take 9 out of the stand-by mode and put it in the power-on mode.

A condenser microphone 5 shown in FIG. 22D is located inside the instrumentation package assembly whose purpose is to capture the sounds of players striking or sliding into the base or plate so equipped with the instrumentation package assembly. This microphone used during game play serves as the signal source for operational amplifiers 34. 34 is configured as low noise high gain microphone pre-amplifier. 34 amplifies signals inputted from the condenser microphone and provides adequate voltage gain and equalization to drive the analog to digital converters inside MPEG Audio Encoder 22. which further combines the resultant elementary audio data packets into a single stream and applies it to MPEG stream encoder 27 prior to transmission to the remote base station by 28.

28 is a network transceiver. This transceiver is inputted the composite MPEG Stream image and audio data from 27 along with system control status data from system control microprocessor 17. Network transceiver 28 then transmits this data using, for example, the 802.11(xx) protocol via the unlicensed 2.4 or 5.8 GHz radio spectrum via radio using an antenna located within the instrumentation package assembly to the remote base station 28 also outputs control commands from the remote base station when they are received by this antenna using the 802.11(xx) protocol via the unlicensed 2.4 or 5.8 GHz radio spectrum. This control commands are inputted to 17. 17 is used to control the flow of system command functions. This command functions are used to adjust the operating parameters of the system based on instructions that it receives from the remote base station.

Alternately, system command function instructions may be received by 17 from battery charging and stand-by data separator circuit 32. This is needed to allow initialization of the instrumentation package assembly inside the base or home plate. 17 utilizes an operating firmware stored at the time of manufacture on system ROM 26 and executes this firmware upon loading system RAM 15 with its contents. 28 is a network transceiver. 28 is used to provide a wireless RF link operating on the unlicensed 2.4 or 5.8 GHz radio spectrum between the instrumented base or instrumented home plate and the remote base station, utilizing, for example, the 802.11 (xx) Protocol. 28 transmits the MPEG stream from 27 and also receives control commands from system control microprocessor 17. These control commands specify the exact RF channel frequency and RF channel power output that will be used during subsequent operation of the system. Signals traveling to and from 28 as RF signals are coupled to the atmosphere by an antenna within the instrumentation package assembly equipped base or home plate. This antenna system, operating within the unlicensed 2.4 or 5.8 GHz radio spectrum, provides an isotropic gain of 3 db or better to reach the remote base station's wireless network access point transceiver. The antenna is used to capture and radiate the RF energy transmitted and/or received between the remote base station and an instrumented base or instrumented home plate so equipped with a instrumentation package assembly.

Power supply regulator 24 supplies power to all the elements shown in FIG. 22D. 24 receives power from a rechargeable battery pack located within the instrumentation package assembly. In a preferred embodiment, a lithium ion battery pack is used because of the heavy current requirements expected during the length of time of a typical baseball game. This battery pack delivers 3.3 volt dc to 24 which in turn supplies power to all the elements shown in FIG. 22D.

The instrumentation package assembly also contains an inductive pickup coils that is used to couple electrical energy from outside of the base or home plate so equipped with the instrumentation package assembly to the aforementioned battery pack during the recharging of the battery pack via battery charging and stand-by data separator circuit 32. The aforementioned inductive pickup coil is tuned by a capacitor 33 so as to resonate at a frequency near 250 kHz. 24 contains a switching circuit 23 that receives control commands from system control microprocessor 17. These commands instruct and enable 24 to supply power to the rest of the electronic components that comprise FIG. 22D. These commands take 24 out of the stand-by mode and put it in the power-on mode.

The cameraman, in the remote base station, software selects either the wireless mode of communication, and/or the fiber optics/copper cable mode of communication between each of the instrumented sports paraphernalia and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia i.e. bases, plates and pitcher's rubbers. Refer to FIG. 30A and FIG. 30B, and FIG. 31A and FIG. 31B, and FIG. 32A and FIG. 32B, and FIG. 35A and FIG. 35B and FIG. 35C and figures elsewhere in the present invention for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver 13 within the instrumented sports paraphernalia are applied to its microprocessor 7, which then in turn upon executing the instructions stored within the contents of its firmware 6 applies a pulse coded control signal via the power and control interconnect interface 21 inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface 21 as shown in FIG. 22D, which is represented by dotted lines, consists of the electrical control wiring to and from the electronic components of the instrumented sports paraphernalia that are being controlled.

Referring to the Preferred Embodiment Specified in FIG. 22D, the instrumentation package assembly element electronics satisfies all of the following objectives:

It is an objective of the present invention that the instrumentation package assembly element electronics be composed of a high definition camera, three condenser microphone connectors, a video MPEG encoder, an audio operational amplifier, audio MPEG encoder, random access memory, microprocessor, power control switch, power regulator, rf antenna phasing and impedance matching module, firmware read only memory, MPEG stream encoder, network transceiver, dc power/fiber line interface, dc power from fiber optics/copper cable port, battery recharging and data isolation network, 250 kHz tuning capacitor, rechargeable battery, induction coil interface, fiber optics/copper cable line driver interface, main image/sound and RF components, control/power supply and battery charging components, RF feed line to antenna assembly, fiber optic/copper cable feed line to a fiber optic/copper cable receptacle, and power and control interconnect interface.

FIG. 23A and FIG. 23B and FIG. 23C

The detailed physical elements disclosed in the instrumented baseball home plate battery pack charging unit drawings shown in FIG. 23A and FIG. 23B and FIG. 23C are identified as follows: 1 is the top of the instrumented baseball home plate. 2 is the side of the instrumented baseball home plate facing the pitcher. 3 is the side of the instrumented baseball home plate facing the right handed batter. 4 is a side of the apex of the instrumented baseball home plate. 5 is a side of the apex of the instrumented baseball home plate. 6 is the side of the instrumented baseball home plate facing a left handed batter. 7 is the bottom of the instrumented baseball home plate. 8 is the x-axis of the instrumented baseball home plate. 9 is the y-axis of the instrumented baseball home plate. 10 is the primary induction coil winding inside the battery pack charging unit. 11 is the top edge of the instrumented baseball home plate. 12 is a side edge of the instrumented baseball home plate facing a left handed batter. 13 is the apex of the instrumented baseball home plate. 14 is the z-axis of the instrumented baseball home plate. 15 is the battery pack charging unit. 16 is the instrumented baseball home plate battery pack. 17 is the upper induction coil. 18 is the lower induction coil. 19 is the instrumentation package assembly.

FIG. 23A is a diagram of the top view of the battery pack charging unit sitting on top of and charging the instrumented baseball home plate.

FIG. 23B is a diagram of the side view of the battery pack charging unit sitting on top of and charging the instrumented baseball home plate.

FIG. 23C is a diagram of the front view of the battery pack charging unit sitting on top of and charging the instrumented baseball home plate.

Referring to drawings FIG. 23A and FIG. 23B and FIG. 23C, in a preferred embodiment, a battery pack charging unit used to wirelessly charge the battery pack inside the instrumented baseball home plate, is disclosed. This same battery pack charging unit is used to wirelessly charge the battery pack inside the instrumented baseball bases shown in FIG. 23D and FIG. 23E and FIG. 23F.

The battery pack charging unit 15 is shown sitting flat on the top 1 of the instrumented baseball home plate. The battery pack charging unit 15 may be placed on the instrumented baseball home plate while the instrumented baseball home plate is either on or off the baseball playing field. The purpose of the battery pack charging unit 15 is to wirelessly charge the battery pack 16 inside the instrumented baseball home plate. The battery pack charging unit 15 has its own source of electrical energy. This source may be either internal or external to the battery pack charging unit 15. The battery pack charging unit has its own electronics (not shown).

The battery pack 16 is part of the instrumentation package assembly 19 electronics power circuitry inside the instrumented baseball home plate. The battery pack charging unit 15 has a primary induction coil winding 10 inside it. The instrumented baseball home plate has an upper secondary induction coil winding 17, and a lower secondary induction coil winding 18 inside it. The upper secondary induction coil winding 17 and a lower secondary induction coil winding 18 are part of the instrumentation package assembly 19.

The primary induction coil winding 10 of the battery pack charging unit 15 induces a 250 kHz time varying magnetic flux down into the instrumented baseball home plate which sits below it. The magnetic flux goes through the top 1 of the instrumented baseball home plate and links the two secondary induction coil windings 17 and 18 which are part of the instrumentation package assembly 19 battery charging circuitry. This field induces a voltage across the two secondary induction coil windings 17 and 18 to form an air core transformer. This voltage is used to charge the battery pack 16. For circuit details, refer to FIG. 23G which discloses the battery pack charging circuitry.

When the battery pack charging unit 15 is placed on top 1 of the instrumented baseball home plate, it is aligned so that its z-axis coincides with the z-axis 14 of the instrumented baseball home plate. This assures that the primary induction coil winding 10 in the battery pack charging unit 15 will be coaxial with the secondary induction coil windings 17 and 18 inside the instrumented baseball home plate to maximize the flux linkage between them and the efficiency of the wireless energy transfer.

The battery pack charging unit's 15 footprint is no larger than the footprint of the instrumented baseball home plate 1. Referring to the Preferred Embodiments Specified in FIG. 23A and FIG. 23B and FIG. 23C, the instrumented baseball plate charging station unit satisfies all of the following objectives:

It is an objective of the present invention that the instrumented baseball plate charging station unit is composed of an enclosure, primary induction coil winding, electronics (not shown). It is an objective of the present invention to wirelessly charge the battery pack inside the instrumented baseball home plate. It is an objective of the present invention that the same charging station unit be used to charge the battery packs in the instrumented baseball bases, instrumented baseball home plates, instrumented baseball pitcher's rubbers, and instrumented ice hockey pucks.

Figure 23F:
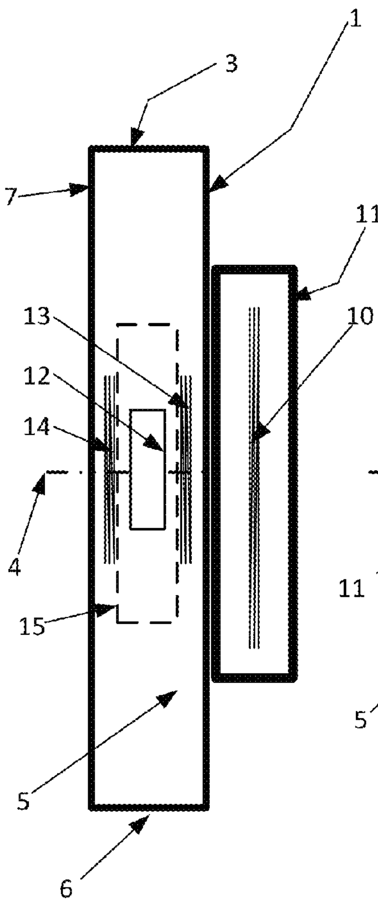
FIG. 23F is a diagram of the front view of the battery pack charging unit sitting on top of and charging the instrumented baseball base.
Figure 23D:
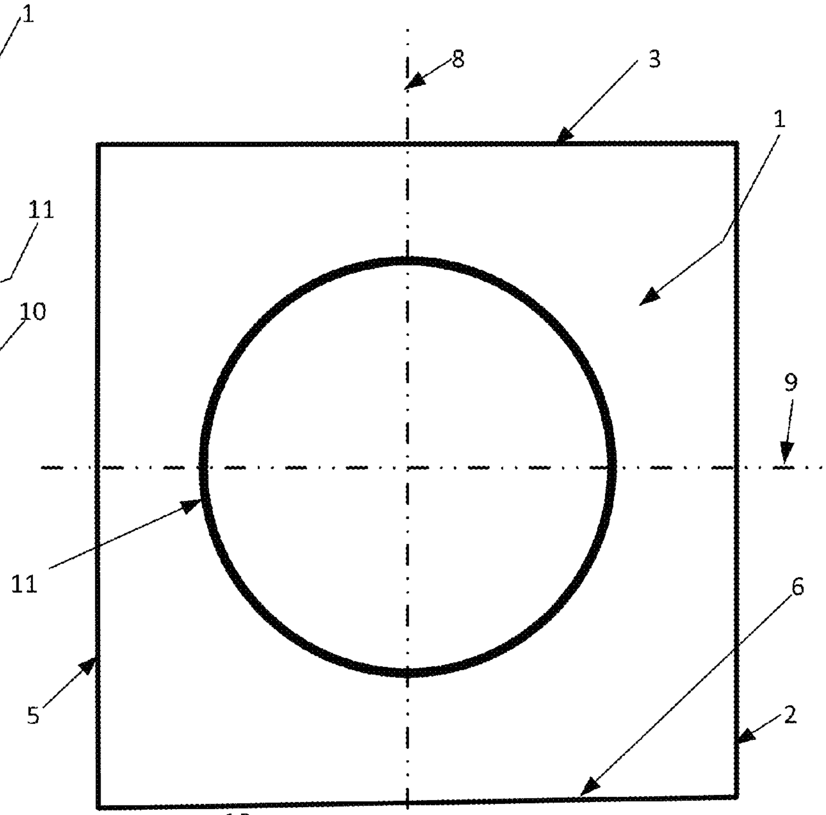
FIG. 23D is a diagram of the top view of the battery pack charging unit sitting on top of and charging the instrumented baseball base.
Figure 23E:
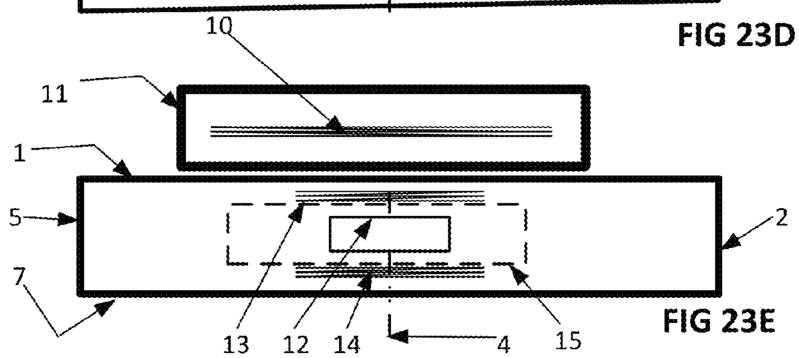
FIG. 23E is a diagram of the side view of the battery pack charging unit sitting on top of and charging the instrumented baseball base.

FIG. 23D and FIG. 23E and FIG. 23F

The physical elements disclosed in the instrumented baseball base charging station unit drawings shown in FIG. 23D and FIG. 23E and FIG. 23F are identified as follows: 1 is the top of the instrumented baseball base. 2 is the side of the instrumented baseball base. 3 is the side of the instrumented baseball base. 4 is the z-axis of the instrumented baseball base. 5 is a side of the instrumented baseball base. 6 is the side of the instrumented baseball base. 7 is the bottom of the instrumented baseball base. 8 is the y-axis of the instrumented baseball base. 9 is the x-axis of the instrumented baseball base. 10 is the primary induction coil inside the battery pack charging unit. 11 is the battery pack charging unit. 12 is the battery pack. 13 is the upper induction coil. 14 is the lower induction coil. 15 is the instrumentation package assembly.

FIG. 23D is a diagram of the top view of the battery pack charging unit sitting on top of and charging the instrumented baseball base.

FIG. 23E is a diagram of the side view of the battery pack charging unit sitting on top of and charging the instrumented baseball base.

FIG. 23F is a diagram of the front view of the battery pack charging unit sitting on top of and charging the instrumented baseball base.

Referring to drawings FIG. 23D and FIG. 23E and FIG. 23F, in a preferred embodiment, a battery pack charging unit used to wirelessly charge the battery pack inside the instrumented baseball base, is disclosed. This same battery pack charging unit is used to wirelessly charge the battery pack inside the instrumented baseball home plate shown in FIG. 23A and FIG. 23B and FIG. 23C.

The battery pack charging unit 11 is shown sitting flat on the top 1 of the instrumented baseball base. The battery pack charging unit 11 may be placed on top of the instrumented baseball base while the instrumented baseball base is either on or off the baseball playing field. The purpose of the battery pack charging unit 11 is to wirelessly charge the battery pack 12 inside the instrumented baseball base. The battery pack charging unit 11 has its own source of electrical energy. This source may be either internal or external to the battery pack charging unit 11.

The battery pack 11 is part of the instrumentation package assembly 15 electronics power circuitry inside the instrumented baseball base. The battery pack charging unit 11 has a primary induction coil winding 10 inside it. The instrumented baseball base has an upper secondary induction coil winding 13, and a lower secondary induction coil winding 14 inside it. The upper secondary induction coil winding 13 and a lower secondary induction coil winding 14 are part of the instrumentation package assembly 15.

The primary induction coil winding 10 in the battery pack charging unit 11 induces a 250 kHz time varying magnetic flux down into the instrumented baseball base which sits below it. The magnetic flux goes through the top 1 of the instrumented baseball base and links the two secondary induction coil windings 17 and 18 which are part of the instrumentation package assembly 19 battery charging circuitry. This field induces a voltage across the two secondary induction coil windings 17 and 18 to form an air core transformer. This voltage is used to charge the battery pack 16.

When the battery pack charging unit 15 is placed on top 1 of the instrumented baseball base, it is aligned so that its z-axis coincides with the z-axis 14 of the instrumented baseball base. This assures that the primary induction coil winding 10 in the battery pack charging unit 15 will be coaxial with the secondary induction coil windings 17 and 18 inside the instrumented baseball base to maximize the flux linkage between them and the efficiency of the wireless energy transfer.

The battery pack charging unit's 11 footprint is no larger than the footprint of the instrumented baseball base 1.

Referring to the Preferred Embodiments Specified in FIG. 23D and FIG. 23E and FIG. 23F, the instrumented baseball plate charging station unit satisfies all of the following objectives:

It is an objective of the present invention that the instrumented baseball plate charging station unit is composed of an enclosure, primary induction coil winding, electronics (not shown). It is an objective of the present invention to wirelessly charge the battery pack inside the instrumented baseball home plate. It is an objective of the present invention that the same charging station unit be used to charge the battery packs in the instrumented baseball bases, instrumented baseball home plates, instrumented baseball pitcher's rubbers, and instrumented ice hockey pucks.

FIG. 23G

Figure 23G:
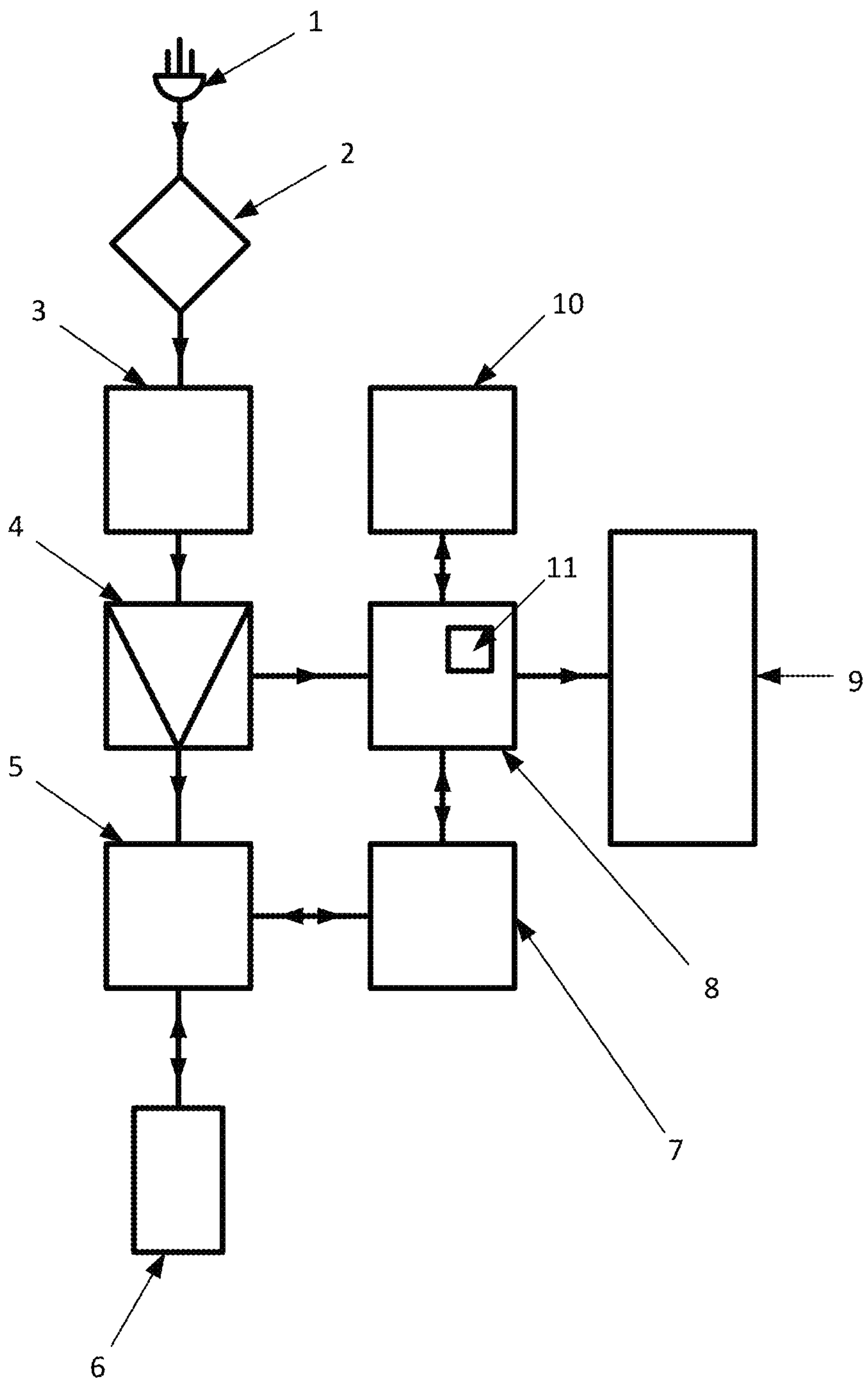
FIG. 23G is a block diagram showing the electronic circuits inside the charging station unit used to charge the battery pack inside the instrumented baseball bases and instrumented baseball home plates.

The physical elements disclosed in the charging station unit electronic circuits block diagram shown in FIG. 23G are identified as follows: 1 is the mains power electric plug. 2 is the rectifier bridge. 3 is the filter capacitor network 4 is the frequency converter. 5 is the impedance matching and switching network. 6 is the induction coil. 7 is the administrative data transceiver. 8 is the microprocessor. 9 is the visual human interface LCD panel. 10 is the human interface data entry panel keypad. 11 is the firmware image.

FIG. 23G is a block diagram showing the electronic circuits inside the charging station unit used to charge the battery pack inside the instrumented baseball bases and instrumented baseball home plate.

Referring to drawing FIG. 23G, in a preferred embodiment, the electronic circuits within the charging station unit specified in FIG. 23A and FIG. 23B and FIG. 23C, and FIG. 23D and FIG. 23E and FIG. 23F, are disclosed. The signals and data flows to and from the power supply and battery charging electronic circuits are specified. The electronic circuits inside the charging station unit are used to charge the battery pack inside both the instrumented baseball bases and the instrumented baseball home plate.

1 is an electric plug used to supply ac mains power to the baseball camera instrumentation package assembly charging station. When 1 is connected to a live electrical receptacle ac mains power is supplied to full-wave Rectifier Bridge 2. The output of 2 supplies pulsating dc current to filter capacitor network 3. After removing most of the ripple content, a current at approximately 200 volts dc from 3 is fed to the input of frequency converter 4. A high frequency standard of approximately 250 kHz is produced and power amplified by 4 and is subsequently applied to impedance matching and switching network 5. A modest amount of low voltage dc power to operate microprocessor 9 is also supplied by 4.

Onboard non-volatile system read only memory within 9 contains a firmware image 11 that is loaded during boot-up time when mains power to the system is first applied. 11, via 9, manages the charging station's operation such that by a command from 9, 5 via Administrative data transceiver 8 will convey 250 kHz power produced by 4 to induction coil 6.

During the charging operation of an instrumented baseball base or instrumented baseball home plate containing the instrumentation package assembly, the instrumented baseball base or instrumented baseball home plate is placed beneath the charging station in such a way so as to permit 6 to convey power wirelessly and non-intrusively to the receiving coils located within the instrumented baseball base or instrumented baseball home plate equipped with an instrumentation package assembly, thus allowing it's batteries to be charged conveniently, reliably and safely.

Due to that fact that rechargeable batteries of the kind primarily used, by the baseball camera instrumentation package assembly, can be made otherwise inoperative by under and/or over-charging, 11 within 8 incorporates several failsafe parameters amongst it's programming structure.

While the charging station is in use, these failsafe parameters allow 8 to monitor an administrative and control data link containing failsafe status information established between 8 and the baseball camera instrumentation package assembly via 5, 6 and 7 respectively. Should and event occur where one of these failsafe parameters is breached, a timely shutdown of the system will follow, thus protecting the instrumentation package assembly's batteries from catastrophic destruction.

The administrative and control data link previously discussed operates within the same 250 kHz radio frequency spectrum as 4 by passing a frequency modulated signal containing the administrative and control data between the recharging station's coil 6 and those located inside the instrumentation package assembly. Whilst the system is in use 5 behaves as a mediator coordinating the complex transmit and receive functions in a manner similar to a pair of walkie-talkies in simplex mode.

In addition to failsafe parameters, the administrative and control data link also contains information such as battery charging status, remaining lifespan and overall condition as well as fault warnings from the instrumentation package assembly that may be of interest to the charging station operator. A visual human interface panel 9 is connected to 8 to display this information. At the discretion of the charging station operator, a human interface entry panel 10, also connected to 8, may be used to initialize, start, and stop the charging process. At anytime he or she may also perform interrogative diagnostic tests of the instrumentation package assembly such as battery condition monitoring, length of charge remaining, instrumentation package assembly serial number, recharge logging, etc.

Referring to the Preferred Embodiments Specified in FIG. 23G, the instrumented baseball base and instrumented baseball home plate charging station unit satisfies all of the following objectives:

It is an objective of the present invention to wirelessly charge the battery pack inside the instrumented baseball bases and the instrumented baseball home plate. It is an objective of the present invention that the charging station unit be composed of a mains power electric plug, rectifier bridge, filter capacitor network, frequency converter, impedance matching and switching network, induction coil, administrative data transceiver, microprocessor, visual human interface LCD panel, human interface data entry panel keypad, and firmware image.

FIG. 24A and FIG. 24B

The detailed physical elements disclosed in the instrumented baseball base drawings shown in FIG. 24A and FIG. 24B are identified as follows: 1 is the central body of the instrumentation package assembly. 2 is the typical electronics of an instrumentation package assembly element. 3 corrugated bellows segment of an instrumentation package assembly element. 4 is an instrumentation package assembly element. 5 is a camera. 6 is a Type VIII buffer plate. 7 is the slightly conical small diameter end of the buffer plate 6. 8 is a camera lens. 9 is the optical and mechanical axis of the camera contained in the instrumentation package assembly element 4. 10 is an optical window. 11 is shock absorbing padding. 12 is a side cover of the instrumented baseball base. 13 is the battery pack. 14 is an induction coil for wirelessly charging the battery package. 15 corrugated bellows segment of an instrumentation package assembly element. 16 is an instrumentation package assembly element. 17 is a miniature SD/HD TV camera. 18 is a Type VIII buffer plate. 19 is the slightly conical small diameter end of the buffer plate 18. 20 is a camera lens. 21 is the mechanical x-axis of the instrumentation package assembly. 22 is an optical window. 23 is the corrugated bellows segment of an instrumentation package assembly element. 24 is a instrumentation package assembly element. 25 is a camera. 26 is a side cover of the instrumented baseball base. 27 is shock absorbing padding. 28 is a Type VIII buffer plate. 29 is the slightly conical small diameter end of the buffer plate 28 pressed into the bore of the baseball base. 30 is a camera lens. 31 is the optical and mechanical axis of the camera contained in the instrumentation package assembly element 24. 32 is an optical window. 33 is the threaded sleeve carrying the optical window. 34 is shock absorbing padding. 35 is a side cover of the instrumented baseball base. 36 corrugated bellows segment of an instrumentation package assembly element. 37 is a instrumentation package assembly element. 38 is a camera. 39 is a Type VIII buffer plate. 40 is the slightly conical small diameter end of the buffer plate 39. 41 is a camera lens. 42 is the x-axis of the instrumented baseball base and the instrumentation package assembly. 43 is an optical window. 44 is shock absorbing padding. 45 is a side cover of the instrumented baseball base. 46 is the z-axis of the instrumented baseball base. 47 is an induction coil for wirelessly charging the battery package. 48 is the bottom surface of the instrumented baseball base. 49 is the upper protective cover plate shield. 50 is the lower protective cover plate shield. 51 is the top surface of the instrumented baseball base. 52 is the tilted optical axis of camera lens 41. 53 is the tilted optical axis of camera lens 20. 54 is the bottom access lid heat sink on the instrumentation package assembly. 55 is the access opening in the lower protective cover plate shield. 56 is the radio antenna. 57 is a microphone. 58 is a microphone. 59 is a microphone. 60 is a microphone. 61 is a gas valve. 62 is the fiber optics cable/copper cable connector. 61 is a microphone. 62 is a microphone. 63 is a microphone. 64 is a microphone.

FIG. 24A is a top view of a four-tilted camera instrumented baseball base.

FIG. 24B is a side view of a four-tilted camera instrumented baseball base.

Referring to drawings FIG. 24A and FIG. 24B, in a preferred embodiment, the present invention contemplates an instrumented baseball base, which when stationed on any baseball playing field at any or all of the traditional $1^{st}$, $2^{nd}$ and $3^{rd}$ base locations can wirelessly and autonomously televise baseball games from its cameras and microphones under the command and control of the remote base station. Each instrumented baseball base is equipped with an instrumentation package assembly 1 which is comprised of four instrumentation package assembly elements 4, 16, 24 and 37. Each instrumentation package assembly element 4, 16, 24 and 37 contains electronics which channels the video from the four cameras 5, 17, 25 and 38 and eight microphones 57, 58, 59, 60, 61, 62, 63, and 64 to radio antenna 56 from which the signals are transmitted wirelessly to the remote base station via the antenna relay junction in the sports stadium. The remote base station and antenna relay junction are disclosed in FIG. 30A and FIG. 30B, and FIG. 31A and FIG. 31B, and FIG. 32A and FIG. 32B, and FIG. 35A, and FIG. 35B, and FIG. 35C. Among its many functions, the remote base station processes the signals and broadcasts 3D pictures and surround sound to the TV viewing audience.

Additionally, referring to drawings FIG. 24A and FIG. 24B, in a preferred embodiment, the present invention contemplates an instrumented baseball base, which when stationed on any baseball playing field at any or all of the traditional $1^{st}$, $2^{nd}$ and $3^{rd}$ base locations can wirelessly and autonomously stream baseball games onto the internet. Each baseball base is equipped with an instrumentation package assembly 1 which is comprised of four instrumentation package assembly elements 2. Each instrumentation package assembly element 2 contains an electronics package unit which channels the video from cameras 5, 16, 25 and 38 to radio antenna 56 from which the signals are transmitted wirelessly to a mobile broadband tower. The electronics package unit also channels the audio from microphones 57, 58, 59, 60, 61, 62, 63, and 64 to radio antenna 56 from which the signals are transmitted wirelessly to a mobile broadband tower. The electronic package unit electronics are disclosed in FIG. 11A. The mobile broadband tower is shown in FIG. 11B. Also, FIG. 11B shows the architecture of the streaming system that conveys high definition video and multi-dimensional audio from the instrumented baseball base.

Referring to the preferred embodiments disclosed in FIG. 31A and FIG. 31B, and FIG. 32A and FIG. 32B the baseball stadium is also equipped with bi-directional multi-function fiber optic cable communication links to televise baseball games from sports paraphernalia i.e. $1^{st}$, $2^{nd}$, $3^{rd}$ bases to a remote base station. The instrumentation package assembly 1 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 55. The fiber optic/copper cable's connector is connected to its mating instrumentation package assembly 1 connector 62 in the bottom of the instrumented baseball bases. The instrumentation package assembly connector 62 is wired to the instrumentation package assembly electronics 2.

The instrumented baseball base shown in FIG. 24A and FIG. 24B has its cameras tilted upward. The purpose of tilting the cameras upward is to move the line of sight of the wide angle zoom camera lenses to center on objects above ground level so as to bring their images closer to the center of the picture frame.

The instrumented baseball base employs a four camera instrumentation package assembly using the Type VIII buffer plate assembly.

The plane-parallel-flat optical window is more unobtrusive to the baseball players; and is less exposed to the hostile playing field environment, and is more dirt free. The optical windows peer out from the sides of the base through clearance holes in the bases cover.

Each one of the four cameras 5, 17, 25 and 38 is housed in each of the four instrumentation package assembly elements 4, 16, 24 and 37 of which there are four instrumentation package assembly elements in the instrumentation package assembly. Details of each of the four instrumentation package assembly elements which are principal parts of the instrumentation package assembly are shown in FIG. 22A and FIG. 22B and FIG. 22C.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Each of the instrumentation package assembly elements 4, 16, 24 and 37 are identical. The instrumentation package assembly elements are disclosed in FIG. 22A and FIG. 22B and FIG. 22C.

Referring to the disclosed instrumented baseball base shown in FIG. 24A and FIG. 24B, the instrumented baseball base has an instrumentation package assembly containing four instrumentation package assembly elements mounted inside the instrumented baseball base. Details of instrumentation package assembly elements are shown in FIG. 22A and FIG. 22B and FIG. 22C. The outer covering i.e. canvas of both the instrumented baseball base and the conventional baseball base are made identical, both having the same size, shape, color and texture.

The instrumentation package assembly 1 carries four CCD sensor arrayed cameras 5, 17, 25 and 38, and four microphones 57, 58, 59 and 60, and a radio antenna 56. The four cameras 5, 17, 25 and 38 have optical axes 9, 21, 31 and 42. The cameras look outward from the four sides of the instrumented baseball base along their respective optical axes 9, 21, 31 and 42. In order to maximize the viewing pleasure of the TV audience, it is sometimes necessary to individually aim each of the cameras 5, 17, 25 and 38 with their lines of sight 9, 21, 31 and 42 above the horizon by varying degrees. This need varies depending on the location of each of the instrumented baseball bases on the baseball playing field and the shape of the baseball playing field at the particular baseball stadium venue where the baseball game is being held. The angles of each of the cameras' lines of sight 9, 21, 31 and 42 above the horizon can be pre-set into the instrumented baseball base prior to a game during the encapsulation process. For example, camera 17 can be tilted upward so that its line of sight changes from 21 to 53. Each of the cameras 5, 17, 25 and 38 contained in the instrumentation package assembly can be adjusted using their flexible bellows sections 3, 15, 23 and 36 respectively.

The instrumentation package assembly 1 has four camera lenses 8, 20, 30 and 41. The cameraman can choose all four lenses to be identical to one another. The cameraman can choose some of the four lenses to be identical to one another. The cameraman can choose all of four lenses to be different from one another. The cameraman makes these choices based on the art, venue and the entertainment value of each choice to the TV viewing audience.

The instrumented baseball base is formed in an encapsulating process. The instrumented baseball base is molded from white rubber. When the rubber cures, it behaves like a cushion. The instrumentation package assembly is placed into the base's mold. When the rubber cures, it acts as a cushion 11 and 27 and 34 and 44 for the instrumentation package assembly that is encapsulated inside the molded base. The cushioning material acts to shield and insulate the instrumentation package assembly contained therein from shock, vibration and the weather.

As an example, FIG. 24A and FIG. 24B shows cameras 17 and 38 tilted upward. The bellows section 36 of the instrumentation package assembly is pre-bent by a prescribed amount prior to encapsulation, thereby enabling the angle between the axes 42 and 52 to be pre-set to a chosen value. The bellows section 15 of the instrumentation package assembly is pre-bent by a prescribed amount prior to encapsulation, thereby enabling the angle between the axes 21 and 53 to be pre-set to a chosen value. These angles are encapsulated in place when the cushioning encapsulating material that forms the instrumented baseball base cures in the interior of the base around the instrumentation package assembly during the encapsulating process. For example, the encapsulating material 44, 11, 27 and 34 surrounds the buffer plate assemblies 39, 6, 18 and 28 and the bellows sections 36, 3, 15 and 23, and as it cures it holds the cameras 38, 5, 17 and 25 in place.

Tilting of the cameras and their respective camera lenses has advantages over aiming them horizontally. When the cameras are aimed horizontally from their respective sides of their instrumented baseball bases, about one half of the field of view is obscured by the ground level. As the cameras are tilted upward, more of the field of view becomes un-obscured by the ground and becomes useful.

The instrumented baseball base's cover is substantially the same canvas material/or other synthetic material as used in conventional baseball bases. 51 is the top of the instrumented baseball base and is covered with the canvas cover et al. 51 is shown flat in FIG. 24A and FIG. 24B.

In another preferred embodiment (not shown in a separate drawing), the shape of the top 51 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 49 just beneath the top of the base is also rounded downward and domed shaped. Domed shaped protective cover plates shown in FIG. 27A and FIG. 27B and FIG. 27C, FIG. 28A and FIG. 28B and FIG. 28C are used. The space between the top of the base and the top of the upper protective cover plate is filled with encapsulation padding. The upper protective cover plate 49 is shaped congruent with the top 51.

Beneath the cover of the instrumented baseball base is its interior. The interior of the instrumented baseball base is filled with a soft encapsulating material 11, 27, 34 and 44 like synthetic foam. The encapsulating material 11, 27, 34 and 44 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 22D (item 21), which is represented by dotted lines, consists of the electrical control wiring to and from the electronic components of the instrumented sports paraphernalia that are being controlled.

In yet another preferred embodiment, the instrumented baseball base shown in FIG. 24A and FIG. 24B is equipped to wirelessly stream its audio and video onto the internet.

Figures 40A, 40B, 40C:
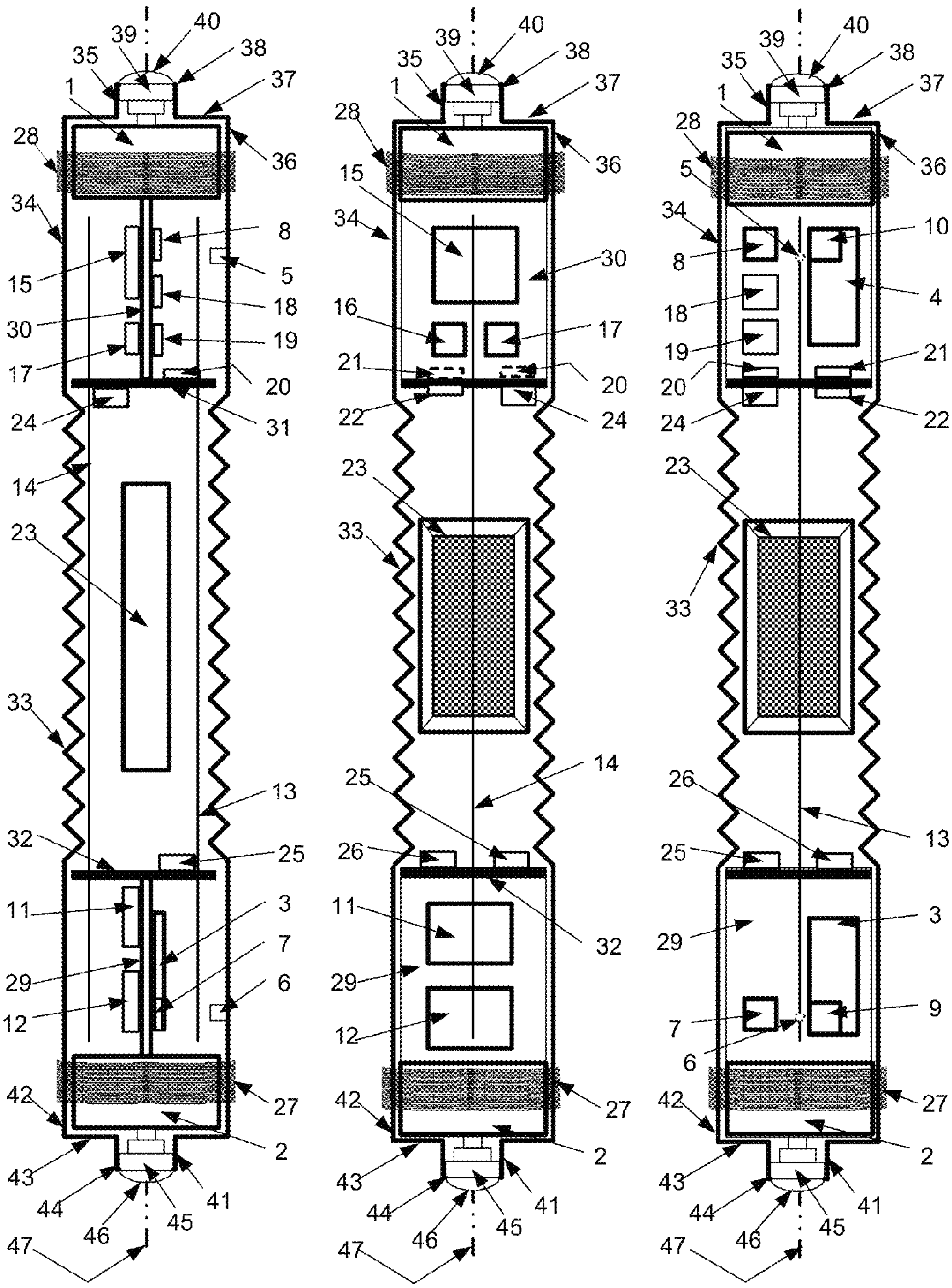
FIG. 40A shows a side view section of the instrumentation package assembly used in the instrumented football shown in FIG. 39A and FIG. 39B.
FIG. 40B shows a top view section of the instrumentation package assembly used in the instrumented football shown in FIG. 39A and FIG. 39B.
FIG. 40C shows a bottom view section of the instrumentation package assembly used in the instrumented football shown in FIG. 39A and FIG. 39B.

The instrumented baseball base is instrumented with instrumentation package assembly elements. The instrumentation package assembly elements are shown in FIG. 40A, FIG. 40B and FIG. 40C. The instrumentation package assembly elements contain an electronics circuit called an electronics package unit. The electronics package unit is shown in FIG. 11A as item 1. The electronics package unit enables the instrumented baseball base to communicate with and stream on the internet.

Referring to FIG. 11B, FIG. 11B shows the architecture of the streaming system that conveys high definition video and multi-dimensional audio from instrumented baseball bases 22, captured by the cameras and microphones contained within their instrumentation package assembly elements, to stream to an audience which may or may not have spectators 7, 8, 9 and 10 respectively present at the games but wish to subscribe and view the games remotely on their personal wireless display devices. The electronics package units inside the instrumentation package assembly elements communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the baseball playing field who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given baseball field of play currently broadcasted.

Referring to FIG. 11A, FIG. 11A is the electronics system block diagram for streaming baseball games on the internet from instrumented sports paraphernalia like instrumented baseball bases. FIG. 11A shows the block diagram for the system for streaming the video and audio of baseball games captured by the cameras and microphones aboard the instrumented sports paraphernalia like instrumented baseball bases. The primary component of the system for connecting the instrumented sports paraphernalia like instrumented baseball bases to the internet is the electronic package unit 1. The electronics package unit 1 enables the instrumented baseball bases to communicate with and stream on the internet. The electronics package unit 1 collects video and audio from the cameras 2 and microphones 3 aboard the instrumentation package assembly elements inside the instrumented baseball bases, and channels the video and audio to the antenna 8 for wireless transmission to a Mobile Broadband Tower. The wireless topography for the system is shown in FIG. 11B.

The instrumented baseball bases are instrumented with instrumentation package assembly elements. An example of an instrumentation package assembly element is shown in FIG. 40A, FIG. 40B and FIG. 40C. Referring to FIG. 40A, FIG. 40B and FIG. 40C, each instrumentation package assembly element is equipped typically with one electronics package unit. Each electronics package unit channels a minimum of one high definition video camera and one microphone whose captured video and audio is buffered by processing hardware following with suitable H.264/MPEG compression by compression hardware, which is and subsequently sent to an active broadband connection established by LTE/4g cellular streaming hardware and an antenna using for example Mobile Broadband Hotspot Hardware Technology. Each electronics package unit contains video processing hardware, audio processing hardware, audio and video compression hardware, 4G/LTE cellular streaming high-speed terrestrial mobile broadband service hardware, and a Wifi band hardware interface.

Referring to FIG. 11A, in some venues the internet is available to the instrumented baseball bases by a fiber optics/copper cable feed buried beneath the ground of the baseball field. In venues where the internet is available by such cable, the cable feed 10 is brought up from the ground and connected to the electronic package unit 1 via 9. If the cable feed is not already available, then it is installed as part of implementing this embodiment.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Each electronics package unit 1 referred to in FIG. 11A uses a high-speed terrestrial mobile broadband service to connect the camera(s) and microphone(s) to a publicly accessible internet relay server for the purpose of real-time viewing the game by audiences using their portable wireless devices—i.e. WIFI enabled Phones, Laptops, Touch Pads, PDA's, etc.

Referring to the Preferred Embodiments Specified in FIG. 24A and FIG. 24B, the instrumented baseball base satisfies all of the following objectives:

It is an objective of the present invention that the instrumented baseball base be composed of a four camera instrumentation package assembly, four buffer plate assemblies, encapsulation shock-proofing padding, upper protective cover plate, canvas cover and lower protective cover plate. It is an objective of the present invention to enable the cameraman to set the tilt angle of the cameras of the instrumentation package assembly so that their lines of sight is angled above the ground level of the baseball playing field. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base has a top, and an upper protective cover plate, that is both congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 25A and FIG. 25B and FIG. 25C and FIG. 25D

The detailed physical elements disclosed in the instrumented baseball home plate drawings shown in FIG. 25A and FIG. 25B and FIG. 25C and FIG. 25D are identified as follows: 1 (not shown). 2 is the axis of symmetry of the instrumented baseball home plate. 3 is the y-axis of the instrumentation package assembly containing camera 36. 4 is the side of the instrumented baseball home plate. 5 is the induction coil used to charge the battery pack inside the instrumentation package assembly. 6 is the induction coil used to charge the battery pack inside the instrumentation package assembly. 7 is the plane-parallel-flat optical window. 8 is the left side of the instrumented baseball home plate. 9 (item not shown), 10 is the side 8 of the instrumented baseball home plate. 11 is the central hub of the instrumentation package assembly containing the battery pack. 12 is the Type XI buffer plate. 13 is the bottom of the instrumented baseball home plate. 14 is the bellows segment of the instrumentation package assembly element. 15 is the y-axis of symmetry of the instrumented baseball plate. 16 is the bottom of the instrumentation package assembly. 17 is the interior of the instrumentation package assembly. 18 is the top of the instrumentation package assembly. 19 is the top of the instrumented baseball home plate. 20 is the plane-parallel-flat optical window. 21 is the side of the instrumented baseball plate that faces the pitcher. 22 is the upper protective cover plate. 23 is the lower protective cover plate. 24 is the optical axis direction of cameras 35 and 36 after they are tilted together. 25 is the top protective plate. 26 is the bottom protective plate. 27 is the z-axis of the camera whose optical window is 20. 28 is the z-axis of the camera whose optical window is 7. 29 is a wireless radio antenna. 30 is the z-axis of the instrumentation package assembly and the instrumented baseball home plate. 31 is the open aperture in the bottom of the instrumented baseball home plate. 32 is the fiber optics/copper cable connector in the bottom of the instrumentation package assembly. 33 is a microphone. 34 is a microphone. 35 is a camera. 36 is a camera. 37 is a camera lens. 38 is a camera lens. 39 is a wireless radio antenna element. 40 is the bellows segment of the instrumentation package assembly element. 41 is a wireless radio antenna element. 42 is an access lid heat sink. 43 is the gas valve. 44 is the battery pack. 45 is the right side of the instrumented baseball home plate. 46 is a microphone. 47 is the microphone cable. 48 is the microphone connector. 49 is a microphone. 50 is a microphone. 51 is a microphone. 52 is a microphone. 53 is a microphone. 54 is a microphone. 55 is a microphone. 56 is a microphone.

Figures 25A, 25B, 25C, 25D:
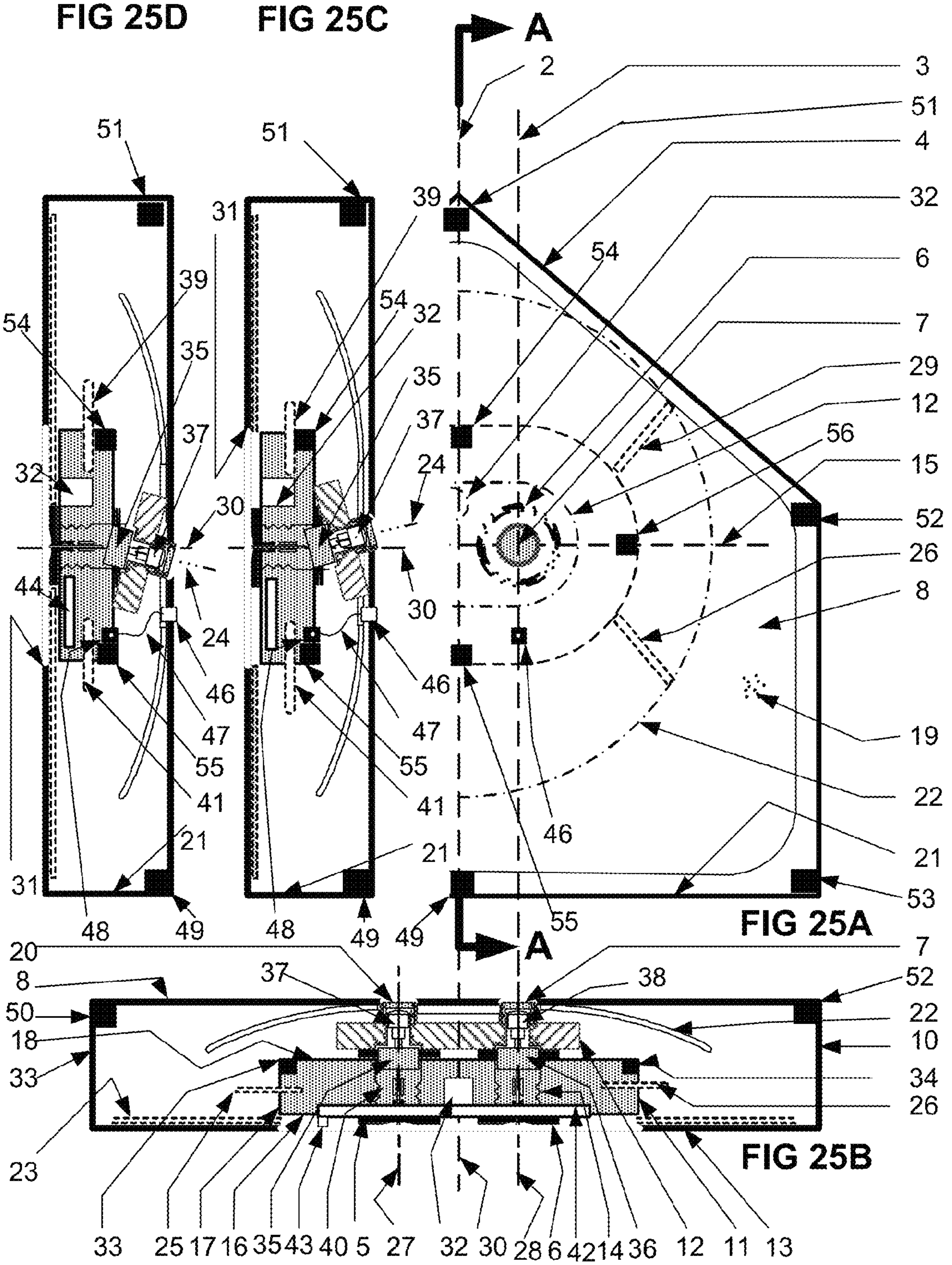
FIG. 25A is the top view of a two-tilted camera instrumented baseball home plate.
FIG. 25B is the side view of a two-tilted camera instrumented baseball home plate.
FIG. 25C is a side view of a two-tilted camera instrumented baseball home plate.
FIG. 25D is a side view of a two-tilted camera instrumented baseball home plate.

FIG. 25A is the top view of a two-tilted camera instrumented baseball home plate.

FIG. 25B is the side view of a two-tilted camera instrumented baseball home plate.

FIG. 25C is a side view of a two-tilted camera instrumented baseball home plate.

FIG. 25D is a side view of a two-tilted camera instrumented baseball home plate.

Referring to drawings FIG. 25A and FIG. 25B and FIG. 25C and FIG. 25D, in a preferred embodiment, the present invention contemplates an instrumented baseball home plate, which when stationed on any baseball playing field at any traditional home plate location on the baseball diamond, can wirelessly and autonomously televise baseball games from its cameras and microphones under the command and control of the remote base station. Each instrumented baseball home plate is equipped with an instrumentation package assembly 11 which is comprised of two instrumentation package assembly elements 14 and 40. The instrumentation package assembly element 11 contains electronics which channels the video from the two cameras 35 and 36 and eleven microphones 33, 34, 46, 49, 50, 51, 52, 53, 54, 55 and 56 to radio antennas 12, 25, 26 and 39 from which the signals are transmitted wirelessly to the remote base station via the antenna relay junction in the sports stadium. The remote base station and antenna relay junction are disclosed in FIG. 30A and FIG. 30B, and FIG. 31A and FIG. 31B, and FIG. 32A and FIG. 32B, and FIG. 35A, and FIG. 35B, and FIG. 35C. Among its many functions, the remote base station processes the signals and broadcasts 3D pictures and surround sound to the TV viewing audience.

Additionally, referring to drawings FIG. 25A and FIG. 25B and FIG. 25C and FIG. 25D, in a preferred embodiment, the present invention contemplates an instrumented baseball home plate, which when stationed on any baseball playing field at the traditional home plate location can wirelessly and autonomously stream baseball games onto the internet. Each home plate is equipped with an instrumentation package assembly 11 which is comprised of two instrumentation package assembly elements 14 and 40. Each instrumentation package assembly element 14 and 40 contains an electronics package unit which channels the video from cameras 35 and 36 to radio antennas 26, 29, 39 and 41 from which the signals are transmitted wirelessly to a mobile broadband tower. The electronics package unit also channels the audio from microphones 33, 34, 46, 49, 50, 51, 52, 53, 54, 55, and 56 to radio antennas 26, 29, 39 and 41 from which the signals are transmitted wirelessly to a mobile broadband tower. The electronic package unit electronics are disclosed in FIG. 11A. The mobile broadband tower is shown in FIG. 11B. Also, FIG. 11B shows the architecture of the streaming system that conveys high definition video and multi-dimensional audio from the instrumented baseball home plate.

The instrumented baseball home plate in FIG. 25A and FIG. 25B and FIG. 25C and FIG. 25D is equipped to use both a fiber optics cable/copper cable transmission link and/or a radio transmission link between the instrumented baseball home plate and the remote base station.

The preferred embodiment specifying the fiber optics/copper cable transmission link is disclosed in FIG. 31A and FIG. 31B and FIG. 32A and FIG. 32B.

The preferred embodiment specifying the radio transmission link is disclosed in FIG. 30A and FIG. 30B.

The instrumented baseball home plate is instrumented with the instrumentation package assembly disclosed in FIG. 20A and FIG. 20C. Details of instrumentation package assembly elements are shown in FIG. 19D.

The present preferred embodiment shown in FIG. 25A and FIG. 25B and FIG. 25C and FIG. 25D provides the TV viewing audience with 3-D stereo pictures and stereophonic sound.

The fiber optics/copper cable transmission link is disclosed in the preferred embodiment shown in FIG. 31A and FIG. 31B. The fiber optics/copper cable transmission link is also disclosed in another preferred embodiment shown in FIG. 32A and FIG. 32B.

Using identical components, another preferred embodiment can just as easily be constructed with the cameras (along with its lens and buffer plate) tilted away from and toward the batter respectively.

The instrumented baseball home plate employs a two camera instrumentation package assembly substantially identical to the instrumentation package assembly shown in FIG. 20A and FIG. 20B and FIG. 20C. It uses the Type XI buffer plate assembly shown in FIG. 13A and FIG. 13B and FIG. 13C. Details of the instrumentation package assembly elements are shown in FIG. 19D.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 25A and FIG. 25B and FIG. 25C and FIG. 25D, the instrumented baseball home plate has one instrumentation package assembly 11 mounted inside the instrumented baseball home plate. Details of instrumentation package assembly are shown in FIG. 20A and FIG. 20B and FIG. 20C. Except for the optical windows, the outer appearance of both the instrumented baseball home plate and the conventional baseball home plate are identical, both being made of the same white rubber material 19 having the same size, shape, color and texture. Consequently both have nearly the same identical appearance as seen by the player's.

The instrumentation package assembly 11 carries two CCD sensor arrayed cameras 35 and 36 and two microphones 33 and 34. The two cameras 35 and 36 are arranged side by side and form a 3-D stereo camera pair. The two cameras 35 and 36 are separated by a interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, larger interpupillary distance will produce more striking 3-D effects.

The two cameras 35 and 36 that form the 3-D stereo camera pair 35 and 36 have optical windows 7 and 20. The interpupillary distance is the distance between the two camera's 35 and 36 optical axes. The cameras 35 and 36 that form the 3-D stereo camera pair 35 and 36 look upward from the top of the instrumented baseball home plate along their common line of sight 24 which is tilted relative to the normal 30 to the top 8 of the instrumented baseball home plate.

The instrumented baseball home plate has five sides. As is customary in the game of baseball, side 21 faces the pitcher. The top 8 of the instrumented baseball home plate sits horizontally on the baseball playing field, and is made level with the playing field as is customary. The bottom 13 of the instrumented baseball home plate is buried underneath the ground.

The instrumented baseball home plate is oriented in space so its z-axis 30 is perpendicular to the baseball field. The z-axis 30 is perpendicular to the top 8 of the instrumented baseball home plate. The line of sight 24 of the two cameras 35 and 36 that form the 3-D stereo camera pair is tilted relative to the z-axis 30. In FIG. 25C the line of sight 24 is tilted toward the catcher.

In FIG. 25D the line of sight 24 is tilted toward the pitcher.

The two cameras 35 and 36 that form the 3-D stereo camera pair 35 and 36 are identical to each other. The two cameras 35 and 36 use the same identical lenses 37 and 38. In the present preferred embodiment these lenses 37 and 38 are extremely wide angle lenses. These lenses have nearly 180 degree fields of view. It is noted that in other preferred embodiments, other lens types can be employed with other fields of view. An advantage of the extremely wide angle lenses is that even though the cameras are pointed skyward, they can see right down to the outfield horizon which is at the edge of their fields of view. The view that the TV audience will get is similar to the view that you would get if you were laying flat on your back on the playing field, with your head on the instrumented baseball home plate, and your feet facing the pitcher. Your right eye would be closest to side 33 of the instrumented home plate, and your left eye would be closest to side 10 of the instrumented home plate; and each of your two eyes would be analogous to the two cameras inside the instrumented baseball base. For the present invention we herein define side 33 as the right hand side of the instrumented baseball home plate, and side 10 as the left hand side of the instrumented home plate.

The two cameras 35 and 36 that form the 3-D stereo camera pair have optical windows 7 and 20. The two cameras 35 and 36 that form the 3-D stereo camera pair have the same line of sight 24. The two cameras 35 and 36 that form the 3-D stereo camera pair have optical windows 7 and 20. The line of sight 24 of the 3-D stereo camera pair is tilted relative to axes 27 and 28. Axes 27 and 28 are perpendicular to the top 19 of the instrumented baseball home plate. The interpupillary distance is the distance between 27 and 28 which is the distance between the optical axes of camera lenses 37 and 38. The line of sight 24 of the cameras 35 and 36 that form the 3-D stereo camera pair is tilted away from the vertical. The line of sight 24 of the cameras 35 and 36 that form the 3-D stereo camera pair is tilted away from the vertical and toward the catcher in FIG. 25C. The line of sight of the cameras 35 and 36 that form the 3-D stereo camera pair is tilted away from the vertical and toward the pitcher in FIG. 25D.

The instrumented baseball home plate has five sides. As is customary in the game of baseball, 21 is the side of the baseball home plate that faces the pitcher. The top of the home plate sits horizontally on the baseball playing field. The optical axes of the two cameras 35 and 36 are parallel to each other and are tilted relative to the top 19 of the instrumented baseball home plate. The instrumented baseball home plate is oriented in space so its z-axis 30 is perpendicular to the surface of the baseball field and pointing skyward.

The two cameras 35 and 36 are identical to each other. The two cameras 35 and 36 use the same two identical extremely wide angle lenses 37 and 38. At times, in order to produce more dramatic shots of the pitcher during the game, the cameraman may want to pre-orchestrate the positioning of the 3-D camera's line of sight 24 before the baseball game begins. This can be accomplished by pre-tilting, and encapsulating in-place, the 3-D cameras 35 and 36 inside the instrumented baseball home plate in advance of the game when the field is being prepared before the game. The 3-D stereo camera's line of sight 24 shown in FIG. 25D is tilted toward the pitcher in order to raise the image of the pitcher above the lower edge of the TV picture frame and produce a larger picture of the pitcher. This produces the dramatic effect of making the pitcher seem closer to the TV viewing audience.

The 3-D stereo camera pair's 35 and 36 line of sight 24 shown in FIG. 25C is tilted away from the pitcher and toward the catcher in order to lower the image of the catcher from the upper edge of the TV picture frame to bring him closer to the center of the TV picture frame and produce a larger picture of the catcher. This produces the dramatic effect of making the catcher and his mitt seem closer to the TV viewing audience. If the batter swings at a pitch and misses, the TV viewing audience will see up-close the baseball hit the crater in the catcher's mitt as it is being caught. The TV viewing audience will hear a loud crack as the baseball slaps the catcher's leather mitt.

Each of the two cameras 35 and 36 comprising the 3-D stereo camera pair is aligned within the instrumentation package assembly 11 so that each of the cameras 35 and 36 yields wirelessly transmitted upright images of objects that appear between the center and the bottom of the TV picture frame. Both cameras 35 and 36 are aligned inside the instrumentation package assembly so that the TV viewing audience sees the distant stadium horizon in the outfield towards the bottom of the TV picture frame. The distant stadium horizon that is behind the pitcher appears horizontal in the picture frame at the bottom of the picture frame. The pitcher appears to be standing upright just above the bottom center of the picture frame.

When the pitcher throws the baseball to the catcher, the TV audience will see the baseball approaching the center of the TV picture from the bottom center of the picture. The size of the baseball grows larger as it gets closer to the instrumented home plate and the batter. Since the cameras are directly below the batter, an image of the batter's chin will occupy the center of the TV picture. The size of the baseball will appear to be at its biggest as it passes directly over the instrumented baseball home plate. The TV audience will hear the whoosh of air in microphones 33 and 34 as the baseball passes over the instrumented home plate. The TV audience will see the batter swing his bat, up close, to strike the baseball as it whizzes by. The TV audience will hear the rush and whiz of the air in microphones 33 and 34 as the batter swings his bat. The sounds received from each of the microphones by the remote base station are processed using special software to produce surround sound which is broadcast to the TV viewing audience. The TV audience will hear the loud crack and explosion of the bat as it strikes the baseball. The TV audience will see the baseball up-close as it is hit by the bat. The TV audience will see the baseball as it travels outward from the bat onto the playing field. The TV audience will see the baseball get smaller as it gets further away from the instrumented home plate.

The audience will see the batter drop the bat and scramble toward first base on the right hand side of the screen. The TV audience will hear the thud of the bat in microphones 33 and 34 after the batter drops it and it hits the ground. The TV audience will hear the rustle and scraping of the batter's cleats on the ground in microphones 33 and 34 as he scrambles to first base. The TV audience will see the size of the batter grow smaller as he scampers toward first base into the distance. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium. Therefore, the instrumented baseball home plate not only provides a step forward in entertainment, but it also provides a great training tool to prospective baseball players by giving them the true life visual and auditory sensations and feelings of being at the plate without actually being there.

The instrumented baseball home plate is symmetrical about its y-axis 2. The instrumented baseball home plate has five sides. Only sides 4, 10, 21, and 32 are shown in the figures. The top 6 of the instrumented baseball home plate sits horizontally on the baseball playing field. The line of sight 24 of the camera's 35 and 36 is shown in FIG. 25C and FIG. 25D. The z-axis 30 of the instrumented baseball home plate is perpendicular to the top 8 of the instrumented baseball home plate, and is oriented in space so it is perpendicular to the baseball field and pointing skyward. The line of sight 24 of camera's 35 and 36 is tilted toward the pitcher in FIG. 25D. The line of sight 24 of the camera's 35 and 36 is tilted toward the catcher in FIG. 25C.

The camera's 35 and 36 look out of the top 8 of the instrumented baseball home plate, along their respective line of sight 24. The camera 35 and 36 are aligned within their instrumentation package assembly 11 so that the camera's 35 and 36 yield a wirelessly transmitted upright image to the TV viewing audience of objects in the center of the field of view. The two holes in the top 8 of the instrumented baseball home plate are made just large enough to prevent vignetting of the cameras field of view.

Camera's 35 and 36 are mounted inside the instrumentation package assembly 11. The line of sight 24 of camera's 35 and 36 are tilted relative to the top 8 of the instrumented baseball home plate. In FIG. 25D, the tilt arrangement shown permits camera's 35 and 36 to look more toward the pitcher from out of the top 8 of the instrumented baseball home plate. This brings the image of the pitcher closer to the center of the TV picture frame and makes him look closer and larger. Utilization of an extremely wide angle lenses 37 and 38 allow the TV viewing audience to see past the pitcher and down past the horizon of the baseball stadium outfield.

In FIG. 25C, the tilt arrangement shown permits the camera's 35 and 36 to look more toward the catcher from out of the top 8 of the instrumented baseball home plate. This brings the image of the catcher closer to the center of the TV picture frame and makes him look closer and larger. Utilization of extremely wide angle lenses 37 and 38 allows the TV viewing audience to see past the catcher and down past the horizon of the baseball stadium behind the catcher.

Tilting of the 3-D stereo camera pair 35 and 36 line of sight 24 is accomplished by using the bellows sections 14 and 40 of the instrumentation package assembly 11. The bellows sections 14 and 40 are flexible. The bellows sections 14 and 40, which connect the buffer plate assembly 12 to the instrumentation package assembly 11, is bent to the desired tilt angle for the camera's 35 and 36 line of sight 24. After the desired tilt angle is set by bending the bellows sections 14 and 40, all the components inside the instrumented baseball home plate are encapsulated in place using the rubber encapsulating compound 19. The tilted line of sight 24 is common for camera's 35 and 36, lenses 37 and 38, optical window's 20 and 7, and buffer plate 12.

Keeping in mind that the line of sight 24 is common for camera's 35 and 36, lenses 37 and 38, optical window's 20 and 7, and buffer plate 12, it follows from the specification discussed above that the line of sight 24 of camera's 35 and 36, lenses 37 and 38, optical window's 20 and 7, and buffer plate 12 can be tilted in a like manner, towards or away from the batter as well, by bending the bellows sections 14 and 40 as before. Tilting 24 towards the batter would bring the image of the batter closer to the center of the TV picture frame and make him look closer and larger. Tilting 24 away from the batter would move the image of the batter away from the center of the TV picture frame and make him look further away and smaller. Utilization of extremely wide angle lenses 37 and 38 allows the TV viewing audience to see down past the batter and down past the horizon of the baseball stadium behind the batter.

When a player is running toward the instrumented baseball home plate from third base, the 3-D stereo camera pair 35 and 36 can see where he is coming from. The cameras 35 and 36 can see the player as he runs and touches the instrumented baseball home plate. The cameras 35 and 36 can see the player as he is sliding into the instrumented baseball home plate. The TV audience will see and hear the player's cleats as they hit the instrumented baseball home plate. The cameras 35 and 36 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The camera's 35 and 36 vantage point at the instrumented baseball home plate gives the audience a viewing angle of the game never seen before by television viewing audiences. The instrumented baseball home plate's cameras 35 and 36 gives the TV viewing audience unending contemporaneous shots that get across a sense of the action of being there—like a player in the game that prior art cameras looking on from their disadvantaged viewing points from outside the playing field cannot get across.

The top 8 of the instrumented baseball home plate sits horizontally flat on the baseball playing field. The common line of sight 24 of the cameras 35 and 36 is tilted with respect to the z-axis 30 of the instrumented baseball home plate. Z-Axis 30 is perpendicular to the top 8 of the instrumented baseball home plate. The instrumented baseball home plate is oriented in space so its z-axis 30 is perpendicular to the surface of the baseball field and pointing skyward.

The cameras 35 and 36 look outward from the top 8 of the instrumented baseball home plate along and around their common line of sight 24 through optical windows 20 and 7. The cameras 35 and 36 are aligned within the instrumentation package assembly 11 so that the cameras 35 and 36 yield a wirelessly transmitted upright image of objects appearing between the center and the bottom of the TV picture frame via wireless radio antennas 25, 26, 29 and 39.

In the present preferred embodiment, cameras 35 and 36 use common extremely wide angle lenses 37 and 38 with zoom capability. Even though cameras 35 and 36 are pointed outward from the top 8 of the instrumented baseball home plate, they can see past the pitcher along y-axis 2 right down to the outfield stadium horizon because of their near 180 degree field of view. This is a distinct advantage of extremely wide angle lenses over other types of lenses. However, it should be pointed out that the cameraman may elect to use a variety of other camera lens pairs 37 and 38 with different capabilities depending on the visual effects he wishes to convey to the TV viewing audience. For example, the cameraman may elect to use a camera lens pair 37 and 38 with a narrower field of view in order to concentrate the attention of the TV viewing audience on the batter's taut and sweaty stubble filled face.

The instrumentation package assembly 11 is supported at its upper end by a buffer plate 12. The instrumentation package assembly 11 and the buffer plate 12 are permanently encapsulated inside of the instrumented baseball home plate as the encapsulating material 19 around them cures. After the encapsulating material 19 sets, it becomes a weatherproof shock absorbing padding material 19. The small diameter end of the buffer plate 12 peers through the top 8 and upper protective cover plate 22 of the instrumented baseball home plate. The small diameter end of the buffer plate 12 is sealed and molded into the shock absorbing padding 19 around its circumference. The encapsulating material 19 is a permanent resilient compound that is air-tight and water-tight.

The buffer plate 12 is encapsulated by the encapsulating material 19 inside the instrumented baseball home plate. Synthetic rubber is an example of encapsulating material that is used. The mechanical axes of the bores in the buffer plate are tilted to the top 8 of the instrumented baseball home plate so that they have a common line of sight 24. The ends of the instrumentation package assembly 11 are inserted into the bores in the buffer plate 12, thereby tilting the mechanical axis of the end of instrumentation package assembly 11 to the top 8 of the instrumented baseball home plate.

The buffer plate 12 acts as a bearing for the instrumentation package assembly 11, and thereby restricts and restrains the motion of the instrumentation package assembly 7 inside the instrumented baseball home plate. Besides functioning as a bearing to support the instrumentation package assembly 11 within the instrumented baseball home plate, the buffer plate provides a hollow portal through which the cameras 35 and 36 inside the instrumentation package assembly 11 may peer out of the instrumented baseball home plate at the baseball playing field along line of sight 24.

The instrumented baseball home plate's outward appearance looks substantially the same as the conventional professional league baseball home plate and the conventional high school league baseball home plate, and meets the official requirements for these venues and is interchangeable with them in these venues.

The buffer plate 12 is a Type XI buffer plate and is shown in FIG. 13A and FIG. 13B and FIG. 13C. The buffer plate 12 is molded into the instrumented baseball home plate using the white rubber encapsulating material 19. The small diameter end of the buffer plate 12 passes through the upper cover protective cover plate 22 and protrudes through the molded rubber top 8 of the instrumented baseball home plate. The buffer plate carries the optical windows 20 and 7. The optical windows 20 and 7 tilt with the buffer plate 12. The flat surfaces of optical windows 20 and 7 are tilted and relatively flush with the top 8 of the instrumented baseball home plate.

The cameras 35 and 36 are aligned together within the instrumentation package assembly 11 so that they yield wirelessly transmitted upright 3-D images of objects that appear between the center and bottom of the TV picture frame. This can be accomplished in any one of two different modes. Each of these two modes conveys its own spectacular viewing angle of the game to the TV viewing audience. Each of these two modes is achieved by physically rotating the cameras 35 and 36 and their lenses 37 and 38 about their optical axes respectively by using an actuating device that is mechanically coupled to the cameras 35 and 36 and lenses 37 and 38 inside the instrumentation package assembly 11. The mechanical actuating device has two stops that are mechanically detented 180 degrees apart from one another. The mechanical actuating device is housed within the camera's instrumentation package assembly 11. The mechanical actuating device can rotate the cameras 35 and 36 and lenses 37 and 38 together to any one of the two stops about their optical axes respectively. The cameraman in the remote base station selects which of the two modes is to be employed, and sends a signal to the instrumentation package assembly 11 to set the cameras 35 and 36 and lenses 37 and 38 to the desired mode he selected.

In the first mode, the cameras 35 and 36 and lenses 37 and 38 are aligned in rotation about their optical axes respectively inside its instrumentation package assembly 11 by the mechanical actuating device so that the TV viewing audience sees the stadium horizon in the outfield near the bottom edge of the 3-D TV picture frame. (This is equivalent to what a person would see visually if he were laying flat down on the playing field with his head resting on the instrumented baseball home plate and looking upward with his feet facing the pitcher.) The stadium outfield horizon appears horizontal in the picture frame at the very bottom center of the TV picture frame. The pitcher appears to be standing upright on his mound just above the bottom center of the picture. When the pitcher throws the baseball to the catcher, the TV audience will see the baseball approaching the center of the TV picture frame from above the bottom center of the picture frame. The size of the baseball grows larger as it gets closer to the instrumented baseball home plate and the batter. Since the cameras 35 and 36 are physically located below the batter inside the instrumented baseball home plate, an image of the underside of batter's chin and sweaty arm pits will occupy the left center of the TV picture frame.

The batter appears standing upright in the picture frame with his head near the left center and his feet at the left side of the SD/HD letterbox 3-D TV picture frame. When the pitcher throws the baseball to the catcher, the TV audience will see the baseball approaching the center of the TV picture frame from the image of the pitcher's hand which is near the bottom center of the picture frame. The size of the baseball grows larger as it gets closer to the instrumented baseball home plate and the batter. Since cameras 35 and 36 are below the batter, an 3-D image of the underside of batter's chin and sweaty arm pits will be near the center left of the TV picture. The microphones 33 and 34 will enable the TV audience to hear the whoosh 35 and 36 of air as the baseball passes above the instrumented baseball home plate. Cameras 34 and 35 will enable the TV audience to see the batter swing his bat, up close, to strike the baseball as it whizzes by above the instrumented baseball home plate. The microphones 33 and 34 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Cameras 35 and 36 will enable the TV audience to see the baseball as it travels outward from the crack of the bat onto the playing field. The TV audience will see the baseball get smaller as it gets further away from the instrumented home plate and the batter. The image of the baseball will move away from near the center of the TV picture frame after it is hit. The audience will see the batter drop the bat and scramble toward first base which is on the right side of center in the TV picture frame. The image of the bat will grow in size and appear to the TV viewing audience as though it was going to hit them in the face as it is dropped and careens down onto and strikes the instrumented baseball home plate. Members of the TV viewing audience will duck to avoid being hit by the bat. The TV audience will hear the thud of the bat after the batter releases it and it hits the instrumented baseball home plate. The microphones 33 and 34 will enable the TV audience to hear the scraping by the batter's cleats on the ground as he scrambles to first base. The TV audience will see the size of the batter grow smaller as he runs toward first base and gets further from home plate.

In the second mode, the cameras 35 and 36 and lenses 37 and 38 are aligned in rotation inside its instrumentation package assembly 11 by the mechanical actuating device so that the TV viewing audience sees the catcher squatting upright with his feet near the bottom of the TV picture frame. (This is equivalent to what a person would see visually if he were laying flat down on the playing field with his head resting on the instrumented baseball home plate and looking upward with his feet facing the catcher at the apex of the instrumented baseball home plate). The stadium horizon appears horizontal at the top of the TV picture frame. The pitcher appears to be standing on his mound near the top of the TV picture frame. When the pitcher throws the baseball to the catcher, the TV audience will see the baseball approaching the center of the TV picture frame from the image of the pitcher's hand which is top of center of the TV picture frame. The size of the baseball grows larger as it gets closer to the instrumented baseball home plate and the batter. Since the camera is below the batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move from the center of the TV picture frame after it is hit. The audience will see the batter drop the bat and scramble toward first base. The image of the bat will grow in size and appear to the TV viewing audience as though it was going to hit them in the face as it careens down onto and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

Each of the two cameras 35 and 36 is arranged within its instrumentation package assembly 11 so that each of the cameras 35 and 36 yields a fiber optics/copper cable transmitted upright 3-D image of objects appearing between the center and the bottom of the TV picture frame. Both cameras 35 and 36 are aligned the instrumentation package assembly 11 so that the TV viewing audience sees the pitcher standing on the pitcher's mound near the bottom center of the TV picture frame. Also, the stadium's outfield appears horizontal in the TV picture frame across the bottom of the frame. The pitcher appears to be standing upright on his mound just above the bottom center of the picture. When the pitcher throws the baseball to the catcher, the TV audience will see the baseball approaching the center of the TV picture from the bottom center of the picture.

Since the TV picture that the TV audience sees is in 3-D, the TV audience will duck their heads as the size of the baseball grows larger as it gets closer to the instrumented baseball home plate and the batter. Since the cameras are directly below the batter and looking upward, an image of the batter's chin will occupy the center of the TV picture. The TV audience will see the baseball as it passes between the batter's chin and the top of the instrumented baseball home plate. The TV audience will hear the loud whoosh of air as the baseball passes above the instrumented baseball home plate and below the batter's chin. The TV audience will move their heads to avoid being hit (figuratively speaking) by the ball. The TV audience will see the batter swing his bat up close, to strike the baseball as it whizzes by. The TV audience will hear the rush of the air as he swings his bat. The TV audience will hear the loud crack of the bat as it strikes the baseball. The TV audience will see the baseball as it is hit by the bat. The TV audience will see the baseball as it travels outward from the bat onto the playing field. The TV audience will see the baseball get smaller as it gets further away from the instrumented baseball home plate. The audience will see the batter drop his bat and scramble toward first base. The TV audience will hear the thud of the bat hit the ground after the batter drops it. The TV audience will hear the scraping by the batter's cleats on the ground as the batter scrambles to first base. The TV audience will see the numbers on the batter's back and see his size grow smaller as he scampers toward first base. In summary, the instrumented baseball home plate gives the TV viewing audience pictures and sounds of the game that are so exciting and realistic that it makes them feel that they themselves are in the game at bat.

The instrumented baseball home plate has two protective cover plates 22 and 23 embedded and molded into it. One protective cover plate 22 is on the top and one is on the bottom of the instrumented baseball home plate. The outer body of the top protective cover plate 22 is made spherically dome shaped. The entire body of the bottom protective cover plate 23 is made flat and has rounded edges like the edges on the top protective plate 22.

The materials chosen for the protective cover plates 22 and 23 in the present preferred embodiment are polycarbonates, ABS, or fiber reinforced plastics. Although a variety of other materials would function almost equally as well, these have an advantage in that they are lightweight and stiff, enabling the thickness of the protective cover plates 22 and 23 to remain thin while still delivering the significant stiffness needed to perform their mechanical shielding function in the limited space they can occupy within the instrumented baseball home plate. These materials have an additional advantage in that they are transparent to the transmitted and received radio waves which need to move to and from the antennas inside the instrumented baseball home plate without absorption or reflection.

The instrumentation package assembly 11 is sandwiched between the top and bottom protective cover plates. The purpose of these protective cover plates 22 and 23 is to act as a shield to protect the instrumentation package assembly 11 from being damaged during the game. During the normal course of the game, the top of the instrumented baseball home plate will be hit and crushed by the players and by their equipment. For example, the players may step on the instrumented baseball home plate or slide into it. They may even drop their bat on it. The two protective cover plates 22 and 23 protect the instrumentation package assembly 11 within the instrumented baseball home plate from physical damage due to these hits.

Around the top, bottom and sides of the instrumented baseball home plate, the space between the outer covering and the protective cover plates 22 and 23 is filled with white rubber encapsulating material 19. When cured, this encapsulating material 19 acts as cushioning to absorb shock and vibration to the instrumented baseball home plate. The molting material 19 encapsulates the upper and lower protective cover plates 22 and 23 and maintains their positions inside the molded instrumented baseball home plate. The space between the protective cover plates 22 and 23 and the instrumentation package assembly 11 is also filled with the same encapsulating material 19. When cured, this encapsulating material 19 acts as cushioning to absorb shock and vibration to the instrumentation package assembly 11. The molting material 19 encapsulates the instrumentation package assembly 11 inside the instrumented baseball home plate and thereby maintains its position inside the molded instrumented baseball home plate.

The top protective cover plate 22 is spherically dome shaped in its outer region. The purpose of making it spherically dome shaped is to provide maximum protection for the optical windows 20 and 7 whose surfaces are at the very top of the instrumented baseball home plate. The upper protective cover plate is flat in its inner region close to the optical windows 20 and 7. The flat shape enables the upper protective cover plate 22 to surround the optical windows 20 and 7 at the top 8 of the instrumented baseball home plate where the optical windows 20 and 7 are most likely to be exposed to the greatest threat of damage due to hits to the top 8 of the instrumented baseball home plate. The upper protective cover plate 22 is buried in molding material 19 at the center top 8 of the instrumented baseball home plate around the optical windows 20 and 7 by approximately 1/32 to 1/8 inch below the top 8. The dome shape enables the upper protective cover plate 22 to come very close to the top 8 center of the instrumented baseball home plate where the players will have only grazing contact with its curved surface if they crash into the instrumented baseball home plate, thereby eliminating the threat of injury to the players if they hit the top of the instrumented baseball home plate. The spherical shape of the protective cover plate 22 causes its edges to be curved downward away from the top of the outer skin and places them approximately over 1 inch below the top surface 8 of the instrumented baseball home plate.

The upper protective cover plate 22 protects the instrumentation package assembly 11 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 8 of the instrumented baseball home plate 4 and the upper protective cover plate 22 is filled with a resilient encapsulation padding material 19. The entire volume between the upper protective cover plate 22 and the instrumentation package assembly 11 is filled with the same resilient encapsulation padding material 19. The domed shape of the upper protective cover plate 22 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 22 is bent downward and past the outermost tips of the radio antennas 25, 26, 27, and 28 to protect them. The curvature of the upper protective 18 cover plate 18 is made large enough so that the dome completely covers around them. The dome shape allows the thickness of the padding 19 between the top 8 of the instrumented baseball home plate 4 and the upper protective cover plate 18 to increase as the radial distance from the center 13 of the instrumented home plate 4 increases outwardly.

The lower protective cover plate 23 is entirely flat and is buried in encapsulating material 19 approximately 1/4 inch or more above the bottom surface of the instrumented baseball home plate. The body of the lower protective cover plate 23 is made flat because it is buried in the ground and there is no danger of the players coming into violent contact with it. The flat shape is easier to make and less expensive to manufacture. Its thickness is also made in the range of approximately 1/8 to 1/2 inches. However, its thickness is not physically restrained because of its location, as is the case with the upper protective cover plate 22. In all cases, the edges of the protective cover plates 22 and 23 come within no less than 1/4 inches from all sides of the instrumented baseball home plate.

Each of the microphones 33 and 34 listens for sounds from their respective sides of the instrumented baseball home plate. The condenser microphones enable the viewing audience to hear real-time contacts, impacts and shocks to the instrumented baseball home plate. Microphones 33 and 34 enable the TV audience to hear sounds that result from air or any physical contacts or vibrations to the instrumented baseball home plate; like for example, the crash of a player sliding into the instrumented baseball home plate.

Microphone 46 protrudes through a hole in the top of the instrumented baseball home plate.

Microphone 46 is mounted through a hole in the upper protective cover plate. Microphone 46 is connected by cable 47 to electrical connector 48. 48 is connected to the electronics in the instrumentation package assembly 18. Microphone 46 enables the TV audience to hear sounds that occur on the baseball playing field. Microphone 46 enables the TV audience to hear the whoosh of air as a pitched baseball passes above the instrumented baseball home plate.

Simultaneously live 3D TV pictures are taken by the TV cameras 35 and 36 of their respective field of views of the live action on the playing field. Cameras 35 and 36 will enable the TV audience to see a right or left handed batter swing his bat, up close, to strike the baseball as it whizzes bye above the instrumented baseball home plate. Microphone 46 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

In a further preferred embodiment, the present invention referring to FIG. 25A and FIG. 25B and FIG. 25C and FIG. 25D contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 30A and FIG. 30B and FIG. 31A and FIG. 31B and FIG. 32A and FIG. 32B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 35C which is a top view of a general sports stadium that has been configured and equipped for use with both static and dynamic instrumented sports paraphernalia, using both bi-directional wireless radio wave communication links and/or bi-directional fiber optics/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 30A and FIG. 30B, and FIG. 31A and FIG. 31B, and FIG. 32A and FIG. 32B, and FIG. 35A and FIG. 35B and FIG. 35C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium. These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented baseball home plates that are being controlled.

In yet another preferred embodiment, the instrumented baseball home plate shown in FIG. 25A and FIG. 25B is equipped to wirelessly stream its audio and video onto the internet.

The instrumented baseball home plate is instrumented with instrumentation package assembly elements. The instrumentation package assembly elements are shown in FIG. 19D.

The instrumentation package assembly elements contain an electronics circuit called an electronics package unit. The electronics package unit is shown in FIG. 11A. The electronics package unit enables the instrumented baseball home plate to communicate with and stream on the internet.

Referring to FIG. 11B, FIG. 11B shows the architecture of the streaming system that conveys high definition video and multi-dimensional audio from instrumented baseball home plates 20, captured by the cameras and microphones contained within their instrumentation package assembly elements, to stream to an audience which may or may not have spectators 7, 8, 9 and 10 respectively present at the games but wish to subscribe and view the games remotely on their personal wireless display devices. The electronics package units inside the instrumentation package assembly elements communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the baseball playing field who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given baseball field of play currently broadcasted.

Referring to FIG. 11A, FIG. 11A is the electronics system block diagram for streaming baseball games on the internet from instrumented sports paraphernalia like instrumented baseball home plates. FIG. 11A shows the block diagram for the system for streaming the video and audio of baseball games captured by the cameras and microphones aboard the instrumented sports paraphernalia like instrumented baseball home plates. The primary component of the system for connecting the instrumented sports paraphernalia like instrumented baseball home plates to the internet is the electronic package unit 1. The electronics package unit 1 enables the instrumented baseball home plates to communicate with and stream on the internet. The electronics package unit 1 collects video and audio from the cameras 2 and microphones 3 aboard the instrumentation package assembly elements inside the instrumented baseball home plates, and channels the video and audio to the antenna 8 for wireless transmission to a Mobile Broadband Tower. The wireless topography for the system is shown in FIG. 11B.

The instrumented baseball home plates are instrumented with instrumentation package assembly elements. An example of an instrumentation package assembly element is shown in FIG. 40A, FIG. 40B and FIG. 40C. Referring to FIG. 40A, FIG. 40B and FIG. 40C, each instrumentation package assembly element is equipped typically with one electronics package unit. Each electronics package unit channels a minimum of one high definition video camera and one microphone whose captured video and audio is buffered by processing hardware following with suitable H.264/MPEG compression by compression hardware, which is and subsequently sent to an active broadband connection established by LTE/4g cellular streaming hardware and an antenna using for example Mobile Broadband Hotspot Hardware Technology. Each electronics package unit contains video processing hardware, audio processing hardware, audio and video compression hardware, 4G/LTE cellular streaming high-speed terrestrial mobile broadband service hardware, and a Wifi band hardware interface.

Referring to FIG. 11A, in some venues the internet is available to the instrumented baseball home plates by a fiber optics/copper cable feed buried beneath the ground of the baseball field. In venues where the internet is available by such cable, the cable feed 10 is brought up from the ground and connected to the electronic package unit 1 via 9. If the cable feed is not already available, then it is installed as part of implementing this embodiment.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Each electronics package unit 1 referred to in FIG. 11A uses a high-speed terrestrial mobile broadband service to connect the camera(s) and microphone(s) to a publicly accessible internet relay server for the purpose of real-time viewing the game by audiences using their portable wireless devices—i.e. WIFI enabled Phones, Laptops, Touch Pads, PDA's, etc.

Referring to the Preferred Embodiments Specified in FIG. 25A and FIG. 25B and FIG. 25C and FIG. 25D;

the instrumented baseball home plate satisfies all of the following objectives:

It is an objective of the present invention to instrument a baseball home plate composed of an instrumentation package assembly, buffer plate assembly, encapsulation cushioning material, upper protective cover plate, and lower protective cover plate. It is an objective of the present invention to instrument the pitcher's bullpen with an instrumented baseball home plate. It is an objective of the present invention to enable an instrumented baseball home plate, which when stationed on any baseball playing field at any traditional home plate location, can both wirelessly and/or by using fiber optics/copper cable connectivity, and autonomously televise baseball games under the command and control of a remote base station. The remote base station is disclosed in FIG. 59A and FIG. 59B and FIG. 60A and FIG. 60B and FIG. 61A and FIG. 61B. It is an objective of the present invention to enable the cameraman in a remote base station to select either the wireless mode of communication and/or the fiber optics/copper cable mode of communication for the instrumented baseball home plate. The cameraman can use whichever equipment (antenna arrays or fiber optics cable/copper cable) is installed in the baseball stadium with which to command and control his choice and communicate it to the instrumented baseball home plate on the baseball stadium playing field. These choices are also physically switch selectable with access from inside through the bottom of the instrumented baseball home plate.

FIG. 26A and FIG. 26B and FIG. 26C

The detailed physical elements disclosed in the instrumented baseball home plate drawings shown in FIG. 26A and FIG. 26B and FIG. 26C are identified as follows: 1 is the y-axis of camera 43. 2 is the y-axis of symmetry of the instrumented baseball home plate. 3 is the y-axis of camera 44. 4 is the instrumented baseball home plate. 5 is a lower induction coil used to charge the battery pack inside the instrumentation package assembly. 6 is a lower induction coil used to charge the battery pack inside the instrumentation package assembly. 7 is a plane-parallel-flat optical window. 8 is the top of the instrumented baseball home plate. 9 is the side of the instrumented baseball home plate. 10 is the side of the instrumented baseball home plate. 11 is the central hub of the instrumentation package assembly containing the battery pack. 12 is the Type XI buffer plate. 13 is the bottom of the instrumented baseball home plate. 14 is the bellows segment of an instrumentation package assembly element. 15 is the x-axis of symmetry of the instrumented baseball home plate. 16 is the bottom of the central instrumentation package assembly. 17 is the side of the central instrumentation package assembly. 18 is the top of the central instrumentation package assembly. 19 is the top of the instrumented baseball home plate. 20 is the plane-parallel-flat optical window. 21 is the bellows section of the instrumentation package assembly element. 22 is the right side of the instrumented baseball plate. 23 is the upper protective cover plate. 24 is the lower protective cover plate. 25 is a wireless radio antenna. 26 is a wireless radio antenna. 27 is a wireless radio antenna. 28 is a wireless radio antenna, 29 is the z-axis of the camera whose optical window is 20. 30 is the z-axis of the instrumentation package assembly and the instrumented baseball home plate. 31 is the z-axis of the camera whose optical window is 7. 32 is a fiber optics/copper cable connector in the bottom of the instrumentation package assembly. 33 is a lower induction coil. 34 is a lower induction coil. 35 is an optical window. 36 is an optical window. 37 is the z-axis of the camera whose optical window is 35. 38 is the z-axis of the camera whose optical window is 36. 39 is the bellows section of the instrumentation package assembly element belonging to optical window 36. 40 is the bellows section of the instrumentation package assembly element belonging to optical window 35. 41 is a camera. 42 is a camera. 43 is a camera. 44 is a camera. 45 is a camera lens. 46 is a camera lens. 47 is a camera lens. 48 is a camera lens. 49 is a microphone. 50 is a microphone. 51 is the bellows segment of an instrumentation package assembly element. 52 is an access lid heat sink. 53 is a microphone. 54 is the microphone cable. 55 is the microphone connector. 56 is the battery pack. 57 is a microphone. 58 is a microphone. 59 is a microphone. 60 is a microphone. 61 is a microphone.

62 is a microphone. 63 is a microphone. 64 is a microphone.

FIG. 26A is the top view of a four-camera instrumented baseball home plate.

FIG. 26B is the side view of a four-camera instrumented baseball home plate.

FIG. 26C is the side view of a four-camera instrumented baseball home plate.

Referring to drawings FIG. 26A and FIG. 26B and FIG. 26C, in a preferred embodiment, the present invention contemplates an instrumented baseball home plate, which when stationed on any baseball playing field at any traditional home plate location on the baseball diamond, can wirelessly and autonomously televise baseball games from its cameras and microphones under the command and control of the remote base station. Each instrumented baseball home plate is equipped with an instrumentation package assembly 11 which is comprised of four instrumentation package assembly elements 14 and 40. The instrumentation package assembly element 11 contains electronics which channels the video from the two cameras 35, 36 and eleven microphones 49, 50, 53, 57, 58, 59, 60, 61, 62, 63, 64 to radio antennas 25, 26, 27, 28 from which the signals are transmitted wirelessly to the remote base station via the antenna relay junction in the sports stadium. The remote base station and antenna relay junction are disclosed in FIG. 30A and FIG. 30B, and FIG. 31A and FIG. 31B, and FIG. 32A and FIG. 32B, and FIG. 35A, and FIG. 35B, and FIG. 35C. Among its many functions, the remote base station processes the signals and broadcasts 3D pictures and surround sound to the TV viewing audience.

Additionally, referring to drawings FIG. 26A and FIG. 26B and FIG. 26C, in a preferred embodiment, the present invention contemplates an instrumented baseball home plate, which when stationed on any baseball playing field at the traditional home plate location on the baseball diamond can wirelessly and autonomously stream baseball games onto the internet. Each home plate is equipped with an instrumentation package assembly 11 which is comprised of four instrumentation package assembly elements 14, 51, 39 and 40. Each instrumentation package assembly element 14 and 40 contains an electronics package unit which channels the video from cameras 41, 42, 43 and 44 to radio antennas 25, 26, 27 and 28 from which the signals are transmitted wirelessly to a mobile broadband tower. The electronics package unit also channels the audio from microphones 49, 50, 53, 57, 58, 59, 60, 61, 62, 63, and 64 to radio antennas 25, 26, 27 and 28 from which the signals are transmitted wirelessly to a mobile broadband tower. The electronic package unit electronics are disclosed in FIG. 11A. The mobile broadband tower is shown in FIG. 11B. Also, FIG. 11B shows the architecture of the streaming system that conveys high definition video and multi-dimensional audio from the instrumented baseball home plate.

The instrumented baseball home plate in FIG. 26A and FIG. 26B and FIG. 26C uses four cameras rather than two, where the cameras shown in FIG. 26A and FIG. 26B and FIG. 26C are arranged into two 3-D stereo camera pairs rather than one.

The instrumented baseball home plate employs a four camera instrumentation package assembly substantially identical to the instrumentation package assembly shown in FIG. 21A and FIG. 21B and FIG. 21C. Four instrumentation package assembly elements are primary parts of the instrumentation package assembly. The instrumentation package assembly uses the identical instrumentation package assembly elements disclosed in FIG. 19D.

The preferred embodiment specifying the fiber optics cable/copper cable transmission link is disclosed in FIG. 31A and FIG. 31B and FIG. 32A and FIG. 32B.

The preferred embodiment specifying the radio transmission link is disclosed in FIG. 30A and FIG. 30B.

The instrumented baseball home plate is instrumented with the instrumentation package assembly disclosed in FIG. 21A and FIG. 21B and FIG. 21C.

Details of instrumentation package assembly elements are shown in FIG. 19D.

The present preferred embodiment provides the TV viewing audience with 3-D stereo pictures and stereophonic sound.

The fiber optics cable/copper cable transmission link is disclosed in the preferred embodiment shown in FIG. 31A and FIG. 31B. The fiber optics cable/copper cable transmission link is disclosed in another preferred embodiment shown in FIG. 32A and FIG. 32B.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 26A and FIG. 26B and FIG. 26C, the instrumented baseball home plate has one instrumentation package assembly 11 mounted inside the plate. Details of instrumentation package assembly 11 are specified in FIG. 21A and FIG. 21B and FIG. 21C. The white rubber top 8 of both the instrumented baseball home plate and the conventional baseball home plate are identical, having the same size, shape, color and texture.

The instrumentation package assembly 11 carries four CCD sensor arrayed cameras 41, 42, 43, and 44. The instrumentation package assembly 11 carries two microphones 49 and 50. The four cameras 41, 42, 43, and 44 in the instrumentation package assembly 11 are arranged into two pairs 41, 42 and 43, 44. The first 3-D stereo camera pair is comprised of cameras 41 and 42. The second 3-D stereo camera pair is comprised of cameras 43 and 44. The pairs of cameras 41, 42 and 43, 44 act electronically and independently to simultaneously produce two 3-D stereo TV pictures of the game. Each of the cameras 41 and 42 that form the first 3-D stereo camera pair 41, 42 are separated by an interpupillary distance. Each of the cameras 43 and 44 that form the second 3-D stereo camera pair 43, 44 are separated by an interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm. How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, larger interpupillary distance will produce more striking 3-D effects.

The 3-D stereo camera pair 41 and 42 in the instrumentation package assembly 11 that forms the first 3-D stereo camera pair, has optical windows 35 and 36 respectively. The 3-D stereo camera pair 43 and 44 in the instrumentation package assembly 11 that forms the second 3-D stereo camera pair has optical windows 20 and 7 respectively. The two cameras 41 and 42 in the instrumentation package assembly 11 that form the first 3-D stereo camera pair have optical axes 37 and 38. The two cameras 43 and 44 in the instrumentation package assembly 11 that form the second 3-D stereo camera pair have optical axes 29 and 31. The interpupillary distance for both of the 3-D stereo camera pairs is identical.

It should be noted here that it is not mandatory that the interpupillary distances for the first and second 3-D stereo camera pairs be made identical in all embodiments. In another preferred embodiment, they are deliberately made different in order to produce a deliberate difference in 3-D sensations as experienced by the TV viewing audience.

Referring to FIG. 26B and FIG. 26C, the lines of sight of the first and of the second 3-D stereo camera pairs, are both looking straight upward from the top 8 of the instrumented baseball home plate along their respective optical axes. Their lines of sight are all parallel to one another.

The SD/HD letter box picture formats of cameras 41 and 42 are aligned together. The SD/HD letter box picture formats of cameras 43 and 44 are aligned together.

The instrumented baseball home plate has two protective cover plates 23 and 24 embedded and molded into it. One protective cover plate 23 is on the top and one 24 is on the bottom of the instrumented baseball home plate. The outer body of the top protective cover plate 23 is made spherically dome shaped. The entire body of the bottom protective cover plate 24 is made flat and has rounded edges like the edges on the top protective cover plate 23.

The materials chosen for the protective cover plates 23 and 24 in the present preferred embodiment are polycarbonates, ABS or fiber reinforced plastics. Although a variety of other materials would function almost equally as well. Polycarbonates, ABS or fiber reinforced plastics have an advantage in that they are lightweight and stiff, enabling their thickness to remain thin while still delivering the significant stiffness needed to perform their mechanical shielding function in the limited space they can occupy within the instrumented baseball home plate. They have an additional advantage in that they are transparent to the transmitted and received radio waves which need to move to and from the antennas 25, 26, 27 and 28 inside the instrumented baseball home plate without absorption or reflection.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged during the game. During the normal course of the game, the top 8 of the instrumented baseball home plate will be hit and crushed by the players and by their equipment. For example, the players may step on the instrumented baseball home plate or slide into it. They may even drop their bat on it. The two protective cover plates 23 and 24 protect the instrumentation package assembly 11 within the instrumented baseball home plate from physical damage due to these hits.

The space between the top 8, bottom 13 and sides of the instrumented baseball home plate and the protective cover plates 23 and 24 is filled with white rubber encapsulating material 19. Synthetic rubber is an example of encapsulating material that is used. When cured, this encapsulating material 19 acts as cushioning to absorb shock and vibration to the instrumented baseball home plate. The material 19 encapsulates the upper and lower protective cover plates 23 and 24 and maintains their positions inside the molded instrumented baseball home plate. The space between the protective cover plates 23 and 24 and the instrumentation package assembly 11 is also filled with the same encapsulating material. When cured, this encapsulating material 19 acts as cushioning to absorb shock and vibration to the instrumentation package assembly 11. The material 19 encapsulates the instrument package assembly 11 inside the instrumented baseball home plate and thereby maintains its position inside the molded instrumented baseball home plate.

The top protective cover plate 23 is made flat in its innermost region close to the optical windows 35, 36 and 20, 7. The purpose of making it flat in its innermost region is to provide maximum protection for the optical windows 35, 36 and 20, 7 whose surfaces are at the very top 8 of the instrumented baseball home plate. The flat shape enables the protective cover plate 23 to surround the optical windows 35, 36 and 20, 7 at the top 8 of the instrumented baseball home plate where the optical windows 5, 36 and 20, 7 are most likely to be exposed to the greatest threat of damage due to hits to the top of the instrumented baseball home plate. The upper protective cover plate 23 is buried in encapsulating material at the center top of the instrumented baseball home plate around the optical windows 35, 36 and 20, 7 by approximately 1/32 inch or more below the top 8. The dome shape enables the upper protective cover plate 23 to come very close to the top center of the instrumented baseball home plate where the players will have only grazing contact with its curved surface if they crash into the instrumented baseball home plate, thereby eliminating the threat of injury to the players if they hit the top of the instrumented baseball home plate. Furthermore, the spherical shape of the protective cover plate 23 causes its edge to be rounded downward away from the top 8 and places it approximately 1 inch or more below the top surface 8 of the instrumented baseball home plate.

The upper protective cover plate 23 protects the instrumentation package assembly 11 from being crushed and damaged by the players during the game. The instrumentation package assembly is located below the upper protective cover plate 23 inside of the instrumented baseball home plate. In order to achieve its purpose, the upper protective cover plate 23 must be stiff. The entire volume between the top 8 of the instrumented baseball home plate 4 and the upper protective cover plate 23 is filled with a resilient encapsulation padding material 19. The entire volume between the upper protective cover plate 23 and the instrumentation package assembly 11 is filled with the same resilient encapsulation padding material 19. The domed shape of the upper protective cover plate 23 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 23 is bent downward and past the outermost tips of the radio antennas 25, 26, 27, and 28 to protect them. The curvature of the upper protective 23 cover plate 23 is made large enough so that the dome completely covers around them. The dome shape allows the thickness of the padding 19 between the top 8 of the instrumented baseball home plate 4 and the upper protective cover plate 23 to increase as the radial distance from the center 13 of the instrumented home plate 4 increases outwardly.

The lower protective cover plate 24 is entirely flat and is buried in encapsulating material 19 approximately ½ inch or more above the bottom surface of the instrumented baseball home plate. The body of the lower protective cover plate 24 is made flat because it is buried in the ground and there is no danger of the players coming into violent contact with it. The flat shape is easier to make and less expensive to manufacture. Its thickness is also made in the range of approximately ¼ to ½ inches. The thickness of the lower protective cover plate 24 is not physically restrained because of its location, as is the case with the upper protective cover plate 23.

In all cases, the rounded edges of the protective cover plates 23 and 24 come within no less than ¼ inch or more from all sides of the instrumented baseball home plate.

The first 3-D stereo camera pair 41 and 42 is aligned together within their instrumentation package assembly 11 so that they yield wirelessly transmitted upright 3-D stereo images of objects which appear between the center and the bottom of the TV picture frame. The second 3-D stereo camera pair 43 and 44 is aligned together within their instrumentation package assembly 11 so that they yield wirelessly transmitted upright 3-D stereo images of objects which appear between the center and the bottom of the TV picture frame. This can be accomplished in any one of four different modes. Each of these modes conveys its own spectacular viewing angle of the game to the TV viewing audience. The first two of these four modes is achieved by physically rotating the cameras 41 and 42 and their lenses 45 and 46 about their optical axes 37 and 38 respectively by using an actuating device that is mechanically coupled to the cameras 41 and 42 and lenses 45 and 46 inside the instrumentation package assembly 11. The second two of these four modes is achieved by physically rotating the cameras 43 and 44 and their lenses 47 and 48 about their optical axes 29 and 31 respectively by using an actuating device that is mechanically coupled to the cameras 43 and 44 and lenses 47 and 48 inside the instrumentation package assembly 11. Two different mechanical actuating devices are used. The first mechanical actuating device controls the two modes of the first 3-D stereo camera pair. The second mechanical actuating device controls the two modes of the second 3-D stereo camera pair. The first mechanical actuating device that controls the two modes of the first 3-D stereo camera pair has two detented positions that are 180 degrees apart. The second mechanical actuating device that controls the two modes of the second 3-D stereo camera pair has two detented positions that are 180 degrees apart. The mechanical actuating devices are housed within the camera's instrumentation package assembly 11. The first mechanical actuating device can rotate the cameras 41 and 42 and lenses 45 and 46 together to any one of its two stops. The second mechanical actuating device can rotate the cameras 43 and 44 and lenses 47 and 48 together to any one of its two stops. The cameraman in the remote base station selects which of the two modes is to be employed for the first 3-D stereo camera pair, and sends a signal to the instrumentation package assembly 11 to set the cameras 41 and 42 and lenses 45 and 46 to the desired mode he selected. The cameraman in the remote base station selects which of the two modes is to be employed for the second 3-D stereo camera pair, and sends a signal to the instrumentation package assembly 11 to set the cameras 43 and 44 and lenses 47 and 48 to the desired mode he selected.

In the first mode, the cameras 41 and 42 and lenses 45 and 46 are aligned in rotation inside their instrumentation package assembly 11 by the first mechanical actuating device so that the TV viewing audience sees the stadium horizon in the outfield near the bottom edge of the 3-D TV picture frame. (This is equivalent to what a person having two eyes would see visually if he were laying flat down on the playing field with his head resting on the instrumented baseball home plate and looking upward with his feet facing the pitcher.) The stadium horizon appears horizontal in the picture frame at the very bottom center of the TV picture frame. The pitcher appears to be standing upright on his mound just above the bottom center of the picture. When the pitcher throws the baseball to the catcher, the TV audience will see the baseball approaching the center of the TV picture frame from the bottom center of the 3-D TV picture frame. The size of the baseball grows larger as it gets closer to the instrumented baseball home plate and the batter. Since the cameras 41 and 42 are physically located below the batter inside the instrumented baseball home plate, an image of the underside of batter's chin and sweaty arm pits will occupy the center of the 3-D TV picture frame.

In the second mode, the cameras 43 and 44 and lenses 47 and 48 are aligned in rotation inside their instrumentation package assembly 11 by the second mechanical actuating device so that the TV viewing audience sees the stadium horizon in the outfield near the right side of the 3-D TV picture frame. (This is equivalent to what a person having two eyes would see visually if he were laying flat down on the playing field with his head resting on the instrumented baseball home plate and looking upward with his feet facing a right handed batter standing on side 52 of the instrumented baseball home plate.) The right handed batter appears to be standing upright with his feet just above the bottom of the 3-D TV picture frame. When the pitcher throws the baseball to the catcher, the TV audience will see the baseball approaching the center of the 3-D TV picture frame from the right of the 3-D TV picture frame. The size of the baseball grows larger as it gets closer to the instrumented baseball home plate and the batter. Since the cameras 43 and 44 are physically located below the batter inside the instrumented baseball home plate, an image of the underside of batter's chin and sweaty arm pits will occupy the center of the 3-D TV picture frame.

In the third mode, the cameras 41 and 42 and lenses 45 and 46 are aligned in rotation inside its instrumentation package assembly 11 by the first mechanical actuating device so that the TV viewing audience sees the stadium horizon in the outfield at the top of the 3-D TV picture frame. (This is equivalent to what a person would see visually if he were laying flat down on the playing field with his head resting on the instrumented baseball home plate and looking upward with his feet facing the catcher.) The stadium outfield horizon appears horizontal in the 3-D TV picture frame at the top of the 3-D TV picture frame. The pitcher appears to be standing on his mound with his feet near the top of the 3-D TV picture frame. When the pitcher throws the baseball to the catcher, the TV audience will see the baseball approaching the center of the TV picture frame from the image of the pitcher's hand which is near the top of the 3-D TV picture frame. The size of the baseball grows larger as it gets closer to the instrumented baseball home plate and the batter. Since cameras 41 and 42 are below the batter, a 3-D image of the underside of batter's chin and sweaty arm pits will occupy the right side of the 3-D TV picture frame. The microphones 32 and 33 will enable the TV audience to hear the whoosh of air as the baseball passes above the instrumented baseball home plate. Cameras 41 and 42 will enable the TV audience to see the batter swing his bat, up close, to strike the baseball as it whizzes by above the instrumented baseball home plate. The microphones 49 and 50 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Cameras 41 and 42 will enable the TV audience to see the baseball as it travels outward from the crack of the bat onto the playing field. The TV audience will see the baseball get smaller as it gets further away from the instrumented home plate and the batter. The image of the baseball will move away from the center of the TV picture frame after it is hit. The TV audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the fourth mode, the cameras 43 and 44 and lenses 47 and 48 are aligned in rotation inside its instrumentation package assembly 11 by the second mechanical actuating device so that the TV viewing audience sees the stadium horizon in the outfield at the left side of the 3-D TV picture frame. (This is equivalent to what a person would see visually if he were laying flat down on the playing field with his head resting on the instrumented baseball home plate and looking upward with his feet facing a left handed batter standing on side 22 of the instrumented baseball home plate.) The pitcher appears to be standing on his mound toward the left hand side of the 3-D TV picture frame. When the pitcher throws the baseball to the catcher, the TV audience will see the baseball approaching the center of the TV picture frame from the image of the pitcher's hand which is left of center of the TV picture frame. The size of the baseball grows larger as it gets closer to the instrumented baseball home plate and the batter. Since the camera is below the batter, an image of the underside of batter's chin and sweaty arm pits will appear below the center of the 3-D TV picture frame. Microphones 49 and 50 will enable the TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the 3-D TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In another preferred embodiment, the same four cameras 41, 42, 43, and 44 specified in the previous preferred embodiment in FIG. 26 are used, but instead of arranging the cameras into the two 3-D stereo camera pairs described previously as the first and second 3-D stereo camera pairs, where 41 and 42 constituted the first 3-D stereo camera pair, and where 43 and 44 constituted the second 3-D stereo camera pair, the cameras 41, 42, 43, and 44 are grouped into four additional unique 3-D stereo camera pairs. The four additional 3-D stereo camera pairs are cameras 41 and 43; cameras 43 and 42, cameras 42 and 44; cameras 44 and 41. We will call 41 and 43 the third 3-D stereo camera pair. We will call 43 and 42 the fourth 3-D stereo camera pair. We will call 42 and 44 the fifth 3-D stereo camera pair. We will call 44 and 41 the sixth 3-D stereo camera pair.

As before in the previous embodiment for the first and second 3-D stereo camera pairs, in order to use the 3-D composite pictures from any one of these four additional 3-D stereo camera pairs, the cameras and their lenses that make up the 3-D stereo camera pair must be previously rotated about their optical axes by their respective mechanical actuating mechanisms to pre-set detented positions 180 degrees apart, to align their letterbox formats together before televising the TV pictures. The cameraman in the remote base station will be able to verify that the letterbox formats of the pictures from the two cameras that make up each 3-D stereo camera pair are aligned. The letterbox formats must be aligned so that the resultant composite 3-D picture made up of the pictures from the two 3-D stereo cameras will overlay with proper parallax to produce the required 3-D sensation in the TV viewing audience.

The additional four 3-D stereo pairs of cameras act electronically and independently to simultaneously produce four additional 3-D stereo TV pictures of the game. They use the same electronics as before, and the same lenses as before as in the previous preferred embodiment.

In the previous preferred embodiment, each of the cameras 41 and 42 that formed the first 3-D stereo camera pair 41, 42 are separated by a 75 millimeter interpupillary distance. Each of the cameras 43 and 44 that formed the second 3-D stereo camera pair 43, 44 are separated by 75 millimeters.

It can be seen from simple geometry in FIG. 26A that the interpupillary distance for the third, fourth, fifth and sixth 3-D stereo camera pairs is equal to one half the square root of two times the interpupillary distance for either the first or second 3-D stereo camera pairs. For example, if the interpupillary distance for the first 3-D stereo camera pair is 75 millimeters, then the interpupillary distance for the third 3-D stereo camera pair would be 0.707 times 75 millimeters or 53.03 millimeters.

75 millimeters is the maximum interpupillary distance of the average human's eyes. It is understood that other alternative interpupillary distances may be used to produce other alternative 3-D effects. For example, larger interpupillary distance will produce more striking 3-D effects.

The 3-D stereo camera pair 41 and 43 in the instrumentation package assembly 11 that forms the third 3-D stereo camera pair, has optical windows 35 and 34 respectively.

The 3-D stereo camera pair 43 and 42 in the instrumentation package assembly 11 that forms the fourth 3-D stereo camera pair has optical windows 34 and 36 respectively.

The 3-D stereo camera pair 42 and 44 in the instrumentation package assembly 11 that forms the fifth 3-D stereo camera pair, has optical windows 36 and 7 respectively.

The 3-D stereo camera pair 44 and 41 in the instrumentation package assembly 11 that forms the sixth 3-D stereo camera pair has optical windows 7 and 35 respectively.

The two cameras 41 and 43 in the instrumentation package assembly 11 that form the third 3-D stereo camera pair have optical axes 37 and 29 respectively.

The two cameras 43 and 42 in the instrumentation package assembly 11 that form the fourth 3-D stereo camera pair have optical axes 29 and 38 respectively.

The two cameras 42 and 44 in the instrumentation package assembly 11 that form the fifth 3-D stereo camera pair have optical axes 38 and 31 respectively.

The two cameras 44 and 41 in the instrumentation package assembly 11 that form the sixth 3-D stereo camera pair have optical axes 31 and 37 respectively.

Electronically, mechanically, and optically all of these 3-D stereo camera pairs operate simultaneously. An advantage occurs when an optical window of one of the cameras is obscured by dirt; the remaining cameras can be paired remotely by the operator in the remote base station to continue to produce 3-D imagery for the TV viewers.

Referring to FIG. 26B and FIG. 26C, the lines of sight of the first, second, third, fourth, fifth and sixth 3-D stereo camera pairs are all looking straight upward from the top 8 of the instrumented baseball home plate along their respective optical axes which are all parallel to one another. Their lines of sight are all parallel to one another. The four holes in the top 8 of the instrumented baseball home plate are made just large enough to prevent vignetting of the cameras field of view.

In certain venues where stereo 3-D is not required or deemed useful from the instrumented baseball home plate, a stereo 3-D camera pair that typically has two identical lenses, for example 47 and 48, may be replaced with two dissimilar lenses having different lens settings, focal lengths and fields of view for example. Under these same circumstances, the identical cameras, for example 43 and 44 of the 3-D stereo camera pair may also be replaced with two dissimilar cameras. The 3-D stereo camera pair 43 and 44 that faces the batter from the top of an instrumented baseball home plate may be considered to be non-essential by the cameraman. Instead, the cameraman may elect to set two dissimilar focal lengths into the zoom lenses 47 and 48 facing the batter. One lens, 47 for example, may be set to a long focal length for close-up facial expressions of the batter, where the other lens 48 may be set to a short focal length for wider shots of the batter.

It should be noted at this point, that in general any combination of any two of the four cameras can be electronically commanded and controlled by the cameraman from the remote base station to act as 3-D stereo camera pairs, for example 41 and 42, 41 and 43, 41 and 44, 42 and 43, 42 and 44, 43 and 44.

Each of the microphones 49 and 50 listens for sounds from their respective sides of the instrumented baseball home plate. The condenser microphones enable the viewing audience to hear real-time contacts, impacts and shocks to the instrumented baseball home plate. Microphones 49 and 50 enable the TV audience to hear sounds that result from air or any physical contacts or vibrations to the instrumented baseball home plate; like for example, the crash of a player sliding into the instrumented baseball home plate. The sounds received from each of the microphones by the remote base station are processed using special software to produce surround sound which is broadcast to the TV viewing audience.

Microphone 53 protrudes through a hole in the top of the instrumented baseball home plate. Microphone 53 is mounted through a hole in the upper protective cover plate.

Microphone 53 is connected by cable to electrical connector 55. 55 is connected to the electronics in the instrumentation package assembly 18. Microphone 53 enables the TV audience to hear sounds that occur on the baseball playing field. Microphone 53 enables the TV audience to hear the whoosh of air as a pitched baseball passes above the instrumented baseball home plate.

Simultaneously live 3D TV pictures are taken by the TV cameras 41, 42, 43 and 44 of their respective field of views of the live action on the playing field. Cameras 41, 42, 43 and 44 will enable the TV audience to see a right or left handed batter swing his bat, up close, to strike the baseball as it whizzes bye above the instrumented baseball home plate. Microphone 53 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

In a further preferred embodiment, the present invention referring to FIG. 26A and FIG. 26B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 30A and FIG. 30B and FIG. 31A and FIG. 31B and FIG. 32A and FIG. 32B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 35C which is a top view of a general sports stadium that has been configured and equipped for use with both static and dynamic instrumented sports paraphernalia, using both bi-directional wireless radio wave communication links and/or bi-directional fiber optics cable/copper cable communication links.

A variety of different camera lens types with different lens setting capabilities, focal lengths and fields of view can be used by the cameraman. For example, extremely wide angle lenses that can see down to the horizon can be used. These lens types give the TV viewing audience a dramatic 3-D effect. When enabled by the operator/cameraman in the remote base station, the auto iris setting permits the camera lens to automatically adjust for varying lighting conditions on the field. The auto focus setting permits the camera lens to adjust focus for varying distances of the players and action subjects on the field. The cameraman may elect to control the functions of the camera lenses himself from the remote base station by sending command and control signals from the remote base station to the instrumented baseball home plate. The cameraman can zoom, focus, and control the iris settings of the camera lenses himself at will from the remote base station.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 30A and FIG. 30B, and FIG. 31A and FIG. 31B, and FIG. 32A and FIG. 32B, and FIG. 35A and FIG. 35B and FIG. 35C for disclosures regarding the remote base station and the antenna array relay junction. The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium. These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented baseball home plates that are being controlled. In yet another preferred embodiment, the instrumented baseball home plate shown in FIG. 26A, FIG. 26B and FIG. 26C is equipped to wirelessly stream its audio and video onto the internet.

The instrumented baseball home plate is instrumented with instrumentation package assembly elements. The instrumentation package assembly elements are shown in FIG. 19D.

The instrumentation package assembly elements contain an electronics circuit called an electronics package unit. The electronics package unit is shown in FIG. 11A. The electronics package unit enables the instrumented baseball home plate to communicate with and stream on the internet.

Referring to FIG. 11B, FIG. 11B shows the architecture of the streaming system that conveys high definition video and multi-dimensional audio from instrumented baseball home plates 20, captured by the cameras and microphones contained within their instrumentation package assembly elements, to stream to an audience which may or may not have spectators 7, 8, 9 and 10 respectively present at the games but wish to subscribe and view the games remotely on their personal wireless display devices. The electronics package units inside the instrumentation package assembly elements communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the baseball playing field who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given baseball field of play currently broadcasted.

Referring to FIG. 11A, FIG. 11A is the electronics system block diagram for streaming baseball games on the internet from instrumented sports paraphernalia like instrumented baseball home plates. FIG. 11A shows the block diagram for the system for streaming the video and audio of baseball games captured by the cameras and microphones aboard the instrumented sports paraphernalia like instrumented baseball home plates. The primary component of the system for connecting the instrumented sports paraphernalia like instrumented baseball home plates to the internet is the electronic package unit 1. The electronics package unit 1 enables the instrumented baseball home plates to communicate with and stream on the internet. The electronics package unit 1 collects video and audio from the cameras 2 and microphones 3 aboard the instrumentation package assembly elements inside the instrumented baseball home plates, and channels the video and audio to the antenna 8 for wireless transmission to a Mobile Broadband Tower. The wireless topography for the system is shown in FIG. 11B.

The instrumented baseball home plates are instrumented with instrumentation package assembly elements. An example of an instrumentation package assembly element is shown in FIG. 40A, FIG. 40B and FIG. 40C. Referring to FIG. 40A, FIG. 40B and FIG. 40C, each instrumentation package assembly element is equipped typically with one electronics package unit. Each electronics package unit channels a minimum of one high definition video camera and one microphone whose captured video and audio is buffered by processing hardware following with suitable H.264/MPEG compression by compression hardware, which is and subsequently sent to an active broadband connection established by LTE/4g cellular streaming hardware and an antenna using for example Mobile Broadband Hotspot Hardware Technology.

Each electronics package unit contains video processing hardware, audio processing hardware, audio and video compression hardware, 4G/LTE cellular streaming high-speed terrestrial mobile broadband service hardware, and a Wifi band hardware interface.

Referring to FIG. 11A, in some venues the internet is available to the instrumented baseball home plates by a fiber optics/copper cable feed buried beneath the ground of the baseball field. In venues where the internet is available by such cable, the cable feed 10 is brought up from the ground and connected to the electronic package unit 1 via 9. If the cable feed is not already available, then it is installed as part of implementing this embodiment.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Referring to the Preferred Embodiments Specified in FIG. 26A and FIG. 26B and FIG. 26C, the instrumented baseball home plate satisfies all of the following objectives:

It is an objective of the present invention to instrument a baseball home plate composed of a four camera instrumentation package assembly, buffer plate assembly, encapsulation cushioning material, upper protective cover plate, and lower protective cover plate. It is an objective of the present invention to instrument the pitcher's bullpen with an instrumented baseball home plate. It is an objective of the present invention to enable the cameraman in the remote base station to electronically command and control any combination of any two of the four cameras in the instrumented baseball home plate to act as 3-D stereo camera pairs. It is an objective of the present invention that instrumentation package assembly, having a selection of different interpupiliary distances, is chosen by the cameraman before the instrumentation package assembly is encapsulated into the instrumented baseball home plate. It is an objective of the present invention to instrument a baseball home plate composed of an instrumentation package assembly, buffer plate assembly, encapsulation cushioning material, upper protective cover plate, and lower protective cover plate.

It is an objective of the present invention to enable the cameraman in the remote base station to electronically command and control any combination of any two of the four cameras in the instrumented baseball home plate to act as a 3-D stereo camera pair. It is an objective of the present invention to align together the cameras that make up a 3-D stereo camera pair within their instrumentation package assembly so that they yield upright 3-D stereo images of objects which appear between the center and the bottom of the TV picture frame by electronically rotating the letterbox picture frames of the cameras about their optical axes using the circular sensor CCD chips disclosed in FIG. 34A and FIG. 34B and FIG. 34C. It is an objective of the present invention to align together the cameras that make up a 3-D stereo camera pair within their instrumentation package assembly so that they yield upright 3-D stereo images of objects which appear between the center and the bottom of the TV picture frame by physically rotating the cameras and their lenses about their optical axes using the actuating device that is mechanically coupled to the cameras and their lenses inside the instrumentation package assembly. It is an objective of the present invention to instrument the pitcher's bullpen with an instrumented baseball home plate. It is an objective of the present invention to televise from the pitcher's bullpen with an instrumented baseball home plate. It is an objective of the present invention to enable coaches who are on the sidelines during training sessions to hear the spoken dialog of their team's players from on the instrumented baseball home plate. It is an objective of the present invention to enable coaches who are on the sidelines during training sessions to view details of the team's players during training sessions on the instrumented baseball home plate. It is an objective of the present invention to enable referees who are on and off the playing field during games to review details of the game from the four cameras onboard the instrumented baseball home plate by instant replay. It is an objective of the present invention to cover and wrap the instrumentation package assembly and its four radio antennas with a domed shaped upper protective cover plate, which is bent downward and past the outermost tips of the radio antennas, to divert trauma and forces that occur to the top of the instrumented baseball home plate away from the instrumentation package assembly during the game in order to protect it. It is an objective of the present invention to equip the instrumentation package assembly to capture video and sounds on the playing field from the instrumented baseball home plate. It is an objective of the present invention to equip the instrumented baseball home plate with an instrumentation package assembly that has four TV cameras, three microphones, four wireless antenna elements, battery pack and supporting electronics housed inside its enclosure. It is an objective of the present invention to equip the instrumentation package assembly inside the instrumented baseball home plate with means to wirelessly televise the captured video and sounds to a remote base station via an antenna array relay junction stationed off the playing field but within (and around) the space of the instrumented sports stadium/arena. The antenna array relay junction is equipped to relay the video and sounds to the remote base station. The remote base station is located within the instrumented sports stadium/arena or its vicinity. It is an objective of the present invention that the instrumented baseball home plate is under the command and control of a cameraman in the remote base station. It is an objective of the present invention to enable the instrumentation package assembly to be mounted inside the instrumented baseball home plate in a manner permitting its four cameras and three microphones to see and hear out of the instrumented baseball home plate. It is an objective of the present invention to enable the instrumentation package assembly to be mounted inside the instrumented baseball home plate in a manner permitting the instrumentation package assembly to be protected from damage during the game. It is an objective of the present invention to enable the instrumentation package assembly to be mounted inside the instrumented baseball home plate in a manner permitting it to maintain its mechanical and optical alignment during the game. It is an objective of the present invention to provide a permanent position and nesting place for the instrumentation package assembly inside the instrumented baseball home plate. It is an objective of the present invention to provide means to permit easy assembly and alignment of the instrumentation package assembly in the instrumented baseball home plate. It is an objective of the present invention to provide the instrumented baseball home plate with the identical handling and playability qualities as conventional regulation baseball home plates. It is an objective of the present invention to provide means to permit the instrumentation package assembly to be nested, cradled and isolated from shock and vibration inside the instrumented baseball home plate. It is an objective of the present invention to provide an instrumentation package assembly that is sized so that it can be easily loaded and assembled into the instrumented baseball home plate. It is an objective of the present invention to provide the instrumented baseball home plate with an instrumentation package assembly that carries its own rechargeable battery pack. It is an objective of the present invention to provide the instrumented baseball home plate with an instrumentation package assembly that carries its own rechargeable battery pack that has sufficient energy to power the cameras, lenses, antennas and electronics for the duration of the game. It is an objective of the present invention to charge the battery pack of the instrumented baseball home plate using the same charging unit as used for instrumented baseball bases; other instrumented baseball home plates, instrumented ice hockey pucks, and instrumented pitcher's rubbers. It is an objective of the present invention to provide the instrumented baseball home plate with instrumentation package assembly electronics that require little power to operate and are lightweight. It is an objective of the present invention to provide the instrumented baseball home plate with an instrumentation package assembly that carries its own battery pack that is recharged wirelessly by induction. It is an objective of the present invention to provide the instrumented baseball home plate with an instrumentation package assembly that can withstand axial and tangential compression and decompression loads exerted on it during play. It is an objective of the present invention that the instrumented baseball home plate will withstand dirt, water, ice and weather conditions. It is an objective of the present invention that the instrumented baseball home plate encapsulation will provide cushioning to protect the instrumentation package assembly from shock and vibration damage. It is an objective of the present invention to provide the instrumented baseball home plate with provisions for holding the instrumentation package assembly in alignment and for cushioning and isolating the instrumentation package assembly from shocks received by the instrumented baseball home plate during the game. It is an objective of the present invention that the optical windows are made small to be unobtrusive to the game without vignetting the field of view of the cameras under the prevailing lighting conditions on the playing field. It is an objective of the present invention that the optical windows withstand heavy blows received during the game and protect the instrumentation package assembly. It is an objective of the present invention that the optical windows be easily removed, replaced and exchanged with substitutes and alternates, and permit the camera lenses to be exchanged with substitutes and alternates as well.

Figures 27A, 27B, 27C:
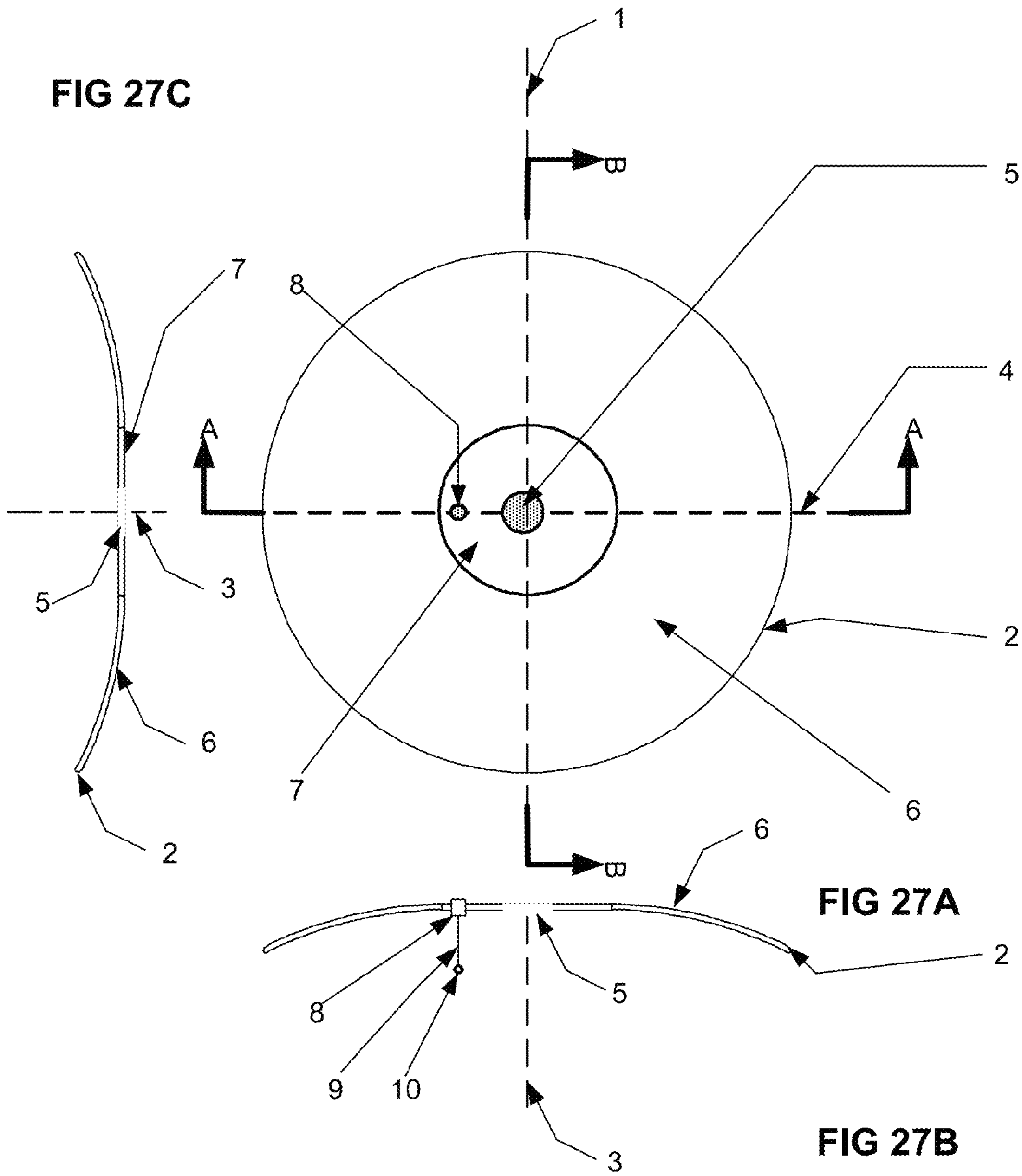
FIG. 27A is the top view of an upper protective cover plate with one window.
FIG. 27B is the front view of an upper protective cover plate with one window.
FIG. 27C is the side view of an upper protective cover plate with one window.

FIG. 27A and FIG. 27B and FIG. 27C

The detailed physical elements shown in the upper protective cover plate drawings disclosed in FIG. 27A and FIG. 27B and FIG. 27C are identified as follows: 1 is the y-axis of the upper protective cover plate and the bored clearance hole 5. 2 is the rounded circular edge of the upper protective cover plate. 3 is the z-axis of the upper protective cover plate and the bored clearance hole 5. 4 is the x-axis of the upper protective cover plate and the bored clearance hole 5. 5 is the bored clearance hole. 6 is the top spherical surface region of the upper protective cover plate. 7 is the flattened surface region of the upper protective cover plate.

8 is a microphone and the mounting hole for the microphone. 9 is the microphone cable. 10 is a microphone connector.

FIG. 27A is the top view of an upper protective cover plate with one window.

FIG. 27B is the front view of an upper protective cover plate with one window.

FIG. 27C is the side view of an upper protective cover plate with one window.

Referring to drawings FIG. 27A and FIG. 27B and FIG. 27C, in a preferred embodiment, the upper protective cover plate of the instrumented baseball home plate, is disclosed. The upper protective cover plate is used as a vital part of the instrumented baseball home plates in order to protect their respective instrumentation package assembly assemblies, which are contained inside them, from damage during the baseball game.

Referring to the disclosed upper protective cover plate shown in FIG. 27A and FIG. 27B and FIG. 27C, the upper protective cover plate has a rounded circular edge 2 and a dome-like shaped spherical top 6. The diameter of the upper protective cover plate is made large enough to cover the tips of the radio antennas in the instrumented baseball home plates. The z-axis of symmetry of the upper protective cover plate is 3. The y-axis of symmetry is 1, and the x-axis of symmetry is 4. The top center of the upper protective cover plate is flattened in the neighborhood of the bored clearance hole 5. The upper protective cover plate becomes spherically curved downward in the region outside of this hole. The spherical top of the dome faces upward in the positive z-axis 3 direction. The upper protective cover plate is thin but rigid. The bored clearance hole 5 in the top of the upper protective cover plate is at its center. The z-axis of hole 5 is 3. The y-axis of hole 5 is 1.

The upper protective cover plate has three major purposes. The first purpose is to provide the clearance hole 5 made large enough through which the optical window on top of the instrumented baseball home plate may protrude, and surround the optical window on top of the instrumented baseball home plate with its walls so as to protect it from damage during the game. The second purpose is to protect the instrumentation package assembly which is located below the upper protective cover plate inside of the instrumented baseball home plate. The third purpose of the upper protective cover plate is to mount and support the microphone 8 which protrudes above the upper surface of the upper protective cover plate.

With regard to its first purpose, the upper protective cover plate surrounds the optical window on the top of the instrumented baseball home plate and shelters it from hits to the instrumented baseball home plate during the game. The top surface of the upper protective cover plate is stationed just below and in close proximity to the top of the instrumented baseball home plate. Refer to drawings FIG. 25A and FIG. 25B and FIG. 25C and FIG. 25D for examples of single camera instrumented baseball home plate preferred embodiments that use this upper protective cover plate. The clearance hole 5 bored in the top of the upper protective cover plate provides an aperture through which the optical window in the referenced instrumented baseball home plates may protrude; and therefore the optical window is protected from damage during the game by the shielding of the wall of the hole. In order to shelter the optical window from damage, the protective cover plate must be made of a stiff resilient material with little give.

With regard to its second purpose, the upper protective cover plate protects the instrumentation package assembly from being crushed and damaged by the players during the game. Refer to drawings FIG. 19A and FIG. 19B and FIG. 19C for examples of the instrumentation package assembly. The instrumentation package assembly is located below the upper protective cover plate inside of the instrumented baseball home plate. In order to achieve its purpose, the upper protective cover plate must be stiff.

With regard to its third purpose, the upper protective cover plate is used to mount and support the microphone 8 which protrudes above the upper surface of the upper protective cover plate and into a hole in the top of the instrumented baseball home plate. Microphone 8 listens for sounds of the game that occur on the baseball playing field above the top of the instrumented baseball home plate and above the ground. Microphone cable 9 carries electrical sound signals from microphone 8 to the microphone electrical connector 10. 10 is plugged into its mating electrical connector on the instrumentation package assembly shown in the referenced drawings.

The top protective cover plate is made dome shaped so the walls of its bore can mechanically surround the optical window near the very top of the instrumented baseball home plate and shelter it from hits, while still keeping the edge of the protective cover plate far down below the top of the instrumented baseball home plate and well below the surface of the playing field in the ground, so the edge can not be felt by the players if the players impact the top surface of the instrumented baseball home plate.

The thickness range of the upper protective cover plate is approximately 1/16 to 3/16 inches. It is made thin in order to make it fit between the top surface of the molded instrumented baseball home plate and the top surface of the buffer plate which is just beneath it. The upper protective cover plate is given a spherical dome shape in order to increase its stiffness. In addition, the upper protective cover plate is made spherically dome shaped in order to keep its edge buried inside the molded instrumented baseball home plate, and curved down and away from the top surface of the instrumented baseball home plate where it could otherwise be collided with by the players. Even though the circular edge 2 of the upper protective cover plate is buried deep into the molded instrumented baseball home plate, it is nevertheless rounded off so it can cause no injury to the players.

The materials chosen for the protective cover plates in the present preferred embodiment are polycarbonates, ABS or fiber reinforced plastics. Although a variety of other materials would function almost equally as well, polycarbonates, ABS and fiber reinforced plastics have an advantage in that they are lightweight and stiff enabling the thickness of the protective cover plates to remain thin while still delivering the significant stiffness needed to perform their shielding function in the limited space they can occupy within the instrumented baseball home plate. They have an additional advantage in that they are transparent to the transmitted and received radio waves which need to move to and from the antennas inside the instrumented baseball home plate without absorption or reflection.

FIG. 28A and FIG. 28B and FIG. 28C

The detailed physical elements shown in the upper protective cover plate drawings disclosed in FIG. 28A and FIG. 28B and FIG. 28C are identified as follows: 1 is the y-axis of the upper protective cover plate. 2 is the y-axis of the bored clearance hole 9. 3 is the y-axis of the bored clearance hole 8. 4 is the x-axis of clearance holes 8 and 9 and of the upper protective cover plate. 5 is the z-axis of clearance hole 8. 6 is the z-axis of the upper protective cover plate. 7 is the z-axis of clearance hole 9. 8 is a bored clearance hole in the upper protective cover plate. 9 is a bored clearance hole in the upper protective cover plate. 10 is the rounded circular edge of the upper protective cover plate. 11 is the top spherical surface region of the upper protective cover plate. 12 is the flattened surface region of the upper protective cover plate. 13 is a microphone and the mounting hole for the microphone. 14 is the microphone cable. 15 is the microphone connector.

FIG. 28A is the top view of an upper protective cover plate with two windows.

FIG. 28B is the front view of an upper protective cover plate with two windows.

FIG. 28C is the side view of an upper protective cover plate with two windows.

Referring to drawings FIG. 28A and FIG. 28B and FIG. 28C, in a preferred embodiment, the upper protective cover plate of the instrumented baseball home plate, is disclosed. The upper protective cover plate is used as a vital part of the instrumented baseball home plates shown in order to protect its instrumentation package assembly assemblies which is contained inside it, from damage during the baseball game.

Referring to the disclosed upper protective cover plate shown in FIG. 28A and FIG. 28B and FIG. 28C, the upper protective cover plate has a rounded circular edge 10 and a dome-like shaped spherical top in its outer region 11. The diameter of the upper protective cover plate is made large enough to cover the tips of the radio antennas in the instrumented baseball home plates shown in preferred embodiments FIG. 25. The z-axis of symmetry of the upper protective cover plate is 6. The y-axis of symmetry is 1, and the x-axis of symmetry is 4. The top center region 12 of the upper protective cover plate is flattened in the neighborhood of the clearance holes 8 and 9. The upper protective cover plate then becomes spherically curved downward in the region 11 outside of these holes. The spherical top of the dome faces upward in the positive z-axis 6 direction. The upper protective cover plate is thin but rigid. There are two bored holes 8 and 9 in the top of the upper protective cover plate equidistant around its center. The z-axis of hole 8 is 5, and the z-axis of hole 9 is 7. The y-axis of hole 8 is 3, and the y-axis of hole 9 is 2. The distance between centers of holes 8 and 9 is made equal to the interpupillary distance for the referenced instrumented baseball home plates. In the present embodiment this distance is set to between 44 and 150 millimeters, although it can be set to any other interpupillary distance we choose to get different 3-D stereo effects.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

The upper protective cover plate has three major purposes. The first purpose is to provide the two clearance holes 8 and 9 made large enough through which the optical windows on top of the instrumented baseball home plate (shown in reference FIG. 25) may protrude, and thereby mechanically surround the optical windows on top of the instrumented baseball home plate so as to protect them from damage during the game. The second purpose is to protect the instrumentation package assembly which is located below the upper protective cover plate inside of the instrumented baseball home plate. The third purpose of the upper protective cover plate is to mount and support the microphone 13 which protrudes above the upper surface of the upper protective cover plate 11.

With regard to its first purpose, the upper protective cover plate surrounds the optical windows on the top of the instrumented baseball home plate and shelters them from hits to the instrumented baseball home plate during the game. The top surface of the upper protective cover plate 11 is stationed just below and in close proximity to the top of the instrumented baseball home plate. Refer to drawings FIG. 25A and FIG. 25B and FIG. 25C and FIG. 25D for examples of two camera instrumented baseball home plate preferred embodiments that use this embodiment of the upper protective cover plate. The two clearance holes 8 and 9 bored in the top of the upper protective cover plate provide apertures through which the two optical windows in the referenced instrumented baseball home plates may protrude, therefore protecting the optical windows from damage during the game by shielding them within the walls of these holes. In order to shelter the optical windows from damage, the protective cover plate must be made of a stiff resilient material with little give.

With regard to its second purpose, the upper protective cover plate protects the instrumentation package assembly from being crushed and damaged by the players during the game. Refer to drawings FIG. 20A and FIG. 20B and FIG. 20C for examples of the two camera instrumentation package assembly. The instrumentation package assembly is located below the upper protective cover plate inside of the instrumented baseball home plate. In order to achieve its purpose, the upper protective cover plate must be stiff.

With regard to its third purpose, the upper protective cover plate is used to mount and support the microphone 13 which protrudes above the upper surface of the upper protective cover plate 11 and into a hole in the top of the instrumented baseball home plate. Microphone 13 listens for sounds of the game that occur on the baseball playing field above the top of the instrumented baseball home plate and above the ground. Microphone cable 14 carries electrical sound signals from microphone 13 to the microphone electrical connector 15. 15 is plugged into its mating electrical connector on the instrumentation package assembly shown in the referenced drawings.

The materials chosen for the protective cover plates in the present preferred embodiment are polycarbonates, ABS and fiber reinforced plastic. Although a variety of other materials would function almost equally as well, these have an advantage in that they are lightweight and stiff enabling their thickness to remain thin while still delivering the significant stiffness needed to perform their shielding function in the limited space they can occupy within the instrumented baseball home plate. They have an additional advantage in that they are transparent to the transmitted and received radio waves which need to move to and from the antennas inside the instrumented baseball home plate without absorption or reflection.

The top protective cover plate is made dome shaped so the walls of its bores can surround the optical window near the very top of the instrumented baseball home plate and shelter it from hits, while still keeping its the edge far down below the top of the instrumented baseball home plate and well below the surface of the playing field in the ground, so the edges can not be felt by the players if the players impact the top surface of the instrumented baseball home plate.

The thickness range of the upper protective cover plate is approximately 1/16 to 3/16 inches. It is made thin in order to make it fit between the top surface of the molded instrumented baseball home plate and the top surface of the buffer plate which is just beneath it. The upper protective cover plate is given a spherical dome shape in order to increase its stiffness. In addition, the upper protective cover plate is made spherically dome shaped in order to keep its edge buried inside the molded instrumented baseball home plate, and curved down and away from the top surface of the instrumented baseball home plate where it could otherwise be collided with by the players. Even though the circular edge 10 of the upper protective cover plate is buried deep into the molded instrumented baseball home plate, it is nevertheless rounded off so it can cause no injury to the players.

FIG. 29

Figure 29:
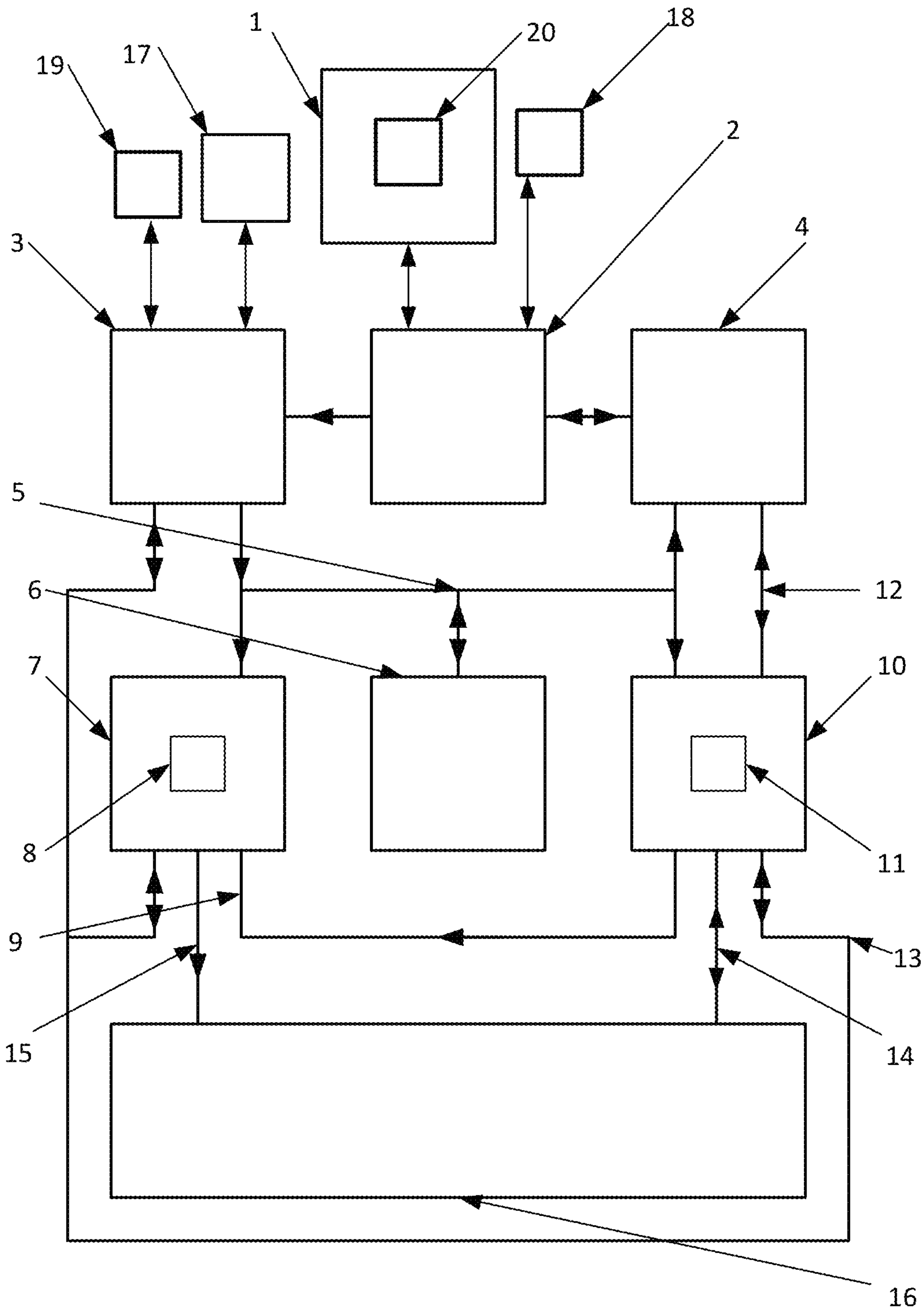
FIG. 29 is the block diagram of the power supply and battery charging circuits inside all the instrumented sports paraphernalia such as the instrumented soccer goals, instrumented ice hockey goals, instrumented baseball bases, instrumented baseball home plates, instrumented pitcher's rubbers, instrumented ice hockey pucks, and instrumented footballs.

The detailed physical elements disclosed in the instrumentation package assembly element power supply and battery charging circuits drawing shown in FIG. 29 are identified as follows: 1 is the induction coil interface. 2 is the impedance matching data and power isolation network. 3 is the battery charging circuit. 4 is the 250 kHz data modem. 5 is the dc power bus. 6 is the rechargeable lithium ion battery pack for example. 7 is the power supply regulator circuit. 8 is the power control switch. 9 is the power control data bus. 10 is the microprocessor. 11 is the read only memory. 12 is the communications data bus. 13 is the status information data bus. 14 is the system control data bus. 15 is the switched dc power bus. 16 is the switched components block. 17 fiber optics/copper communications cable and dc power connector. 18 is the electronic package unit interface. 19 is the wireless communications connector. 20 is the 250 kHz induction coil(s).

FIG. 29 is the block diagram of the power supply and battery charging circuits inside all the instrumented sports paraphernalia such as instrumented soccer goals, instrumented ice hockey goals, instrumented baseball bases, instrumented baseball home plates, instrumented pitcher's rubbers, instrumented ice hockey pucks, and instrumented footballs that are disclosed in FIG. 1A, FIG. 1B, FIG. 1C, FIG. 3, FIG. 4, FIG. 5, FIG. 6, FIG. 9A, FIG. 9B, FIG. 24A, FIG. 24B, FIG. 25A, FIG. 25B, FIG. 25C, FIG. 25D, FIG. 26A, FIG. 26B, FIG. 26C, FIG. 36A, FIG. 36B, FIG. 36C, FIG. 37A FIG. 37B, FIG. 37C, FIG. 39A, FIG. 39B, FIG. 41A and FIG. 41B.

The signals and data flows to and from the power supply and battery charging electronic circuits are specified in FIG. 29. Power to the electronics may be turned on or off inside the instrumented sports paraphernalia by any of the following methods. Firstly, power may be turned on of off by sending a wireless RF control signal over the internet to the instrumented sports paraphernalia via an RF tower. Secondly, power may be turned on of off by sending a wireless RF control signal from the remote base station to the instrumented sports paraphernalia via the antenna relay junction assembly. Thirdly, power may be turned on of off by sending a signal by magnetic induction from the hand held remote to the instrumented sports paraphernalia. Fourthly, power may be turned on of off by sending a control signal by magnetic induction from the battery charging station to the instrumented sports paraphernalia. In cases where the instrumented sports paraphernalia have fiber optic/copper cable communication link connections, power may be turned on of off by sending a control signal over the cable to the instrumented sports paraphernalia from the remote base station or from the internet.

FIG. 29 shows an induction coil interface 1 whose purpose is to convey electrical energy from a light-weight air core induction coil(s) 20 located onboard the instrumented sports paraphernalia. The coil(s) 20 is wound of only a few turns of a relatively small gauge magnet wire with sufficient capacity to handle the required current to recharge the batteries also onboard the instrumentation package assembly with minimal temperature rise.

Impedance matching diverter 2 is connected to 1 forming a parallel resonant tank circuit with the aforementioned induction coil 20 tuned to approximately 250 kHz. When any of the instrumented sports paraphernalia containing the instrumentation package assembly is properly placed on or in proximity to the recharging station such that its induction coil 20 is subject to the intense magnetic flux created by the coil within the recharging station, 20 will supply magnetically coupled electrical power from the recharging station via 1 and 2 to battery charging circuit 3. In addition, 1 and 2 also convey a packet of administrative and control data signals between the recharging station and Data transceiver 4. Furthermore, 2 includes a high-stability fail-safe protection circuit which prevents 4 from being catastrophically destroyed by the high voltage present across 1 that is necessary during a typical recharging cycle. Circuits 1, 2 and 3 are so arranged that whenever the instrumented sports paraphernalia containing the instrumentation package assembly is not placed or is improperly placed on the recharging station or is being used in a game, the circuits comprised of 1, 2 and 3 do not present an electrical load on 7. This feature set also ensures the longest possible life of the battery during idle periods of no-use by not permitting unnecessary loading of 7 by 1, 2 and 3

In the event that the voltage level appearing at battery bus line 5 has fallen below the charging set-point threshold of 3, charging of rechargeable battery 6 will begin to commence automatically as charging current is applied to 6 via 3 and 5 whilst the base or plate containing the instrumentation package is properly placed on an active recharging station.

As the back voltage detected by 3 appearing at 6 rises abruptly above a set-point threshold of 3, charging current is automatically reduced to prevent over-charging of the batteries, this also protects the remainder of the instrumented sports paraphernalia's camera system 16 from damage due to over heating while its batteries are in the charging station.

Throughout a recharging cycle, main power supply 7, microprocessor 10 and 4 also receive dc power from 3 via 5 so as to avoid any unnecessary battery consumption until charging is complete.

Whenever dc power is supplied to 7 via 5, power to the remaining hardware 16 will remain in an off-state until a turn-on command is received by main power supply switch 8 from 10 via main power control data bus line 9. This will in turn cause 8 to energize Switched Power Bus 14 and begin supplying regulated D/C power to the rest of the instrumentation package 16. 8 will continue to supply such power until 8 receives a shutdown command from 10 via 9 or a failure of 6 occurs. As long as 8 is keeping 14 active 10 may issue commands to 16 via Bi-directional Instrumentation Package Control Data Bus Line 15. 15 is also used to collect status information about 16 including modes of failures which may occur throughout the use of the instrumentation package. These failures in turn cause software parameters of 10 stored within 11 to be executed by 10 and communicate these fault indications back to the base station. Such indications are intended to alert personnel of the fault condition which might otherwise result in an embarrassment to personnel i.e.: an aging battery in need of recharging or a damaged camera.

Each instrumented sports paraphernalia instrumentation package assembly is equipped with a unique identification code and operating firmware embedded in the read only memory 11 areas of 10. As soon as power to 10 via 5 becomes available, initialization of 10 is commenced loading this id code and operating firmware into 10 via 11. Once this initialization of 10 is complete, synchronization of 4 with the recharging station's onboard data transceiver begins, via data transceiver bus line 12, thereby establishing an administrative and control data link between 10 and the recharging station's human interface panel via 1, 2, 3, 4 and 12 respectively.

The overall rate and length of time at which 3 will continue to supply charging current and hence recharge the batteries within the base instrumentation package is dependent on the specific rating and initial condition of the battery, and the entries made in the user adjustable settings menu of the recharging station's human interface panel based on the operating parameters contained in 11 transferred to the microprocessor onboard the recharging station during synchronization of 4 as previously described.

As soon as a typical charging cycle is commenced, continuous fail-safe monitoring data of the charging current and voltage supplied by 3 is sent to 10 via Power control data bus line 13. If at any time a problem develops during a charging cycle that could result in catastrophic destruction of the instrumented sports paraphernalia's instrumentation package assembly, batteries and/or the recharging station, a total system shutdown sequence is initiated and personnel advisory warning displayed on the recharging station's human interface panel, thereby removing power and safeguarding the hardware as described.

While instrumented sports paraphernalia that is equipped with the instrumentation package assembly is properly placed in the recharging station a series of self diagnostic and power consumption tests may be performed on 16. The results of which are forwarded to the human interface panel of the recharging station via 1, 2, 4, 10 and 11 respectively and are useful to personnel in evaluating the base or plate camera instrumentation packages overall condition prior to its use in a game.

Since a typical team may wish to use a finite number of n instrumented sports paraphernalia equipped with the instrumentation package assembly, a means of cataloging and archiving the charge, recharge, usage, power consumption and diagnostic testing cycles associated with each is provided by 10 via 11. This information is available to personnel via the human interface panel on the recharging station upon command from personnel and furthermore may be stored by a Personal Computer connected to the data logging port of the recharging station charging the base(s) concerned. As previously described, each base instrumentation package assembly contains a unique identification number; therefore the book-keeping for each instrumented sports paraphernalia involved is independent respectively.

After 6 has assumed a full and complete charge, the instrumented sports paraphernalia instrumentation package assembly is placed into a powered-off state and except for a very small stand-by current through 4 and 10, battery consumption is minimized until future use is desired.

Prior to using the instrumented sports paraphernalia in a game, 8 must be activated in order to supply dc power to 16. Upon receiving a power-on command from 10 via 9 and 10 will take 8 out of the power-off state thus allowing 7 to supply dc power to 16.

Invocation of the power-on command by 10 may be accomplished by any of several methods: Firstly, if the instrumented sports paraphernalia concerned is properly placed on or near a recharging station. Its human interface panel (if so equipped) may be used to invoke a power-on command sequence to 10 via 1, 2, 4 and 12 respectively. Secondly, the hand-held remote control device may be placed near either end of the instrumented sports paraphernalia concerned to invoke this command to 10 via 1, 2, 4 and 12 if desired. Thirdly, on/off control signal commands received by the electronics package units (see FIG. 11A) from the internet tower (see FIG. 11B) by the instrumented sports paraphernalia, are conveyed to the electronic package interface 18 to invoke a power-on command sequence to 10 via 1, 2, 4 and 12 respectively. Fourthly, on/off control signal commands received at the fiber optics/copper communications cable and dc power connector 17 from the remote base station, invoke a power-on command sequence to 10 via 3, and 13 respectively. Fifthly, on/off control signal commands sent wirelessly from the remote base station to the wireless communications connector 19, invoke a power-on command sequence to 10 via 3, and 13 respectively.

Activation of 8 by either method places the instrumented sports paraphernalia's instrumentation package assembly into a fully powered-on state and may then be synchronized with the base station hardware, tested and subsequently utilized in a game.

While the instrumentation package assembly is in a fully powered on state and not placed in the recharging station i.e. it is being used in a real baseball game, administrative data, Identification code and control signals along with photographic image and sound accompaniment will be transmitted and available to the remote base station hardware.

If throughout a game, a low battery condition, power supply or any other technical fault develops, 7 via 13 will cause 10 to transmit an appropriate warning message to the remote base station's human interface display via the 802.11(x) transceiver in 16.

False signaling and invocation of the instrumentation package assembly by other nearby potential sources of interference is avoided by the decoding algorithm stored in 11 and used by 10 when communicating critical information over either of the two distinct administrative and control data link techniques utilized by the instrumented sports paraphernalia's instrumentation package assembly.

Until 6 falls to a low level set-point threshold within 7, The instrumented sports paraphernalia's instrumentation package assembly will remain in a fully powered-on state unless 7 is de-activated via 8 after a shutdown sequence is issued by a power-off command from 10.

To preserve the life of 6, upon completion of its use, i.e. at the end of a game, the instrumented sports paraphernalia's instrumentation package assembly should be placed into a powered-off state by causing 10 to issue a power-off signal to 7 via 8 and 9.

This may be accomplished in one of several methods: Firstly using the human interface hardware, display and software at the remote base station, personnel may transmit and invoke a power-off command to 10 via the 802.11(x) administrative and control data link of 16 via 13. Secondly, the personnel at the side lines of a typical game may wish to conclude its operation by conveniently placing the handheld remote control near the instrumented sports paraphernalia and depressing the power-off key on the human interface panel of said remote control invoking a power-off command to 10 via 1, 2, 3, 4 and 12 respectively.

Finally, personnel may position the instrumented sports paraphernalia beneath or close to the recharging station. For example, whenever an instrumented baseball base is properly placed beneath or on to an active recharging station the instrumented baseball base instrumentation package assembly is automatically put into a powered-off state unless otherwise instructed by personnel using the human interface panel of the recharging station concerned whenever 4 is synchronized with the recharging station via 1, 2 and 3.

Confirmation in any of the methods just described that the instrumented sports paraphernalia's instrumentation package assembly has indeed been placed into a powered-off state is assured to personnel by both visual and audible indication from the human interface concerned when 10 via 1, 2, 3, 4 and 12 acknowledges receipt and execution of the power-off invocation.

The administrative data link is referred to in several places in the specification of the current invention. For purposes of elucidation, a description of the administrative data link is given as follows. The administrative data link is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall. This communications transport mechanism is formed whenever the microprocessor within the instrumented sports paraphernalia communicates with the remote base station over the particular mode of communications connectivity that the stadium has been equipped for i.e. fiber optics, copper cable or wireless radio. This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

Referring to the Preferred Embodiments Specified in FIG. 22E, the instrumentation package assembly element power supply and battery charging circuits satisfy all of the following objectives:

It is an objective of the present invention that the instrumentation package assembly power supply and battery charging circuits be composed of an induction coil interface, impedance matching data and power isolation network, battery charging circuit, 250 kHz data modem, dc power bus, rechargeable battery pack, power supply regulator circuit, power control switch, power control data bus, microprocessor, read only memory, communications data bus, status information data bus, system control data bus, switched dc power bus, switched components block, fiber optics/copper communications cable and dc power connector.

FIG. 30A and FIG. 30B

The detailed physical elements disclosed in the typical instrumented baseball stadium drawings shown in FIG. 30A and FIG. 30B are identified as follows: 1 is the baseball playing field ground. 2 is the standard baseball diamond. The distance between the instrumented baseball home plate 3 and the instrumented baseball first base 5 is 90 feet. The distance between the instrumented baseball first base 5 and the instrumented baseball second base 7 is 90 feet. The distance between the instrumented baseball second base 7 and the instrumented baseball third base 9 is 90 feet. The distance between the instrumented baseball third base 9 and the instrumented baseball home plate 3 is 90 feet. 3 is the instrumented baseball home plate equipped with an instrumentation package assembly 4. 4 is the instrumentation package assembly of home plate. 5 is the instrumented first base equipped with an instrumentation package assembly 6. 6 is the instrumentation package assembly of first base. 7 is the instrumented second base equipped with an instrumentation package assembly. 8 is the instrumentation package assembly of second base. 9 is the instrumented third base equipped with an instrumentation package assembly. 10 is the instrumentation package assembly of third base. 11 is the ground level beneath the antenna array relay junction. 12 is the height level of antenna array relay junction above ground. 13 is the antenna array relay junction located within the stadium but outside the limits of the baseball playing field. 14 is the bi-directional fiber optic/copper communications cable between the remote base station and the antenna array relay junction. 15 is the remote base station. 16 is an instrumentation package assembly of the pitcher's rubber. 17 is the pitcher's rubber. 18 is an instrumentation package assembly of the pitcher's rubber.

FIG. 30A is a diagram of the top view of a typical instrumented baseball stadium equipped to wirelessly televise baseball games from instrumented sports paraphernalia on the baseball playing field.

FIG. 30B is a diagram of the side view of a typical instrumented baseball stadium equipped to wirelessly televise baseball games from instrumented sports paraphernalia on the baseball playing field.

Referring to drawings FIG. 30A and FIG. 30B, in a preferred embodiment, a typical instrumented baseball stadium equipped to wirelessly televise baseball games from instrumented sports paraphernalia located on the baseball playing field, employing single point non-diversity reception techniques, is disclosed.

FIG. 30A and FIG. 30B illustrate a typical instrumented baseball stadium playing field 1 whose instrumented home plate, instrumented bases, and instrumented pitcher's rubber 3, 5, 7, 9 and 17 located about the baseball diamond 2 are each equipped with instrumentation package assemblies 4, 6, 8, 10, 16 and 18 respectively.

Typical instrumented baseball bases are disclosed in FIG. 24A and FIG. 24B.

Typical instrumented baseball plates are disclosed in FIG. 25A and FIG. 25B and FIG. 25C and FIG. 25D, FIG. 26A and FIG. 26B and FIG. 26C.

A typical baseball pitcher's rubber is disclosed in FIG. 36A and FIG. 36B and FIG. 36C.

In this embodiment 4, 6, 8, 10, 16 and 18 are configured to operate and communicate wirelessly with the remote base station 15 employing single point non-diversity reception techniques via a fixed point multi-directional RF antenna array relay junction 13 and bi-directional cable communications cable 14. Because of its simplicity, this feature set enables the complete system to be used in virtually any baseball stadium or training field environment unobtrusively i.e. no underground cabling or trenching of the field and with only a minimal amount of set-up time required prior to use.

At the time the complete system consisting of 3 thru 10, 16, 17, 18, and 13 thru 15 is initially placed into operation at a given stadium or training ball field testing to determine the very best received signal strength, location and optimal placement of 13 relative to 3 thru 10 should be performed by field-side personnel familiar with the system.

FIG. 59B further depicts the aerial position of 13 mounted above 12 the ground level 11 beneath. This step is important to ensure that during a typical baseball game or training session personnel situated at 15 may operate and receive the high quality photographic images made in real-time from 4, 6, 8, 10, 16 and 18 individually or in multiple simultaneously.

The antenna array relay junction 13 simultaneously receives the televised RF signals transmitted by each and all of the static instrumented sports paraphernalia on the ground i.e. 3, 5, 7, 9 and 17. The televised RF signals from each of the instrumented sports paraphernalia have different carrier frequencies to differentiate them from one another and improve the S/N ratio. The antenna array relay junction 13 simultaneously relays these televised signals to the remote base station 15 over the bi-directional communications link 14. Depending on the total number of HD TV cameras contained in the instrumented sports paraphernalia 3, 5, 7, 9 and 17 that are simultaneously on the playing field, and the noise levels in the air ways in the stadium, the cameraman in the remote base station 15 can conserve bandwidth to insure the quality of the HD that is broadcast to the TV viewing audience by the remote base station 15. The cameraman can conserve bandwidth by transmitting a control signal to each of the instrumented sports paraphernalia 3, 5, 7, 9 and 17 instructing them to operate all their cameras in a low resolution mode. The cameraman then selects which of the instrumented sports paraphernalia's camera's video is going to be broadcast to the TV viewing audience, and sends a control signal to those instrumented sports paraphernalia cameras to televise their signals in the HD resolution mode. The instrumented sports paraphernalia then transmits its camera's HD video televised signal to the remote base station 15 via the antenna array relay junction 13. As an example, the low resolution mode can be realized using TDM (time division multiplexing) or FDM (frequency division multiplexing) or HDT (high definition thumbnails).

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Referring to the Preferred Embodiments Specified in FIG. 30A and FIG. 30B, the wireless baseball stadium satisfies all of the following further objectives:

It is an objective of the present invention to replace existing prior art non-instrumented sports paraphernalia like baseball bases, baseball home plates, and pitcher's rubbers that are currently on existing playing fields with substitute instrumented sports paraphernalia like instrumented baseball bases, instrumented baseball home plates and instrumented baseball pitcher's rubbers. It is an objective of the present invention to equip existing prior art sports stadiums with instrumented sports paraphernalia systems comprised of instrumented sports paraphernalia (like instrumented sports paraphernalia like instrumented baseball bases, instrumented baseball home plates and instrumented baseball pitcher's rubbers), an antenna array relay junction, bi-directional communication links, and a remote base station, to improve the quality of the stadium's sports TV broadcasts. It is an objective of the present invention that a baseball stadium used to wirelessly televise baseball games from baseball sports paraphernalia be instrumented with an instrumented baseball first base, an instrumented baseball second base, an instrumented baseball third base, an instrumented baseball home plate, and an instrumented pitcher's rubber, an antenna array relay junction located within the stadium but outside the limits of the baseball playing field, a bi-directional communications cable between the remote base station and the antenna array relay junction, and a remote base station. It is an objective of the present invention to equip a baseball stadium to wirelessly televise baseball games from sports paraphernalia i.e. $1^{st}$, $2^{nd}$, $3^{rd}$ bases, pitcher's rubber, and home plate located on the baseball playing field to a remote base station via an antenna array relay junction, and then to the TV viewing audience. It is an objective of the present invention to use this system in virtually any baseball stadium or training field environment unobtrusively with only a minimal amount of set-up time required prior to use. It is an objective of the present invention to locate and optimally place the antenna array relay junction to achieve the very best received signal strength. It is an objective of the present invention to operate and receive high quality photographic images made in real-time from all of the instrumented sports paraphernalia in multiple simultaneously.

It is an objective of the present invention that the antenna array relay junction receive televised signals simultaneously from a multiplicity of static instrumented sports paraphernalia (like for example instrumented baseball bases, instrumented baseball home plates and instrumented baseball pitcher's rubbers) that are on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

It is an objective of the present invention to equip any sports stadium with a fiber optics/copper cable bidirectional communication link between the antenna array relay junction and the remote base station, an antenna array relay junction, a bidirectional wireless radio wave communication link between the instrumented sports paraphernalia (like instrumented baseball bases, instrumented baseball home plates, and baseball pitcher's rubber) and the antenna array relay junction, a remote base station, and an antenna array relay junction. It is an objective of the present invention to equip any sport stadium/arena with instrumented sports paraphernalia, an antenna array relay junction, wireless and/or fiber optics/copper cable communication links, and a remote base station. It is an objective of the present invention to equip any sport stadium to simultaneously wirelessly televise sports games from a multiplicity of both dynamic and static sports paraphernalia i.e. $1^{st}$, $2^{nd}$, $3^{rd}$ baseball bases, pitcher's rubbers, and baseball home plates located on the playing field to a remote base station. It is an objective of the present invention to equip any sport stadium to simultaneously wirelessly televise sports activity from a multiplicity of static sports paraphernalia i.e. pitcher's rubbers and baseball home plates located off the playing field in a bullpen to a remote base station. It is an objective of the present invention to configure and equip any sports training field to both wirelessly/and by use of fiber optics cable/copper cable, simultaneously televise sports games from a multiplicity of static sports paraphernalia i.e. $1^{st}$, $2^{nd}$, $3^{rd}$ baseball bases and baseball home plates located on the playing field, to a remote base station. It is an objective of the present invention to configure and equip any sport stadium to simultaneously televise sports games using both wireless and bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 31A and FIG. 31B

The detailed physical elements disclosed in the typical instrumented baseball stadium drawings shown in FIG. 31A and FIG. 31B are identified as follows: 1 is the baseball playing field ground. 2 is the baseball diamond. The distance between the instrumented baseball home plate 3 and the instrumented baseball first base 5 is 90 feet. The distance between the instrumented baseball first base 5 and the instrumented baseball second base 7 is 90 feet. The distance between the instrumented baseball second base 7 and the instrumented baseball third base 9 is 90 feet. The distance between the instrumented baseball third base 9 and the instrumented baseball home plate 3 is 90 feet. 4 is the instrumentation package assembly of the instrumented baseball home plate. 4 is equipped for fiber optic/copper connection with a fiber optics cable/copper cable connector. 5 is the instrumentation package assembly of the first instrumented baseball base. 6 is the instrumentation package assembly equipped for fiber optic connection with a fiber optics cable/copper cable connector. 7 is the instrumentation package assembly of the second instrumented baseball base. 8 is the instrumentation package assembly equipped for fiber optic connection with a fiber optics cable/copper cable connector. 9 is the instrumentation package assembly of the third instrumented baseball base. 10 is the instrumentation package assembly equipped for fiber optic connection with a fiber optics cable/copper cable connector. 11 is the bi-directional multi-function fiber optic communication cable to home plate and second base IPA. 12 is the bi-directional multi-function fiber optic communication cable to first base IPA. 13 is the bi-directional multi-function fiber optic communication cable to the pitcher's rubber and second base IPA. 14 is the bi-directional multi-function fiber optic communication cable to third base instrumentation package assembly. 15 is the field-side fiber optic/copper multi-function junction box termination point for all instrumentation package assemblies (also known as the antenna array relay junction). It is located within the stadium but outside the limits of the baseball playing field. 16 is the bi-directional multi-function fiber optic/copper cables between 15 and the remote base station. 17 is the remote base station employing bi-directional fiber optic/copper connectivity. 18 is the instrumentation package assembly in the pitcher's rubber. 19 is the pitcher's rubber. 20 is the instrumentation package assembly in the pitcher's rubber.

FIG. 31A is a diagram of the top view of a typical instrumented baseball stadium equipped to televise baseball games via fiber optics cable/copper cable from instrumented sports paraphernalia on the baseball playing field.

FIG. 31B is a diagram of the side view of a typical instrumented baseball stadium equipped to televise baseball games via fiber optics cable from instrumented sports paraphernalia on the baseball playing field.

Referring to drawings FIG. 31A and FIG. 31B, in a preferred embodiment, a typical instrumented baseball stadium equipped to televise baseball games via fiber optics cable/copper cable from instrumented sports paraphernalia located on the baseball playing field, to a remote base station, is disclosed.

FIG. 31A and FIG. 31B shows a typical instrumented baseball stadium equipped with a fiber optics cable/copper cable communications link used to televise baseball games from sports paraphernalia i.e. $1^{st}$, $2^{nd}$, $3^{rd}$ bases, pitcher's rubber and home plate located on the baseball playing field, to a remote base station.

Typical instrumented baseball bases are disclosed in FIG. 24A and FIG. 24B.

Typical instrumented baseball plates are disclosed in FIG. 25A and FIG. 25B and FIG. 25C and FIG. 25D, FIG. 26A and FIG. 26B and FIG. 26C.

A typical baseball pitcher's rubber is disclosed in FIG. 36A and FIG. 36B and FIG. 36C.

Referring to the preferred embodiments disclosed in FIG. 31A and FIG. 31B a typical instrumented baseball stadium equipped for baseball camera system operation employing bi-directional multi-function fiber optic cable connectivity is specified.

Referring to the preferred embodiment disclosed in FIG. 31A and FIG. 31B the typical instrumented baseball stadium is equipped with bi-directional multi-function fiber optic cable communication links to televise baseball games from sports paraphernalia i.e. $1^{st}$, $2^{nd}$, $3^{rd}$ bases and home plate located on the baseball playing field, to a remote base station. The instrumentation package assembly has bi-directional multi-function fiber optic cable connectivity with the remote base station via these cables. The fiber optics cable/copper cable from beneath the ground of the baseball stadium playing field, enters the bottom of the instrumented baseball home plate/instrumented baseball base through its access opening. The fiber optics cable/copper cable connector is connected to its mating instrumentation package assembly connector in the bottom of the instrumented baseball home plate/instrumented baseball bases. The instrumentation package assembly connector is wired to the instrumentation package assembly electronics. The baseball stadium fiber optic cable/copper cable run includes copper cabling which furnishes an alternate source of low voltage dc power to the instrumented baseball home plate/instrumented baseball base.

FIG. 31A illustrates a baseball stadium using bases 5, 7 and 9 and a home plate 3 each equipped with instrumentation package assemblies 4, 6, 8 and 10 employing bi-directional multi-function fiber optic cable connectivity between all instrumentation package assemblies and the remote base station 17 employing bi-directional fiber optic connectivity.

Some baseball stadiums are located in geographical areas prone to radio frequency emissions that could be disruptive to a wireless camera instrumentation system. In such cases of extreme radio frequency interference an implementation of a hard-wired system is best to ensure that the high quality photographic images captured in real-time by 4, 6, 8 and 10 are conveyed to 17 without degradation and to reduce the time required by personnel during setup i.e. particularly in stadiums whereby frequent patterns of use would be anticipated. To do this, such a system requires an underground installation be made consisting of bi-directional multi-function fiber optic communication cables 11, 12, 13 and 14 between 4, 6, 8 and 10 and a field-side fiber optic multi-function junction box termination point 16 must be used.

FIG. 31A and FIG. 31B additionally show a preferred approach of how 11, 12, 13 and 14 could be positioned when it is desirable to use multiple under ground trenches beneath the outer perimeter of 2 at the time of installation. Since such a system is permanently installed within 1, personnel operating 17 need only connect bi-directional multi-function fiber optic cables 16 between 15 and 17 prior to a game or training session—making set-up simple and easy.

The underground fiber optics cable/copper cable is laid in three separate underground trenches. The first trench extends from the fiber optics junction box 15 to the instrumented baseball home plate 3 and continues on to the instrumented $2^{nd}$ base 7. The second trench extends from 15 to the instrumented $1^{st}$ base 5. The third trench extends from 15 to the instrumented 3rd base 9.

The instrumented baseball home plate 3, instrumented $1^{st}$ base 5, instrumented $2^{nd}$ base 7, and instrumented 3rd base 9 are each connected to the fiber optics cable/copper cable using their respective fiber optics/copper cable connectors. The fiber optics cables/copper cables 11, 12, 13 and 14 are connected to their respective instrumentation package assemblies 4, 6, 8 and 10 via the fiber optics/copper cable connectors.

The fiber optics cables/copper cables 11, 12, 13 and 14 are routed up from under the ground and up through the anchoring device of the instrumented baseball home plate and each $1^{st}$, $2^{nd}$ and 3rd instrumented baseball base respectively. The respective fiber optics cable/copper cable with its connector enters the bottom of the instrumented baseball home plate and each instrumented baseball base respectively through the access openings thereon. The fiber optics cables/copper cables 11, 12, 13 and 14 are each connected to their mating connectors of the instrumentation package assemblies 4, 6, 8, and 10 in the instrumented baseball home plate 3 and the three instrumented baseball bases 5, 7 and 9 respectively. Some modification of the existing prior art anchoring devices may be required in order to provide a clear path for the routing of the cable. In an alternative preferred embodiment the fiber optics cable/copper cable is routed around the outside of the anchoring device and connected to the fiber optics connector.

The value of this alternative preferred embodiment is that it doesn't require altering the existing prior art anchoring devices.

Stadiums employing the use of fiber optics cable/copper cable based system like that shown in FIG. 31A have some additional features otherwise unavailable in a completely wireless system. First these features include the ability to send dc power to 4, 6, 8 and 10 via 11, 12, 13 and 14 supplied by 17 via 15 and 16 respectively. Secondly, 3, 5, 8 and 10 may be upgraded or replaced to incorporate additional camera angles easily at the discretion of the system operator. Finally, but not limited to: the high quality photographic images in full hi-definition may be simultaneously received by 17 from any combination of 4, 6, 8 and 10 respectively without the need of high radio frequency bandwidth Referring to the Preferred Embodiments Specified in FIG. 31A and FIG. 31B, the baseball stadium satisfies all of the following further objectives:

It is an objective of the present invention to equip a baseball stadium to televise baseball games using a fiber optics communications link and/or a high speed copper cable communications link from sports paraphernalia i.e. $1^{st}$, $2^{nd}$, $3^{rd}$ bases, baseball pitcher's rubber and home plate located on the baseball playing field to a remote base station. It is an objective of the present invention to equip a baseball stadium to televise baseball games using a fiber optics communications link and/or a high speed copper cable communications link from each individual sports paraphernalia i.e. $1^{st}$, $2^{nd}$, $3^{rd}$ bases, baseball pitcher's rubber and home plate located on the baseball playing field, to an antenna array relay junction, which relays the televised signals to a remote base station using a fiber optics and/or a high speed copper cable communications link. It is an objective of the present invention to equip a baseball stadium to televise baseball games using bi-directional multi-function fiber optic cable communication links and/or bi-directional multi-function high speed copper cable communication links buried beneath the ground of the baseball stadium playing field, that enter the bottom of the instrumented baseball sports paraphernalia located at their traditional positions on the playing field, through an access opening. It is an objective of the present invention to equip a baseball stadium with fiber optics cable/copper cable connector that are connected to their mating instrumentation package assembly connectors in the bottom of the instrumented baseball sports paraphernalia on the playing field. It is an objective of the present invention to equip a baseball stadium with fiber optic cable/copper cable runs that includes copper cabling which furnishes an alternate source of low voltage dc power to the instrumented baseball sports paraphernalia located at their traditional positions on the playing field, that enters the bottom of the instrumented baseball sports paraphernalia through an access opening. It is an objective of the present invention to replace existing prior art non-instrumented sports paraphernalia like baseball bases, baseball home plates, and pitcher's rubbers that are currently on existing playing fields with substitute instrumented sports paraphernalia like instrumented baseball bases, instrumented baseball home plates and instrumented baseball pitcher's rubbers. It is an objective of the present invention to equip existing prior art sports stadiums with instrumented sports paraphernalia systems comprised of instrumented sports paraphernalia (like instrumented sports paraphernalia like instrumented baseball bases, instrumented baseball home plates and instrumented baseball pitcher's rubbers), an antenna array relay junction, bi-directional communication links, and a remote base station, to improve the quality of the stadium's sports TV broadcasts. It is an objective of the present invention that a baseball stadium used to televise baseball games using fiber optics cable/copper cable from baseball sports paraphernalia be instrumented with an instrumented baseball first base, an instrumented baseball second base, an instrumented baseball third base, an instrumented baseball home plate, and an instrumented pitcher's rubber, an antenna array relay junction located within the stadium but outside the limits of the baseball playing field, a bi-directional communications cable between the remote base station and the antenna array relay junction, and a remote base station. It is an objective of the present invention to equip a baseball stadium to televise baseball games from sports paraphernalia i.e. $1^{st}$, $2^{nd}$, $3^{rd}$ bases, pitcher's rubber, and home plate using fiber optics cable/copper cable to a remote base station via an antenna array relay junction. It is an objective of the present invention to use the instrumented sports paraphernalia system in virtually any baseball stadium or training field environment unobtrusively with only a minimal amount of set-up time required prior to use. It is an objective of the present invention to locate and optimally place the antenna array relay junction to achieve the shortest cable runs. It is an objective of the present invention to operate and receive high quality photographic images made in real-time from a multiplicity of instrumented sports paraphernalia simultaneously. It is an objective of the present invention that the antenna array relay junction receive televised signals simultaneously from a multiplicity of static instrumented sports paraphernalia (like for example instrumented baseball bases, instrumented baseball home plates and instrumented baseball pitcher's rubbers) that are on the playing field, by fiber optics cable/copper cable buried beneath the playing field. It is an objective of the present invention that the antenna array relay junction receives televised signals simultaneously from a multiplicity of instrumented sports paraphernalia that are on the playing field and relay them simultaneously to the remote base station by fiber optics cable/copper cable. It is an objective of the present invention that the antenna array relay junction receives command and control signals from the remote base station by fiber optics cable/copper cable bi-directional communications links, and relay them simultaneously in parallel to each of the instrumented sports paraphernalia that are on the playing field.

It is an objective of the present invention that the antenna array relay junction receives command and control signals from the remote base station and relays them simultaneously to a multiplicity of static instrumented sports paraphernalia that are on the playing field. It is an objective of the present invention to equip existing sports stadium with a parallel fiber optics/copper cable bi-directional communication link beneath the ground between the antenna array relay junction and instrumented sports paraphernalia (like instrumented baseball bases, instrumented baseball home plates, and baseball pitcher's rubber) on the playing field. It is an objective of the present invention to equip every sport stadium/arena with instrumented sports paraphernalia, an antenna array relay junction, wireless and/or fiber optics/copper cable communication links, and a remote base station to improve the quality of its sports TV broadcasting of games. It is an objective of the present invention to equip any sport stadium to simultaneously wirelessly televise sports games from a multiplicity of static sports paraphernalia i.e. $1^{st}$, $2^{nd}$, $3^{rd}$ baseball bases, pitcher's rubbers, and baseball home plates located on the playing field to a remote base station. It is an objective of the present invention to equip any sport stadium to simultaneously wirelessly televise sports activity from a multiplicity of static sports paraphernalia i.e. pitcher's rubbers and baseball home plates located off the playing field in a bullpen to a remote base station. It is an objective of the present invention to configure and equip any sports training field to use fiber optics cable/copper cable, to simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sport stadium to simultaneously televise sports games using bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single static instrumented sports paraphernalia that are on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

Figure 32A:
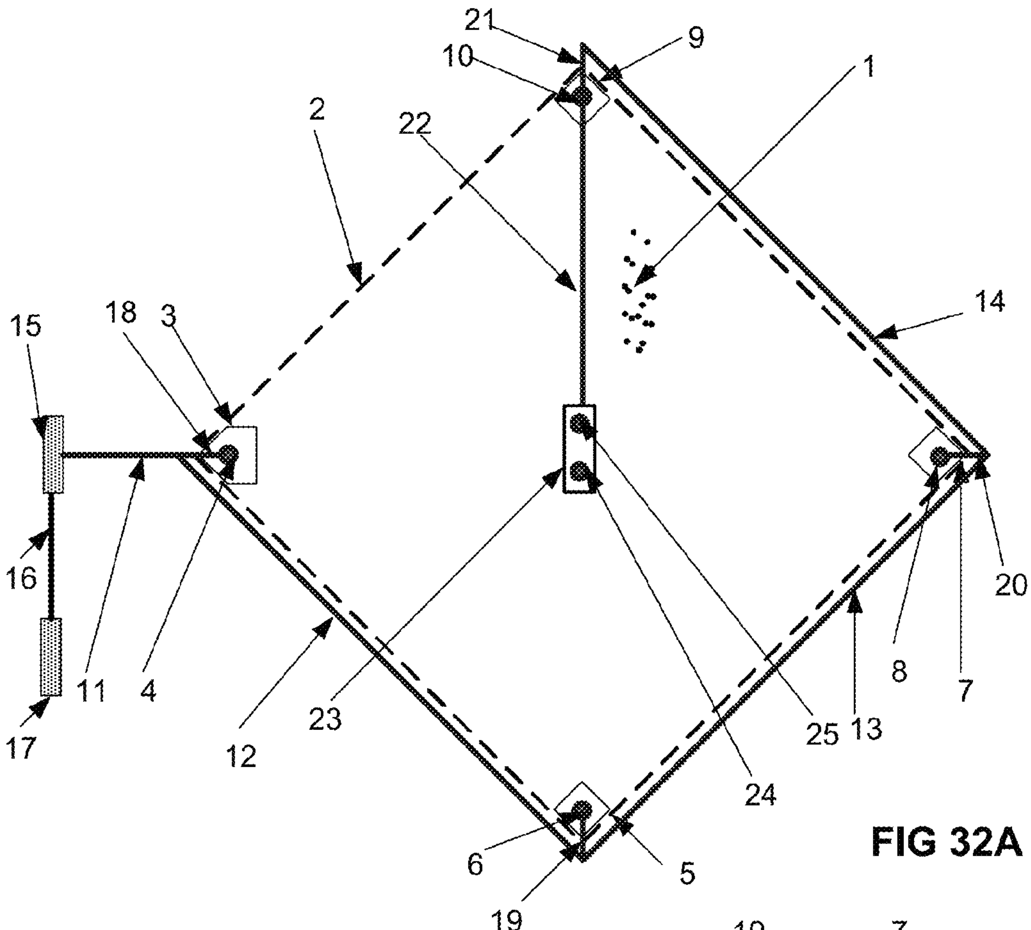
FIG. 32A is a diagram of the top view of a typical instrumented baseball stadium equipped to televise baseball games via fiber optics cable/copper cable from instrumented sports paraphernalia on the baseball playing field.
Figure 32B:
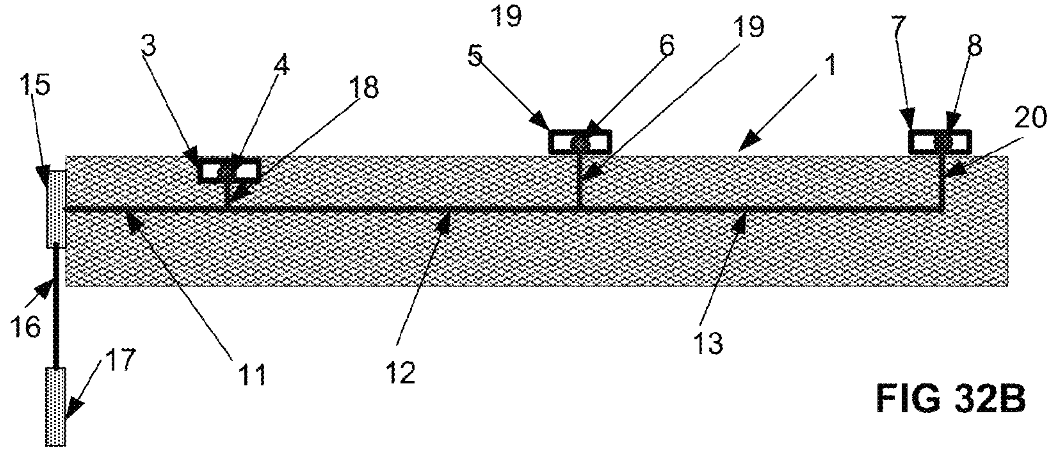
FIG. 32B is a diagram of the side view of a typical instrumented baseball stadium equipped to televise baseball games via fiber optics cable/copper cable from instrumented sports paraphernalia on the baseball playing field.

FIG. 32A and FIG. 32B

The detailed physical elements disclosed in the typical instrumented baseball stadium drawings shown in FIG. 32A and FIG. 32B are identified as follows: 1 is the baseball playing field ground. 2 is the baseball diamond. The distance between the instrumented baseball home plate 3 and the instrumented baseball first base 5 is 90 feet. The distance between the instrumented baseball first base 5 and the instrumented baseball second base 7 is 90 feet. The distance between the instrumented baseball second base 7 and the instrumented baseball third base 9 is 90 feet. The distance between the instrumented baseball third base 9 and the instrumented baseball home plate 3 is 90 feet. The distance between the third base 9 and the pitcher's rubber 23 is 63 feet. 3 is the instrumented baseball home plate equipped with the instrumentation package assembly. 4 is the instrumentation package assembly equipped for fiber optic/copper cable connection. 5 is the first instrumented baseball base equipped with the instrumentation package assembly. 6 is the instrumentation package assembly equipped for fiber optic/copper cable connection. 7 is the second instrumented baseball base equipped with the instrumentation package assembly. 8 is the instrumentation package assembly of second base so equipped for fiber optics/copper cable connection. 9 is the third instrumented baseball base equipped with the instrumentation package assembly. 10 is the instrumentation package assembly equipped for fiber optic/copper cable connection. 11 is the bi-directional multi-function fiber optic communication cable to home and all other base IPAs. 12 is the bi-directional multi-function fiber optic/copper communication cable between home plate and first base. 13 is the bi-directional multi-function fiber optic/copper communication cable between first and second base. 14 is the bi-directional multi-function fiber optic communication cable between second and s third base. 15 is the field-side fiber optic/copper multi-function junction box termination point for all IPAs (also known as the antenna array relay junction). It is located within the stadium but outside the limits of the baseball playing field. 16 is the bi-directional multi-function fiber optic/copper cables between 15 and the remote base station. 17 is the remote base station employing bi-directional fiber optic/copper connectivity. 18 is the bi-directional multi-function fiber optic/copper communication cable to home IPA. 19 is the bi-directional multi-function fiber optic communication cable to first base. 20 is the bi-directional multi-function fiber optic/copper communication cable to second base. 21 is the bi-directional multi-function fiber optic/copper communication cable to third base. 22 is the bi-directional multi-function fiber optic/copper communication cable between third base and the pitcher's rubber. 23 is the pitcher's rubber. 24 is the instrumentation package assembly equipped for fiber optic/copper connection. 25 is the instrumentation package assembly equipped for fiber optic/copper connection.

FIG. 32A is a diagram of the top view of a typical instrumented baseball stadium equipped to televise baseball games via fiber optics cable/copper cable from instrumented sports paraphernalia on the baseball playing field.

FIG. 32B is a diagram of the side view of a typical instrumented baseball stadium equipped to televise baseball games via fiber optics cable/copper cable from instrumented sports paraphernalia on the baseball playing field.

Referring to drawings FIG. 32A and FIG. 32B, in a preferred embodiment, a typical instrumented baseball stadium equipped to televise baseball games via fiber optics cable/copper cable from instrumented sports paraphernalia located on the baseball playing field to a remote base station is disclosed.

FIG. 32A and FIG. 32B shows a typical instrumented baseball stadium equipped with a fiber optics cable/copper cable communications link to televise baseball games from sports paraphernalia i.e. 1$^{st}$, 2$^{nd}$, 3$^{rd}$ bases, pitcher's rubber and home plate located on the baseball playing field, to a remote base station.

Typical instrumented baseball bases are disclosed in FIG. 24A and FIG. 24B.

Typical instrumented baseball plates are disclosed in FIG. 25A and FIG. 25B and FIG. 25C and FIG. 25D, FIG. 26A and FIG. 26B and FIG. 26C.

A typical baseball pitcher's rubber is disclosed in FIG. 36A and FIG. 36B and FIG. 36C.

The only substantial difference between the preferred embodiment disclosed in FIG. 32A and FIG. 32B, and the preferred embodiment disclosed in FIG. 31A and FIG. 31B is that the bidirectional multi-function fiber optics cable/copper cable is connected to the fiber optics/copper cable junction box sequentially to home plate and 1$^{st}$, 2$^{nd}$ and 3$^{rd}$ bases respectively, rather than directly to home plate, 1$^{st}$, 2$^{nd}$ and 3$^{rd}$ base. Some stadiums may favor one or the other method to facilitate easier installation of the fiber optics system.

Referring to the preferred embodiment disclosed in FIG. 32A and FIG. 32B a baseball stadium equipped for baseball camera system operation employing bi-directional multi-function fiber optic cable connectivity is specified. The underground fiber optics cable/copper cable is laid in a single contiguous underground trench. The trench that contains fiber optics cable 11 extends from the fiber optics/copper cable junction box 15 to the instrumented baseball home plate 3 and continues as fiber optics cable/copper cable 12 on to the instrumented 1st base 5; and continues as fiber optics cable/copper cable 13 on to the instrumented $2^{nd}$ base 7; and continues as fiber optics cable/copper cable 14 on to the instrumented $3^{rd}$ base 9. The instrumented baseball home plate 3, instrumented $1^{st}$ base 5, instrumented $2^{nd}$ base 7, and instrumented 3rd base 9 are each connected to the contiguous fiber optics cable/copper cable using their respective fiber optics/copper cable connectors. The fiber optics cables/copper cables 11, 12, 13 and 14 are connected to their respective instrumentation package assemblies 4, 6, 8 and 10 respectively via the mating fiber optics/copper cable connectors on each.

The fiber optics cables 11, 12, 13 and 14 are routed up from under the ground and up through the anchoring device of the instrumented baseball home plate and each instrumented baseball base respectively. The respective fiber optics cable/copper cable with its connector enters the bottom of the instrumented baseball home plate and each instrumented baseball base respectively through the access openings therein. Some modification of the existing anchoring devices may be required in order to provide a clear path for the routing of the cable. In an alternative preferred embodiment the fiber optics/copper cable is routed around the outside of the anchoring device and connected to the fiber optics/copper cable connector. The value of this alternative preferred embodiment is that it doesn't require altering the existing anchoring devices.

Referring to the Preferred Embodiments Specified in FIG. 32A and FIG. 32B, the fiber optics/copper cable baseball stadium satisfies all of the following objectives:

It is an objective of the present invention to equip existing prior art sports stadiums with instrumented sports paraphernalia systems comprised of instrumented sports paraphernalia (like instrumented baseball bases, instrumented baseball home plates and instrumented baseball pitcher's rubbers), an antenna array relay junction, bi-directional communication links, and a remote base station, to improve the quality of the stadium's sports TV broadcasts. It is an objective of the present invention to replace existing prior art non-instrumented sports paraphernalia like baseball bases, baseball home plates, and pitcher's rubbers that are currently on existing playing fields with substitute instrumented sports paraphernalia like instrumented baseball bases, instrumented baseball home plates and instrumented baseball pitcher's rubbers. It is an objective of the present invention to equip a baseball stadium to televise baseball games using a serial fiber optics/copper cable communications link that runs sequentially between the instrumented sports paraphernalia i.e. instrumented home plate, instrumented first base, instrumented second base, instrumented third base and the instrumented pitcher's rubber, and to the antenna array relay junction which relays the televised signals by a fiber optics/copper cable communications link to the remote base station. It is an objective of the present invention to equip a baseball stadium to televise baseball games using a fiber optics/copper cable communications link from sports paraphernalia i.e. $1^{st}$, $2^{nd}$, $3^{rd}$ bases, pitcher's rubber and home plate located on the baseball playing field, to a remote base station via an antenna array relay junction. It is an objective of the present invention to equip a baseball stadium to televise baseball games using a serial fiber optics communications link and/or a high speed serial copper cable communications link from sports paraphernalia i.e. $1^{st}$, $2^{nd}$, $3^{rd}$ bases, baseball pitcher's rubber and home plate located on the baseball playing field to a remote base station via an antenna array relay junction. It is an objective of the present invention to equip a baseball stadium with a bidirectional multi-function fiber optics cable/copper cable connected to the fiber optics/copper cable junction box (antenna array relay junction) sequentially to home plate, $1^{st}$, $2^{nd}$ and $3^{rd}$ bases and the pitcher's rubber respectively.

It is an objective of the present invention to equip a baseball stadium to televise baseball games using bi-directional multi-function fiber optic cable communication links and/or bi-directional multi-function high speed copper cable communication links buried beneath the ground of the baseball stadium playing field, that enters the bottom of the instrumented baseball sports paraphernalia located at their traditional positions on the playing field, through an access opening. It is an objective of the present invention to equip a baseball stadium with fiber optics cable/copper cable connectors that are connected to their mating instrumentation package assembly connectors in the bottom of the instrumented baseball sports paraphernalia on the playing field. It is an objective of the present invention to equip a baseball stadium with fiber optic cable/copper cable runs that includes copper cabling which furnishes an alternate source of low voltage dc power to the instrumented baseball sports paraphernalia located at their traditional positions on the playing field, that enters the bottom of the instrumented baseball sports paraphernalia through an access opening.

It is an objective of the present invention that a baseball stadium used to televise baseball games using fiber optics cable/copper cable from baseball sports paraphernalia be instrumented with an instrumented baseball first base, an instrumented baseball second base, an instrumented baseball third base, an instrumented baseball home plate, and an instrumented pitcher's rubber, an antenna array relay junction located within the stadium but outside the limits of the baseball playing field, a bi-directional communications cable between the remote base station and the antenna array relay junction, and a remote base station. It is an objective of the present invention to equip a baseball stadium to televise baseball games from sports paraphernalia i.e. $1^{st}$, $2^{nd}$, $3^{rd}$ bases, pitcher's rubber, and home plate using fiber optics cable/copper cable to a remote base station via an antenna array relay junction. It is an objective of the present invention to use the instrumented sports paraphernalia system in virtually any baseball stadium or training field environment unobtrusively with only a minimal amount of set-up time required prior to use. It is an objective of the present invention to locate and optimally place the antenna array relay junction to achieve the shortest cable runs. It is an objective of the present invention to operate and receive high quality photographic images made in real-time from a multiplicity of instrumented sports paraphernalia simultaneously.

It is an objective of the present invention that the antenna array relay junction receive televised signals simultaneously from a multiplicity of static instrumented sports paraphernalia (like for example instrumented baseball bases, instrumented baseball home plates and instrumented baseball pitcher's rubbers) that are on the playing field, by fiber optics cable/copper cable buried beneath the playing field. It is an objective of the present invention that the antenna array relay junction receives televised signals simultaneously from a multiplicity of instrumented sports paraphernalia that are on the playing field and relay them simultaneously to the remote base station by fiber optics cable/copper cable. It is an objective of the present invention that the antenna array relay junction receives command and control signals from the remote base station by fiber optics cable/copper cable bi-directional communications links, and relay them simultaneously in serial to each of the instrumented sports paraphernalia that are on the playing field. It is an objective of the present invention that the antenna array relay junction receives command and control signals from the remote base station and relays them simultaneously to a multiplicity of static instrumented sports paraphernalia that are on the playing field.

It is an objective of the present invention to equip existing sports stadium with a parallel fiber optics/copper cable bi-directional communication link beneath the ground between the antenna array relay junction and instrumented sports paraphernalia (like instrumented baseball bases, instrumented baseball home plates, and baseball pitcher's rubber) on the playing field. It is an objective of the present invention to equip every sport stadium/arena with instrumented sports paraphernalia, an antenna array relay junction, wireless and/or fiber optics/copper cable communication links, and a remote base station to improve the quality of its sports TV broadcasting of games. It is an objective of the present invention to provide an instrumented sports paraphernalia system to improve the broadcast quality of any sports stadium by quipping the sport stadium to simultaneously wirelessly televise sports games from a multiplicity of static sports paraphernalia i.e. 1$^{st}$, 2$^{nd}$, 3$^{rd}$ baseball bases, pitcher's rubbers, and baseball home plates located on the playing field to a remote base station. It is an objective of the present invention to equip any sport stadium to simultaneously wirelessly televise sports activity from a multiplicity of static sports paraphernalia i.e. pitcher's rubbers and baseball home plates located off the playing field in a bullpen to a remote base station. It is an objective of the present invention to configure and equip any sports training field to use fiber optics cable/copper cable, to simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sport stadium to simultaneously televise sports games using bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single static instrumented sports paraphernalia that are on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 33A

The detailed physical elements disclosed in the typical instrumented football stadium drawing shown in FIG. 33A are identified as follows: 1 is the football playing field. 2 is the remote base station. 3 is the bi-directional communications cable to first antenna location. 4 is the first antenna location. 5 is the bi-directional communications cable junction of first antenna location. 6 is the bi-directional communications cable to second antenna location. 7 is the second antenna location. 8 is the bi-directional communications cable junction of second antenna location. 9 is the bi-directional communications cable to third antenna location. 10 is the bi-directional communications cable junction of third antenna location. 11 is the third antenna location. 12 is the bi-directional communications cable to fourth antenna location. 13 is the bi-directional communications cable junction of fourth antenna location. 14 is the fourth antenna location. 15 is the bi-directional communications cable to fifth antenna location. 16 is the bi-directional communications cable junction of fifth antenna location. 17 is the fifth antenna location. 18 is the bi-directional communications cable to sixth antenna location. 19 is the sixth antenna location. 20 is the linear dimension of the distance measured across the field of play diagonally. 21 is the instrumented football.

FIG. 33A is a diagram of a typical instrumented football stadium equipped with a wireless RF bi-directional communications link to televise football games, from an instrumented football which is in play on the football playing field, and a remote base station via the antenna array relay junction.

Referring to the preferred embodiment specified in FIG. 33A, a typical instrumented football stadium equipped to televise football games from instrumented footballs on the stadium playing field to a remote base station is disclosed.

FIG. 33A shows a typical instrumented football stadium playing field 1 with the stadium equipped for televising pictures and sound from instrumented football 21 employing multipoint diversity reception techniques.

Some football stadiums are located in areas where only a poor signal to noise ratio can be achieved due to radio frequency interference from other sources within the vicinity while attempting to receive real-time televised images and sounds from an instrumented football 21 using systems that employ only a single antenna point.

Six antenna arrays 4, 7, 11, 14, 17 and 19 are each equipped with electronics that facilitate high-speed real-time bi-directional communication, with the instrumented football 21 using the 802.11(xx0 protocol operating within the unlicensed 2.4 ghz or 5.8 ghz spectrum, and the remote base station 2 via Ethernet or fiber optic cabling. The communication link between the antenna arrays and the instrumented football is wireless, whereas the communication link between the antenna arrays and the remote base station 2 is hard wired.

The remote base station 2 receives the high quality real-time pictures and sound captured by the instrumented football 21 during game play using multiple antenna arrays placed at strategic points. These points may be located near the ground level or at a substantial height above the field of play depending on the radio frequency architecture and/or noise floor and interference characteristics of the particular stadium.

In this preferred embodiment, a set of bi-directional communications cables 3, 6, 9, 12, 15 and 18 are used to connect each of the six antenna arrays 4, 7, 11, 14, 17 and 19 to the remote base station 2 via bi-directional communications cable junctions 5, 8, 10, 13, and 16.

Each of 3, 6, 9, 12, 15 and 18 consist of a separate category six UTP unshielded twisted pair cable assembly. Due to the large area of a football stadium throughout which 3, 6, 9, 12, 15 and 18 must span, category six cables should be used since they are capable of handling the required bandwidth with minimal losses to the signal path. Other types of cabling can also be used including multi-function fiber optic cable assemblies, provided such cabling can handle the required signal bandwidth.

The cabling system segments and related hardware 3, 5, 6, 8, 9, 10, 12, 13, 15, 16 and 18 are also used to convey electric power supplied by electronic hardware within the remote base station 2 to the electronics within each antenna array 4, 7, 11, 14, 17 and 19.

Bi-directional communications cable junctions 5, 8, 10, 13, and 16 are points in the cable installation that facilitate ease of access to 3, 6, 9, 12, 15 and 18 by personnel in the event servicing or future upgrades of the wired network is required.

Installation of 3, 5, 6, 8, 9, 10, 12, 13, 15, 16 and 18 within the stadium structure can be accomplished in several ways depending on the stadium's architecture. For example a run of electrical conduit containing 3, 6, 9, 12, 15 and 18 can be used between each antenna array location and the remote base station 2.

It is also possible that an existing wired or optical data network, already present within the stadium, be used in lieu of 3, 5, 6, 8, 9, 10, 12, 13, 15, 16 and 18, provided such existing network is capable of handling the required bandwidth and power.

The electronics within each antenna array 4, 7, 11, 14, 17 and 19, convey to the electronic hardware located at the remote base station 2, received signal strength indication and status data information along with the specific payload data packet which consists primarily of the image and audio data captured previously by the instrumented football The electronic hardware located at the remote base station 2 executes an algorithm that in real-time continuously monitors and compares the received signal strength indication and status data information from each of the corresponding antenna arrays 4, 7, 11, 14, 17 and 19 and determines dynamically which antenna array to use to receive the best overall specific payload data packet from the instrumented football 21.

Additionally, the electronic hardware located at the remote base station 2 executes an algorithm that in real-time continuously monitors, compares and determines dynamically the radio frequency, gain, polarization and error correction that should be applied by the antenna array's electronics to receive the best overall specific payload data packet from the instrumented football 21.

By proper real-time selection of the radio frequency, gain and polarization the electronics hardware at remote base station 2 can ensure that the images and sounds captured by the instrumented football 6 will be of high quality and will have sufficient stability to allow additional decoding and post processing of the payload data packet by the other electronics hardware and software located at remote base station 2.

By proper real-time selection of the correct antenna arrays, the electronics hardware at remote base station 2 can ensure that the images and sounds captured by the instrumented football 21 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 33A, the wireless football stadium satisfies all of the following further objectives:

It is an objective of the present invention to equip existing prior art football stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention to provide a low cost version for low budget users like, for example sandlot players and high school leagues. It is an objective of the present invention to equip a football stadium to televise football games using a wireless bi-directional communications link between instrumented footballs in play on the stadium football playing field and a remote base station via an antenna array relay junction. It is an objective of the present invention to equip a football stadium with an instrumented sports paraphernalia system employing six antenna arrays to overcome poor signal to noise ratios in those football stadiums having radio frequency interference. It is an objective of the present invention to equip a football stadium with an instrumented sports paraphernalia system employing six antenna arrays linked by hard wiring to the remote base station. It is an objective of the present invention to equip a football stadium with an instrumented sports paraphernalia system employing a remote base station having hardware that executes a real time algorithm that continuously monitors and compares the received signal strength indication and status data information from each of the corresponding six antenna arrays and determines dynamically which antenna array to use to receive the best overall specific payload data packet from the instrumented football. It is an objective of the present invention to equip a football stadium with an instrumented sports paraphernalia system employing a remote base station having hardware that executes a real time algorithm that continuously monitors, compares and determines dynamically the radio frequency, gain, polarization and error correction that should be applied by the six antenna array's electronics to receive the best overall specific payload data packet from the instrumented football.

FIG. 33B

The detailed physical elements disclosed in the typical instrumented football stadium drawing shown in FIG. 33B are identified as follows: 1 is the football stadium playing field. 2 is the remote base station. 3 is the bi-directional communications cable to antenna array relay junction. 4 is the antenna array relay junction. 5 is the linear dimension of the distance measured across the field of play diagonally. 6 is the instrumented football.

FIG. 33B shows a typical instrumented football stadium equipped with a wireless bi-directional RF communications link to televise football games from an instrumented football, which is in play on the football playing field, and a remote base station via the antenna array relay junction.

Referring to the preferred embodiments specified in FIG. 33B, a typical instrumented football stadium equipped to televise football games from instrumented footballs on the stadium playing field to a remote base station is disclosed.

Figure 39A:
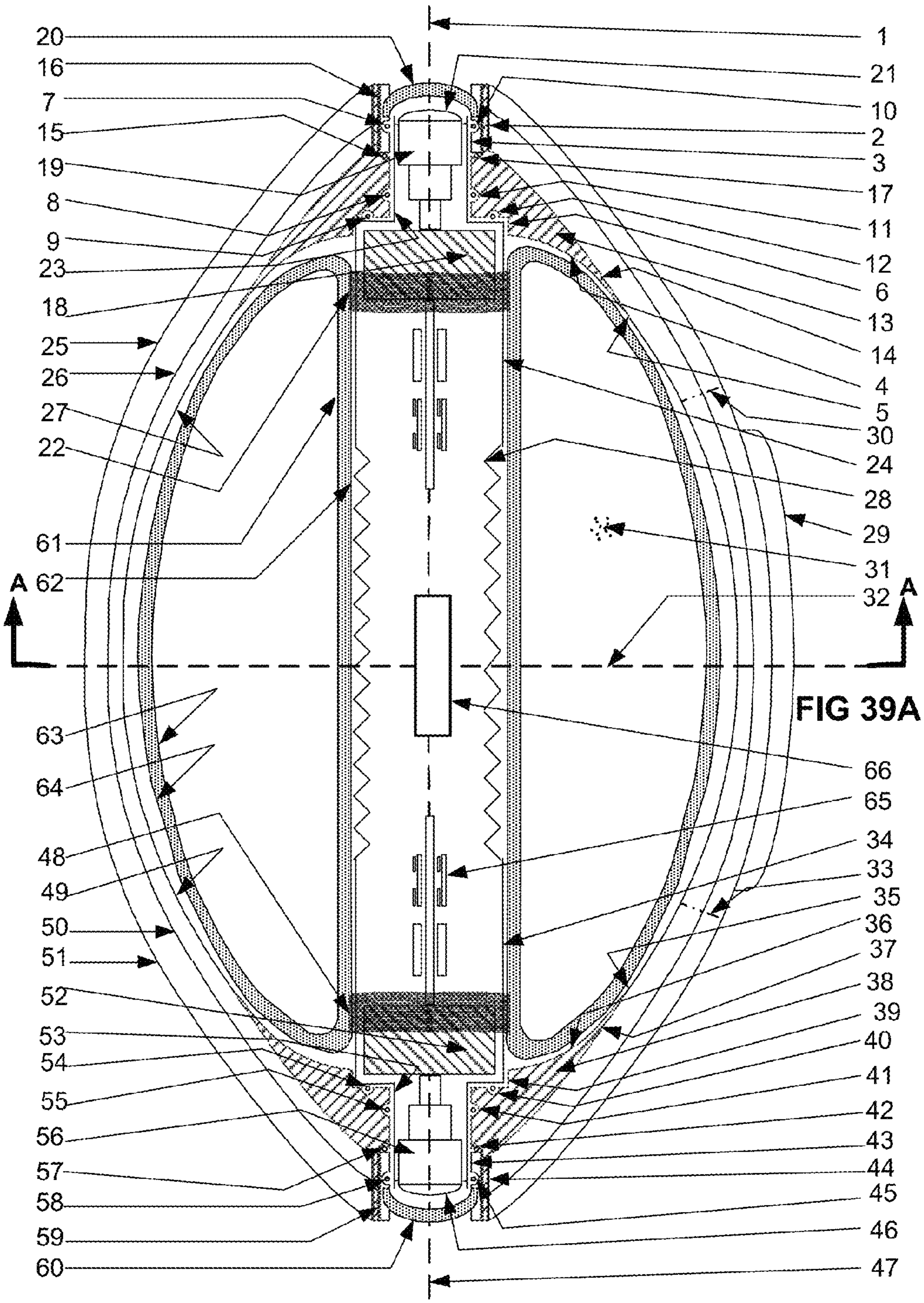
FIG. 39A is a side view section B-B of the instrumented football in FIG. 39B.
Figure 39B:
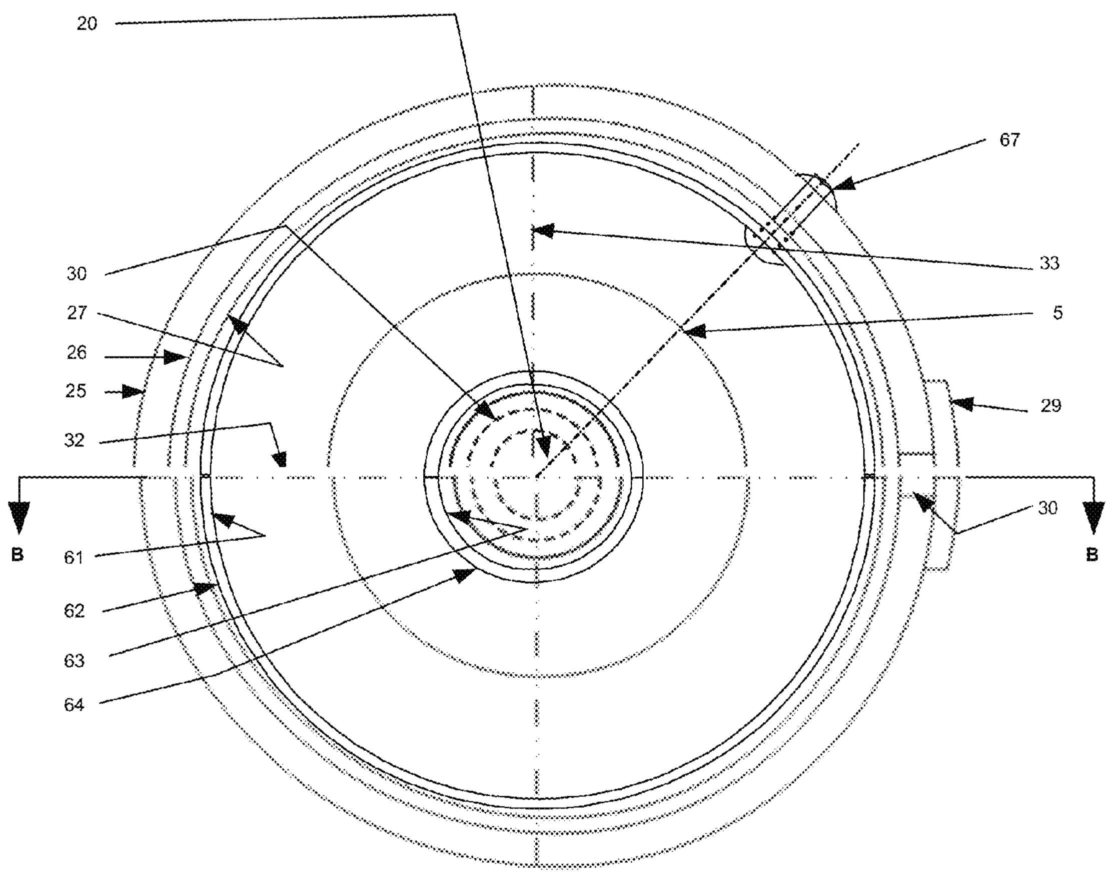
FIG. 39B is an end view section A-A of the instrumented football in FIG. 39A.

Typical instrumented footballs are disclosed in FIG. 39A and FIG. 39B.

FIG. 33B shows a typical instrumented football stadium playing field 1 with the stadium equipped for televising pictures and sound from instrumented football 6 employing single-point non-diversity reception techniques.

The disclosed preferred embodiment uses only a single antenna point. This becomes practical in football stadiums that are located in areas where a good signal to noise ratio can be achieved, due to reduced and/or non-existent radio frequency interference from other sources within the vicinity, while attempting to receive real-time televise images and sounds from an instrumented football 6

The antenna array 4 is equipped with electronics that facilitates high-speed real-time bi-directional communication, with the instrumented football 6 using the 802.11(xx0 protocol operating within the unlicensed 2.4 GHz or 5.8 GHz spectrum, and the remote base station 2 via Ethernet or fiber optic cabling. The communication link between the antenna array 4 and the instrumented football 6 is wireless, whereas the communication link between the antenna array and the remote base station 2 is hard wired.

A remote base station 2 receives the high quality real-time pictures and sound captured by the instrumented football 6 during game play using a single antenna array 4 placed at a strategic point. This point may be located near the ground level or at a substantial height above the field of play depending on the radio frequency architecture and/or noise floor and interference characteristics of the particular stadium.

In this preferred embodiment, a bi-directional communications cable 3 is used to connect the antenna array 4 to the remote base station 2. There is no need to have multiple junctions because there is only one cable with two ends.

Cable 3 consists of a separate category six UTP unshielded twisted pair cable assembly. Due to the large area of a typical football stadium the length of 3 can be large depending on the distance between the antenna array 4 and the remote base station 2.

Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power.

The cabling system has only a single segment 3 and is used to convey both bi-directional data as well as power to the antenna array 4. Because only a single segment is used, implementation of the complete hardware setup is easy to place into operation. The reduced complexity is a useful advantage to personnel setting up this equipment at football sporting events or training sessions.

Installation of 3 within the stadium structure can be accomplished in several ways depending on the stadium's architecture. For example a run of electrical conduit containing 3 can be used between the antenna array and the remote base station 2.

It is also possible that an existing wired or optical data network that may already be present within the stadium be used in lieu of 3 provided the existing network is capable of handling the required bandwidth and power.

The electronics within the antenna array 4 conveys to the electronic hardware located at the remote base station 2 information including received signal strength indication and status data along with the specific payload data packet which consists primarily of the image and audio data captured previously by the instrumented football 6.

The electronic hardware located at the remote base station 2 executes an algorithm that in real-time continuously monitors and compares the received signal strength indication and status data information from the antenna array 4 with an algorithm and determines dynamically the radio frequency, gain, polarization and error correction that should be applied by the antenna array electronics to receive the best overall specific payload data packet from the instrumented football 6.

By proper real-time selection of the radio frequency, gain and polarization the electronics hardware at remote base station 2 can ensure that the images and sounds captured by the instrumented football 6 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 33B, the wireless football stadium satisfies all of the following objectives:

It is an objective of the present invention to equip existing prior art football stadiums with instrumented sports paraphernalia systems comprised of an instrumented football, an antenna array relay junction, bi-directional communication links, and a remote base station to improve the quality of the stadium's sports TV broadcasts. It is an objective of the present invention to provide a low cost version for low budget users like, for example sandlot players and high school leagues. It is an objective of the present invention to equip a football stadium to televise football games using a wireless bi-directional communications link between instrumented footballs in play on the stadium football playing field and a remote base station via an antenna array relay junction. It is an objective of the present invention to equip a football stadium with an instrumented sports paraphernalia system employing a single antenna array relay junction in those football stadiums having low radio frequency interference. It is an objective of the present invention to equip a football stadium with an antenna array relay junction that looks at the entire football field, receives wireless RF televised signals from the instrumented football from anywhere on the football field, and transmits wireless RF signals to the instrumented football from the remote base station. It is an objective of the present invention to equip a football stadium with an instrumented sports paraphernalia system employing a single antenna array relay junction linked by hard wiring to the remote base station. It is an objective of the present invention to equip a football stadium with an instrumented sports paraphernalia system employing a remote base station having hardware that executes a real time algorithm that continuously monitors and compares the received signal strength indication and status data information from the antenna array relay junction and determines dynamically the condition of the payload data packet from the instrumented football to help the cameraman to anticipate the next break. It is an objective of the present invention to equip a football stadium with an instrumented sports paraphernalia system employing a remote base station having hardware that executes a real time algorithm that continuously monitors, compares and determines dynamically the radio frequency, gain, polarization and error correction that should be applied by the antenna array relay junction's electronics to receive the best overall specific payload data packet from the instrumented football.

FIG. 33C

The detailed physical elements disclosed in the typical instrumented football stadium drawing shown in FIG. 33C are identified as follows: 1 is the football stadium playing field. 2 is the remote base station. 3 is the bi-directional communications cable. 4 is the bi-directional communications cable. 5 is the instrumented football servo tracking actuator. 6 is the bi-directional communications cable. 7 is the instrumented football tracking camera. 8 is the bi-directional communications cable. 9 is the instrumented football tracking antenna array. 10 is the diagonal distance measured across the field of play. 11 is an instrumented football.

FIG. 33C shows a typical instrumented football stadium equipped with a wireless bi-directional RF communications link to televise football games from an instrumented football which is in play on the football playing field, and a remote base station via the antenna array relay junction.

Referring to the preferred embodiment specified in FIG. 33C, a typical instrumented football stadium equipped to televise football games from instrumented footballs on the stadium playing field is disclosed.

FIG. 33C shows a typical instrumented football stadium playing field 1 with the stadium equipped for televising pictures and sound from instrumented football 11 employing single-point non-diversity reception techniques aided by a single gimbaled antenna array 9 and instrumented football tracking camera 7.

Pictures taken by camera 7 of the instrumented football 11 on the playing field 1 are relayed to the remote base station 2 via bi-directional communications cable 6. The pictures are used by the remote base station 2 to calculate the location of the instrumented football 11 on the field 1 during the game using image recognition techniques.

The calculated location of the instrumented football 11 is fed from the remote base station 2 to the servo actuator 5 which in turn drives the gimbaled mounted antenna array 9 to point at the instrumented football 11. The gimbal mounted antenna array 9 is used to wirelessly receive televised pictures and sound radio signals from the instrumented football 11 and relay these to the remote base station 2 for processing. Bi-directional control signals are also relayed by the antenna array 9 between the remote base station 2 and the instrumented football 11. The antenna array 9 has a narrow beam width and high front to back ratio. This type antenna array 9 is used to reduce potential radio interference from extraneous sources in order to improve the signal to noise ratio of the communications link.

The tracking camera 7 simultaneously views the entire football playing field 1 to see the instrumented football 11. The tracking camera 7 is mounted high up over the football playing field 1 in order to simultaneously see the football playing field 1 in its entirety.

The disclosed preferred embodiment uses only a single antenna 9 point. This becomes practical in football stadiums that are located in areas where a good signal to noise ratio can not be achieved due to increased noise and/or radio frequency interference from other sources within the vicinity, while attempting to receive real-time televised images and sounds from an instrumented football 11.

The antenna arrays 9 is equipped with electronics that facilitates high-speed real-time bi-directional communication, with the instrumented football 11 using the 802.11(xx0 protocol operating within the unlicensed 2.4 ghz or 5.8 ghz spectrum, and the remote base station 2 via Ethernet or fiber optic cabling. The communication link between the antenna array 9 and the instrumented football 11 is wireless, whereas the communication link between the antenna array and the remote base station 2 is hard wired.

A remote base station 2 receives the high quality real-time pictures and sound captured by the instrumented football 11 during game play using a single antenna array 9 placed at a strategic point. This point may be located near the ground level or at a substantial height above the field of play depending on the radio frequency architecture and/or noise floor and interference characteristics of the particular stadium.

In this preferred embodiment, a bi-directional communications cable 8 is used to connect the antenna array 9 to the remote base station 2.

The cabling system has three cable segments 4, 6 and 8 that are used to convey both bi-directional data as well as power between the antenna array 9, servo actuator 5, tracking camera 7 and the remote base station 2.

3 is a cable bundle consisting of three separate category six UTP unshielded twisted pair cable assemblies. Due to the large area of a typical football stadium the length of these cables 3, 4, 6 and 8 can be large depending on the distance between the gimbaled antenna array 9 and servo actuator 5, and tracking camera 7 and the remote base station 2.

Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power.

Because the optimum location for the tracking camera 7 may not be the best location for the antenna 9 due to a poor signal to noise ratio, three separate segments are used so that the tracking camera 7 can be positioned at a remote distance which is different from the gimbaled antenna array 9. This preferred embodiment has an advantage over the embodiment shown in FIG. 33A because it uses only one antenna array versus six.

Installation of cables 3, 4, 6 and 8 within the stadium structure can be accomplished in several ways depending on the stadium's architecture. For example a run of electrical conduit containing 3, 4, 6 and 8 can be used between the antenna array 9, servo actuator 7 and tracking camera 7 and the remote base station 2.

It is also possible that an existing wired or optical data network that may already be present within the stadium be used in lieu of 3, 4, 6 and 8 provided the existing network is capable of handling the required bandwidth and power. The electronics within the antenna array 9 conveys to the electronic hardware located at the remote base station 2 information including received signal strength indication and status data along with the specific payload data packet which consists primarily of the image and audio data captured previously by the instrumented football 11.

The electronic hardware located at the remote base station 2 executes an algorithm that in real-time continuously monitors and compares the received signal strength indication and status data information from the antenna array 9 with an algorithm and determines dynamically the radio frequency, gain, polarization and error correction that should be applied by the antenna array electronics to receive the best overall specific payload data packet from the instrumented football 11.

By proper real-time selection of the radio frequency, gain and polarization the electronics hardware at remote base station 2 can ensure that the images and sounds captured by the instrumented football 11 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 33C, the wireless football stadium satisfies all of the following further objectives:

It is an objective of the present invention to equip existing prior art football stadiums with instrumented sports paraphernalia systems to improve the quality of the stadium's sports TV broadcasts. It is an objective of the present invention to replace current prior art American footballs with substitute instrumented footballs on the football stadium playing field. It is an objective of the present invention to equip a football stadium with an instrumented sports paraphernalia system consisting of a remote base station, bi-directional communications cables, instrumented football servo tracking actuator, an instrumented football tracking camera, an instrumented football tracking antenna array, an instrumented football and a remote base station to televise football games wirelessly from instrumented footballs in play on the football stadium playing field. It is an objective of the present invention to equip a football stadium with a bi-directional RF communications link to televise football games from an instrumented football which is in play on the football playing field. It is an objective of the present invention to equip a football stadium for televising pictures and sound from the instrumented football employing single-point non-diversity reception techniques aided by a single gimbaled antenna array and instrumented football tracking camera. It is an objective of the present invention to equip a football stadium with a remote base station that uses pictures taken by the cameras in the instrumented football to calculate the location of the instrumented football on the field during the game using image recognition techniques. It is an objective of the present invention to equip a football stadium with a remote base station that feeds the calculated location of the instrumented football to the servo actuator which in turn drives the gimbaled mounted antenna array to point at the instrumented football. It is an objective of the present invention to equip a football stadium with a gimbal mounted antenna array to use to wirelessly receive televised pictures and sound radio signals from the instrumented football and relay these to the remote base station for processing. It is an objective of the present invention to equip a football stadium with the remote base station to send control signals via the antenna array to the instrumented football. It is an objective of the present invention to equip a football stadium with a tracking camera that simultaneously views the entire football playing field to see the instrumented football. It is an objective of the present invention to equip a football stadium with only a single antenna point. It is an objective of the present invention to equip a football stadium with an antenna tracking system to overcome the poor S/N ratios and radio frequency interference in some stadiums. It is an objective of the present invention to equip a football stadium with three separate antenna segments so that the tracking camera can be positioned at a remote distance which is different from the gimbaled antenna array. It is an objective of the present invention to equip a football stadium with electronics within the antenna array that conveys to the electronic hardware located at the remote base station information including received signal strength indication and status data along with the specific payload data packet which consists primarily of the image and audio data captured previously by the instrumented football. It is an objective of the present invention to equip a football stadium with electronic hardware located at the remote base station that executes an algorithm that in real-time continuously monitors and compares the received signal strength indication and status data information from the antenna array with an algorithm and determines dynamically the radio frequency, gain, polarization and error correction that should be applied by the antenna array electronics to receive the best overall specific payload data packet from the instrumented football.

It is an objective of the present invention to equip a football stadium with electronics hardware at remote base station to make real-time selection of the radio frequency, gain and polarization to ensure that the images and sounds captured by the instrumented football will be of high quality and will have sufficient stability to allow additional decoding and post processing of the payload data packet by the other electronics hardware and software located at remote base station.

FIG. 33D

The detailed physical elements disclosed in the typical instrumented football stadium drawing shown in FIG. 33D are identified as follows: 1 is the football stadium playing field. 2 is the remote base station. 3 is the bi-directional communications cable. 4 is the remote base station repeater antenna. 5 is the remote repeater antenna. 6 is the bi-directional communications cable bundle. 7 is the bi-directional communications cable. 8 is the gimbal servo actuator. 9 is the bi-directional communications cable. 10 is the football tracking camera. 11 is the bi-directional communications cable. 12 is the gimbaled tracking antenna array. 13 is the linear diagonal distance measured across the field of play. 14 is the instrumented football.

FIG. 33D shows a typical instrumented football stadium equipped with a wireless bi-directional communications link to televise football games from an instrumented football which is in play on the football playing field, and a remote base station via the antenna array relay junction.

Referring to the preferred embodiment specified in FIG. 33D, a typical instrumented football stadium equipped to televise football games from instrumented footballs on the stadium playing field 1 is disclosed.

FIG. 33D shows a typical instrumented football stadium playing field 1 with the stadium equipped for televising pictures and sound from instrumented football 14 employing single-point non-diversity reception techniques aided by a single gimbaled antenna array 12 and instrumented football tracking camera 10.

Pictures taken by tracking camera 10 of the instrumented football 14 on the playing field 1 are relayed to the remote base station 2 via bi-directional network repeaters 4 and 5.

The pictures are used by the remote base station 2 to calculate the location of the instrumented football 14 on the field 1 during the game using image recognition techniques.

The calculated location of the instrumented football 14 is fed from the remote base station 2 to the gimbal servo actuator 8 via bi-directional network repeaters 4 and 5 which in turn drives the gimbaled mounted antenna array 12 to point at the instrumented football 14. The gimbal mounted antenna array 12 is used to wirelessly receive televised pictures and sound radio signals from the instrumented football 14 and relay these to the remote base station 2 via bi-directional network repeaters 4 and 5 for processing. Bi-directional control signals are also relayed by the antenna array 12 between the remote base station 2 via bi-directional network repeaters 4 and 5. and the instrumented football 14.

The antenna array 12 has a narrow beam width and high front to back ratio. This type antenna array 12 is used to reduce potential radio interference from extraneous sources in order to improve the signal to noise ratio of the communications link.

The tracking camera 10 simultaneously views the entire football playing field 1 to see the instrumented football 14. The tracking camera 10 is mounted high up over the football playing field 1 in order to simultaneously see the football playing field 1 in its entirety.

The disclosed preferred embodiment uses only a single antenna 12 point. This becomes practical in football stadiums that are located in areas where a good signal to noise ratio can not be achieved due to increased noise and/or radio frequency interference from other sources within the vicinity, while attempting to receive real-time televised images and sounds from an instrumented football 14.

The antenna array 12 is equipped with electronics that facilitates high-speed real-time bi-directional communication, with the instrumented football 14 using the 802.11(xx0 protocol operating within the unlicensed 2.4 ghz or 5.8 ghz spectrum, and the remote base station 2 via bi-directional network repeaters 4 and 5. The communication link between the antenna array 12 and the instrumented football 14 is wireless. The repeater communication link consisting of repeaters 4 and 5 between the antenna array 12 and the remote base station 2 is also wireless.

A remote base station 2 in turn receives the high quality real-time pictures and sound captured by the instrumented football 14 during game play using a single antenna array 12 placed at a strategic point. This point may be located near the ground level or at a substantial height above the field of play depending on the radio frequency architecture and/or noise floor and interference characteristics of the particular stadium.

In this preferred embodiment, a bi-directional communications cable 3 is used to connect the repeater 4 to the remote base station 2.

The cabling system has three cable segments 7, 9 and 11 that are used to convey both bi-directional data as well as power between the antenna array 12, servo actuator 8, tracking camera 10 and repeater 5.

6 is a cable bundle consisting of three separate category six UTP unshielded twisted pair cable assemblies. Due to the large area of a typical football stadium the length of these cables 6, 7, 9 and 11 can be large depending on the distance between the gimbaled antenna array 12 and servo actuator 8, and tracking camera 10 and repeater 5.

Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power.

Because the optimum location for the tracking camera 10 may not be the best location for the antenna 12 due to a poor signal to noise ratio, three separate segments are used so that the tracking camera 10 can be positioned at a remote distance which is different from the gimbaled antenna array 12. This preferred embodiment has an advantage over the embodiment shown in FIG. 33A because it uses only one antenna array versus six.

Installation of cables 6, 7, 9 and 11 within the stadium structure can be accomplished in several ways depending on the stadium's architecture. For example a run of electrical conduit containing 6, 7, 9 and 11 can be used between the antenna array 12, gimbal servo actuator 8 and tracking camera 10 and the repeater 5. It is also possible that an existing wired or optical data network that may already be present within the stadium be used in lieu of 6, 7, 9 and 11 provided the existing network is capable of handling the required bandwidth and power.

The electronics within the antenna array 12 in turn conveys to the electronic hardware located at the remote base station 2 information including received signal strength indication and status data along with the specific payload data packet which consists primarily of the image and audio data captured previously by the instrumented football 14.

The electronic hardware located at the remote base station 2 executes an algorithm that in real-time continuously monitors and compares the received signal strength indication and status data information from the antenna array 12 with an algorithm and determines dynamically the radio frequency, gain, polarization and error correction that should be applied by the antenna array electronics to receive the best overall specific payload data packet from the instrumented football 14.

By proper real-time selection of the radio frequency, gain and polarization the electronics hardware at remote base station 2 can ensure that the images and sounds captured by the instrumented football 14 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 33D, the wireless football stadium satisfies all of the following further objectives:

It is an objective of the present invention to replace existing prior art non-instrumented footballs that are currently on existing football playing fields with substitute instrumented footballs. It is an objective of the present invention to equip a football stadium with an instrumented football system for the improvement of the TV broadcast quality of football games. It is an objective of the present invention to equip a football stadium with an instrumented football system consisting of a remote base station, a bi-directional communications cables, remote base station repeater antenna, a remote repeater antenna, a bi-directional communications cable bundle, a bi-directional communications cable, a gimbal servo actuator, football tracking camera, and gimbaled tracking antenna array. It is an objective of the present invention to equip a typical instrumented football stadium with a wireless bi-directional communications link to televise football games from an instrumented football which is in play on the football playing field, and a remote base station. It is an objective of the present invention to equip a typical instrumented football stadium for televising pictures and sound from an instrumented football employing single-point non-diversity reception techniques aided by a single gimbaled antenna array and an instrumented football tracking camera. It is an objective of the present invention to relay pictures taken by the tracking camera of the instrumented football on the playing field, to the remote base station which uses its processing software to calculate the location of the instrumented football on the field during the game, using image recognition processing techniques on the pictures via the archived data base from the tripod mounted set-up camera.

It is an objective of the present invention for the remote base station to use the calculated location of the instrumented football to send a control signal to the gimbal servo actuator via bi-directional network repeaters to drive the gimbaled mounted antenna array to point at the instrumented football. It is an objective of the present invention for the gimbal mounted antenna array to wirelessly receive televised pictures and sound radio signals from the instrumented football and relay these to the remote base station via the bi-directional network repeaters for processing. It is an objective of the present invention for the gimbaled tracking camera to simultaneously view the entire football playing field to see the instrumented football. It is an objective of the present invention for the gimbaled tracking camera system to overcome the S/N ratio in stadiums where increased noise and/or radio frequency interference is an obstacle to receiving real-time televised images and sounds from an instrumented football. It is an objective of the present invention for the remote base station's electronic hardware to measure the received signal strength and status data, along with the specific payload data packet which consists primarily of the image and audio data captured previously by the instrumented football, and execute an algorithm that in real-time continuously monitors and compares the received signal strength indication and status data information from the antenna array with an algorithm and determines dynamically the radio frequency, gain, polarization and error correction that should be applied by the antenna array electronics to receive the best overall specific payload data packet from the instrumented football. It is an objective of the present invention that the determination of the real-time selection of the radio frequency, gain and polarization at the remote base station ensures that the images and sounds captured by the instrumented football are of high HD quality and will have sufficient stability to allow additional decoding and post processing of the payload data packet by the other electronics hardware and software located at remote base station.

FIG. 33E

The detailed physical elements disclosed in the typical instrumented football stadium drawing shown in FIG. 33E are identified as follows: 1 is the football stadium playing field. 2 is the remote base station. 3 is the bi-directional communications cable. 4 is the antenna array relay junction. 5 is the repeater antenna. 6 is the repeater antenna. 7 is the repeater antenna. 8 is the repeater antenna. 9 is the repeater antenna. 10 is the repeater antenna. 11 is the linear diagonal dimension of the distance measured across the playing field. 12 is the instrumented football.

FIG. 33E shows a typical instrumented football stadium equipped with a wireless bi-directional communications link to televise football games from an instrumented football which is in play on the football playing field, and a remote base station via the antenna array relay junction.

In the preferred embodiment for the typical instrumented football stadium configuration disclosed in FIG. 33E, it is an objective of the present invention to equip a football stadium to televise football games using a wireless RF bi-directional communications link between an instrumented football in play on the football playing field and a remote base station.

Referring to the preferred embodiment specified in FIG. 33E, a typical instrumented football stadium equipped to televise football games from instrumented footballs on the playing field is disclosed.

FIG. 33E shows a typical football stadium playing field 1 with the stadium equipped for televising pictures and sound from instrumented football 12 relayed wirelessly to remote base station 2 employing multipoint diversity reception techniques.

Some football stadiums may be located in areas where only a poor signal to noise ratio can be achieved, due to radio frequency interference from other sources within the vicinity, while attempting to receive real-time televised images and sounds from an instrumented football 12 using systems that employ only a single antenna point.

A multiplicity of repeater antenna arrays (for example, six repeater antenna arrays 5, 6, 7, 8, 9 and 10) are each equipped with electronics that facilitate high-speed real-time bi-directional communication, with the instrumented football 12 using for example the 802.11(xx0 protocol operating within the unlicensed 2.4 Ghz or 5.8 Ghz spectrum, and the remote base station 2. The communication link between the repeater antenna arrays 5, 6, 7, 8, 9 and 10, the instrumented football 12 and the remote base station 2 is wireless.

A remote base station 2 receives the high quality real-time pictures and sound captured by the instrumented football 12 during game play using multiple repeater antenna arrays 5, 6, 7, 8, 9 and 10 placed at strategic points. These points may be located near the ground level or at a substantial height above the field of play depending on the radio frequency architecture and/or noise floor and interference characteristics of the particular stadium.

In this preferred embodiment, a bi-directional communications cable 3 is used to connect antenna array 4 to the remote base station 2.

3 consists of a single category six UTP unshielded twisted pair cable assembly. Due to the large area of a football stadium throughout which 3 spans, a category six cable should be used since it is capable of handling the required bandwidth with minimal losses to the signal path. Other types of cabling can also be used including multi-function fiber optic cable assemblies, provided such cabling can handle the required signal bandwidth. The cabling system segment and related hardware is also used to convey electric power supplied by electronic hardware within the remote base station 2 to the electronics within antenna array 4.

Installation of 3 within the stadium structure can be accomplished in several ways depending on the stadium's architecture. For example a run of electrical conduit containing 3 can be used between the antenna array 4 and the remote base station 2.

It is also possible that an existing wired or optical data network, already present within the stadium, be used in lieu of 3 provided such existing network is capable of handling the required bandwidth and power.

The electronics within each antenna array 4 convey to the electronic hardware located at the remote base station 2 the received signal strength indication and status data information along with the specific payload data packet which consists primarily of the image and audio data captured previously by the instrumented football The electronic hardware located at the remote base station 2 executes an algorithm that in real-time continuously monitors and compares the received signal strength indication and status data information from each of the corresponding antenna arrays 5, 6, 7, 8, 9, and 10 and determines dynamically which antenna array to use to receive the best overall specific payload data packet from the instrumented football 12.

Additionally, the electronic hardware located at the remote base station 2 executes an algorithm that in real-time continuously monitors, compares and determines dynamically the radio frequency, gain, polarization and error correction that should be applied by the antenna array's electronics to receive the best overall specific payload data packet from the instrumented football 12.

By proper real-time selection of the radio frequency, gain and polarization the electronics hardware at remote base station 2 can ensure that the images and sounds captured by the instrumented football 12 will be of high quality and will have sufficient stability to allow additional decoding and post processing of the payload data packet by the other electronics hardware and software located at remote base station 2.

By proper real-time selection of the correct antenna arrays, the electronics hardware at remote base station 2 can ensure that the images and sounds captured by the instrumented football 12 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 33E, the instrumented football stadium satisfies all of the following further objectives:

It is an objective of the present invention to replace existing prior art non-instrumented footballs that are currently on existing football playing fields with substitute instrumented footballs. It is an objective of the present invention to equip existing prior art football stadiums with the instrumented football system to improve the TV broadcast quality of football games. It is an objective of the present invention to equip a football stadium with an instrumented football system consisting of an instrumented football, a wireless bi-directional communications air ways link, a multiplicity of repeater antennas, an antenna array relay junction, a bi-directional communications cable, and a remote base station. It is an objective of the present invention to equip a football stadium to televise football games using a wireless RF bi-directional communications link between an instrumented football in play on the football playing field and a remote base station. It is an objective of the present invention to equip a football stadium for televising pictures and sound from instrumented footballs that are relayed wirelessly to a remote base station employing multipoint diversity reception techniques. It is an objective of the present invention to equip a football stadium to overcome the poor signal to noise ratio in a stadium due to radio frequency interference from sources within the vicinity of the stadium. It is an objective of the present invention to equip a football stadium with multiple repeater antenna arrays. It is an objective of the present invention to equip a football stadium with a remote base station having hardware to execute algorithms that in real-time continuously monitors, compares and determines dynamically the radio frequency, gain, polarization and error correction that should be applied by the antenna array's electronics to receive the best overall specific payload data packet from the instrumented football to ensure that the images and sounds captured by the instrumented football will be of HD high quality and will have sufficient stability to allow additional decoding and post processing of the payload data packet by the other electronics hardware and software located at remote base station. It is an objective of the present invention to equip a football stadium with a remote base station to make real-time selection of the correct antenna arrays to ensure that the images and sounds captured by the instrumented football will be of HD high quality and will have sufficient stability to allow additional decoding and post processing of the payload data packet by the other electronics hardware and software located at remote base station.

It is an objective of the present invention to stabilize the imagery obtained from the instrumented football in an upright condition in the picture frame, regardless of the pitch, roll or yaw of the ice football, as viewed by a live TV audience in the HD CCD letterbox picture format. It is an objective of the present invention to stabilize the imagery obtained from the instrumented football in an upright condition in the picture frame, regardless of the pitch, roll or yaw of the football, as viewed by a live TV audience in the HD CCD letterbox picture format by using gyroscopic encoders. It is an objective of the present invention to stabilize the imagery obtained from the instrumented football in an upright condition in the picture frame, regardless of the pitch, roll or yaw of the ice hockey puck, as viewed by a live TV audience in the HD CCD letterbox picture format by image recognition processing. It is an objective of the present invention to stabilize the imagery obtained from the instrumented football in an upright condition in the picture frame, regardless of the pitch, roll or yaw of the instrumented football, as viewed by a live TV audience in the HD CCD letterbox picture format by using gyroscopic encoders and image recognition processing. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system used in the football stadium venue. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station. It is an objective of the present invention to provide views of the game not seen before during broadcasts by real time TV audiences. It is an objective of the present invention to provide views of the game from the instrumented football. It is an objective of the present invention to provide views of the game as seen from the vertices of the instrumented football; for example, views in front of the instrumented football as it is being passed forwardly, views in back of the instrumented football as it is being passed forwardly. It is an objective of the present invention to provide sounds of the game not heard before during broadcasts by real time TV audiences. It is an objective of the present invention to provide sounds of the game as heard by the instrumented football as it is handled. It is an objective of the present invention to provide sounds heard from the football as it is passed from player to player and hits the goal net. It is an objective of the current invention that the electronics components needed to carry out all the electronic functions of the instrumentation package assembly defined above, be packaged into the confined space of the instrumentation package assembly inside the instrumented football and that the weight limitations, center of gravity and moment of inertia considerations set out for the instrumentation package assembly be adhered to. It is an objective of the present invention to enable coaches who are on the sidelines during training sessions to hear the spoken dialog of their team's players from on the football field. It is an objective of the present invention to enable coaches who are on the sidelines during training sessions to view details of the team's players during training sessions on the football field. It is an objective of the present invention to enable referees who are on and off the football field during games to review details of the game from the two cameras onboard the instrumented football by instant replay. It is an objective of the present invention to equip the instrumentation package assembly to capture video and sounds on the football field from the instrumented football. It is an objective of the present invention to equip the instrumented football with an instrumentation package assembly that has two TV cameras, two microphones, two wireless antenna elements, battery pack and supporting electronics housed inside its enclosure. It is an objective of the present invention to equip the instrumentation package assembly inside the instrumented football with means to wirelessly televise the captured video and sounds to a remote base station via an antenna array relay junction stationed off the playing field but within (and around) the space of the instrumented football stadium. The antenna array relay junction is equipped to relay the video and sounds to the remote base station. The remote base station is located within the instrumented football stadium or its vicinity. It is an objective of the present invention that the instrumented football is under the command and control of a cameraman in the remote base station. It is an objective of the present invention to enable the instrumentation package assembly to be mounted inside the instrumented football in a manner permitting its two cameras and two microphones to see and hear out of the instrumented football. It is an objective of the present invention to enable the instrumentation package assembly to be mounted inside the instrumented football in a manner permitting the instrumentation package assembly to be protected from damage during the game on the playing field. It is an objective of the present invention to enable the instrumentation package assembly to be mounted inside the instrumented football in a manner permitting it to maintain its mechanical and optical alignment during the game on the playing field. It is an objective of the present invention to provide a permanent position and nesting place for the instrumentation package assembly inside the instrumented football. It is an objective of the present invention to provide the instrumented football with the identical handling and playability qualities as conventional regulation footballs. It is an objective of the present invention to provide a means to permit the instrumentation package assembly to be nested, cradled and isolated from shock and vibration inside the instrumented football. It is an objective of the present invention to provide an instrumentation package assembly that is sized so that it can be easily loaded and assembled into the instrumented football. It is an objective of the present invention to provide the instrumented football with an instrumentation package assembly that carries its own rechargeable battery pack. It is an objective of the present invention to provide the instrumented football with an instrumentation package assembly that carries its own rechargeable battery pack that has sufficient energy to power the cameras, lenses, antennas and electronics for the duration of the football game. It is an objective of the present invention to charge the battery pack of the instrumented football wirelessly using the charging unit. It is an objective of the present invention to provide the instrumented football with instrumentation package assembly electronics that require little power to operate and are lightweight. It is an objective of the present invention to provide the instrumented football with an instrumentation package assembly that carries its own battery pack that is recharged wirelessly by induction. It is an objective of the present invention to provide the instrumented football with an instrumentation package assembly that can withstand axial and tangential compression and decompression loads exerted on it during play. It is an objective of the present invention to provide the instrumented football with physical characteristics such as total weight, center of gravity and moments of inertia that are identical to regulation conventional football. It is an objective of the present invention to provide instrumented football with playing qualities and handling qualities that are identical to those in prior art conventional regulation football playing fields. It is an objective of the present invention that the instrumented football will withstand dirt, water, ice and weather conditions. It is an objective of the present invention that the instrumented football encapsulation will provide cushioning to protect the instrumentation package assembly from shock and vibration damage. It is an objective of the present invention to provide the instrumented football with provisions for holding the instrumentation package assembly in alignment and for cushioning and isolating the instrumentation package assembly from shocks received by the instrumented football during the game. It is an objective of the present invention that the optical windows are made small to be unobtrusive to the game without vignetting the field of view of the cameras under the prevailing lighting conditions on the rink in the arena. It is an objective of the present invention that the optical windows withstand heavy blows received during the game and protect the instrumentation package assembly. It is an objective of the present invention that the optical windows be easily removed and replaced. It is an objective of the present invention to simplify the instrumented football and reduce its cost for low budget venues by using only a single TV camera instead of the two camera preferred embodiment. It is an objective of the present invention for the simplified one camera instrumented football to operate in the same sports stadium and use the same remote base station, wireless communication links and antenna array relay junction as the four camera preferred embodiment. It is an objective of the present invention for the simplified one camera instrumented football to have the same appearance, playability and handling qualities as the conventional regulation footballs.

FIG. 34A and FIG. 34B and FIG. 34C

The detailed physical elements disclosed in the circular HD CCD TV camera sensor chip drawings shown in FIG. 34A and FIG. 34B and FIG. 34C are identified as follows: 1 is the top view of a flat circular HD CCD sensor chip of radius dimension R. 1 is constructed as a circular pattern of etched pixel elements. The pixel elements are arranged on the chip as an (x, y) Cartesian matrix of points into a sensor mosaic as with conventional CCD sensors. All the pixel elements in the mosaic that are on the surface of the chip within the circle are active. There are a total of 3,811,378 pixel elements in the (x, y) mosaic on the entire circular chip. The pixel elements are read in scan lines parallel to the chip's x-axis 2.

FIG. 34A is a top view of the circular CCD camera sensor chip showing the scanned letterbox picture frame format superimposed on it at an angular direction of zero degrees.

FIG. 34B is a top view of a virtual instrumented baseball home plate showing the generalized orientation of the circular CCD camera's sensor chip with the electronically scanned letterbox format superimposed on it at an arbitrary angular direction.

FIG. 34C is a top view of a virtual instrumented baseball home plate showing the generalized orientation of the circular CCD camera's sensor chip with the electronically scanned letterbox format superimposed on it at an angular direction of minus forty five degrees.

Referring to drawings FIG. 34A and FIG. 34B and FIG. 34C, in a preferred embodiment, a circular HD CCD TV camera sensor chip is disclosed. Besides the instrumented baseball home plate application described in the present invention, the specifications disclosed in the present invention with regard to the circular CCD camera sensor chip equally apply to instrumented baseball pitcher's rubbers, instrumented ice hockey pucks, and instrumented sports paraphernalia in general.

FIG. 34A shows an HD letterbox picture frame format 11 of electronically scanned pixel elements where the top of the HD letterbox picture frame format 11 is parallel to the x-axis 2 of the chip's circular sensor mosaic. The HD letterbox picture frame format has an aspect ratio of 16:9 by convention. The aspect ratio is the ratio of the letterbox's length dimension to its height dimension.

The resolutions for the 16:9 letterbox format are as follows:

By convention for entry level HD720, there are a total of 921,600 pixel elements enclosed within the HD letter box picture frame. This is derived by multiplying the number of standard pixels per line (i.e. 1,280) by the number of standard lines HD per picture frame (i.e. 720).

By convention for highest entry level HD768, there are a total of 1,049,088 pixel elements enclosed within the HD letter box picture frame. This is derived by multiplying the number of standard pixels per line (i.e. 1,366) by the number of standard lines HD per picture frame (i.e. 768).

By convention for standard HD1080, there are a total of 2,073,600 pixel elements enclosed within the HD letter box picture frame. This is derived by multiplying the number of standard pixels per line (i.e. 1,920) by the number of standard lines HD per picture frame (i.e. 1,080).

By convention for standard HD, there are a total of 2,073, 600 pixel elements enclosed within the HD letter box picture frame. This is derived by multiplying the number of standard pixels per line (i.e. 1,920) by the number of standard lines HD per picture frame (i.e. 1,080).

There are other high definition resolutions that differ from the common 16:9 letterbox format such as 17:9, 5:3, 3:2, 5:4, 8:5, and 4:3. Each of these formats has a finite number of pixel resolutions possible.

The remainder of the present preferred embodiment pertains to the standard HD1080 16:9 letterbox format with 2,073,600 pixel elements. It is obvious that other preferred embodiments of circular CCD sensor arrays can be constructed using any or all of the other HD letterbox, HD non-letterbox, non-HD letterbox and non-HD non-letterbox formats and resolutions.

4 is the geometrical center of the CCD sensor array. It lies at the intersection of the x and y axes on the chip's surface. The x-y plane is on the surface of the chip. The number of equally spaced pixel elements per inch in the x direction is equal to the number of equally spaced pixel elements per inch in the y direction. The origin of the z-axis of the chip is at 4 and is normal to the x-y plane of the chip. The z-axis 4 of the chip is normal to the chip's surface and is out of the x-y plane of the paper. The z-axis 4 of the chip is the optical axis of a camera lens (not shown) which is normal to the instrumented baseball home plate 12. The camera lens is above the x-y plane of the chip as it would normally be in the instrumentation package assembly, at a distance equal to its back focal length. The camera lens focuses the images of objects and players that are on the playing field onto the surface of the chip, and fills the chip's circular sensor array 1. The HD CCD sensor array's pixel elements fill the circular sensor array 1. Refer to FIG. 19A, FIG. 19B, FIG. 19C, FIG. 19D, FIG. 20A, FIG. 20B, FIG. 20C, FIG. 21A, FIG. 21B, FIG. 21C, FIG. 38, FIG. 40A, FIG. 40B, and FIG. 40C for specifications of instrumentation package assemblies showing the CCD cameras.

The camera lens is looking skyward from the instrumented baseball home plate. Refer to FIG. 25A, FIG. 25B, FIG. 25C, FIG. 25D, FIG. 26A, FIG. 26B, FIG. 26C for specifications of instrumented baseball home plates. Since the camera lens has an extremely wide angle field of view, it images the pictures of the playing field and the players that are near the edges of the field of view, onto the flat circular CCD sensor array 5 near its circular edge. The imagery from the camera lens fully covers the entire circular array of 3, 811,378 pixel elements on the chip right out to the chip's circumference. The coordinates of all the pixels on the chip's circumference are given by the following mathematical expression which is the equation for a circle:

$$X*X+Y*Y=R*R$$

2 is the x-axis of the chip's CCD etched sensor array mosaic. The x-axis passes through the geometrical center of the chip's circular mosaic. The x-axis is in the plane of the chip.

3 is the y-axis of the chip's CCD sensor array. The y-axis passes through the geometrical center of the circular chip. The y-axis is in the plane of the chip.

5, 6, 7, and 8 are the corner points of the HD letterbox picture frame format. The coordinates of the corner points obey the expression: X*X+Y*Y=R*R because they all are on the chip's circumference.

9 is called the angular direction vector. It is a virtual mathematical vector pointing from the center 4 of the HD letterbox's picture frame format 11 to the top of the HD letterbox picture frame format. The top of the HD letterbox picture frame format 11 is the line joining the two corner points 5 and 6. For extremely wide field lenses, like fish eye lenses for example, this vector essentially points to the direction on the playing field where the televised HD pictures of the objects that appear below the center of the TV picture frame are upright to the TV audience.

10 is the angle that 9 makes with the y-axis 3. This angle will be called theta. Theta is measured in degrees. Theta is positive when it is measured counter clockwise from the y-axis 3. Theta is negative when it is measured clockwise from the y-axis 3.

11 is the top of the HD letterbox picture frame format. The HD letterbox picture frame format contains the standard 2,073,600 pixel elements which are scanned on the chip. 12 is the top of the outline of the instrumented baseball home plate. The instrumented baseball home plate is positioned on the baseball playing field at its standard location on the baseball diamond. Refer to FIG. 30A, FIG. 30B, FIG. 31A, FIG. 31B, FIG. 32A, and FIG. 32B for specifications of the baseball diamond. FIG. 34B and FIG. 34C show a typical chip 1 (shown enlarged) positioned inside the instrumented baseball home plate 12. Chip 1 is a part of the typical CCD camera that is housed inside the instrumentation package assembly that is located within the instrumented baseball home plate 12.

FIG. 34B and FIG. 34C are not drawn to scale. The purpose of these figures is to show the orientation of the CCD sensor arrayed chip mosaic and the HD letterbox picture frame format relative to the instrumented baseball home plate 12. On the baseball diamond, by convention, the top of the instrumented baseball home plate, as shown, faces the pitcher.

Let the general Cartesian coordinates (x, y) of the corner points of the HD picture frame format be defined as follows:

The corner point 5 is defined as P1, where $P1=P1(X1, Y1)$.

The corner point 6 is defined as P2, where $P2=P2(X2, Y2)$.

The corner point 7 is defined as P3, where $P3=P3(X3, Y3)$.

The corner point 8 is defined as P4, where $P4=P4(X4, Y4)$.

The HD letterbox picture frame format has an aspect ratio of 16:9 by convention. R is the radius of the circular CCD sensor array. The radius R is an arbitrary value which is set by the chip manufacturer and is dependent on the desired individual pixel dimensions.

As an example, referring to FIG. 34A, the physical coordinates of the corner points 5, 6, 7, and 8 on the CCD chip's pixel mosaic are as follows:

Point 5 is $P1$, where $P1=P1(X1,Y1)=P1(+0.871575R,+0.490261R)$.

Point 6 is $P2$, where $P2=P2(X2,Y2)=P2(-0.871575R,+0.490261R)$.

Point 7 is $P3$, where $P3=P3(X3, Y3)=P3(-0.871575R,-0.490261R)$.

Point 8 is $P4$, where $P4=P4(X4, Y4)=P4(+0.871575R,-0.490261R)$.

As another example, referring to FIG. 34C where the angular direction vector 9 is shown at an angle 10 of minus forty five degrees with the y-axis of the instrumented baseball home plate outline 12, the angular vector 9 is pointing toward first base.

The physical coordinates of the corner points 5, 6, 7, and 8 on the CCD chip's pixel mosaic are therefore as follows:

Point 5 is $P1$, where $P1=P1(X1, Y1)=P1(+0.962962R,-0.26963R)$.

Point 6 is $P2$, where $P2=P2(X2, Y2)=P2(-0.26963R,+0.962962R)$.

Point 7 is $P3$, where $P3=P3(X3, Y3)=P3(-0.962962R,+0.26963R)$.

Point 8 is $P4$, where $P4=P4(X4, Y4)=P4(+0.26963R,-0.962962R)$.

Even though all the pixel elements etched on the circular CCD sensor array are active to the light striking them from the camera lens, the only pixel elements that are electronically scanned to form the televised TV picture are the ones within the letterbox picture frame format bounded by the corner point coordinates for 5, 6, 7, and 8 above.

Per convention, the pitcher's mound is along the positive y-axis where 10 is zero degrees. The catcher is squatted along the negative y-axis where 10 is one hundred and eighty degrees.

The CCD sensor array 1 is used in the instrumentation package assembly camera which is inside the instrumented baseball home plate 12. FIG. 63B shows the general case where the HD letterbox picture frame format 11 is oriented at an arbitrary angle 10 of theta degrees.

FIG. 34A shows the HD letterbox picture frame format 11 oriented at an angle 10 of zero degrees. At this angle, the vector 9 is facing the pitcher. The advantage gained by using the present invention specified above is that it greatly simplifies the instrumentation package assembly and thereby reduces its cost, and make it less likely to become misaligned or physically damaged. The present invention specified above greatly simplifies the instrumentation package assembly by eliminating the need to mechanically rotate the camera and the camera lens. The electro-mechanical actuating mechanism is thereby eliminated. The functions once provided by the electro-mechanical actuating mechanism in other embodiments are now provided electronically in the present embodiment without having to physically move any parts.

The disadvantage of this embodiment is that it requires that a circular flat CCD array be produced by a semiconductor company. Also, the letterbox picture frame electronically scans and reads only 54.4% of the pixels on the chip at any time, so there is a substantial wasted amount of overhead. This produces bandwidth limitations in the supporting electronics. These disadvantages however are over-weighted by the advantages.

In another preferred embodiment, a chip with a large oversized square array of pixels is used rather than a circular array of pixels. The disadvantage is that a large percentage of pixels would not be used because the letterbox picture frame would electronically scan and read only 39% of the pixels in the square array. This means that 61% of the pixels in the chip's CCD mosaic would go unused at any time the HD letterbox is scanned, resulting in a substantial wasted amount of overhead. A chip with a square array of pixels becomes more practical as the cost to develop and produce the square arrayed chips approaches that of the circular arrayed chips and the bandwidth limitations can be overcome at a lower cost.

The pixel elements that are on each corner of the HD letter box picture frame format are located on the circumference of the CCD sensor array of pixels at the four points 5, 6, 7 and 8. The four points are expressed mathematically as P1, P2, P3 and P4. The four points P1, P2, P3 and P4 have coordinates (X1, Y1), (X2, Y2), (X3, Y3) and (X4, Y4) respectively. The coordinates of the corner points 5=P1, 6=P2, 7=P3, and 8=P4 are a function of the angle theta 10.

In general, the mathematical relationships between the coordinates of the corner points of the HD letterbox picture frame format on the CCD array and theta 10 are as follows:

$$X=x\cos(\text{theta})-y\sin(\text{theta})$$

and $$Y=x\sin(\text{theta})+y\cos(\text{theta})$$

where x and y are the point coordinates when theta is zero degrees.

As a general example, referring to FIG. 63C with the angular direction vector 9 shown at an arbitrary angle 10 of theta degrees with the y-axis of the instrumented baseball home plate outline 12, the physical coordinates of the corner points 5, 6, 7, and 8 on the CCD chip's pixel mosaic are therefore as follows:

$P1=P1(X1, Y1)$, where $X1=0.871575R\cos(\text{theta})-0.490261R\sin(\text{theta})$.

$Y1=0.871575R\sin(\text{theta})+0.490261R\cos(\text{theta})$.

$P2=P2(X2, Y2)$, where $X2=-0.871575R\cos(\text{theta})-0.490261R\sin(\text{theta})$.

$Y2=-0.871575R\sin(\text{theta})+0.490261R\cos(\text{theta})$.

$P3=P3(X3, Y3)$, where $X3=-0.871575R\cos(\text{theta})+0.490261R\sin(\text{theta})$.

$Y3=-0.871575R\sin(\text{theta})-0.490261R\cos(\text{theta})$.

$P4=P4(X4, Y4)$, where $X4=+0.871575R\cos(\text{theta})+0.490261R\sin(\text{theta})$.

$Y4=+0.871575R\cos(\text{theta})-0.490261R\sin(\text{theta})$.

Even though all the pixel elements etched on the circular CCD sensor array are active to the light striking them from the camera lens, the only pixel elements that are electronically scanned to form the televised TV picture are the ones within the letterbox picture frame format bounded by the point coordinates for 5, 6, 7, and 8 above.

In another preferred embodiment, we can accomplish the same performance as above by using standard square chips, where the dimension of each side of the square is equal to the diameter of the circular chip sensor array, and where we only use the pixel elements inscribed in the circular region of the chip.

Referring to the Preferred Embodiments Specified in FIG. 34A and FIG. 34B and FIG. 34C, the circular HD CCD sensor chip satisfies all of the following further objectives:

It is an objective of the present invention to equip a TV camera with a flat circular shaped CCD sensor chip. It is an objective of the present invention to equip a TV camera with a flat circular shaped CCD sensor array chip. It is an objective of the present invention to equip a TV camera with a flat circular shaped CCD sensor arrayed chip to enable the TV viewing audience to see an upright image, within the HD letterbox format picture frame, no matter what horizontal angular direction the cameraman chooses to point the camera. It is an objective of the present invention to equip a TV camera with a flat circular shaped CCD sensor arrayed chip to enable the TV viewing audience to see an upright image, within the HD letterbox format picture frame, no matter what horizontal angular direction the cameraman chooses to point the camera, without the cameraman having to physically rotate the camera about its optical axis. It is an objective of the present invention to equip a camera with a flat circular shaped CCD sensor arrayed chip to enable the camera to deliver a HD letterbox format no matter what the angular direction is that the cameraman chooses to point the camera. It is an objective of the present invention to equip a camera with a flat circular shaped CCD sensor arrayed chip to be used to equip TV cameras for all kinds of instrumented sports paraphernalia besides instrumented baseball home plates, for example instrumented baseball pitcher's rubbers and instrumented ice hockey pucks. It is an objective of the present invention to greatly simplify the instrumentation package assembly and reduce its cost, and make it less likely to become misaligned or physically damaged. It is an objective of the present invention to eliminate the need to mechanically rotate the camera and the camera lens to point the camera. It is an objective of the present invention to use a square shaped chip sensor array where the dimension of each side of the square is equal to the diameter of the circular chip sensor array, and we only use the pixel elements inscribed in the circular region of the chip.

FIG. 35A

The detailed physical elements disclosed in the typical instrumented sports stadium drawing shown in FIG. 35A are identified as follows: 1 is the instrumentation package assembly inside 2. 2 is the instrumented sports paraphernalia. 3 is the playing field. 4 is a typical instrumented sports stadium. 5 is the boundary of the sports stadium parking lot and the air space above the sports stadium. 6 is the wireless radio bidirectional antenna array relay junction. 7 is the remote base station. 8 is the bidirectional wireless radio wave communication link between the antenna array relay junction 6 and the remote base station 7. 9 is the bidirectional wireless radio wave communication link between the instrumented sports paraphernalia 2 and the antenna array relay junction 6.

FIG. 35A is a top view of a typical instrumented sports stadium having been configured for use with both static and dynamic instrumented sports paraphernalia, for televising games from the playing field using wireless radio wave communication links.

Referring to the preferred embodiment disclosed in FIG. 35A, a typical instrumented sport stadium 4 equipped for wireless television operation employing single point non-diversity reception techniques is specified. The typical instrumented sport stadium 4 is physically configured with instrumented sports paraphernalia 2, remote base station 7, and antenna array relay junction 6.

Typical instrumented sports paraphernalia used in an instrumented sports stadium/arena as disclosed in FIG. 64A are: instrumented baseball bases as disclosed in FIG. 24A and FIG. 24B; instrumented baseball plates as disclosed in FIG. 25A and FIG. 25B and FIG. 25C and FIG. 25D, FIG. 26A and FIG. 26B and FIG. 26C; an instrumented baseball pitcher's rubber as disclosed in FIG. 36A and FIG. 36B and FIG. 36C; and instrumented ice hockey pucks as disclosed in FIG. 37A and FIG. 37B and FIG. 37C.

2 is meant to represent both a typical static or dynamic instrumented sports paraphernalia which are among a multiplicity of different instrumented sports paraphernalia that may be on the playing field 3 simultaneously with one another. As a result of 2 being instrumented with 1, 2 has the capability to televise games wirelessly via radio waves.

A typical instrumented sports stadium 4 is a stadium that is a venue for one or more types of sports events i.e. baseball and/or football. Static instrumented sports paraphernalia 2 are sports paraphernalia that have been instrumented and whose locations on the playing field 3 are fixed. Dynamic instrumented sports paraphernalia 2 are sports paraphernalia that have been instrumented and whose locations on the playing field 3 are varying.

The typical instrumented sport stadium 4 is configured to handle the simultaneous television signals from a multiplicity of such instrumented sports paraphernalia that are on the playing field 3 at a multiplicity of both fixed and varying locations. Each instrumented sports paraphernalia 2 has a radio wave communications link 9 which runs in the air above the playing field 3 between 2 and 6.

1 and 6 wirelessly communicate bi-directionally via radio wave signals 9. 6 and 7 wirelessly communicate bi-directionally via radio wave signals 8. 8 is the wireless radio communication link between the wireless radio antenna array relay junction 6 and the remote base station 7.

The typical instrumented sport stadium 4 is configured with instrumented sports paraphernalia 2, remote base station 7, and antenna array relay junction 6. The antenna array relay junction 6 is located within the sport stadium 4 but outside the limits of the playing field 3. The antenna array relay junction 6 is located above the ground level of the playing field 3. 6 is a bi-directional radio antenna array wirelessly linking the sports paraphernalia 2 to the remote base station 7 which is located inside or outside the sport stadium 4 but within the boundaries of the sport stadium parking lot 5.

The purpose of 6 is to relay radio signals between 1 and 7. There is a radio wave link between 1 and 6, and another radio wave link between 6 and 7. 6 relays television and system status signals from 1 to 7, and relays command and control signals from 7 to 1.

In this embodiment 1 is configured to communicate wirelessly with the remote base station 7 employing single point non-diversity reception techniques via a fixed point multi-directional antenna array relay junction 6. This feature set enables the complete system to be used in virtually any sport stadium or training field environment unobtrusively i.e. no underground cabling or trenching of the field, and with only a minimal amount of set-up time required prior to use.

At the time the complete system consisting of 1, 6 and 7 is initially placed into operation at a given sport stadium or training field, testing to determine the very best received signal strength, location and optimal placement of 6 relative to 1, and 7 relative to 6 is performed by field-side personnel familiar with the system.

The aerial position of 6 mounted above 3 is set to ensure that during a typical game or training session, 7 may operate and receive the high quality mages made in real-time from 1.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 35A, the typical instrumented sports stadium satisfies all of the following further objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio bidirectional antenna array relay junction, a remote base station, a bidirectional wireless radio wave communication link between the antenna array relay junction and the remote base station, is the bidirectional wireless radio wave communication link between the instrumented sports paraphernalia and the antenna array relay junction. It is an objective of the present invention to equip any sport stadium/arena to simultaneously wirelessly televise sports games from a multiplicity of both dynamic and static sports paraphernalia i.e. footballs, 1st, 2nd, 3rd baseball bases, pitcher's rubbers, baseball home plates, and ice hockey pucks located on the playing field/rink to a remote base station. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single dynamic instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 35B

The detailed physical elements disclosed in the typical instrumented sports stadium drawing shown in FIG. 35B are identified as follows: 1 is the instrumentation package assembly inside 2. 2 is the instrumented sports paraphernalia. 3 is the playing field. 4 is the typical instrumented sports stadium. 5 is the boundary of the sports stadium parking lot and the air space above the typical instrumented sports stadium. 6 is the bidirectional fiber optics/copper cable antenna array relay junction. 7 is the remote base station. 8 is the bidirectional wireless radio communication link between the antenna array relay junction 6 and the remote base station 7. 9 is the bidirectional fiber optics cable/copper cable communication link between the instrumented sports paraphernalia 2 and the antenna array relay junction 6.

FIG. 35B is a top view of a typical instrumented sports stadium having been configured and equipped for use with static instrumented sports paraphernalia, for televising games from the playing field using fiber optics cable and bi-directional high speed copper network cable communication links.

Referring to the preferred embodiment disclosed in FIG. 35B, a typical instrumented sport stadium equipped for fiber optics cable/copper cable television operation employing single point non-diversity reception techniques is specified. The typical instrumented sport stadium 4 is physically configured with instrumented sports paraphernalia 2, fiber optics cable/copper cable link 9, remote base station 7, and antenna array relay junction 6.

Typical instrumented sports paraphernalia used in an instrumented sports stadium/arena as disclosed in FIG. 35B are: instrumented baseball bases as disclosed in FIG. 24A and FIG. 24B; instrumented baseball plates as disclosed in FIG. 25A and FIG. 25B and FIG. 25C and FIG. 25D, FIG. 26A and FIG. 26B and FIG. 26C; and instrumented baseball pitcher's rubber's as disclosed in FIG. 36A and FIG. 36B and FIG. 36C;

A typical instrumented sports stadium 4 is a stadium that is a venue for one or more types of sports events i.e. baseball games. Static instrumented sports paraphernalia 2 are instrumented sports paraphernalia that have been instrumented and whose locations on the stadium playing field 3 are fixed; for example, instrumented baseball bases, instrumented baseball plates and instrumented pitcher's rubbers.

2 is meant to represent a typical static instrumented sports paraphernalia which is among a multiplicity of different static instrumented sports paraphernalia that may be on the playing field 3 simultaneously with one another. As a result of 2 being instrumented with 1, 2 has the capability to televise games wirelessly via radio waves and/or by fiber optics cable/copper cable.

FIG. 64B shows a typical static instrumented sports paraphernalia 2 on the playing field 3. The typical instrumented sport stadium 4 is configured to handle the simultaneous television signals from a multiplicity of such static instrumented sports paraphernalia that are on the playing field at the same time at multiple fixed locations. Each static instrumented sports paraphernalia 2 has its own fiber optics cable/copper cable communications link 9 which runs under ground beneath the playing field 3 between 2 and 6.

1 and 6 communicate bi-directionally using signals via a fiber optics cable/copper cable link 9. 6 and 7 wirelessly communicate via radio wave signals 8. 8 is the wireless radio communication link between the antenna array relay junction 6 and the remote base station 7.

The typical instrumented sport stadium 4 is configured with instrumented sports paraphernalia 2, fiber optics cable/copper cable link 9, remote base station 7, and antenna array relay junction 6. The antenna array relay junction 6 is located within the sport stadium 4 but outside the limits of the playing field 3. The antenna array relay junction 6 is located above the ground level of the playing field 3. 6 is a bi-directional radio antenna array linking the sports paraphernalia 2 to the remote base station 7 which is located inside or outside the typical instrumented sport stadium 4 but within the boundaries of the typical instrumented sport stadium parking lot 5.

The purpose of 6 is to relay signals between 1 and 7. There is a fiber optics/copper cable link between 1 and 6, and a radio link between 6 and 7. 6 relays television and system status signals from 1 to 7, and relays command and control signals from 7 to 1.

In this embodiment 1 is configured to communicate with the remote base station 7 employing single point non-diversity reception techniques via a fixed point multi-directional antenna array relay junction 6.

At the time the complete system consisting of 1, 6 and 7 is initially placed into operation at a given typical instrumented sport stadium or training field, testing to determine the very best received signal strength, location and optimal placement of 6 relative to 1, and 7 relative to 6 is performed by field-side personnel familiar with the system. The aerial position of 6 mounted above 3 is set to ensure that during a typical game or training session, 7 may operate and receive the high quality mages made in real-time from 1.

Referring to the Preferred Embodiments Specified in FIG. 35B, the typical instrumented sports stadium satisfies all of the following further objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio bidirectional antenna array relay junction, a remote base station, a bidirectional wireless radio wave communication link between the antenna array relay junction and the remote base station, a bidirectional fiber optics/copper cable communication link between the instrumented sports paraphernalia and the antenna array relay junction. It is an objective of the present invention to equip any sport stadium with static instrumented sports paraphernalia, an antenna array relay junction, fiber optics/copper cable communication links, and a remote base station. It is an objective of the present invention for any sport stadium to be configured and equipped to televise simultaneously from a multiplicity of static sports paraphernalia located on the playing field, to a remote base station. It is an objective of the present invention to equip any sport stadium to simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sport stadium to simultaneously wirelessly televise sports games from a multiplicity of static sports paraphernalia i.e. 1$^{st}$, 2$^{nd}$, 3$^{rd}$ baseball bases and baseball home plates located on the playing field to a remote base station. It is an objective of the present invention to configure and equip any sport stadium to simultaneously televise sports games using bi-directional fiber optics/copper cable communications links extending from a multiplicity of static sports paraphernalia i.e. 1$^{st}$, 2$^{nd}$, 3$^{rd}$ baseball bases and baseball home plates, located on the playing field to a remote base station. It is an objective of the present invention to configure and equip any sport stadium both wirelessly and by use of fiber optics cable/copper cable, to simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sports training field to both wirelessly and by use of fiber optics cable/copper cable, simultaneously televise sports games from a multiplicity of static sports paraphernalia i.e. 1$^{st}$, 2$^{nd}$, 3$^{rd}$ baseball bases and baseball home plates located on the playing field, to a remote base station.

FIG. 35C

The detailed physical elements disclosed in the typical instrumented sports stadium drawing shown in FIG. 35C are identified as follows: 1 is the instrumentation package assembly inside 2. 2 is the instrumented sports paraphernalia that has been instrumented with the instrumentation package assembly 1. 3 is the playing field. 4 is a typical instrumented sports stadium. 5 is the boundary of the typical instrumented sports stadium parking lot and the air space above the sports stadium. 6 is the antenna array relay junction. 7 is the remote base station. 8 is the bidirectional wireless radio wave communication link between the antenna array relay junction 6 and the remote base station 7. 9 is the bidirectional fiber optics cable/copper cable communication link between the instrumented sports paraphernalia 2 and the antenna array relay junction 6. 10 is the bidirectional wireless radio wave communication link between the instrumented sports paraphernalia 2 and the antenna array relay junction 6. 11 is the bidirectional fiber optics cable/copper cable communication link between the antenna array relay junction 6 and the remote base station 7. 12 is the instrumented sports paraphernalia that has been instrumented with the instrumentation package assembly 15. 13 is the bidirectional wireless radio wave communication link between the instrumented sports paraphernalia 12 and the antenna array relay junction 6. 14 is the bidirectional fiber optics cable/copper cable communication link between the instrumented sports paraphernalia 12 and the antenna array relay junction 6. 15 is the instrumentation package assembly inside 12.

FIG. 35C is a top view of a typical instrumented sports stadium that has been configured and equipped for use with both static and dynamic instrumented sports paraphernalia, for televising games from both on the playing field, and off the playing field, using bi-directional wireless radio wave communication links and/or bi-directional fiber optics cable and bi-directional high speed copper network communications cable links.

Typical instrumented sports paraphernalia used in an instrumented sports stadium/arena as disclosed in FIG. 35C are: instrumented footballs as disclosed in FIG. 39A and FIG. 39B; instrumented baseball bases as disclosed in FIG. 24A and FIG. 24B; instrumented baseball plates as disclosed in FIG. 25A and FIG. 25B and FIG. 25C and FIG. 25D, and FIG. 26A and FIG. 26B and FIG. 26C; an instrumented baseball pitcher's rubber as disclosed in FIG. 36A and FIG. 36B and FIG. 36C; and instrumented ice hockey pucks as disclosed in FIG. 1A and FIG. 1B and FIG. 1C, and FIG. 9A and FIG. 9B, and FIG. 37A and FIG. 37B and FIG. 37C.

Referring to the preferred embodiment disclosed in FIG. 35C, a typical instrumented sport stadium equipped for both bi-directional wireless radio wave television and bi-directional fiber optics cable/copper cable television operation employing single point non-diversity reception techniques is specified. The typical instrumented sport stadium 4 is physically configured with instrumented sports paraphernalia 2, fiber optics cable/copper cable link 9, remote base station 7, fiber optics cable/copper cable link 11, and antenna array relay junction 6. The remote base station 7 exercises command and control of the sports paraphernalia 2. The electronics, signals and data flows of the remote base station 7 are specified in FIG. 14A and FIG. 14B. Except for differences in processing software, the remote base stations specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B are substantially identical.

A typical instrumented sports stadium 4 is a stadium that is a venue for one or more types of sports events i.e. baseball and/or football. Static instrumented sports paraphernalia 2 are sports paraphernalia that have been instrumented and whose locations on the playing field 3 are fixed. Dynamic instrumented sports paraphernalia 2 are sports paraphernalia that have been instrumented and whose locations on the playing field 3 are varying.

2 is meant to represent both a typical static or dynamic instrumented sports paraphernalia which are among a multiplicity of different instrumented sports paraphernalia that may be on the playing field 3 simultaneously with one another. As a result of 2 being instrumented with 1, 2 has the capability to televise games wirelessly via radio waves and/or by fiber optics cable/copper cable.

During the calendar year some sports stadiums are often used as venues for more than one sport. For example, during different seasons during the year some are used for both baseball and football. During the game of football, the instrumented football is an example of the instrumented sports paraphernalia. During the game of baseball, the instrumented $1^{st}$, $2^{nd}$, $3^{rd}$ bases and instrumented home plate are examples of the instrumented sports paraphernalia.

The instrumented football is an example of a dynamic instrumented sports paraphernalia. The instrumented $1^{st}$, $2^{nd}$, $3^{rd}$ bases and instrumented home plate are examples of static sports paraphernalia. The location of the instrumented football varies on the playing field during the game. The locations of the $1^{st}$, $2^{nd}$, $3^{rd}$ bases, instrumented pitcher's rubber, and instrumented home plate are fixed on the playing field during the game. It is therefore advantageous to configure these sports stadiums to use both static and dynamic sports paraphernalia.

Some typical instrumented sports stadiums are larger than others and can economically justify the cost of using fiber optics cable/copper cable communication links between the fixed sports paraphernalia on the playing field and the antenna array relay junction 6; and between the antenna array relay junction 6 and the remote base station 7. The cost of a bi-directional fiber optics cable/copper cable communication link installation exceeds the cost of a bi-directional wireless radio wave communication link installation. Therefore, the bi-directional wireless radio wave communication link installation has a cost advantage over the bi-directional fiber optics cable/copper cable communication link installation.

The bi-directional fiber optics cable/copper cable communication link has a distinct performance advantage over the bi-directional wireless radio wave communication link. The bi-directional fiber optics cable/copper cable communication link has a much greater bandwidth than the bi-directional wireless radio wave communication link. Consequently, the bi-directional fiber optics cable/copper cable communication link has both a much greater capability and flexibility in producing HD video and sound than the bi-directional wireless radio wave communication link.

2 is meant to represent a typical instrumented sports paraphernalia which is representative of any one of a possible multiplicity of instrumented sports paraphernalia that are televising on the playing field simultaneously. For example, in the game of football there is only one instrumented football in play that is televising on the playing field at any one time. For example, in the game of baseball there are at least five instrumented sports paraphernalia televising on the playing field at any one time i.e. the instrumented $1^{st}$ base, instrumented $2^{nd}$ base, instrumented $3^{rd}$ base, instrumented pitcher's rubber, and the instrumented home plate.

2 is also meant to represent a typical static or dynamic instrumented sports paraphernalia that are televising on the playing field simultaneously. Static instrumented sports paraphernalia 2 are sports paraphernalia whose locations on the playing field 3 are fixed. The instrumented $1^{st}$ base, instrumented $2^{nd}$ base, instrumented $3^{rd}$ base, instrumented pitcher's rubber, and instrumented home plate are examples of static instrumented sports paraphernalia. Dynamic instrumented sports paraphernalia 2 are sports paraphernalia whose locations on the playing field 3 are varying. The instrumented football is an example of a dynamic instrumented sports paraphernalia.

2 is a typical static/dynamic instrumented sports paraphernalia on the playing field 3. The sport stadium 4 is configured to handle the simultaneous television signals from a multiplicity of such static or dynamic instrumented sports paraphernalia that are on the playing field at a multiplicity of both fixed and varying locations respectively.

Each dynamic instrumented sports paraphernalia 2 has a bi-directional radio wave communications link 10 which runs in the air above the playing field 3 between 2 and 6 as the location of 2 on the playing field varies.

Each static instrumented sports paraphernalia 2 has a bi-directional radio wave communications link 10 which runs in the air above the playing field 3 between 2 and 6, as well as a bi-directional fiber optics/copper cable communications link 9 that runs in the ground beneath the playing field 3 between 2 and 6.

The antenna array relay junction 6 has a bi-directional radio wave communications link 8 which runs in the air above the playing field 3 between 6 and 7. The antenna array relay junction 6 also has a bi-directional fiber optics/copper cable communications link 9 that runs between 6 and 7.

8 is the wireless radio communication link between the fiber optics/copper cable/wireless radio antenna array relay junction 6 and the remote base station 7.

The typical instrumented sport stadium 4 is configured with the antenna array relay junction 6. The antenna array relay junction 6 is located within the sport stadium 4 but outside the limits of the playing field 3. The antenna array relay junction 6 is located above the ground level of the playing field 3.

6 is a bi-directional radio antenna array wirelessly linking the sports paraphernalia 2 to the remote base station 7 which is located outside the sport stadium 4 but within the boundaries of the sport stadium parking lot 5. 6 is also a bi-directional fiber optics cable/copper cable junction linking the sports paraphernalia 2 to the remote base station 7.

The purpose of 6 is to relay televised radio wave signals between 2 and 7. The purpose of 6 is also to relay televised fiber optics cable/copper cable signals between 2 and 7.

There is a radio wave link between 1 and 6, and another radio wave link between 6 and 7. 6 relays television and system status signals from 1 to 7, and relays command and control signals from 7 to 1.

In this embodiment 1 is configured to communicate wirelessly with the remote base station 7 employing single point non-diversity reception techniques via a fixed point multi-directional antenna array 6. This feature set enables the complete system to be used in virtually any sport stadium or training field environment unobtrusively i.e. no underground cabling or trenching of the field, and with only a minimal amount of set-up time required prior to use.

At the time the complete system consisting of 1, 6 and 7 is initially placed into operation at a given sport stadium or training field, testing to determine the very best received signal strength, location and optimal placement of 6 relative to 1, and 7 relative to 6 is performed by field-side personnel. familiar with the system.

The aerial position of 6 mounted above 3 is set to ensure that during a typical game or training session, 7 may operate and receive the high quality mages made in real-time from 1.

In a further preferred embodiment, the present invention contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 30A and FIG. 30B and FIG. 31A and FIG. 31B and FIG. 32A and FIG. 32B and elsewhere in the present invention. In addition to adding an element to the entertainment of the TV viewing audience, the embodiment serves to provide video and sound to aid the pitchers and the pitching coaches in evaluating the quality of the pitcher's progress, prowess, fitness and "stuff".

12 is a typical static or dynamic instrumented sports paraphernalia that are televising off of the playing field simultaneously. 15 is the instrumentation package assembly inside 12.

Static instrumented sports paraphernalia are sports paraphernalia whose locations off of the playing field 3 are fixed. The instrumented pitcher's rubber and the instrumented home plate are examples of static instrumented sports paraphernalia. Dynamic instrumented sports paraphernalia are sports paraphernalia whose locations off of the playing field 3 are varying.

For example, the baseball bullpen is within the typical instrumented stadium but is located off of the playing field. In an additional preferred embodiment, the present invention contemplates at least two static instrumented sports paraphernalia televising at any one time from the bullpen i.e. the instrumented pitcher's rubber and the instrumented home plate. During practice and warm-up sessions in the bullpen, the pitchers stand on the instrumented pitcher's rubber and pitch baseballs to a catcher behind the instrumented baseball home plate. The typical instrumented sport stadium 4 is configured to handle the simultaneous television signals from a multiplicity of such static or dynamic instrumented sports paraphernalia that are off of the playing field at a multiplicity of both fixed and varying locations respectively.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 35C, the typical instrumented sports stadium satisfies all of the following further objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio and fiber optics/copper cable bidirectional antenna array relay junction, a remote base station, a bidirectional wireless radio wave communication link between the antenna array relay junction and the remote base station, a bidirectional fiber optics/copper cable communication link between the instrumented sports paraphernalia and the antenna array relay junction, a bidirectional wireless radio wave communication link between the antenna array relay junction and the instrumented sports paraphernalia, and a bidirectional fiber optics/copper cable communication link between the remote base station and the antenna array relay junction. It is an objective of the present invention to equip any sport stadium/arena with instrumented sports paraphernalia, an antenna array relay junction, wireless and/or fiber optics/copper cable communication links, and a remote base station. It is an objective of the present invention to equip any sport stadium to simultaneously wirelessly televise sports games from a multiplicity of both dynamic and static sports paraphernalia i.e. footballs, 1st, 2nd, 3rd baseball bases, pitcher's rubbers, ice hockey pucks, and baseball home plates located on the playing field to a remote base station. It is an objective of the present invention to equip any sport stadium to simultaneously wirelessly televise sports activity from a multiplicity of both dynamic and static sports paraphernalia i.e. pitcher's rubbers and baseball home plates located off the playing field to a remote base station. It is an objective of the present invention to configure and equip any sports training field to both wirelessly/and by use of fiber optics cable/copper cable, simultaneously televise sports games from a multiplicity of static sports paraphernalia i.e. 1st, 2nd, 3rd baseball bases and baseball home plates located on the playing field, to a remote base station. It is an objective of the present invention to configure and equip any sport stadium to simultaneously televise sports games using both wireless and bi-directional fiber optics/copper cable communications links from a multiplicity of static sports paraphernalia i.e. pitcher's rubbers and baseball home plates, located off the playing field i.e. pitcher's bull-pen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single dynamic instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 36A and FIG. 36B and FIG. 36C

The detailed physical elements disclosed in the instrumented baseball pitcher's rubber drawings shown in FIG. 36A and FIG. 36B and FIG. 36C are identified as follows: 1 is the y-axis of the instrumentation package assembly containing camera 35. 2 is the axis of symmetry of the instrumented baseball pitcher's rubber. 3 is the y-axis of the instrumentation package assembly containing camera 24. 4 is the rear side of the instrumented baseball pitcher's rubber. 5 is the induction coil used to charge the battery pack inside the instrumentation package assembly. 6 is the induction coil used to charge the battery pack inside the instrumentation package assembly. 7 is the plane-parallel-flat optical window. 8 is the left side of the instrumented baseball pitcher's rubber. 9 is the front side of the pitcher's rubber, 10 is the side 8 of the instrumented baseball pitcher's rubber. 11 is the central hub of the instrumentation package assembly containing the battery pack. 12 is the Type XI buffer plate assembly. 13 is the bottom of the instrumented baseball pitcher's rubber. 14 is the bellows segment of the instrumentation package assembly. 15 is the y-axis of symmetry of the instrumented baseball pitcher's rubber. 16 is the bottom of the instrumentation package assembly. 17 is an instrumentation package assembly. 18 is the top of the instrumentation package assembly. 19 is the y-axis of camera 48. 20 is the plane-parallel-flat optical window. 21 is the y-axis of the instrumentation package assembly 46. 22 is the upper protective cover plate. 23 is a lower protective cover plate. 24 is the y-axis of camera 58. 25 is a wireless radio antenna element. 26 is a wireless radio antenna element. 27 is the optical axis direction of the cameras 35, 36, and 48 and 58 before they are tilted. 28 is the z-axis of the camera 36. 29 is a wireless radio antenna. 30 is the z-axis of the instrumentation package assembly 11. 31 is a wireless radio antenna. 32 is the end of the instrumented baseball pitcher's rubber. 33 is a microphone. 34 is a microphone. 35 is a camera. 36 is a camera. 37 is a camera lens. 38 is a camera lens. 39 is a wireless radio antenna element. 40 is the bellows segment of the instrumentation package assembly. 41 is the gas valve. 42 is an access lid heat sink. 43 is the microphone. 44 is the microphone. 45 is a wireless radio antenna. 46 is an instrumentation package assembly. 47 is the bottom of the instrumentation package assembly. 48 is a camera. 49 is the bellows segment of the instrumentation package assembly. 50 is the optical axis of camera 48. 51 is the induction coil used to charge the battery pack 72. 52 is the z-axis of the instrumentation package assembly 46 and the instrumented baseball pitcher's rubber. 53 is an access lid heat sink. 54 is the optical axis of camera 58. 55 is the induction coil used to charge the battery pack 72. 56 is the bellows segment of the instrumentation package assembly. 57 is the gas valve. 58 is a camera. 59 is the Type XI buffer plate assembly. 60 is the central hub of the instrumentation package assembly containing the battery pack. 61 is a wireless radio antenna. 62 is a microphone. 63 is the upper protective cover plate. 64 is the plane-parallel-flat optical window. 65 is a camera lens. 66 is a camera lens. 67 is the plane-parallel-flat optical window. 68 is the encapsulating rubber material that fills the instrumented baseball pitcher's rubber. 69 is a microphone that is flush with the top surface 8 of the instrumented baseball pitcher's rubber. 70 is the microphone cable that connects the microphone 69 to the microphone connector 71. 71 is the microphone connector. 72 is the battery pack. 73 is the optical axis direction of the cameras 35, 36, and 48 and 58 after they are tilted together. 74(not shown). 75 is the fiber optics cable/copper cable connector. 76 is the fiber optics cable/copper cable connector. 77 is the slotted opening in the bottom of the instrumented baseball pitcher's rubber for the fiber optics cable/copper cable access. 78 is the slotted opening in the bottom of the instrumented baseball pitcher's rubber for the fiber optics cable/copper cable access. 79 is a wireless radio antenna. 80 is a microphone. 81 is a microphone. 82 is a microphone. 83 is a microphone. 84 is a microphone. 85 is a microphone. 86 is a microphone. 87 is a microphone. 88 is a microphone. 89 is a microphone. 90 is a microphone. 91 is a microphone. 92 is a microphone. 93 is a microphone. 94 is a microphone. 95 is a microphone. 96 is a microphone.

FIG. 36A is a top view of the instrumented baseball pitcher's rubber.

FIG. 36B is a side view of the instrumented baseball pitcher's rubber.

FIG. 36C is an end view of the instrumented baseball pitcher's rubber.

Referring to drawings FIG. 36A and FIG. 36B and FIG. 36C, in a preferred embodiment, the present invention contemplates an instrumented baseball pitcher's rubber, which when stationed on any baseball playing field at any traditional pitcher's rubber location on the baseball diamond, can wirelessly and autonomously televise baseball games from its cameras and microphones under the command and control of the remote base station. Each instrumented baseball pitcher's rubber is equipped with two instrumentation package assemblies 17 and 46 which are comprised of four instrumentation package assembly elements 14, 40, 49, and 56. The instrumentation package assembly elements 14, 40, 49, and 56 contain electronics which channels the video from the four cameras 35, 36, 48, 58 and twenty three microphones 33, 34, 43, 44, 62, 69, 80, 81, 82, 83, 84, 85, 86, 87, 88, 89, 90, 91, 92, 93, 94, 95, 96 to radio antennas 25, 26, 29, 31, 39, 45, 61, 79 from which the signals are transmitted wirelessly to the remote base station via the antenna relay junction in the sports stadium. The remote base station and antenna relay junction are disclosed in FIG. 30A and FIG. 30B, and FIG. 31A and FIG. 31B, and FIG. 32A and FIG. 32B, and FIG. 35A, and FIG. 35B, and FIG. 35C. Among its many functions, the remote base station processes the signals and broadcasts 3D pictures and surround sound to the TV viewing audience.

Additionally, referring to drawings FIG. 36A and FIG. 36B and FIG. 36C, in a preferred embodiment, the present invention contemplates an instrumented baseball pitcher's rubber, which when stationed on any baseball playing field at its traditional location on the baseball diamond can wirelessly and autonomously stream baseball games onto the internet. Each instrumented baseball pitcher's rubber is equipped with two instrumentation package assemblies 11 and 46 which are each comprised of two instrumentation package assembly elements 14, 40, 49, 56 respectively. Each instrumentation package assembly element 14, 40, 49, 56 contains an electronics package unit which channels the video from cameras 35, 36, 48, 58 to radio antennas 25, 26, 29, 31, 39, 45, 61, 79 from which the signals are transmitted wirelessly to a mobile broadband tower. The electronics package unit also channels the audio from microphones 33, 34, 43, 44, 62, 69, 80, 81, 82, 83, 84, 85, 86, 87, 88, 89, 90, 91, 92, 93, 94, 95, 96 to radio antennas 25, 26, 29, 31, 39, 45, 61, 79 from which the signals are transmitted wirelessly to a mobile broadband tower. The electronic package unit electronics are disclosed in FIG. 11A. The mobile broadband tower is shown in FIG. 11B. Also, FIG. 11B shows the architecture of the streaming system that conveys high definition video and multi-dimensional audio from the instrumented baseball pitcher's rubber.

Referring to the preferred embodiment disclosed in FIG. 36A and FIG. 36B and FIG. 36C, an instrumented baseball pitcher's rubber equipped for bi-directional wireless radio wave 3-D stereo television and/or bi-directional fiber optics cable/copper cable 3-D stereo television operation, employing single point non-diversity communication techniques and/or multi point diversity communication techniques, is specified. The instrumented baseball pitcher's rubber is equipped to be enabled, commanded and controlled by administrative data conveyed simultaneously from the remote base station utilizing both bi-directional wireless radio wave and bi-directional fiber optics cable/copper cable communication. The remote base station is disclosed in FIG. 30A and FIG. 30B, and FIG. 31A and FIG. 31B, and FIG. 32A and FIG. 32B, and FIG. 35A, and FIG. 35B, and FIG. 35C.

A conventional baseball pitcher's rubber is traditionally considered to be sport's paraphernalia. It is a white rubber slab that is six inches wide by two feet long. The instrumented baseball pitcher's rubber is instrumented sports paraphernalia. The instrumented baseball pitcher's rubber contains two instrumentation package assemblies 17 and 46 inside it. The outward appearance of the instrumented baseball pitcher's rubber is made identical to the conventional baseball pitcher's rubber so it will not be obtrusive to the game or to the players. The instrumented baseball pitcher's rubber material 68 is white rubber. The instrumented baseball pitcher's rubber sits on the baseball diamond at its traditional location at the pitcher's mound. The instrumented baseball pitcher's rubber is two feet long, six inches front to back wide, and lies with its top surface 8 flush with the ground of the pitcher's mound. Its front edge 9 faces the catcher and the batter.

Cameras 35 and 36 form a 3-D stereo camera pair. Cameras 48 and 58 form a 3-D stereo camera pair. Each of the two 3-D stereo camera pairs comprised of cameras 35, 36 and cameras 48 and 58 respectively are tilted toward the catcher by the same tilt angle. The tilt angle is the difference between 73 and 27. The distance between 4 and 5 is six inches. The distance between 10 and 32 is two feet.

The two instrumentation package assemblies 17 and 46 are identical to one another, and are disclosed in FIG. 20A and FIG. 20B and FIG. 20C.

Preferred embodiments specifying the fiber optics/copper cable transmission link are disclosed in FIG. 31A and FIG. 31B, and FIG. 32A and FIG. 32B, FIG. 35B, and FIG. 35C.

The preferred embodiment specifying the wireless radio transmission link is disclosed in FIG. 30A and FIG. 30B, and FIG. 35C.

The instrumented baseball pitcher's rubber is instrumented with two identical instrumentation package assemblies disclosed in FIG. 20A and FIG. 20C. Details of instrumentation package assembly elements are shown in FIG. 19D.

The present preferred embodiment shown in FIG. 36A and FIG. 36B and FIG. 36C provides the TV viewing audience with vantage points from two separate 3-D stereo camera pairs whose instrumentation package assemblies 17 and 46 are spaced approximately ten to fourteen inches apart. The distance between the centerlines 30 and 52 of the two instrumentation package assemblies 17 and 46 is chosen to separate the two 3-D stereo camera pairs so that there is one pair at either end of the instrumented baseball pitcher's rubber. If one of the 3-D stereo camera pairs is fouled by dirt and debris, then the other one will be available to televise the event.

The fiber optics/copper cable transmission link is disclosed in the preferred embodiment shown in FIG. 31A and FIG. 31B. The fiber optics/copper cable transmission link is also disclosed in two another preferred embodiments shown in FIG. 32A and FIG. 32B, and FIG. 32C.

The instrumented baseball pitcher's rubber employs two instrumentation package assemblies that are substantially identical to the instrumentation package assembly shown in FIG. 20A and FIG. 20B and FIG. 20C. Each of the instrumentation package assemblies uses the Type XI buffer plate assembly shown in FIG. 13A and FIG. 13B and FIG. 13C. Details of the instrumentation package assembly elements are shown in FIG. 19D.

It is understood that as the state of the art in TV camera technology advances, there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their use now and in the future.

Referring to the disclosed instrumented baseball pitcher's rubber shown in FIG. 36A and FIG. 36B and FIG. 36C, the instrumented baseball pitcher's rubber has two instrumentation package assemblies 17 and 46 mounted inside the instrumented baseball pitcher's rubber. Details of instrumentation package assembly are shown in FIG. 13A and FIG. 13B and FIG. 13C. Except for the optical windows, the outer appearance of the instrumented baseball pitcher's rubber and the conventional baseball pitcher's rubber are identical, both being made of the same white rubber material 68 having the same size, shape, color and texture. Except for the four small inconspicuous optical windows 7, 20, 67 and 64 on the top 8, both the instrumented baseball pitcher's rubber and the conventional baseball pitcher's rubber have the same outward appearance as seen by the player's.

Each of the instrumentation package assemblies 17 and 46 carries two CCD sensor arrayed cameras and two microphones. A third microphone is mounted above each of the instrumentation package assemblies through the top 8 of instrumented baseball pitcher's rubber. Each of the microphones in the top 8 is connected by an electrical cable to a cable connector on each of the instrumentation package assemblies. The two cameras in each of the instrumentation package assemblies are arranged side by side and form a 3-D stereo camera pair. The two cameras are separated by an interpupillary distance.

The linear distance separation of the optical axes of the two camera lenses that make up a stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

It is understood that other alternative interpupillary distances may be used to produce other alternative 3-D effects. For example, larger interpupillary distance will produce more striking 3-D effects.

The two cameras 35 and 36 that form one of the 3-D stereo camera pairs have optical windows 20 and 7 respectively. The interpupillary distance is the distance between the two camera's 35 and 36 optical axes. The cameras 35 and 36 that form the 3-D stereo camera pair, 35 and 36 look upward from the top of the instrumented baseball pitcher's rubber along their common line of sight 73 which is tilted relative to the normal 27 to the top 8 of the instrumented baseball pitcher's rubbers.

The two cameras 48 and 58 that form one of the 3-D stereo camera pairs have optical windows 67 and 20 respectively. The interpupillary distance is the distance between the two camera's 48 and 58 optical axes. The cameras 48 and 58 that form the 3-D stereo camera pair, 48 and 58 look upward from the top of the instrumented baseball pitcher's rubber along their common line of sight 73 which is tilted relative to the normal 27 to the top 8 of the instrumented baseball pitcher's rubbers.

The instrumented baseball pitcher's rubber has four sides. Side 9 faces the catcher. Side 4 faces $2^{nd}$ base. The top 8 of the instrumented baseball pitcher's rubber sits horizontally on the baseball playing field, and is made level with the playing field as is customary. The bottom 13 of the instrumented baseball pitcher's rubber is buried underneath the ground of the playing field.

In a preferred embodiment, a fiber optics cable/copper cable bi-directional communications link is buried underneath the ground of the playing field beneath the pitcher's mound under the instrumented baseball pitcher's rubber. Refer to FIG. 31A and FIG. 31B, and FIG. 32A and FIG. 32B, FIG. 35B, and FIG. 35C. The fiber optics cable/copper cable is passed through the openings 77 and 78 in the bottom of the instrumented baseball pitcher's rubber and connected to the instrumented baseball pitcher's rubber via the two fiber optics cable/copper cable connectors 75 and 76.

The z-axis 30 is perpendicular to the top 8 of the instrumented baseball pitcher's rubber. The z-axis 52 is perpendicular to the top 8 of the instrumented baseball pitcher's rubber. The line of sight direction 73 of the four cameras 35, 36, 48 and 58 that form the two 3-D stereo camera pairs is tilted forward toward the catcher in order that the televised video from both 3-D stereo camera pairs show the viewers the images of the catcher and the batter closer to the center of the letter box picture format as the baseball is pitched from the pitcher to the batter. In FIG. 49D the line of sight direction 24 is tilted toward the pitcher. The two cameras 35 and 36 that form the 3-D stereo camera pair 35 and 36 and the two cameras 48 and 58 that form the 3-D stereo camera pair 48 and 58 are identical to each other. The two cameras 35 and 36 use the same identical lenses 37 and 38. The two cameras 48 and 58 use the same identical lenses 65 and 66.

In one preferred embodiment, the lens pair 37 and 38 is identical to the lens pair 48 and 58.

In another preferred embodiment, the lens pair 37 and 38 is different than the lens pair 48 and 58. This enables the cameraman to get different shots from the two 3-D stereo camera pairs.

In a preferred embodiment, lenses 37 and 38 are extremely wide angle lenses. These lenses have nearly 180 degree fields of view. It is noted that in other preferred embodiments, other lens types can be employed with other fields of view. An advantage of the extremely wide angle lenses is that even though the cameras are pointed skyward, they can see right down to the outfield horizon which is at the edge of their fields of view. The view that the TV audience will get is similar to the view that you would get if you were laying flat on your back on the playing field, with your head on the instrumented baseball pitcher's rubber, and your feet facing the catcher. Your two eyes would be analogous to either one of the 3-D stereo camera pairs inside the instrumented baseball pitcher's rubber. For the present invention we herein define side 10 as the right hand side of the instrumented baseball pitcher's rubber, and side 32 as the left hand side of the instrumented home plate.

The two cameras 35 and 36 that form the 3-D stereo camera pair have optical windows 7 and 20. The two cameras 35 and 36 that form the 3-D stereo camera pair have the same line of sight 73. The two cameras 35 and 36 that form the 3-D stereo camera pair have optical windows 7 and 20. The line of sight 73 of the 3-D stereo camera pair is tilted relative to axes direction 27. Axis direction 27 is perpendicular to the top 8 of the instrumented baseball pitcher's rubber.

The two cameras 48 and 58 that form the 3-D stereo camera pair have optical windows 67 and 64. The two cameras 48 and 58 that form the 3-D stereo camera pair have the same line of sight direction 73. The two cameras 48 and 58 that form the 3-D stereo camera pair have optical windows 67 and 64. The line of sight direction 73 of the 3-D stereo camera pair is tilted relative to axis direction 27. Axis direction 27 is perpendicular to the top 8 of the instrumented baseball pitcher's rubber.

The interpupillary distance is the distance between 27 and 28, and between 50 and 54, which is the distance between the optical axes of camera lenses 37 and 38, and the distance between the optical axes of camera lenses 66 and 65. The line of sight direction 73 of the cameras 35 and 36, and cameras 48 and 58, that form the two 3-D stereo camera pairs are tilted away from the vertical.

The line of sight direction 73 of the cameras 35 and 36, and cameras 48 and 58 that form the two 3-D stereo camera pairs is tilted away from the vertical and toward the catcher. The line of sight directions of the cameras 35 and 36 and cameras 48 and 58 that form the two 3-D stereo camera pairs are tilted away from the vertical and away from the pitcher.

The two cameras 35 and 36 are identical to each other. The two cameras 35 and 36 use the same two lenses 37 and 38. The two cameras 48 and 58 are identical to each other. The two cameras 48 and 58 use the same two lenses 65 and 66. At times, in order to produce more dramatic shots of the pitcher or the catcher during the game, the cameraman may want to pre-orchestrate the positioning of the 3-D camera's line of sight 73 before the baseball game begins. This can be accomplished by pre-tilting, and encapsulating in-place, the 3-D cameras 35 and 36, and 48 and 58 inside the instrumented baseball pitcher's rubber in advance of the game when the field is being prepared before the game. The 3-D stereo camera's line of sight 73 is tilted toward the catcher in order to raise the image of the catcher above the lower edge of the TV picture frame and produce a larger picture of the catcher. This produces the dramatic effect of making the catcher seem closer to the TV viewing audience. This effect makes the catcher and his mitt seem closer to the TV viewing audience. If the batter swings at a pitch and misses, the TV viewing audience will see the baseball hit the crater in the catcher's mitt as it is being caught. The TV viewing audience will hear the scraping of the pitcher's feet on the mound and on the pitcher's rubber as he winds up and throws the ball.

Each of the four cameras inside the instrumented baseball pitcher's rubber is aligned within their respective instrumentation package assemblies 11 and 46 so that each of the cameras yields televised upright images of objects that appear between the center and the bottom edge of the TV picture frame. The four cameras are aligned inside their instrumentation package assemblies so that the TV viewing audience sees the batter, catcher and umpire in the bottom half of the TV picture frame.

When the pitcher throws the baseball to the catcher, the TV audience will see the baseball approaching the bottom half of the TV picture from near the center of the picture. The size of the baseball grows smaller as it gets further from the instrumented baseball pitcher's rubber and gets closer to the instrumented baseball home plate and the batter. Since the cameras are directly below the pitcher, an image of the pitcher's chin will occupy near the center of the TV picture frame. The size of the baseball will appear to be at its biggest as it is pitched from directly over the instrumented baseball pitcher's rubber. The TV audience will hear the whoosh of air in microphones 43 and 69 as the pitcher pitches the baseball. The TV audience will see the batter swing his bat to strike the baseball as it whizzes by. The TV audience will hear the loud crack of the batter's bat in microphones 43 and 69 as the batter hits the baseball. The sounds received from each of the microphones by the remote base station are processed using special software to produce surround sound which is broadcast to the TV viewing audience. The TV audience will see the baseball, as the pitcher sees it, as it is hit by the bat. The TV audience will see the baseball as it travels outward from the batter's bat onto the playing field toward the pitcher, as the pitcher sees it. The TV audience will see the baseball get larger as it gets closer to the pitcher and appears to hit the TV viewers in 3-D.

The audience will see the batter drop the bat and scramble toward first base on the left hand side of the screen. The TV audience will hear the rustle and scraping of the pitcher's cleats on the ground in microphones 33, 34, 44 and 62 as he scrambles to field the ball. In summary, the instrumented baseball pitcher's rubber provides video and sound to the viewing audience that is so exciting and realistic that it makes the individual members of the audience feel that they are at the pitcher's mound and in the game. In many ways this is more exciting than viewing the game in person from the stands of the baseball stadium. Therefore, the instrumented baseball pitcher's rubber not only provides a step forward in entertainment, but it also provides a great training tool to prospective baseball players by giving them the true life visual and auditory sensations and feelings of being in the game without actually being there.

The instrumented baseball pitcher's rubber is symmetrical about its x-axis 15. The instrumented baseball pitcher's rubber has four sides 4, 9, 10, and 32 and a top 8 and bottom 13. The top 8 of the instrumented baseball pitcher's rubber sits horizontally on the baseball playing field. The four holes in the top 8 of the instrumented baseball pitcher's rubber are made just large enough to prevent vignetting of the cameras field of view through the optical windows 7, 20, 64 and 67. Camera's 35 and 36 are mounted inside the instrumentation package assembly 11. Camera's 48 and 58 are mounted inside the instrumentation package assembly 46. The cameraman has a choice of camera lenses to use. Utilization of extremely wide angle lenses allows the TV viewing audience to see past the catcher and down behind the catcher.

Tilting of the two 3-D stereo camera pairs line of sight direction 73 is accomplished by using the bellows sections 14 and 40, and 49 and 56 of the instrumentation package assemblies 11 and 46 respectively. The bellows sections 14, 40, 49 and 56 are flexible. The bellows sections 14 and 40, which connect the buffer plate assembly 12 to the instrumentation package assembly 11, is bent to the desired tilt angle for the camera's 35 and 36 line of sight direction 73. The bellows sections 49 and 56, which connect the buffer plate assembly 59 to the instrumentation package assembly 46, is bent to the desired tilt angle for the camera's 48 and 58 line of sight direction 73.

After the desired tilt angle is set by bending the bellows sections, all the components inside the instrumented baseball home plate are encapsulated in place using the white rubber encapsulating compound 68. The tilted line of sight 73 is common for all four cameras 35, 36, 48 and 58, their lenses 37, 38, 65 and 66, their optical window's 7, 20, 64 and 67, their buffer plates 12 and 59, and their bellows sections 14, 40, 49, and 56.

Keeping in mind that the line of sight 73 is common for camera's, lenses, optical window's, and buffer plates, it follows from the specification discussed above that the line of sight 73 of cameras, lenses, optical windows, and buffer plates can be tilted in a like manner, towards or away from the catcher as well, by bending the bellows sections as before. Tilting 73 towards the batter would bring the image of the batter closer to the center of the TV picture frame and make him look closer and larger. Tilting 73 away from the batter would move the image of the batter away from the center of the TV picture frame and make him look further away and smaller. Utilization of extremely wide angle lenses allows the TV viewing audience to see down past the batter and behind the batter.

When a player is running toward the instrumented baseball home plate from third base, the two 3-D stereo camera pairs in the instrumented baseball pitcher's rubber can see where he is coming from. The cameras can see the player as he runs and touches the instrumented baseball home plate. The cameras can see the player as he is sliding into the instrumented baseball home plate. The cameras can see the catcher as he tags the player before the player touches the instrumented baseball home plate and scores a run. From the vantage point of the instrumented baseball pitcher's rubber, the viewing audience can see the strained player darting for the instrumented baseball home plate. The viewing audience can see details of the pitcher as he attempts to cover the play. The viewing audience can see a close-up of the pitcher's attempt to cover the play. As the baseball is thrown home, the viewing audience can see the catcher reach down for it close to the plate. The camera's vantage point at the instrumented baseball pitcher's rubber gives the audience a viewing angle of the game never seen before by television viewing audiences. The instrumented baseball pitcher's rubber's cameras gives the TV viewing audience unending contemporaneous shots that get across a sense of the action of being there—like a player in the game that prior art cameras looking on from their disadvantaged viewing points from outside the playing field cannot get across.

In the present preferred embodiment, cameras 35, 36, 48 and 58 when using common extremely wide angle lenses 37, 38, 65 and 66 with zoom capability, even though the cameras are pointed from the top 8 of the instrumented baseball pitcher's rubber, they can see past the catcher right down to the horizon because of their near 180 degree field of view. This is a distinct advantage of extremely wide angle lenses over other types of lenses. However, it should be pointed out that the cameraman may elect to use a variety of other camera lens pairs with different capabilities depending on the visual effects he wishes to convey to the TV viewing audience. For example, the cameraman may elect to use a camera lens pairs with a narrower more highly magnified field of view in order to concentrate the attention of the TV viewing audience on the pitcher's taut and sweaty stubble filled face.

The instrumentation package assemblies 11 and 46 are supported inside the instrumented baseball pitcher's rubber at their upper ends by their buffer plates 12 and 59 respectively. The instrumentation package assemblies 11 and 46 and their buffer plates 12 and 59 are permanently encapsulated inside of the instrumented baseball home plate as the encapsulating material 68 around them cures. After the encapsulating material 68 sets, it becomes a weatherproof shock absorbing padding material. The small diameter ends of the buffer plates 12 and 59 peer through the top 8 and upper protective cover plates 22 and 63 of the instrumented baseball pitcher's rubber. The small diameter ends of the buffer plates are sealed and molded into the shock absorbing padding 68 around their circumferences. The encapsulating material 68 is a permanent resilient compound that is air-tight and water-tight.

The buffer plates are encapsulated by the encapsulating material 68 inside the instrumented baseball pitcher's rubber. Synthetic rubber is another example of encapsulating material besides natural rubber that is used. The mechanical axes of the bores in the buffer plates are tilted to the top 8 of the instrumented baseball pitcher's rubber so that they have a common line of sight directions 73. The ends of the instrumentation package assemblies 11 and 46 are inserted into the bores in the buffer plates 12 and 59, thereby tilting the mechanical axis of the ends of instrumentation package assemblies 11 and 46 to the top 8 of the instrumented baseball pitcher's rubber.

The buffer plates 12 and 59 act as mechanical bearings for the instrumentation package assemblies 11 and 46, and thereby restrict and restrain the motion of the instrumentation package assemblies 11 and 46 inside the instrumented baseball pitcher's rubber. Besides functioning as bearings to support the instrumentation package assemblies 11 and 46 within the instrumented baseball pitcher's rubber, the buffer plates provides a hollow portal through which the cameras inside the instrumentation package assemblies 11 and 46 may peer out of the instrumented baseball pitcher's rubber at the baseball playing field along line of sight direction 73.

Except for the four small holes in the top 8 used for the optical windows, the instrumented baseball pitcher's rubber's outward appearance looks substantially the same as the conventional professional league baseball pitcher's rubber and the conventional high school league baseball pitcher's rubber, and plays the same as these rubbers, and meets the official requirements for these venues and is interchangeable with them in these venues as substitutes.

The buffer plates 12 and 59 are Type XI buffer plates and are disclosed in FIG. 13A and FIG. 13B and FIG. 13C. The buffer plate 12 and 59 are molded into the instrumented baseball pitcher's rubber using the white rubber encapsulating material 68. The small diameter end of the buffer plates 12 and 59 pass through the upper cover protective cover plates 22 and 63 and protrude through the molded rubber top 8 of the instrumented baseball pitcher's rubber. The buffer plates carry the optical windows 20, 7, 64 and 67. The optical windows tilt with their buffer plates. The flat surfaces of optical windows 20, 7, 64 and 67 are tilted and made relatively flush with the top 8 of the instrumented baseball pitcher's rubber.

The cameras 35 and 36, and 48 and 58 are aligned together within their respective instrumentation package assemblies 11 and 46 respectively so that they yield wirelessly transmitted upright 3-D images of objects that appear between the center and bottom of the TV picture frame. This is accomplished in any one of two different modes. Each of these two modes conveys its own spectacular viewing angle of the game to the TV viewing audience. Each of these two modes is achieved by physically rotating the cameras and their lenses together about their optical axes respectively by using an actuating device that is mechanically coupled to the cameras and lenses inside the instrumentation package assemblies. The mechanical actuating device has two mechanical stops that are mechanically detented 180 degrees apart from one another. The mechanical actuating devices are housed within their camera's instrumentation package assemblies. The mechanical actuating device can rotate the cameras and lenses together to any one of the two stops about their optical axes respectively. The cameraman in the remote base station selects which of the two modes is to be employed, and sends a signal to the instrumentation package assemblies to set the cameras and lenses to the desired mode he selected.

In the first mode, the cameras and lenses are aligned in rotation about their optical axes respectively inside its instrumentation package assemblies by the mechanical actuating devices so that the TV viewing audience sees the horizon near the bottom edge of the 3-D TV picture frame. This is equivalent to what a person would see visually if he were laying flat down on the playing field with his head resting on the instrumented baseball pitcher's rubber and looking upward with his feet facing the catcher. The batter appears standing upright in the picture frame with his head near the bottom of the SD/HD letterbox 3-D TV picture frame.

In the second mode, the cameras and lenses are aligned in rotation inside their instrumentation package assemblies by the mechanical actuating device so that the TV viewing audience sees the catcher squatting upright with his feet near the bottom of the TV picture frame. This is equivalent to what a person would see visually if he were laying flat down on the playing field with his head resting on the instrumented baseball pitcher's rubber and looking upward with his feet facing the catcher at the apex of the instrumented baseball home plate).

Since the TV picture that the TV audience sees is in 3-D, the TV audience will duck their heads as the size of the baseball grows larger as it gets closer to the instrumented baseball pitcher's rubber and the pitcher.

The instrumented baseball pitcher's rubber has two upper protective cover plates 22 and 63 embedded and molded into it. The protective cover plates 22 and 63 are on the top of the instrumented baseball pitcher's rubber. The outer body of the top of the protective cover plates are made spherically dome shaped so their edges do not come close to the top 8 of the instrumented baseball pitcher's rubber to protect the pitcher from hitting their edges. The entire body of the bottom protective cover plate 23 is made flat and has rounded edges like the edges on the top protective plate 22. Its purpose is to protect the instrumentation package assemblies and prevent the instrumented baseball pitcher's rubber from bending to maintain camera alignment.

The materials chosen for the protective cover plates 22, 63 and 23 in the present preferred embodiment are polycarbonates, ABS, or fiber reinforced plastics. Although a variety of other materials would function almost equally as well, these have an advantage in that they are lightweight and stiff, enabling the thickness of the protective cover plates 22, 63 and 23 to remain thin while still delivering the significant stiffness needed to perform their mechanical shielding function in the limited space they can occupy within the instrumented baseball home plate. These materials have an additional advantage in that they are transparent to the transmitted and received radio waves which need to move to and from the antennas inside the instrumented baseball home plate without absorption or reflection.

The instrumentation package assemblies are sandwiched between the top and bottom protective cover plates. The purpose of these protective cover plates is to act as a shield to protect the instrumentation package assemblies from being damaged during the game by the pitcher stepping on the instrumented baseball pitcher's rubber. During the normal course of the game, the top of the instrumented baseball pitcher's rubber will be hit and crushed by the pitcher and by his equipment. The protective cover plates 22 and 63 protect the instrumentation package assemblies within the instrumented baseball pitcher's rubber from physical damage due to these hits.

Around the top, bottom and sides of the instrumented baseball pitcher's rubber, the space between the outer covering and the protective cover plates is filled with white rubber encapsulating material 68. When cured, this encapsulating material 68 acts as cushioning to absorb shock and vibration to the instrumented baseball pitcher's rubber. The molting material 68 encapsulates the upper and lower protective cover plates 22, 63 and 23 and maintains their positions inside the molded instrumented baseball home plate. The space between the protective cover plates 22, 63 and 23 and the instrumentation package assemblies 11 46 is also filled with the same encapsulating material 68. When cured, this encapsulating material 68 acts as cushioning to absorb shock and vibration to the instrumentation package assemblies. The molding material 68 encapsulates the instrumentation package assemblies inside the instrumented baseball pitcher's rubber and thereby maintains their positions inside the molded instrumented baseball pitcher's rubber The top protective cover plates 22 and 63 are spherically dome shaped in their outer regions. The major purpose of making them spherically dome shaped is to provide maximum protection for the optical windows 20, 7, 64 and 67 whose surfaces are at the very top 8 of the instrumented baseball pitcher's rubber. The upper protective cover plates are flat in their inner regions close to the optical windows. The flat shape enables the upper protective cover plates to surround the optical windows at the top 8 of the instrumented baseball pitcher's rubber where the optical windows are most likely to be exposed to the greatest threat of damage due to hits to the top 8 of the instrumented baseball pitcher's rubber. The upper protective cover plates are buried in molding material 68 at the center top 8 of the instrumented baseball pitcher's rubber around the optical windows by approximately 1/32 to 1/8 inch below the top 8. The dome shape enables the upper protective cover plates to come very close to the top 8 of the instrumented baseball pitcher's rubber where the players will have only grazing contact with its curved surface if they crash into the instrumented baseball pitcher's rubber, thereby eliminating the threat of injury to the players if they hit the top of the instrumented baseball pitcher's rubber. The spherical shape of the protective cover plates causes their edges to be curved downward and away from the top of the outer skin and places them approximately over 1 inch below the top surface 8 of the instrumented baseball pitcher's rubber.

The lower protective cover plate 23 is entirely flat and is buried in encapsulating material 68 over an inch or more above the bottom surface of the instrumented baseball pitcher's rubber. The lower protective cover plate spans the distance between one side of the instrumented baseball pitcher's rubber and the other. It physically supports the bottom of each of the instrumentation package assemblies containing the two 3-D stereo camera pairs and contributes toward holding them in optical and mechanical alignment with one another. The body of the lower protective cover plate 23 is made flat because it is buried in the ground and there is no danger of the players coming into violent contact with it. The flat shape is easier to make and less expensive to manufacture. Its thickness is also made in the range of approximately 1/8 to 1/2 inches. However, its thickness is not physically restrained because of its location, as is the case with the upper protective cover plates. In all cases, the edges of the protective cover plates 22, 63 and 23 come within no less than 1/4 inches from all sides of the instrumented baseball pitcher's rubber.

Each of the microphones 43 and 69 listens for sounds from the outside vicinity of top 8 of the instrumented baseball pitcher's rubber. Each of the microphones 33, 34, 44 and 67 listens for sounds of impacts conducted from the ground and body of the instrumented baseball pitcher's rubber. The condenser microphones enable the viewing audience to hear real-time contacts, impacts and shocks to the instrumented baseball pitcher's rubber and to the ground around it.

Microphones 43 and 69 protrude through holes in the top 8 of the instrumented baseball pitcher's rubber. Microphones 43 and 69 are mounted above the upper protective cover plates and connected by cables from each to an electrical connector on each of the instrumentation package assemblies respectively.

Microphones 80, 81, 82, 83, 84, 85, 86, 87, 88, 89, 90, 91 and 92 are flush with 8 and are mounted above the upper protective cover plates and connected by cables from each to an electrical connector on each of the instrumentation package assemblies respectively. Each of these microphones listens for sounds from the outside vicinity of 8 of the instrumentation modules.

In a further preferred embodiment, the present invention contemplates an instrumented baseball pitcher's rubber, which when stationed off of any baseball playing field i.e. at the traditional pitcher's mound location in the pitcher's bullpen, can wirelessly by RF radio and/or by fiber optics cable and/or by coaxial copper cable, autonomously televise baseball pitching practice and warm-up sessions under command and control of the remote base station. The remote base station is disclosed in FIG. 30A and FIG. 30B and FIG. 31A and FIG. 31B and FIG. 32A and FIG. 32B, and FIG. 35A and FIG. 35B, and FIG. 35C and elsewhere in the present invention. In addition to adding an element to the entertainment of the TV viewing audience, this embodiment serves to aid the pitchers and the pitching coaches in evaluating the quality of the pitcher's progress, prowess, fitness and "stuff".

The instrumented baseball pitcher's rubber is an example of static instrumented sports paraphernalia. For televising games from off the playing field, for example in the pitcher's bullpen, refer to FIG. 35C which is a top view of a general sports stadium that has been configured and equipped for use with both static and dynamic instrumented sports paraphernalia, using both bi-directional wireless RF radio wave communication links and/or bi-directional fiber optics cable communication links and/or coaxial copper cable communication links.

In another preferred embodiment, the interpupillary distances may be increased by electronically forming a 3-D stereo camera pair with cameras 35 and 48.

In another preferred embodiment, the interpupillary distances may be increased by electronically forming a 3-D stereo camera pair with cameras 35 and 58.

In another preferred embodiment, the interpupillary distances may be increased by electronically forming a 3-D stereo camera pair with cameras 36 and 48.

In another preferred embodiment, the interpupillary distances may be increased by electronically forming a 3-D stereo camera pair with cameras 36 and 58.

Electronically, mechanically and optically all four of these 3-D stereo camera pairs operate simultaneously with the 3-D stereo camera pair formed with cameras 36 and 35, and the 3-D stereo camera pair formed with cameras 48 and 58. An advantage of these four embodiments in certain venues is that the 3-D effect to the TV viewers is magnified in these four alternative embodiments relative to the present embodiment. This occurs because their interpupillary distances are larger due to the increased spatial separations across the instrumented baseball pitcher's rubber between the cameras in the electronically formed 3-D stereo camera pairs. Another advantage occurs when an optical window is obscured by dirt; the remaining cameras can be paired to continue to produce 3-D imagery for the TV viewers. A disadvantage of this arrangement is that the alignment of the cameras in these 3-D stereo camera pairs is more difficult to maintain owing to the increased distance between the cameras. In each of these four embodiments the four cameras are identical to one another, the four camera lenses are identical to one another, and the four line of sight directions of the cameras are identical to one another. The SD/HD letter box picture formats of cameras 43 and 44 are aligned together. The SD/HD letter box picture formats of cameras 41 and 42 and 43 and 44 are aligned together so that any two of the four cameras can be a 3-D stereo camera pair.

Charging the battery pack in the pitcher's rubber is accomplished in the same fashion as charging the instrumented baseball home plate and the instrumented baseball bases as is shown in FIG. 23A and FIG. 23B and FIG. 23C, and FIG. 23E and FIG. 23F and FIG. 23G. The charging station unit is placed on the top of the instrumented baseball pitcher's rubber in order to inductively couple electricity into the coils of the instrumented baseball pitcher's rubber to charge its battery packs.

The cameraman, in the remote base station, software selects either the wireless mode of communication, and/or the fiber optics/copper cable mode of communication between the instrumented baseball pitcher's rubber and the remote base station. The cameraman can use whichever equipment (antenna array relay junction or fiber optics cable/copper cable) that is installed in the baseball stadium with which to command and control his choice and communicate it to the instrumented baseball pitcher's rubber on the baseball stadium playing field. These choices are also physically switch selectable by the cameraman with his access through the opening in the bottom of the instrumented baseball pitcher's rubber.

The cameraman selects items from a software menu of control commands that go to the network transceiver at the remote base station that are subsequently transmitted to the instrumented sports paraphernalia (the instrumented baseball pitcher's rubber) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented sports paraphernalia that are being controlled.

In yet another preferred embodiment, the instrumented baseball pitcher's rubber shown in FIG. 36A, FIG. 36B and FIG. 36C is equipped to wirelessly stream its audio and video onto the internet.

The instrumented baseball pitcher's rubber is instrumented with instrumentation package assembly elements. The instrumentation package assembly elements are shown in FIG. 19D.

The instrumentation package assembly elements contain an electronics circuit called an electronics package unit. The electronics package unit is shown in FIG. 11A. The electronics package unit enables the instrumented baseball pitcher's rubber to communicate with and stream on the internet.

Referring to FIG. 11B, FIG. 11B shows the architecture of the streaming system that conveys high definition video and multi-dimensional audio from instrumented baseball pitcher's rubber 18, captured by the cameras and microphones contained within their instrumentation package assembly elements, to stream to an audience which may or may not have spectators 7, 8, 9 and 10 respectively present at the games but wish to subscribe and view the games remotely on their personal wireless display devices. The electronics package units inside the instrumentation package assembly elements communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the baseball playing field who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given baseball field of play currently broadcasted.

Referring to FIG. 11A, FIG. 11A is the electronics system block diagram for streaming baseball games on the internet from instrumented sports paraphernalia like instrumented baseball pitcher's rubbers. FIG. 11A shows the block diagram for the system for streaming the video and audio of baseball games captured by the cameras and microphones aboard the instrumented sports paraphernalia like instrumented baseball pitcher's rubbers. The primary component of the system for connecting the instrumented sports paraphernalia like instrumented baseball pitcher's rubbers to the internet is the electronic package unit 1. The electronics package unit 1 enables the instrumented baseball pitcher's rubbers to communicate with and stream on the internet. The electronics package unit 1 collects video and audio from the cameras 2 and microphones 3 aboard the instrumentation package assembly elements inside the instrumented baseball pitcher's rubbers, and channels the video and audio to the antenna 8 for wireless transmission to a Mobile Broadband Tower. The wireless topography for the system is shown in FIG. 11B.

The instrumented baseball pitcher's rubbers are instrumented with instrumentation package assembly elements. An example of an instrumentation package assembly element is shown in FIG. 40A, FIG. 40B and FIG. 40C. Referring to FIG. 40A, FIG. 40B and FIG. 40C, each instrumentation package assembly element is equipped typically with one electronics package unit. Each electronics package unit channels a minimum of one high definition video camera and one microphone whose captured video and audio is buffered by processing hardware following with suitable H.264/MPEG compression by compression hardware, which is and subsequently sent to an active broadband connection established by LTE/4g cellular streaming hardware and an antenna using for example Mobile Broadband Hotspot Hardware Technology. Each electronics package unit contains video processing hardware, audio processing hardware, audio and video compression hardware, 4G/LTE cellular streaming high-speed terrestrial mobile broadband service hardware, and a Wifi band hardware interface.

Referring to FIG. 11A, in some venues the internet is available to the instrumented baseball pitcher's rubbers by a fiber optics/copper cable feed buried beneath the ground of the baseball field. In venues where the internet is available by such cable, the cable feed 10 is brought up from the ground and connected to the electronic package unit 1 via 9.

In venues where the internet is available by a 4G/LTE or better equivalent Mobile Broadband Tower, such as shown in FIG. 11B, the electronic package unit accesses the internet wirelessly via its 4G/LTE cellular streaming high-speed terrestrial mobile broadband service hardware which is connected to the cellular and Wifi band antenna hardware.

Referring to the Preferred Embodiments Specified in FIG. 36A and FIG. 36B and FIG. 36C, the instrumented baseball pitcher's rubber satisfies all of the following further objectives:

It is an objective of the present invention to replace existing prior art non-instrumented baseball pitcher's rubbers that are currently on existing baseball fields with substitute instrumented baseball pitcher's rubbers. It is an objective of the present invention to instrument the baseball pitcher's rubber with four cameras, eight induction coils, four plane-parallel-flat optical windows, two central hubs of the instrumentation package assembly, two battery packs, two buffer plate assemblies, four bellows segments, two upper protective cover plates, two lower protective cover plates, eight wireless radio antenna elements, four tilted cameras, six microphones, four camera lenses, gas valves, access lid heat sinks, encapsulating rubber material, fiber optics cable/copper cable connector, and a slotted opening. It is an objective of the present invention to instrument the baseball pitcher's rubber with two instrumentation package assemblies, two buffer plate assemblies, two upper protective cover plates, two lower protective cover plates, two additional microphones, and encapsulation/molding material. It is an objective of the present invention to instrument the pitcher's mound on the baseball playing field with an instrumented baseball pitcher's rubber.

It is an objective of the present invention to televise from the pitcher's bullpen with an instrumented pitcher's rubber. It is an objective of the present invention to instrument the pitcher's bullpen with an instrumented pitcher's rubber. It is an objective of the present invention to enable an instrumented baseball pitcher's rubber, which when stationed on any baseball playing field at any traditional pitcher's rubber location, to both wirelessly and/or by using fiber optics/copper cable connectivity, autonomously televise baseball games under the command and control of a remote base station. It is an objective of the present invention to enable an instrumented baseball pitcher's rubber, which when stationed in any baseball bull pen at any traditional pitcher's rubber location, to both wirelessly and/or by using fiber optics/copper cable connectivity, autonomously televise baseball warm-up and training activity under the command and control of a remote base station.

It is an objective of the present invention to enable the cameraman in a remote base station to select either the wireless mode of communication and/or the fiber optics/copper cable mode of communication for the instrumented baseball pitcher's rubber where the cameraman can use whichever equipment (antenna array relay junction or fiber optics cable/copper cable) which is installed in the baseball stadium with which to command and control his choice and communicate it to the instrumented baseball pitcher's rubber on the baseball stadium playing field or in the bullpen, where his choices are physically switch selectable with access through the bottom of the instrumented baseball pitcher's rubber. It is an objective of the present invention to enable the cameraman in the remote base station to electronically command and control any combination of any two of the four cameras in the instrumented baseball pitcher's rubber to act as a 3-D stereo camera pair.

FIG. 37A and FIG. 37B and FIG. 37C

The detailed physical elements disclosed in the instrumented ice hockey puck drawings shown in FIG. 37A and FIG. 37B and FIG. 37C are identified as follows: 1 is the y-axis of camera 43. 2 is the y-axis of symmetry of the instrumented ice hockey puck. 3 is the y-axis of camera 44. 4 is the side of the instrumented ice hockey puck. 5 is a lower induction coil used to charge the battery pack inside the instrumentation package assembly. 6 is a lower induction coil used to charge the battery pack inside the instrumentation package assembly. 7 is a plane-parallel-flat optical window. 8 is the top of the instrumented ice hockey puck. 9 is the front side of the instrumented ice hockey puck. 10 is the side of the instrumented ice hockey puck. 11 is the central hub of the instrumentation package assembly containing the battery pack. 12 is the Type XI buffer plate. 13 is the bottom of the instrumented ice hockey puck. 14 is the bellows segment of the instrumentation package assembly. 15 is the x-axis of symmetry of the instrumented ice hockey puck. 16 is the bottom of the instrumentation package assembly. 17 is the side of the instrumentation package assembly. 18 is the top of the instrumentation package assembly. 19 is the top of the instrumented ice hockey puck. 20 is the plane-parallel-flat optical window. 21 is the front side of the instrumented ice hockey puck and faces the pitcher. 22 is the right side of the instrumented ice hockey puck. 23 is the upper protective cover plate. 24 is the lower protective cover plate. 25 is a wireless radio antenna. 26 is a wireless radio antenna. 27 is a wireless radio antenna. 28 is a wireless radio antenna, 29 is the z-axis of the camera whose optical window is 20. 30 is the z-axis of the instrumentation package assembly and the instrumented ice hockey puck. 31 is the z-axis of the camera whose optical window is 7. 32 is a fiber optics/copper cable connector in the bottom of the instrumentation package assembly. 33 is a lower induction coil. 34 is a lower induction coil. 35 is an optical window. 36 is an optical window. 37 is the z-axis of the camera whose optical window is 35. 38 is the z-axis of the camera whose optical window is 36. 39 is the bellows section of the instrumentation package assembly belonging to optical window 36. 40 is the bellows section of the instrumentation package assembly belonging to optical window 35. 41 is a camera. 42 is a camera. 43 is a camera. 44 is a camera. 45 is a camera lens. 46 is a camera lens. 47 is a camera lens. 48 is a camera lens. 49 is a microphone. 50 is a microphone. 51 is a gas valve. 52 is an access lid heat sink. 53 is a microphone. 54 is the microphone cable. 55 is the microphone connector. 56 is the battery pack. 57 is a microphone. 58 is a microphone. 59 is a microphone. 60 is a microphone. 61 is a microphone. 62 is a microphone.

FIG. 37A is a top view of the instrumented ice hockey puck.

FIG. 37B is a front view of the instrumented ice hockey puck.

FIG. 37C is a side view of the instrumented ice hockey puck.

Referring to the preferred embodiment disclosed in FIG. 37A and FIG. 37B and FIG. 37C, an instrumented ice hockey puck equipped with two wireless radio wave 3-D stereo television cameras employing single point, multi point and/or multi point diversity reception techniques is specified. The instrumented ice hockey puck is equipped to be enabled, commanded and controlled by administrative data conveyed simultaneously from the remote base station utilizing wireless radio communication. The instrumented ice hockey puck uses the instrumentation package assembly shown in FIG. 21A and FIG. 21B. The instrumentation package assembly shown in FIG. 21A and FIG. 21B uses four of the instrumentation package assembly elements shown in FIG. 19D.

A conventional ice hockey puck is traditionally considered to be sport's paraphernalia. It is a black colored disk three inches in diameter by one inch thick. The instrumented ice hockey puck is instrumented sports paraphernalia. The instrumented ice hockey puck is three inches in diameter and one inch thick. Its size, shape, color, texture, weight, dynamic playability and outward appearance are identical to the conventional regulation ice hockey pucks. The instrumented ice hockey puck contains one instrumentation package assembly 11 inside it. This is the identical instrumentation package assembly used in some instrumented baseball home plates, for example FIG. 26A and FIG. 26B and FIG. 26C. The outward appearance of the instrumented ice hockey puck is made identical to the conventional ice hockey puck so it will not be obtrusive to the game or to the players. The dynamics of the instrumented hockey puck are made identical to the dynamics of the conventional ice hockey puck. The instrumented ice hockey puck material 19 is vulcanized hard black rubber just like the conventional regulation hockey puck. The weight of the instrumented hockey puck is 5.5 to 6.0 ounces which is the regulation weight of conventional ice hockey pucks. The instrumented ice hockey puck is used during a hockey game on the hockey court/rink in an arena/stadium by the players in the same way a conventional hockey puck is used. It is a direct substitute for conventional hockey pucks. The instrumented ice hockey puck is three inches in diameter and one inch thick. The distance between the instrumented ice hockey puck's top 8 and its bottom 13 is one inch, just like the conventional regulation ice hockey pucks. 8 and 13 are flat and parallel to one another.

The instrumentation package assembly 11 is disclosed in FIG. 21A and FIG. 21B. The four identical instrumentation package assembly elements which constitute a major part of the instrumentation package assembly 11 are disclosed in FIG. 19D.

Referring to drawings FIG. 37A and FIG. 37B and FIG. 37C, in a preferred embodiment, the present invention contemplates an instrumented ice hockey puck, which when used on any hockey court can wirelessly and autonomously televise ice hockey games under the command and control of the remote base station. The remote base station is disclosed in FIG. 35A and FIG. 35C and elsewhere in the present invention.

The instrumented ice hockey puck employs a four camera instrumentation package assembly substantially identical to the instrumentation package assembly shown in FIG. 21A and FIG. 21B. Four instrumentation package assembly elements are primary parts of the instrumentation package assembly. The instrumentation package assembly uses the identical instrumentation package assembly elements disclosed in FIG. 19D. The instrumented ice hockey puck must be arranged at the beginning of the game with its top 8 facing upward from the ice with its cameras looking skyward.

The radio transmission link is similar to that disclosed in FIG. 30A and FIG. 30B except that the baseball diamond is replaced with a hockey rink in a typical instrumented sports stadium/arena. The radio transmission link is also disclosed in FIG. 35A and FIG. 35C.

As with the previous preferred embodiment shown in FIG. 26A and FIG. 26B and FIG. 26C, the present invention provides the TV viewing audience with 3-D stereo pictures and stereophonic surround sound.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented ice hockey puck shown in FIG. 37A and FIG. 37B and FIG. 37C, the instrumented ice hockey puck has one instrumentation package assembly 11 mounted inside the puck. Details of instrumentation package assembly 11 are specified in FIG. 21A and FIG. 21B. The top 8 of both the instrumented ice hockey puck and the conventional ice hockey puck are identical, having the same size, shape, color and texture.

The instrumentation package assembly 11 carries four CCD sensor arrayed cameras 41, 42, 43, and 44. The instrumentation package assembly 11 carries three microphones 49, 50, and 53. The four cameras 41, 42, 43, and 44 in the instrumentation package assembly 11 are arranged into two pairs 41, 42 and 43, 44. The imagery from each camera in the pair is combined by the processors in the remote base station to be broadcast as 3-D video to the TV viewing audience. Each camera pair effectively becomes a 3-D stereo camera pair. The first 3-D stereo camera pair is comprised of cameras 41 and 42. The second 3-D stereo camera pair is comprised of cameras 43 and 44. The pairs of cameras 41, 42 and 43, 44 act independently of one another to simultaneously produce two 3-D stereo TV pictures of the game.

Each of the cameras 41 and 42 that form the first 3-D stereo camera pair 41, 42 are separated by an interpupillary distance. Each of the cameras 43 and 44 that form the second 3-D stereo camera pair 43, 44 are separated by an interpupillary distance.

The linear distance separation of the optical axes of the two camera lenses that make up the stereo camera pairs is an important function of the buffer plate. For the buffer plate, the distance measured between the optical axes of the lenses is defined as the interpupilarly distance between the camera lenses.

The diameter of the hockey puck is three inches. This dimension puts a practical limitation on the maximum interpupillary distance between the cameras that make up a 3-D stereo camera pair. For today's state of the art SD/HD cameras with body diameters of 0.7 inches for example, and assuming a generous clearance of 0.25 inches between the walls of the puck and the camera bodies, this leaves 1.8 inches for interpupillary distance, or 45.72 mm. Therefore, the axial separation between each 3-D stereo pair of camera lenses can vary up to 46 mm in this example. Therefore in this example, the separation between 29 and 31 can vary up to 46 mm, and the separation between 37 and 38 can vary up to 46 mm also. It is understood that different interpupillary distances produce different 3-D effects. For example, larger interpupillary distance will produce more striking 3-D effects. In the future, as SD/HD cameras get smaller in diameter we may be able to raise the interpupillary distance to 46 to 57 mm.

The 3-D stereo camera pair 41 and 42 in the instrumentation package assembly 11 that forms the first 3-D stereo camera pair has optical windows 35 and 36 respectively. The 3-D stereo camera pair 43 and 44 in the instrumentation package assembly 11 that forms the second 3-D stereo camera pair has optical windows 20 and 7 respectively. The two cameras 41 and 42 in the instrumentation package assembly 11 that form the first 3-D stereo camera pair have optical axes 37 and 38. The two cameras 43 and 44 in the instrumentation package assembly 11 that form the second 3-D stereo camera pair have optical axes 29 and 31. The interpupillary distance for both of these 3-D stereo camera pairs is set to be identical.

The lines of sight of the first and of the second 3-D stereo camera pairs are both looking straight upward from the top 8 of the instrumented ice hockey puck along their respective optical axes. Their lines of sight are all parallel to one another. The SD/HD letter box picture formats of cameras 41 and 42 are aligned together. The SD/HD letter box picture formats of cameras 43 and 44 are aligned together also. Video information from all four cameras is transmitted simultaneously from the instrumented ice hockey puck to the remote base station where it is processed. The SD/HD letter box picture formats of cameras 41 and 42 and 43 and 44 are aligned together so that any two of the four cameras can be configured to be a 3-D stereo camera pair in the remote base station's processing software. Gyroscope data from the instrumented ice hockey puck accompanies the video data transmitted from the instrumented ice hockey puck to the remote base station. The gyroscope data is processed by the remote base station software to yield the spin rate, spin sense and direction of forward motion of the instrumented ice hockey puck. The spin rate, spin sense and direction of forward motion is then used by the processor to remove the spin from the imagery through derotation processing which stabilizes the imagery in the SD/HD letterbox picture format and holds it upright for broadcast to viewing by the TV audience.

The instrumented ice hockey puck has two protective cover plates 23 and 24 embedded and molded into it. One protective cover plate 23 is on the top and one 24 is on the bottom of the instrumented ice hockey puck. The outer body of the top protective cover plate 23 is made spherically dome shaped. The entire body of the bottom protective cover plate 24 is made flat and has rounded edges like the edges on the top protective cover plate 23.

The materials chosen for the protective cover plates 23 and 24 in the present preferred embodiment are polycarbonates, ABS or fiber reinforced plastics. Although a variety of other materials would function equally as well. Polycarbonates, ABS or fiber reinforced plastics have an advantage in that they are lightweight and stiff, enabling their thickness to remain thin while still delivering the significant stiffness needed to perform their mechanical shielding function in the limited space they can occupy within the instrumented ice hockey puck. They have an additional advantage in that they are transparent to the transmitted and received radio waves which need to move to and from the antennas 25, 26, 27 and 28 inside the instrumented ice hockey puck without absorption or reflection.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged during the game. During the normal course of the game, the top 8 of the instrumented ice hockey puck will be hit and crushed by the players and by their equipment. For example, the players may step on the instrumented ice hockey puck or slide into it, or hit it with their hockey sticks, or bounce it off of a wall. They may even drop their knees on it. The two protective cover plates 23 and 24 protect the instrumentation package assembly 11 within the instrumented ice hockey puck from physical damage due to these hits.

The space between the top 8, bottom 13 and sides of the instrumented ice hockey puck and the protective cover plates 23 and 24 is filled with vulcanized hard rubber or synthetic rubber encapsulating material 19. A combination of encapsulation voids and encapsulated tiny lead spheres are used to carefully balance and set the moments of inertia of the instrumented puck to match those of the conventional regulation puck. Synthetic rubber is an example of an encapsulating material that is used besides vulcanized hard rubber to mold the disk. When cured, this encapsulating material 19 acts to absorb shock and vibration to the instrumented ice hockey puck. The material 19 encapsulates the upper and lower protective cover plates 23 and 24 and maintains their positions inside the molded instrumented ice hockey puck. The space between the protective cover plates 23 and 24 and the instrumentation package assembly 11 is also filled with the same encapsulating material. When cured, this encapsulating material 19 acts to absorb shock and vibration to the instrumentation package assembly 11. The material 19 encapsulates the instrument package assembly 11 inside the instrumented ice hockey puck and thereby maintains its position centered with 30 coaxial with the mechanical z-axis of the disk inside the molded instrumented ice hockey puck.

The top protective cover plate 23 is made flat in its innermost region close to the optical windows 35, 36 and 20, 7. The purpose of making it flat in its innermost region is to provide maximum protection for the optical windows 35, 36 and 20, 7 whose surfaces are at the very top 8 of the instrumented ice hockey puck. The flat shape enables the protective cover plate 23 to surround the optical windows 35, 36 and 20, 7 at the top 8 of the instrumented ice hockey puck where the optical windows 5, 36 and 20, 7 are most likely to be exposed to the greatest threat of damage due to hits to the top of the instrumented ice hockey puck. The upper protective cover plate 23 is buried in encapsulating material at the center top of the instrumented ice hockey puck around the optical windows 35, 36 and 20, 7 by approximately 1/32 inch or more below the top 8. The dome shape enables the upper protective cover plate 23 to come very close to the top center of the instrumented ice hockey puck where the players will have only grazing contact with its curved surface if they crash into the instrumented ice hockey puck, thereby eliminating the threat of injury to the players if they hit the top of the instrumented ice hockey puck. Furthermore, the spherical shape of the protective cover plate 23 causes its edge to be rounded downward away from the top 8 and places it approximately ½ inch or more below the top surface 8 of the instrumented ice hockey puck.

The lower protective cover plate 24 is entirely flat and is buried in encapsulating material 19 approximately ¼ inch or more above the bottom surface of the instrumented ice hockey puck. The body of the lower protective cover plate 24 is made flat because it is buried inside the puck and there is no danger of the players coming into violent contact with it. The flat shape is easier to make and less expensive to manufacture. Its thickness is also made in the range of approximately ⅛ to ¼ inches. The thickness of the lower protective cover plate 24 is not physically restrained because of its location, as is the case with the upper protective cover plate 23.

In all cases, the rounded edges of the protective cover plates 23 and 24 come within no less than ¼ inch or more from all sides of the instrumented ice hockey puck.

Alignment of all four cameras of the instrumented ice hockey puck is achieved using the following representative procedure. When the instrumented ice hockey puck is arranged on the ice so that the hockey net lies along the positive y-axis direction 2 of the instrumented ice hockey puck, the first camera pair 43 and 44 is aligned together in rotation about their respective z-axes within the instrumentation package assembly 11 so that they simultaneously yield wirelessly transmitted upright 3-D stereo images of the hockey net to the remote base station which appear between the center and the bottom of the TV picture frame, and have their letterbox picture frames aligned together. The second camera pair 41 and 42 is aligned together in rotation about their respective z-axes within the instrumentation package assembly 11 so that they simultaneously yield wirelessly transmitted upright 3-D stereo images of the hockey net which appear between the center and the bottom of the TV picture frame, and have their letterbox picture frames aligned together with those of cameras 43 and 44 so that they are all superimposed on one another.

3-D stereo camera pair 43 and 44 will enable the TV audience to see what the instrumented ice hockey puck sees as it travels outward from the crack of the hockey stick on its body. The TV audience will see the hockey net get larger as the instrumented ice hockey puck gets closer to the net and the goal tender. Microphones 49, 50 and 53 will deliver the sound of a loud crack to the TV viewing audience as the player's hockey stick crashes against the instrumented ice hockey puck. The TV audience will see the goal tender drop down close-up as the instrumented ice hockey puck approaches the net and the goal tender tries to block its flight. Members of the TV viewing audience will duck to avoid being hit by the goal tenders hockey stick as he wields it to intercept the puck. The TV audience will hear the thud and groans of the goal tender as he blocks the puck. The TV audience will hear the scraping by the goal tender's skates as they dig into the ice on the rink. The TV audience will hear the players collide as they scramble for the puck. The sounds received from each of the microphones by the remote base station are processed using special software to produce surround sound which is broadcast to the TV viewing audience.

The televised images viewed by the TV audience are maintained upright in the HD letterbox picture frame despite the rotational motions of the instrumented ice hockey puck, by transmitting pitch, yaw and roll data from the gyroscopes along with the televised image data from the instrumented ice hockey puck's instrumentation package assembly 11 to the remote base station which processes the imagery and gyroscope data in its hardware and software and derotates the imagery and holds it upright and stable for the TV audience. Pitch, yaw and roll gyroscopes and encoders are part of the supporting electronics in each of the four instrumentation package elements that are inside the instrumentation package assembly 11.

In a preferred embodiment where standard SD/HD letterbox CCD chips are used in the cameras, since the shape of the CCD sensor array of pixel elements is a letterbox, this causes the common area of pixels of the physically spinning letterbox to be a square covering only 9/16 or 56% of the field of view of the whole letterbox. Therefore, in a preferred embodiment using standard camera chips we loose 44% of the field of view and are reduced essentially to a square picture format. We can recover the field of view by using physically larger sized standard chips and shorter focal length camera lenses.

In another preferred embodiment, the circular HD CCD TV camera sensor chips disclosed in drawings FIG. 34A and FIG. 34B and FIG. 34C are used in the four cameras 41, 42, 43 and 44 rather than ordinary prior art CCD sensor chips. These circular HD CCD TV camera sensor chips have an advantage over ordinary HD CCD sensor chips because they permit transmission of the entire circular sensor array to the remote base station for processing, even though the instrumented ice hockey puck is spinning. The pixel elements of ordinary prior art CCD sensor chips cover only the area of the letterbox, thereby causing a loss of field of view when the ice hockey puck spins. Use of the circular HD CCD TV camera sensor chips eliminates this problem of field of view loss when the puck spins. Using software, the SD/HD letterbox picture frame format is made to spin in sync with the spin of the instrumented ice hockey puck in the processor to derotate and stabilize the imagery and lock it in its upright position relative to the direction of forward motion of the ice hockey puck without loss of any of the field of view. For example, as the instrumented ice hockey puck spins on the ice rink about its z-axis 30, the optical images formed on all four of the circular HD CCD TV camera sensor chips by the camera lenses 45, 46, 47 and 48, fully fill the circular sensor's surfaces. Imagery from the entire circular sensor surface is scanned because all the pixel elements on the sensor are active simultaneously. As the instrumented ice hockey puck spins on the ice, so does the optical images on the circular sensor's surfaces of all four chips. The circular sensors are large enough to cover and track the full SD/HD letterbox picture frame format of the images whatever their rotation angle may be. Image data from all the pixel elements on the face of the circular sensor is wirelessly transmitted to the remote base station from the instrumented ice hockey puck for processing. At the remote base station, the spinning virtual electronic SD/HD letterbox frame within the software processor collects the signals from only those pixel elements within the rectangular letterbox borders for transmission to the TV viewing audience. The roll gyroscopes detect the z-axis 30 spin of the instrumentation package assembly within the spinning instrumented ice hockey puck and encodes the spin data as well as the pitch and yaw data. The spin (roll) data along with pitch and yaw data, and the image data from the circular camera sensors are transmitted to the remote base station wirelessly from the RF antennas 25, 26, 27 and 28 via the antenna array relay junction in the ice hockey arena. The remote base station processes the encoded spin data with the image data and delivers a spin stable upright HD letterbox picture to the TV viewing audience. An advantage of this preferred embodiment is that it completely eliminates the need for the mechanical actuators and bearings associated with each of the instrumentation package elements specified in FIG. 19D. This reduces the weight and the volume requirements of the instrumentation package assembly inside the instrumented ice hockey puck.

In another preferred embodiment, we can accomplish the same performance as above by using standard square chips, where the dimension of each side of the square is equal to the diameter of the circular chip sensor array, and we only use the pixel elements inscribed in the circular region of the chip.

It should be noted at this point, that in general any combination of any two of the four cameras can be electronically commanded and controlled by the cameraman from the remote base station to act as 3-D stereo camera pairs. For example 41 and 42, 41 and 43, 41 and 44, 42 and 43, 42 and 44, 43 and 44.

Each of the microphones 49, 50, 58 60 listens for sounds from their respective sides of the instrumented ice hockey puck. The condenser microphones enable the viewing audience to hear real-time contacts, impacts and shocks to the instrumented ice hockey puck by conduction of sound waves in the puck. Microphones 49, 50, 58 60 enable the TV audience to hear sounds that result from air or any physical contacts or vibrations to the instrumented ice hockey puck; like for example, the crash of a player sliding into the instrumented ice hockey puck; or like for example the puck sliding on the ice; or like for example the crash of a hockey stick on the puck.

Microphones 53, 57, 60, 61, 62 protrude through holes in the top of the instrumented ice hockey puck. They are molded in place by encapsulation material 19. Microphone 53 is mounted through a hole in the upper protective cover plate. Microphones 53, 57, 60, 61, 62 are connected by cables to electrical connector 55. 55 is connected to the electronics in the instrumentation package assembly 18. Microphone 53, 57, 60, 61, 62 enables the TV audience to hear sounds that occur on the hockey rink like extemporaneous remarks from the players. In certain venues the cameraman may be asked to disable these sounds. The cameraman may disable these sounds remotely by transmitting a microphone disabling signal to the ice hockey puck from the remote base station. Microphone 53 enables the TV audience to hear the whoosh of air as a hockey sticks wiz past the instrumented ice hockey puck. The audio signals from the microphones are transmitted via antennas 25, 26, 27, 28 to the remote base station where they are processed and formatted into surround sound and broadcasted to the TV viewing audience.

Simultaneously live 3D TV pictures are taken by the TV cameras 41, 42, 43 and 44 of their respective field of views of the live action on the hockey rink. Cameras 41, 42, 43 and 44 will enable the TV audience to see close-ups from the pucks perspective as players maneuver to strike the instrumented ice hockey puck as it whizzes bye. This will be an action packed event never before witnessed by a TV audience. Some members of the TV audience will flinch as the puck is struck by an oncoming stick. Each of the plays will produce breath taking excitement and expectations by the TV viewing audience. In summary, the instrumented ice hockey puck provides video and sound to the viewing audience that is so exciting and realistic that it makes the individual members of the audience feel that they are in the game on the rink amongst the players. In many ways this is more exciting than viewing the game in person from the stands of the hockey stadium.

The four CCD sensor arrayed TV cameras 41, 42, 43, and 44 are chosen to be identical to one another. The four TV camera lenses 45, 46, 47 and 48 are chosen to be identical to one another. The interpupillary distance between 41 and 42 is identical to the interpupillary distance between 43 and 44. The field of view of each of the lenses is an extremely wide angle approaching one hundred and eighty degrees. Except for the small parallax between the four images due to the interpupillary distances between the four camera lenses 45, 46, 47 and 48, the images of the ice arena as seen by the four TV cameras as projected onto their four HD circular CCD sensor arrays, are identical to one another. The cameras and their lenses are arranged symmetrically around the z-axis 30 of the puck. The center of gravity of the instrumented ice hockey puck is in its center and equidistant from its top 8 and bottom 13.

As an example of how the remote base station does its image processing, if the hockey puck is initially located at rest at the center of the ice hockey rink at x-y-z coordinates P(0, 0, 0), with the puck arranged on the ice so that cameras 44 and 43 are aligned along x-axis of the rink, and its cameras 41 and 42 are aligned along the y-axis of the rink, and if the two hockey goal nets are located at coordinates N(d, 0, 0) and N(−d, 0, 0) at either end of the rink, then the TV viewing audience will see the net N(d, 0, 0) appear upright near the bottom central edge of the HD letterbox picture frame screen format. The initial 3-D image of the net N(d, 0, 0) that the TV viewing audience sees is generated by the images from cameras 41 and 42 because these cameras, which comprise a 3-D stereo camera pair, offer the greatest parallax for objects like the net N(d, 0, 0) which lie along the x-axis. Initially, the stereo camera pair formed by cameras 43 and 44 offer minimum parallax for images of the net and will produce no 3-D effects for the net because cameras 43 and 44 lie inline together along the x-axis.

If the hockey puck is now struck so it accelerates to velocity V along the x-axis of the rink toward the net N(d, 0, 0), and if the puck has a clockwise spin (or roll) about its z-axis 50, then as the hockey puck travels closer to the net N(d, 0, 0), the TV viewing audience will see the net N(d, 0, 0) be imaged upright above the bottom central edge of the HD letterbox picture frame screen format and see it appear to be growing larger and closer to the center of the letterbox picture frame in 3-D. The pitch, roll and yaw gyroscope data from each of the instrumentation package assembly elements is simultaneously transmitted to the base station via the antenna array relay junction where the spin rate, spin sense, and the forward velocity direction of each of the four cameras is calculated by the processing software. The software in the remote base station processes the data it receives from the hockey puck's onboard instrumentation package assembly and aligns the HD letterbox picture frame screen formats of the four cameras so that they are stable relative to the direction of the net N(d, 0, 0). The software in the remote base station processes the data it receives from the hockey puck's onboard instrumentation package assembly, and derotates the spinning imagery that all four TV cameras see, and removes the spin from the imagery of all four cameras to stabilize it and make it upright in the HD letterbox picture frame screen format that the TV viewing audience sees. As the hockey puck spins, during each and every time interval, the remote base station's processors alternately select the imagery from the one of the two spinning 3-D stereo camera pairs with the most parallax, in order to maximize the 3-D effect and keep it uniform during any one time interval as the two 3-D stereo camera pairs spin. If this were not done, the TV viewing audience would see the 3-D effects change and fade and then alternately reoccur as the puck spins and the 3-D stereo camera pairs change angular places relative to the net N(d, 0, 0).

The remote base station receives imagery from all four cameras simultaneously. The remote base station software automatically processes the incoming data stream and sets up the order in time when the processors alternately select which 3-D stereo camera pair's imagery is to be televised to the TV viewing audience as the puck spins. Except for processing software and joy sticks, the remote base station used in conjunction with the instrumented ice hockey pucks is substantially identical to those specified in FIG. 30A and FIG. 30B and FIG. 31A and FIG. 31B and FIG. 32A and FIG. 32B and FIG. 33A and FIG. 33B and FIG. 33C and FIG. 33D and FIG. 33E and FIG. 35A and FIG. 35B and as disclosed elsewhere in the present invention. Block diagrams of the electronics circuitry signal and data flows are specified in FIG. 14A and FIG. 14B. The processing software is similar to that used for the instrumented football preferred embodiments disclosed elsewhere in the present invention to stabilize and maintain upright imagery using the data from the instrumented ice hockey puck gyroscope encoders and the image recognition data from the set-up camera system shown in FIG. 15A and FIG. 15B, and FIG. 16.

The 3-D stereo effects of the N(d, 0, 0) net's imagery, as seen by the TV audience as the puck moves forward towards the net, are maximized when the parallax in the images between the respective cameras comprising a 3-D stereo camera pair which are televising the net are maximized. At the point in the puck's spin where the full interpupillary distance between the cameras comprising the 3-D stereo camera pair televising the net is perpendicular to the forward direction of the puck toward the net, the 3-D effect of the net's image is at a maximum as seen by the TV audience. The parallax in the images between the two respective cameras comprising a 3-D stereo camera pair is maximized when a line drawn between the two cameras comprising the 3-D stereo camera pair is perpendicular to a line drawn from the center of the puck to the net N(d, 0, 0) which is the direction of the pucks forward motion. Since the two stereo camera pairs are imbedded in the puck, when the puck spins, the line drawn between the two cameras will spin also. This changes the angle between the line and the direction of forward motion of the puck, thereby continuously changing the parallax and the 3-D effects of the net's image. In order to minimize this modulation of the 3-D effect that the TV audience sees as the puck spins, the processors will alternately select and switch the 3-D stereo camera pair to broadcast to the TV viewers every ⅛ of a turn (or forty-five degree change in rotation angle) of the puck. The processors easily calculate the time to make the switch based on the data stream transmitted to the remote base station from the roll (spin) gyros in the puck from which they derive the spin rate, spin sense and forward motion direction of the instrumented ice hockey puck.

In another preferred embodiment, the same four cameras 41, 42, 43, and 44 specified in the previous preferred embodiment are used, but instead of arranging the cameras into the two 3-D stereo camera pairs described previously as the first and second 3-D stereo camera pairs, where 41 and 42 constituted the first 3-D stereo camera pair, and where 43 and 44 constituted the second 3-D stereo camera pair, the cameras 41, 42, 43, and 44 are grouped into four additional unique 3-D stereo camera pairs. The four additional 3-D stereo camera pairs are cameras 41 and 43; cameras 43 and 42, cameras 42 and 44; cameras 44 and 41. We will call 41 and 43 the third 3-D stereo camera pair. We will call 43 and 42 the fourth 3-D stereo camera pair. We will call 42 and 44 the fifth 3-D stereo camera pair. We will call 44 and 41 the sixth 3-D stereo camera pair.

In order to use the 3-D composite pictures from any one of these four additional 3-D stereo camera pairs, the scan directions of the letterbox picture frame formats must be electronically rotated about the optical axes of the cameras to align their letterbox formats together before televising the TV pictures. Although electronic rotation of the scan direction of the letterbox can be achieved using standard CCD sensor chips, the circular CCD sensor arrayed chips referred to in FIG. 34A and FIG. 34B and FIG. 34C are particularly suitable for this application because the letterbox can be rotated without any loss of the field of view of the camera. The cameraman in the remote base station will verify that the letterbox formats of the pictures from the two cameras that make up each 3-D stereo camera pair are aligned. The letterbox formats must be aligned so that the resultant composite 3-D picture made up of the pictures from the two 3-D stereo cameras will overlay and register with proper parallax to produce the required 3-D sensation in the TV viewing audience.

The additional four 3-D stereo pairs of cameras act electronically and independently to simultaneously produce four additional 3-D stereo TV pictures of the game. They use the same electronics as before, and the same lenses as before as in the previous preferred embodiment.

In the previous preferred embodiment, each of the cameras 41 and 42 that formed the first 3-D stereo camera pair 41, 42 are separated by as much as a 46 millimeter interpupillary distance. Each of the cameras 43 and 44 that formed the second 3-D stereo camera pair 43, 44 are separated by 46 millimeters.

It can be seen from simple geometry that the interpupillary distance for the third, fourth, fifth and sixth 3-D stereo camera pairs is equal to one half the square root of two times the interpupillary distance for either the first or second 3-D stereo camera pairs. For example, if the interpupillary distance for the first 3-D stereo camera pair is 46 millimeters, then the interpupillary distance for the third 3-D stereo camera pair would be 0.707 times 46 millimeters or 32.5 millimeters.

75 millimeters is the maximum interpupillary distance of the average human's eyes. It is understood that other alternative interpupillary distances may be used to produce other alternative 3-D effects. For example, larger interpupillary distance will produce more striking 3-D effects.

The 3-D stereo camera pair 41 and 43 in the instrumentation package assembly 11 that forms the third 3-D stereo camera pair, has optical windows 35 and 20 respectively.

The 3-D stereo camera pair 43 and 42 in the instrumentation package assembly 11 that forms the fourth 3-D stereo camera pair has optical windows 20 and 36 respectively.

The 3-D stereo camera pair 42 and 44 in the instrumentation package assembly 11 that forms the fifth 3-D stereo camera pair, has optical windows 36 and 7 respectively.

The 3-D stereo camera pair 44 and 41 in the instrumentation package assembly 11 that forms the sixth 3-D stereo camera pair has optical windows 7 and 35 respectively.

The two cameras 41 and 43 in the instrumentation package assembly 11 that form the third 3-D stereo camera pair have optical axes 37 and 29 respectively.

The two cameras 43 and 42 in the instrumentation package assembly 11 that form the fourth 3-D stereo camera pair have optical axes 29 and 38 respectively.

The two cameras 42 and 44 in the instrumentation package assembly 11 that form the fifth 3-D stereo camera pair have optical axes 38 and 31 respectively.

The two cameras 44 and 41 in the instrumentation package assembly 11 that form the sixth 3-D stereo camera pair have optical axes 31 and 37 respectively.

Electronically, mechanically, and optically all of these six 3-D stereo camera pairs operate simultaneously. An advantage occurs when an optical window of one of the cameras is obscured by dirt; the remaining cameras can be paired remotely by the operator in the remote base station to continue to produce 3-D imagery for the TV viewers.

The lines of sight of the first, second, third, fourth, fifth and sixth 3-D stereo camera pairs are all looking straight upward from the top 8 of the instrumented ice hockey puck along their respective optical axes which are all parallel to one another. Their lines of sight are all parallel to one another. The four holes in the top 8 of the instrumented ice hockey puck are made just large enough to prevent vignetting of the cameras field of view.

In an alternate preferred embodiment where in certain venues stereo 3-D is not required or deemed useful from the instrumented ice hockey puck, a stereo 3-D camera pair that typically has two identical lenses, for example 47 and 48, may be replaced with two dissimilar lenses having different lens settings, focal lengths and fields of view for example. The weights of the lenses must be kept the same in order to maintain balance and the center of gravity location of the puck. Under these same circumstances, the identical cameras, for example 43 and 44 of the 3-D stereo camera pair may also be replaced with two dissimilar cameras. The weights of the cameras must be kept the same in order to maintain balance and the center of gravity location of the puck. For example, the two 3-D stereo camera pairs that face the net from the top of the instrumented ice hockey puck may be considered to be non-essential by the cameraman. Instead, the cameraman may elect to set four dissimilar focal lengths into the zoom lenses facing the net. One lens, 41 for example, may be set to a long focal length for close-up facial expressions of the players as they strike the puck, where another lens 42 may be set to a short focal length for wider shots of the players moving into position to strike the puck.

It should be noted at this point, that in general any combination of any two of the four cameras can be electronically commanded and controlled by the cameraman from the remote base station to act as 3-D stereo camera pairs, for example 41 and 42, 41 and 43, 41 and 44, 42 and 43, 42 and 44, 43 and 44.

In general, for all the preferred embodiments disclosed in the present invention, the instrumented ice hockey puck uses the instrumentation package assembly shown in FIG. 21A and FIG. 21B and FIG. 21C. The instrumentation package assembly shown in FIG. 21A and FIG. 21B and FIG. 21C uses four of the instrumentation package assembly elements shown in FIG. 19D. The instrumentation package assembly elements shown in FIG. 19D use gyroscopic transducers which are specified in the electronics block diagram FIG. 19E.

A detailed example of the operation of the gyroscopic transducers follows. Referring to FIG. 19E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis.

Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software.

When the instrumented hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software.

During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game.

The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

In another preferred embodiment, a less costly instrumented ice hockey puck using only one TV camera is constructed. This one camera embodiment is far less complex than the previous four camera preferred embodiment. Because of the obvious nature and simplicity of this one camera embodiment, a separate drawing is not shown. The instrumentation package assembly element shown in FIG. 19D is the identically same unit used in the four camera embodiment. The one camera embodiment uses the instrumentation package assembly shown in drawings FIG. 19A and FIG. 19B and FIG. 19C. The one camera embodiment does not produce 3-D. The instrumentation package assembly shown in FIG. 19A and FIG. 19B and FIG. 19C is mounted, aligned and encapsulated into the ice hockey puck in the same manner as the previous preferred embodiment that uses four cameras. The z-axis of the instrumentation package assembly is aligned and made coincident with the z-axis 30 of the puck which is normal to the top center of the puck, so that the single camera sees out the top of the puck. The center of gravity is in the center of the ice hockey puck as in the previous preferred embodiment. The image stabilization is done by the remote base station in the same way as before also. As the puck spins about its z-axis, so does the camera and its CCD sensor array. As the CCD sensor array spins about the z-axis of the puck, the imagery formed on the sensor seems to spin relative to the CCD sensor. The instrumented ice hockey puck wirelessly communicates with the remote base station in the identical manner as before. The spinning pixel data and the gyroscope data are communicated to the remote base station as before. The remote base station uses the same processing software as before to de-rotate and stabilize the imagery and make it upright relative to the direction of forward motion of the instrumented puck. The instrumented ice hockey puck has the same appearance, playing and handling qualities, as before.

The cameraman, in the remote base station, software selects the wireless mode of communication between the instrumented ice hockey puck and the remote base station. The cameraman uses the antenna array relay junction that is installed in the ice hockey stadium/arena with which to command and control his choice and communicate it to the instrumented ice hockey puck in the ice hockey rink.

The cameraman selects items from a software menu of control commands that go to the network transceiver at the remote base station that are subsequently transmitted to the instrumented sports paraphernalia (the instrumented ice hockey puck) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular sports stadium/arena.

These commands, when intercepted by the network transceiver within the instrumented sports paraphernalia, are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented sports paraphernalia that are being controlled.

Referring to the Preferred Embodiments Specified in FIG. 37A and FIG. 37B and FIG. 37C;

the instrumented ice hockey puck satisfies all of the following further objectives:

It is an objective of the present invention to replace existing prior art non-instrumented ice hockey pucks that are currently on existing rinks with substitute instrumented ice hockey pucks. It is an objective of the present invention to equip an ice hockey arena with an instrumented ice hockey system for the improvement of the TV broadcast quality of ice hockey games. It is an objective of the present invention for the instrumented ice hockey puck to be composed of an instrumentation package assembly, a buffer plate assembly, an upper protective cover shield, a lower protective cover shield, and synthetic or vulcanized rubber encapsulation/molding material. It is an objective of the present invention to physically configure two 3-D stereo camera pairs from a total of four cameras looking out from the top of the instrumented ice hockey puck. It is an objective of the present invention to electronically configure six 3-D stereo camera pairs from a total of four cameras looking out from the top of the instrumented ice hockey puck. It is an objective of the present invention to physically configure a single camera looking out from the top of the instrumented ice hockey puck. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format. It is an objective of the present invention to stabilize the imagery obtained from the instrumented ice hockey puck in an upright condition in the picture frame, regardless of the pitch, roll or yaw of the football, as viewed by a live TV audience in the HD CCD letterbox picture format by using gyroscopic encoders. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by image recognition processing. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using gyroscopic encoders and image recognition processing. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using image recognition processing of the archived data base derived from the tripod mounted set-up camera system used in the ice hockey arena venue. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using image recognition processing of the archived data base derived from the tripod mounted set-up camera system in the remote base station. It is an objective of the present invention to provide views of the game not seen before during broadcasts by real time TV audiences. It is an objective of the present invention to provide views of the game from the instrumented ice hockey puck. It is an objective of the present invention to provide views of the game from the surface of the ice rink, as seen from the top of the instrumented ice hockey puck. It is an objective of the present invention to provide views of the game from the surface of the ice rink, as seen from the top of the instrumented ice hockey puck using the two 3-D stereo camera pairs. For example, views in front of the instrumented ice hockey puck as it is being passed forwardly, and views in back of the instrumented ice hockey puck as it is being passed forwardly toward the goal keeper who stands motionless in front of the net. It is an objective of the present invention to provide sounds of the game not heard before during broadcasts by real time TV audiences. It is an objective of the present invention to provide sounds of the game as heard by the instrumented ice hockey puck as it slides on the ice. It is an objective of the present invention to provide sounds heard from the ice hockey puck as it is passed from player to player and hits the net. It is an objective of the current invention that the electronics components needed to carry out all the electronic functions of the instrumentation package assembly defined above, be packaged into the confined space of the instrumentation package assembly inside the instrumented ice hockey puck and that the weight limitations, center of gravity and moment of inertia considerations set out for the instrumentation package assembly be adhered to. It is an objective of the present invention to enable coaches who are on the sidelines during training sessions to hear the spoken dialog of their team's players from on the ice hockey rink. It is an objective of the present invention to enable coaches who are on the sidelines during training sessions to view details of the team's players during training sessions on the ice hockey rink. It is an objective of the present invention to enable referees who are on and off the rink during games to review details of the game from the four cameras onboard the instrumented ice hockey puck by instant replay. It is an objective of the present invention to equip the instrumentation package assembly to capture video and sounds on the ice hockey rink from the instrumented ice hockey puck. It is an objective of the present invention to equip the instrumented ice hockey puck with an instrumentation package assembly that has four TV cameras, three microphones, four wireless antenna elements, battery pack and supporting electronics housed inside its enclosure. It is an objective of the present invention to equip the instrumentation package assembly inside the instrumented ice hockey puck with means to wirelessly televise the captured video and sounds to a remote base station via an antenna array relay junction stationed off the playing field but within (and around) the space of the instrumented sports stadium/arena. The antenna array relay junction is equipped to relay the video and sounds to the remote base station. The remote base station is located within the instrumented sports stadium/arena or its vicinity. It is an objective of the present invention that the instrumented ice hockey puck is under the command and control of a cameraman in the remote base station. It is an objective of the present invention to enable the instrumentation package assembly to be mounted inside the instrumented ice hockey puck in a manner permitting its four cameras and three microphones to see and hear out of the instrumented ice hockey puck. It is an objective of the present invention to enable the instrumentation package assembly to be mounted inside the instrumented ice hockey puck in a manner permitting the instrumentation package assembly to be protected from damage during the game on the ice. It is an objective of the present invention to enable the instrumentation package assembly to be mounted inside the instrumented ice hockey puck in a manner permitting it to maintain its mechanical and optical alignment during the game on the ice. It is an objective of the present invention to provide a permanent position and nesting place for the instrumentation package assembly inside the instrumented ice hockey puck. It is an objective of the present invention to provide means to permit easy assembly and alignment of the instrumentation package assembly in the instrumented ice hockey puck. It is an objective of the present invention to provide the instrumented ice hockey puck with the identical handling and playability qualities as conventional regulation ice hockey pucks. It is an objective of the present invention to provide means to permit the instrumentation package assembly to be nested, cradled and isolated from shock and vibration inside the instrumented ice hockey puck. It is an objective of the present invention to provide an instrumentation package assembly that is sized so that it can be easily loaded and assembled into the instrumented ice hockey puck. It is an objective of the present invention to provide the instrumented ice hockey puck with an instrumentation package assembly that carries its own rechargeable battery pack. It is an objective of the present invention to provide the instrumented ice hockey puck with an instrumentation package assembly that carries its own rechargeable battery pack that has sufficient energy to power the cameras, lenses, antennas and electronics for the duration of the ice hockey puck game. It is an objective of the present invention to charge the battery pack of the instrumented ice hockey puck using the same charging unit as used for instrumented baseball bases, instrumented baseball home plates and instrumented pitcher's rubbers. It is an objective of the present invention to provide the instrumented ice hockey puck with instrumentation package assembly electronics that require little power to operate and are lightweight. It is an objective of the present invention to provide the instrumented ice hockey puck with an instrumentation package assembly that carries its own battery pack that is recharged wirelessly by induction. It is an objective of the present invention to provide the instrumented ice hockey puck with an instrumentation package assembly that can withstand axial and tangential compression and decompression loads exerted on it during play. It is an objective of the present invention to provide the instrumented ice hockey puck with physical characteristics such as total weight, center of gravity and moments of inertia that are identical to regulation conventional ice hockey pucks. It is an objective of the present invention to provide instrumented ice hockey puck with playing qualities and handling qualities that are identical to those in prior art conventional regulation ice hockey pucks. It is an objective of the present invention that the instrumented ice hockey puck will withstand dirt, water, ice and weather conditions. It is an objective of the present invention that the instrumented ice hockey puck's encapsulation will provide cushioning to protect the instrumentation package assembly from shock and vibration damage. It is an objective of the present invention to provide the instrumented ice hockey puck with provisions for holding the instrumentation package assembly in alignment and for cushioning and isolating the instrumentation package assembly from shocks received by the instrumented ice hockey puck during the game. It is an objective of the present invention that the optical windows be made small to be unobtrusive to the game without vignetting the field of view of the cameras under the prevailing lighting conditions on the rink in the arena. It is an objective of the present invention that the optical windows withstand heavy blows received during the game and protect the instrumentation package assembly. It is an objective of the present invention that the optical windows be easily removed and replaced. It is an objective of the present invention to simplify the instrumented ice hockey puck and reduce its cost for low budget venues by using only a single TV camera instead of the four camera preferred embodiment. It is an objective of the present invention for the simplified one camera instrumented ice hockey puck to operate in the same sports stadium/arena and use the same remote base station, wireless communication links and antenna array relay junction as the four camera preferred embodiment. It is an objective of the present invention for the simplified one camera instrumented ice hockey puck to have the same appearance, playability and handling qualities as the conventional regulation ice hockey pucks.

FIG. 38

The detailed physical elements disclosed in the instrumentation package assembly electronics signal and data circuitry drawing disclosed in FIG. 38 are identified as follows: 1 is a high definition SD/HD TV camera. 2 is a high definition SD/HD TV camera. 3 is MPEG compression hardware. 4 is MPEG compression hardware. 5 is a sound pickup microphone. 6 is a sound pickup microphone. 7 is an audio operational amplifier. 8 is an audio operational amplifier. 9 is an audio MPEG encoder. 10 is an audio MPEG Encoder. 11 is an MPEG stream encoder. 12 is a network transceiver. 13 is a microwave radio frequency antenna. 14 is a microwave radio frequency antenna. 15 is a CPU—microprocessor. 16 is a ROM—read only memory. 17 is a RAM—random access memory. 18 is a pitch gyroscopic encoder. 19 is a yaw gyroscopic encoder. 20 is a roll gyroscopic encoder. 21 is a master power on-off-standby power switching circuit. 22 is a power supply circuit regulator. 23 is a rechargeable battery pack. 24 is a 250 kHz tuning capacitor. 25 is a 250 kHz tuning capacitor. 26 is a data and power separator. 27 is an induction coil. 28 is an induction coil. 29 is the power and control interconnect interface.

FIG. 38 is a block diagram showing the circuitry, electronic signals and data flows in the instrumentation package assembly disclosed in FIG. 40A and FIG. 40B and FIG. 40C.

Referring to drawing FIG. 38, in a preferred embodiment, a block diagram showing the signals and data flows to and from the electronic components inside the instrumentation package assembly, which is mounted inside the instrumented football, is disclosed. Cameras 1 and 2 are identical Hi-Definition (SD/HD) 1080i CCD cameras, whose outputs are a broadcast grade HD-SDI format signal. These signals are fed to the inputs of compression hardware 3 and 4. Cameras 1 and 2 are also equipped with an auto-focus/iris feature set that may be over-ridden by commands from the system CPU 15. Cameras 1 and 2 are used during game play to photograph the action occurring around either end of the instrumented football that the instrumentation package assembly is contained within, and convey those photographs via network transceiver 12 and MPEG stream encoder 11 to the antenna array relay junction. The antenna array relay junction and the remote base station are specified in FIG. 62A and FIG. 62B and FIG. 62C and FIG. 62D and FIG. 62E and elsewhere in the present invention. Compression hardware modules 3 and 4 are real time H.264 MPEG compression hardware modules. Hardware modules 3 and 4 compress the signals inputted to them from the cameras 1 and 2 into MPEG format using the H.264 Protocol and provide each captured image a separate stream via the encapsulation function of MPEG stream encoder 11. Compression is needed to reduce bandwidth requirements prior to transmission via radio using network transceiver 12 and microwave radio frequency antennas 13 and 14 respectively. Compression hardware modules 3 and 4, also receive commands from the CPU 15, which set the compression parameters associated with the H.264 protocol.

Alternatively, the aforementioned cameras 1 and 2 can contain part of or all the functions of compression hardware modules 3 and 4 as part of their own internal circuitry, thus saving some board space during manufacturing, in which case the additional control commands from CPU 15 would be sent to cameras 1 and 2 in-lieu of compression hardware modules 3 and 4.

Condenser microphones 5 and 6 are identical condenser microphones mounted inside the football near the vertices on each end. Microphones 5 and 6 capture the sounds around the football during game play and serve as the signal source for operational amplifiers 7 and 8. Operational amplifiers 7 and 8 are identical operational amplifiers configured as low noise high gain microphone pre-amplifiers. Operational amplifiers 7 and 8 amplify signals inputted from condenser microphones 5 and 6 and provide adequate voltage gain and equalization to drive the analog to digital converters inside MPEG Audio Encoder 9 and 10. MPEG Audio Encoder 9 and 10 further combines the two resultant elementary audio data packets into a single stream using the encapsulation function of MPEG stream encoder 11 prior to transmission to the remote base station by network transceiver 12.

Network Transceiver 12 is a complete microwave radio frequency network transceiver. This transceiver is inputted composite MPEG Stream image and audio data from 3, 4, 9 and 10 along with bi-directional system control status data packets to and from system control microprocessor 15. As an example in the present invention, Network transceiver 12 then transmits this data wirelessly using the 802.11(xx) protocol and intentional radiators 13 and 14 to the remote base station via the unlicensed 2.4 or 5.8 GHz radio spectrum. Network transceiver 12 also outputs control commands from the remote base station when they are received by items 13 and 14 using the 802.11(xx) protocol via the unlicensed 2.4 or 5.8 GHz radio spectrum. These control commands are inputted to system control microprocessor 15. System control microprocessor 15 is used to control the flow of system command functions. These command functions are used to adjust the operating parameters of the system based on instructions that it receives from the remote base station.

Alternately, system command function instructions may be received by system control microprocessor 15 from battery charging and stand-by data separator circuit 26. This is needed to allow initialization of the instrumentation package assembly inside the football. System control microprocessor 15 utilizes an operating firmware stored at the time of manufacture on system ROM 16 and executes this firmware upon loading system RAM 17 with its contents.

In order to simplify the process of properly decoding and making upright for viewing the televised images captured by the football instrumentation package assembly, a dynamic means of determining the relative physical position of the football with respect to pitch, yaw and roll is provided by Real-time Gyroscopic encoders 18, 19, and 20 respectively.

The resultant pitch, yaw and roll positional data from 18, 19 and 20 is sent to 15 and is subsequently transmitted along with the televised image data to the remote base station via 11 and 12 respectively.

Network transceiver 12 is used to provide a wireless RF link operating on the unlicensed 2.4 or 5.8 GHz radio spectrum between the instrumented football and the remote base station network transceiver, as an example utilizing the 802.11(xx) Protocol. Network transceiver 12 transmits and receives 802.11(xx) data packets to and from the remote base station. 12 also receives control commands from system control microprocessor 15. These control commands specify the exact RF channel frequency and RF channel power output that will be used during subsequent operation of the system. Signals traveling to and from 12 as RF signals are coupled to the atmosphere by an intentional radiators 13 and 14. Intentional radiators 13 and 14 comprise a phase array antenna system operating within the unlicensed 2.4 or 5.8 GHz radio spectrum. 13 and 14 together provide an isotropic gain of 3 db or better to reach the wireless network access point or base station network transceiver. The remote base station network transceiver is referred to in FIG. 25 which is the specification for the remote base station.

Intentional radiators 13 and 14 are used to capture and radiate the RF energy transmitted and/or received between the antenna array relay junction and the instrumented football. Intentional radiators 13 and 14 are physically located inside the instrumented football between cameras 1 and 2. Power supply 22 is a power supply that supplies power to all the elements shown in FIG. 38. Power supply 22 contains a rechargeable battery pack 23. 29 is the sound, imaging and communications interface electronics.

As an example, a lithium battery is used in the battery pack 23 because of its ability to be recharged and deliver the heavy current requirements expected during the length of time of a typical football game. The battery pack 23 delivers 3.3 volt dc to power supply 22. Power supply 22 supplies power to all the elements shown in FIG. 38. As the state of the art of battery technology changes, other batteries besides lithium batteries will become available. In the present invention, lightweight batteries are preferable to heavier ones.

The power supply electronics within the instrumentation package assembly contains a failsafe mechanism, battery pack, battery pack charging circuitry, system status and administrative data management circuitry.

The power supply 22 contains a set of two inductive pickup coils 27 and 28 that are used to couple electrical energy from outside of the football to the battery pack 23 during the recharging of the battery pack via battery charging and standby data separator circuit 26. 27 and 28 are tuned by capacitors 24 and 25 so as to resonate at a frequency near 250 KHZ. Power supply 22 contains a switching circuit 21 that receives control commands from system control microprocessor 15. These commands instruct and enable power supply 22 to supply power to the rest of the system 29. These commands take power supply 22 out of the stand-by mode and put it in the power-on mode.

A coded RF hand-held remote is disclosed in FIG. 17A and FIG. 17B and FIG. 18. The coded RF hand-held remote is used to initialize the electronics inside the instrumented football by taking the football electronics out of the standby-power mode and placing it in the power-on mode.

A battery pack charging station unit used to charge the battery pack contained in the instrumented football's instrumentation package assembly.

In FIG. 38 self contained three-dimensional gyroscopic transducer comprised of three separate individual low power semiconductor based encoders 18, 19 and 20 is shown. Each of these three encoders is configured at the time of manufacture to respond to a pre-determined action of motion specific to the direction of rotation, forward or backward motion and rise or fall conditions of the instrumented football in real-time. The football's pitch, roll and yaw are encoded. Roll is associated with the spin of the ball about its y-axis as it is thrown above the field during game play.

Each encoder provides a pulse coded binary data output that varies in accordance with the relative direction and rate of movement of the instrumented football. For example, during a typical football game the football will be thrown by a player causing the football to suddenly accelerate in a horizontal direction towards the goal post. The amplitude of this acceleration is perceived by the horizontal motion encoder and its resultant pulse coded data output is fed to an interrupt request port of microprocessor 15. The connection between 18, 19, 20 and 15 is such that each of the encoders will accurately convey information about the multiple possibilities of physical motions of the instrumented football during a typical game, as previously described above, to 15 for further transmission to the remote base station via the administrative data link established by components 12, 13, 14 and 15 respectively. At the time of boot-up, microprocessor 15 is instructed by the firmware contents contained within read only memory 16 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented football in real-time to a computer at the remote base station for use by special software.

When the instrumented football is first initialized prior to use from an idle position, normally by a command sent over the administrative data link from the remote base station, microprocessor 15 according to its firmware instructions contained within read only memory 16 initializes the gyroscopic encoders in a zero motion state so that the remote base station's computer is able to synchronize the previously mentioned special software.

During a typical football game this computer simultaneously receives the image data streams transmitted by the instrumented football and automatically, using the previously mentioned special software, continuously calculates and applies to the received image data stream temporarily stored in memory the correct amount of counter adjustment necessary to hold the images in an upright stable unscrambled position when viewed on a hi definition display or monitor by the TV audience. The cameraman operating the remote base station computer also has the ability to manually issue commands that affect the amount of correction applied to the final image stream. Such commands are very useful in conjunction with other special effects often used during a televised football game.

The administrative data link referenced in FIG. 38 is a Bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station.

Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. The cameraman, in the remote base station, software selects the wireless mode of communication between the instrumented football and the remote base station. The cameraman uses the equipment (antenna array relay junction) that is installed in the football stadium with which to command and control his choice and communicate it to the instrumented football on the football stadium playing field. Refer to FIG. 33A, and FIG. 33B, and FIG. 33C, and FIG. 33D, and FIG. 33E, and FIG. 35A and FIG. 35C for disclosures regarding the remote base station and the antenna array relay junction.

The cameraman, selects items from a software menu of control commands that go to the network transceiver at the remote base station that are subsequently transmitted to the instrumented football for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular sports stadium.

These commands, when intercepted by the network transceiver 12 within the instrumented football are applied to its microprocessor 15, which then in turn upon executing the instructions stored within the contents of its firmware 16 applies a pulse coded control signal via the power and control interconnect interface 29 inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface 29 as shown in FIG. 23, which is represented by dotted lines, consists of the electrical control wiring to and from the electronic components of the instrumented football that are being controlled.

Referring to the Preferred Embodiment Specified in FIG. 38, the instrumentation package assembly electronics signal and data circuitry satisfies all of the following further objectives:

It is the an objective of the present invention to provide an instrumentation package assembly electronics circuitry consisting of two high definition SD/HD TV cameras, two MPEG compression hardware's, two sound pickup microphones, two audio operational amplifiers, two audio MPEG encoders, network transceiver, MPEG stream encoder, two microwave radio frequency antennas, CPU—microprocessor, ROM—read only memory, RAM—random access memory, pitch-yaw and roll gyroscopic encoders, master power on-off-standby power switching circuit, power supply circuit regulator, rechargeable battery pack, two 250 kHz tuning capacitors, data and power separator, two induction coils, and power and control interconnect interface. It is the an objective of the present invention to provide an instrumentation package assembly with onboard electronics contained within it to transmit TV pictures and sounds via its two radio antennas to a remote base station via an antenna array relay junction. It is an objective of the present invention to control the TV cameras and lenses from the remote base station. It is an objective of the present invention to control the power from the battery pack to the electronics. It is an objective of the present invention to stabilize the TV pictures using gyroscopic control. It is an objective of the present invention to control the charging of the battery pack. It is an objective of the present invention to monitor the battery pack charge status from the remote base station. It is the an objective of the present invention to provide an instrumentation package assembly with onboard electronics contained within it to produce outputs of a broadcast grade HD-SDI format signal. It is an objective of the present invention to provide an instrumentation package assembly with onboard electronics contained within it to compress the signals inputted to them from the cameras into a MPEG format using the H.264 Protocol and provide each an elementary MPEG stream. It is the an objective of the present invention to provide an instrumentation package assembly with onboard electronics contained within it to receive commands from the CPU in the remote base station, which sets the compression parameters associated with the H.264 protocol. It is the an objective of the present invention to provide an instrumentation package assembly with onboard electronics contained within it to contain part of or all the functions of compression hardware modules as part of the cameras own internal circuitry. It is the an objective of the present invention to provide an instrumentation package assembly with condenser microphones mounted inside the football near the vertices on each end. It is the an objective of the present invention to provide an instrumentation package assembly with onboard electronics contained within it to capture the sounds around the football during game play and serve as the signal source for operational amplifiers. It is the an objective of the present invention to provide an instrumentation package assembly with onboard electronics contained within it to combine the two resultant elementary audio data packets into a single stream prior to transmission to the remote base station. It is the an objective of the present invention to provide an instrumentation package assembly with onboard electronics contained within it to receive system command function instructions from the system control microprocessor. It is the an objective of the present invention to provide an instrumentation package assembly with onboard electronics contained within it to provide a dynamic means of determining the relative physical position of the football with respect to pitch, yaw and roll.

It is the an objective of the present invention to provide an instrumentation package assembly with onboard electronics contained within it to provide pitch, yaw and roll positional data to be transmitted along with the televised image data to the remote base station. It is the an objective of the present invention to provide an instrumentation package assembly with onboard electronics contained within it to provide a network transceiver to wirelessly link the instrumented football by use of the 2.4 or 5.8 GHz radio spectrum, between the instrumented football and the remote base station, utilizing for example the 802.11(xx) Protocol. It is the an objective of the present invention to provide an instrumentation package assembly with onboard electronics contained within it to transmit and receive 802.11(xx) system control command packets for example, to and from the network transceiver. It is an objective of the present invention to provide an instrumentation package assembly with a network transceiver within it to transmit and receive control commands to and from the system control microprocessor. It is the an objective of the present invention to provide an instrumentation package assembly where control commands specify the exact RF channel frequency and RF channel power output that will be used during subsequent operation of the system. It is the an objective of the present invention to provide an instrumentation package assembly with phase array antennas to couple RF signals to the atmosphere within the unlicensed 2.4 or 5.8 GHz radio spectrum. It is the an objective of the present invention to provide an instrumentation package assembly with antennas yielding an isotropic gain of 3 db or better to reach the remote base station network transceiver via the antenna array relay junction in the sports stadium. It is the an objective of the present invention to provide an instrumentation package assembly with two antennas physically located inside the instrumented football between the two cameras It is the an objective of the present invention to provide an instrumentation package assembly with power supply electronics that supplies power to all the elements shown in FIG. 23. It is the an objective of the present invention to provide an instrumentation package assembly with a set of two wireless inductive pickup coils that are used to couple electrical energy from outside of the football to the rechargeable battery pack. It is the an objective of the present invention to provide an instrumentation package assembly with a battery charging and stand-by data separator circuit tuned by capacitors to resonate at a frequency near 250 KHZ. It is the an objective of the present invention to provide an instrumentation package assembly with a power supply that contains a switching circuit that receives control commands from system control microprocessor which instructs and enables the power supply to supply power to the rest of the system. It is the an objective of the present invention to provide a coded RF hand-held remote to initialize the electronics inside the instrumented football by taking the football electronics out of the standby-power mode and placing it in the power-on mode. It is the an objective of the present invention to provide an instrumentation package assembly with a self contained three-dimensional gyroscopic transducer comprised of three separate individual low power semiconductor based encoders which are configured at the time of manufacture to respond to a pre-determined action of motion specific to the direction of pitch, roll and yaw rotation, forward or backward motion and rise or fall conditions of the instrumented football in real-time.

FIG. 39A and FIG. 39B

The detailed physical elements disclosed in the instrumented professional league football drawings shown in FIG. 39A and FIG. 39B are identified as follows: 1 is the y-axis of both the instrumentation package assembly and the instrumented football. 2 is the slightly conical small diameter end of the buffer plate pressed into the machined bore of the cover/liner sandwich. 3 is the threaded sleeve window holder part of the buffer plate assembly with the small diameter bore. 4 is the curved interior surface of the buffer plate which is pressed against by the inflated pre-formed bladder. 5 is the tapered edge of the buffer plate. 6 is the large diameter bore in the buffer plate. 7 is an o-ring seal. 8 is an o-ring seal. 9 is an o-ring seal. 10 is an o-ring mounting grove. 11 is an o-ring mounting grove. 12 is an o-ring mounting grove. 13 is a buffer plate assembly. 14 is the exterior convex curved surface of the buffer plate that presses on and is bonded to the cover/liner sandwich. 15 is an o-ring seal. 16 is the thread in the buffer plate window assembly. 17 is an o-ring mounting grove. 18 is a TV camera. 19 is a camera lens. 20 is an optical window. 21 is the surface of the front element of the camera lens. 22 is an induction coil for wirelessly charging the battery package. 23 is the small diameter end of the instrumentation package assembly. 24 is the cylindrical segment of the skin of the instrumentation package assembly. 25 is the instrumented football's cover. 26 is the football's liner. 27 is the inside surface of the football's liner which is pressed on by the pre-formed bladder. 28 corrugated bellows segment of the skin of the instrumentation package assembly. 29 are the football's laces. 30 is the gap in the seam between the football's panels. 31 is the gas used to inflate the pre-formed bladder. 32 is the x-axis of the instrumented football's coordinate system. 33 is the z-axis of the instrumented football's coordinate system. 34 is the cylindrical segment of the skin of the instrumentation package assembly. 35 is the tapered edge of the buffer plate. 36 is the curved interior surface of the buffer plate which is pressed against by the inflated pre-formed bladder. 37 is the exterior convex curved surface of the buffer plate that presses on and is bonded to the cover/liner sandwich. 38 is a buffer plate assembly. 39 is the large diameter bore in the buffer plate. 40 is an o-ring mounting grove. 41 is an o-ring mounting grove. 42 is an o-ring mounting grove. 43 is the threaded sleeve window holder part of the buffer plate assembly with the small diameter bore. 44 is the slightly conical small diameter end of the buffer plate pressed into the machined bore of the cover/liner sandwich. 45 is an o-ring groove. 46 is the surface of the front element of the camera lens. 47 is the co-axis (x-axis) of the instrumentation package assembly and the instrumented football. 48 is an induction coil for wirelessly charging the battery package. 49 is the inside surface of the football's liner which is pressed on by the pre-formed bladder. 50 is the football's liner. 51 is the instrumented football's cover. 52 is a TV camera. 53 is the small diameter end of the instrumentation package assembly. 54 is an o-ring seal. 55 is an o-ring seal. 56 is a camera lens. 57 is an o-ring seal. 58 is an o-ring seal. 59 is the thread in the buffer plate window assembly. 60 is an optical window. 61 is the hollow cylindrical cavity wall inside the inflated bladder. 62 is the innermost surface of the hollow cylindrical cavity of the pre-formed bladder which presses on the skin of the instrumentation package assembly. 63 is the inside wall of the inflated bladder. 64 is the outside surface of the inflated bladder which presses on the instrumented football's liner. 65 are typical instrumentation package assembly electronics. 66 is the battery pack. 67 is the gas valve.

FIG. 39A is a side view section B-B of the instrumented football in FIG. 39B.

FIG. 39B is an end view section A-A of the instrumented football in FIG. 39A.

Referring to drawings FIG. 39A and FIG. 39B, in a preferred embodiment, an instrumented football is disclosed whose optical windows 20 and 60 are recessed into the vertices of the instrumented football's cover 51 with the window's outer optical surfaces being flush with the tips of the instrumented football cover's vertices. Recessing the optical windows 20 and 60 into the vertices of the instrumented football's cover has an advantage by making them less obtrusive to the players, and protects their outer optical surfaces better from damage during game play. In order to accomplish this, different buffer plate assemblies are required. The portals in the cover's vertices for the buffer plates are precision holes bored in each of the cover's vertices. The circumferences of the holes are precisely stitched to form a precision hole.

The present embodiment disclosed in FIG. 39A and FIG. 39B has an additional advantage in that it provides for quick trouble-free removal and replacement of the optical windows 20 and 60 by allowing them to be threaded in or out of the vertices of the instrumented football. This is accomplished by mounting the optical windows 20 and 60 in threaded sleeves 3 and 43 that screw into the buffer plate assemblies 13 and 38 respectively mounted in the vertices of the instrumented football. This facilitates the removal of damaged optical windows with new ones. It also facilitates the exchange of optical windows with alternative optical windows having different optical prescriptions. It also facilitates the easy removal and exchange of the camera lenses 19 and 56 by providing an access port through which they can be quickly and easily replaced. Removal of an optical window is achieved by unscrewing the threaded sleeve which carries the optical window from its threaded bore in the buffer plate assembly. Replacement of an optical window is achieved by screwing in another sleeve containing another optical window into its threaded bore in the buffer plate assembly. Removal of a camera lens is achieved by first unscrewing the threaded sleeve which carries the optical window that is in front of the camera lens from its buffer plate assembly; and then unscrewing the camera lens and removing it through the threaded bore in the buffer plate assembly. Replacement of an optical window is achieved by screwing in another sleeve containing another optical window into its threaded bore in the buffer plate assembly.

The preferred embodiment of the instrumentation package assembly 24 is disclosed in FIG. 40A and FIG. 40B and FIG. 40C.

Lightweight Exxon brand synthetic rubberized plastic materials are used to replace the conventional natural rubber bladder in order to reduce the weight of the bladder. Lightweight Exxon brand synthetic rubberized plastic materials are also used to replace the conventional liner in order to reduce the weight of the liner.

Referring to the Preferred Embodiments Specified in FIG. 39A and FIG. 39B, the instrumented professional league football satisfies all of the following further objectives:

It is an objective of the present invention to provide an instrumented professional league football having its spherical domed shaped optical windows recessed into the vertices of its cover with the window's outer optical surfaces being flush with the tips of the instrumented football cover's vertices. It is an objective of the present invention to provide an instrumented professional league football with removable and replaceable optical windows. It is an objective of the present invention to provide an instrumented professional league football with an easy means to remove and exchange camera lenses. It is an objective of the present invention to provide an instrumented football that carries its own rechargeable battery pack. It is an objective of the present invention to provide an instrumented football that carries its own rechargeable battery pack that carries sufficient energy to power the cameras, lenses, antennas and electronics for the duration of the football game. It is an objective of the present invention to provide an instrumented football that carries its own battery pack that is recharged wirelessly by induction. It is an objective of the present invention to provide and instrumented football whose weight, balance, moments of inertia, and center of gravity are identical to a regulation American football; and whose playability and handling qualities are identical to a regulation American football.

FIG. 40A and FIG. 40B and FIG. 40C

The detailed physical elements disclosed in the instrumentation package assembly drawings shown in FIG. 40A and FIG. 40B and FIG. 40C are identified as follows: 1 and 2 are miniature SD/HD TV cameras. 3 and 4 are signal compression modules. 5 and 6 are condenser microphones. 7 and 8 are operational amplifiers. 9 and 10 are audio encoders. 11 is a network transceiver for wirelessly transmitting and receiving radio signals. 12 is an MPEG stream encoder. 13 and 14 are intentional radiators or antenna elements. 15 is a system control microprocessor. 16 is a ROM, 17 is a RAM. 18, 19 is the instrumentation package assembly, and 20 are real-time pitch, roll and yaw gyroscope encoders. 21 is a power switching circuit. 22 is a power supply. 23 is a rechargeable battery pack which powers all the electronics in the instrumentation package assembly. 24 and 25 are tuning capacitors. 26 is a stand by data separator circuit. 27 and 28 are inductive pickup coils used to wirelessly charge by inductive coupling electricity from a charging station external to the football to the battery pack within the instrumentation package assembly. 29 and 30 are circuit boards used to mount the electronic components within the instrumentation package assembly. 31 and 32 are circular circuit boards used to mount the antenna elements and electronics components. 33 is the corrugated bellows section of the skin. 34 is the cylindrical skin section. 35 and 41 are the small diameter slightly conical ends of the instrumentation package assembly. 37 and 43 are shoulders on the ends of the instrumentation package assembly. 36 and 42 are the large diameter ends of the instrumentation package assembly. 38 and 44 are air and water tight seals between the camera lenses and the small diameter slightly conical ends of the instrumentation package assembly. 39 and 45 are the camera lenses. 40 and 46 are the front lens elements of camera lenses 39 and 45 respectively. 47 is the mechanical y-axis of the instrumentation package assembly and the optical axis of the cameras and their lenses. 48 is the x-axis. 49 is the z-axis.

FIG. 40A shows a side view section of the instrumentation package assembly used in the instrumented football shown in FIG. 39A and FIG. 39B.

FIG. 40B shows a top view section of the instrumentation package assembly used in the instrumented football shown in FIG. 39A and FIG. 39B.

FIG. 40C shows a bottom view section of the instrumentation package assembly used in the instrumented football shown in FIG. 39A and FIG. 39B.

Referring to drawings FIG. 40A and FIG. 40B and FIG. 40C, in a preferred embodiment, an instrumentation package assembly 19 provided in accordance with the invention, comprises two cameras 1 and 2, two camera lenses 39 and 45, two microphones 5 and 6, two antenna elements 13 and 14, battery pack 23, induction coils 27 and 28, supporting electronics (numerous), and an enclosure is disclosed. The enclosure of the instrumentation package assembly is essentially circularly symmetric about its y-axis.

The instrumentation package assembly 19 is an autonomous module for wirelessly televising pictures and sounds from the cameras 1 and 2 and microphones 5 and 6 from within its enclosure. It is under the command and control of the remote base station disclosed in FIG. 33A and FIG. 33B and FIG. 33C and FIG. 33D and FIG. 33E and FIG. 35A and FIG. 35C. Its enclosure is made up of several sections 33, 34, 35, 36, 37 38, 41, 42, 43, and 44. The picture and sounds are taken directly by the instrumentation package assembly's cameras 1 and 2 and microphones 5 and 6. The instrumentation package assembly is designed as a sealed unit to be mounted within the instrumented football that will be in play on the football field.

The instrumentation package assembly wirelessly communicates the pictures and sounds from within the instrumented football which is on the football playing field, to an antenna array located off the playing field, which then relays the pictures and sounds to a remote base station for final processing and dissemination. Refer to FIG. 33A and FIG. 33B and FIG. 33C and FIG. 33D and FIG. 33E and FIG. 35A and FIG. 35C for the specification of the antenna array and the remote base station.

FIG. 38 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 23.

From the vantage point of the football amongst the players on the field of play, using the instrumentation package assembly microphones 5 and 6, the audience can hear and feel the sounds produced by contact to the football's cover created by player's handling, passing, receiving, clutching, fumbling, sacking, kicking and crushing the football. For example, the TV audience will hear a loud blast as the football is kicked for a field goal. The TV audience will hear a crunching sound when the football is crushed beneath the players. The TV audience will hear a bumping sound when the football is fumbled and is freely bouncing on the ground. The TV audience will hear the whooshing sound of the air as the football is thrown to a wide receiver.

The optical axis 47 of the cameras within the instrumentation package assembly are aligned to be coaxial with the instrumentation package assembly's mechanical y-axis. The cameras are positioned at either end of the instrumentation package assembly and look out through the football's vertices through the portals in the buffer plate assemblies. The mechanical y-axis 7 of the instrumentation package assembly is aligned coaxially with the mechanical x-axis of the football after mounting the instrumentation package assembly inside the football. The instrumentation package assembly is mounted inside the football using a pair of buffer plates that act as bearings for the instrumentation package assembly. There is one buffer plate supporting each end of the instrumentation package assembly.

The instrumentation package assembly contains two miniature SD/HD TV cameras 1 and 2 and two condenser microphones 5 and 6 and supporting electronics. The cameras, microphones and supporting electronics are housed together within the skin 34 of the instrumentation package assembly which is mounted inside the instrumented football. Each one of the two TV cameras and microphones are located at their respective ends of the football. The TV cameras are aligned within the instrumentation package assembly so they share a common optical axis, each one looking out in opposite directions from the instrumentation package assembly through the portals in the cover's vertices. The portals in the cover's vertices are precision holes bored in each of the cover's vertices. The circumferences of the holes are precisely stitched to form precision holes.

The condenser microphones are attached to the top interior wall of the instrumentation package assembly's skin 34. The microphones hear any sounds produced by physical contact of the football's cover with any external thing, including for example air currents felt on the cover during the football's flight in the air when being passed.

The instrumentation package assembly's skin 34 is made of polycarbonates, ABS and fiber reinforced plastics which are strong and also are non-conductors of electricity. It is necessary to use a skin made of a non-conducting material so as to allow radio signals to radiate thru the enclosure from the antenna elements within the skin, for the purpose of televising signals by wireless communications to and from the remote base station.

The instrumentation package assembly's network transceiver 11 wirelessly transmits real-time pictures and sounds from the football's cameras and microphones via duel parallel antenna array elements 13 and 14, also known as intentional radiators, to a remote base station. The duel parallel antenna array elements are axially mounted between the two circular circuit boards 29 and 30.

As an alternative example, the duel parallel antenna array 13 and 14 could be replaced with a helix antenna (not shown) with similar dimensions wound on the inside diameter of the instrumentation package assembly down the length of its skin 34 between the two circular circuit boards 29 and 30. The diameter of the circular circuit boards is such as to provide a slip fit with the inside diameter of the skin.

The antenna array shown in FIG. 33A and FIG. 33B and FIG. 33C and FIG. 33D and FIG. 33E and FIG. 35A and FIG. 35C is deployed in the stadium and receives radio signals from the football's antenna array elements 13 and 14. Antenna array elements 13 and 14 are in quadrature to radiate radio signals to the antenna array relay junction with sufficient gain so as to overcome RF noise and provide for a large enough gain bandwidth product to accommodate real-time SD/HD picture quality requirements. The instrumentation package assembly's network transceiver 11 also provides a wireless means for the football to receive command and control radio signals from the remote base station.

The instrumentation package assembly's battery pack 23 is wirelessly charged before and during games on an as needed basis. Charging of the battery pack 23 is accomplished wirelessly by inductive coupling. The instrumented football's inductive pickup coils 27 and 28 act as the secondary windings on an air core transformer. Time varying magnetic flux is furnished to 27 and 28 by the primary windings of the charging station with a frequency of about 250 kHz.

Each TV camera looks out in opposite directions from its respective end of the instrumentation package assembly. Consequently the instrumentation package assembly enables each TV camera to look out in opposite directions from its respective end of the instrumented football along the football's long axis of symmetry. Each of the two microphones listens for sounds from the playing field from their respective ends of the football. The two condenser microphones enable the viewing audience to hear real-time contacts, impacts and shocks to the football. Simultaneously live TV pictures are taken by each of the two TV cameras of their respective fields of view of the live action on the playing field. The condenser microphones have good quality, small size, and small weight; and they consume low power. As newer better microphone technologies become available, they will be used in other preferred embodiments of the current invention.

The images of the horizon provide horizontal reference data used by the image recognition and processing software in the remote base station to yield pictures that appear stabilized and upright to the viewing audience regardless of the instrumented football's spatial attitudes and dynamic motions on the field. The images of the horizon are accomplished using camera lenses with extremely wide fields of view; for example, fish-eye zoom lenses. The image data of the horizon, acquired with lenses having extremely wide viewing angles, is used in the image processing software as a horizontal frame of reference to yield finally broadcast TV pictures that appear stabilized and upright to the TV viewing audience. In addition, frames of reference used for yielding stabilized and upright real time pictures are also obtained from the real-time pitch, roll and yaw gyroscope encoders 18, 19, and 20.

The horizon is herein defined as the visual departure line between the sky and the ground in the images. The horizon may also be the departure line between the sky and structures on the ground, as is the case where the playing field is inside a football stadium. Horizon data from these images supplements the pitch, roll and yaw data from the three gyroscopes in the instrumentation package assembly. Together this data is used to assist the processing hardware and software in the base station to stabilize and make upright the pictures received from the two cameras, regardless of the dynamic motion and spatial orientation of the football. As the football is made to execute habitual twisting, turning and spinning routines by the players, the audience still finally sees processed real-time stable upright pictures of the players and the playing field. Although an occasional bounce, jump, bump or tilt of the pictures is tolerable, if the pictures were not largely stable and upright, the viewing audience would quickly grow weary and dizzy.

The diameter of the instrumentation package assembly is kept to a minimum in order to minimize its moment of inertia about the three axes. The dimension of the outside diameter of the corrugated skin 33 of the instrumentation package assembly is governed largely by the physical diagonal dimension of the largest components within the instrumentation package assembly, like the camera's CCD sensor array and the battery.

The battery's charging coils 27 and 28 are wound on the outside diameter at both ends of the instrumentation package assembly's skin and act electrically as a transformer's secondary winding. The coils are wound on the outside diameter of the instrumentation package assembly to keep any heat they may produce away from the contents of the instrumentation package assembly while the battery is being charged. The number of turns in each charging coil is made large enough to inductively couple a sufficient number of magnetic lines of flux from the primary coil of the battery charging station so as to charge the battery in a reasonably short time before and during games. When the football is placed in the battery charging station, the charging coils 27 and 28 receive electrical energy inductively coupled from the primary coils of the charging station.

The instrumentation package assembly has a flexible corrugated bellows skin section 33 and two cylindrically smooth sections like 34. The length of the instrumentation package assembly is approximately the length of the inflated football measured along its y-axis (i.e. about 11 inches).

The corrugated section 33 of the instrumentation package assembly's skin allows the instrumentation package assembly to be folded to facilitate inserting the instrumentation package assembly through the gap 5 in the seam in the football's cover shown in FIG. 1. Additionally, the corrugated section 33 allows the instrumentation package assembly to act as a spring and compress or expand or twist its length without damaging the contents of the instrumentation package assembly. When circumstances arise where the players tend to crush the football, the instrumentation package assembly will compress or expand or twist.

The instrumentation package assembly is filled with a dry pressurized gas like nitrogen to prevent the entry of moisture or dirt. The seal between the optical windows and the enclosure prevents the dry gas from leaking out of the enclosure.

A desiccant is disposed near the TV lenses and optical windows to collect and prevent any moisture build-up.

A variety of different camera lens types, with different lens setting capability, are used providing they are small in size and weight. The auto iris setting permits the camera lens to automatically adjust for varying lighting conditions on the field. The auto focus setting permits the camera lens to adjust focus for varying distances of the players and action subjects on the field. The zoom setting permits the camera lens to adjust focal lengths and image size/magnification. These functions/settings are controlled by the cameraman in the remote base station by wirelessly transmitting command and control signals from the remote base station to the instrumentation package assembly inside the instrumented football. The auto focus and auto iris are frequently run in the automatic mode under control of each of the TV camera's electronics.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 39 and 45 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 39 and 45 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 39 and 45 to be identical to one another. In many venues the cameraman will choose to use identical settings in both lenses 39 and 45 so that the TV viewing audience will see the same from either end of the instrumented football.

Referring to the Preferred Embodiments Specified in FIG. 40A and FIG. 40B and FIG. 40C, the instrumentation package assembly satisfies all of the following further objectives:

It is an objective of the present invention to symmetrically package the components of the instrumentation package assembly around the x-axis, y-axis and z-axis of the instrumentation package assembly in order to balance the weight around each axis. It is an objective of the present invention to symmetrically package the components of the instrumentation package assembly around the x-axis, y-axis and z-axis of the instrumentation package assembly in order to minimize the moments of inertia around each axis. It is an objective of the present invention for the instrumentation package assembly to provide a means for wirelessly televising the video and audio of football games from inside an instrumented football that is in play on the football playing field. It is an objective of the present invention for the instrumentation package assembly to provide a means for televising the video of football games from TV cameras that look out onto the playing field from both ends of the instrumented football. It is an objective of the present invention for the instrumented football to furnish portals through its cover through which the two cameras packaged within the instrumentation package assembly can see out onto the playing field from inside the instrumented football. It is an objective of the present invention for the instrumentation package assembly to include two TV cameras, two microphones, bi-directional wireless communications electronics, RF antennas, gyroscope encoders, magnetic induction coils, battery charging electronics, power supply electronics, support electronics and a battery pack. It is an objective of the present invention for the instrumentation package assembly to include two microphones to hear sounds generated by contacts with the instrumented football's cover and are wirelessly transmitted to, and processed by, the remote base station to produce HD stereophonic surround sound of the events on the playing field to the TV audience. It is an objective of the present invention for the instrumentation package assembly to include a rechargeable battery pack which can be wirelessly charged by magnetic induction. It is an objective of the present invention for the instrumentation package assembly to wirelessly televise pictures and sounds of the game to a remote base station located within the vicinity of the football stadium, via an RF antenna array relay junction located in the football stadium outside the boundaries of the playing field. It is an objective of the present invention for the instrumentation package assembly to wirelessly transmit the gyroscope encoder data from the instrumented football to the remote base station for processing. It is an objective of the present invention for the instrumentation package assembly to be commanded and controlled wirelessly by the remote base station by means of a bi-directional data communications link using an RF antenna array relay junction located in the football stadium between the instrumented football and the remote base station. It is an objective of the present invention for the instrumentation package assembly to use a variety of camera lenses including ones having extremely wide viewing angles of the football field. It is an objective of the present invention for the instrumentation package assembly to use camera lenses having settings for zoom, focus and iris. It is an objective of the present invention for the instrumentation package assembly to use camera lenses having settings for auto zoom, auto focus and auto iris. It is an objective of the present invention for the instrumentation package assembly to use camera lenses having settings for zoom, focus and iris which are controlled wirelessly from the remote base station by the cameraman and/or automatically by software in the remote base station. It is an objective of the present invention for the instrumentation package assembly to be sized properly so it can be inserted into the instrumented football through the identically conventionally sized lacing gap in the seam of the cover of a conventional regulation football. It is an objective of the present invention for the instrumentation package assembly to be sized properly so it can be withdrawn from the football through the identically conventionally sized lacing gap in the seam of the cover of a conventional regulation football. It is an objective of the present invention for the instrumentation package assembly to be cradled and isolated from shock and vibration by the instrumented football's bladder. It is an objective of the present invention for the instrumentation package assembly to be shielded from damage by the optical windows which are part of the buffer plate assemblies. It is an objective of the present invention to make the instrumentation package assembly flexible so it can be bent and inserted into the instrumented football through the conventional identical lacing hole pattern slot in the cover/liner sandwich of a conventional regulation football. It is an objective of the present invention to make the instrumentation package assembly flexible so it can be bent and inserted into the football through the identical conventional lacing hole pattern slot in the cover of a conventional regulation football. It is an objective of the present invention to make the instrumentation package assembly press axially along the y-axis on the buffer plate assemblies so the instrumentation package assembly will maintain its alignment between the buffer plate assemblies under conditions of shock and vibration. It is an objective of the present invention for the instrumentation package assembly to take compressive, twisting and stretching impacts and loads. It is an objective of the present invention to prop up the cover of the instrumented football to take the identical vesica piscis shape as the covers of conventional regulation footballs. It is an objective of the present invention for the instrumented football to use the identical cover used by conventional regulation footballs. It is an objective of the present invention for the instrumented football to be laced using the identical laces used by conventional regulation footballs. It is an objective of the present invention for the instrumented football's bladder to be inflated with gas to the identical pressure used by conventional regulation footballs. It is an objective of the present invention to process the pictures captured by the two cameras from inside the instrumented football, and make them appear stabilized and upright to the viewing audience regardless of the instrumented football's spatial attitudes and dynamic motions. It is an objective of the present invention for the instrumentation package assembly to be shock resistant and ruggedized to endure the rigors of the game. It is an objective of the present invention for the instrumentation package assembly to include two miniature SD/HD TV cameras, signal compression modules, two condenser microphones, two operational amplifiers, two audio encoders, a network transceiver, a MPEG stream encoder, two antenna elements, a system control microprocessor, a ROM, a RAM, real-time pitch, roll and yaw gyroscope encoders, a power switching circuit, a power supply, a rechargeable battery pack, two tuning capacitors, a stand by data separator circuit, two inductive pickup coils, circuit boards, corrugated bellows section, cylindrical skin section, small diameter slightly conical ends, machined shoulders on the ends, large diameter ends, air and water tight seals, and two camera lenses.

Figures 41A, 41B:
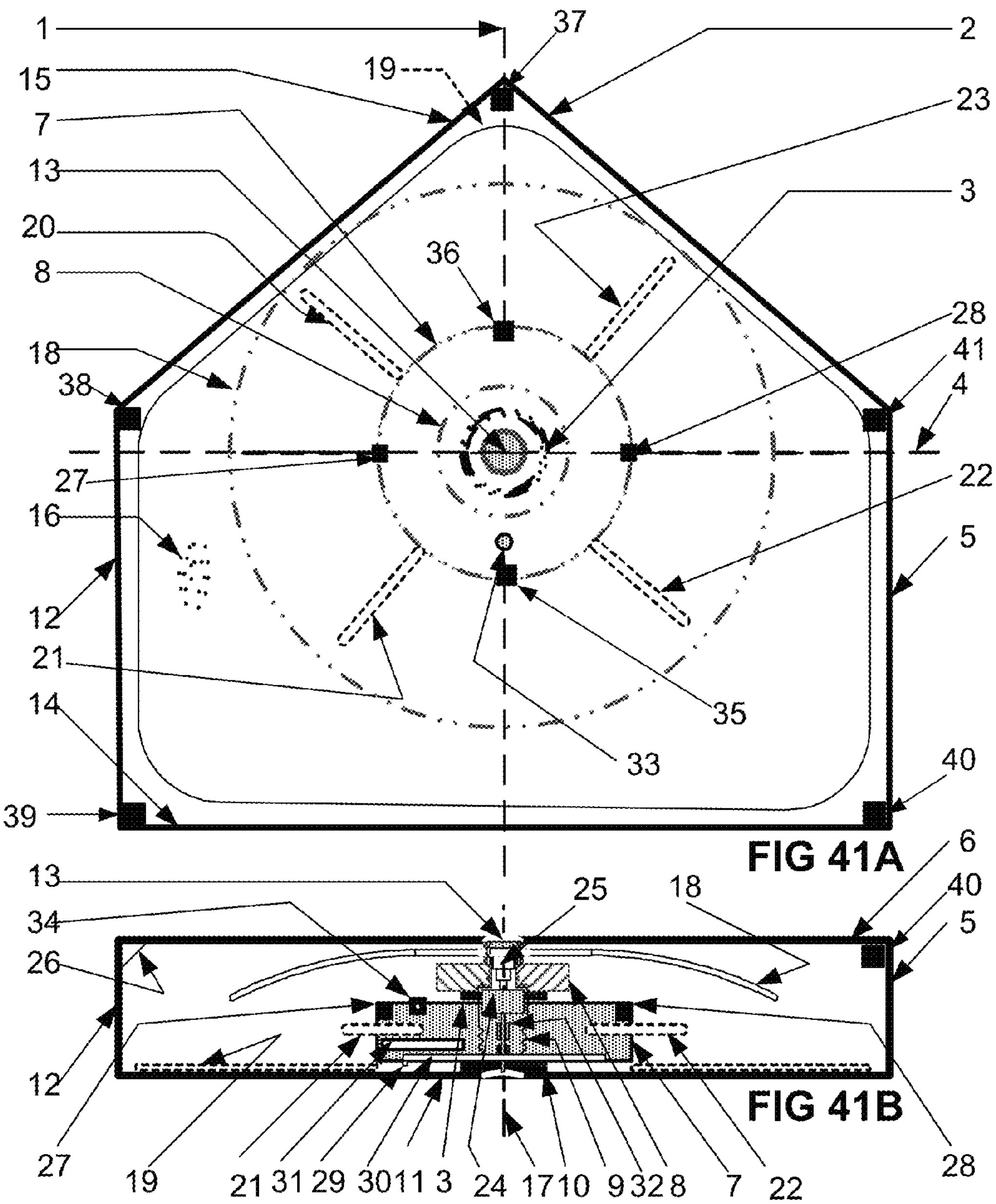
FIG. 41A is a top view of a one-camera instrumented baseball home plate.
FIG. 41B is a side view of a one-camera instrumented baseball home plate.

FIG. 41A and FIG. 41B

The detailed physical elements disclosed in the instrumented baseball home plate drawings shown in FIG. 41A and FIG. 41B are identified as follows: 1 is the y-axis of symmetry of the instrumented baseball home plate. 2 is the instrumented baseball home plate. 3 is the upper induction coil used to charge the battery pack inside the instrumentation package assembly. 4 is the x-axis of symmetry of the instrumented baseball home plate. 5 is the left side of the instrumented baseball home plate. 6 is the top of the instrumented baseball home plate. 7 is the central body of the instrumentation package assembly. 8 is the Type VIII buffer plate assembly. 9 is the bellows segment of the instrumentation package assembly. 10 is the lower induction coil used to charge the battery pack inside the instrumentation package assembly. 11 is the bottom of the instrumented baseball home plate. 12 is the right side of the instrumented baseball home plate. 13 is the plane-parallel-flat optical window. 14 is the side of the instrumented baseball home plate that faces the pitcher. 15 is the side of the instrumented baseball home plate. 16 is the shock absorbing encapsulating material. 17 is the z-axis of the instrumented baseball home plate and the optical z-axis of the instrumentation package assembly and camera 24. 18 is the upper protective cover plate shield. 19 is the lower protective cover plate shield. 20 is a wireless radio antenna. 21 is a wireless radio antenna. 22 is a wireless radio antenna. 23 is a wireless radio antenna. 24 is the camera. 25 is the camera lens. 26 is the beveled edge around the top of the home plate. 27 is a microphone. 28 is a microphone. 29 is a gas valve. 30 is an access lid heat sink. 31 is the battery pack. 32 is the electronics. 33 is a microphone. 34 is a microphone connector. 35 is a microphone. 36 (not shown). 37 is a microphone. 38 is a microphone. 39 is a microphone.

40 is a microphone. 41 is a microphone.

FIG. 41A is a top view of a one-camera instrumented baseball home plate.

FIG. 41B is a side view of a one-camera instrumented baseball home plate.

Referring to drawings FIG. 41A and FIG. 41B, in a preferred embodiment, an instrumented baseball home plate is disclosed. The instrumented baseball home plate employs a single camera instrumentation package assembly 7 substantially identical to the instrumentation package assembly shown in FIG. 19A and FIG. 19B and FIG. 19C. It uses the Type VIII buffer plate assembly 8.

The present invention contemplates an instrumented baseball home plate, which when stationed on any baseball playing field at any traditional home plate location, can wirelessly and autonomously televise baseball games under command and control of the remote base station. The remote base station is disclosed in FIG. 30A and FIG. 30B and FIG. 31A and FIG. 31B and FIG. 32A and FIG. 32B.

The present invention also contemplates the instrumented baseball home plate to be equipped with an instrumentation package assembly 7 that is mounted and encapsulated inside the instrumented baseball home plate, which wirelessly televises pictures and sounds of baseball games from its camera 24 and its microphones 27, 28 and 33 contained therein.

The camera 24 is housed in an instrumentation package assembly element 9 which is a principal part of the instrumentation package assembly. Details of the instrumentation package assembly is shown in FIG. 19A and FIG. 19B. The instrumentation package assembly uses the identical instrumentation package assembly element disclosed in FIG. 19D.

It is understood that as the state of the art in TV camera 24 technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and therefore the present invention is not confined only to their sole use in the future.

Referring to the disclosed instrumented baseball home plate shown in FIG. 41A and FIG. 41B, the instrumented baseball home plate has a single instrumentation package assembly 7 mounted inside the instrumented baseball home plate. The instrumentation package assembly 7 is encapsulated inside the instrumented baseball home plate using a shock absorbing white rubber encapsulating material 16 that fills the entire cavity of the instrumented baseball home plate.

Details of instrumentation package assembly 7 are shown in FIG. 19A and FIG. 19B and FIG. 19C. The instrumentation package assembly 7 has a single instrumentation package assembly element which is one of its principal components and is disclosed in FIG. 19D. The instrumentation package assembly 7 carries a single CCD sensor arrayed camera 24 and two microphones 27 and 28. The camera 24, camera lens 25 and electronics 32 are parts of the instrumentation package assembly element disclosed in FIG. 19D.

The instrumentation package assembly 7 is mechanically mounted inside the instrumented baseball home plate using the buffer plate assembly 8. The upper small diameter end of the instrumentation package assembly element is shown plugged into the buffer plate assembly 8. The buffer plate assembly 8 is embedded and encapsulated into the instrumented baseball home plate using the shock absorbing material 16. The instrumentation package assembly 7 is mechanically protected inside the instrumented baseball home plate using an upper and lower protective cover shields 18 and 19 respectively.

The two protective cover plates 18 and 19 are embedded and molded into the instrumented baseball home plate using the shock absorbing material 16. Protective cover plate 18 is on the top and protective cover plate 19 is on the bottom of the instrumented baseball home plate. The top protective cover plate 18 is referred to as the upper protective cover plate. It is shown in FIG. 56. The bottom protective cover plate 19 is referred to as the lower protective cover plate. These protective cover plates 18 and 19 sandwich the instrumentation package assembly 7 between them and protect it and its contents from being damaged.

Except for the optical windows, the external appearance of both the instrumented baseball home plate and the conventional baseball home plate are identical, both being made of the same white rubber material 16. In addition, their size, shape, color and texture are identical. The weights of the instrumented baseball home plate and the conventional baseball home plate are nearly identical. Details of the conventional baseball home plate are shown in FIG. 41.

The instrumentation package assembly 7 is sandwiched between the top and bottom protective cover plates 18 and 19. The purpose of these protective cover plates 18 and 19 is to act as mechanical shields to protect the instrumentation package assembly 7 from being damaged by impacts during the game. During the normal course of the game, the top of the instrumented baseball home plate will be hit and crushed by the players and by their equipment. For example, the players may step on the instrumented baseball home plate or slide into it. They may even drop their bats on it. The two protective cover plates 18 and 19 protect the instrumentation package assembly 7 within the instrumented baseball home plate from physical damage due to these hits.

The outermost body region of the top protective cover plate 18 is made substantially spherically dome shaped. There is a flat region in the middle of the upper protective cover plate 18 surrounding the clearance bore for camera 24. The entire body of the bottom or lower protective cover plate 19 is made flat. The top and bottom protective cover plates 18 and 19 both have rounded outer edges. The edges are rounded to insure that the baseball players will not be injured by them if the players crash into the instrumented baseball home plate.

A variety of materials can be chosen for the protective cover plates 18 and 19 in the present preferred embodiment. Material examples are polycarbonates, ABS, and fiber reinforced plastics. These materials have the advantage that they are lightweight and stiff, enabling the thickness of the cover plates to remain thin while still delivering the significant stiffness needed to perform their protective function of mechanical shielding the instrumentation package assembly in the limited space they can occupy within the instrumented baseball home plate. They have the additional advantage in that they are transparent to the transmitted and received radio waves which need to move to and from the wireless radio antennas 20, 21, 22, and 23 inside the instrumented baseball home plate without absorption or reflection therein.

The space between the top, bottom and sides of the instrumented baseball home plate and the protective cover plates 18 and 19 is filled with encapsulating material 16. Synthetic rubber is an example of encapsulating material that is used. When cured, this encapsulating material 16 acts as cushioning to absorb shock and vibration to the instrumented baseball home plate that may be transferred to the instrumentation package assembly 7. The molding material 16 encapsulates the upper and lower protective cover plates and maintains their positions inside the molded instrumented baseball home plate. The space between the protective cover plates and the instrumentation package assembly 7 is also filled with the same encapsulating material 16. When cured, this encapsulating material acts as cushioning to absorb shock and vibration to the instrumentation package assembly 7. The molting material encapsulates the instrument package assembly 7 inside the instrumented baseball home plate and thereby maintains its position inside the molded instrumented baseball home plate. The top edge 26 of the instrumented baseball plate is beveled at 45 degrees the same as the standard conventional professional league baseball plate in order to protect the players who hit against it.

The top protective cover plate 18 is spherically dome shaped in its outer region, and flattened in its inner region close to the optical window 13. The purpose of making it flattened near the optical window 13 is to provide maximum protection for the optical window 13 whose surface is at the very top of the instrumented baseball home plate. The flattened shape enables the protective cover plate 18 to surround the optical window 13 at the top of the instrumented baseball home plate where the optical window 13 is most likely to be exposed to the greatest threat of damage due to hits to the top of the instrumented baseball home plate. The upper protective cover plate 18 is buried in encapsulating material at the center top of the instrumented baseball home plate around the optical window 13. The dome shape enables the upper protective cover plate 18 to come very close to the top center of the instrumented baseball home plate where the players will have only grazing contact with its surface 6 if they crash into the instrumented baseball home plate, thereby eliminating the threat of injury to the players if they hit the top of the instrumented baseball home plate.

The spherical shape of the upper protective cover plate 18 causes its edge to be rounded downward and away from the top of the outer skin and places the edge well below the top surface 6 of the outer skin of the instrumented baseball home plate and away from the players.

The lower protective cover plate 19 is flat and is buried in the encapsulating material 16 just above the bottom surface 11 of the instrumented baseball home plate. The body of the lower protective cover plate 19 can be made flat because it is buried in the ground and there is no danger of the baseball players coming into violent contact with it. The flat shape is easier to make and less expensive to manufacture. It can also be made thicker than the upper protective cover plate 18 because there is more free space near the bottom of the instrumented baseball home plate that it can occupy. Its thickness is not physically restrained because of its location, as is the case with the upper protective cover plate 18 which is physically located between the top surface 6 and the buffer plate 8.

In both cases, the rounded edges of the protective cover plates 18 and 19 are substantially distant from the top 6 of the instrumented baseball home plate to protect the players from impacting against them. The top protective cover plate 18 is detailed in FIG. 56. The edge of the top protective cover plate 18 is rounded and all sharp corners are removed so as to make it safe to the players if they press violently against the instrumented baseball home plate.

The outer body of the top protective cover plate 18 is made spherically dome shaped. The spherical top of the dome faces upward. The top protective cover plate 18 has a bored hole in it. The purpose of the bore is to permit the cylindrical end of the buffer plate 8 containing the camera 24 optical window 13 to pass through it, and through the encapsulating material 16, and through the top 6 of the instrumented baseball home plate. The top protective cover plate 18 is made flat in its inner region near to its circular bore so it can surround the optical window 13 near the very top of the instrumented baseball home plate and shelter it from hits, while its spherical dome shape in its outer region keeps the edge of the protective cover plate 18 far down below the top of the instrumented baseball home plate and well below the surface of the playing field within the ground, so the edge would not be felt by the players if they impacted on the top surface of the instrumented baseball home plate. The body of the bottom protective cover plate 19 is made flat and has rounded corners like the top protective cover plate 18 for the same reason.

The upper protective cover plate 18 protects the instrumentation package assembly 7 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 6 of the instrumented baseball home plate 2 and the upper protective cover plate 18 is filled with a resilient encapsulation padding material 16. The entire volume between the upper protective cover plate 18 and the instrumentation package assembly 7 is filled with the same resilient encapsulation padding material 16. The domed shape of the upper protective cover plate 18 is very important. It completely covers and wraps the instrumentation package assembly 7 and its radio antennas 20, 21, 22, and 23, which are below it, and diverts trauma and forces that occur to the top 6 of the instrumented baseball home plate 2 during the game away from the instrumentation package assembly 7 and its antennas 20, 21, 22, and 23. The outer edge of the upper protective cover plate 18 is bent downward and past the outermost tips of the radio antennas 20, 21, 22, and 23 to protect them. The curvature of the upper protective 18 cover plate 18 is made large enough so that the dome completely covers around them. The dome shape allows the thickness of the padding 16 between the top 6 of the instrumented baseball home plate 2 and the upper protective cover plate 18 to increase as the radial distance from the center 13 of the instrumented home plate 2 increases outwardly.

The optical window 13 permits the camera 24 mounted inside the instrumentation package assembly 7 of the instrumented baseball home plate 2 to look out through the top 6 of the instrumented baseball home plate 2 onto the playing field during a baseball game and be protected from hazards such as rain, dirt and physical impacts. The hole in the top 6 of the instrumented baseball home plate 2 is made just large enough to prevent vignetting of the camera's field of view.

The optical window 13 is sealed to the small diameter cylindrical end of the buffer plate 8. The seals are airtight and waterproof to protect the camera 24, microphones 27 and 28, and the electronics within the instrumentation package assembly 7.

The optical window 13 is made strong to protect the camera lens 25 and camera 24 that are located beneath it. The optical window 13 is hard coated by vapor deposition with materials such as MgFl or SiO2 to help prevent the outermost window 13 surface from being scratched during the game. The optical window 13 material itself is chosen to be strong. It is made from hard optical glass such as barium lanthanum borate glasses, or hard optical plastic like acrylic or polycarbonate, both of which are scratch resistant.

The optical window 13 is made small to make it inconspicuous to the players, and substantially preserve the instrumented baseball home plate's look-alike quality with the conventional major league home plate; while still retaining sufficient clear aperture for the camera lens 25 to see events with SD/HD resolution on the playing field in prevailing light. A typical optical window 13 ranges in size from about ⅛ inch to ½ inches in diameter. Besides its small size, the optical window 13 is made additionally inconspicuous by making its antireflection coating a straw color to match the tan coloration of the ground dust around the instrumented baseball home plate.

The optical window 13 is plane-parallel-flat. It is disposed at the intersection of the x-axis and y-axis of the instrumented baseball home plate. The optical window 13 is positioned on the top of the instrumented baseball home plate so it is aligned with the chin line of the average batter, and roughly at the same location as the center of gravity of the conventional major league home plate shown in FIG. 41.

Optical windows having a spherical dome shape can also be used when a larger field of view is desired. The flat optical window can be easily unscrewed from the front of the buffer plate assembly 8 and replaced with a spherically domed shaped window. In another preferred embodiment, the outer surface of the window is spherical in shape and convex outward and shell-like as is necessary to permit the camera to see fields of view with extremely wide viewing angles approaching 90 degrees off the optical axis of the cameras. Shell-like implies that the inner and outer spherical surfaces of the optical window are concentric. In applications where extremely wide viewing angles are not required, the optical window surfaces can be made flat and plane parallel. The shell-like windows enable the camera to use lenses that have extremely wide viewing angles approaching 90 degrees off the optical axis of the camera lens without introducing bothersome optical aberrations and vignetting. The shell-like shape of the windows also imparts increased physical strength to the windows.

The optical window 13 is attached to buffer plate 8. The optical window 13 provides a portal through which cameras lens 25 can see out onto the playing field from inside the instrumented baseball home plate. The encapsulating material 16 provides shock absorbing padding between the outer top surface 6 of the instrumented baseball home plate and the protective cover plate 18. The encapsulating material 16 provides shock absorbing padding between the protective cover plate 18 and the buffer plate 8.

Camera lens 25 looks out thru the top 6 of the instrumented baseball home plate through its optical window 13 at objects angularly spread out around its respective axial line of sight 13 and images the objects it sees onto camera 24.

A variety of different camera lens 25 types with different lens setting capabilities, focal lengths and fields of view can be used. When enabled by the operator/cameraman in the remote base station, the auto iris setting permits the camera lens 25 to automatically adjust for varying lighting conditions on the field. The auto focus setting permits the camera lens 25 to adjust focus for varying distances of the players and action subjects on the field. The cameraman may elect to control the functions of the camera lenses himself from the remote base station by sending command and control signals from the remote base station to the instrumented baseball home plate. The cameraman can zoom, focus, and control the iris settings of the camera lenses from the remote base station.

For example, when a baseball is hit, and a player is rounding the bases, the distance of a player from home plate may be increasing or decreasing. The camera 24 within the instrumented baseball home plate can be independently and simultaneously commanded and controlled to auto focus on the player. As the player is rounding third base, if he decides to run for home plate, the instrumented baseball home plate's camera 24 and microphones 27 and 28 will capture all the action. While the player is running, his pictures and sounds are being wirelessly transmitted from the instrumentation package assembly 7 inside the instrumented baseball home plate to the remote base station for processing. The sounds received from each of the microphones by the remote base station are processed using special software to produce surround sound which is broadcast to the TV viewing audience.

If the player decides to slide into home plate, the instrumented baseball home plate camera 24 will enable the viewing audience to see the player slide into home plate, up close. The camera 24 will catch a detailed image of the player's sharp cleats as they strike the plate. The TV audience will experience the flight of chunks of dirt being thrown onto the plate. The microphones 27 and 28 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate.

Camera 24 is mounted inside the instrumentation package assembly 7. The optical axis 17 of the camera 24 is perpendicular to the top 6 of the instrumented baseball home plate. This arrangement permits the camera 24 to look upward and around its z-axis 17 from out of the top 6 of the instrumented baseball home plate. Utilization of an extremely wide angle lens 25 allows the TV viewing audience to see past the pitcher and down to the horizon of the baseball stadium.

When a player is running toward the instrumented baseball home plate from third base, the camera 24 can see where he is coming from. The camera 24 can see the player as he runs and touches the instrumented baseball home plate. The camera 24 can see the player as he is sliding into the instrumented baseball home plate. The TV audience will see and hear the player's cleats as they hit the instrumented baseball home plate. The camera 24 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The camera 24 vantage point at the instrumented baseball home plate gives the audience a viewing angle of the game never seen before by television viewing audiences. The instrumented baseball home plate's camera 24 gives the TV viewing audience unending contemporaneous shots that get across a sense of the action of being there—like a player in the game, which prior art cameras looking on from their disadvantaged viewing points from outside the playing field cannot get across.

The top 6 of the instrumented baseball home plate sits horizontally flat on the baseball playing field. The optical axis 17 of the camera 24 is the z-axis of the instrumentation package assembly 7 and the z-axis of the instrumented baseball home plate. Axis 17 is perpendicular to the top 6 of the instrumented baseball home plate. The instrumented baseball home plate is oriented in space so its z-axis 17 is perpendicular to the baseball field and pointing skyward.

The camera 24 looks upward out from the top 6 of the instrumented baseball home plate along and around its optical axis 17 through optical window 13. The camera 24 is aligned within the instrumentation package assembly 7 so that the camera 24 yields a wirelessly transmitted upright image to the TV viewing audience via radio antennas 20, 21, 22 and 23.

In the present preferred embodiment, camera 24 uses an extremely wide angle lens 25 with zoom capability. Even though camera 24 is pointed skyward, it can see past the pitcher along y-axis 1 right down to the outfield stadium horizon because of its near 180 degree field of view. This is a distinct advantage of extremely wide angle lenses over other types of lenses. However, it should be pointed out that the cameraman may elect to use a variety of camera lenses 25 with different capabilities depending on the visual effects he wishes to convey to the TV viewing audience. For example, the cameraman may elect to use a camera lens 25 with a narrower field of view in order to concentrate the attention of the TV viewing audience on the batter's taut and sweaty stubble face.

The camera 24 is aligned within its instrumentation package assembly 7 so that it yields wirelessly transmitted upright images of objects that appear in the TV picture frame between the center and the bottom of the TV picture frame. This alignment is controlled remotely from the remote base station by the cameraman. This can be accomplished in any one of four different primary modes. Each of these modes conveys its own spectacular viewing angle of the game to the TV viewing audience. Each of these four modes is achieved by physically rotating the camera 24 and its lens 25 about the z-axis 17 by using a electro-mechanical actuating device that is mechanically coupled to the camera 24 and lens 25 inside the instrumentation package assembly element.

Refer to FIG. 19D for the specification of the instrumentation package assembly element, and the electro-mechanical actuating device and its eight mechanical stops. The electro-mechanical actuating device has four primary stops that are mechanically detented 90 degrees apart from one another. The mechanical actuating device has four secondary mechanical stops that are mechanically detented 90 degrees apart from one another, and are angularly located 45 degrees between the primary mechanical stops. The electro-mechanical actuating device is housed within the instrumentation package assembly 7. The electro-mechanical actuating device can rotate and detent the camera 24 and lens 25 together to any one of its eight stops. The cameraman in the remote base station selects which of the eight mechanical stops is to be used, and sends a signal to the instrumentation package assembly 7 to set the camera 24 and lens 25 to the desired mechanical stop he selected.

The horizontal space around the center of the instrumented baseball home plate's instrumentation package assembly is indexed electronically into a counter-clockwise sequence of eight angular directions. Each angular direction is forty-five degrees apart from its sequential predecessor. The center of the instrumentation package assembly is where the x-axis 4 intersects the y-axis 1 and the z-axis 17. The x-axis 4, y-axis 1, and the z-axis 17 are orthogonal to one another.

In order of their sequence, the eight angular directions are the pitcher, forty-five degrees counter-clockwise from the pitcher, the right handed batter, forty-five degrees counter-clockwise from the right handed batter, the catcher, forty-five degrees counter-clockwise from the catcher, the left handed batter, and forty-five degrees counter-clockwise from the left handed batter.

The eight angular directions are referenced to the parts of the instrumented baseball home plate as follows: side 14, forty-five degrees counter-clockwise from side 14, side 5, side 2, the apex, side 15, side 12, and forty-five degrees counter-clockwise from side 12.

Of the eight angular directions, the four primary angular directions are as follows: the pitcher, the right handed batter, the catcher, and the left handed batter. These will be referred to as the $1^{st}$, $3^{rd}$, $5^{th}$ and $7^{th}$ angular directions. The four secondary angular directions are as follows: forty-five degrees counter-clockwise from the pitcher, forty-five degrees counter-clockwise from the right handed batter, forty-five degrees counter-clockwise from the catcher, and forty-five degrees counter-clockwise from the left handed batter. These will be referred to as the $2^{nd}$, $4^{th}$, $6^{th}$ and $8^{th}$ angular directions.

The numbering scheme for the eight mechanical stops of the instrumentation package assembly 7 is made to concur with the numbering scheme for the eight angular directions around the instrumented baseball home plate.

In preparation for the time when the instrumentation package assembly 7 is encapsulated inside the mold of the instrumented baseball home plate, the instrumentation package assembly 7 is first plugged into and aligned in buffer plate assembly 8. The instrumentation package assembly 7 and buffer plate assembly 8 are then loaded into the mold on top of the lower cover plate shield 19. The instrumentation package assembly is carefully positioned in the mold, and then aligned with its mechanical z-axis 17 normal to the top 6 of the mold. The instrumentation package assembly 7 is then precisely aligned in rotation in the mold about its mechanical axis 17 so that its $1^{st}$ primary stop for its instrumentation package assembly element is aligned with the y-axis's 1 six o'clock angular direction, toward side 14, of the instrumented baseball home plate. The mold is then filled with encapsulating material 16 with the upper cover plate shield 18 placed on top of the buffer plate assembly 8.

The previous alignment procedure assures that after the encapsulating material 16 has cured, the four primary stops of the electro-mechanical actuator inside the instrumentation package assembly are aligned to side 14, side 5, apex, and side 12 of the instrumented baseball home plate respectively. Side 14 faces the pitcher, side 5 faces a right handed batter, the apex faces the catcher, and side 12 faces a left handed batter.

Also, the $4^{th}$ secondary stop will be aligned to side 2, and the $6^{th}$ secondary stop will be aligned to side 15.

Now, whenever the electro-mechanical actuating device is driven to the $1^{st}$ primary stop, camera 24 will now produce precisely centered upright images of any objects that lie along the y-axis 1 in the six o'clock angular direction toward side 14 of the instrumented baseball home plate and the pitcher.

Whenever the electro-mechanical actuating device is driven to the 3rd primary stop, camera 24 will now produce precisely centered upright images of any objects that lie along the x-axis 4 in the three o'clock angular direction toward side 5 of the instrumented baseball home plate and a right handed batter.

Whenever the electro-mechanical actuating device is driven to the $5^{th}$ primary stop, camera 24 will now produce precisely centered upright images of any objects that lie along the y-axis 1 in the twelve o'clock angular direction toward the apex of the instrumented baseball home plate and the catcher.

Whenever the electro-mechanical actuating device is driven to the 7th primary stop, camera 24 will now produce precisely centered upright images of any objects that lie along the x-axis 4 in the nine o'clock angular direction toward side 12 of the instrumented baseball home plate and a left handed batter.

When the instrumented baseball home plate is placed horizontally on the baseball playing field at its traditional location on the baseball diamond, it is then carefully positioned so its y-axis is aligned with the centerline of the baseball diamond running from the instrumented baseball home plate to second base.

Now, whenever the cameraman in the remote base station commands the camera 24 to rotate and go to the 1st mechanical stop, the electro-mechanical actuator specified in FIG. 19B and FIG. 19C drives the camera's 24 enclosure against the 1st mechanical stop and detents it there. When using an extremely wide field camera lens, the TV audience will see a picture of the pitcher standing upright on the pitcher's mound of the baseball playing field in the lower half of the TV viewer's screen.

Whenever the cameraman in the remote base station commands the camera 24 to rotate and go to the 3rd mechanical stop, the electro-mechanical actuator specified in FIG. 19B and FIG. 19C drives the camera's enclosure against the 3rd mechanical stop and detents it there. When using an extremely wide field camera lens, the TV audience will see a picture of the right handed batter standing upright on the baseball playing field in the lower half of the TV viewer's screen.

Whenever the cameraman in the remote base station commands the camera 24 to rotate and go to the 5th mechanical stop, the electro-mechanical actuator specified in FIG. 19B and FIG. 19C drives the camera's enclosure against the 5th mechanical stop and detents it there. When using an extremely wide field camera lens, the TV audience will see a picture of the catcher squatted upright on the baseball playing field in the lower half of the TV viewer's screen.

Whenever the cameraman in the remote base station commands the camera 24 to rotate and go to the 7th mechanical stop, the electro-mechanical actuator specified in FIG. 19B and FIG. 19C drives the camera's enclosure against the 7th mechanical stop and detents it there. When using an extremely wide field camera lens, the TV audience will see a picture of the left handed batter standing upright on the baseball playing field in the lower half of the TV viewer's screen.

In the first primary mode where the cameraman selects the $1^{st}$ primary mechanical stop, the camera 24 and lens 25 are aligned in rotation inside its instrumentation package assembly 7 by the electro-mechanical actuating device so that the TV viewing audience sees the stadium horizon in the outfield near the bottom edge of the TV picture frame. (This is equivalent to what a person would see visually if he were laying flat down on the playing field with his head resting on the instrumented baseball home plate and looking upward with his feet facing the pitcher on side 14 of the instrumented baseball home plate.) The stadium outfield horizon appears horizontal in the TV picture frame at the bottom center of the TV picture frame. The pitcher appears to be standing upright on his mound just above the bottom of the TV picture frame. When the pitcher throws the baseball to the catcher, the TV audience will see the baseball approaching the center of the TV picture frame from the bottom of the TV picture frame. The size of the baseball grows larger as it gets closer to the camera inside the instrumented baseball home plate and the batter. Since the camera 24 is physically located below the batter inside the instrumented baseball home plate, an image of the underside of a right handed batter's chin and sweaty arm pits will appear just left of the center of the TV picture frame.

In the second primary mode, where the cameraman selects the $2^{nd}$ primary mechanical stop, the camera 24 and lens 25 are aligned in rotation inside its instrumentation package assembly 7 by the electro-mechanical actuating device so that the TV viewing audience sees the stadium horizon in the outfield at the right side of the TV picture frame. (This is equivalent to what a person would see visually if he were laying flat down on the playing field with his head resting on the instrumented baseball home plate and looking upward with his feet facing a right handed batter on side 5 of the instrumented baseball home plate). The pitcher appears to be standing on his mound toward the right hand side of the TV picture frame. When the pitcher throws the baseball to the catcher, the TV audience will see the baseball approaching the center of the TV picture frame from the image of the pitcher's hand which is right of center of the TV picture frame. The size of the baseball grows larger as it gets closer to the instrumented baseball home plate and the right handed batter. Since camera 24 is below the batter, an image of the underside of batter's chin and sweaty arm pits will occupy the space below the center of the TV picture frame. The right handed batter will appear to be standing near the bottom of the TV picture frame.

Camera 24 will enable the TV audience to see the baseball as it travels outward from the crack of the bat onto the playing field. The TV audience will see the baseball get smaller as it gets further away from the instrumented home plate and the batter. The image of the baseball will move from near the center of the TV picture frame toward the right of the TV picture frame if it is hit toward the outfield. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The microphones 27 and 28 enable the TV audience to hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the third primary mode, where the cameraman selects the 3rd primary mechanical stop, the camera 24 and lens 25 are aligned in rotation inside its instrumentation package assembly 7 by the electro-mechanical actuating device so that the TV viewing audience sees the stadium horizon in the outfield at the top of the TV picture frame. The catcher appears to be squatting upright above the bottom of the picture. (This is equivalent to what a person would see visually if he were laying flat down on the playing field with his head resting on the instrumented baseball home plate and looking upward with his feet facing the catcher toward the apex of the instrumented baseball home plate) The baseball stadium outfield horizon appears horizontal in the picture frame at the top of the TV picture frame. When the pitcher throws the baseball to the catcher, the TV audience will see the baseball approaching the center of the TV picture frame from the image of the pitcher's hand which is near the center top of the TV picture frame. The size of the baseball grows larger as it gets closer to the instrumented baseball home plate and the batter. Since the camera 24 is below the batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from the instrumented baseball home plate.

In the fourth primary mode, where the cameraman selects the 4th primary mechanical stop, the camera 24 and lens 25 are aligned in rotation inside its instrumentation package assembly 7 by the electro-mechanical actuating device so that the TV viewing audience sees the baseball stadium horizon in the outfield at the left side of the TV picture frame. (This is equivalent to what a person would see visually if he were laying flat down on the playing field with his head resting on the instrumented baseball home plate and looking upward with his feet facing a left handed batter on side 12 of the instrumented baseball home plate.) The baseball stadium horizon outfield appears in the TV picture frame at the left hand side of the TV picture frame. The pitcher appears to be standing on his mound near the left hand side of the TV picture frame. When the pitcher throws the baseball to the catcher, the TV audience will see the baseball approaching the center of the TV picture frame from the image of the pitcher's hand which is left of center of the TV picture frame. The size of the baseball grows larger as it gets closer to the instrumented baseball home plate and the left handed batter. Since the camera is below the batter, an image of the underside of batter's chin and sweaty arm pits will be below the center of the TV picture frame. A left handed batter would appear to be standing upright with his feet near the bottom of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate. In an alike fashion to those modes presented above, the cameraman may select any of the secondary mechanical stops.

The instrumentation package assembly 7 is supported at its upper end by a buffer plate 8. The instrumentation package assembly 7 and the buffer plate 8 are permanently encapsulated inside of the instrumented baseball home plate as the encapsulating material 16 around them cures. After the encapsulating material 16 sets, it becomes a weatherproof shock absorbing padding material 16. The small diameter end of the buffer plate 8 peers through the top 6 and upper protective cover plate 18 of the instrumented baseball home plate. The small diameter end of the buffer plate 8 is sealed and molded into the shock absorbing padding 16 around its circumference. The encapsulating material 16 is a permanent resilient compound that is air-tight and water-tight.

The buffer plate 8 is encapsulated by the encapsulating material 16 inside the instrumented baseball home plate. The z-axis 17 of the bore in the buffer plate is perpendicular to the top of the instrumented baseball home plate. The end of the instrumentation package assembly 7 is inserted into the bore in the buffer plate 8, thereby aligning the z-axis 17 of the instrumentation package assembly 7 perpendicular to the top of the instrumented baseball home plate.

The buffer plate 8 acts as a bearing for the instrumentation package assembly 7, and thereby restricts and restrains the motion of the instrumentation package assembly 7 inside the instrumented baseball home plate. Besides functioning as a bearing to support the instrumentation package assembly 7 within the instrumented baseball home plate, the buffer plate provides a hollow portal through which the camera 24 inside the instrumentation package assembly 7 may peer out of the instrumented baseball home plate at the baseball playing field.

The instrumented baseball home plate's outward appearance looks substantially the same as the conventional professional league baseball home plate and the conventional high school league baseball home plate, and meets the official requirements for these venues and is interchangeable with them in these venues.

The buffer plate 8 is a Type VIII buffer plate and is shown in FIG. 12A and FIG. 12B and FIG. 12C. The buffer plate 8 is molded into the instrumented baseball home plate using the white rubber encapsulating material 16. The small diameter end of the buffer plate 8 passes through the upper cover protective cover plate 18 and protrudes through the molded rubber top 6 of the instrumented baseball home plate. The buffer plate carries the optical window 13. The flat surface of optical window 13 is flush with the top 6 of the instrumented baseball home plate.

If the cameraman chooses to use a spherical concentric dome shaped optical window 13 instead of the flat window in order to minimize the vignetting at the extreme 180 degree field of view of an extremely wide angle lens 25, then the flat window can be unscrewed from the front of the buffer plate assembly 8 and replaced with a spherical domed shaped window. The spherical domed shaped optical window will protrude above 6 by about one half the diameter of the spherical optical window.

Buffer plate 8 is shown in detail in FIG. 12A and FIG. 12B and FIG. 12C. It is made from a light-weight rigid polycarbonate, ABS or fiber reinforced plastic material. It is used to prop up and position the instrumented baseball home plate's upper protective cover plate 18. The buffer plate 8 is mounted and permanently encapsulated to the inside of the instrumented baseball home plate. The top of the buffer plate 8 is covered by upper protective cover plate 18. The purpose of upper protective cover plate 18 is to protect the instrumentation package assembly 7 which is below it from being crushed when a player steps on the instrumented baseball home plate.

In summary, the buffer plate 8 is multi-purposed. It provides a mounting surface against which the upper protective cover plate 18 rests. It protects the instrumentation package assembly 7 from becoming misaligned relative to the portal through which camera 24 peers out from the top surface 6 of the instrumented baseball home plate.

The instrumented baseball home plate has five sides just like the standard conventional baseball home plate. Their dimensions are identical to the dimensions of the standard conventional baseball home plate. Side 14 is closest to the pitcher and is 17 inches long. Sides 2 and 15 form the apex of the instrumented baseball home plate. They are each 12.021 inches long, and join at right angles to one another at the apex of the instrumented baseball home plate.

It is not necessary to make the weight of the instrumented baseball home plate exactly identical to the weight of the conventional major league home plate because the instrumented baseball home plate will be immobile and anchored in the ground.

There are reasons however to make the weight of the instrumented baseball home plate approximately the same as that of the conventional major league home plate. The first reason is so that when a player hits it, the instrumented baseball home plate will feel and react the same as the conventional major league home plate. Accordingly, the location of the center of gravity of the instrumented baseball home plate base and the conventional major league baseball home plate are both in roughly the same place. The second reason is so the field crew that maintains the playing field can handle the instrumented baseball home plate in the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds are made inaudible to the players who are outside the instrumented baseball home plate by sound absorption, muffling, baffling and damping methods designed into the instrumented baseball home plate. The central body of the instrumentation package assembly 7 is essentially a cylindrical can that contains the battery pack. The bottom of the can has a removable lid. The lid can be removed in order to change out battery packs when the battery packs loose their ability to charge properly. Access to the bottom of the cylindrical can is through the circular aperture in the bottom 11 of the instrumented baseball home plate.

The instrumentation package assembly 7 is shown in FIG. 19A and FIG. 19B and FIG. 19C. The z-axis 17 is the axis of symmetry of the instrumentation package assembly 7. The instrumentation package assembly 7 contains its own camera lens 25, camera 24, and supporting electronics. The battery pack supplies electrical power to the entire instrumentation package assembly 7. The instrumentation package assembly 7 is essentially a short cylindrical can like a tuna fish can. It is made strong to resist being crushed. Materials such as polycarbonates, ABS and fiber reinforced plastics are used in its construction.

Induction coils 3 and 10 are located on the top and on the bottom of the instrumentation package assembly 7 central hub. The electrical induction coils 3 and 10 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate is a source of electrical power which inductively couples electrical current into these induction coils 3 and 10. The external induction coil is laid flat on the top of the instrumented baseball home plate coaxially above coils 3 and 10 during the battery charging process. Electrical current which is induced into the induction coils 3 and 10 is fed into the battery pack in order to charge it.

A block diagram of the instrumentation package assembly 7 electronics is shown in FIG. 38. Four antennas 21, 22, 23, and 24 are used to accomplish the wireless transmission and reception of signals between the instrumented baseball home plate and the antenna array relay junction. The same four antennas 21, 22, 23, and 24 are used by the instrumented baseball home plate to both transmit video signals to the remote base station and receive control commands back from the remote base station.

The instrumentation package assembly's can is made of polycarbonate, ABS or fiber reinforced plastic which are strong and are non-conductors of electricity. It is necessary to use a non-conducting material so as to allow the transmitted and received radio signals to radiate thru it from the antenna elements within the instrumentation package assembly 7 for the purpose of televising signals by wireless communications to and from the remote base station. The instrumentation package assembly's network transceiver electronics wirelessly transmits real-time pictures and sounds from the instrumentation package assembly 7 camera 24 and microphones 27 and 28 via the duel parallel antenna array elements 20, 21, 22, and 23, also known as intentional radiators, to the antenna array relay junction. The remote base station and the antenna array relay junction are specified in FIG. 30A and FIG. 30B.

In an alternative preferred embodiment, the quad antenna array elements 20, 21, 22 and 23 shown in the instrumentation package assembly 7 are replaced with a helix antenna (not shown) with similar dimensions wound on the inside diameter of the instrumentation package assembly.

An antenna array relay junction shown in FIG. 30A and FIG. 30B is deployed in the baseball stadium and receives radio signals from the instrumented baseball home plate's antenna array elements 20, 21, 22, and 23. Antenna array elements 20, 21, 22, and 23 are in quadrature to radiate radio signals to the antenna array relay junction with sufficient gain so as to overcome RF noise and provide for a large enough gain bandwidth product to accommodate real-time SD/HD picture quality requirements.

The instrumentation package assembly's network transceiver referred to in FIG. 22D also provides a wireless means for the instrumented baseball home plate to receive command and control radio signals from the base station. The instrumentation package assembly assembly's 7 battery pack is wirelessly inductively charged before and during games on an as needed basis, using the charging station shown in preferred embodiment shown in FIG. 23A and FIG. 23B and FIG. 23C. The charging station is placed on the top of the instrumented baseball home plate when it is charging the battery pack. Charging of the battery pack 31 is accomplished wirelessly by inductive coupling. The instrumented baseball home plate's two inductive pickup coils 3 and 10 act as the secondary windings on an air core transformer. Time varying magnetic flux at about 250 MHz is furnished to pickup coils 3 and 10 by the primary windings of the charging station unit referred to in FIG. 23A and FIG. 23B and FIG. 23C.

The antennas 21, 22, 23, and 24 are deployed below the upper protective cover plate 18 inside the instrumented baseball home plate. The antennas form a phased array. The radiation pattern from the phased array antennas 21, 22, 23, and 24 can be maximized to radiate and receive preferentially in the direction of the pickup antenna used by the remote base station. This reduces the noise in the transmission link.

The instrumentation package assembly 7 has a flexible corrugated bellows skin section 9. The height of the instrumentation package assembly 7 is approximately ⅓ the thickness of the instrumented baseball home plate.

The corrugated bellows segment 9 of the instrumentation package assembly 7 connects the outer portion of the instrumentation package assembly 7 with its central body hub. The connections are sealed with o-rings and are air-tight.

The corrugated section 9 of the instrumentation package assembly assembly's skin allows the instrumentation package assembly to flex, stretch and compress when the instrumented baseball home plate is impacted. This enables the instrumentation package assembly to resist shock and vibration. Additionally, the corrugated section allows the instrumentation package assembly to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 16 provides shock absorbing padding between the upper protective cover plate 18 and the instrumentation package assembly 7. A purpose of the encapsulating material is to cushion the blows to the instrumented baseball home plate that would otherwise result in damaging shock and vibration to the instrumentation package assembly 7 and its contents. The rubber encapsulating material 16 also provides protection for the instrumentation package assembly 7 from dirt, moisture and the environment.

The z-axis 17 of the instrumented baseball home plate is orthogonal to the x and y axes 4 and 1 respectively, of the instrumented baseball home plate.

Each of the microphones 27, 28, 35, 36 listens for sounds from their respective sides of the instrumented baseball home plate. The condenser microphones enable the viewing audience to hear real-time contacts, impacts and shocks to the instrumented baseball home plate by the conduction of sound waves through the home plate. Microphones 27, 28, 35, 36 enable the TV audience to hear sounds that result from air or any physical contacts or vibrations to the instrumented baseball home plate; like for example, the crash of a player sliding into the instrumented baseball home plate or the thud of a baseball as it hits the playing field; or the splat of the batter's tobacco spit as the gob hits the top of the home plate. The sounds received from each of the microphones 27, 28, 35, 36 by the remote base station are processed and formatted in the remote base station using special software to produce surround sound which is broadcast to the TV viewing audience.

Microphones 33, 37, 38, 39, 40, 41 protrude through holes in the top of the instrumented baseball home plate. They are molded in place using the encapsulating material 16. Microphones 33, 37, 38, 39, 40, 41 enable the TV audience to hear sounds that occur on the baseball playing field.

Microphones 33, 37, 38, 39, 40, 41 enable the TV audience to hear the whoosh of air as a pitched baseball passes above the instrumented baseball home plate; the TV audience can hear the slap of the baseball as it is caught in the pocket of the catcher's glove.

Simultaneously live TV pictures are taken by the TV camera 24 of its respective field of view of the live action on the playing field. Camera 24 will enable the TV audience to see a right or left handed batter swing his bat, up close, to strike the baseball as it whizzes bye above the instrumented baseball home plate. Microphone 33 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate.

A block diagram showing the detailed flow of electrical signals and data in the instrumentation package assembly 7 is shown in the preferred embodiment given in FIG. 22D and FIG. 22E. The present invention contemplates the instrumented baseball home plate's battery pack being wirelessly charged by a charging station shown in FIG. 23A and FIG. 23B and FIG. 23C.

The diameter of the instrumentation package assembly 7 is kept to a minimum in order to minimize its footprint inside the instrumented baseball home plate. The dimension of the outside diameter of the instrumentation package assembly 7 (not including the four antennas) is governed largely by the physical diagonal dimension of the largest components within the instrumentation package assembly 7, like the SD/HD camera's CCD sensor array and the battery.

The battery's charging coils 3 and 10 are wound on the outside diameter of the instrumentation package assembly 7 at both top and bottom of its central hub and act electrically as a transformer's secondary winding. The coils are wound on the outside diameter of the instrumentation package assembly 7 to keep any heat they may produce away from the contents of the instrumentation package assembly 7 while the battery pack is being charged. The number of turns in each charging coil is made large enough to enable them to inductively couple a sufficient number of magnetic lines of flux from the primary coil of the battery charging station so as to charge the battery pack in a reasonably short time before games. When the charging station is placed on top 6 of the instrumented baseball home plate, the charging coils 3 and 10 receive electrical energy inductively coupled from the primary coils of the charging station, and use this energy to charge the battery pack.

In a further preferred embodiment, the present invention referring to FIG. 41A and FIG. 41B contemplates an instrumented baseball home plate, which when stationed off of any baseball playing field i.e. at the traditional home plate location in the pitcher's bullpen, can wirelessly and autonomously televise baseball pitching practice and warm-up sessions under command and control of the remote base station. The remote base station is disclosed in FIG. 30A and FIG. 30B and FIG. 31A and FIG. 31B and FIG. 32A and FIG. 32B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 35C which is a top view of a general sports stadium that has been configured and equipped for use with both static and dynamic instrumented sports paraphernalia, using both bi-directional wireless radio wave communication links and/or bi-directional fiber optics cable/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 30A and FIG. 30B, and FIG. 31A and FIG. 31B, and FIG. 32A and FIG. 32B, and FIG. 35A and FIG. 35B and FIG. 35C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 19E (item 21), which is represented by dotted lines, consists of the electrical control wiring to and from the electronic components of the instrumented baseball home plates that are being controlled.

Referring to the Preferred Embodiments Specified in FIG. 41A and FIG. 41B, the instrumented baseball home plate satisfies all of the following objectives:

It is an objective of the present invention to instrument a baseball home plate composed of a one camera instrumentation package assembly, buffer plate assembly, encapsulation cushioning material, upper protective cover plate, additional microphone on the top, and lower protective cover plate. It is an objective of the present invention to process the pictures captured by the camera inside the instrumented baseball home plate and make them appear upright to the viewing audience. It is an objective of the present invention to take pictures from the instrumented baseball home plate with extremely wide viewing angles. It is an objective of the present invention that the instrumented baseball home plate has an upper protective cover plate that is rounded downward and domed shaped. It is an objective of the present invention to take pictures from the instrumented baseball home plate with extremely wide viewing angles. It is an objective of the present invention to make the weight and center of gravity location of the instrumented base the same as the conventional bases. It is an objective of the present invention to fill the volume of the instrumented baseball base beneath its top surface in its interior with a resilient encapsulating material like synthetic foam rubber to hold all the contents of the instrumented baseball home plate aligned in their places, and act as a shock absorbing padding for the instrumentation package assembly, buffer plate assembly, upper protective cover plate, and lower protective cover plate. It is an objective of the present invention to enable the cameraman in the remote base station to software selects either the wireless mode of communication, and/or the fiber optics/copper cable mode of communication, between the instrumented baseball home plate and the remote base station by sending control signals to the instrumented baseball home plate. It is an objective of the present invention to enable the cameraman to select either the wireless mode of communication, and/or the fiber optics/copper cable mode of communication between the instrumented baseball home plate and the remote base station by physically setting a switch in the bottom of the instrumented baseball home plate with his access through the bottom of the instrumented baseball home plate. It is an objective of the present invention to enable coaches who are on the sidelines during training sessions to hear the spoken dialog of their team's players from on the baseball playing field. It is an objective of the present invention to enable coaches who are on the sidelines during training sessions to view details of the team's players during training sessions on the baseball playing field. It is an objective of the present invention to enable umpires who are on and off the field during games to review details of the game from the cameras onboard the instrumented baseball paraphernalia by instant replay. It is an objective of the present invention to equip the instrumentation package assembly to capture video and sounds on the playing field from the top of the instrumented baseball home plate. It is an objective of the present invention to enable the instrumentation package assembly with a means to wirelessly televise the captured video and sounds to a remote base station via an antenna array relay junction stationed off the playing field but within (and around) the space of the instrumented sports stadium. It is an objective of the present invention to equip the antenna array relay junction to relay the televised video and sounds it receives from the instrumented baseball home plate to the remote base station located within the instrumented sports stadium or its vicinity. It is an objective of the present invention that the instrumented baseball home plate is under the command and control of a cameraman in the remote base station. It is an objective of the present invention to enable the instrumentation package assembly to be mounted inside the instrumented baseball home plate in a manner permitting its cameras and three microphones to see and hear out from the top of the instrumented baseball home plate. It is an objective of the present invention to enable the instrumentation package assembly to be mounted inside the instrumented baseball home plate in a manner permitting the instrumentation package assembly to be protected from damage during the game. It is an objective of the present invention to enable the instrumentation package assembly to be mounted inside the instrumented baseball home plate in a manner permitting it to maintain its mechanical and optical alignment during the game. It is an objective of the present invention to provide a permanent position and nesting place for the instrumentation package assembly inside the instrumented baseball home plate. It is an objective of the present invention to provide an upper protective cover plate, buffer plate assembly, instrumentation package assembly, additional microphone and lower protective cover plate to be sized and assembled together inside the instrumented baseball home plate. It is an objective of the present invention to provide an instrumentation package assembly whose components including, camera lens, battery pack and electronics are easily repaired, replaced and maintained. It is an objective of the present invention to provide an instrumentation package assembly that carries its own rechargeable battery pack. It is an objective of the present invention to provide an instrumentation package assembly that carries its own rechargeable battery pack that carries sufficient energy to power the cameras, lenses, antennas and electronics for the duration of the baseball game. It is an objective of the present invention to provide an instrumentation package assembly that carries its own battery pack that is recharged wirelessly by induction using a charging station unit placed on the instrumented baseball home plate. It is an objective of the present invention to provide instrumentation package assembly electronics that require little power to operate and are lightweight. It is an objective of the present invention to provide an instrumented baseball home plate carrying an instrumentation package assembly that can withstand axial and tangential compression and decompression loads exerted on it during play. It is an objective of the present invention to provide an instrumented baseball home plate whose total weight, and center of gravity is identical to regulation conventional baseball home plates. It is an objective of the present invention to provide an instrumented baseball home plate who's playing qualities, and handling qualities are identical to those in prior art conventional regulation baseball home plate. It is an objective of the present invention that the instrumentation package assembly withstands dirt and weather conditions. It is an objective of the present invention that the optical windows be made small to be unobtrusive to the game without vignetting the field of view of the cameras in the instrumented baseball home plate under the prevailing lighting conditions. It is an objective of the present invention that the optical windows withstand heavy blows received during the game and protect the instrumentation package assembly. It is an objective of the present invention that the optical windows be easily removed and replaced. It is an objective of the present invention that the camera lenses be easily removed and replaced through the top of the instrumented baseball home plate. It is an objective of the present invention to equip the instrumented baseball home plate with a single camera that looks out from inside the top of the instrumented baseball home plate onto the baseball playing field. It is an objective of the present invention to equip the instrumented baseball home plate with three microphones that listen for sounds of the game, in, and on, and above the playing field. It is an objective of the present invention to equip the instrumented baseball home plate to wirelessly and/or by fiber optics/copper cable communication links, televise baseball games under the command and control of the remote base station when stationed on any baseball playing field at any traditional home plate location.

It is an objective of the present invention to equip the instrumented baseball home plate with an instrumentation package assembly and additional microphone that are mounted and encapsulated inside the instrumented baseball home plate, which wirelessly televises pictures and sounds of baseball games from its camera and its three microphones contained therein. It is an objective of the present invention to equip the instrumented baseball home plate with state of the art TV cameras as technology advances. It is an objective of the present invention to equip instrumented sports paraphernalia with a single or multiple instrumentation package assemblies, additional microphones, and a single or multiple buffer plate assemblies, and single or multiple protective cover plates. It is an objective of the present invention to equip the instrumented baseball home plate with encapsulation shock absorbing material that protects and stabilizes the contents of the instrumented baseball home plate by holding, cushioning and maintaining the alignment of the instrumentation package assembly, additional microphone, buffer plate assembly, and upper and lower protective cover plates inside the instrumented baseball home plate. It is an objective of the present invention to equip the instrumented baseball home plate with an instrumentation package assembly that includes a single CCD sensor arrayed camera and two microphones. It is an objective of the present invention to equip the instrumented baseball home plate with an instrumentation package assembly that is mechanically mounted inside the instrumented baseball home plate using a buffer plate assembly. It is an objective of the present invention to equip the instrumented baseball home plate with a buffer plate assembly which is embedded and encapsulated into the instrumented baseball home plate using a shock absorbing encapsulation material. It is an objective of the present invention to equip the instrumented baseball home plate with upper and lower protective cover plate shields to protect the other contents of the instrumented baseball home plate. It is an objective of the present invention to equip the instrumented baseball home plate with an instrumentation package assembly that has a fiber optics/copper cable connector which is connected to a fiber optics/copper cable buried in the ground beneath the baseball playing field, which acts as an electric power and communications link to the remote base station via the antenna array relay junction. It is an objective of the present invention to equip the instrumented baseball home plate with two protective cover plate shields that are embedded and molded into the instrumented baseball home plate using encapsulation shock absorbing material. It is an objective of the present invention to equip the instrumented baseball home plate with two protective cover plates shields that sandwich the instrumentation package assembly between them and protect it and its contents from being damaged by the game and by the environment. It is an objective of the present invention that the external appearance and playability of the instrumented baseball home plate be substantially the same as the conventional regulation baseball home plate. It is an objective of the present invention that there is a flat region in the middle of the upper protective cover plate surrounding the clearance bore for the optical windows. It is an objective of the present invention that the optical windows permit the cameras mounted inside the instrumentation package assembly of the instrumented baseball home plate to look out through the top of the instrumented baseball home plate onto the playing field during a baseball game, and be protect the camera lenses and cameras from hazards such as rain, dirt and physical impacts. It is an objective of the present invention that the optical window is sealed to the small diameter cylindrical end of the buffer plate to protect the camera lenses, cameras, microphones and the electronics within the instrumentation package assembly. It is an objective of the present invention that the optical windows are made small to make them inconspicuous to the players, and substantially preserve the instrumented baseball home plate's look-alike quality with the conventional major league home plate while still retaining sufficient clear aperture for the camera lenses to see events with SD/HD resolution on the playing field in prevailing light. It is an objective of the present invention that the optical windows have a spherical dome shape when a larger field of view is desired. It is an objective of the present invention that the functions (i.e. zoom, focus, and iris settings) of the camera lenses are controlled by the cameraman in the remote base station by sending command and control signals from the remote base station to the instrumented baseball home plate. It is an objective of the present invention that the cameras use extremely wide angle lenses with zoom capability so that even though camera is pointed skyward, it can see past the pitcher right down to the outfield stadium horizon because of its near 180 degree field of view. It is an objective of the present invention that the camera is aligned within its instrumentation package assembly so that it yields wirelessly transmitted upright images of objects that appear in the TV picture frame between the center and the bottom of the TV picture frame by using the electro-mechanical actuating device that is mechanically coupled to the camera and its lens inside the instrumentation package assembly element. It is an objective of the present invention that the electro-mechanical actuating device can rotate and detent the camera and its lens together to any one of eight mechanical angular stop locations. It is an objective of the present invention that the cameraman in the remote base station selects which of the eight mechanical stops is to be used and sends a signal to the instrumentation package assembly to set the camera and lens to the desired mechanical stop he selected.

FIG. 42A and FIG. 42B and FIG. 42C and FIG. 42D and FIG. 42E The detailed physical elements disclosed in the instrumented tennis net drawings shown in FIG. 42A and FIG. 42B are identified as follows: 1 is the top of the head band of the instrumented tennis net. 2 is an instrumentation module attached to the front right side at the top of the net. 3 is the top of the right side tennis post. 4 is the top of the left side tennis post. 5 is an instrumentation module attached to the front left side at the top of the net beneath the headband. 6 is an instrumentation module attached to the front center at the top of the net beneath the headband. 7 is the tape at the top front center of the net. 8 is the bottom of the instrumented tennis net. 9 is the ground of the tennis court. 10 is an instrumentation module attached to the rear top center of the net. 11 is the surface of the instrumented tennis net. 12 is an instrumentation module attached to the rear left side at the top of the net beneath the headband. 13 is an instrumentation module attached to the rear right side at the top of the net beneath the headband. 14 is the Velcro backing on 6. 15 is a strip of Velcro. 16 is a strip of Velcro. 17 is the Velcro backing on 10. 18 is the base of the tennis net post 3 at ground level. 19 is a two-camera instrumentation module mounted inside the net post. 20 is a break in the net post. 21 is an opening in the net post for the net's cable to protrude through. 22 is the net's suspension cable on the right end of the net. 23 is a two-camera instrumentation module mounted inside the net post. 24 is the top of the cap housing that houses 23 and 26 that sits on 3. 25 is a two-camera instrumentation module mounted inside the net post. 26 is a two-camera instrumentation module mounted inside the net post. 27 is an antenna from 19. 28 is an antenna from 25. 29 is an optical window through which a camera is peering onto the tennis court. 30 is an optical window through which a camera is peering onto the tennis court. 31 is an optical window through which a camera is peering onto the tennis court. 32 is an optical window through which a camera is peering onto the tennis court. 33 is an underground cable feed which is routed up into the tennis net post 3 to the instrumentation modules in and on the posts and the tennis net 1. 34 is the base of the tennis net post 4 at ground level. 35 is the net's suspension cable on the left end of the net.

FIG. 42A is a front view of the instrumented tennis net.

FIG. 42B is a side view A-A section of FIG. 42A of the instrumented tennis net.

FIG. 42C is an isometric view of instrumentation modules mounted on the net using a Velcro sandwich.

FIG. 42D is a front view of instrumentation modules mounted on a net post.

FIG. 42E is a top view of instrumentation modules mounted on a net post.

The present invention contemplates that instrumented tennis nets and net posts, which when stationed on any tennis court at their traditional locations, can autonomously televise and stream tennis matches both wirelessly and/or by using fiber optics/copper cable connectivity.

In the first preferred embodiment, the instrumented tennis net 11 shown in FIG. 42A and FIG. 42B and FIG. 42C is equipped to wirelessly stream its audio and video onto the internet. The instrumented tennis net 11 is equipped with six instrumentation modules 2, 5, 6, 10, 12, 13 that carry TV cameras and microphones that face the players on both sides of the net. There are three instrumentation modules attached to each side of the net. The instrumentation modules 2, 5, 6, 10, 12, 13 are specified in FIG. 2A and FIG. 2B and FIG. 2C.

It is contemplated that the present invention affords the viewing audience the ability to see and hear unique views and sounds of the tennis match which will enhance their viewing pleasure.

The instrumentation modules 2, 5, 6, 10, 12, 13 each contain an electronic circuit called an electronics package unit. The electronics package unit is shown in FIG. 11A. The electronics package unit enables the instrumented tennis net to communicate with and stream on the internet.

Referring to FIG. 11B, FIG. 11B shows the architecture of the streaming system that conveys high definition video and multi-dimensional audio from instrumented tennis nets, captured by the cameras and microphones contained within their instrumentation modules, to stream to an audience which may or may not have spectators 7, 8, 9 and 10 respectively present at the games but wish to subscribe and view the games remotely on their personal wireless display devices. The electronics package units inside the instrumentation modules communicate wirelessly with the 4G/LTE or better equivalent Mobile Broadband Tower 11 operating on the 1700 and/or 1900 MHz Frequency Band within a three to five bar signal strength radius of the desired site local to the field of play. The same Mobile Broadband Tower that is used to intercept the captured streams 12 and 17 wirelessly from the electronics package unit(s) 3, 4, 5 and 6 is also used simultaneously to supply the wireless internet access 13, 14, 15 and 16 needed by spectators 7, 8, 9 and 10 present at the field/rink of play whom wish to view the game on their personal wireless devices. In operation, the live captured MPEG streams are made accessible across the public internet via a relay server which need not be local to the field/rink of play. This relay server acts as a traffic router and is connected to an internet backbone with sufficient capacity to successfully convey the wideband data streams needed to render High-definition video and sound to the viewing audience over the www. Each person present at the tennis court who is in possession of a suitable mobile broadband wireless device wishing to view the televised game, will initially register or subscribe to the service via a URL that is pointed to the relay server IP address. Once registered, however, the viewer will have the option of choosing the desired video and/or audio streams available at the given tennis court of play currently broadcasted.

The WIFI Communications block shown as item 9 in FIG. 11A permits wireless access and control of administrative functions and operating parameters by a laptop PC near the field of play independent of the Instrumentation package's Cellular streaming capabilities. Personnel at the field of play for example, activate the camera system prior to a game using a laptop PC logged into the WIFI communications block and subsequently deactivate it after the game has finished. Access to the Instrumentation package via WIFI is purposely limited to authorized personnel only through the use of a private encryption software key. The control and administration of other features of the instrumentation package are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to patrons wireless viewing devices at the field at the discretion of field personnel independent of Instrumentation package's Cellular streaming.

FIG. 11A is the electronics system block diagram for streaming tennis games on the internet from instrumented sports paraphernalia like instrumented tennis nets. FIG. 11A shows the block diagram for the system for streaming the video and audio of tennis games captured by the cameras and microphones aboard the instrumented sports paraphernalia like instrumented tennis nets. The primary component of the system for connecting the instrumented sports paraphernalia like tennis nets to the internet is the electronic package unit 1. The electronics package unit 1 enables the instrumented tennis nets to communicate with and stream on the internet. The electronics package unit 1 collects video and audio from the cameras 2 and microphones 3 aboard the instrumentation modules attached to the tennis nets, and channels the video and audio to the antenna 8 for wireless transmission to a Mobile Broadband Tower. The wireless topography for the system is shown in FIG. 11B.

An example of an instrumentation module is shown in FIG. 2A and FIG. 2B and FIG. 2C. Referring to FIG. 2A and FIG. 2B and FIG. 2C, each instrumentation module is equipped typically with four electronics package units 1. Each electronics package unit 1 channels a minimum of one high definition video camera 2 and one microphone 3 whose captured video and audio is buffered by processing hardware 4 and 5 following with suitable H.264/MPEG compression by compression hardware 6, which is and subsequently sent to an active broadband connection established by LTE/4g cellular streaming hardware 7 and an antenna 8 using for example Mobile Broadband Hotspot Hardware Technology. Each electronics package unit 1 contains video processing hardware 4, audio processing hardware 5, audio and video compression hardware 6, 4G/LTE cellular streaming high-speed terrestrial mobile broadband service hardware 7, and Wifi band hardware interface 9.

In another preferred embodiment, the instrumented tennis net 11 shown in FIG. 42A and FIG. 42B and FIG. 42C is equipped to stream its audio and video onto the internet via an internet cable buried beneath the tennis court. The advantage of this preferred embodiment over the previous preferred embodiment is that it affords greater bandwidth. The disadvantage is that this embodiment is limited to venues where underground internet cabling is already available or is made available by modifying the tennis court. Only some existing tennis courts have underground internet cabling available; underground internet cabling is expensive to install Referring to FIG. 11A, in some venues where the underground internet cabling is already available or newly installed as part of this embodiment in the form of a fiber optics/copper cable feed buried beneath the ground of the tennis court, the cable feed 10 is brought up from the ground through the hollow base 18 of the tennis net posts 3 and 4 and connected to the electronic package units 1 via 9 of the instrumentation modules. Each electronics package unit 1 referred to in FIG. 11A uses a high-speed terrestrial mobile broadband service to connect the camera(s) 2 and microphone(s) 3 to a publicly accessible internet relay server for the purpose of real-time viewing the game by audiences using their portable wireless devices—i.e. WIFI enabled Phones, Laptops, Touch Pads, PDA's, etc.

As an example of the cable routing in this embodiment, the power cable and fiber optics/copper bi-directional cables 33 are routed up from beneath the surface of the court 9 into the bottom 18 of post 3; and up through post 3 to instrumentation modules 23, 19, 26, 25, and out along net suspension cable 22 through and along the top edge 1 and concealed under the headband, and then connected to the instrumentation modules 2, 13, 6, 10, 5, 12 via their respective electrical connectors. The cable then proceeds out along net suspension cable 35 and into net post 4 where the four instrumentation modules (not shown) are now connected to it. In this preferred embodiment the fiber optics cable/copper cable bi-directional communications link is buried underneath the court's ground. In addition to being a bi-directional communications link, the copper cable carries electrical power as well. Both posts 3 and 4 are constructed with fiber optics/copper cable connectors built into their ground footings at 18 and 34 which can connect to the fiber optics cable/copper cable bi-directional communications and power link mating cable connectors that come up from the ground beneath the post's footings 18 and 34. In this preferred embodiment, only tennis post 3 is chosen to be hooked up to the cable from under the ground. The advantage of this approach is that a single cable run it is less expensive to implement because there needs to be only one run of cable trenched under the court to one post rather than two. The tennis nets have power and fiber optics/copper cable running up from the connectors in the post's footings to fiber optics/copper cable connectors along the top edge 1 beneath the headband where the instrumentation modules are located. The fiber optics/copper cable connectors in the top edge of the net are mated with the instrumentation module's fiber optics/copper cable connectors in the instrumentation modules by passing the fiber optics cable/copper cable through the openings in the instrumentation modules and mating them to the two fiber optics cable/copper cable connectors within the instrumentation modules.

In yet another preferred embodiment, the present invention contemplates an instrumented tennis net 11, which when located on any tennis court, can wirelessly televise by RF radio and/or by fiber optics cable/coaxial copper cable, tennis matches and warm-up sessions under the command and control of a remote base station. The remote base station is disclosed in FIG. 30A and FIG. 30B, and FIG. 31A and FIG. 31B, and FIG. 32A and FIG. 32B, and FIG. 35A, and FIG. 35B, and FIG. 35C, and FIG. 7 and FIG. 8 of the present invention. This wireless embodiment avoids the expense of trenching the tennis court with underground cable, but does not have as mush bandwidth as is gained by using cable. The instrumented tennis nets 11 are instrumented with instrumentation modules 2, 5, 6, 10, 12, 13 that are equipped with transceivers and antennas capable of wirelessly transmitting radio signals encoded with the picture and sound information to a remote base station via an antenna array relay junction located in the stadium. The instrumentation modules 2, 5, 6, 10, 12, 13 are specified in FIG. 2A and FIG. 2B and FIG. 2C. The instrumented tennis nets 11 that are in play on the tennis court during professional and amateur games and player training sessions, are instrumented with the instrumentation modules 2, 5, 6, 10, 12, 13 that contain the cameras and microphones enabling them to acquire pictures and sounds of the players from amongst the players on the court. The electronics within the instrumentation modules 2, 5, 6, 10, 12, 13 televises the pictures and sounds to a remote base station via an antenna array relay junction. The instrumentation modules 2, 5, 6, 10, 12, 13 are equipped with their own wirelessly rechargeable battery packs to furnish electrical power.

In all the preferred embodiments involving instrumented tennis nets, the instrumentation modules 2, 5, 6, 10, 12, 13 are made to be easily removable and replaceable for maintenance and repair, and their physical presence, size, color, shape, orientation and appearance does not pose a distraction to the players or an impediment to the game. Except for the instrumentation module's 2, 5, 6, 10, 12, 13 small optical windows, and given that the instrumentation module's 2, 5, 6, 10, 12, 13 are camouflaged and painted to match the colors and patterns of the net 11, the instrumented tennis net's outward appearance looks substantially the same as the conventional regulation nets, and plays the same as these nets, and meets the same official requirements for these regulation nets, and is therefore interchangeable with them in all venues as substitutes.

Referring to FIG. 42A and FIG. 42B and FIG. 42C, there are typically six instrumentation modules 2, 5, 6, 10, 12, 13 per tennis net. The instrumentation modules 2, 5, 6, 10, 12, 13 are positioned just below the top edge of the net 1 beneath the headband. Each instrumentation module 2, 5, 6, 10, 12, 13 has four TV cameras and seventeen microphones. The TV cameras and microphones are housed inside each instrumentation module 2, 5, 6, 10, 12, 13. As an example, two instrumentation modules 6 and 10 are mounted to the net as a pair near its top center, opposite to one another, on either side of the net 11. Two other instrumentation modules 2 and 13 are mounted to the net as a pair near its top right end, opposite to one another, on either side of the net; and two more instrumentation modules 5 and 12 are mounted to the net as a pair near its top left end, opposite to one another, on opposite sides of the net. Typically, three instrumentation modules are attached just below the top edge of the net 11 beneath the headband on both sides of the net 11. All the instrumentation modules 2, 5, 6, 10, 12, 13 are positioned just below the top edge of the net 11 beneath the headband so they do not interfere with the path of the tennis balls or the players during play. Instrumentation modules 2, 5, and 6 face the player(s) standing on the right side of the court. Instrumentation modules 10, 12 and 13 face the player(s) standing on the left side of the court. Instrumentation modules 2 and 5 view the right side of the court with their 3-D wide angle zoom lenses from their vantage points from either end of the net 11. Instrumentation module 6 views the right side of the court with its 3-D wide angle zoom lenses from its vantage point at the center of the net. Instrumentation modules 12 and 13 view the left side of the court with their 3-D wide angle zoom lenses from their vantage points at both ends of the net. Instrumentation module 10 views the right side of the court with its 3-D wide angle zoom lenses from its vantage point at the center of the net. The instrumentation modules 2, 5, 6, 10, 12, 13 are mounted flat and horizontal onto the surface of the tennis net 11 just below the top edge of the net beneath the headband. The instrumentation modules 2, 5, 6, 10, 12, 13 can be mounted to 11 using a variety of simple methods. Preferred methods are ones where the instrumentation modules 2, 5, 6, 10, 12, 13 can be easily removed and replaced for routine maintenance, testing and repairs. For example, the instrumentation modules 6 and 10 can be positioned and held to 11 using a Velcro sandwich as shown in FIG. 42B and FIG. 42C. The same type of Velcro sandwich is used to mount 2 and 13 together; as well as 5 and 12 together. The instrumentation modules 6 and 10 are held to the tennis net 11 using double sided "Velcro" strips 15 and 16. The two strips of Velcro 15 and 16 are each cut to the rectangular shape and size of the instrumentation modules 6 and 10. The strips 15 and 16 are cut from double sided "Velcro" sheets.

The two strips 15 and 16 are then positioned just below the top of the tennis net 11 beneath the headband on opposite sides of the net 1 from one another with the net sandwiched between them. The Velcro strips 15 and 16 are pressed together and grab one another through the loops of the net 11 with the net 11 sandwiched firmly between them. The Velcro strips 15 and 16 act as clamps to hold the net 11 between the two Velcro strips 15 and 16. The flat mounting surface on the backs of the instrumentation modules 6 and 10 are also backed with "Velcro" 14 and 17. The flat Velcro surfaces of instrumentation modules 6 and 10 are then pressed flat and level against each side of 15 and 16 of the Velcro sandwich which had been attached to the tennis net 11. Therefore then, the instrumentation modules 6 and 10 have been attached to the net 11 facing opposite sides of the court from one another. One instrumentation module 6 will be facing the right side of the court, and the other instrumentation module 10 will be facing the left side of the court. The cameras and microphones on board instrumentation module 6 will see and hear the players on the right court, while the cameras and microphones on board instrumentation module 10 will see and hear the players on the left court.

In yet another preferred embodiment, FIG. 42D and FIG. 42E show the front and top views of the instrumented net post 3. Net post 3 is shown instrumented with two instrumentation modules 19 and 25 mounted inside rectangular cutouts in post 3. The instrumentation modules 19 and 25 are specified in FIG. 2A and FIG. 2B and FIG. 2C. The instrumentation modules 19 and 25 face opposite sides of court from one another. 19 and 25 are located at the same heights on the post 3 from the ground. The cutouts for 19 and 25 are located below the net's cable cranking mechanism (not shown) and the base 18 of post 3. The posts 3 and 4 are typically made of galvanized steel approximately three inches in diameter. The lines of sight of 19 and 25 are arranged typically to look down the sidelines, although they may otherwise be adjusted to look at any points on the court at the discretion of the cameraman. Their wide angle zoom lenses afford abundant coverage of the players on the court. Net post 4 is instrumented in a similar way as net post 3. As in the preferred embodiments described above for the tennis nets, the tennis posts 3 and 4 have the same ability to both stream on the internet and televise games simultaneously. The system architecture for streaming on the internet is shown in FIG. 11B. The system architecture for televising games from instrumented tennis nets using bi-directional wireless radio wave communication links and/or bi-directional fiber optics cable and bi-directional high speed copper network communications cable links is similar to that shown in FIG. 7 where the instrumented tennis net replaces the instrumented soccer goals. In a manner similar to that described for the instrumented tennis net embodiments, power and fiber optic/copper cable bi-directional communication links to the internet and to the remote base station can be routed up from the ground inside the posts to their instrumentation modules if the cable is made available beneath the tennis court. If the cable feed is not already available, then it is installed as part of implementing this embodiment.

In yet still another preferred embodiment, FIG. 42D and FIG. 42E show the front and top views of the instrumented net post 3. A weatherproof enclosure 24 sits on and is attached to the top of 3. The weatherproof enclosure 24 houses two instrumentation modules 23 and 26. The instrumentation modules 23 and 26 are specified in FIG. 2A and FIG. 2B and FIG. 2C. In FIG. 42D, 26 is behind 23. The cameras and microphones of 23 and 26 peer out through rectangular cutouts in 24. The weatherproof enclosure 24 is made of a non-electrically conducting material such as a plastic. The enclosure 24 is made from an electrically non-conducting material so it will pass radio waves radiated to and from both 23 and 26. The instrumentation modules 23 and 26 face opposite sides of the court from one another and are located at the same heights above the top of post 3. The weatherproof enclosure 24 is painted the same color as 3 to make it blend in with 3 so as not to be a visual distraction to the players during the game. The lines of sight of 23 and 26 are arranged typically to look down the sidelines, although they may otherwise be adjusted to look at any points on the court at the discretion of the cameraman. Their wide angle zoom lenses afford abundant coverage of the players on the court. Net post 4 is instrumented in a similar way as net post 3. As in the preferred embodiments described above for the tennis nets, the enclosures on the tops of tennis posts 3 and 4 have the same ability to both stream on the internet and televise games simultaneously. The system architecture for streaming on the internet is shown in FIG. 11B. The system architecture for televising games from instrumented tennis net posts using bi-directional wireless radio wave communication links and/or bi-directional fiber optics cable and bi-directional high speed copper network communications cable links is similar to that shown in FIG. 7 where the instrumented tennis net posts replace the instrumented soccer goals. In a manner similar to that described for the instrumented tennis net embodiments, power and fiber optic/copper cable bi-directional communication links to the internet and to the remote base station can be routed up from the ground inside the posts to their instrumentation modules if the cable is made available beneath the tennis court. If the cable feed is not already available, then it is installed as part of implementing this embodiment.

The present invention in all its embodiments cited above has advantages over the prior art. The audience will see and hear the events on the court from the vantage point of the cameras and microphones located on the top of the net. This action packed view of the tennis ball has never before been seen and heard by a viewing audience. The viewing audience sees the action in 3-D and hears the action in surround sound. The vantage points of the instrumentation modules on the net allow the microphones on board the instrumentation modules to hear the sounds coming into the net from every point on the tennis court. The sounds collected by these microphones in the three instrumentation modules are processed and formatted in the remote base station and broadcast as surround sound to the viewing audience. When either player hits the tennis ball cross-court over the center of the net, the viewing audience will see the ball approach them in 3-D. This is an exciting event. When either player serves the ball, the ball will pass over the center of the net. This too is an exciting event. When a player rushes the net the audience will see a close-up of his sweat drenched face. The audience can zoom-in and see the potholes in the clay damaged courts. When a tennis ball hits the net the audience will experience a crash in surround sound. The viewing audience will see close-ups of the fronts of the players and hear them cry out their anguish in close-up surround sound. The audience will hear the twang of the racquet strings as they sing when top spin is put on a ball. The audience will be able to experience in 3-D and surround sound the near net confusion when two players occupy the same side of the court in doubles matches. In summary, the instrumented tennis net 1 shown in FIG. 42A and FIG. 42B and FIG. 42C and FIG. 42D and FIG. 42E provides the viewing audience with video and sound that is felt so close-in amongst the players, that is so exciting and realistic that it makes the individual members of the audience feel that they are in the game themselves. In many ways this is more exciting than viewing the game in person from the stands. Therefore, the instrumented tennis net not only provides a step forward in entertainment, but it also provides a great training tool to prospective tennis players by giving them the true life visual and auditory sensations and feelings of being in the game without actually being there. The camera's vantage point from the top of the net gives the audience a viewing angle of the game never seen before by television viewing audiences. The cameras and microphones at mid-court gives the TV viewing audience unending contemporaneous shots and sounds that get across a sense of the action of being there—like a player in the game that prior art cameras and microphones looking on from their disadvantaged viewing points from outside the court cannot get across. In addition to adding an extreme "element of being there" to the entertainment of the TV viewing audience, this embodiment serves to aid the players and the coaches in evaluating the quality of the player's progress, prowess, fitness and "stuff" in the game of tennis.

In yet a further preferred embodiment, it should be obvious from the disclosure for instrumented tennis nets and instrumented tennis net posts that a nearly identical specification applies to the game of volleyball. Volleyball, like tennis, has a net; and volleyball, like tennis, has two net posts. Three instrumentation modules are attached to each side of the volleyball net using the same Velcro sandwich method used to attach the instrumentation modules to the tennis net. The instrumentation modules are attached to the volleyball net in the same general locations as with the tennis net. For example, one instrumentation module is attached on both sides of the net at the top right end of the net; and one instrumentation module is attached on both sides of the net at the top left end of the net; and one instrumentation module is attached on both sides of the net at the center top of the net. Additionally four instrumentation modules are attached to each net pole; two at the top and two halfway down the poles from the top. As in the game of tennis, the positioning of all the instrumentation modules gives abundant coverage of the players on the court by their cameras and microphones. As is in the game of tennis, the same 3-D and surround sound for volleyball is broadcast to the TV viewing audience via the remote base station; and as is in the game of tennis, the same streaming is done on the internet by the volleyball net and poles.

Referring to the Preferred Embodiments Specified in FIG. 42A and FIG. 42B and FIG. 42C and FIG. 42D and FIG. 42E, the instrumented tennis nets and instrumented tennis net posts satisfy all of the following objectives:

It is an objective of the present invention that two instrumented tennis net posts be mounted on the tennis court at their traditional locations.

It is an objective of the present invention that two instrumentation modules be mounted inside each instrumented tennis net post.

It is an objective of the present invention that two instrumentation modules be mounted inside an enclosure attached to the top of each instrumented tennis net post.

It is an objective of the present invention that the instrumented tennis net posts be comprised of standard regulation tennis net posts that have been modified with two instrumentation modules mounted inside each of them, and a viewing slot for each.

It is an objective of the present invention that the instrumentation modules mounted inside the enclosure attached to the top of each net post be equipped with two cameras and eight microphones, and provide video for 3D and audio for surround sound.

It is an objective of the present invention that an instrumented tennis net be strung between the net posts.

It is an objective of the present invention that an instrumented tennis net be equipped with six instrumentation modules attached to it.

It is an objective of the present invention that an instrumented tennis net be equipped with six instrumentation modules attached to it, where three instrumentation modules face one side of the court, and the other three instrumentation modules face the other side of the court.

It is an objective of the present invention that pairs of the instrumentation modules be mounted to the tennis net using a Velcro sandwich.

It is an objective of the present invention that power cable and bi-directional fiber optics/copper cable carrying the internet, be buried in the ground beneath the tennis court.

It is an objective of the present invention that power cable and bi-directional fiber optics/copper cable connected to a remote base station via an antenna array relay junction, be buried in the ground beneath the tennis court.

It is an objective of the present invention that power cable and fiber optics/copper cable be buried in the ground beneath the tennis court, be routed up from the ground through the base of a net post, and connected to the two instrumentation modules mounted inside the net post.

It is an objective of the present invention that power cable and fiber optics/copper cable be buried in the ground beneath the tennis court and routed up from the ground through the base of a net post, and connected to the two instrumentation modules mounted inside the net post, and connected to the two instrumentation modules mounted inside the enclosure attached to the top of the instrumented tennis net post.

It is an objective of the present invention that power cable and fiber optics/copper cable be buried in the ground beneath the tennis court, and be routed up from the ground through the base of a net post, and up through the hollow in the net post, and strung across the net suspension cable from the net post to the net, and routed across the top of the net under the net's headband, and be connected to the six instrumentation modules mounted on the tennis net below the headband, thereby connecting them to stream on the internet to subscribers.

It is an objective of the present invention that power cable and fiber optics/copper cable be buried in the ground beneath the tennis court, and be routed up from the ground through the base of a net post, and up through the hollow in the net post, and strung across the net suspension cable from the net post to the net, and routed across the top of the net under the net's headband, and be connected to the six instrumentation modules mounted on the tennis net below the headband, thereby connecting them to televise to the remote base station to broadcast to a TV viewing audience.

It is an objective of the present invention to enable the cameraman to set the tilt angle of the instrumentation modules inside the net posts so the camera's lines of sight can be angled to see the players at strategic locations on the tennis court.

It is an objective of the present invention to enable the cameraman in the remote base station to software select either the wireless mode of communication, and/or the fiber optics/copper cable mode of communication between the instrumented tennis nets and the remote base station by sending a control signal to the instrumented tennis nets.

It is an objective of the present invention to enable the cameraman in the remote base station to software select either the wireless mode of communication, and/or the fiber optics/copper cable mode of communication between the instrumented tennis net posts and the remote base station by sending a control signal to the instrumented tennis net posts.

It is an objective of the present invention to enable the cameraman to select either the wireless mode of communication, and/or the fiber optics/copper cable mode of communication between the instrumented tennis nets and the remote base station by physically setting a switch in the bottom of the instrumentation modules with access through the bottom of the instrumentation modules on the nets.

It is an objective of the present invention to enable the cameraman to select either the wireless mode of communication, and/or the fiber optics/copper cable mode of communication between the instrumented tennis net posts and the remote base station by physically setting a switch in the bottom of the instrumentation modules with access through the bottom of the instrumentation modules in and on the posts.

It is an objective of the present invention to enable the cameraman to software select either the wireless mode of communication, and/or the fiber optics/copper cable mode of communication between the instrumented tennis nets and the remote base station by sending a control signal to the instrumented tennis nets from his hand held remote.

It is an objective of the present invention to enable the cameraman to software select either the wireless mode of communication, and/or the fiber optics/copper cable mode of communication between the instrumented tennis net posts and the remote base station by sending a control signal to the instrumented tennis net posts from his hand held remote.

DRAWINGS

The following drawings are not drawn to scale, but are drawn rather to make the details of the current invention apparent and recognizable.

What is claimed as being new and desired to be protected by Letters Patent of the United States is as follows:

1. A system installed at a sporting venue for delivering audio and video of a sporting event, comprising:

at least one of a fixed instrumented sports paraphernalia object and a dynamic instrumented sports paraphernalia object; wherein said fixed instrumented sports paraphernalia object, integrated into a playing area of the sporting venue, comprising:

integrated devices comprising at least one first video camera and at least one first microphone, and a bi-directional communication link configured to transmit first media content captured by said first video camera and said first microphone;

said dynamic instrumented sports paraphernalia object, different from the fixed instrumented sports paraphernalia object, comprising:

a package assembly containing at least one second video camera and at least one second microphone, and a bi-directional communication link configured to transmit second media content captured by said second video camera and second microphone;

at least one antenna array relay junction configured for receiving at least one of said first media content and said second media content;

at least one base station configured to receive from at least one of said fixed instrumented sports paraphernalia object and said dynamic instrumented sports paraphernalia object, via at least one of a wired communication link and wireless communication link through said antenna relay junction, at least one of said first media content and second media content, wherein said base station comprises:

processing circuitry configured to process at least one of said first media content and second media content to produce processed media content, wherein said base station is configured to transmit said processed media content to at least one of a live TV viewing audience and a steaming Internet audience, and wherein said base station is further configured to transmit command and control signals to at least one of the fixed instrumented sports paraphernalia object and the dynamic instrumented sports paraphernalia object to control functions associated with at least one of said first video camera and said second video camera;

wherein at least one of said first video camera and said second video camera comprises an image sensor chip comprised of a flat image sensor array of pixel elements disposed in a circular shape in the x-y image plane of said sensor chip centered around the optical z-axis of said first video camera and said second video camera for capturing at least one of said first media content and said second media content and enabling said base station to process upright images no matter what arbitrary direction is selected in the x-y plane for the image of an object in the playing area; wherein the diameter of said circular shape is a predetermined value sufficient to cover the field of view of the playing area; said image sensor's circular shape eliminating the need for an electro-mechanical actuator to produce upright media content;

wherein when said fixed instrumented sports paraphernalia object comprises at least four said first cameras, said base station is configured with software enabling selection of a first interpupillary distance by selecting a first camera pair comprising two of said four said first video cameras, wherein said first interpupillary distance, comprising the distance between the selected said first camera pair, is selected for increasing or decreasing the 3-D effects to the TV audience;

wherein when said dynamic instrumented sports paraphernalia object comprises at least four said second cameras, said base station is configured with software enabling selection of a second interpupillary distance by selecting a second camera pair comprising two of said four said second video cameras, wherein said second interpupillary distance, comprising the distance between the selected said second camera pair, is selected for increasing or decreasing the 3-D effects to the TV audience;

wherein said package assembly further comprises a gyroscope transducer configured to obtain orientation information comprising pitch, roll, and yaw data related to the dynamic instrumented sports paraphernalia object, the package assembly further configured to encode and transmit said orientation information to said base station, wherein said base station utilizes said orientation information to stabilize said received second media content;

wherein said base station is configured for processing at least one of said first media content and said second media to produce stabilized upright images of the playing area;

wherein said base station is further configured to generate stabilized audio by processing audio signals received from said second microphone to remove effects of spin imparted on said dynamic instrumented sports paraphernalia object, said stabilized audio being fixed to a reference point that is the direction of forward motion of the dynamic instrumented sports paraphernalia object, and wherein said stabilized audio is combined with said processed media content and delivered to said live TV viewing audience and said streaming internet audience.

2. The system of claim 1, wherein the fixed instrumented sports paraphernalia object comprises:

at least one of a soccer goal, a football goal post, a hockey net, a soccer net, a baseball base, a baseball home plate, a baseball pitcher's rubber, a volleyball net, volleyball net posts, tennis nets, and tennis net posts.

3. The system of claim 1, wherein the dynamic instrumented sports paraphernalia object comprises:

at least one of a football and a hockey puck.

4. The system of claim 1, wherein the communication link comprises: a wireless link.

5. The system of claim 1, wherein said antenna array relay junction is comprised of:

at least one antenna repeater; and wherein said antenna repeater is configured for relaying at least one of said first media content and said second media content from at least one said fixed instrumented sports paraphernalia object and said dynamic instrumented sports paraphernalia object to said internet; and wherein said antenna repeater is configured for relaying at least one of said first media content and said second media content from at least one said fixed instrumented sports paraphernalia object and said dynamic instrumented sports paraphernalia object to said base station.

6. The system of claim 1, wherein the communication link comprises: a fiber optic cable link.

7. The system of claim 1, wherein said base station is configured for processing at least one of said first media content and said second media with upright images of the playing area in HD letterbox format.

8. The system of claim 1, wherein said fixed instrumented sports paraphernalia object further comprises:

at least one physical and chemical state sensor;

wherein said physical chemical state sensor is for measuring the physical and chemical states of said fixed instrumented sports paraphernalia object and for inputting said physical and chemical state data into at least one said integrated devices configured on said fixed instrumented sports paraphernalia object; and wherein furthermore said integrated devices is configured for streaming said physical and chemical state measurements to said streaming internet audience.

9. The system of claim 1, wherein at least one of said first microphone said second microphone is for capturing the conducted sounds from the play area conducted through at least one of said fixed instrumented sports paraphernalia object and said dynamic instrumented sports paraphernalia object.

10. The system of claim 1, wherein said system further comprises:

at least one battery charging station configured for displaying and transmitting control commands to at least one of said fixed instrumented sports paraphernalia object and said dynamic instrumented sports paraphernalia object, and receiving the status of functions associated with at least one of said fixed instrumented sports paraphernalia object and said dynamic instrumented sports paraphernalia object.

11. The system of claim 1, wherein said system further comprises at least one tripod mounted set-up camera system for capturing images of the interior physical structure of said sporting venue from the play area before game time, and for creating an archival image database to be processed by said base station to enhance, stabilize and make upright said second media content received from said dynamic instrumented sports paraphernalia object during game time.

12. The system of claim 1, wherein the system further comprises:

a laptop PC configured to perform tests diagnostics on the functions associated with at least one of said fixed instrumented sports paraphernalia object and said dynamic instrumented sports paraphernalia object via said communications link; and wherein at least one of said fixed instrumented sports paraphernalia object and said dynamic instrumented sports paraphernalia object are configured for providing the status of functions associated with at least one of said fixed instrumented sports paraphernalia object and said dynamic instrumented sports paraphernalia object to said laptop PC operated by said sporting venue's authorized field personnel via said communications link;

wherein a private encryption software key is used by the field personnel for gaining access to said dynamic instrumented sports paraphernalia object and said fixed instrumented sports paraphernalia object.

13. The system of claim 1, wherein at least one of said integrated devices and said package assembly is comprised of:

at least one buffer plate assembly for mounting and positioning at least one of said first video camera and said second video camera within at least one of said integrated devices and said package assembly; and wherein said buffer plate assembly is molded and encapsulated into the body of at least one of said integrated devices and said package assembly; and wherein said buffer plate assembly is furthermore for preserving the alignment of at least one of said first video camera and said second video camera; and wherein each said buffer plate assembly is comprised of:

at least one bearing surface for retaining at least one of said first video camera and said second video camera; and wherein said bearing surface is comprised of: at least one clear aperture; and wherein said clear aperture mounts an optical window retained therein; and wherein at least one of said first video camera and said second video camera looks out through said optical window onto the playing area with its line of sight perpendicular to said bearing surface to said optical window; and wherein said optical window protects at least one of said first video camera and said second video camera from physical impacts, debris, humidity, and moisture encountered during a sporting event; and wherein said optical window is mechanically disposed for ease of removal and replacement.

14. The system of claim 1, wherein said base station is further configured to generate stabilized video by processing video signals received from said second video camera to remove effects of spin imparted on said dynamic instrumented sports paraphernalia object, said stabilized video being fixed in an upright condition to a reference point that is either the direction of forward motion of said dynamic instrumented sports paraphernalia object, or is chosen to be in any arbitrary direction relative to the direction of forward motion of the dynamic instrumented sports paraphernalia object, and wherein said stabilized video is combined with said processed media content and delivered to said live TV viewing audience or said streaming internet audience; and wherein said processed media content includes 3-D.

15. The system of claim 1, wherein said base station is further configured to generate stabilized audio surround sound by processing audio signals received from a plurality of said second microphones phased for surround sound to remove effects of spin imparted on said dynamic instrumented sports paraphernalia object, said stabilized audio surround sound being fixed to a reference point that is either the direction of forward motion of the dynamic instrumented sports paraphernalia object, or is chosen to be in any arbitrary direction relative to the direction of forward motion of the dynamic instrumented sports paraphernalia object, and wherein said stabilized audio surround sound is combined with said processed media content and delivered to said live TV viewing audience or said streaming internet audience.

16. The system of claim 1, wherein said system further comprises:

at least one hand held remote control unit;

wherein said hand held remote control unit is configured for transferring control commands to both said fixed instrumented sports paraphernalia object and said dynamic instrumented sports paraphernalia object enabling field personnel to manipulate the various functions associated with at least one of said fixed instrumented sports paraphernalia object and said dynamic instrumented sports paraphernalia object; and for receiving the status of the various functions associated with at least one of said fixed instrumented sports paraphernalia object and said dynamic instrumented sports paraphernalia object via said communication link.

17. The system of claim 1, wherein said integrated devices further comprises:

a corrugated bellows segment creating a mechanical connection between said first video camera and a main body of said integrated devices, wherein said corrugated bellows segment is flexible to provide shock absorption by compressing in response to an external force, and wherein said corrugated bellows segment further is capable of being flexed to allow said first video camera to be mechanically tilted relative to the x-axis and the y-axis and the z-axis of the main boy of said integrated devices.

18. The system of claim 1, wherein at least one of said first video camera and said second video camera are comprised of:

a ultra wide angle lens for providing a field of view of substantially 180 degrees; said ultra wide angle lens having an optical z-axis normal to the x-y planar surface of the playing area;

wherein at least one of said first video camera and said second video camera captures at least one of said first media content and second media content from the extreme edges of the x-y planar surface of the playing area.

19. The system of claim 1, wherein said package assembly further comprises:

a corrugated bellows segment creating a mechanical connection between said second video camera and a main body of said package assembly, wherein said corrugated bellows segment is flexible to provide shock absorption by compressing in response to an external force, and wherein said corrugated bellows segment further is capable of being flexed to allow said second video camera to be mechanically tilted relative to the z-axis of the main boy of said package assembly.

20. The system of claim 2, wherein at least one of said hockey net, said soccer net, said volleyball net, and said tennis net is comprised of:

at least one adhesive sandwich assembly for externally attaching said integrated devices to at least one of said hockey net, said soccer net, said volleyball net, and said tennis net; wherein said adhesive sandwich assembly is comprised of:

a first adhesive backing strip having two sides identified as side 1 and side 2;

a second adhesive backing strip having two sides identified as side 3 and side 4;

a third adhesive strip having two sides identified as side 5 and side 6;

a fourth adhesive strip having two sides identified as side 7 and side 8;

wherein side 1 of said first adhesive backing strip is bonded to a first said integrated device; and wherein side 8 of said fourth adhesive backing strip is bonded to a second said integrated device; and wherein side 4 of said second adhesive strip and side 5 of said third adhesive strip are pressed together to form a sandwich with at least one of said hockey net and said soccer net and said volleyball net and said tennis net, thereby capturing and constraining at least one of said hockey net and said soccer net and said volleyball net and said tennis net between them, and forming an attachment;

and wherein side 2 of said first adhesive backing strip is pressed together with side 3 of said second adhesive strip;

wherein said first adhesive backing strip adheres to said second adhesive strip;

wherein side 7 of said fourth adhesive backing strip is pressed together with side 6 of said third adhesive strip;

wherein said fourth adhesive backing strip adheres to said third adhesive strip, thereby attaching the first said integrated device and the second said integrated device to opposite sides of at least one of said hockey net and said soccer net and said volleyball net and said tennis net.

21. The system of claim 2, wherein said baseball base is comprised of:

a top surface;

a plurality of first microphones located flush with said baseball base's said top surface; and a plurality of said first microphones located in proximity to said baseball base's said integrated devices by a predetermined distance;

wherein said first microphones are molded and encapsulated inside said baseball base's form; and wherein said first microphones are for capturing sounds conducted through said baseball base from the playing area.

22. The system of claim 2, wherein said baseball home plate is comprised of:

a flat top surface;

a plurality of first microphones located flush with said baseball home plate's said top surface; and a plurality of said first microphones located in proximity to said baseball home plate's said integrated devices;

wherein said first microphones are molded and encapsulated inside said baseball home plate's form; and wherein said first microphones are for capturing sounds conducted through said baseball home plate from the playing area.

23. The system of claim 2, wherein said baseball pitcher's rubber is comprised of:

a flat top surface; and a plurality of first microphones located flush with said baseball pitcher's rubber's said top surface;

wherein said first microphones are molded and encapsulated inside said baseball pitcher's rubber form; and wherein said first microphones are for capturing sounds conducted through said baseball pitcher's rubber from the playing area.

24. The system of claim 3, wherein said hockey puck is comprised of:

a flat top surface;

a flat bottom surface; and a plurality of second microphones located flush with said hockey puck's said top surface and said bottom surface;

at least two said package assemblies;

wherein at least one said package assembly is disposed beneath said hockey puck's said top surface; and wherein at least one said package assembly is disposed above said hockey puck's said bottom surface, thereby enabling said second media content to be captured from both said top surface and said bottom surface of said hockey puck by said second video cameras and said second microphones;

a plurality of said second microphones located on said hockey puck's said package assemblies;

and wherein said package assemblies are molded and encapsulated inside said hockey puck's form;

wherein said second microphones are for capturing sounds conducted through said hockey puck from the playing area for facilitating stabilized audio and surround sound.

25. The system of claim 12, wherein said system further comprises:

a mobile broadband tower means configured to receive the status of functions associated with at least one of said fixed instrumented sports paraphernalia objects and said dynamic instrumented sports paraphernalia objects via said communication link; and wherein said mobile broadband tower means is further configured for distributing the status of functions associated with at least one of said fixed instrumented sports paraphernalia objects and said dynamic instrumented sports paraphernalia objects to said laptop PC via WIFI;

whereby said laptop PC is operated by the sporting venue's authorized field personnel during and after a sporting event in support of repairs and preventive maintenance; and wherein said mobile broadband tower means is further configured to receive said first media content from said fixed instrumented sports paraphernalia object via said communication link; and wherein said mobile broadband tower means is further configured to receive second media content from said dynamic instrumented sports paraphernalia object via said communication link.

26. A method for delivering audio and video of a sporting event at a sporting venue comprising:

capturing, by a fixed instrumented sports paraphernalia object, first media content from a playing area of the sporting venue;

capturing, by a dynamic instrumented sports paraphernalia object, second media content from a playing area of the sporting venue wherein said fixed instrumented sports paraphernalia object, integrated into said playing area of the sporting venue, comprises integrated devices comprising at least one first video camera and at least one first microphone, and a bi-directional communication link configured to transmit said first media content captured by said first video camera and said first microphone;

wherein said dynamic instrumented sports paraphernalia object, different from the fixed instrumented sports paraphernalia object, comprises a package assembly comprising at least one second video camera and at least one second microphone, and a bi-directional communication link configured to transmit said second media content captured by said second video camera and second microphone;

receiving, by at least one antenna array relay junction at the sporting venue, at least one of a said first media content and a said second media content;

transmitting to said antenna array relay junction at least one of said first media content and said second media content from at least one of a said fixed instrumented sports paraphernalia object and a said dynamic instrumented sports paraphernalia object;

receiving, by at least one base station at the sporting venue, at least one of said first media content and said second media content, from at least one of said fixed instrumented sports paraphernalia object and said dynamic instrumented sports paraphernalia object, via said antenna array relay junction;

receiving at said base station at least one of a said first media content and second media content via at least one of said antenna array relay junction;

processing at the base station, using processing circuitry, at least one of a said first media content and second media content to produce processed media content; and transmitting said processed media content from the base station to at least one of a live TV viewing audience a steaming Internet audience, and transmitting, by said base station via said antenna array relay junction, command and control signals to at least one of the fixed instrumented sports paraphernalia object and the dynamic instrumented sports paraphernalia object to control functions associated with at least one of said first video camera and said second video camera;

receiving at the base station feedback via said antenna array relay junction from at least one of the fixed instrumented sports paraphernalia object and the dynamic instrumented sports paraphernalia object with regard to the status of the control functions;

obtaining, by a gyroscope transducer within said package assembly, orientation information comprising pitch, roll, and yaw data related to the dynamic instrumented sports paraphernalia object;

encoding, by said package assembly, said orientation information; and transmitting, by said package assembly, said encoded orientation information to said base station, wherein said base station utilizes said orientation information to stabilize said received second media content;

receiving said orientation information at said base station via said antenna array relay junction;

processing said orientation information at said base station to stabilize said received second media content;

processing at least one of said first media content and said second media to produce stabilized upright images of the playing area;

generating, by said base station, stabilized audio by processing audio signals received from said second microphone to remove effects of spin imparted on said dynamic instrumented sports paraphernalia object, said stabilized audio being fixed to a reference point that is the direction of forward motion of the dynamic instrumented sports paraphernalia object, and wherein said stabilized audio is combined with said processed media content and delivered to at least one of said live TV viewing audience and said streaming internet audience.

27. The method of claim 26, wherein the fixed instrumented sports paraphernalia object comprises:

at least one of football goal post and a hockey net.

28. The method of claim 26, wherein the dynamic instrumented sports paraphernalia object comprises:

at least one of a football and a hockey puck.

29. The method of claim 26, wherein the communication link comprises:

a wireless link.

30. The method of claim 26, further comprising:

relaying, by at least one antenna repeater, at least one of said first media content and said second media content from at least one said fixed instrumented sports paraphernalia object and said dynamic instrumented sports paraphernalia object to said internet; and relaying, by said antenna repeater, at least one of said first media content and said second media content from at least one said fixed instrumented sports paraphernalia object and said dynamic instrumented sports paraphernalia object to said base station.

31. The method of claim 26, wherein the communication link comprises: a fiber optic cable link.

32. A system installed at a sporting venue for delivering audio and video of a sporting event, comprising:

at least one fixed instrumented sports paraphernalia object, integrated into a playing area of the sporting venue, comprising:

integrated devices comprising at least one first video camera and at least one first microphone, and a bi-directional communication link configured to transmit first media content captured by said first video camera and said first microphone;

at least one dynamic instrumented sports paraphernalia object, different from the fixed instrumented sports paraphernalia object, comprising:

a package assembly containing at least one second video camera and at least one second microphone, and a bi-directional communication link configured to transmit second media content captured by said second video camera and second microphone;

at least one base station configured to receive from at least one of said fixed instrumented sports paraphernalia object and said dynamic instrumented sports paraphernalia object, via at least one of a wired communication link and wireless communication link, at least one of said first media content and second media content, wherein said base station comprises processing circuitry configured to process at least one of said first media content and second media content to produce processed media content, wherein said base station is configured to transmit said processed media content to at least one of a live TV viewing audience and a steaming Internet audience, and wherein said base station is further configured to transmit command and control signals to at least one of the fixed instrumented sports paraphernalia object and the dynamic instrumented sports paraphernalia object to control functions associated with at least one of said first video camera and said second video camera;

wherein said package assembly further comprises a gyroscope transducer configured to obtain orientation information comprising pitch, roll, and yaw data related to the dynamic instrumented sports paraphernalia object, the package assembly further configured to encode and transmit said orientation information to said base station, wherein said base station utilizes said orientation information to stabilize said received second media content;

wherein said base station is configured for processing at least one of said first media content and said second media to produce stabilized upright images of the playing area;

wherein said base station is further configured to generate stabilized audio by processing audio signals received from said second microphone to remove effects of spin imparted on said dynamic instrumented sports paraphernalia object, said stabilized audio being fixed to a reference point that is the direction of forward motion of the dynamic instrumented sports paraphernalia object, and wherein said stabilized audio is combined with said processed media content and delivered to said live TV viewing audience and said streaming internet audience;

at least one antenna array relay junction configured for receiving at least one of a said first media content and a said second media content.

33. The system of claim 32, wherein the fixed instrumented sports paraphernalia object comprises:

at least one of a football goal post a hockey net.

34. The system of claim 32, wherein the dynamic instrumented sports paraphernalia object comprises: at least one of a football and a hockey puck.

35. The system of claim 32, wherein the communication link comprises: a wireless link.

36. The system of claim 32, wherein said antenna array relay junction is comprised of:

at least one antenna repeater; and wherein said antenna repeater is configured for relaying at least one of said first media content and said second media content from at least one said fixed instrumented sports paraphernalia object and said dynamic instrumented sports paraphernalia object to said internet; and wherein said antenna repeater is configured for relaying at least one of said first media content and said second media content from at least one said fixed instrumented sports paraphernalia object and said dynamic instrumented sports paraphernalia object to said base station.

37. The system of claim 32, wherein the communication link comprises: a fiber optic cable link.

* * * * *